US010621203B2

(12) United States Patent
Hunt et al.

(10) Patent No.: US 10,621,203 B2
(45) Date of Patent: Apr. 14, 2020

(54) CROSS-CATEGORY VIEW OF A DATASET USING AN ANALYTIC PLATFORM

(75) Inventors: Herbert Dennis Hunt, Bedford, NY (US); John Randall West, Sunnyvale, CA (US); Marshall Ashby Gibbs, Jr., Clarendon Hills, IL (US); Bradley Michael Griglione, Lake Zurich, IL (US); Gregory David Neil Hudson, Riverside, IL (US); Andrea Basilico, Lomazzo (IT); Arvid Conrad Johnson, Frankfort, IL (US); Cheryl G. Bergeon, Arlington Heights, IL (US); Craig Joseph Chapa, Lake Barrington, IL (US); Alberto Agostinelli, Trezzo sull'Adda (IT); Jay Alan Yusko, Lomard, IL (US); Trevor Mason, Bolingbrook, IL (US)

(73) Assignee: Information Resources, Inc., Chicago, IL (US)

( * ) Notice: Subject to any disclaimer, the term of this patent is extended or adjusted under 35 U.S.C. 154(b) by 0 days.

(21) Appl. No.: 12/021,268

(22) Filed: Jan. 28, 2008

(65) Prior Publication Data

US 2009/0018996 A1 Jan. 15, 2009

Related U.S. Application Data

(60) Provisional application No. 60/886,798, filed on Jan. 26, 2007, provisional application No. 60/886,801,
(Continued)

(51) Int. Cl.

| | |
|---|---|
| ***G06F 16/28*** | (2019.01) |
| ***G06F 16/22*** | (2019.01) |
| ***G06Q 30/02*** | (2012.01) |

(52) U.S. Cl.
CPC ........ *G06F 16/283* (2019.01); *G06F 16/2264* (2019.01); *G06Q 30/02* (2013.01)

(58) Field of Classification Search
USPC ......................... 707/600, 603, 736, 752, 776
See application file for complete search history.

(56) References Cited

U.S. PATENT DOCUMENTS

| | | | |
|---|---|---|---|
| 4,908,761 | A | 3/1990 | Tai |
| 5,548,749 | A | 8/1996 | Kroenke et al. |

(Continued)

FOREIGN PATENT DOCUMENTS

| | | | |
|---|---|---|---|
| WO | WO-2008/092147 | A9 | 7/2008 |
| WO | WO-2008092147 | A2 | 7/2008 |
| WO | WO-2008092149 | A2 | 7/2008 |

OTHER PUBLICATIONS

Fangyan Rao , Long Zhang , Xiu Lan Yu , Ying Li , Ying Chen, Spatial hierarchy and OLAP-favored search in spatial data warehouse, Proceedings of the 6th ACM international workshop on Data warehousing and OLAP, Nov. 7-7, 2003, New Orleans, Louisiana, USA.*

(Continued)

*Primary Examiner* — James Trujillo
*Assistant Examiner* — John J Morris
(74) *Attorney, Agent, or Firm* — Strategic Patents, P.C.

(57) ABSTRACT

In embodiments, systems and methods may involve using a platform as disclosed herein for applications described herein where the systems and methods involve receiving a dataset in an analytic platform, the dataset including fact data and dimension data for a plurality of distinct product categories. It may also involve storing the data in a flexible hierarchy, the hierarchy allowing the temporary fixing of data along a dimension and flexible querying along other dimensions of the data. It may also involve pre-aggregating certain combinations of data to facilitate rapid querying, the
(Continued)

pre-aggregation based on the nature of common queries. It may also involve facilitating the presentation of a cross-category view of an analytic query of the dataset. In embodiments, the temporarily fixed dimension can be rendered flexible upon an action by the user.

20 Claims, 103 Drawing Sheets

Related U.S. Application Data filed on Jan. 26, 2007, provisional application No. 60/887,573, filed on Jan. 31, 2007, provisional application No. 60/891,508, filed on Feb. 24, 2007, provisional application No. 60/891,936, filed on Feb. 27, 2007, provisional application No. 60/952,898, filed on Jul. 31, 2007.

(56) References Cited

U.S. PATENT DOCUMENTS 5,675,662 A 10/1997 Deaton et al.
5,726,914 A 3/1998 Janovski et al.
5,737,494 A 4/1998 Lawrence et al.
5,758,257 A 5/1998 Herz et al.
5,819,226 A 10/1998 Gopinathan et al.
5,832,509 A 11/1998 Mortis et al.
5,845,285 A 12/1998 Klein
5,884,305 A 3/1999 Kleinberg et al.
5,966,695 A 10/1999 Melchione et al.
5,974,396 A 10/1999 Anderson et al.
5,978,788 A * 11/1999 Castelli et al.
6,073,112 A 6/2000 Geerlings
6,163,774 A * 12/2000 Lore et al. .................. 705/36 R
6,233,573 B1 * 5/2001 Bair et al.
6,282,544 B1 * 8/2001 Tse et al. ...................... 707/600
6,317,722 B1 11/2001 Jacobi et al.
6,401,070 B1 6/2002 McManus et al.
6,434,544 B1 * 8/2002 Bakalash et al.
6,480,842 B1 * 11/2002 Agassi ............. G06F 17/30398
6,523,025 B1 2/2003 Hashimoto et al.
6,556,974 B1 4/2003 D'alessandro et al.
6,642,946 B1 11/2003 Janes et al.
6,662,192 B1 12/2003 Rebane
6,687,705 B2 2/2004 Agrawal et al.
6,708,156 B1 3/2004 Gonten
6,920,461 B2 7/2005 Hejlsberg et al.
6,928,434 B1 8/2005 Choi et al.
6,965,886 B2 11/2005 Govrin et al.
7,010,523 B2 3/2006 Greenfield et al.
7,043,492 B1 5/2006 Neal et al.
7,082,426 B2 7/2006 Musgrove et al.
7,107,254 B1 9/2006 Dumais et al.
7,133,865 B1 * 11/2006 Pedersen et al.
7,177,855 B2 * 2/2007 Witkowski et al. .......... 707/718
7,191,183 B1 3/2007 Goldstein
7,239,989 B2 * 7/2007 Kothuri ............................ 703/2
7,269,517 B2 9/2007 Bondarenko
7,333,982 B2 * 2/2008 Bakalash et al.
7,360,697 B1 * 4/2008 Sarkar et al. ................. 235/383
7,430,532 B2 9/2008 Wizon et al.
7,469,246 B1 12/2008 Lamping
7,490,052 B2 2/2009 Kilger et al.
7,493,308 B1 2/2009 Bair et al.
7,499,908 B2 3/2009 Elnaffar et al.
7,577,579 B2 8/2009 Watarai et al.
7,606,699 B2 * 10/2009 Sundararajan et al. ........ 703/26
7,672,877 B1 3/2010 Acton et al.
7,698,170 B1 4/2010 Darr et al.
7,702,645 B2 4/2010 Khushraj et al.
7,747,617 B1 6/2010 Bair et al.
7,800,613 B2 * 9/2010 Hanrahan et al. ............ 345/440
7,801,967 B1 9/2010 Bedell et al.
7,870,031 B2 1/2011 Bolivar
7,870,039 B1 1/2011 Dom et al.
7,949,639 B2 5/2011 Hunt et al.
8,041,741 B1 10/2011 Bair et al.
8,086,643 B1 12/2011 Tenorio
8,117,063 B2 2/2012 Xie et al.
8,160,984 B2 4/2012 Hunt et al.
8,788,372 B2 7/2014 Kettner et al.
2001/0044758 A1 11/2001 Talib et al.
2001/0056398 A1 12/2001 Scheirer et al.
2002/0099598 A1 7/2002 Eicher, Jr. et al.
2002/0116213 A1 * 8/2002 Kavounis .............. G06Q 10/06 705/1.1
2002/0123945 A1 9/2002 Booth et al.
2002/0186818 A1 12/2002 Arnaud et al.
2003/0004779 A1 1/2003 Rangaswamy et al.
2003/0018513 A1 1/2003 Hoffman et al.
2003/0028424 A1 2/2003 Kampff et al.
2003/0083947 A1 5/2003 Hoffman et al.
2003/0088565 A1 5/2003 Walter et al.
2003/0093340 A1 5/2003 Krystek et al.
2003/0126143 A1 * 7/2003 Roussopoulos et al. ..... 707/100
2003/0149586 A1 8/2003 Chen et al.
2003/0158749 A1 8/2003 Olchanski et al.
2003/0200134 A1 10/2003 Leonard et al.
2003/0210278 A1 11/2003 Kyoya et al.
2003/0228541 A1 12/2003 Hsu et al.
2003/0233297 A1 * 12/2003 Campbell ....................... 705/31
2003/0236791 A1 12/2003 Wilmsen et al.
2004/0015460 A1 1/2004 Alhadef et al.
2004/0107205 A1 6/2004 Burdick et al.
2004/0143508 A1 7/2004 Bohn et al.
2004/0210562 A1 * 10/2004 Lee et al. .......................... 707/3
2005/0039033 A1 2/2005 Meyers et al.
2005/0060300 A1 * 3/2005 Stolte et al. ...................... 707/3
2005/0114377 A1 5/2005 Russell et al.
2005/0131830 A1 6/2005 Juarez et al.
2005/0187977 A1 8/2005 Frost
2005/0197883 A1 9/2005 Kettner et al.
2005/0197926 A1 9/2005 Chinnappan et al.
2005/0240085 A1 10/2005 Knoell et al.
2005/0240577 A1 * 10/2005 Larson et al. .................... 707/3
2005/0246307 A1 11/2005 Bala
2005/0267889 A1 12/2005 Snyder et al.
2005/0278139 A1 12/2005 Glaenzer et al.
2005/0278597 A1 12/2005 Miguelanez et al.
2006/0009935 A1 1/2006 Uzarski et al.
2006/0080141 A1 4/2006 Fusari et al.
2006/0080294 A1 * 4/2006 Orumchian et al. .............. 707/3
2006/0085386 A1 * 4/2006 Thanu ................... G06F 17/246
2006/0136428 A1 6/2006 Syeda-Mahmood et al.
2006/0164257 A1 7/2006 Giubbini
2006/0206485 A1 9/2006 Rubin et al.
2006/0212413 A1 9/2006 Rujan et al.
2006/0218157 A1 * 9/2006 Sourov et al. ................ 707/100
2006/0253476 A1 11/2006 Roth et al.
2006/0259358 A1 11/2006 Robinson et al.
2006/0282339 A1 12/2006 Musgrove et al.
2007/0028111 A1 2/2007 Covely
2007/0118541 A1 5/2007 Nathoo
2007/0160320 A1 7/2007 McGuire et al.
2007/0174290 A1 7/2007 Narang et al.
2007/0203919 A1 8/2007 Sullivan et al.
2007/0250404 A1 10/2007 Bangalore et al.
2007/0276676 A1 11/2007 Hoenig et al.
2008/0005106 A1 1/2008 Schumacher et al.
2008/0021864 A1 * 1/2008 Bakalash .......... G06F 17/30457
2008/0033914 A1 * 2/2008 Cherniack et al. ............... 707/3
2008/0059489 A1 3/2008 Han et al.
2008/0071630 A1 3/2008 Donahue et al.
2008/0077469 A1 3/2008 Philport et al.
2008/0147699 A1 6/2008 Kruger et al.
2008/0162302 A1 7/2008 Sundaresan et al.
2008/0168027 A1 7/2008 Kruger et al.
2008/0168028 A1 7/2008 Kruger et al.
2008/0168104 A1 7/2008 Kruger et al.
2008/0228797 A1 9/2008 Kenedy et al.
2008/0256028 A1 10/2008 Kruger et al.
2008/0256099 A1 10/2008 Chodorov et al.
2008/0256275 A1 10/2008 Hofstee et al.

(56) References Cited

U.S. PATENT DOCUMENTS

| | | | |
|---|---|---|---|
| 2008/0270363 | A1 | 10/2008 | Hunt et al. |
| 2008/0276232 | A1 | 11/2008 | Aguilar et al. |
| 2008/0288209 | A1 | 11/2008 | Hunt et al. |
| 2008/0288889 | A1 | 11/2008 | Hunt et al. |
| 2008/0294372 | A1 | 11/2008 | Hunt et al. |
| 2008/0294583 | A1 | 11/2008 | Hunt et al. |
| 2008/0294996 | A1 | 11/2008 | Hunt et al. |
| 2008/0319829 | A1 | 12/2008 | Hunt et al. |
| 2009/0006156 | A1 | 1/2009 | Hunt et al. |
| 2009/0006490 | A1 | 1/2009 | Hunt et al. |
| 2009/0012971 | A1 | 1/2009 | Herbert et al. |
| 2009/0018891 | A1 | 1/2009 | Eder |
| 2009/0070131 | A1 | 3/2009 | Chen |
| 2009/0132541 | A1 | 5/2009 | Barsness et al. |
| 2009/0132609 | A1 | 5/2009 | Barsness et al. |
| 2009/0150428 | A1 | 6/2009 | Anttila et al. |
| 2010/0070333 | A1 | 3/2010 | Musa |
| 2012/0173472 | A1 | 7/2012 | Hunt et al. |
| 2014/0032269 | A1 | 1/2014 | West |
| 2016/0224996 | A1 | 8/2016 | Hunt et al. |

OTHER PUBLICATIONS

Inderpal Singh Mumick , Dallan Quass , Barinderpal Singh Mumick, Maintenance of data cubes and summary tables in a warehouse, Proceedings of the 1997 ACM SIGMOD international conference on Management of data, p. 100-111, May 11-15, 1997, Tucson, Arizona, United States.*

Chaudhuri, S.; Dayal, U.; Ganti, V.; , "Database technology for decision support systems," Computer , vol. 34, No. 12, pp. 48-55, Dec. 2001 doi: 10.1109/2.970575 URL: http://ieeexplore.ieee.org/stamp/stamp.jsp?tp=&arnumber=970575&isnumber=20936.*

Surajit Chaudhuri , Umeshwar Dayal, An overview of data warehousing and OLAP technology, ACM SIGMOD Record, v.26 n.1, p. 65-74, Mar. 1997 [doi>10.1145/248603.248616].*

George Colliat, OLAP, relational, and multidimensional database systems, ACM SIGMOD Record, v.25 n.3, p. 64-69, Sep. 1996 [doi>10.1145/234889.234901].*

Ralph Kimball , Kevin Strehlo, Why decision support fails and how to fix it, ACM SIGMOD Record, v.24 n.3, p. 92-97, Sep. 1995 [doi>10.1145/211990.212023].*

"U.S. Appl. No. 11/927,502, Non-Final Office Action dated Jan. 8, 2009", , 12 pgs.

"U.S. Appl. No. 11/927,528 , Non-Final Office Action dated Nov. 30, 2009", , 11 pgs.

"U.S. Appl. No. 11/927,550, Non-Final Office Action dated Jan. 8, 2009", , 12 pgs.

"U.S. Appl. No. 11/927,565, Non-Final Office Action dated Jan. 9, 2009", , 12 pgs.

"U.S. Appl. No. 12/021,263, Non Final Office Action dated Jul. 22, 2009", , 27.

"U.S. Appl. No. 12/023,284, Non-Final Office Action dated Jun. 24, 2009", , 17 pgs.

"U.S. Appl. No. 12/023,294, Non-Final Office Action dated Jun. 25, 2009", , 13 pgs.

Baron, S. et al., "The Challenges of Scanner Data", *The Journal of the Operational Research Society*; vol. 46(1) Jan. 1995 , 50-61.

Bronnenberg, B. T. et al., "Unobserved Retailer Behavior in Multimarket Behavior", *Joint Spatial Dependence in Market Shares and Promotional Variables* Marketing Science, 20, 3, ABI/INFORM Global Summer 2001 , p. 284.

Guadagni, P. M. et al., "A logit model of brand choice calibrated on scanner data", *Marketing Science*, vol. 2, No. 3 Summer 1983 , 203-238 pgs.

Intl Searching Authority, , "International Search Report", *For US Patent Application No. PCT/US2008/052187, dated Oct. 30, 2008* dated Oct. 30, 2008.

Intl Searching Authority, , "International Search Report", *For US Patent Application No. PCT/US2008/052195, dated Jun. 25, 2008* dated Jun. 25, 2008.

McCullock, R. et al., "An Exact Likelihood Analysis of the Multinomial Probit Model", *Journal of Econometrics* ,vol. 64 1994 , 207-240.

Qian, J. et al., "Optimally Weighted Means in Stratified Sampling", amstat.org 1994 , 863-866.

Swait, J. et al., "Enriching Scannel Panel Models with Choice Experiments", *Marketing Science,22(4); ABI/INFORM Global* Fall 2003 , 442-460 pgs.

"U.S. Appl. No. 12/020,740, Non-Final Office Action dated Mar. 30, 2010", , 3.

"U.S. Appl. No. 11/927,515, Non-Final Office Action dated Feb. 17, 2010", , 10 Pgs.

"U.S. Appl. No. 12/023,294, Final Office Action dated Mar. 10, 2010", , 14.

Malhotra, N et al., "Marketing research in the new millennium: Emerging issues and trends", *Marketing Intelligence and Planning* vol. 19, No. 4. 2001 , 216-235 Pgs.

Renard, Y , "Perturbation singuliere d'un probleme de frottement sec non monotone", "*Singular perturbation approach to an elastic dry friction problem with non monotone coefficient*" Quarterly of Applied Mathematics, LVIII, No. 2:303-324, 2000 Apr. 11, 1997 , all.

"U.S. Appl. No. 12/021,495, Non-Final Office Action dated May 26, 2010", , 15.

"U.S. Appl. No. 12/023,400, Non-Final Office Action dated Aug. 11, 2010", , 8 pgs.

"U.S. Appl. No. 12/023,305, Non-Final Office Action dated Aug. 18, 2010", , 16 pgs.

"U.S. Appl. No. 12/023,305, Final Office Action dated Apr. 27, 2011", , 14.

"U.S. Appl. No. 12/023,310, Final Office Action dated Apr. 26, 2011", , 16.

"Access control: Policies, models, and mechanisms", P Samarati, SC de Vimercati— . . . of Security Analysis and Design, 2001—Springer , 405 pages.

"U.S. Appl. No. 12/020,740 Notice of Allowance dated Jun. 7, 2013", 11 pages.

"U.S. Appl. No. 12/021,916, Final Office Action dated Aug. 1, 2013", , 20 pages.

"Secure computer system: Unified exposition and multics interpretation", DE Bell, LJ La Padula—1976 DTIC Document , 133 pages.

"U.S. Appl. No. 12/022,667 Final Office Action dated Aug. 7, 2013", 14 pages.

"U.S. Appl. No. 12/020,740, Final Office Action dated Oct. 27, 2010", , 2 pgs.

"U.S. Appl. No. 12/023,310, Non-Final Office Action dated Sep. 22, 2010", , 19.

"U.S. Appl. No. 12/020,740, Non-Final Office Action dated Nov. 26, 2012", SN:12020740-NFOA-112612 NPL-136 Nov. 26, 2012 , 11 pgs.

"U.S. Appl. No. 13/418,518, Non-Final Office Action dated Oct. 25, 2012", SN:13418518_NFOA-102512 NPL-139 Oct. 25, 2012 , 37 pages.

"U.S. Appl. No. 13/947,216, Non-Final Office Action dated Nov. 7, 2013", 33 pages.

"U.S. Appl. No. 13/947,216, Notice of Allowance dated Dec. 23, 2013", 8 pages.

"U.S. Appl. No. 12/021,916, Final Office Action dated Mar. 13, 2012 00-00-00", 133.

Sandhu, Ravi S. et al., "Role-Based Access Control Models", 1996 IEEE, Feb. 1996 , 10 pages.

"U.S. Appl. No. 12/022,667, Non-Final Office Action dated Jan. 15, 2014", 14 pages.

*Acxiom Product Brochure* pp. 108 2008 , 1-8.

*Abilitec Bureau Services Brochure* 2009 , 1-9.

"U.S. Appl. No. 12/020,740, Non-Final Office Action dated Mar. 30, 2011", , 8.

"U.S. Appl. No. 12/021,227, Non-Final Office Action dated Apr. 4, 2011", U.S. Appl. No. 12/021,227 , 26.

"U.S. Appl. No. 12/021,495, Notice of Allowance dated Mar. 24, 2011", U.S. Appl. No. 12/021,495 , 9 pgs.

"U.S. Appl. No. 12/022,667, Non-Final Office Action dated Apr. 8, 2011", , 17.

(56) References Cited

OTHER PUBLICATIONS

"U.S. Appl. No. 12/021,495, Final Office Action dated Feb. 16, 2011", U.S. Appl. No. 12/021,495 , 14.
"U.S. Appl. No. 12/023,400, Final Office Action dated Apr. 6, 2011", , 10.
Dan, Briody "Matching Customer Buying Patterns online and offline poses challenges for Retailers", Infoworld, May 29, 2000 , 36.
Kamakura, Wagner A. Statistical Data Fusion for Cross-Tabulation,University of Pittsburgh,University of Groningen Mar. 12, 1996 , 1-34.
Shilakes, Christopher C. Enterprise Information Portals, Merrill Lynch, Enterprise Software Team Nov. 16, 1998 , 1-64.
Zadrozny, Bianca et al., "Second International Workshop on Utility-Based Data Mining", Workshop Chairs Bianca Zadrozny, Gary Weiss, Maytal Saar-Tsechansky. Held in conjuctionwith the KDD conference, Aug. 20, 2006, Copyright 2006 by the Association for Computing Machinery, Inc (AMC), Aug. 20, 2006 , 81 pages.
Greenberg, Ken et al., "Using Panels to Understand the Consumer", Ken Greenberg, Vice President, Marketing, ACNielsen Homescan, US, Published May 2006. May 2006 , pp. 1-3.
"U.S. Appl. No. 12/023,310, Non-Final Office Action dated Sep. 24, 2013", 33 pages.
"U.S. Appl. No. 12/021,227, Non-Final Office Action dated Sep. 26, 2013", 26 pages.
"A framework for evaluating privacy preserving data mining algorithms", [PDF] from aau.dk,E Bertino, IN Fovino . . . —Data Mining and Knowledge . . . ,2005—Springer.
"Achieving privacy preservation when sharing data for clustering[PDF] from pp.ua S Oliveira", Secure Data Management, 2004 Springer.
"U.S. Appl. No. 12/020,740 Non Final Office Action dated Nov. 10, 2011", , 14 Pgs.
"U.S. Appl. No. 12/022,667 Final Office Action dated Dec. 19, 2011", , 14.
"U.S. Appl. No. 12/021,227, Final Office Action dated Dec. 2, 2011", , 18.
"U.S. Appl. No. 12/023,305, Notice of Allowance dated Dec. 13, 2011", , 11 Pgs.
"On the design and quantification of privacy preserving data mining algorithms[PDF] from utdallas.", edu D Agrawal . . . —Proceedings of the twentieth ACM SIGMOD— . . . ,2001—dl.acm.org.
"Personalized privacy preservation[PDF] from sabanciuniv.edu X", Xiao . . . —Proceedings of the 2006 ACM SIGMOD international . . . ,2006—dl.acm.org.
"Protecting Consumer Data in Composite Web Services[PDF] from rmit.edu.au", C Pearce, P Bertok . . . —Security and Privacy in the Age of . . . , 2005—Springer.
"State-of-the-art in privacy preserving data mining", [PDF] from sigmod.org VS Verykios, E Bertino, IN Fovino . . . —ACM SIGMOD . . . ,2004—dl.acm.org.
"The applicability of the perturbation based privacy preserving data mining for real-world data[PDF] from utdallas.edu L Liu, M", Kantarcioglu . . . —Data & Knowledge Engineering, 2008—Elsevier.
web.archive.org, , "Our Mission", PMGBenchmarking.com Sep. 18, 2000 , pp. 1.
"Webcasts", Web.archive.org, PMGBenchmarking.com Jun. 8, 2002 , 1-2.
web.archive.org, , "Measure Your Performance", PMGBenchmarking.com Jun. 7, 2002 , pp. 1-3.
"Signals of Performance", Web.archive.org, PMGBenchmarking.com Jun. 2, 2002 , 1-2.
"The Performance Measurement Group Rolls out Product Development Benchmarking Series Online", PRTM Press release Jun. 11, 1999 , 1-2.
PRTM Press Release, , "New Survey Addresses Product and Marketing Management", May 21, 1999 , 1.
PRTM Press Release, , "Fujitsu and PRTM/PMG Announce Supply-Chain Benchmarking and Consulting Collaboration in Japan", Mar. 1, 1999 , 1.
PRTM Press Release, , "High Tech Management Consultants PRTM Launch Online Benchmarking Company", Mar. 1, 1999 , 1-2.
web.archive.org, , "Supply-Chain Management Benchmarking Series—Tips & Slips", vol. 4: Subscriber Site Navigation PMGBenchmarking.com, vol. 4: Subscriber Site Navigation Feb. 8, 2011 , pp. 1-11.
"SAP Partnership—Product Offerings and Credentials", Web.archive.org, PMGBenchmarking.com Feb. 8, 2001 , 1.
"Supply-Chain Management Benchmarking Series—Tips & Slips, vol. 3: Plan Survey FAQ's", Web.archive.org, PMGBenchmarking.com Feb. 8, 2001 , 1-6.
web.archive.org, , "Supply-Chain Management Benchmarking Series vol. 2", PMGBenchmarking.com Feb. 8, 2001 , 1-3.
"SAP Partnership—a research note published by AMR on the PMG/SAP Alliance", Web.archive.org, PMGBenchmarking.com Feb. 10, 2001 , all.
web.archive.org, , "SAP Partnership—Continuous Performance Assessments", PMGBenchmarking.com Continuous Performance Assessments Feb. 10, 2001 , pp. 1.
"SAP Partnership—Peformance Snapshots", Web.archive.org, PMGBenchmarking.com Feb. 10, 2001 , 1-2.
"Product Development Benchmarking Series", Web.archive.org, PMGBenchmarking.com Dec. 6, 2000 , 1-2.
web.archive.org, "SAP Partnership", PMGBenchmarking.com Dec. 6, 2000 , 1.
"Supply-Chain Management Benchmarking Series", Web.archive.org, PMGBenchmarking.com Dec. 6, 2000 , 1-2.
"Supply-Chain Management and Product Development Benchmarking Series", Web.archive.org, PMGBenchmarking.com Dec. 5, 2000 , 1-2.
"Supply Chain Letter", Web.archive.org, supply-chain.org Dec. 5, 1998 , 1-12.
web.archive.org, , "Questions frequently asked by development professionals considering a subscriptions to the Product Development Benchmarking Series", PMGBenchmarking.com Oct. 6, 2000 , pp. 1-4.
"SAP and PMG Introduce Industry-specific Key Performance Indicators for Supply-Chain Operations", PRTM Press Release Jan. 31, 2000 , 1-2.
PRTM Press Release, , "University of Michigan/OSAT and the Performance Measurment Group Launch a new Benchmarking Initiative for the Automotive Industry", Jan. 21, 2000 , 1-2.
"Improving performance and cutting costs", Strategic Direction, v16n1 Jan. 2000 , 1-4.
"Industry standard benchmarking program", SAP Press release Jan. 20, 2000 , 1.
"Benchmarking Studies by PRTM", Web.archive.org, prtm.com Jan. 17, 1998 , 1-4.
Dimensions: Executive Summary, , "The Performance Measurement Group", Jul. 2000 , pp. 1-4.
"Supply-Chain Management Benchmarking Series vol. 1", Web.archive.org, PMGBenchmarking.com Feb. 8, 2001 , 1-5.
"U.S. Appl. No. 12/021,916, Non-Final Office Action dated Jul. 25, 2011", , 40.
"U.S. Appl. No. 12/022,667 Non-Final Office Action dated Mar. 14, 2013", 15 pages.
"U.S. Appl. No. 13/418,518 Notice of Allowance dated Mar. 19, 2013", 13 pages.
"U.S. Appl. No. 12/021,916, Non-Final Office Action dated Apr. 12, 2013", 22 pages.
"U.S. Appl. No. 12/022,667 Final Office Action dated Aug. 12, 2014", 17 pages.
"U.S. Appl. No. 12/021,227, Final Office Action dated May 14, 2014", 26 pages.
"U.S. Appl. No. 12/023,310, Final Office Action dated Mar. 24, 2014", 14 pages.
"U.S. Appl. No. 12/023,294, Non-Final Office Action dated Mar. 4, 2014", 12 pages.
Huang, et al., "Single-Mode Projection Filters for Modal Parameter Identification for Flexible Solutions", revision received Feb. 29, 1988, Copyright American Institute of Aeronautics and Astronautics, Inc. pp. 568-576.
"U.S. Appl. No. 12/023,294, Non-Final Office Action dated Jul. 31, 2014", 16 pages.

(56) References Cited

OTHER PUBLICATIONS

"U.S. Appl. No. 12/023,294, Final Office Action dated Dec. 5, 2014", 19 pages.
"U.S. Appl. No. 12/023,310, Non-Final Office Action dated Oct. 22, 2014", 15 pages.
USPTO, "U.S. Appl. No. 12/021,227, Final Office Action dated Aug. 14, 2015", 18 pages.
"U.S. Appl. No. 12/023,310, Notice of Allowance dated Dec. 23, 2015", 8 pages.
"U.S. Appl. No. 12/022,667 Final Office Action dated Oct. 21, 2015", 18 pages.
"U.S. Appl. No. 12/023,294, Final Office Action dated Oct. 7, 2015", 16 pages.
Abe, Makoto,et al., "Store Sales and Panel Purchase Data: Are They Compatible?", Department of Marketing, University of Illinois at Chicago; Leavey School of Business, Oct. 1995 , 30 pages.
"U.S. Appl. No. 12/021,227, Non-Final Office Action dated Mar. 17, 2015", 26 pages.
"U.S. Appl. No. 12/022,667 Non-Final Office Action dated Apr. 14, 2015", 17 pages.
"U.S. Appl. No. 12/023,294, Non-Final Office Action dated Jun. 24, 2015", 13 pages.
"U.S. Appl. No. 12/023,310, Final Office Action dated Feb. 25, 2015", 15 pages.
"U.S. Appl. No. 12/023,310, Non-Final Office Action dated Jun. 10, 2015", 15 pages.
"U.S. Appl. No. 12/022,667, Non-Final Office Action dated Apr. 6, 2016", 17 pages.
"U.S. Appl. No. 12/022,667, Non-Final Office Action dated Dec. 14, 2016", 18 pages.
"U.S. Appl. No. 12/023,294, Final Office Action dated Nov. 4, 2016", 18 pages.
"U.S. Appl. No. 12/021,227, Final Office Action dated Nov. 10, 2016", 15 pages.
"U.S. Appl. No. 15/042,459, Non-Final Office Action dated Nov. 2, 2016", 16 pages.
"U.S. Appl. No. 12/021,227, Non-Final Office Action dated Jun. 15, 2016", 13 pages.
"U.S. Appl. No. 12/022,667, Final Office Action dated Aug. 2, 2016", 15 pages.
"U.S. Appl. No. 12/023,294, Non-Final Office Action dated Jun. 8, 2016", 18 pages.
"U.S. Appl. No. 12/021,227, Non-Final Office Action dated Apr. 14, 2017", 19 pages.
"U.S. Appl. No. 12/022,667, Final Office Action dated Jun. 2, 2017", 15 pages.
"U.S. Appl. No. 12/023,294, Non-Final Office Action dated Apr. 6, 2017", 18 pages.
"U.S. Appl. No. 15/042,459, Final Office Action dated Apr. 21, 2017", 22 pages.
"U.S. Appl. No. 12/021,227 Non-Final Office Action dated Mar. 15, 2018", 20 pages.
"U.S. Appl. No. 12/022,667 Final Office Action dated May 29, 2018", 21 pages.
"U.S. Appl. No. 15/042,459 Final Office Action dated Apr. 6, 2018", 23 pages.
"U.S. Appl. No. 12/023,294 Final Office Action dated Oct. 18, 2017", 18 pages.
"U.S. Appl. No. 12/022,667 Non-Final Office Action dated Sep. 26, 2017", 16 pages.
"U.S. Appl. No. 15/042,459 Non-Final Office Action dated Oct. 5, 2017", 20 pages.
"U.S. Appl. No. 12/021,227, Final Office Action dated Aug. 30, 2017", 16 pages.
"U.S. Appl. No. 12/021,227 Final Office Action dated Sep. 4, 2018", 15 pages.
"U.S. Appl. No. 12/022,667 Non-Final Office Action dated Dec. 20, 2018", 17 pages.
"U.S. Appl. No. 12/022,667 Final Office Action dated Aug. 27, 2019", 18 pages.

* cited by examiner

PLATO BASIC LOGIC

BOOLEAN LOGIC

TRUE (KNOWN) = 1 FALSE (UNKNOWN) = 0

INFORMATION LOGIC:

HOW MUCH A KNOWN INFO CAN CONTRIBUTE TO THE KNOWLEDGE OF AN UNKNOWN ENTITY?

| | |
|---|---|
| FULLY KNOWN: | 1 (INFO IS ABLE TO PROVIDE COMPLETE KNOWLEDGE OF TARGET ENTITY) |
| | Ø (INFO DOES NOT/CANNOT CONTRIBUTE AT ALL TO TARGET ENTITY KNOWLEDGE) |
| UNKNOWN: | $K \geq 0$ (INFO EXPECTED CONTRIBUTION TO TARGET ENTITY KNOWLEDGE) |

*FIG. 5*

PROJECTIONS (AND THEREFORE GEOGRAPHY) CHARACTERISTICS DEPEND FROM W(S) AND W(U) CHARACTERISTICS, AS WELL AS FROM THE RELATIONS BETWEEN THE TWO

IMPORTANT NOTE: THE FIGURE AIMS TO POINT OUT THAT RELAXING CONDITIONS WE CAN INCREASE THE # OF GEOGRAPHIES WE CAN DELIVER – IT DOES NOT MEAN THAT GEOGRAPHY TYPES ARE HIERARCHICALLY STRUCTURED (WITH EXCEPTION OF TYPE0 AND TYPE1)

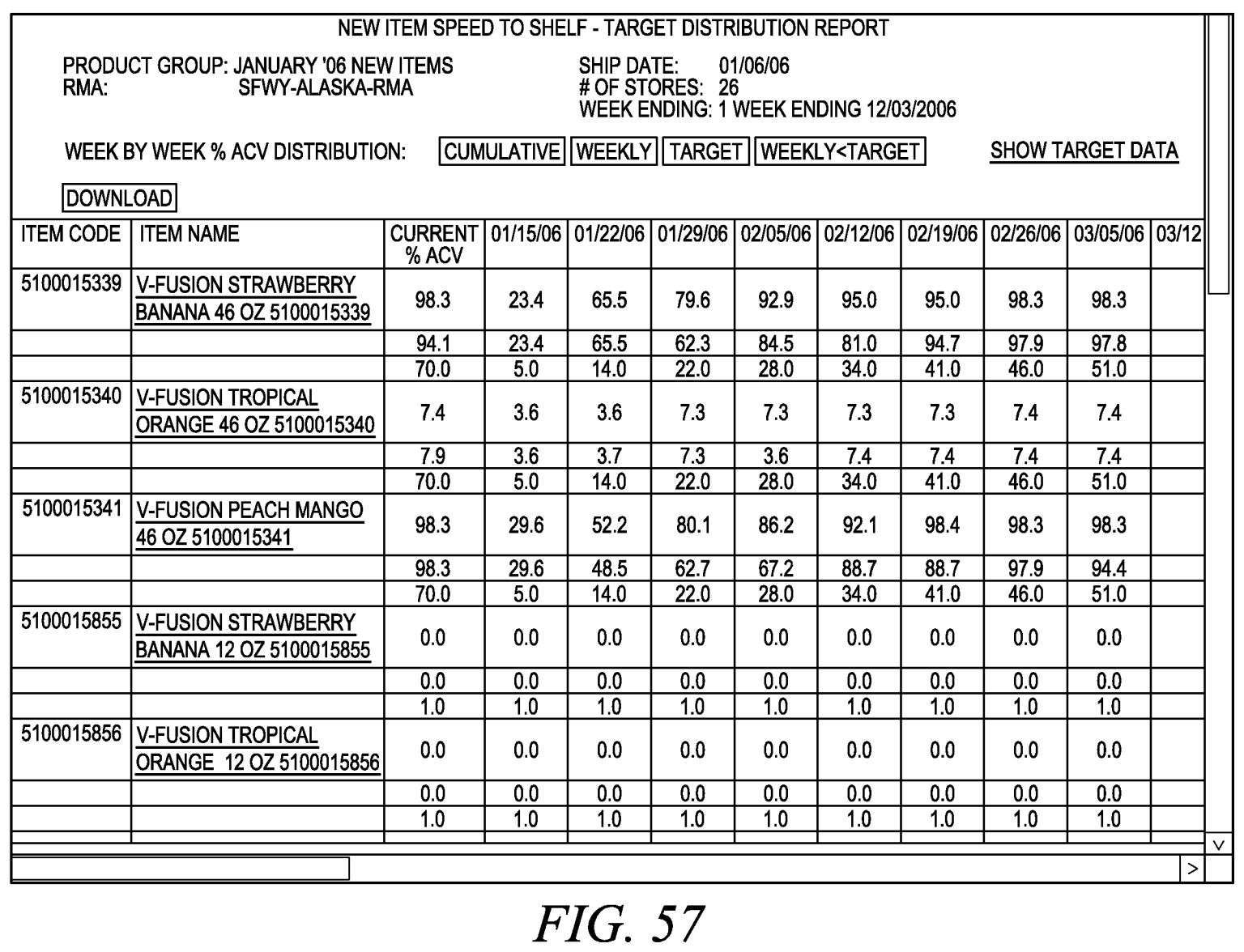

NEW ITEM SPEED TO SHELF - TARGET DISTRIBUTION REPORT

PRODUCT GROUP: JANUARY '06 NEW ITEMS
RMA: SFWY-ALASKA-RMA

SHIP DATE: 01/06/06
OF STORES: 26
WEEK ENDING: 1 WEEK ENDING 12/03/2006

WEEK BY WEEK % ACV DISTRIBUTION: CUMULATIVE | WEEKLY | TARGET | WEEKLY<TARGET

SHOW TARGET DATA

DOWNLOAD

| ITEM CODE | ITEM NAME | CURRENT % ACV | 01/15/06 | 01/22/06 | 01/29/06 | 02/05/06 | 02/12/06 | 02/19/06 | 02/26/06 | 03/05/06 | 03/12 |
|---|---|---|---|---|---|---|---|---|---|---|---|
| 5100015339 | V-FUSION STRAWBERRY BANANA 46 OZ 5100015339 | 98.3 | 23.4 | 65.5 | 79.6 | 92.9 | 95.0 | 95.0 | 98.3 | 98.3 | |
| | | 94.1 | 23.4 | 65.5 | 62.3 | 84.5 | 81.0 | 94.7 | 97.9 | 97.8 | |
| | | 70.0 | 5.0 | 14.0 | 22.0 | 28.0 | 34.0 | 41.0 | 46.0 | 51.0 | |
| 5100015340 | V-FUSION TROPICAL ORANGE 46 OZ 5100015340 | 7.4 | 3.6 | 3.6 | 7.3 | 7.3 | 7.3 | 7.3 | 7.4 | 7.4 | |
| | | 7.9 | 3.6 | 3.7 | 7.3 | 3.6 | 7.4 | 7.4 | 7.4 | 7.4 | |
| | | 70.0 | 5.0 | 14.0 | 22.0 | 28.0 | 34.0 | 41.0 | 46.0 | 51.0 | |
| 5100015341 | V-FUSION PEACH MANGO 46 OZ 5100015341 | 98.3 | 29.6 | 52.2 | 80.1 | 86.2 | 92.1 | 98.4 | 98.3 | 98.3 | |
| | | 98.3 | 29.6 | 48.5 | 62.7 | 67.2 | 88.7 | 88.7 | 97.9 | 94.4 | |
| | | 70.0 | 5.0 | 14.0 | 22.0 | 28.0 | 34.0 | 41.0 | 46.0 | 51.0 | |
| 5100015855 | V-FUSION STRAWBERRY BANANA 12 OZ 5100015855 | 0.0 | 0.0 | 0.0 | 0.0 | 0.0 | 0.0 | 0.0 | 0.0 | 0.0 | |
| | | 0.0 | 0.0 | 0.0 | 0.0 | 0.0 | 0.0 | 0.0 | 0.0 | 0.0 | |
| | | 1.0 | 1.0 | 1.0 | 1.0 | 1.0 | 1.0 | 1.0 | 1.0 | 1.0 | |
| 5100015856 | V-FUSION TROPICAL ORANGE 12 OZ 5100015856 | 0.0 | 0.0 | 0.0 | 0.0 | 0.0 | 0.0 | 0.0 | 0.0 | 0.0 | |
| | | 0.0 | 0.0 | 0.0 | 0.0 | 0.0 | 0.0 | 0.0 | 0.0 | 0.0 | |
| | | 1.0 | 1.0 | 1.0 | 1.0 | 1.0 | 1.0 | 1.0 | 1.0 | 1.0 | |

FIG. 57

INTEGRATED REPORT PUBLISHING FRAMEWORK FOR STRUCTURED REPORT GENERATION AND DELIVERY FOR CASUAL USERS

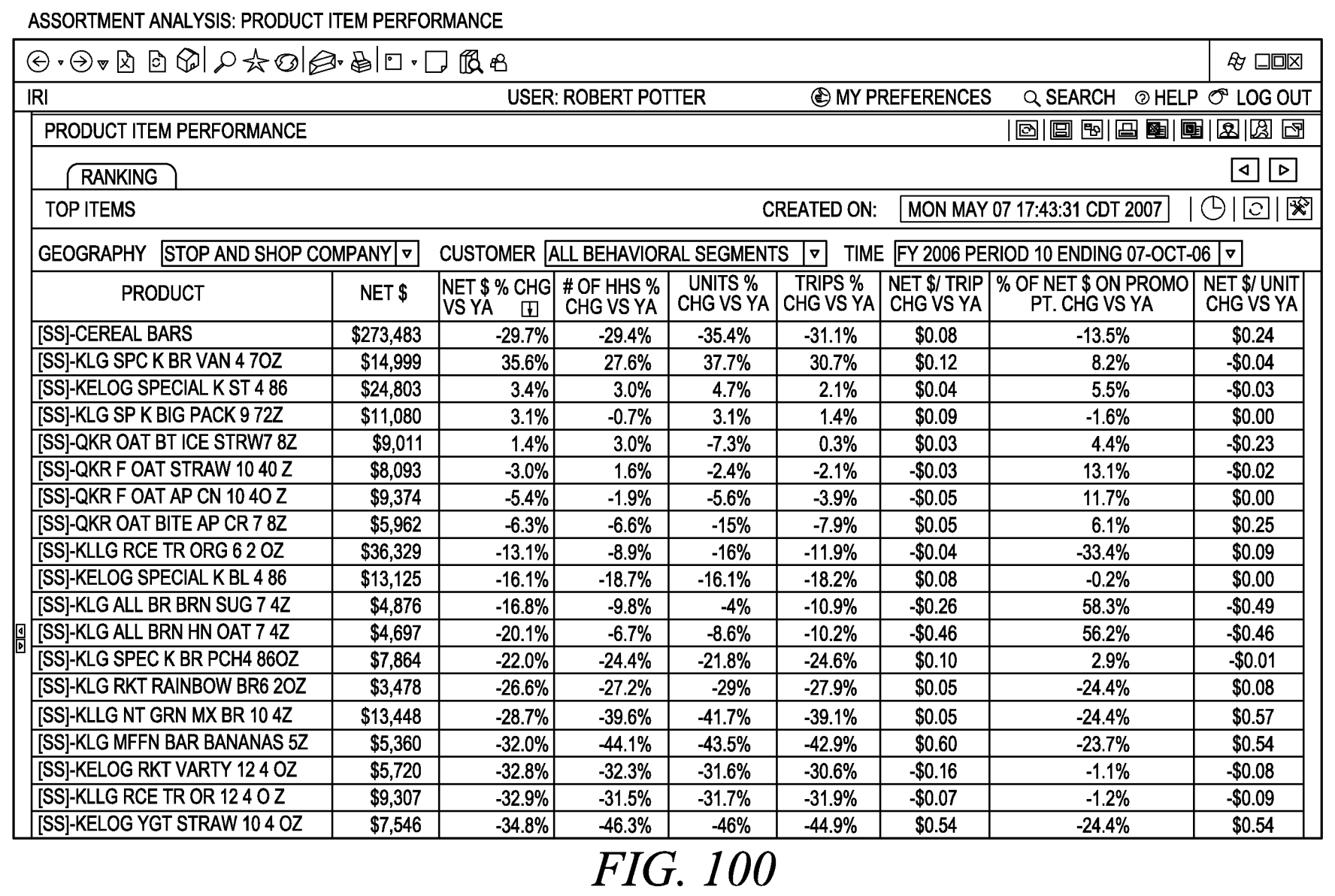

ASSORTMENT ANALYSIS: PRODUCT ITEM PERFORMANCE

IRI USER: ROBERT POTTER MY PREFERENCES SEARCH HELP LOG OUT

PRODUCT ITEM PERFORMANCE

RANKING

TOP ITEMS CREATED ON: MON MAY 07 17:43:31 CDT 2007

GEOGRAPHY STOP AND SHOP COMPANY CUSTOMER ALL BEHAVIORAL SEGMENTS TIME FY 2006 PERIOD 10 ENDING 07-OCT-06

| PRODUCT | NET $ | NET $ % CHG VS YA | # OF HHS % CHG VS YA | UNITS % CHG VS YA | TRIPS % CHG VS YA | NET $/ TRIP CHG VS YA | % OF NET $ ON PROMO PT. CHG VS YA | NET $/ UNIT CHG VS YA |
|---|---|---|---|---|---|---|---|---|
| [SS]-CEREAL BARS | $273,483 | -29.7% | -29.4% | -35.4% | -31.1% | $0.08 | -13.5% | $0.24 |
| [SS]-KLG SPC K BR VAN 4 7OZ | $14,999 | 35.6% | 27.6% | 37.7% | 30.7% | $0.12 | 8.2% | -$0.04 |
| [SS]-KELOG SPECIAL K ST 4 86 | $24,803 | 3.4% | 3.0% | 4.7% | 2.1% | $0.04 | 5.5% | -$0.03 |
| [SS]-KLG SP K BIG PACK 9 72Z | $11,080 | 3.1% | -0.7% | 3.1% | 1.4% | $0.09 | -1.6% | $0.00 |
| [SS]-QKR OAT BT ICE STRW7 8Z | $9,011 | 1.4% | 3.0% | -7.3% | 0.3% | $0.03 | 4.4% | -$0.23 |
| [SS]-QKR F OAT STRAW 10 40 Z | $8,093 | -3.0% | 1.6% | -2.4% | -2.1% | -$0.03 | 13.1% | -$0.02 |
| [SS]-QKR F OAT AP CN 10 4O Z | $9,374 | -5.4% | -1.9% | -5.6% | -3.9% | -$0.05 | 11.7% | $0.00 |
| [SS]-QKR OAT BITE AP CR 7 8Z | $5,962 | -6.3% | -6.6% | -15% | -7.9% | $0.05 | 6.1% | $0.25 |
| [SS]-KLLG RCE TR ORG 6 2 OZ | $36,329 | -13.1% | -8.9% | -16% | -11.9% | -$0.04 | -33.4% | $0.09 |
| [SS]-KELOG SPECIAL K BL 4 86 | $13,125 | -16.1% | -18.7% | -16.1% | -18.2% | $0.08 | -0.2% | $0.00 |
| [SS]-KLG ALL BR BRN SUG 7 4Z | $4,876 | -16.8% | -9.8% | -4% | -10.9% | -$0.26 | 58.3% | -$0.49 |
| [SS]-KLG ALL BRN HN OAT 7 4Z | $4,697 | -20.1% | -6.7% | -8.6% | -10.2% | -$0.46 | 56.2% | -$0.46 |
| [SS]-KLG SPEC K BR PCH4 86OZ | $7,864 | -22.0% | -24.4% | -21.8% | -24.6% | $0.10 | 2.9% | -$0.01 |
| [SS]-KLG RKT RAINBOW BR6 2OZ | $3,478 | -26.6% | -27.2% | -29% | -27.9% | $0.05 | -24.4% | $0.08 |
| [SS]-KLLG NT GRN MX BR 10 4Z | $13,448 | -28.7% | -39.6% | -41.7% | -39.1% | $0.05 | -24.4% | $0.57 |
| [SS]-KLG MFFN BAR BANANAS 5Z | $5,360 | -32.0% | -44.1% | -43.5% | -42.9% | $0.60 | -23.7% | $0.54 |
| [SS]-KELOG RKT VARTY 12 4 OZ | $5,720 | -32.8% | -32.3% | -31.6% | -30.6% | -$0.16 | -1.1% | -$0.08 |
| [SS]-KLLG RCE TR OR 12 4 O Z | $9,307 | -32.9% | -31.5% | -31.7% | -31.9% | -$0.07 | -1.2% | -$0.09 |
| [SS]-KELOG YGT STRAW 10 4 OZ | $7,546 | -34.8% | -46.3% | -46% | -44.9% | $0.54 | -24.4% | $0.54 |

FIG. 100

CROSS-CATEGORY VIEW OF A DATASET USING AN ANALYTIC PLATFORM

CROSS-REFERENCE TO RELATED APPLICATIONS

This application claims the benefit of the following provisional applications, each of which is hereby incorporated by reference in its entirety: App. No. 60/886,798 filed on Jan. 26, 2007 and entitled "A Method of Aggregating Data," App. No. 60/886,801 filed on Jan. 26, 2007 and entitled "Utilizing Aggregated Data," App. No. 60/887,573 filed on Jan. 31, 2007 and entitled "Analytic Platform," App. No. 60/891,508 filed on Feb. 24, 2007 and entitled "Analytic Platform," App. No. 60/891,936 filed on Feb. 27, 2007 and entitled "Analytic Platform," App. No. 60/952,898 filed on Jul. 31, 2007 and entitled "Analytic Platform."

BACKGROUND

1. Field

This invention relates to methods and systems for analyzing data, and more particularly to methods and systems for aggregating, projecting, and releasing data.

2. Description of Related Art

Currently, there exists a large variety of data sources, such as census data or movement data received from point-of-sale terminals, sample data received from manual surveys, panel data obtained from the inputs of consumers who are members of panels, fact data relating to products, sales, and many other facts associated with the sales and marketing efforts of an enterprise, and dimension data relating to dimensions along which an enterprise wishes to understand data, such as in order to analyze consumer behaviors, to predict likely outcomes of decisions relating to an enterprise's activities, and to project from sample sets of data to a larger universe. Conventional methods of synthesizing, aggregating, and exploring such a universe of data comprise techniques such as OLAP, which fix aggregation points along the dimensions of the universe in order to reduce the size and complexity of unified information sets such as OLAP stars. Exploration of the unified information sets can involve run-time queries and query-time projections, both of which are constrained in current methods by a priori decisions that must be made to project and aggregate the universe of data. In practice, going back and changing the a priori decisions can lift these constraints, but this requires an arduous and computationally complex restructuring and reprocessing of data.

According to current business practices, unified information sets and results drawn from such information sets can be released to third parties according to so-called "releasability" rules. Theses rules might apply to any and all of the data from which the unified information sets are drawn, the dimensions (or points or ranges along the dimensions), the third party (or members or sub-organizations of the third party), and so on. Given this, there can be a complex interaction between the data, the dimensions, the third party, the releasability rules, the levels along the dimensions at which aggregations are performed, the information that is drawn from the unified information sets, and so on. In practice, configuring a system to apply the releasability rules is an error-prone process that requires extensive manual set up and results in a brittle mechanism that cannot adapt to on-the-fly changes in data, dimensions, third parties, rules, aggregations, projections, user queries, and so on.

Various projection methodologies are known in the art. Still other projection methodologies are subjects of the present invention. In any case, different projection methodologies provide outputs that have different statistical qualities. Analysts are interested in specifying the statistical qualities of the outputs at query-time. In practice, however, the universe of data and the projection methodologies that are applied to it are what drive the statistical qualities. Existing methods allow an analyst to choose a projection methodology and thereby affect the statistical qualities of the output, but this does not satisfy the analyst's desire to directly dictate the statistical qualities.

Information systems are a significant bottle neck for market analysis activities. The architecture of information systems is often not designed to provide on-demand flexible access, integration at a very granular level, or many other critical capabilities necessary to support growth. Thus, information systems are counter-productive to growth. Hundreds of market and consumer databases make it very difficult to manage or integrate data. For example, there may be a separate database for each data source, hierarchy, and other data characteristics relevant to market analysis. Different market views and product hierarchies proliferate among manufacturers and retailers. Restatements of data hierarchies waste precious time and are very expensive. Navigation from among views of data, such as from global views to regional to neighborhood to store views is virtually impossible, because there are different hierarchies used to store data from global to region to neighborhood to store-level data. Analyses and insights often take weeks or months, or they are never produced. Insights are often sub-optimal because of silo-driven, narrowly defined, ad hoc analysis projects. Reflecting the ad hoc nature of these analytic projects are the analytic tools and infrastructure developed to support them. Currently, market analysis, business intelligence, and the like often use rigid data cubes that may include hundreds of databases that are impossible to integrate. These systems may include hundreds of views, hierarchies, clusters, and so forth, each of which is associated with its own rigid data cube. This may make it almost impossible to navigate from global uses that are used, for example, to develop overall company strategy, down to specific program implementation or customer-driven uses. These ad hoc analytic tools and infrastructure are fragmented and disconnected.

In sum, there are many problems associated with the data used for market analysis, and there is a need for a flexible, extendable analytic platform, the architecture for which is designed to support a broad array of evolving market analysis needs. Furthermore, there is a need for better business intelligence in order to accelerate revenue growth, make business intelligence more customer-driven, to gain insights about markets in a more timely fashion, and a need for data projection and release methods and systems that provide improved dimensional flexibility, reduced query-time computational complexity, automatic selection and blending of projection methodologies, and flexibly applied releasability rules.

SUMMARY

In embodiments, systems and methods may involve using a platform as disclosed herein for applications described herein where the systems and methods involve receiving a dataset in an analytic platform, the dataset including fact data and dimension data for a plurality of distinct product categories. It may also involve storing the data in a flexible hierarchy, the hierarchy allowing the temporary fixing of data along a dimension and flexible querying along other dimensions of the data. It may also involve pre-aggregating certain combinations of data to facilitate rapid querying, the pre-aggregation based on the nature of common queries. It may also involve facilitating the presentation of a cross-category view of an analytic query of the dataset. In embodiments, the temporarily fixed dimension can be rendered flexible upon an action by the user.

In embodiments, the temporarily fixed dimension may be rendered flexible upon an action by the user.

These and other systems, methods, objects, features, and advantages of the present invention will be apparent to those skilled in the art from the following detailed description of the preferred embodiment and the drawings. Capitalized terms used herein (such as relating to titles of data objects, tables, or the like) should be understood to encompass other similar content or features performing similar functions, except where the context specifically limits such terms to the use herein.

BRIEF DESCRIPTION OF THE FIGURES

The invention and the following detailed description of certain embodiments thereof may be understood by reference to the following figures:

FIG. 5 illustrates Boolean logic and information logic.

FIG. 57 depicts one embodiment of a distribution report.

FIG. 100 depicts an assortment analysis output view.

DETAILED DESCRIPTION

Figure 1:
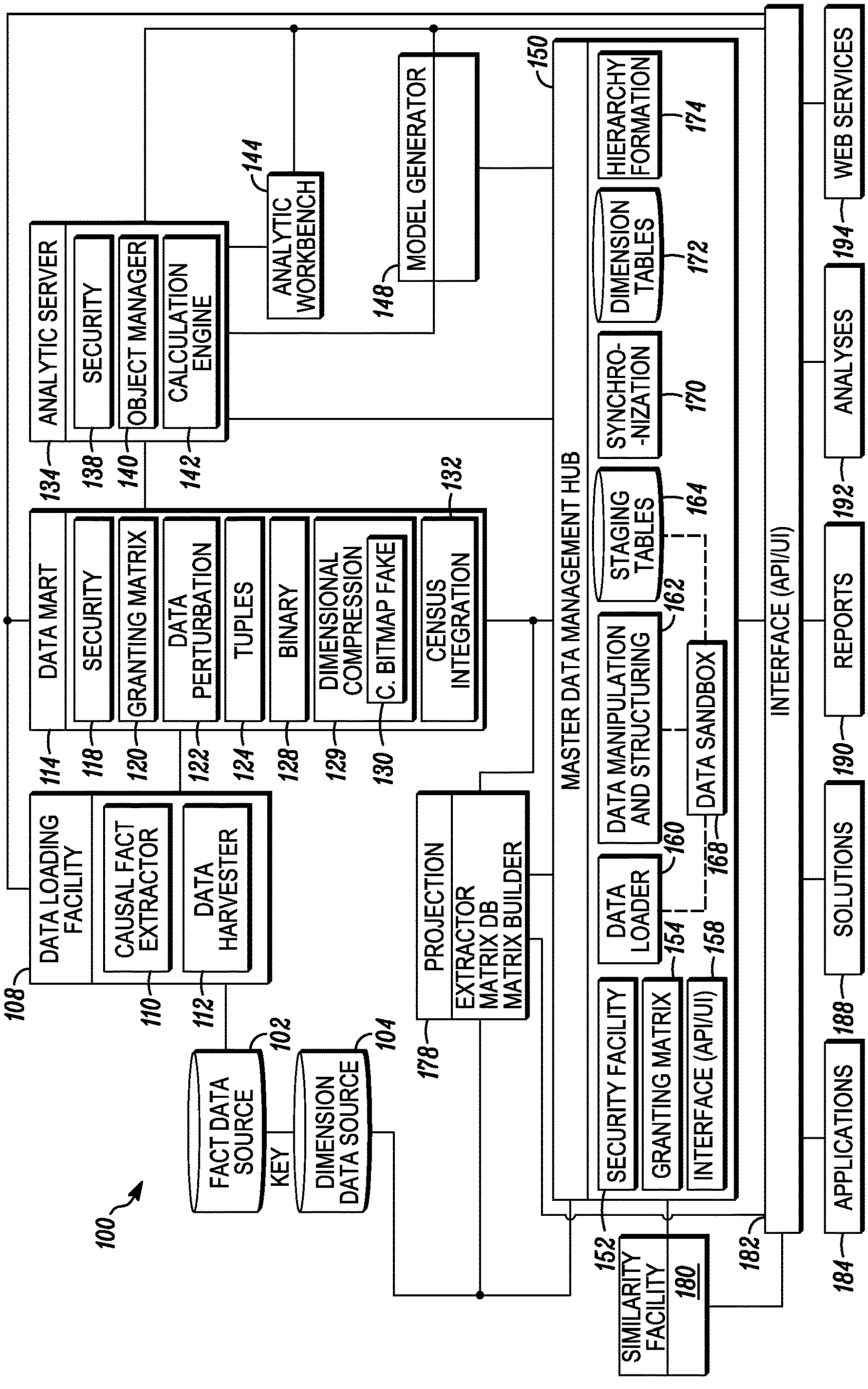
FIG. 1 illustrates an analytic platform for performing data analysis.
Figure 2:
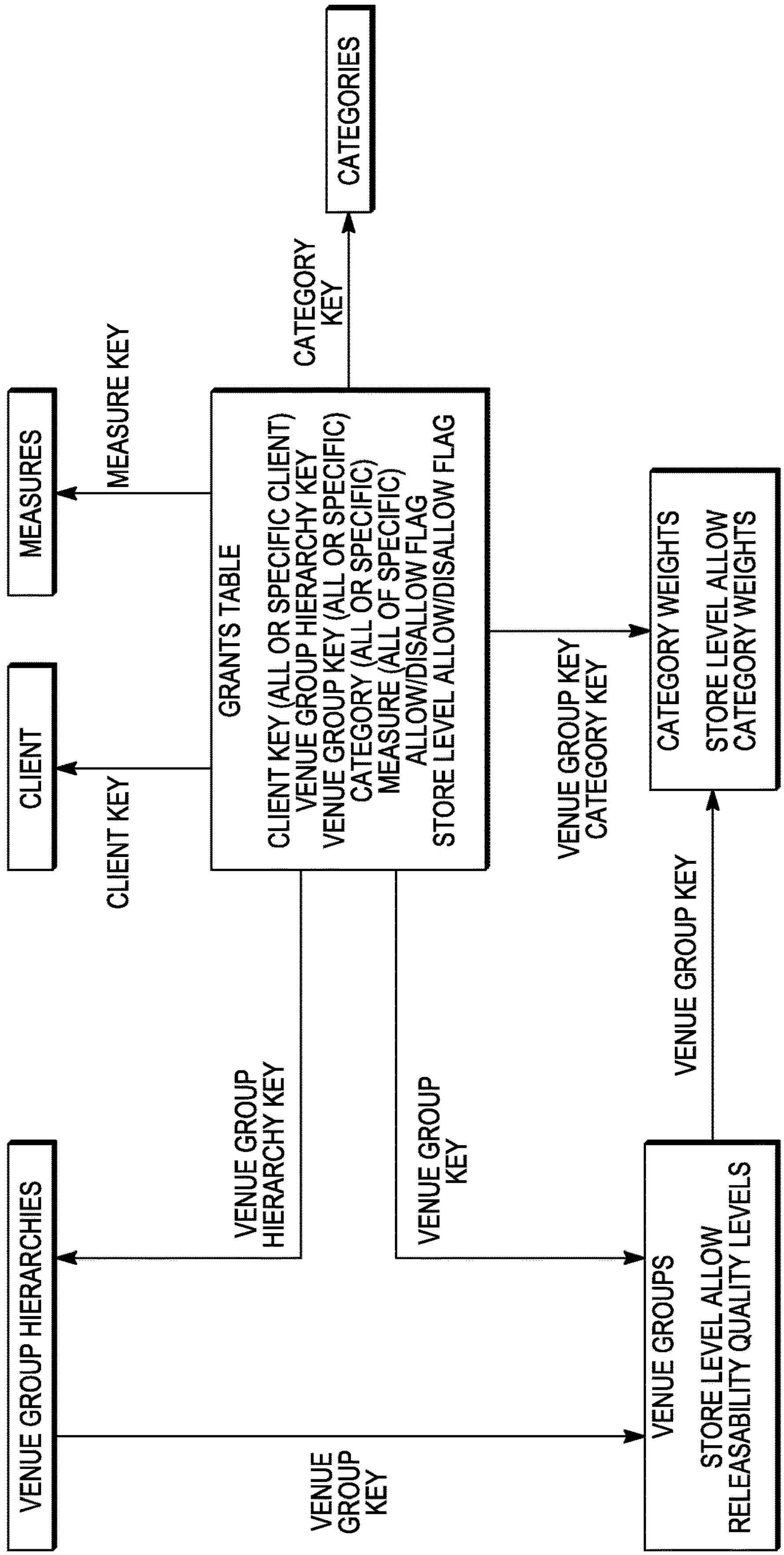
FIG. 2 illustrates components of a granting matrix facility.

Referring to FIG. 1, the methods and systems disclosed herein are related to improved methods for handling and using data and metadata for the benefit of an enterprise. An analytic platform 100 may support and include such improved methods and systems. The analytic platform 100 may include, in certain embodiments, a range of hardware systems, software modules, data storage facilities, application programming interfaces, human-readable interfaces, and methodologies, as well as a range of applications, solutions, products, and methods that use various outputs of the analytic platform 100, as more particularly detailed herein, other embodiments of which would be understood by one of ordinary skill in the art and are encompassed herein. Among other components, the analytic platform 100 includes methods and systems for providing various representations of data and metadata, methodologies for acting on data and metadata, an analytic engine, and a data management facility that is capable of handling disaggregated data and performing aggregation, calculations, functions, and real-time or quasi-real-time projections. In certain embodiments, the methods and systems enable much more rapid and flexible manipulation of data sets, so that certain calculations and projections can be done in a fraction of the time as compared with older generation systems.

In embodiments, data compression and aggregations of data, such as fact data sources 102, and dimension data sources 104, may be performed in conjunction with a user query such that the aggregation dataset can be specifically generated in a form most applicable for generating calculations and projections based on the query. In embodiments, data compression and aggregations of data may be done prior to, in anticipation of, and/or following a query. In embodiments, an analytic platform 100 (described in more detail below) may calculate projections and other solutions dynamically and create hierarchical data structures with custom dimensions that facilitate the analysis. Such methods and systems may be used to process point-of-sale (POS) data, retail information, geography information, causal information, survey information, census data and other forms of data and forms of assessments of past performance (e.g. estimating the past sales of a certain product within a certain geographical region over a certain period of time) or projections of future results (e.g. estimating the future or expected sales of a certain product within a certain geographical region over a certain period of time). In turn, various estimates and projections can be used for various purposes of an enterprise, such as relating to purchasing, supply chain management, handling of inventory, pricing decisions, the planning of promotions, marketing plans, financial reporting, and many others.

Referring still to FIG. 1 an analytic platform 100 is illustrated that may be used to analyze and process data in a disaggregated or aggregated format, including, without limitation, dimension data defining the dimensions along which various items are measured and factual data about the facts that are measured with respect to the dimensions. Factual data may come from a wide variety of sources and be of a wide range of types, such as traditional periodic point-of-sale (POS) data, causal data (such as data about activities of an enterprise, such as in-store promotions, that are posited to cause changes in factual data), household panel data, frequent shopper program information, daily, weekly, or real time POS data, store database data, store list files, stubs, dictionary data, product lists, as well as custom and traditional audit data. Further extensions into transaction level data, RFID data and data from non-retail industries may also be processed according to the methods and systems described herein.

In embodiments, a data loading facility 108 may be used to extract data from available data sources and load them to or within the analytic platform 100 for further storage, manipulation, structuring, fusion, analysis, retrieval, querying and other uses. The data loading facility 108 may have the a plurality of responsibilities that may include eliminating data for non-releasable items, providing correct venue group flags for a venue group, feeding a core information matrix 600 with relevant information (such as and without limitation statistical metrics), or the like. In an embodiment, the data loading facility 108 eliminate non-related items. Available data sources may include a plurality of fact data sources 102 and a plurality of dimension data sources 104. Fact data sources 102 may include, for example, facts about sales volume, dollar sales, distribution, price, POS data, loyalty card transaction files, sales audit files, retailer sales data, and many other fact data sources 102 containing facts about the sales of the enterprise, as well as causal facts, such as facts about activities of the enterprise, in-store promotion audits, electronic pricing and/or promotion files, feature ad coding files, or others that tend to influence or cause changes in sales or other events, such as facts about in-store promotions, advertising, incentive programs, and the like. Other fact data sources may include custom shelf audit files, shipment data files, media data files, explanatory data (e.g., data regarding weather), attitudinal data, or usage data. Dimension data sources 104 may include information relating to any dimensions along which an enterprise wishes to collect data, such as dimensions relating to products sold (e.g. attribute data relating to the types of products that are sold, such as data about UPC codes, product hierarchies, categories, brands, sub-brands, SKUs and the like), venue data (e.g. store, chain, region, country, etc.), time data (e.g. day, week, quad-week, quarter, 12-week, etc.), geographic data (including breakdowns of stores by city, state, region, country or other geographic groupings), consumer or customer data (e.g. household, individual, demographics, household groupings, etc.), and other dimension data sources 104. While embodiments disclosed herein relate primarily to the collection of sales and marketing-related facts and the handling of dimensions related to the sales and marketing activities of an enterprise, it should be understood that the methods and systems disclosed herein may be applied to facts of other types and to the handling of dimensions of other types, such as facts and dimensions related to manufacturing activities, financial activities, information technology activities, media activities, supply chain management activities, accounting activities, political activities, contracting activities, and many others.

In an embodiment, the analytic platform 100 comprises a combination of data, technologies, methods, and delivery mechanisms brought together by an analytic engine. The analytic platform 100 may provide a novel approach to managing and integrating market and enterprise information and enabling predictive analytics. The analytic platform 100 may leverage approaches to representing and storing the base data so that it may be consumed and delivered in real-time, with flexibility and open integration. This representation of the data, when combined with the analytic methods and techniques, and a delivery infrastructure, may minimize the processing time and cost and maximize the performance and value for the end user. This technique may be applied to problems where there may be a need to access integrated views across multiple data sources, where there may be a large multi-dimensional data repository against which there may be a need to rapidly and accurately handle dynamic dimensionality requests, with appropriate aggregations and projections, where there may be highly personalized and flexible real-time reporting 190, analysis 192 and forecasting capabilities required, where there may be a need to tie seamlessly and on-the-fly with other enterprise applications 184 via web services 194 such as to receive a request with specific dimensionality, apply appropriate calculation methods, perform and deliver an outcome (e.g. dataset, coefficient, etc.), and the like.

The analytic platform 100 may provide innovative solutions to application partners, including on-demand pricing insights, emerging category insights, product launch management, loyalty insights, daily data out-of-stock insights, assortment planning, on-demand audit groups, neighborhood insights, shopper insights, health and wellness insights, consumer tracking and targeting, and the like A proposed sandbox decision framework may enable new revenue and competitive advantages to application partners by brand building, product innovation, consumer-centric retail execution, consumer and shopper relationship management, and the like. Predictive planning and optimization solutions, automated analytics and insight solutions, and on-demand business performance reporting may be drawn from a plurality of sources, such as InfoScan, total C-scan, daily data, panel data, retailer direct data, SAP, consumer segmentation, consumer demographics, FSP/loyalty data, data provided directly for customers, or the like.

The analytic platform 100 may have advantages over more traditional federation/consolidation approaches, requiring fewer updates in a smaller portion of the process. The analytic platform 100 may support greater insight to users, and provide users with more innovative applications. The analytic platform 100 may provide a unified reporting and solutions framework, providing on-demand and scheduled reports in a user dashboard with summary views and graphical dial indicators, as well as flexible formatting options. Benefits and products of the analytic platform 100 may include non-additive measures for custom product groupings, elimination of restatements to save significant time and effort, cross-category visibility to spot emerging trends, provide a total market picture for faster competitor analysis, provide granular data on demand to view detailed retail performance, provide attribute driven analysis for market insights, and the like.

The analytic capabilities of the present invention may provide for on-demand projection, on-demand aggregation, multi-source master data management, and the like. On-demand projection may be derived directly for all possible geographies, store and demographic attributes, per geography or category, with built-in dynamic releasablitiy controls, and the like. On-demand aggregation may provide both additive and non-additive measures, provide custom groups, provide cross-category or geography analytics, and the like. Multi-source master data management may provide management of dimension member catalogue and hierarchy attributes, processing of raw fact data that may reduce harmonization work to attribute matching, product and store attributes stored relationally, with data that may be extended independently of fact data, and used to create additional dimensions, and the like.

In addition, the analytic platform 100 may provide flexibility, while maintaining a structured user approach. Flexibility may be realized with multiple hierarchies applied to the same database, the ability to create new custom hierarchies and views, rapid addition of new measures and dimensions, and the like. The user may be provided a structured approach through publishing and subscribing reports to a broader user base, by enabling multiple user classes with different privileges, providing security access, and the like. The user may also be provided with increased performance and ease of use, through leading-edge hardware and software, and web application for integrated analysis.

In embodiments, the data available within a fact data source 102 and a dimension data source 104 may be linked, such as through the use of a key. For example, key-based fusion of fact 102 and dimension data 104 may occur by using a key, such as using the Abilitec Key software product offered by Acxiom, in order to fuse multiple sources of data. For example, such a key can be used to relate loyalty card data (e.g., Grocery Store 1 loyalty card, Grocery Store 2 loyalty card, and Convenience Store 1 loyalty card) that are available for a single customer, so that the fact data from multiple sources can be used as a fused data source for analysis on desirable dimensions. For example, an analyst might wish to view time-series trends in the dollar sales allotted by the customer to each store within a given product category.

In embodiments the data loading facility may comprise any of a wide range of data loading facilities, including or using suitable connectors, bridges, adaptors, extraction engines, transformation engines, loading engines, data filtering facilities, data cleansing facilities, data integration facilities, or the like, of the type known to those of ordinary skill in the art or as disclosed herein and in the documents incorporated herein by reference. Referring still to FIG. 1, in embodiments, the data loading facility 108 may include a data harvester 112. The data harvester 112 may be used to load data to the platform 100 from data sources of various types. In embodiment the data harvester 112 may extract fact data from fact data sources 102, such as legacy data sources. Legacy data sources may include any file, database, or software asset (such as a web service or business application) that supplies or produces data and that has already been deployed. In embodiments, the data loading facility 108 may include a causal fact extractor 110. A causal fact extractor 110 may obtain causal data that is available from the data sources and load it to the analytic platform 100. Causal data may include data relating to any action or item that is intended to influence consumers to purchase an item, and/or that tends to cause changes, such as data about product promotion features, product displays, product price reductions, special product packaging, or a wide range of other causal data. In various embodiments, there are many situations where a store will provide POS data and causal information relating to its store. For example, the POS data may be automatically transmitted to the facts database after the sales information has been collected at the stores POS terminals. The same store may also provide information about how it promoted certain products, its store or the like. This data may be stored in another database; however, this causal information may provide one with insight on recent sales activities so it may be used in later sales assessments or forecasts. Similarly, a manufacturer may load product attribute data into yet another database and this data may also be accessible for sales assessment or projection analysis. For example, when making such analysis one may be interested in knowing what categories of products sold well or what brand sold well. In this case, the causal store information may be aggregated with the POS data and dimension data corresponding to the products referred to in the POS data. With this aggregation of information one can make an analysis on any of the related data.

Referring still to FIG. 1, data that is obtained by the data loading facility 108 may be transferred to a plurality of facilities within the analytic platform 100, including the data mart 114. In embodiments the data loading facility 108 may contain one or more interfaces 182 by which the data loaded by the data loading facility 108 may interact with or be used by other facilities within the platform 100 or external to the platform. Interfaces to the data loading facility 108 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data loading facility 108. The interfaces 182 may support interactions with the data loading facility 108 by applications 184, solutions 188, reporting facilities 190, analyses facilities 192, services 194 (each of which is describe in greater detail herein) or other entities, external to or internal to an enterprise. In embodiments these interfaces are associated with interfaces 182 to the platform 100, but in other embodiments direct interfaces may exist to the data loading facility 108, either by other components of the platform 100, or by external entities.

Referring still to FIG. 1, in embodiments the data mart facility 114 may be used to store data loaded from the data loading facility 108 and to make the data loaded from the data loading facility 108 available to various other entities in or external to the platform 100 in a convenient format. Within the data mart 114 facilities may be present to further store, manipulate, structure, subset, merge, join, fuse, or perform a wide range of data structuring and manipulation activities. The data mart facility 114 may also allow storage, manipulation and retrieval of metadata, and perform activities on metadata similar to those disclosed with respect to data. Thus, the data mart facility 114 may allow storage of data and metadata about facts (including sales facts, causal facts, and the like) and dimension data, as well as other relevant data and metadata. In embodiments, the data mart facility 114 may compress the data and/or create summaries in order to facilitate faster processing by other of the applications 184 within the platform 100 (e.g. the analytic server 134). In embodiments the data mart facility 114 may include various methods, components, modules, systems, sub-systems, features or facilities associated with data and metadata. For example, in certain optional embodiments the data mart 114 may include one or more of a security facility 118, a granting matrix 120, a data perturbation facility 122, a data handling facility, a data tuples facility 124, a binary handling facility 128, a dimensional compression facility 129, a causal bitmap fake facility 130 located within the dimensional compression facility 129, a sample/census integration facility 132 or other data manipulation facilities.

In certain embodiments the data mart facility 114 may contain one or more interfaces 182 (not shown on FIG. 1), by which the data loaded by the data mart facility 114 may interact with or be used by other facilities within the platform 100 or external to the platform. Interfaces to the data mart facility 114 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data mart facility 114. These interfaces may comprise interfaces 182 to the platform 100 as a whole, or may be interfaces associated directly with the data mart facility 114 itself, such as for access from other components of the platform 100 or for access by external entities directly to the data mart facility 114. The interfaces 182 may support interactions with the data mart facility 114 by applications 184, solutions 188, reporting facilities 190, analyses facilities 192, services 194 (each of which is describe in greater detail herein) or other entities, external to or internal to an enterprise.

In certain optional embodiments, the security facility 118 may be any hardware or software implementation, process, procedure, or protocol that may be used to block, limit, filter or alter access to the data mart facility 114, and/or any of the facilities within the data mart facility 114, by a human operator, a group of operators, an organization, software program, bot, virus, or some other entity or program. The security facility 118 may include a firewall, an anti-virus facility, a facility for managing permission to store, manipulate and/or retrieve data or metadata, a conditional access facility, a logging facility, a tracking facility, a reporting facility, an asset management facility, an intrusion-detection facility, an intrusion-prevention facility or other suitable security facility.

In certain optional embodiments, the granting matrix facility 120 is provided, which may be used to make and apply real-time access and releasability rules regarding the data, metadata, processes, analyses, and output of the analytic platform 100. For example, access and releasability rules may be organized into a hierarchical stack in which each stratum of the hierarchy has a set of access and releasability rules associated with it that may or may not be unique to that stratum. Persons, individual entities, groups, organizations, machines, departments, or some other form of human or industry organizational structure may each be assigned to a hierarchical stratum that defines the access and releasability rules applicable to them. The access and releasability rules applicable to each stratum of the hierarchy may be coded in advance, have exceptions applied to them, be overridden, be altered according to a rules-based protocol, or be set or altered in some other manner within the platform 100. In embodiments a hierarchy of rules may be constructed to cause more specific rules to trump less-specific rules in the hierarchy. In embodiments, the granting matrix 120 may operate independently or in association with the security facility 118 within the data mart 114 or some other security facility that is associated with the analytic platform 100. In embodiments, just as access and releasability rules may be associated with a hierarchy of individuals, groups, and so forth, the granting matrix 120 may also associate the rules with attributes of the data or metadata, dimensions of the data or metadata, the data source from which the data or metadata were obtained, data measures, categories, sub-categories, venues, geographies, locations, metrics associated with data quality, or some other attribute associated with the data. In embodiments, rules may be ordered and reordered, added to and/or removed from a hierarchy. The granting matrix 120 rules may also be associated with hierarchy combinations. For example, a particular individual may be assigned to a hierarchy associated with rules that permit him to access a particular data set, such as a retailer's store level product sales. This hierarchy rule may be further associated with granting matrix 120 rules based in part upon a product hierarchy. These two hierarchies, store dataset- and product-based, may be combined to create rules that state for this individual which products within the total store database to which he may have access or releasability permissions. In embodiments the granting matrix 120 may capture rules for precedence among potentially conflicting rules within a hierarchy of rules.

In an embodiment, a granting matrix (120, 154) may facilitate restricted access to databases and other IT resources and may be used anywhere where granular security may be required. In certain prior art systems, security may be granted using role-based access controls, optionally based on a hierarchy, where certain exceptions may not be handled appropriately by the system. Exceptions may include a sales engineer getting added to an account team for an account outside of her assigned territory where the account needs to be granted and other accounts protected, granting a sales representative all accounts in a territory except three, granting an aggregate level of access to data, but not leaf, access to sales data is granted in all states except California, and the like. The granting matrix (120, 154) may facilitate application security, where role and data may be required together. In an example of a problem to which the granting matrix may be applied, the granting matrix (120, 154) may facilitate call center queue management based on skill and territory assignments of the call center agents. The granting matrix (120, 154) may facilitate sales force assignments and management. The granting matrix (120, 154) may facilitate catalog security. The granting matrix (120, 154) may facilitate decision management. The scheme defined may be used in management and execute decision trees. The granting matrix (120, 154) may facilitate configuration management. The same scheme may be used to configure certain types of products that have options associated with them. The granting matrix (120, 154) may facilitate priority management. The same scheme may be used to manage priorities and express them efficiently.

In certain optional embodiments, a data perturbation facility 122 may be associated with the data mart 114. The data perturbation facility 122 may include methods and systems for perturbing data in order to decrease the time it takes to aggregate data, to query data more dynamically (thus requiring less to be pre-aggregated), to perturb non-unique values in a column of a fact table and to aggregate values of the fact table, wherein perturbing non-unique values results in a column containing only unique values, and wherein a query associated with aggregating values is executed more rapidly due to the existence of only unique values in the column, as well as other methods of perturbation. Among other things, the data perturbation facility 122 may be used to make data facts of differing granularities to be joined in the same query without forcing the platform 100 to store large intermediate tables.

In an embodiment, data perturbation 122 may be an analytical technique involving changing some of the numeric data in the facts to make it faster to join and process. Data perturbation 122 may hide information within a numeric field used for another purpose. For example and without limitation, store sales data may be changed slightly to achieve unique values for all store sales. This may involve changing sales data as much as, for example, ten dollars out of ten million. The changes may not affect the numbers on the reports as they may be too small. Data perturbation 122 may simplify the join effort when doing projections. In an example of a problem to which the data perturbation 122 technique may be applied, performance and/or data analysis may be enhanced when adding information to the fact columns. In another example, the precision of reporting may be less than the data space used to store the numbers. In another example, putting information into data columns may be useful. Data perturbation 122 may be applied to checksum or other applications where the contents of the data have to be verified against unauthorized changes. This may take less space than storing encrypted and unencrypted versions of the data. Checksums using this approach may be almost impossible to fake and may be invisible inside the data.

In embodiments, data perturbation 122 may be applied to database watermarking. Some records may contain particular marks that show the origin of the data. In many cases, the watermarks may survive aggregation. Data perturbation 122 may be applied to uniqueness applications, such as where values need to be unique to allow joining and grouping to happen with the perturbed column. Data perturbation 122 may be applied to hashing. In applications where the perturbed column is the subject of a hash, data perturbation 122 may greatly improve the effectiveness of hashing by creating the maximum possible number of hash keys. Data perturbation 122 may be applied to image watermarking. Data perturbation 122 may survive image compression and resolution loss. Watermarking may be possible because no record is really processed in isolation. The small change may be undetectable. When the perturbation 122 is separated from the fact data, a watermark may appear that may be traced. This may be the first type of calculation that could be applied to the problem of data set watermarking. By putting the small changes into the data, it may be impossible to erase the watermark. Such watermarking may be used to trace data sets and individual records. In some cases, the perturbation 122 may survive aggregation such that a perturbation-based watermark may survive some forms of aggregation. A full watermarking system would need other components, but the technique for perturbation 122 described herein may be used for this purpose.

In embodiments, a tuples facility 124 may be associated with the data mart facility 114. The tuples facility 124 may allow one or more flexible data dimensions to exist within an aggregated dataset. The methods and systems associated with aggregation may allow the flexible dimensions to be defined at query time without an undue impact on the time it takes to process a query. Other features of the tuples facility 124 may include accessing an aggregation of values that are arranged dimensionally; accessing an index of facts; and generating an analytical result, wherein the facts reside in a fact table. The analytical result may depend upon the values and the facts; and the index may be used to locate the facts. In embodiments, the aggregation may be a pre-aggregation. In embodiments, the analytical result may depend upon one of the dimensions of the aggregation being flexible. In embodiments, the aggregation may not contain a hierarchical bias. In embodiments, the analytical result may be a distributed calculation. In embodiments, the query processing facility may be a projection method. In embodiments, the fact table may consist of cells. In embodiments, the index of facts may be a member list for every cell. In embodiments, the aggregation performed by the tuples facility 124 may be a partial aggregation. In embodiments, the projected data set may contain a non-hierarchical bias. In embodiments, distributed calculations may include a projection method that has a separate member list for every cell in the projected data set. In embodiments, aggregating data may not build hierarchical bias into the projected data set. In embodiments, a flexible hierarchy created by the tuples facility 124 may be provided in association with in the projected data set.

In an embodiment, venue group tuples may be applied to problems that involve fixing an approximated dimension while allowing other dimensions to be flexible. For example and without limitation, venue group may be the fixed dimension, such as collection of data from only a subset of stores, and the other dimensions may remain flexible. In an example of a problem to which the venue group tuples technique may be applied, the data may be approximated along at least one dimension and other dimensions may need to remain flexible. In another example, there may be a desire to process large amounts of data like discrete analytical data for purposes such as reporting where performance of querying is a significant issue. In another example, the data problem must involve a time series where facts of some kind may be collected over a period of time. In another example, flexibility may be needed in the data reporting such that full pre-aggregation of all reports may not be desired. Venue group tuples may be applied to panel measurement of any sort of consumer panel, such as television panels, ratings panels, opinion polls, and the like. Venue group tuples may be applied to forecasting data. The forecasted data may be made into tuples and queried just like current data. Venue group tuples may be applied to clinical trial design and analysis. The patient population may be a sample of the actual patient population being studied. Various patient attributes may be used to aggregate the data using venue group tuples. Venue group tuples may be applied to compliance management. Total compliance may be predicted based on samples. The effect of compliance may be based on different attributes of the population. Venue group tuples may be applied to estimated data alignment. Estimated data alignment may occur when there exists a detailed sample of data from a set of data where an estimate is desired and a broad data set that covers the aggregate. Venue group tuples may be applied to data mining to provide faster data sets for many types of data mining.

In embodiments, a binary facility 128 may be associated with the data mart 118. The binary 128 or bitmap index may be generated in response to a user input, such as and without limitation a specification of which dimension or dimensions should be flexible. Alternatively or additionally, the binary 128 may be generated in advance, such as and without limitation according to a default value. The binary 128 may be embodied as a binary and/or or may be provided by a database management system, relational or otherwise.

In embodiments, a dimensional compression facility 129 may be associated with the data mart 118. The dimensional compression facility 129 may perform operations, procedures, calculations, data manipulations, and the like, which are in part designed to compress a dataset using techniques, such as a causal bitmap fake. A causal bitmap fake facility 130 may be associated with the data mart 118. A causal bitmap may refer to a collection of various attributes in a data set that are associated with causal facts, such as facts about whether a product was discounted, the nature of the display for a product, whether a product was a subject of a special promotion, whether the product was present in a store at all, and many others. It is possible to analyze and store a pre-aggregated set of data reflecting all possible permutations and combinations of the attributes potentially present in the causal bitmap; however, the resulting dataset may be very large and burdensome when components of the platform 100 perform calculations, resulting in slow run times. Also, the resulting aggregated data set may contain many combinations and permutations for which there is no analytic interest. The causal bitmap fake facility 130 may be used to reduce the number of permutations and combinations down to a data set that only includes those that are of analytic interest. Thus, the causal bitmap fake 130 may include creation of an intermediate representation of permutations and combinations of attributes of a causal bitmap, where permutations and combinations are pre-selected for their analytic interest in order to reduce the number of permutations and combinations that are stored for purposes of further analysis or calculation. The causal bitmap fake 130 compression technique may improve query performance and reduce processing time.

In certain optional embodiments, a sample/census integration facility 132 may be associated with the data mart 114. The sample/census integration facility 132 may be used to integrate data taken from a sample data set (for example, a set of specific sample stores from with causal data is collected) with data taken from a census data set (such as sales data taken from a census of stores).

Still referring to FIG. 1, the analytic platform 100 may include an analytic server 134. The analytic server 134 may be used to build and deploy analytic applications or solutions or undertake analytic methods based upon the use of a plurality of data sources and data types. Among other things, the analytic server 134 may perform a wide range of calculations and data manipulation steps necessary to apply models, such as mathematical and economic models, to sets of data, including fact data, dimension data, and metadata. The analytic server may be associated with an interface 182, such as any of the interfaces described herein.

The analytic server 134 may interact with a model generator 148, which may be any facility for generating models used in the analysis of sets of data, such as economic models, econometric models, forecasting models, decision support models, estimation models, projection models, and many others. In embodiments output from the analytic server 134 may be used to condition or refine models in the model generator 148; thus, there may be a feedback loop between the two, where calculations in the analytic server 134 are used to refine models managed by the model generator 148. The model generator 148 or the analytic server 134 may respectively require information about the dimensions of data available to the platform 100, which each may obtain via interactions with the master data management hub 150 (described in more detail elsewhere in this disclosure).

The analytic server 134 may extract or receive data and metadata from various data sources, such as from data sources 102, 104, from the data mart 114 of the analytic platform 100, from a master data management hub 150, or the like. The analytic server 134 may perform calculations necessary to apply models, such as received from the model generator 148 or from other sources, to the data and metadata, such as using analytic models and worksheets, and may deliver the analytic results to other facilities of the analytic platform 100, including the model generator 148 and/or via interactions with various applications 184, solutions 188, a reporting facilities 190, analysis facilities 192, or services 194 (such as web services), in each case via interfaces 182, which may consist of any of the types of interfaces 182 described throughout this disclosure, such as various data integration interfaces.

The analytic server 134 may be a scalable server that is capable of data integration, modeling and analysis. It may support multidimensional models and enable complex, interactive analysis of large datasets. The analytic server may include a module that may function as a persistent object manager 140 used to manage a repository in which schema, security information, models and their attached worksheets may be stored. The analytic server may include a module that is a calculation engine 142 that is able to perform query generation and computations. It may retrieve data in response to a query from the appropriate database, perform the necessary calculations in memory, and provide the query results (including providing query results to an analytic workbench 144). The U.S. Pat. No. 5,918,232, relating to the analytic server technologies described herein and entitled, "Multidimensional domain modeling method and system," is hereby incorporated by reference in its entirety.

The analytic workbench 144 may be used as a graphical tool for model building, administration, and advanced analysis. In certain preferred embodiments the analytic workbench 144 may have integrated, interactive modules, such as for business modeling, administration, and analysis.

In embodiments, a security facility 138 of the analytic server 134 may be the same or similar to the security facility 118 associated with the data mart facility 114, as described herein. Alternatively, the security facility 138 associated with the analytic server 134 may have features and rules that are specifically designed to operate within the analytic server 134.

In certain preferred embodiments, the model generator 148 may be included in or associated with the analytic platform 100. The model generator 148 may be associated with the analytic server 134 and/or the master data management hub 150. The model generator 148 may create, store, receive, and/or send analytic models, formulas, processes, or procedures. It may forward or receive the analytic models, formulas, processes, or procedures to or from the analytic server 134. The analytic server 134 may use them independently as part of its analytic procedures, or join them with other of the analytic models, formulas, processes, or procedures the analytic server 134 employs during analysis of data. The model generator 148 may forward or receive analytic models, formulas, processes, or procedures to or from the master data management hub 150. In embodiments the master data management hub 150 may use information from the model generator 148 about the analytic models, formulas, dimensions, data types, processes, or procedures, for example, as part of its procedures for creating data dimensions and hierarchies. Alternatively, the model generator 148 may receive analytic models, formulas, dimensions, data types, processes, or procedures from the master data management hub 150 which it may, in turn, forward the same on to the analytic server 134 for its use.

As illustrated in FIG. 1, the analytic platform 100 may contain a master data management hub 150 (MDMH). In embodiments the MDMH 150 may serve as a central facility for handling dimension data used within the analytic platform 100, such as data about products, stores, venues, geographies, time periods and the like, as well as various other dimensions relating to or associated with the data and metadata types in the data sources 102, 104, the data loading facility 108, the data mart facility 114, the analytic server 134, the model generator 148 or various applications, 184, solutions 188, reporting facilities 190, analytic facilities 192 or services 194 that interact with the analytic platform 100. The MDMH 150 may in embodiments include a security facility 152, a granting matrix facility 154, an interface 158, a data loader 160, a data sandbox 168, a data manipulation and structuring facility 162, one or more staging tables 164, a synchronization facility 170, dimension tables 172, and a hierarchy formation facility 174. The data loader 160 may be used to receive data. Data may enter the MDMH from various sources, such as from the data mart 114 after the data mart 114 completes its intended processing of the information and data that it received as described herein. Data may also enter the MDMH 150 through a user interface 158, such as an API or a human user interface, web browser or some other interface, of any of the types disclosed herein or in the documents incorporated by reference herein. The user interface 158 may be deployed on a client device, such as a PDA, personal computer, laptop computer, cellular phone, or some other client device capable of handling data. The data sandbox 168 may be a location where data may be stored and then joined to other data. The data sandbox 168 may allow data that are contractually not able to be released or shared with any third party to be shared into the platform 100 framework. In embodiments, the security 152 and granting matrix 154 facilities of the MDMH may be the same or similar to the security 118 and granting matrix 120 facilities associated with the data mart facility 114, as described herein. Alternatively, the security 152 and granting matrix 154 facilities that are associated with the MDMH 150 may have features and rules that are specifically designed to operate within the MDMH 150. As an example, a security 152 or granting matrix 154 security feature may be created to apply only to a specific output of the MDMH 150, such as a unique data hierarchy that is created by the MDMH 150. In another example, the security 152 and/or granting matrix 154 facility may have rules that are associated with individual operations or combination of operations and data manipulation steps within the MDMH 150. Under such a MDMH-based rules regimen it may be possible to assign rules to an individual or other entity that permit them to, for example, use the data loader 160, staging tables 164, and hierarchy formation facilities 174 within the MDMH 150, but not permit them to use the dimension tables 172. In embodiments, the staging tables 164 may be included in the MDMH 150. In embodiments, the synchronization facility 170 may be included in the MDMH. In embodiments, the dimension tables 172 may be used to organize, store, and/or process dimension data. In embodiments, the hierarchy formation facility 174 may be used to organize dimension data. Hierarchy formation may make it easier for an application to access and consume data and/or for an end-user to interact with the data. In an example, a hierarchy may be a product hierarchy that permits an end-user to organize a list of product items. Hierarchies may also be created using data dimensions, such as venue, consumer, and time.

In embodiments, a similarity facility 180 may be associated with the MDMH 150. The similarity facility 180 may receive an input data hierarchy within the MDMH 150 and analyze the characteristics of the hierarchy and select a set of attributes that are salient to a particular analytic interest (e.g., product selection by a type of consumer, product sales by a type of venue, and so forth). The similarity facility 180 may select primary attributes, match attributes, associate attributes, block attributes and prioritize the attributes. The similarity facility 180 may associate each attribute with a weight and define a set of probabilistic weights. The probabilistic weights may be the probability of a match or a non-match, or thresholds of a match or non-match that is associated with an analytic purpose (e.g., product purchase). The probabilistic weights may then be used in an algorithm that is run within a probabilistic matching engine (e.g., IBM QualityStage). The output of the matching engine may provide information on, for example, other products which are appropriate to include in a data hierarchy, the untapped market (i.e. other venues) in which a product is probabilistically more likely to sell well, and so forth. In embodiments, the similarity facility 180 may be used to generate projections of what types of products, people, customers, retailers, stores, store departments, etc. are similar in nature and therefore they may be appropriate to combine in a projection or an assessment.

In embodiments, the MDMH 150 may accommodate a blend of disaggregated and pre-aggregated data as necessitated by a client's needs. For example, a client in the retail industry may have a need for a rolling, real-time assessment of store performance within a sales region. The ability of the MDMH 150 to accommodate twinkle data, and the like may give the client useful insights into disaggregated sales data as it becomes available and make it possible to create projections based upon it and other available data. At the same time, the client may have pre-aggregated data available for use, for example a competitor's sales data, economic indicators, inventory, or some other dataset. The MDMH 150 may handle the dimension data needed to combine the use of these diverse data sets.

As illustrated in FIG. 1, the analytic platform 100 may include a projection facility 178. A projection facility 178 may be used to produce projections, whereby a partial data set (such as data from a subset of stores of a chain) is projected to a universe (such as all of the stores in a chain), by applying appropriate weights to the data in the partial data set. A wide range of potential projection methodologies exist, including cell-based methodologies, store matrix methodologies, iterative proportional fitting methodologies, virtual census methodologies, and others. The methodologies can be used to generate projection factors. As to any given projection, there is typically a tradeoff among various statistical quality measurements associated with that type of projection. Some projections are more accurate than others, while some are more consistent, have less spillage, are more closely calibrated, or have other attributes that make them relatively more or less desirable depending on how the output of the projection is likely to be used. In embodiments of the platform 100, the projection facility 178 takes dimension information from the MDMH 150 or from another source and provides a set of projection weightings along the applicable dimensions, typically reflected in a matrix of projection weights, which can be applied at the data mart facility 114 to a partial data set in order to render a projected data set. The projection facility 178 may have an interface 182 of any of the types disclosed herein.

In certain preferred embodiments the projection facility 178 may be used, among other things, to select and/or execute more than one analytic technique, or a combination of analytic techniques, including, without limitation, a store matrix technique, iterative proportional fitting (IPF), and a virtual census technique within a unified analytic framework. An analytic method using more than one technique allows the flexible rendering of projections that take advantage of the strengths of each of the techniques, as desired in view of the particular context of a particular projection. In embodiments the projection facility may be used to project the performance of sales in a certain geography. The geography may have holes or areas where no data exists; however, the projection facility may be adapted to select the best projection methodology and it may then make a projection including the unmeasured geography. The projection facility may include a user interface that permits the loading of projection assessment criteria. For example, a user may need the projection to meet certain criteria (e.g. meet certain accuracy levels) and the user may load the criteria into the projection facility. In embodiments the projection facility 178 may assess one or more user-defined criteria in order to identify one or more projections that potentially satisfy the criteria. These candidate projections (which consist of various potential weightings in a projection matrix), can be presented to a user along with information about the statistical properties of the candidate weightings, such as relating to accuracy, consistency, reliability and the like, thereby enabling a user to select a set of projection weightings that satisfy the user's criteria as to those statistical properties or that provide a user-optimized projection based on those statistical properties. Each weighting of the projection matrix thus reflects either a weighting that would be obtained using a known methodology or a weighting that represents a combination or fusion of known methodologies. In some cases there may be situations where no projection can be made that meets the user-defined criteria, and the projections facility may respond accordingly, such as to prompt the user to consider relaxing one or more criteria in an effort to find an acceptable set of weightings for the projection matrix. There may be other times were the projections facility makes its best projection given the data set, including the lack of data from certain parts of the desired geography.

In embodiments, the projection facility 178 may utilize the store matrix analytic methodology. The store matrix methodology is an empirical method designed to compensate for sample deficiency in order to most efficiently estimate the sales for population stores based on data from a set of sample stores. The store matrix methodology is an example of an algorithm that is flexible and general. It will automatically tend to offset any imbalances in the sample, provided that the appropriate store characteristics on which to base the concept of similarity are selected. The store matrix methodology allows projection to any store population chosen, unrestricted by geography or outlet. It is a general approach, and may allow use of the same basic projection methodology for all outlets, albeit potentially with different parameters. The store matrix methodology views projection in terms of a large matrix. Each row of the matrix represents a population store and each column of the matrix represents a census/sample store. The goal of this algorithm is to properly assign each population store's ACV to the census/sample stores that are most similar.

In embodiments, the projection facility 178 may utilize the iterative proportional fitting (IPF) analytic methodology. IPF is designed for, among other things, adjustment of frequencies in contingency tables. Later, it was applied to several problems in different domains but has been particularly useful in census and sample-related analysis, to provide updated population statistics and to estimate individual-level attribute characteristics. The basic problem with contingency tables is that full data are rarely, if ever, available. The accessible data are often collected at marginal level only. One must then attempt to reconstruct, as far as possible, the entire table from the available marginals. IPF is a mathematical scaling procedure originally developed to combine the information from two or more datasets. It is a well-established technique with theoretical and practical considerations behind the method. IPF can be used to ensure that a two-dimension table of data is adjusted in the following way: its row and column totals agree with fixed constraining row and column totals obtained from alternative sources. IPF acts as a weighting system whereby the original table values are gradually adjusted through repeated calculations to fit the row and column constraints. During these calculations the figures within the table are alternatively compared with the row and column totals and adjusted proportionately each time, keeping the cross-product ratios constant so that interactions are maintained. As the iterations are potentially never-ending, a convergence statistic is set as a cut-off point when the fit of the datasets is considered close enough. The iterations continue until no value would change by more than the specified amount. Although originally IPF was been developed for a two-dimension approach, it has been generalized to manage n dimensions.

In embodiments, the projection facility 178 may utilize the virtual census analytic methodology. Virtual census is a dual approach of the store matrix algorithm. Store matrix assigns census stores to sample stores based on a similarity criteria, whereas virtual census assigns sample stores to census stores using a similarity criteria too. Thus, virtual census can be seen as an application of a store matrix methodology, giving the opposite direction to the link between sample and non-sample stores. The way non-sample stores are extrapolated is made explicit in the virtual census methodology, whereas the store matrix methodology typically keeps it implicit. The virtual census methodology can be considered as a methodology solving missing data problems; however, the projection may be considered an imputation system (i.e. one more way to fill in the missing data). The application of this method foresees a computation of "virtual stores."

In embodiments, the projection facility 178 may use a combination of analytic methodologies. In an example, there may be a tradeoff in using different methodologies among accuracy, consistency and flexibility. For example, the IPF methodology may be highly accurate and highly consistent, but it is not as flexible as other methodologies. The store matrix methodology is more flexible, but less accurate and less consistent than the other methodologies. The virtual census methodology is consistent and flexible, but not as accurate. Accordingly, it is contemplated that a more general methodology allows a user, enabled by the platform, to select among methodologies, according to the user's relative need for consistency, accuracy and flexibility in the context of a particular projection. In one case flexibility may be desired, while in another accuracy may be more highly valued. Aspects of more than one methodology may be drawn upon in order to provide a desired degree of consistency, accuracy and flexibility, within the constraints of the tradeoffs among the three. In embodiments, the projection facility 178 may use another style of analytic methodology to make its projection calculations.

Projection methodologies may be employed to produce projected data from a known data set. The projected data may be associated with a confidence level, a variance, and the like. The projection facility 178 may provide, emulate, blend, approximate, or otherwise produce results that are associated with projection methodologies. Throughout this disclosure and elsewhere, the projection facility 178 may be described with respect to particular projection methodologies, such as and without limitation Iterative Proportional Fitting, Store Matrix, Virtual Census, and so on. It will appreciated that, in embodiments, the projection facility 178 may not be limited to these projection methodologies.

Iterative Proportional Fitting (IPF) was originally designed by Deming and Stephan (1940) for adjustment of frequencies in contingency tables. IPF has been applied to several problems in different domains but is particularly useful in census and sample-related analysis, to provide updated population statistics and to estimate individual-level attribute characteristics.

An issue with contingency tables may be that full data is rarely, if ever, available. The accessible data are often collected at marginal level only and then the entire table may be completed from the available marginal information.

IPF is a mathematical scaling procedure. IPF can be used to ensure that a two-dimension table of data is adjusted so that its row and column totals agree with a fixed constraining row and column totals obtained from alternative sources.

IPF may act as a weighting system, whereby the original table values are gradually adjusted through repeated calculations to fit the row and column constraints. During the calculations, the figures within the table may be alternatively compared with the row and column totals and adjusted proportionately each time, keeping the cross-product ratios constant so that interactions are maintained. As the iterations may be executed continuously, a "Convergence Statistic" may be set as a cut-off point when the fit of the datasets is considered substantially the same. The iterations continue until no value would change by more than the specified amount. IPF has been generalized to manage n dimensions of datasets.

IPF may be better understood by using an algorithm considering a simple two-dimension table.

TABLE 1

| | k = 1 | k = 2 | . . . | k = K | |
|---|---|---|---|---|---|
| h = 1 | | | | | $ACV_{1\cdot}^s$ |
| h = 2 | | | | | $ACV_{2\cdot}^s$ |
| . . . | | | $ACV_{hk}^s$ | | |
| h = H | | | | | $ACV_{H\cdot}^s$ |
| | $ACV_{\cdot 1}^s$ | $ACV_{\cdot 2}^s$ | | $ACV_{\cdot K}^s$ | |

We can define:

$pf_{hk}^i$ Projection Factor of the cell (h, k) computed at iteration i. $pf_{hk}^i=(ACV_{hk}/ACV_{hk}^s)$ $ACV_{hk}$ Total All Commodity Value (hereafter ACV) of the universe computed at cell (h, k) level.

$ACV_{h\cdot}$ Total ACV of the universe computed at marginal level for row h.

$ACV_{\cdot k}$ Total ACV of the universe computed at marginal level for column k.

$ACV_{hk}^s$ Total ACV of the sample computed at cell (h, k) level.

$ACV_{h\cdot}^s$ Total ACV of the sample computed at marginal level for row h.

$ACV_{\cdot k}^s$ Total ACV of the sample computed at marginal level for column k.

h=1, . . . , H Number of levels of the 1st stratification variable h.

k=1, . . . , K Number of levels of the 2nd stratification variable k.

The following two equations can now be defined:

$$pf_{hk}^{i} = pf_{hk}^{(i-1)} \cdot \frac{ACV_{h\cdot}}{\sum_{k=1}^{K} pf_{hk}^{(i-1)} \cdot ACV_{hk}^{s}} \tag{1}$$

$$pf_{hk}^{(i+1)} = pf_{hk}^{i} \cdot \frac{ACV_{\cdot k}}{\sum_{h=1}^{H} pf_{hk}^{i} \cdot ACV_{hk}^{s}} \tag{2}$$

$ACV_{h\cdot}$ and $ACV_{\cdot k}$ are the pre-defined row totals and column totals respectively.

In an embodiment, equation (1) may be used to balance rows, while equation (2) may be used to balance columns. In terms of probabilities, IPF updates may be interpreted as retaining the old conditional probabilities while replacing the old marginal probability with the observed marginal.

In an embodiment, equations (1) and (2) may be employed iteratively to estimate new projection factors and may theoretically stop at iteration m where:

$$ACV_{h\cdot} = \sum_{k=1}^{K} pf_{hk}^{m} \cdot ACV_{hk}^{s}$$

-continued and $$ACV_{\cdot k} = \sum_{h=1}^{H} pf_{hk}^{m} \cdot ACV_{hk}^{s}.$$

In an embodiment, convergence may be taken to have occurred and the procedure stopped when no cell value would change in the next iteration by more than a pre-defined amount that obtains the desired accuracy. In an embodiment, convergence of the data may not occur if there are zero cells in the marginal constraints, negative numbers in any of the data, a mismatch in the totals of the row and column constraints, or the like.

In an embodiment, empirical evidence may show that a certain percentage of zero cells in the initial matrix may prevent convergence through a persistence of zeros. In an embodiment, a certain percentage of zero cells is undefined but if a matrix contains evenly distributed zeros in more than 30% of the cells or are grouped closely together and comprise around 10% of the table, convergence may not occur.

In an embodiment, IPF may be used when different variables need to be reported and balanced at the same time such as chains, regions, store formats and the like, and the elementary cells obtained by combining all the levels are not well populated. In an embodiment, IPF may allow the set up of constraints at store level (i.e. constraints in the value of projection factors). It may be understood, that when increasing the constraints, the total degrees of freedom may decrease, affecting the number of iterations needed to reach convergence.

In an embodiment, using IPF, the delivered geographies (custom and standard specific) may be balanced. In an embodiment, a geography may be balanced when the total ACV projected from the sample is equal to the total ACV estimated in the universe. A non-balanced geography may be defined as floating.

In an embodiment, if there is a certain percentage of zero cells, there may be a need to develop virtual stores before applying IPF. In an embodiment, if a large number of virtual stores are developed, the projection may no longer fit a very good statistical model.

In an embodiment, once the convergence is reached, the final projection factors $pf_{hk}^m$ may be the closest to the initial ones if considering the "Kullback Leibler" distance as a metric. In an embodiment, the table of data that comes out from the application of IPF may be a joint probability distribution of maximum likelihood estimates obtained when the probabilities are convergent within an acceptable pre-defined limit.

In an embodiment, maximum likelihood estimations may provide a consistent approach to parameter estimation problems. This may mean that they can be developed for a large variety of estimation situations.

In an embodiment, maximum likelihood estimations may have desirable mathematical and optimality properties. In an embodiment, they may become minimum variance unbiased estimators as the sample size increases. Unbiased may mean that if large random samples with replacement from a population, the average value of the parameter estimates may be theoretically equal to the population value. By minimum variance (asymptotically efficiency), if there is a minimum variance bound estimator, this method may produce it. In an embodiment, the estimator may have the smallest variance, and thus the narrowest confidence interval of all estimators of that type.

In an embodiment, maximum likelihood estimations may have approximate normal distributions (asymptotic normality) and approximate sample variances that can be used to generate confidence bounds and hypothesis tests for the parameters.

In an embodiment, maximum likelihood estimations may be invariant under functional transformations.

In an embodiment, maximum likelihood estimations may be consistent, for large samples they may converge in probability to the parameters that they estimate.

In an embodiment, maximum likelihood estimations may be best linear unbiased estimations.

In an embodiment, a store matrix may be an empirical method designed to compensate for sample deficiency and most efficiently estimate the sales for a population of stores based on data from a set of sample stores. In an embodiment, the algorithm may be flexible and very general. In an embodiment, the store matrix may automatically tend to offset any imbalances in the sample, provided that we select the appropriate store characteristics on which to base the concept of similarity. In an embodiment, the store matrix may allow the projection of any store population chosen, unrestricted by geography or outlet.

In an embodiment, the store matrix algorithm may view projection in terms of a large matrix. Each row of the matrix may represent a population store and each column of the matrix may represent a census/sample store. The goal of this algorithm may be to properly assign each population store's ACV to the census/sample stores that are most similar.

The table below shows an example of how the matrix looks before any calculations are done.

| | | | | CENSUS/SAMPLE STORES | | | | | | | | | |
|---|---|---|---|---|---|---|---|---|---|---|---|---|---|
| | | | | Marsha's | | Jan's | | | | | | | |
| | | | | Store # | | | | | | | | | |
| | | | | 102 | 106 | 201 | 202 | 203 | 204 | 205 | 206 | 207 | 208 |
| | Retailer | Store # | ACV | 16 | 9 | 24 | 18 | 29 | 18 | 12 | 18 | 15 | 26 |
| POPULATION | Marsha's | 101 | 12 | | | | | | | | | | |
| | Marsha's | 102 | 16 | | | | | | | | | | |
| | Marsha's | 103 | 13 | | | | | | | | | | |
| | Marsha's | 104 | 11 | | | | | | | | | | |
| | Marsha's | 105 | 8 | | | | | | | | | | |
| | Marsha's | 106 | 9 | | | | | | | | | | |
| | Marsha's | 107 | 16 | | | | | | | | | | |
| | Marsha's | 108 | 15 | | | | | | | | | | |
| | Marsha's | 109 | 13 | | | | | | | | | | |
| | Marsha's | 110 | 7 | | | | | | | | | | |
| | Jan's | 201 | 24 | | | | | | | | | | |
| | Jan's | 202 | 18 | | | | | | | | | | |
| | Jan's | 203 | 29 | | | | | | | | | | |
| | Jan's | 204 | 18 | | | | | | | | | | |
| | Jan's | 205 | 12 | | | | | | | | | | |
| | Jan's | 206 | 18 | | | | | | | | | | |
| | Jan's | 207 | 15 | | | | | | | | | | |
| | Jan's | 208 | 26 | | | | | | | | | | |
| | Cindy's | 301 | 14 | | | | | | | | | | |
| | Cindy's | 302 | 12 | | | | | | | | | | |
| | Cindy's | 303 | 11 | | | | | | | | | | |
| | Cindy's | 304 | 7 | | | | | | | | | | |
| | Cindy's | 305 | 7 | | | | | | | | | | |
| | Cindy's | 306 | 13 | | | | | | | | | | |
| | Cindy's | 307 | 6 | | | | | | | | | | |
| | Cindy's | 308 | 6 | | | | | | | | | | |
| | Cindy's | 309 | 12 | | | | | | | | | | |

The Store Matrix algorithm/process can be divided into 8 key steps:

a) Calculation of Store Similarity
b) Maximum ACV Calculation (Market Run)
c) ACV Allocation Within Market
d) Minimum ACV Calculation (Region Run only)
e) Initialize calculated ACV (Region Run only)
f) ACV Allocation within Region
g) ACV Re-Allocation
h) Weights Calculation In an embodiment, virtual census (VC) may be the dual approach of the Store Matrix Algorithm. In an embodiment, the store matrix may assign census stores to sample stores based on a similarity criteria, whereas virtual census may assign sample stores to census stores using a similarity criteria. Therefore, virtual census may be an application of store matrix, providing the opposite direction to the link between sample and non-sample stores. In an embodiment, the way non-sample stores are extrapolated may be made explicit, whereas store matrix may be implicit.

In an embodiment virtual census may create a virtual layer of non sample stores, assigning sample store(s) to each virtual store. In an embodiment, for each virtual store, virtual census may give a list of nearest sample stores, along with projection factors, that may allow building up the ACV (or any measure of size) of the non-sample store represented by the virtual store. Each virtual store may be estimated by a linear combination of sample stores.

Virtual store may be better understood by an example. In the example, there is a universe of 15 stores, among which 5 stores are part of the sample.

The matrix in table 1 shows how each non-sample store (in rows) may be replaced by one virtual store estimated by a linear combination of sample stores (on columns). For example, the sales of store #6 are estimated as 0.2*sales of store #3+0.7*sales of store #4+0.3*sales of store #8. For each non-sample store, only the "nearest" sample stores are used for the calculation.

TABLE 1

| Sample | Universe | geography | Store #3 | Store 4 | Store 8 | Store 11 | Store 13 |
|---|---|---|---|---|---|---|---|
| | Store #1 | G1 | 0.3 | 0.3 | 0.4 | | |
| | Store #2 | G1 | 0.5 | 0.5 | 0.2 | | |
| X | Store #3 | G1 | 1 | | | | |
| X | Store #4 | G1 | | 1 | | | |
| | Store #5 | G1 | 0.1 | 0.8 | 0.2 | | |
| | Store #6 | G1 | 0.2 | 0.7 | 0.3 | | |
| | Store #7 | G1 | | 0.2 | 0.8 | 0.2 | |
| x | Store #8 | G1 | | | 1 | | |
| | Store #9 | G2 | | | 0.9 | 0.1 | |
| | Store #10 | G2 | | | 0.2 | 0.7 | 0.1 |
| x | Store #11 | G2 | | | | 1 | |
| | Store #12 | G2 | | | | 0.5 | 0.5 |
| x | Store #13 | G2 | | | | | 1 |
| | Store #14 | G2 | | | | 0.5 | 0.6 |
| | Store #15 | G2 | | | | 0.5 | 0.7 |

The distance used to determine the nearest neighbors of a non-sample store may allow taking into account, constraints like region, chain, and store-type. As a result, one can deliver any geography, under releasability conditions, by just giving the list of stores belonging to the geography.

| Sample | Universe | geography | Store 3 | Store 4 | Store 8 | Store 11 | Store 13 |
|---|---|---|---|---|---|---|---|
| | Store #1 | G1 | 0.3 | 0.3 | 0.4 | | |
| | Store #2 | G1 | 0.5 | 0.5 | 0.2 | | |
| x | Store #3 | G1 | 1 | | | | |
| x | Store #4 | G1 | | 1 | | | |
| | Store #5 | G1 | 0.1 | 0.8 | 0.2 | | |
| | Store #6 | G1 | 0.3 | 0.7 | 0.3 | | |
| | Store #7 | G1 | | 0.2 | 0.8 | 0.2 | |
| x | Store #8 | G1 | | | 1 | | |
| | | | 2.2 | 3.5 | 2.9 | 0.2 | |

For example, the geography G1 may be estimated using 2.2*sales of store #3+3.5*sales of store #4+2.9*sales of store #8+0.2*sales of store #11. Geographies to be released can then be defined by picking stores or by rules as (take all stores in region North from chain A).

In an embodiment, the steps of the system may be:

1. Compute similarities between census and sample store
2. For each census store select the K nearest sample stores (neighbors). K can vary census store—by census store. Sample stores that are outliers are not selected as possible neighbors.
3. For each census store, compute the linear combination to apply to its neighbors, based on the Measure of Size and the similarity.
4. Keep the results of step 3 in a repository projection file, not directly used in production.
5. Create production projection files aggregating stores from the repository projection.

The projection facility 178 may be used in association with a hierarchical modular system that may include cell-based functionality, simplified basic store matrix functionality, calibration, or the like. In an embodiment, the cell-based functionality may allow detailed or macro stratification and relative projection calculation used to support existing cell-based services. In an embodiment, simplified basic store matrix functionality may support the store matrix methodology and virtual census methodology. In an embodiment, calibration may support IPF methodology and its extension (Calibration). In an embodiment, the three different solutions may be used individually or in combination, supporting a very large spectrum of actual and future applications In a solution A, a (Small) Sample based profile may most commonly be applied to non-enumerated or partially enumerated universes. It may be based on classical and robust sample design. Calibration (IPF) may be used as a way to release a limited set of additional geographies.

In a solution B, a (Large) Sample based profile may most commonly apply to fully enumerated universes. This family of solutions may be outside the classical statistical approach. Sample design may be considered beneficial, but not a key element to guarantee quality: the key element in this case may be the "distance metrics" between Universe and Sample. The store matrix may be useful tools to control universes and the set of geographies in which we need to partition it. Calibration (IPF), if added on, may be a useful tool to add flexibility in creating additional geographies not directly covered by the "distance metrics" function. The resulting quality for these geographies (or the entire set of geographies) could be relatively questionable (not easily predictable or controllable).

In a Solution C, a (Large) Sample based profile may most commonly be applied to fully enumerated universes. This family of solutions can be inside the classical statistical approach in case of trivial applications (Cell Based Only; Cell Based plus basic IPF). A sample design may be considered a key element as well as the calibration methodology. The store matrix can be considered a useful tool to improve quality and/or sample management, but not as a key factor. Calibration (IPF) may allow Universe control together with a relatively flexible way to release several geographies.

In an embodiment, the projection facility 178 may provide a number of capabilities such as:

- Support cell-based and marginal-based projection. Capability of supporting multiple projection methods (standard—Ratio/Lacing/Bolt on—IPF).
- Support projection to a fully enumerated universe (i.e. a store-level listing of the universe), a partially enumerated universe (i.e. a store-level listing for a portion of the universe with segment/sub-segment estimates of the non-enumerated portion of universe), a non-enumerated universe where only segment/sub-segment estimates of the universe are known, or the like.
- Support projection by any reasonable measure of size (MOS), including but not limited to All Commodity Volume, Category Volume, and Store Count.
- Allow creation of Secondary level MOS starting from primary one. Example: from MOS=Surface, derive MOS2=log(Surface)
- Facilitate new projection set up through a user interface that guides analysts or users through the parameterization of the projection framework.
- Facilitate automated production with little-to-no manual intervention.
- Enable process monitoring and quality control with alert capabilities when monitoring metrics breach acceptable levels.
- Support both approximate and exact projections (detailed documents to be provided).
- Facilitate population with either a store-based projection or a household-based (incl. individual/user) projection.
- Interact with other processes such as data load and quality control, universe definition/update, sample selection and maintenance, measure-of-size estimation, projection, release evaluation, venue grouping definition, validation of releasability of venue groups, venue group reporting, or the like.

The map of the interactions (input received/output released) may be part of the general design and must be shared and approved with the other areas of the analytic platform 100.

Prior to projection creation allow evaluation of inputs (# of sample, etc.) as part of a quality audit. Allow pre-production data simulation. Allow projected data quality control (Raw data early checks—trend simulation based on basket of product hierarchies).

Support functionality for weight capping, where capping can be done at global-, strata-, and/or venue-levels.

Time dimension for projections must be flexible enough to handle not just weekly data, but also daily data.

Ability to recreate projections for specific week ranges in response to quality concerns or data input corruption.

In embodiments, the projection facility 178 may provide a blend of projection methodologies, which may be manually or automatically selected so as to produce projection factors able to satisfy a desired trade-off between accuracy, consistency, and so on. Accuracy or calibration may pertain to a capability that is associated with a level in an information hierarchy. In embodiments, the projection facility 178 may opt for or automatically choose the level in an information hierarchy that produces the best accuracy or calibration. In embodiments, the information hierarchy may pertain to or contain facts that are associated with a market; may contain information that pertains to or encodes dimensions that are associated with a market; and so on. Spillage may refer to a problem caused by sample stores with a partially matching set of characteristics with respect to the characteristics of stores they are used to represent. Reducing spillage may be associated with deterioration of consistency or calibration. In embodiments, the projection facility 178 may automatically control spillage. Consistency may pertain to a relationship between two or more results that are calculated in different ways or from different data, but that are nonetheless expected to be the same or to exhibit a known or anticipated relationship. The degree to which such an equality or relationship is observed may be the degree to which consistency is present. The projection facility 178 may automatically increase, maximize, or achieve a given level of consistency by adjusting its operation, selecting appropriate source data, choosing and applying a blend of projection methodologies, and so on. Flexibility may pertain to the amount of freedom that is available at query time to choose which level of an information hierarchy will be used to perform calculations, with greater flexibility being associated with greater freedom.

Figure 4:
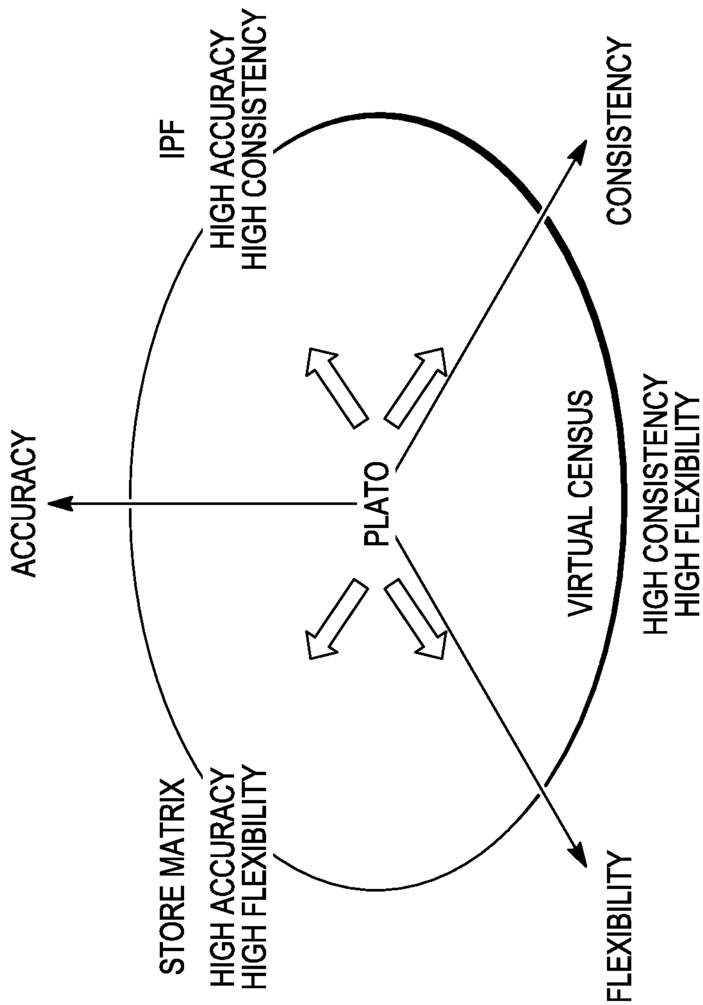
FIG. 4 illustrates various projection methodologies in relation to the projection facility.

Referring now to FIG. 4, it will be appreciated that different projection methodologies may differ on the three dimensions of accuracy, consistency, and flexibility. For example, IPF may provide relatively good accuracy and consistency, but may be relatively inflexible; store matrix may be relatively flexible and may provide relatively high flexibility, but may provide relatively little consistency (such as may be due to a relatively large amount of spillage or leakage); virtual census may provide relatively high consistency and flexibility, but may provide relatively little accuracy; and so on.

The projection facility 178 may provide a single or unified methodology that includes store matrix, IPF, and virtual census, in addition to a cell-based projection. The methodology may be automatically and/or manually directed to replicate the functionality of its constituent projection methodologies or to provide a blend of the projection methodologies. It will be appreciated that embodiments of the projection facility 178 may provide results of improved precision as new information (or geographies) become available. Embodiments of the projection facility 178 may employ a core information matrix to compute these results.

Referring now to FIG. 5, Boolean logic may consist of a 1-state indicating true or known and a 0-state indicating false or unknown. Information logic may consists of a 1-state indicating it is fully known that some information is able to provide complete knowledge of a target entity; a b-slash-state indicating it is fully known that the some information does not or cannot contribute at all to target entity knowledge; and an unknown K-state indicating some information's expected contribution to target entity knowledge, wherein the actual contribution is not fully known.

Figure 6:
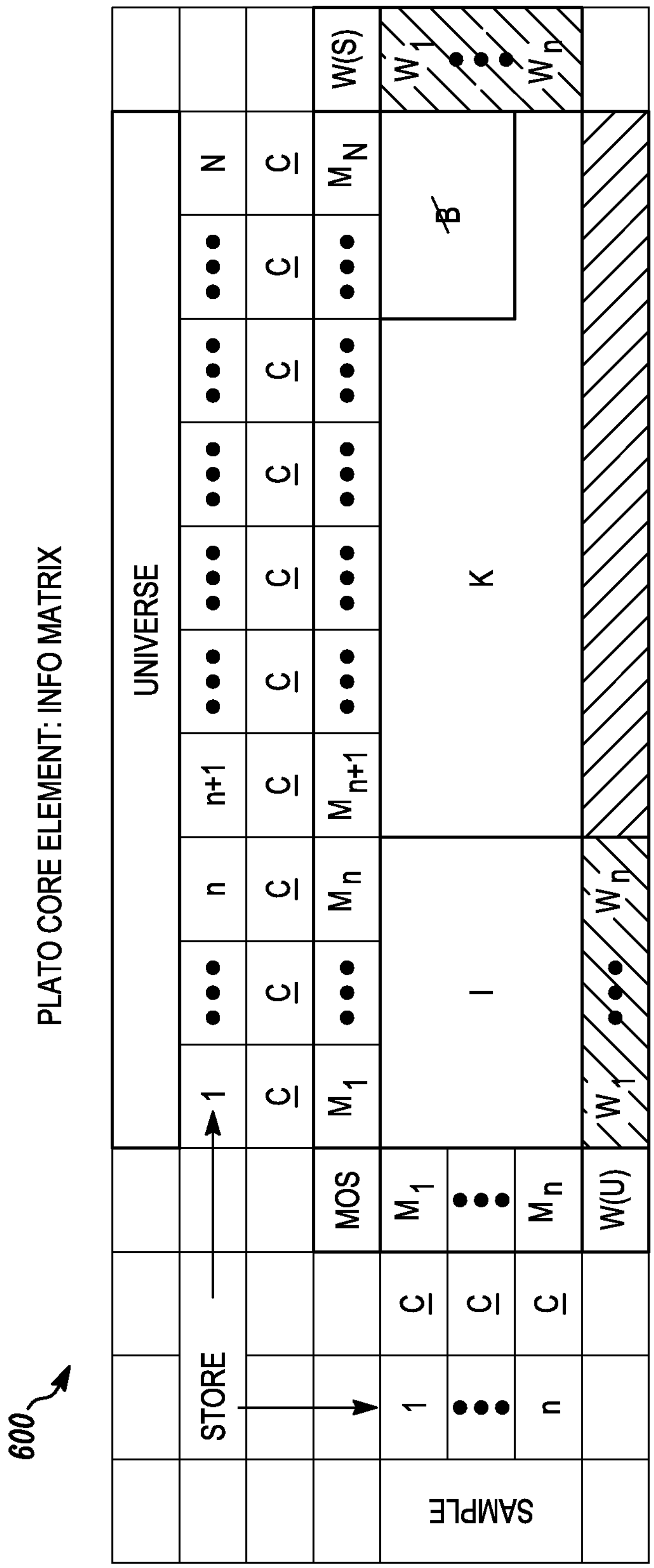
FIG. 6 illustrates a core information matrix.

Referring now to FIG. 6, the core information matrix is depicted in two dimensions with a universe of stores 1 through big-N along the horizontal axis and a sample of stores 1 through little-n along the vertical axis. Also along the horizontal axis are measures of size (MOS) m-1 through m-big-N. Also along the vertical axis are measures of size m-1 through m-little-n. In embodiments, the individual measures of size may encompass a universal measure of size divided by the store's measure of size. Also along the horizontal and vertical axes are weights w-1 through w-little-n. As indicated, there are no weights w-n-plus-1 through w-big-n. In other words, only sample stores have weights associated with them. In embodiments, any number of measures of size and any number of weights may be assigned to each cell in the matrix. In other words, each weight w and/or each MOS m may represent an array or hierarchy of weights and measures. These weights and measures may be associated with an array or hierarchy of characteristics of a store. The utility of this will be appreciated especially with reference to FIG. 7, which is described in detail hereinafter and elsewhere. As indicated, the universe of stores includes the samples stores (both contain stores 1 through little-n) although the universe of stores may contain even more stores than that. For the purpose of illustration, the cells of the core information matrix are labeled with information logic states, with a 1-state indicating that a store in the universe is completely known (i.e. the store is in both the sample and the universe), and the K-state and b-slash state respectively indicating that a store in the universe is either known to some expected degree or not known at all. Projections may be calculated with reference to the core information matrix and characteristics of those projections may depend upon w(s) and w(u) characteristics—when w(s) and w(u) are known, then the projection is fully known. In embodiments, the sample stores may all be members of a given geography and the projections may be used to generate additional geographies by imputing or projecting virtual stores. In embodiments, the virtual stores may form the basis of a virtual census. In embodiments, the core information matrix may be populated according to IPF, linear programming techniques, or the like. It will be appreciated that once the core information matrix is populated, it is possible to pull any selection of stores so long as the location of those stores in the matrix is known.

Figure 7:
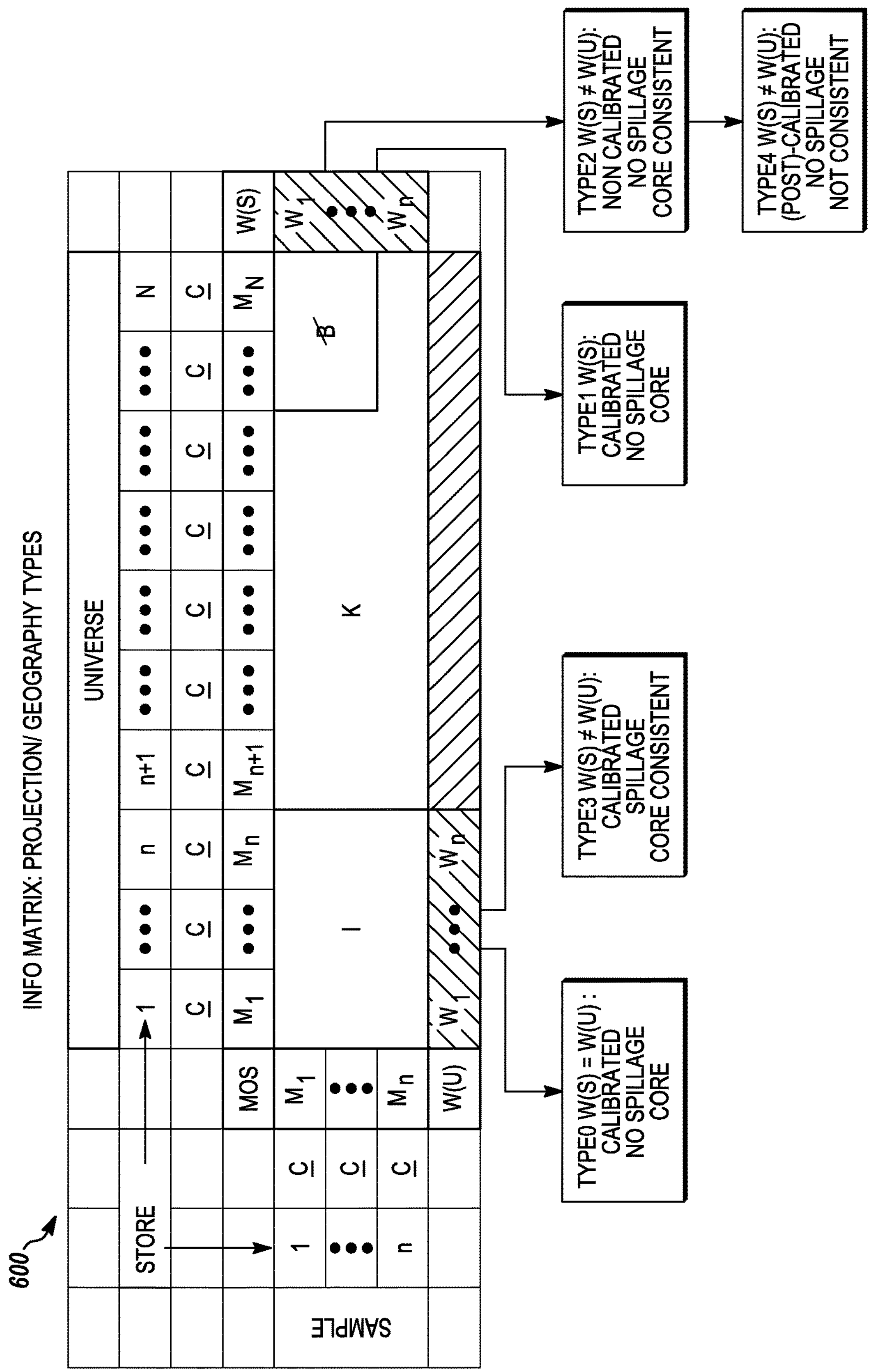
FIG. 7 illustrates types of projections in relation to the core information matrix.

Referring now to FIG. 7, the core information matrix 600 may be utilized to produce different types of projections or projected geographies. In a Type 0 projection, for each sample store used to compute projections, all the sample characteristics equal the universe characteristics and this is true for each store in the universe. Projections of this type may be core projections, being based on calibrated weights with no spillage.

Figure 8:
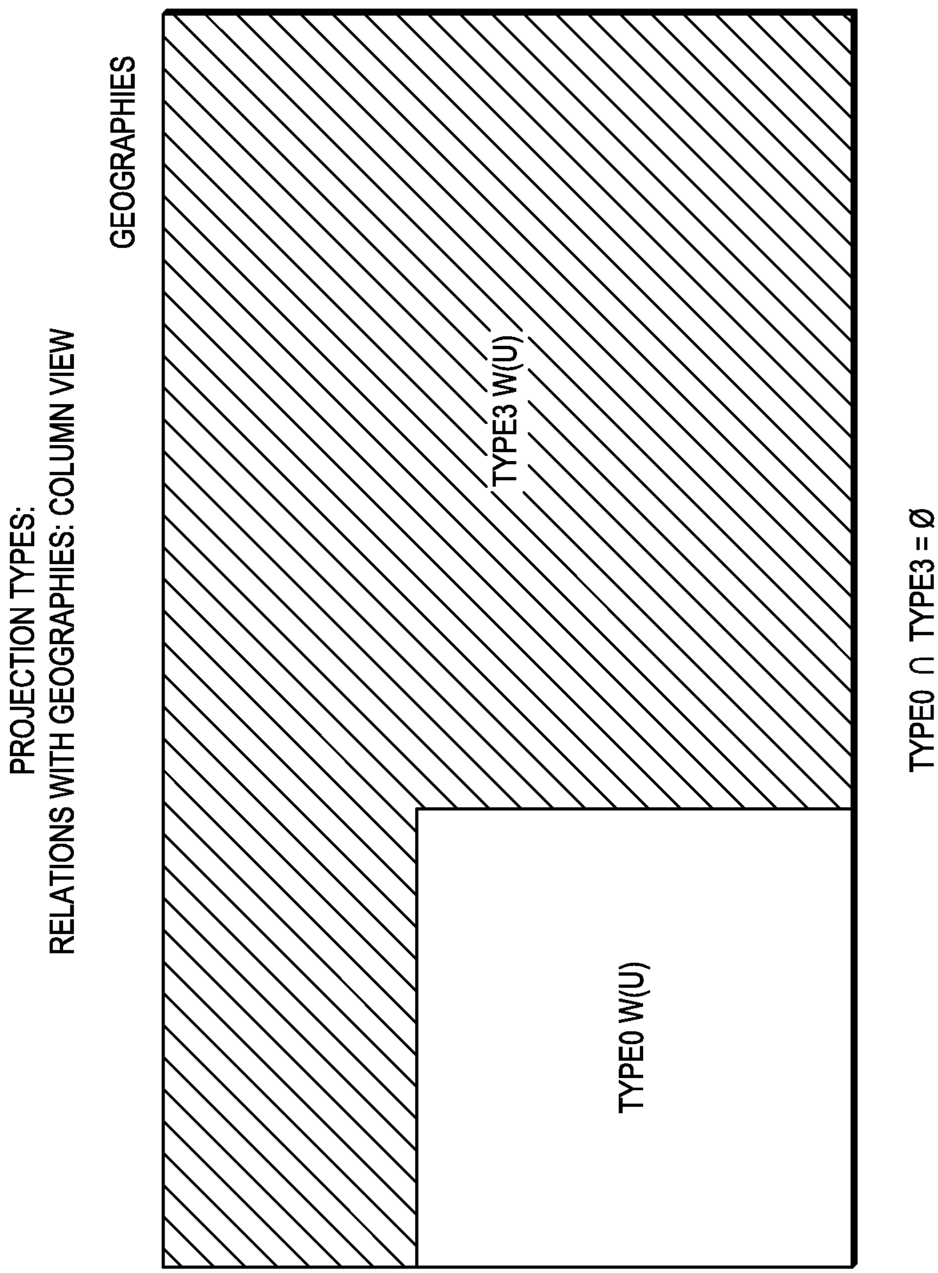
FIG. 8 illustrates projection types in relation to geographies.

In a Type 3 projection, for at least one store in the projection, the sample characteristics do not equal the universe characteristics. Projections of this type may be consistent with core projections and have the property of being calibrated weights, but may be affected by spillage. It should be appreciated that any chosen projected geography can be one of a Type 0 and Type 3 projection, as depicted in FIG. 8.

Figure 9:
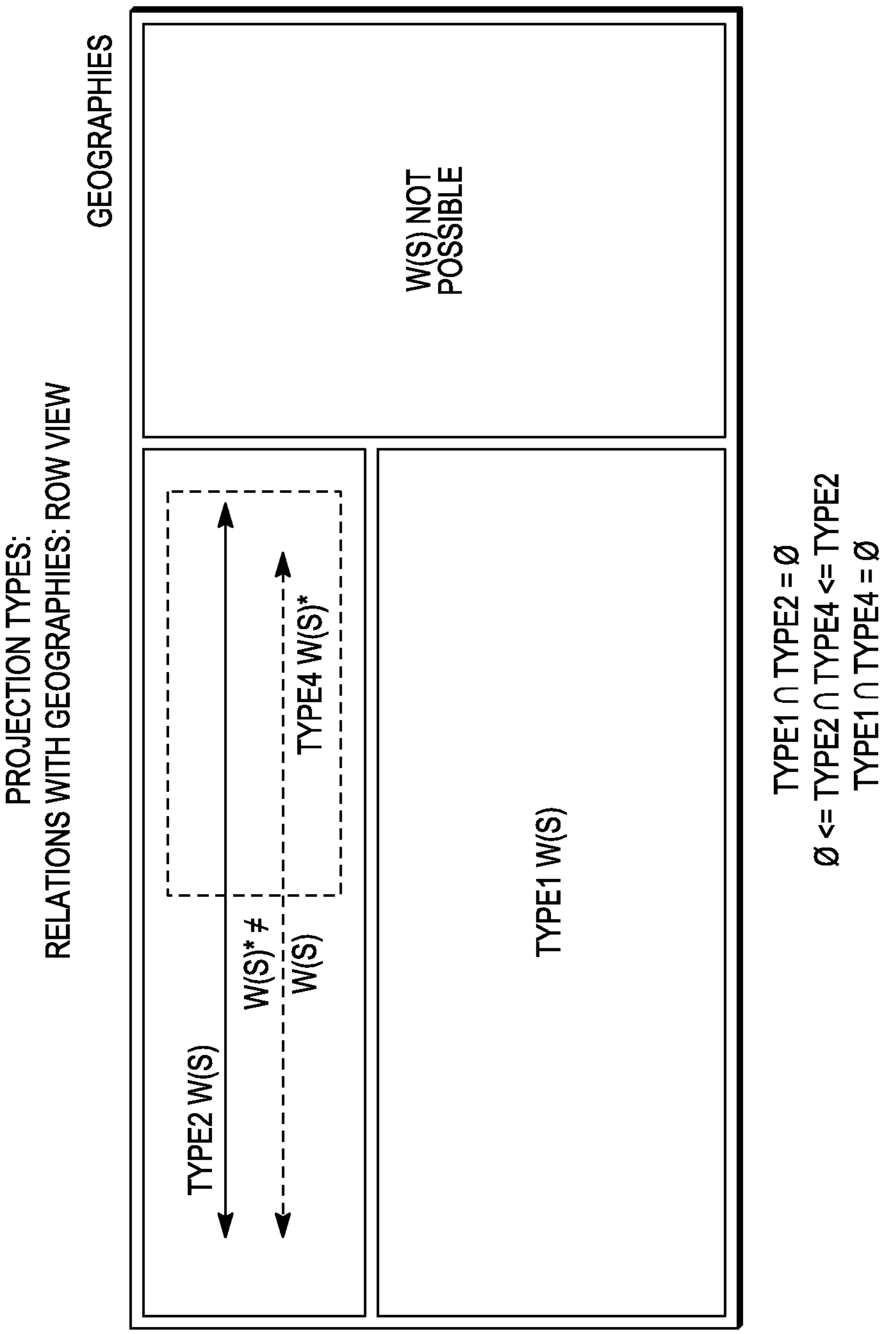
FIG. 9 illustrates projection types in relation to geographies.

A Type 1 projection is computed as Type 0, but in this case the only requirement may be that sample stores' characteristics are exactly matching the universe characteristics at marginal level (not store by store): they may be a core projection that is characterized by consistency, calibrated weights, and no spillage. As depicted in FIG. 9, it may not always be possible to construct a Type 1 projection in all cases. In practice, row and column weights generally may not be equal or calibrated.

Type 2 projections are computed Type 1 projections used to represent geographies based on characteristics not entirely included in the set of characteristics used to compute type 1 projections. For example and without limitation, suppose that a Type 1 projection represents the Chicago metropolitan area (characteristic used is city=Chicago). If one wanted to partition the Chicago metropolitan area into "North" and "South," one could compute two Type 1 projections based computation on two characteristics: city=Chicago and location=North; city=Chicago and location=South. Alternatively, one could simply partition the original Type 1 projection of the entire Chicago metropolitan area into North and South partitions. In this case, the partitions are Type 2—they are consistent with the original Type 1 projection (indeed they are of the original Type 1 projection) but the partitions may be not be calibrated and could have spillage. As depicted in FIG. 9, it may not always be possible to construct a Type 2 projection in all cases.

A Type 4 projection may be a Type 2 projection that is post-calibrated. That is, the result of a Type 2 projection may be calibrated to produce a Type 4 projection. By performing this post-calibration step, the Type 2 projection becomes post-calibrated, but consistency is lost.

Figure 10:
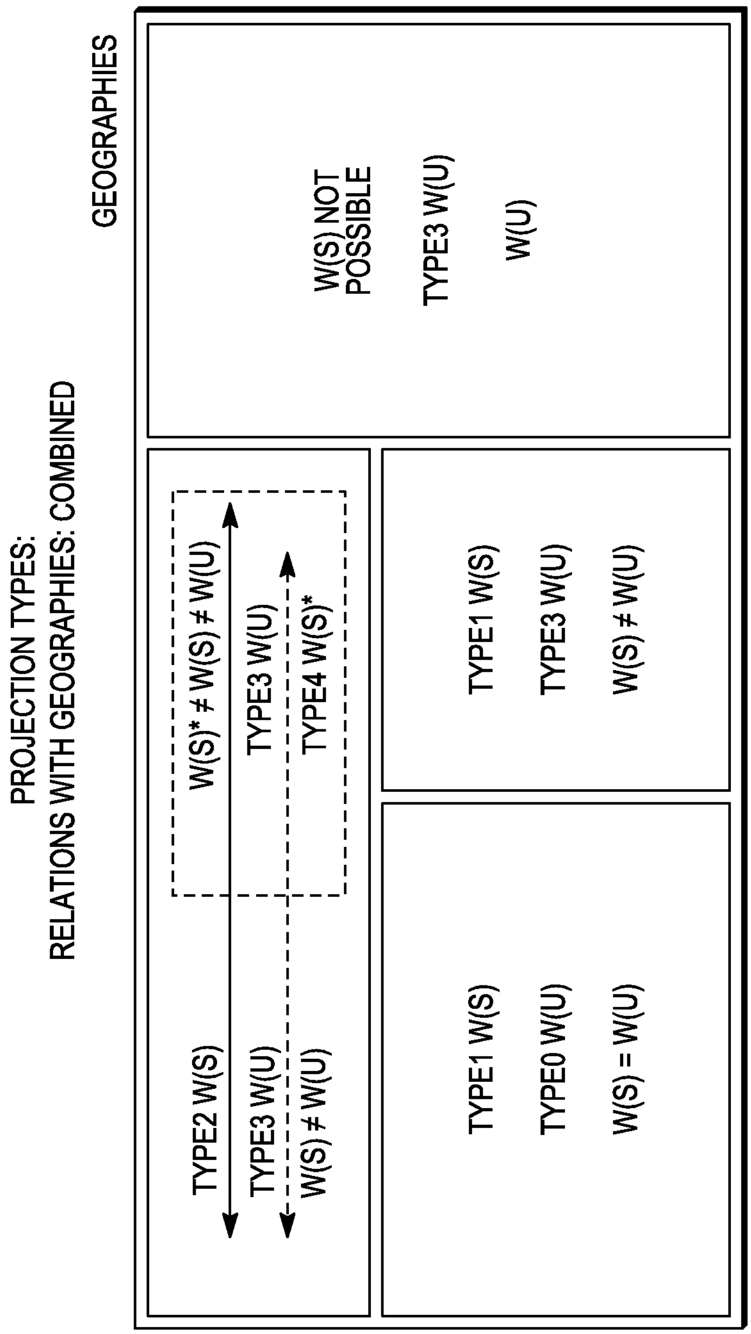
FIG. 10 illustrates projection types in relation to geographies.
Figure 11:
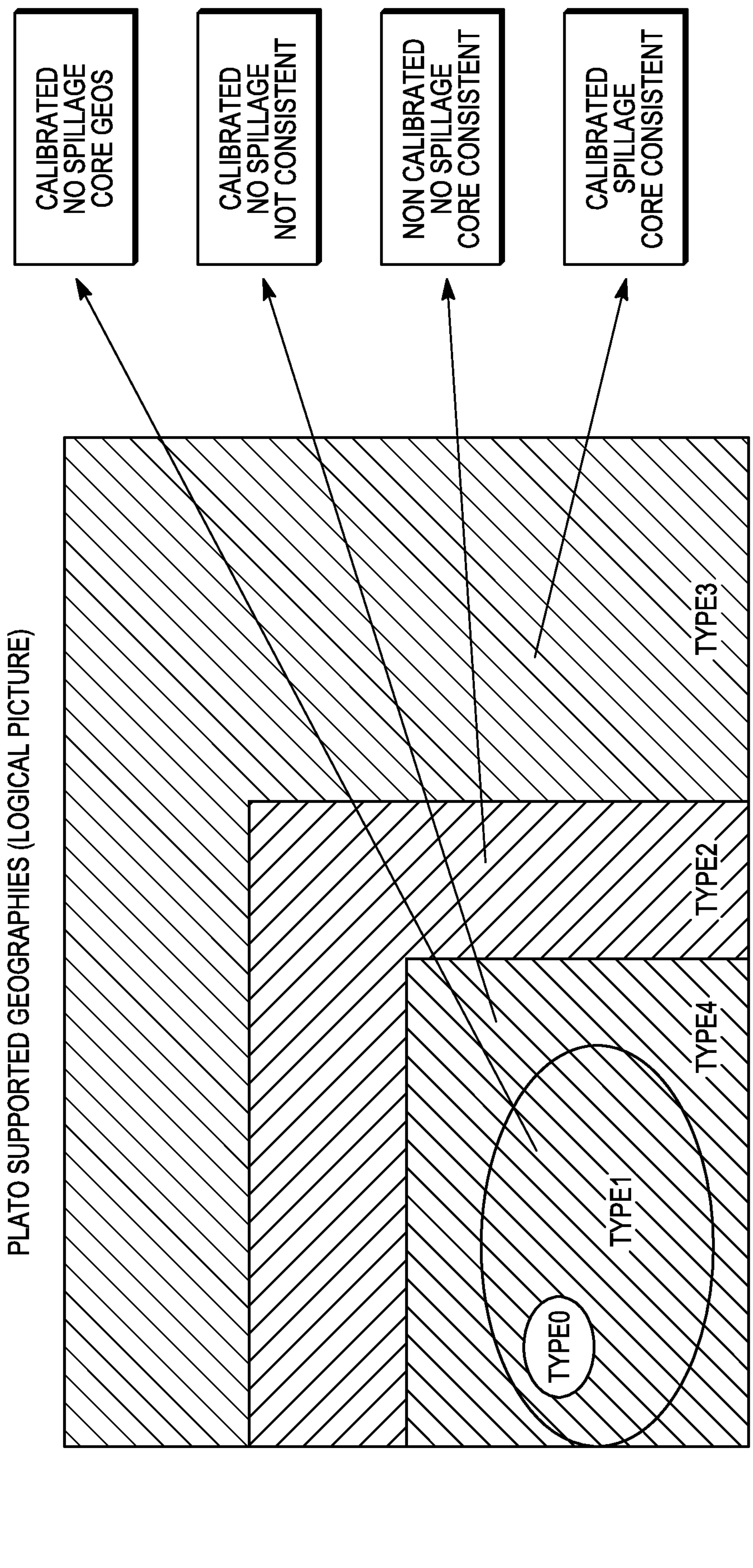
FIG. 11 illustrates a logical view of geography types that are supported by the projection facility.

As depicted in FIG. 10, it will be appreciated that the ability to produce Type 0, Type 1, Type 2, Type 3, and Type 4 projections from a single information matrix 600 may allow the projection facility 178 to produce projections weights with a desired mix of calibration/non-calibration, spillage/no spillage, consistency/inconsistency more or less in a automated and on demand way. As a result and as depicted in FIG. 11, tradeoffs between the various projection methodologies may be present and/or chosen and/or blended at run time.

Figure 12:
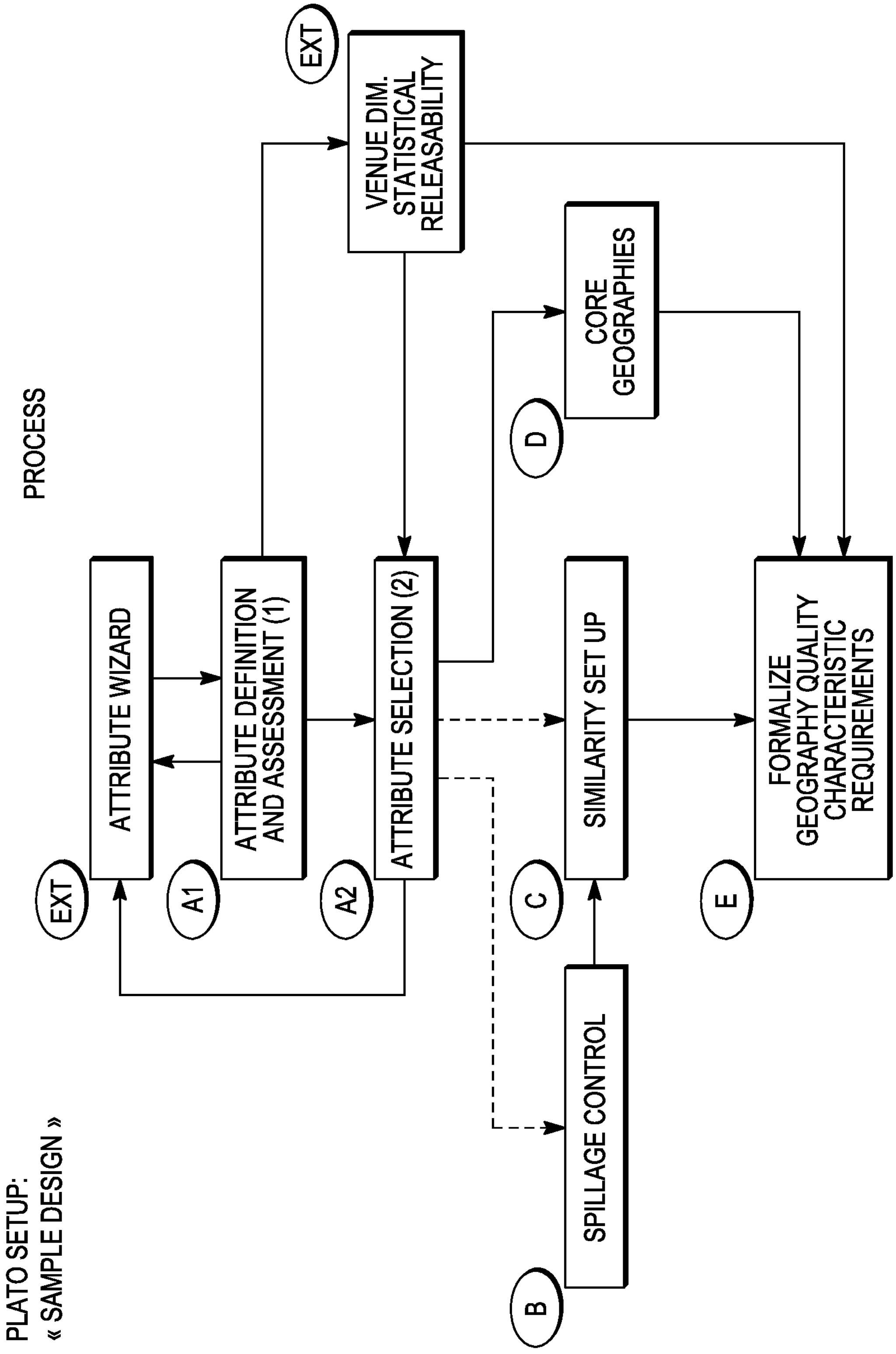
FIG. 12 is a logical flow diagram of a set-up process or step.
Figure 13:
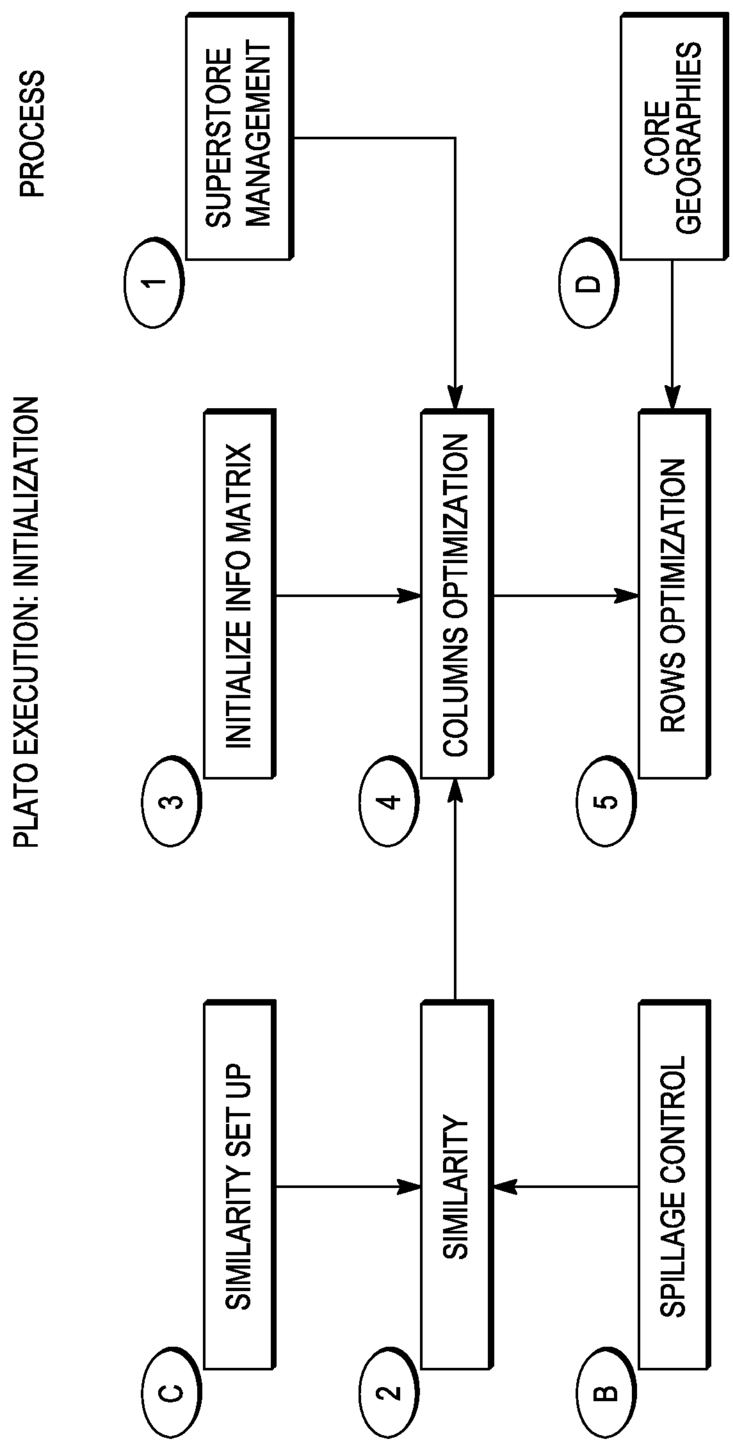
FIG. 13 is a logical flow diagram of an initialization process or step.
Figure 14:
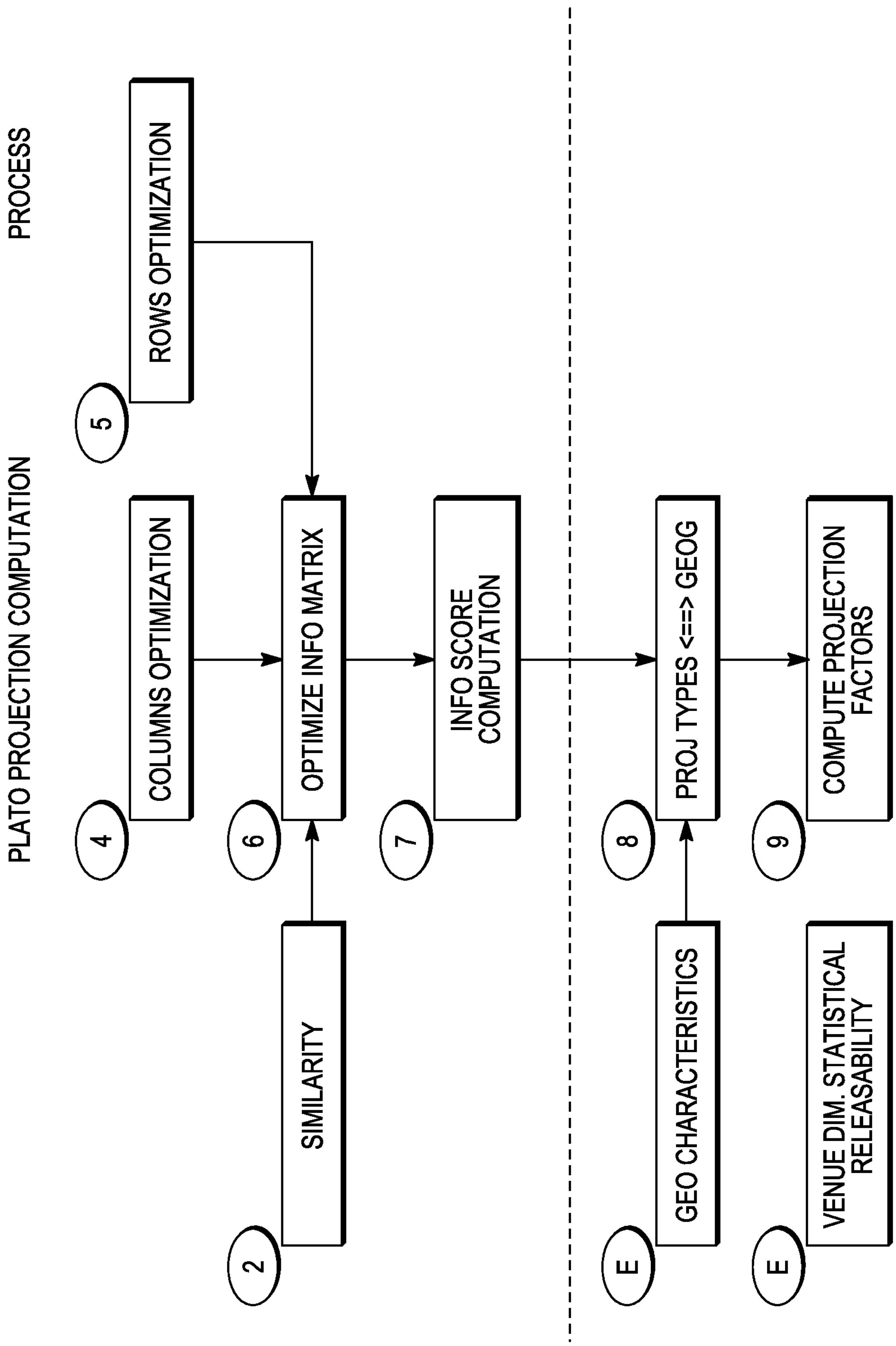
FIG. 14 is a logical flow diagram of a projection computation process or step.

A logical view of the projection facility 178 may comprise three distinct steps. The first step, a set-up step that is described hereinafter with reference to FIG. 12, may comprise activities that are done relatively infrequently. The second step, an initialization step that is described hereinafter with reference to FIG. 13, may comprise activities that are executed more or less periodically, at the start up of a projection session. The third step, an execution step that is described hereinafter with reference to FIG. 14, may comprise activities that compute projections during a projection session. The logical blocks as depicted in FIG. 12, FIG. 13, and FIG. 14 may represent logical steps in a logical flow, logical modules in a logical block diagram of a system or method, and so on. In embodiments, the shaded logical blocks may comprise elements of the projection facility 178 and the grey logical blocks may comprise modules that are external to the projection facility 178.

The process depicted in FIG. 12 may comprise a set of activities that are needed, preferred, or optional in the initialization of a system for generating projections, such as the projection facility 178 in combination with any and all of the elements of the analytic platform 100. Key elements of this process may employ or be associated with a collection of tools for enabling statisticians in one or more of the following: selecting the most appropriate store attributes to be used for reporting purposes (i.e. geography creation) and statistical control (similarity/spillage); identifying the best set of geographies supported by available sample; setting up spillage and similarity quality controls; setting up a geography database inclusive of the list of all geographies to be produced and the statistical quality criteria that these geographies are requested to meet and so on. The process begins with logical block A1, where to-be-projected attributes are defined and assessed. These definitions may be processed by a facility, such as and without limitation the granting matrix 120, to determine whether the projected attributes would be releasable. In any case, processing flow may continue to logical block A2 where some or all of the attributes are selected for projection. Processing flow may then proceed more or less in parallel to logical blocks B, C, and D. Processing at logical block B may be directed at spillage control—that is, limiting or controlling the amount of spillage that will be present in the projection. Processing at logical block C involves setting up similarity measures or other information relating to similarity, which may be described in further detail herein with reference to the similarity facility 180 and elsewhere. Processing at logical block D involves determining, assigning, or otherwise indicating or receiving an indication of one or more core geographies. The results of processing at logical block B are provided to logical block C. The results of processing at logical blocks C and D flow to logical block E, where processing continues so as to formalize quality characteristic requirements for the to-be-projected geographies.

Logical blocks A1 and A2 (attribute assessment/definition/selection) may be associated with a module where, perhaps based upon statistical analysis and/or interaction with subject matter experts, any and all available store attributes are scrutinized and a subset of them are identified as relevant for reporting/statistical purposes. Logical blocks B and C (spillage/similarity control) may be associated with one or more modules with which statisticians may research the best way to control similarity and spillage, perhaps according to a step-by-step process that the modules enable. Elements that control similarity and spillage may be identified through such use of these modules. These elements may be made available to the projection facility 178 for ongoing execution. Logical block D (core geographies) may be associated with a semi-automated module for helping statisticians and subject matter experts in defining which geographies can be eligible to be "CORE" (i.e. calibrated, spillage-free, and consistent with one another). Logical block E may be associated with a geography database including quality specifications. This database may comprise a repository of any and all geographies that need to be produced, together with releasability criteria inclusive of the projection type that is eligible for each geography based on the quality targets.

The process depicted in FIG. 13 may comprise a set of activities that are needed, preferred, or optional in the setup of a system for generating projections, such as the projection facility 178 in combination with any and all of the elements of the analytic platform 100. Key elements of this process may be completely, partially, or not automated and may employ or be associated with: managing superstores, initializing the core information matrix, calculating similarity criteria for a period, column optimization, and row optimization. In embodiments, any and all elements of the analytic platform 100 may be employed to implement the depicted figure. The process may involve similarity calculations at logical block 2, initialization of the core information matrix 600 at logical block 3, and superstore management at logical block 1. The results of processing at logical blocks 1, 2, and 3 flow to logical block 4 where a column optimization procedure is applied to the core information matrix. Then, processing flow continues to logical block 5 where a row optimization procedure is applied to the information matrix.

The superstore management of block 1 may correspond to a system or method for collapsing many (unknown) stores with equal attributes into a single store (i.e. a superstore) having the same attributes. Superstores may be utilized in cases where a store-by-store representation of a universe is incomplete or unknown, but the universe is known at an aggregate level. For example and without limitation, the number of mom-and-pop stores in a geographic region may be known, but individual fact data from each of those stores may be generally unavailable, except perhaps for the stores that are sample stores. Logical block 3 (initialize info matrix) may be associated with populating the core information matrix 600 with relevant (for a given processing period) universe and sample information. Logical block 2 (similarity) may be associated with the similarity facility 180 or any and all other elements of the analytic platform 100 and may provide a base of similarity elements. It will be appreciated that store attributes may change over time and, therefore, similarity criteria may need to be refreshed from time to time, such as and without limitation at each production period. Logical block 4 (columns optimization) may be associated with populating the core information matrix 600 with fresh universe and sample information. Logical block 5 (row optimization) may be associated with computing IPF projected weights for core geographies based on data in the core information matrix.

The process depicted in FIG. 14 may comprise a set of activities that are needed, preferred, or optional to concretely compute projection factors, such as may be computed by the projection facility 178 in combination with any and all of the elements of the analytic platform 100. Key elements of this process may be completely, partially, or not automated and may employ or be associated with: optimizing the core information matrix, computing an information score, geography-projection association, and a projection computation. In embodiments any and all elements of the analytic platform 100 may be employed to implement the depicted figure. Processing flow may begin at logical block 6 where the results of similarity processing, column optimization, and row optimization are brought together in a calculation that optimizes the core information matrix. Processing flow continues to logical block 7, where an information score computation is conducted to produce a set of statistics about the quality of the core information matrix. The statistics may be stored for off-line review. Processing flow then proceeds to logical block 8, where quality characteristic requirements of the to-be-projected geographies are converted, translated, or otherwise applied to determine the projection types that may be used to produce the projections. Processing flow then continues to logical block 9, where projection factors are computed from the core information matrix 600 in accordance with the determined projections.

Logical block 6 (optimize info matrix) may correspond to a system or method for optimizing the core information matrix 600. Initially, the core information matrix 600 may be fed by sample stores that are selected in relation to their similarity/spillage characteristics with respect to the universe of non-sample stores. Row marginal and column marginal, which may be equal to each universe store's measure of size, may encompass constraints that are used to optimize the matrix 600. Logical block 7 (information score computation) may be associated with a system or method for computing a set of statistics about the quality of the core information matrix 600 and storing the statistics off-line for review by, for example and without limitation, a process owner. Logical block 8 (geography-projection association) may be associated with a system or method for identifying which projection factor for a geography provides the best fitting projection for a set of geography-projection quality targets. Logical block 9 (projection computation) may be associated with a system or method for computing a projection based on the type of projection is identified in logical block 8.

Referring again to FIG. 1, several types of data management challenges may be grouped into a class of problems known as similarity; which may be described as the problem of finding the commonalities or similarities within data structures. While there may be situations where data comparisons, fusions, combinations, aggregations and the like can be made directly (e.g. through an explicit reference to the same item name) there are many situations where there exist two things that are characterized by various attributes but where the attributes do not match. In such situations, in certain embodiments, a similarities facility 180 may be used to determine if the characteristics (e.g. the identified attributes in a fact or dimensions database) of the two things are close enough for the things to be called "similar." In embodiments, the similarities facility 180 may use a probabilistic based methodology for the determination of similarity. The probabilistic methodology may use input (e.g. user input or API input) to determine if the two things are similar within a certain degree of confidence and/or the probabilistic methodology may produce an indication of how likely the two things are to be similar. There are many processes that can be performed on the data once two or more things are determined to be similar. For example, data associated with the two things may be aggregated or fused together such that the information pertaining to the two things can be used as a projection of one whole. In certain embodiments, the similarity information may be used to generate new attributes or other descriptions to be associated with the thing being analyzed. For example, once a certain product is identified as similar to a certain class of products, data indicating such may be associated with the certain product. New attribute data may associated with an item and the information may be loaded into a dimensions database such that data associated with the item, and the item itself, can be used in projections or assessments.

A similarities facility 180 according to the principles of the present invention may be used to assess the similarity of products, items, departments, stores, environments, real estate, competitors, markets, regions, performance, regional performance, and a variety of other things. For example, in the management of retail market information, the similarity problem may manifest itself as a need to identify similar stores for purposes of projecting regional performance from a sample of, as the need to identify the competing or comparison set of products for any given item; as the need to identify similar households for purposes of bias correction; as the need to properly place new or previously unclassified or reclassified items in a product hierarchy; or for other projections and assessments. In another example, again from the retail industry, automated item placement may pose a problem. Often the current solution is labor intensive and may take from eight to twelve weeks for a new product to get properly placed within a store, department, shelf or otherwise. This delay inhibits the effectiveness of the analysis of new product introductions and in the tactical monitoring of category areas for a daily data service. However, these application sets need the product list to be up to date. In addition, the management of custom retail hierarchies may require that items from all other retailers in the market be placed inside that hierarchy, and often the structure of that hierarchy is not based on existing attributes. This may mean that the logic of the hierarchy itself must be discovered and then all other items from the market must be 'similarly' organized. In the current environment, this process takes months and is prone to error. In embodiments of the present invention, issues of similarity are automated using techniques such as rules-based matching, algorithmic matching, and other similarities methods. In the present example, the similarities facility 180 may be used to assess the similarity of the new product with existing products to determine placement information. Once the similar matches are made, new attributes may be added to the new product description such that it is properly grouped physically in the store and electronically within the data structures to facilitate proper assessments and projections.

The similarity of entities may be associated with the concept of grouping entities for the purpose of reporting. One purpose may be to codify the rules placing entities into a specific classification definition. Some examples of such specific classification definitions may be item similarity for use in automatic classification and hierarchy, venue similarity for use in projections and imputations, consumer similarity in areas like ethnicity and economics used for developing weighting factors, or the like.

There may be certain matching requirements used by the similarities facility 180 in the determination of similarity. For example, scenarios for matching similarity may involve determining similar items related to a single specified item, where the similarities engine is programmed to identify all the items in the repository that are similar to it with respect to some specific criteria (e.g. one or more attributes listed in the dimensions database). The similarities engine may also or instead be programmed to analyze a list of items, where all the items in the repository are similar to each of the items in the list with respect to some specific criteria. Likewise, the similarities facility 180 may analyze an item within a list of items, where group items are placed into classifications of similar items with respect to some specific criteria; or the like.

In embodiments, the similarities facility 180 may use a probabilistic matching engine where the probabilistic matching engine compares all or some subset of attributes to determine the similarity. Each of the attributes may be equally considered in the probabilistic evaluation or certain attributes may be weighted with greater relevance. The similarities facility 180 may select certain attributes to weigh with greater relevance and/or it may receive input to determine which attributes to weight. For example, the similarities engine may automatically select and disproportionately weight the attributes associated with 'scent' when assessing the products that it understands to be deodorants. In other embodiments, a user may determine which attributes or fields to disproportionally weight. For example, a user may determine a priority for the weighting of certain attributes (e.g. attributes within a list of attributes identified in a dimensions database), and load the prioritization, weighting or other such information into the similarities facility 180. The similarities facility 180 may then run a probabilistic matching engine with the weights as a factor in determining the extent to which things are similar.

An advantage of using probabilistic matching for doing similarity may be related to an unduplication process. The matching for unduplication and similarity may be similar. However, they may be based on different sets of attributes. For unduplication, all attributes may be used since the system may be looking for an exact match or duplicate item. This may work by matching a list against itself. In similarity, the system may be looking for items that are similar with regard to physical attributes, not the same exact item.

For two entities to be similar, they may have to be evaluated by a specific similarity measure. In most cases, they may have to be in the same domain, but this also may depend on the similarity measure that is used. The similarity measure that the system may use is the probabilistic matching of physical attributes of items, such as a deodorant keycat (or deodorant "key category"), where a keycat is a block of items that have a similar set of attributes. In this case, since the item may be a domain, and venue is a domain, an item may not be looked at as being similar to a venue.

The concept of similarity may be based on the similarity of the values of attributes that describe specific entities. This may involve developing similarity measures and the metadata to support them. The process may include deciding the purpose of the similarity; selecting the set of entities to be used in the similarity process; analyzing the characteristics (attributes and values) of each entity in the set of possible similar entitles; deciding which attributes will be used as part of the similarity measure; deciding on the priority and weight of the set of attributes and their values; defining the similarity measure; defining all the probabilistic weights needed to perform the similarity measure; defining the thresholds, such as automatic definite match, automatic definite non-match, or undecided match with human intervention; or the like.

The measure used may be the probabilistic matching of certain physical attributes. This may be associated with automatic record linkage. Types of matching may include individual matching that may be used for the single item scenario, where one file contains a single item and a second file contains a the master list of deodorants; many-to-one matching that may be a one-to-many matching of individual records from one file to a second file; single file grouping that may be for grouping similar items in a single list; geographic coding that may insert missing information from one file into a second file when there is a match, useful for adding new attribute information from external examples to the repository that does not currently exist; unduplication service that may identify duplicate items in a single list; or the like.

Weighting factors of each attribute and of the total composite weight of the match may be important aspects to take into account in the matching process. Since the system may use probabilistic matching, the frequency analysis of each of the attribute values may be taken into account. The weight of the match of a specific attribute may be computed as the logarithm to the base two of the ratio of m and u, where the m probability is the probability that a field agrees given that the record pair being examined is a matched pair, which may be one minus the error rate of the field, and the u probability is the probability that a field agrees given that the record pair being examined is an unmatched pair, which may be the probability that the field agrees at random. The composite weight of the match, also referred to as match weight, may be the sum of each of the matched attribute weights. Each matched attribute may then be computed. If two attributes do not match, the disagreement weight may be calculated as: $\log_2[(1-m)/(1-u)]$. Each time a match is accomplished, a match weight may also be calculated. Thresholds may be established to decide if this is a good match, a partial match, or not a match at all.

When doing probabilistic matching, different types of attributes may be needed, such as block attributes and match attributes. In this instance, block attributes may divide a list of items into blocks. This may provide a better performance on the matching. The block attributes may have to match before the block of items is examined. Two keycats may have similar attributes with different sets of attribute values. A value may be the information stored in a value fact of an attribute. There may be different types of attributes, such as global attributes across all keycats, keycat specific attributes, or the like. A category may also be used as a block. A category may be a classification of items made up of one to many different full or partial keycats.

Global attributes may be used across a plurality of keycats. Block attributes for the item domain may come from either the set of global or keycat specific attributes. Global attributes for the item domain may include keycat, keycat description, system, generation, vendor, item, week added, week completed coding, week last moved, price, UPC description, UPC 70 character description, US Item, maintained, brand code, company code, company name, major brand name, immediate parent company, top parent company, brand type, minor brand name, major brand short description, or the like.

Specific keycat attributes may not be common across keycats. There may be more descriptive attributes that a consumer would look at. Some of these attributes may be common across multiple keycats. Most of the keycat specific attributes may be used as match attributes. However, for each keycat, the most important keycat specific attribute may be used as a block attribute. The match attributes may be where the true match for similarity occurs. Examples of deodorant keycat attributes may include total ounces, total count, base ounces, store location, per unit ounce, product type, package, flavor, scent, strength, additives, form, or the like. The block and match attributes may be selected from a list of deodorant specific attributes, such as per unit ounce, product type, package, flavor, scent, strength, additives, form, or the like.

The similarity process for deciding if items in an item domain are similar may use a probabilistic matching engine, such as the IBM WebSphere QualityStage (QS). The process steps may include: extraction of the items from the item dictionary now and the new repository in the future, conversion of all volumetric attributes and defined attributes for the keycat into specific columns in a table using the long description as values, formatting the information into a fixed length column ASCII file, setting up a new project, entering the data file, mapping the data file columns, setting up and running an investigate stage to develop a frequency analysis of the values for each of the attributes that will be used in the match stage, setting up the block attributes from the list of deodorant specific attributes, or the like. Another process step may be associated with setting up and running a character concatenate investigate stage for each of the attributes, such as per unit ounce, product type, package, flavor, scent, strength, additives, form, and the like, that may be used in the matching process.

It should be appreciated that the probabilistic matching engine methodology is but one of the many methods that may be used within the similarity facility 180. Others methods may include, but are not limited to, time series similarity methods, attribute-based methods, spillage-based methods, information theory methods, classification trees, or some other similarity methodology, combination of similarity methodologies, or plurality of methodologies.

In embodiments, a data field may be dynamically altered to conform to a bit size or some other desired format. A record of the dynamic alteration may be tracked by the analytic platform 100 and stored in a database that may be accessed by other facilities of the analytic platform 100. In an example, a data field may relate to sales data. In order to, in part, reduce the processing time required to utilize the sales data as part of an analysis, the sales data field may be dynamically altered to conform to a desired bit size of, for example, 6 bits. Once this alteration is made, a record may be stored indicating that each sales datum in the sales field is a datum of 6 bits. Upon making an analytic query involving the sales field (e.g., “compute average sales by store”) the query may communicate with the stored data indicating the dynamic alteration of sales data to a 6 bit size format. With this information, the analytic query may process and analyze the sales data by reading the sales field in 6 bit units. This process may remove the need for the sales data to be associated with a header and/or footer indicating how the sales data is to be read and processed. As a result, processing speed may be increased.

In embodiments, the MDMH 150 may be associated with a partitioned database. The MDMH 150 may be further associated with a master cluster node that is, in turn, associated with a plurality of slave cluster nodes. Each partition of the partitioned database may be associated with a slave cluster node or a plurality of slave cluster nodes. Each slave cluster node may be associated with a mirror slave cluster node. The mirror slave cluster node may be used in the event of a node failure of the slave cluster node to which it is assigned to mirror. In an example, data, such as sales data, may enter the analytic platform 100 using a data loading facility 108. The sales data may be loaded with the causal fact extractor 110 and processed into a data mart 114 which may store the sales data within a partitioned database. In an alternate embodiment, the sales data mart may be processed by the MDMH 150 and the MDMH 150 used to create a portioned sales database. In this simplified example, the partitioned sales database may have two partitions, Partition One and Partition Two, each associated with one of the two stores for which sales data are available. Partition One may be associated with Slave Cluster Node One. Partition Two may be associated with Slave Cluster Node Two. Each slave cluster node may, in turn, be associated with a slave cluster node mirror that is associated with the same database partition as the slave cluster node to which it is a mirror. The MDMH 150 and the master cluster node may store and/or have access to stored data indicating the associations among the database partitions and the slave cluster nodes. In an example, upon receipt of an analytic query to summarize sales data for Store One, the master cluster node may command the Slave Cluster Node One (which is associated with the Store One sales data that is stored in Partition One) to process Store One's sales data. This command from the master cluster node may be associated with information relating to dynamic alterations that have been performed on the stored data (e.g., the bit size of each stored datum) to enable the slave node to accurately read the sales data during analysis. Similarly, the analysis may take place on a plurality of slave cluster nodes, each of which is associated with a database partition or plurality of database partitions.

In embodiments, the partitioned database may be updated as new data become available. The update may be made on the fly, at a set interval, or according to some other criteria.

In embodiments, the cluster-based processing may be associated with bitmap compression techniques, including word-aligned hybrid (WAH) code compression. In an example, WAH compression may be used to increase cluster processing speed by using run-length encoding for long sequences of identical bits and encoding/decoding bitmaps in word size groupings in order to reduce their computational complexity.

In embodiments, failover clusters may be implemented for the purpose of improving the availability of services which a cluster provides. Failover clusters may operate using redundant nodes, which may be used to provide service when system components fail. Failover cluster implementations may manage the redundancy inherent in a cluster to minimize the impact of single points of failure. In embodiments, load-balancing clusters may operate by having all workload come through one or more load-balancing front ends, which then distribute it to a collection of back end servers. Such a cluster of computers is sometimes referred to as a server farm. In embodiments, high-performance clusters may be implemented to provide increased performance by splitting a computational task across many different nodes in the cluster. Such clusters commonly run custom programs which have been designed to exploit the parallelism available on high-performance clusters. High-performance clusters are optimized for workloads which require jobs or processes happening on the separate cluster computer nodes to communicate actively during the computation. These include computations where intermediate results from one node's calculations will affect future calculations on other nodes.

Message passing interface (MPI) refers to a language-independent computer communications descriptive application programming interface (API) for message-passing on a parallel computer. MPI has defined semantics and flexible interpretations; it does not define the protocol by which these operations are to be performed in the sense of sockets for TCP/IP or other layer-4 and below models in the ISO/OSI Reference Model. It is consequently a layer-5+ type set of interfaces, although implementations can cover most layers of the reference model, with sockets+TCP/IP as a common transport used inside the implementation. MPI's goals are high performance, scalability, and portability. It may express parallelism explicitly rather than implicitly. MPI is a de facto standard for communication among the processes modeling a parallel program on a distributed memory system. Often these programs are mapped to clusters, actual distributed memory supercomputers, and to other environments. However, the principal MPI-1 model has no shared memory concept, and MPI-2 has only a limited distributed shared memory concept used in one portion of that set of extensions.

In embodiments, the analytic server may use ODBC to connect to a data server.

An ODBC library may use socket communication through the socket library to communicate with the data server. The data server may be cluster-based in order to distribute the data server processing. A socket communication library may reside on the data server. In an embodiment, the data server may pass information to a SQL parser module. In an embodiment, Gnu Flex and/or Bison may used to generate a Lexer and parser.

In embodiments, a master node and multiple slave nodes may be used in a cluster framework. A master node may obtain the SQL code by ODBC sockets and forward it to a parser to interpret the SQL sequence. Once the server has received SQL as part of a query request, MPI may be used to distribute the server request to slave nodes for processing. In embodiments, a bitvector implementation may be used.

In embodiments, retrieval may be facilitated based at least in part on representing the data as efficiently as possible. This efficiency may enable the data to be kept in memory as an in-memory database. In order to facilitate the process, data structures may be used that are small enough that they may be stored in memory. In an example, unlike a relational database, multiple record types may be used to allow minimizing the data size so that it may be kept in memory within a hardware implementation. Keeping the data within a hardware implementation may have the additional advantage of reducing the expense of the system. In embodiments, the cluster system may fit modestly sized hardware nodes with modest amounts of memory. This may keep the data near the CPU, so that one mustn't use file-based I/O. Data that is in the regular system memory may be directly accessed by the CPU.

In embodiments, a distribution hash key may be used to divide the data among the nodes.

In embodiments, the data may be partitioned by one dimension. In an example, an analyst may want to analyze a set of retail store data looking at which products are selling, taking into account the size of the store revenue in which they are sold. Store One may have $10M in revenue, Store Two $20M, and Store Three $30M. In this example, the analytic goal is to determine how well a brand of cola is selling relative to the size of the store in which it is sold. To accomplish this, one may analyze the total potential size and figure out how well a product is selling relative to the whole. However, this may be difficult because one may have to look across multiple time periods in which the product may be selling multiple times but only count it once. The use of a distinct sum or count operator may be expensive, especially in something that is in millions of records. Instead, this data may be partitioned by "venue" so that a venue only exists on one of the processing nodes. If all of a venue's data is processed on a unique node there is a reduced risk of double-counting, as the data only reside in a single location. On the other hand, if the data are distributed by venue and some other key, one might have data for the same venue located in multiple places. By partitioning by venue and associating each venue with an independent node, the venues may be added on the master node.

In embodiments, partitioning may be done within each node by certain dimensions in order to more efficiently access those data according to which data dimensions clients have used in the past. For example, data may be partitioned by venue and time, so that on any given processing node it is relatively easy to access particular sets of information based on venue and time dimensions. In embodiments, partitioning may be used as an implicit indexing method. This may simplify the process of analyzing wanted data without having to build an actual index.

In embodiments, cluster processing may be dynamically configurable to accommodate increases and/or reductions in the number of nodes that are used.

In embodiments, cluster processing may have failover processes that may re-enable a cluster by having a node take on the function of another node that has failed In embodiments, a threading model may be used for inter-processing communication between the nodes and the master. Posix threads may be used in combination with an MPI. In embodiments, multiple threads may run with one logical process and with separate physical processes running on different machines. A thread model may form the backbone of communication between processing elements. In an example, if there is a master and two slaves, there may be one physical process on the master and one on each slave node. An inbound SQL request may come into the master node and be intercepted by a thread that is using a socket. The thread may transmit to a master thread running on each slave process that creates threads that do actual analysis and, in turn, communicate to a listener thread on the master that passes information to a collator thread on the master. A new series of threads may be created for new thread arrival. The listener threads may be designed to look for information from a specific slave source. If a query comes into the system, a new collator thread may be created, a new worker thread created in each slave node, and information sent from each slave node to a listener on the master that passes information to the collator thread created for that query. The collator thread may then pass information back through the socket to the ODBC client. In embodiments, this system may be scalable. For every slave that is created, the system may create a new listener thread for that code.

In embodiments, inter-server communication may be done through MPI. Data server and client communication may be conducted using regular sockets. Each server may have data (its partition of information), so that each of the servers knows what information for which it is responsible. The collator may collate the partial results into a final result set.

In an example, ODBC may pass to a master node and a master thread in the master node's process. The SQL query may be translated into something the server can understand. Next, the master node may pass a thread to all nodes as part of a Query One. The first node may retrieve Store One data, and may add up a partial result and creates a data tuple that it communicates back to the listener for that slave node. The Second Node may do the same thing and communicate with its listener. Nodes with only Store Two (as opposed to Store One data) may do nothing. At the master node, the collator may add up the results from the two relevant listeners' results. Next, through socket communication, it may communicate the result through ODBC communication to the client. After that is accomplished, the collator thread and worker threads that performed the retrieval may be omitted. In embodiments, these transient threads may be associated with and used for a particular query.

In embodiments, a normalization scheme may be used in order to minimize the size of internal data structures.

Continuing to refer to FIG. 1, an interface 182 may be included in the analytic platform 100. In embodiments, data may be transferred to the MDMH 150 of the platform 100 using a user interface 182. The interface 182 may be a web browser operating over the Internet or within an intranet or other network, it may be an analytic server 134, an application plug-in, or some other user interface that is capable of handling data. The interface 182 may be human readable or may consist of one or more application programming interfaces, or it may include various connectors, adaptors, bridges, services, transformation facilities, extraction facilities, loading facilities, bindings, couplings, or other data integration facilities, including any such facilities described herein or in documents incorporated by reference herein.

As illustrated in FIG. 1, the platform 100 may interact with a variety of applications 184, solutions 188, reporting facilities 190, analytic facilities 192 and services 194, such as web services, or with other platforms or systems of an enterprise or external to an enterprise. Any such applications 184, solutions 188, reporting facilities 190, analytic facilities 192 and services 194 may interact with the platform 100 in a variety of ways, such as providing input to the platform 100 (such as data, metadata, dimension information, models, projections, or the like), taking output from the platform 100 (such as data, metadata, projection information, information about similarities, analytic output, output from calculations, or the like), modifying the platform 100 (including in a feedback or iterative loop), being modified by the platform 100 (again optionally in a feedback or iterative loop), or the like.

In embodiments one or more applications 184 or solutions 188 may interact with the platform 100 via an interface 182. Applications 184 and solutions 188 may include applications and solutions (consisting of a combination of hardware, software and methods, among other components) that relate to planning the sales and marketing activities of an enterprise, decision support applications, financial reporting applications, applications relating to strategic planning, enterprise dashboard applications, supply chain management applications, inventory management and ordering applications, manufacturing applications, customer relationship management applications, information technology applications, applications relating to purchasing, applications relating to pricing, promotion, positioning, placement and products, and a wide range of other applications and solutions.

In embodiments, applications 184 and solutions 188 may include analytic output that is organized around a topic area. For example, the organizing principle of an application 184 or a solution 188 may be a new product introduction. Manufacturers may release thousands of new products each year. It may be useful for an analytic platform 100 to be able to group analysis around the topic area, such as new products, and organize a bundle of analyses and workflows that are presented as an application 184 or solution 188. Applications 184 and solutions 188 may incorporate planning information, forecasting information, "what if?" scenario capability, and other analytic features. Applications 184 and solutions 188 may be associated with web services 194 that enable users within a client's organization to access and work with the applications 184 and solutions 188.

In embodiments, the analytic platform 100 may facilitate delivering information to external applications 184. This may include providing data or analytic results to certain classes of applications 184. For example and without limitation, an application may include enterprise resource planning/backbone applications 184 such as SAP, including those applications 184 focused on Marketing, Sales & Operations Planning and Supply Chain Management. In another example, an application may include business intelligence applications 184, including those applications 184 that may apply data mining techniques. In another example, an application may include customer relationship management applications 184, including customer sales force applications 184. In another example, an application may include specialty applications 184 such as a price or SKU optimization application. The analytic platform 100 may facilitate supply chain efficiency applications 184. For example and without limitation, an application may include supply chain models based on sales out (POS/FSP) rather than sales in (Shipments). In another example, an application may include RFID based supply chain management. In another example, an application may include a retailer co-op to enable partnership with a distributor who may manage collective stock and distribution services. The analytic platform 100 may be applied to industries characterized by large multi-dimensional data structures. This may include industries such as telecommunications, elections and polling, and the like. The analytic platform 100 may be applied to opportunities to vend large amounts of data through a portal with the possibility to deliver highly customized views for individual users with effectively controlled user accessibility rights. This may include collaborative groups such as insurance brokers, real estate agents, and the like. The analytic platform 100 may be applied to applications 184 requiring self monitoring of critical coefficients and parameters. Such applications 184 may rely on constant updating of statistical models, such as financial models, with real-time flows of data and ongoing re-calibration and optimization. The analytic platform 100 may be applied to applications 184 that require breaking apart and recombining geographies and territories at will.

In various embodiments disclosed herein, it may be noted that data may be stored and associated with a wide range of attributes, such as attributes related to customers, products, venues, and periods of time. In embodiments, data may be stored in a relatively flat structure, with a range of attributes associated with each item of data; thus, rather than requiring predetermined hierarchies or data structures, data may be associated with attributes that allow the user to query the data and establish dimensions of the data dynamically, such as at the time the data is to be used. Using such a flat data storage approach, various types of data associated with customers, products, venues, periods of time and other items can be stored in a single, integrated data source (which may of course consist of various instances of databases, such as in parallel databases), which can be used to support a wide range of views and queries. A user may, for example, determine the dimensions of a view or query on the fly, using, for example, any attribute as a dimension of that view. Rather than requiring a user to use a predetermined hierarchical data structure, with predetermined dimensions and a limited set of views, the methods and systems disclosed herein allow a user to determine, at the time of use, what views, dimensions and attributes the user wishes to employ, without requiring any particular data structure and without limitation on the views. Among other advantages, use of the flat data storage approach allows integration of data from disparate sources, including any of the sources described herein, such as data from point of sale terminals in stores, census data, survey data, data from loyalty programs, geographic data, data related to hierarchies, data related to retailer views of a market, data related to manufacturer views of a market, data related to time periods, data related to product features, data related to customers, and the like.

In an embodiment, a single database may be used to store all of the market data, customer data, and other market data for an enterprise. In an embodiment, there may be multiple instances of this database.

Once data is stored and attributes are identified, or tagged, a user may query the data, such as in relation to a desire to have a particular view of the data. For example, a user may wish to know what customers having a certain attribute (such as a demographic, psychographic or other attribute) purchased what products having a certain attribute (such as belonging to a particular category of product, having a particular feature, or the like) in what venue having a certain attribute (such as in a store of a particular type or in a particular geographic area) during a particular time period (such as during a week, month, quarter or year). The user may enter a query or select a view that provides the relevant data, without requiring the user to pre-structure the data according to the demands of that particular view. For example, a user might ask how many men between ages twenty-five and thirty purchased light beer in six-packs of twelve-ounce containers in convenience stores in the Chicago area during the first week in March, and the platform described herein will aggregate the data, using tagged attributes, to provide that view of the data; meanwhile, another user might ask how many men over age twenty purchased any kind of alcoholic beverage in stores in Illinois during the same time period. The latter query could be run on the same data set, without requiring a different structure; thus, by flat storage and formation of data views at the time of query, the methods and systems disclosed herein avoid the need for pre-structuring or hard coding of hierarchies of data and therefore may allow more flexible views of the data.

It may be noted, therefore, that greater flexibility may be provided to users than in conventional methods and systems for supporting market analysis. One advantage of the methods and systems disclosed herein is enabling collaboration among parties who have disparate views of the market. For example, a manufacturer of a product and a retailer for the product may have different views of a market for the same product. Taking a simple example, such as deodorant, the manufacturer may classify the products according to attributes such as target gender, solid versus stick, and scent, while a retailer might classify the same category according to brands, target age range, and category (e.g., toiletries). Historically, the manufacturer and retailer might collaborate as to the outcome of specific analyses of market behavior, but their having disparate views of the market has presented a significant obstacle to collaboration, because neither party is able to conduct analyses on the other's data sets, the latter being stored and manipulated according to specific views (and underlying hierarchies) that reflect the particular party's view of the marketplace. In embodiments, parties may access data, such as private label data, that is relevant to a category of a marketplace. With the methods and systems disclosed herein, underlying data may be tagged with attributes of both (or many) parties to a collaboration, allowing both (or many) parties to query the same underlying data sets (potentially with limits imposed according to the releasability or legal usability of the data, as described in connection with the granting matrix facility 120, 154, data sandbox 168, and other facilities disclosed herein). In addition, a mapping may be established between attributes used by one user and attributes used by another, so that a query or view preferred by a particular party, such as a retailer, can be mapped to a query or view preferred by another party, such as a manufacturer, thereby enabling each of them to share the same data set, draw inferences using the same underlying data, and share results of analyses, using the preferred terminology of each party in each case.

In embodiments, the methods and systems disclosed herein may include application programming interfaces, web services interfaces, or the like, for allowing applications, or users of applications, to use results of queries as inputs to other applications, such as business intelligence applications, data integration applications, data storage applications, supply chain applications, human resources applications, sales and marketing applications, and other applications disclosed herein and in the documents referenced herein. In other embodiments a user interface may be a very simple user interface, such as allowing the user to form queries by entering words into a simple text box, by filling boxes associated with available dimensions or attributes, by selecting words from drop down menus, or the like. In other embodiments a user may export results of queries or views directly to other programs, such as spreadsheet programs like Microsoft's Excel®, presentation programs such as PowerPoint® from Microsoft, word processing program or other office tools.

In embodiments, a user may select attributes, determine views, or determine queries using graphical or visualization tools. For example, geographic attributes of data, such as store locations, may be coded with geographic information, such as GPS information, so that data can be presented visually on a map. For example, a map may show a geographic region, such as the San Francisco area, with all stores having desired attributes being highlighted on the map (such as all grocery stores of a particular banner with more than ten thousand square feet in floor space). A user may interact with the map, such as by clicking on particular stores, encircling them with a perimeter (such as a circle or rectangle), specifying a distance from a center location, or otherwise interacting with the map, thus establishing a desired geographic dimension for a view. The desired geographic dimension can then be used as the dimension for a view or query of that market, such as to show store data for the selected geographic area, to make a projection to stores in that area, or the like. In other embodiments, other dimensions may similarly be presented graphically, so that users can select dimensions by interacting with shapes, graphs, charts, maps, or the like in order to select dimensions. For example, a user might click on three segments of a pie chart (e.g., a pie chart showing ten different brands of products of a particular category) to indicate a desire to run a query that renders views of those three segments, leaving out unselected segments (the other brands in the category). More complex visualizations may also be provided, such as tree maps, bubble charts and the like. In embodiments, users may embed comments in a visualization, such as to assist other users in understanding a particular view.

In embodiments, data may be presented with views that relate not only to data that has been collected about a market, but also other views along similar dimensions, such as views of a company's plan (such as a sales plan or marketing plan), as well as comparison of a plan to actual data, comparison of projections (such as based on data sets) to a plan, or the like. Thus, visualizations may include presentation of forward projections, such as along any dimension disclosed herein, including dimensions relating to attributes, such as customer, store, venue, and time attributes. In embodiments, sample data can be used to project the rest of the market along any selected dimension, such as a dimension relating to a particular attribute or cluster of attributes.

In embodiments, of the methods and systems disclosed herein, users may select clusters of attributes in order to produce specialized views, relevant to a wide range of business attributes. For example, users may group attributes of products, customers, venues, time periods or other data to create clusters of underlying data. For example, a cluster could relate to a product characteristic, such as related to a product claim or packaging information, such as amounts of carbohydrates, amounts of particular ingredients, claims of favorable health benefits, or the like. Thus, a user might see, for example, a time series of sales of products labeled "heart healthy" for a particular set of stores. A cluster might relate to a customer characteristic, such as a purpose of a shopping trip; for example, attributes might be used to generate clusters related to purchases for particular meals (a "breakfast" oriented trip, for example), clusters of purchases related to a particular trip (such as a major shopping trip, a trip for staples, or the like), or a wide range of other clusters. In embodiments, clusters may relate to venues, such as groups of geographies, groups of products sold in particular aisles or departments of stores, or the like. In embodiments, clusters may relate to products, such as groups of products of particular types, such as products by target gender, products by target age, products by physical characteristic, or the like. Clusters may, for example, relate to special packs of products, which may be tagged as being part of such packs. In embodiments clusters may include combinations of attributes, such as related to combinations of venue data, product data, customer data, time series data, geographic data, or the like. For example, a cluster may relate to products and to the time products were introduced, such as to show sales (or projected sales) of new products introduced in a given time period. Such a cluster may be used to track the success of innovation efforts by a manufacturer or retailer, such as compared to its own past efforts or as compared to efforts by other companies during similar time periods.

In embodiments, the methods and systems disclosed herein may allow use of attributes to generate cross-category views, such as trip views, aisle views, cross-store views, department views, and the like, including views that relate to both additive and non-additive measures.

In embodiments, attributes may be used as dimensions, filters, hierarchies or the like.

In embodiments, methods and systems disclosed herein may facilitate the generation of best-practices methodologies, such as methodologies relating to preferred views of customers, products, venues, geographies, time periods, or the like, such as determined by processes in particular industries.

In embodiments, similar attributes may be normalized across parties, to provide a normalized set of attributes, thereby diminishing the total number of attributes managed by the methods and systems disclosed herein. Such attributes may be included in a normalized attribute set, to enable improved collaboration among different parties who are users.

In embodiments, views may relate to aggregations of units within an organization, such as sets of stores, groups of business units or the like, such as in the context of mergers, acquisitions, or other combinations of business units. For example, stores may be tagged with attributes that allow generation of pre-merger and post-merger views, both of which may be used, rather than requiring the abandonment of one hierarchy in order to reflect a new hierarchy of an organization. Thus, a pre-merger set of stores may be aligned with a post-merger set of the same stores, thereby allowing consistent same store views, without impacting the ability to roll up financial results for the post-merger set of stores according to financial accounting purposes.

In embodiments, data from multiple retailers or manufacturers or data sources may be used to produce custom clusters of attributes, such as to provide cross-manufacturer, cross-retailer, or other custom views.

In embodiments, attributes may be used to create views of a market structure, such as relating to a marketing strategy of a company. Similar attributes may be used to create a view of a model of a market, such as a market mix model for a set of products. By using similar attributes for marketing strategy as well as execution of a marketing plan, with a common underlying data set, an organization can bridge the gap between the marketing strategy and its actual marketing activities, rather than their being a gap between the two.

In embodiments, attributes may be tracked to enable consistent analysis of attributes, dimensions, or clusters of attributes over time, such as to provide longitudinal analysis of market characteristics, as compared to ad hoc analysis currently used in market analytics.

In embodiments of the methods and systems disclosed herein, a platform 100 is provided for finding and exploiting growth opportunities on demand. The methods and system may include methods and systems for users to find, drive and exploit growth opportunities through integrated market and consumer intelligence and breakthrough insights, delivered continuously on-demand, with ease of use. Embodiments include facilities for data simplification; for example, one integrated database may be used for all market and consumer information, eliminating the hundreds of databases a large organization may use now. Embodiments may allow users to integrate across POS, panel, audit, shipments, and other data sources, at the most granular store/SKU level, enabling market and brand views on demand from global to store level, while simultaneously allowing global views of the marketplace as a whole.

In embodiments, the methods and systems disclosed herein may facilitate generation of ad-hoc business performance reports and analyses on demand from a single source of data.

In embodiments, the methods and systems disclosed herein may facilitate live interactive information access across all stores, categories, products and time periods 'at a click', across multiple manufacturer and retailer hierarchies and attributes. The methods and systems may eliminate the need to restate data or reestablish hierarchies in order to show a different view, thereby saving thousands of hours of time devoted to restating data.

The methods and system disclosed herein may allow users to define and project solutions and product clusters across categories on the fly, define and project custom store clusters on the fly, and define attributed-based opportunities on the fly.

In embodiments, methods and systems disclosed herein may be used to assist manufacturers, retailers and other parties in growing brands, such as by enabling use of integrated market intelligence using data from multiple sources. Historically users gain understanding of market and brand performance by commissioning market structure studies that drive strategies for brand growth. Often these drive brand growth strategies. Separately, users commission many different ad-hoc projects to do market mix models to support execution of brand plans. Since these two activities are not connected, actual brand performance often falls short of your strategic expectations and business plans. The methods and systems disclosed herein allow users to integrate market structure and market mix models to provide a closed loop from strategy to execution.

Matching the right products to the right consumer at the right time in the right place is a critical growth factor for businesses. The average consumer shops at a small number of stores, so matching the right channel to the right trip mission may be a growth opportunity for retailers and manufacturers. While manufacturers and retailers think about supply chains and categories, consumers think about needs, solutions and trips. There is a disconnect between how manufacturers and retailers think about markets and how consumers think about buying. The methods and systems disclosed herein enable a new kind of one-on-one consumer relationship, along one-on-one consumer targeting and marketing. Even if the execution of consumer strategies is not one on one, this precision targeting may drive growth in a variety of ways. Historically, it has been nearly impossible to integrate panel data, FSP data from multiple retailers, demographics data, and other sets of consumer data in one integrated database and model to create one integrated source of consumer intelligence. The methods and systems disclosed herein make it possible. Among other things, the methods and systems disclosed herein deliver integrated intelligence on-demand, relating to the buying behavior of, for example, 100 million consumers rather than just one hundred thousand panelists. The methods and systems disclosed herein provide shopper insights into buying behavior (e.g., share of-wallet and leakage) based on trip missions, consumer segments, neighborhoods, channels and stores, as well as other custom clusters of attributes. The methods and systems disclosed herein enable targeting of opportunities in growth micro-segments, such as relating to children, wellness, aging boomer diabetics, ethnic micro-communities, and the like. The methods and systems disclosed herein enable definition of the best shoppers to target for growth, in turn enabling one-on-one marketing to target customers.

In embodiments, the methods and systems disclosed herein may allow for improved collaboration between manufacturers and retailers. At one time, retailers depended on manufacturers for market and consumer intelligence, for insights, and for strategy. Those days are gone. Retailers today often have even better knowledge of consumers than manufacturers do and their use of analytics is at least as sophisticated; however, the two groups have different views of the marketplace. The differences start with different versions of the truth about market and category performance, complicated by different market definitions, changing retail configurations and different product hierarchies and views. The differences are further complicated by different approaches and different definitions of consumer segments, trip missions and neighborhoods. There are also differences in thinking about categories and assortments, as well as conflicts over private label data. Not, surprisingly, today's collaboration model between manufacturers and retailers has reached its limits, so manufacturers need a new paradigm for retail execution, and retailers need to take collaboration with manufacturers to the next level. This new paradigm will involve the sharing of more information including vast amounts of frequent shopper program and other consumer information, and market information down to the neighborhood and store level. The methods and systems disclosed herein can manage this vast amount of information and make it easier to use and analyze, on demand. Thus, in the methods and systems disclosed herein, manufacturers and retailers may navigate seamlessly between their different market definitions and product hierarchies. Each manufacturer-retailer pair may define a mutually agreed upon custom definition of, for example, trip missions, consumer segments and neighborhoods, and the like, on the fly. Each manufacturer-retailer pair may target specific shoppers for growth in basket and mindshare. Manufacturers and retailers may also define new solutions that drive growth across multiple categories. Manufacturers and retailers may also optimize assortments and space plans, and refine their category management processes and price/promotion plans around solutions, not just traditional categories.

In embodiments, the methods and systems disclosed herein may facilitate improvement in efforts to innovate, such as by helping target micro-markets and solutions. The traditional approach of targeting opportunities at the mega intersection of consumers, categories and channels has limitations. This is reflected in low success rates for new product launches. The reasons are not complex. Consumers are much more sophisticated and have too many choices, consumers address needs with solutions not categories, channels are blurring and many retailers are getting more specialized. New growth opportunities lie at the precise intersection of consumer micro-segments, trip missions and neighborhoods. The methods and systems disclosed herein allow users to draw insights at intersections of conventional dimensions, such as, for example, kids' wellness (reflecting an age dimension and a dimension of purpose). Traditionally, a custom intersection would take months to develop, requiring recoding of hierarchies of data. With the method and systems disclosed herein, such a custom intersection of data with attributes such as relating to "kids" and "wellness" can be created on the fly. Thus, in embodiments a user can, for example, target micro-brands or segments, such as healthy pizza. The methods and systems disclosed herein thus enable discovery at the intersection of pizza as a category and wellness attributes across multiple categories competing for the same shopper dollar. The methods and systems disclosed herein also allow users to target micro-consumer segments, e.g., aging boomers with diabetes. The methods and systems disclosed herein also allow users to target trip missions, such as breakfast, baby, or pet-oriented trips. The methods and systems disclosed herein may allow users to connect the dots between trips, micro-segments and categories. The methods and systems disclosed herein may also allow users to target solutions or packages, such as crackers and cheese, cookies and tea, salad (vs. salad dressing) and the like. The methods and systems disclosed herein may also allow on-demand assembly of new solutions from multiple categories, each of which previously had to be treated as a silo. In addition to illuminating new growth opportunities, the methods and systems disclosed herein may also allow users to improve launch performance and success in a variety of ways, from real-time monitoring and prediction of launch performance to the ability to measure trial and repeat across channels and banners to the remedial targeting of distribution voids.

The methods and systems disclosed herein may also allow users to operate a consumer-driven enterprise. Historically, enterprises focus on transactional, supply-chain oriented data, in which hundreds of millions have been spent on transactional systems like SAP and Oracle. Enterprises suffer from decision arthritis triggered by bottlenecks in market and consumer intelligence and slow and suboptimal project-driven ad-hoc approaches to analytics and insights. Breakthrough insights are rare in such an organization, and when they happen they are often too late. Methods and systems disclosed herein may allow a customer-driven enterprise that transforms its key market and consumer-facing processes to seek and exploit growth opportunities. A user can access market and consumer intelligence on demand to make the best decisions rapidly. The enterprise may embed insights in every process, plan and decision. Such a customer driven enterprise may use methods and systems disclosed herein as a decision framework, with flexible access to custom views of all of its data, built as needed on the fly, without the expense of custom aggregation projects.

In an embodiment, a content and solution platform 188 and an analytic platform may provide scalability and flexibility to support solutions for industries such as consumer goods, retail, and the like.

In an embodiment, the content and solution platform 188 enables flexible retail store clustering, maintenance of multiple concurrent retailer hierarchies, retailer specific hierarchies based on retailer attributes such as price zones, integrated same store sales analysis across any set of periods, non-traditional retail store hierarchies and groups such as those aligned with a distributor territory, quick adaptation of retailer hierarchies based on retailer M&A actions, support for multiple projection methods, and the like. The content and solution platform 188 overcomes the problems faced by traditional systems in processing and managing market and consumer data such as suffering from inherent restrictions due to fixed data structures and hierarchies. As the retailer landscape evolves with emerging new channels and continued M&A activities, there may be a constant need to update to the latest view to the retailer structure. In addition, merchandising shifting to a more granular level may require more sophisticated and granular store clustering. The improved data flexibility enabled by the content and solution platform 188 may eliminate restatements in the traditional sense.

In an embodiment, the content and solution platform 188 may enable rapid cross-category views where data scope is not limited by a particular database, multiple product hierarchies which may be based on any combination of item attributes, quick adaptation of product structures to recent brand acquisitions or for initial hypothetical analysis, and the like. The content and solution platform 188 may overcome the problems faced by traditional systems being limited by a small number of dimensions applied to a predefined, relatively small subset of data rendering effective analysis of market and consumer data a more complex and time consuming task than necessary.

In an embodiment, the content and solution platform 188 may enable extensible product attribute analysis. Product attributes may enable analysis of consumer behavior and competitive performance. The content and solution platform 188 may enable an expanded set of standard attributes, across categories, for interactive data filtering, and selection. Attributes may also be used to generate flexible hierarchies. The content and solution platform 188 may also enable support for adding client specific and custom attributes to support specific analysis type or for specific projects with significantly reduced time delay and complexity to incorporate such new attribute data into the analytic platform. The content and solution platform 188 also enables multiple ways to use attribute information for data ad-hoc reporting and analysis, such as dynamic multi-column filter and sort, attributes as measures, use attributes to generate product hierarchies, attributes as dimensions for cross-tab reporting, and the like. Thus, the content and solution platform 188 may overcome the problems faced by traditional systems being limited in the number and flexibility of adding new attributes and the use of such attributes for effective analysis.

In an embodiment, the content and solution platform 188 may enable comprehensive data integration. Data integration may enable effective viewing of total market performance, and close alignment with internal enterprise systems. The content and solution platform 188 may enable an open data architecture that may allow for data alignment and integration at several points along the data processing flow, such as at a data source, as a web service, as a data query, at the user interface level, and the like. The content and solution platform 188 may also enable a flexible deployment model which supports both a content-platform-hosted model and an enterprise based model. The content and solution platform 188 may also enable an extensible data platform based on open modern standards. The extensible data platform may provide a cost effective platform for market and consumer data, even as enterprise systems evolve. The content and solution platform 188 may overcome problems faced by traditional systems for market and consumer data which may be relatively proprietary and closed, with few ways of easily integrating external data.

In an embodiment, the content and solution platform 188 may enable rapid data updates. Traditional data restatements may be eliminated. The content and solution platform 188 may provide support for multiple data updates, such as monthly, weekly, and daily data updates the next day. The content and solution platform 188 may provide support for faster updates to data structures, such as changing or adding hierarchies, adding attributes, adding measures, and the like. The content and solution platform 188 may overcome problems faced by traditional systems suffering from weeks or more of delay to process, cleanse and aggregate market and consumer information.

In an embodiment, the content and solution platform 188 possesses features that enable data access and reporting. Content platform features may include on-demand and scheduled reports, automated scheduled report delivery, multi-page and multi-pane reports for guided analysis, interactive drill down/up, swap, and pivot, dynamic filter/sort/rank and attribute filtering, conditional formatting and highlighting, on-the-fly custom hierarchies and aggregates, calculated measures and members, built-in chart types, interactive drillable charts in 100% thin client UI, data export to spreadsheet and presentation software or files with single click refresh capability, integrated alerts with optional email delivery, folders for organizing links and documents, multi-user collaboration and report sharing, printing and export to HTML, PDF, spreadsheet files, and presentation files with configurable print templates, dashboards with summary views and graphical dial indicators, publication and subscription of reports and dashboards, and the like.

In an embodiment, the analytic platform 100 comprises a store clustering facility. The store clustering facility enables merchandising planning and retailer execution at a granular store cluster level. The store clustering facility may provide for ways to create store groups independent from traditional retailer trading areas. Clusters may be defined using demographic attributes, retailer-specific store groups, competitive attributes, and the like. The store clustering facility may enable users to quickly define additional clusters based on a combination of existing and new store attributes. The store clustering facility may enable retailers and manufacturers to jointly develop improved merchandising plans adapted to neighborhood level household and competitive characteristics.

The store clustering facility may include a set of pre-built store clustering methods. Store clustering methods may be used individually or in combination. A store clustering method may be based on a "Micro Trading Area". "Micro Trading Area" clusters may be store clusters based on micro markets below the traditional retailer trading areas. "Micro Trading Area" clusters may enable adaptation of merchandising strategies to real-world variations in store household demographics and market conditions. A store clustering method may be based on competitive stores. Competitive store clusters may be based on the actual competitive situation on a store-by-store level. For example and without limitation, such clustering analysis may be for stores of Retailer A relative to a minimum distance from stores of Retailer B. A store clustering method may be based on a household demographic. Household demographic clusters may be based on demographic attributes for households located within a specified driving distance from each store. A store clustering method may be based on a performance. Performance clusters may be based on retail store performance, such as declining stores, growing stores, and the like. A store clustering method may be based on a retailer attribute. Retailer attribute clusters may be based on retailer provided store group attributes, such as price or ad zones. Store clustering may be flexible. The store clustering facility may support store clustering on a broad set of store attributes. Multiple clustering versions may be compared side-by-side. Clusters may be updated quickly without lengthy data restatement or rework. Users may quickly drill down from clusters to store-level information, for example, with retailers that provide census level information.

The analytic platform 100 may comprise a new product tracking facility. The new product tracking facility may deliver automated tracking of new products on a periodic basis. The new product tracking facility may include benchmarking metrics of new products versus the category, across retailers, across competitive products, and the like. The new product tracking facility may also incorporate consumer-level information to bring further insights to underlying shopping behavior for new products, such as trial and repeat. The new product tracking facility may include a set of pre-built reports and analyses. Trend analysis may comprise advanced performance benchmarking based on adjusted product sales rate versus a category index. Trend analysis may be performed on a periodic basis after launch. Trend analysis may assist in establishing sales profiles for launch and for end-to-end product lifecycle. Trend analysis may enable comparisons in launch characteristics for different categories and types of new products, such as line extensions versus new brands. Competitive benchmarking may comprise comparing new product performance versus a competitive set. Competitive benchmarking may enable monitoring a competitive response and an action result. Market and retailer benchmarking may comprise comparing new product performance across different markets, channels, retailers, and the like. Market and retailer benchmarking may identify chronic performance issues and opportunities. Market and retailer benchmarking may establish fact-based new product launch profiles for product planning. Product portfolio analysis may comprise comparing new product performance versus distribution to identify opportunities for rebalancing product portfolio and sales and marketing investments. Driver analysis may comprise comparing new product performance with concurrent price, promotion, and advertising activities to enable faster course correction and more optimal marketing spend. The new product tracking facility enables relative time product analysis by incorporating automated processes for benchmarking products along a relative time scale, such as weeks since launch, for improved analyst productivity. The new product tracking facility enables effective performance benchmarks. The index metrics in the new product tracking facility may enable analysis and adaptation to differences across markets, retailers, categories, and the like. The new product tracking facility may be deployed on both United States and European Union retail and consumer data, to provide a consistent global framework for brand and new product performance benchmarking. The new product tracking facility may be extended by integrating internal sales plans/targets to enable closed-loop tracking of plan-versus-actual performance for new products.

In an embodiment, the analytic platform 100 comprises a shopper insight facility. The shopper insight facility enables automated in-depth analysis of shopper buying behavior, loyalty, baskets, share of wallet, channel switching, incorporating trip types, retailers, shopper demographics and segments, and the like. The shopper insight facility may perform analyses rapidly. The shopper insight facility may be based on granular disaggregated analytic platform household panel data. The shopper insight facility may comprise a multi-dimensional analysis model enabling quick reporting and data mining across several key dimensions, including many demographics and segmentation variables. The shopper insight facility may include a set of pre-built reports and analyses. Loyalty analysis may enable understanding of consumer loyalty metrics and share of wallet for consumers and specific retailers at a granular level. Demographics analysis may enable understanding of primary demographics attributes and life stage segments influencing product sales. New product sell in analysis may quickly develop fact-based business cases adapted to specific retailers to support introducing new items. Leakage and channel switching analysis may enable understanding consumer shopping behavior across retailers and across channels and analysis of revenue risk and/or sales potential. Trip type analysis may enable understanding shopper trip type mix across key shopper segments to help fine tune retailer specific merchandising actions. The shopper insight facility may facilitate ad-hoc analysis for new business questions. The shopper insight facility may facilitate understanding consumer behavior per retailer, more actionable insights by integrating trip type and segmentation information and expanded use of shopper group and buyer group segmentation, and maximum return on investment due to its simplicity, adoptability, and pre-built analyses and reports.

In an embodiment, the analytic platform 100 comprises a consumer tracking and targeting facility. The consumer tracking and targeting facility may provide consumer data integration for in-depth behavior analysis, and targeting at the individual household level detail. The consumer tracking and targeting facility may apply data fusion methods to integrate disparate consumer data sources supported by a comprehensive household and store master. The methodology may improve tracking of channels with limited coverage, such as with certain retailers. The consumer tracking and targeting facility may provide a more accurate profiling of individual stores based on actual household demographics within a local trading area, incorporating real-world considerations such as multi-store competitive effects and shopper store preference for different categories. The consumer tracking and targeting facility may be based on a comprehensive base of a large number of households and a complete store list. The consumer master includes an extensive set of demographic and purchasing behavior attributes, and several derived segmentations, such as life stage. The store list may include both grocery retail stores and other stores. The consumer tracking and targeting facility may implement consumer data fusion methodology for mapping and statistical data fusion across different types of consumer data, resulting in increased data accuracy, reduced sample bias, extended data scope, and the like. The consumer tracking and targeting facility may enable consumer tracking. The integration across multiple data sources enables a comprehensive view of total consumer behavior, with the ability to include a broader set of demographic and economic attributes to identify effective consumer clusters in each market. The consumer tracking and targeting facility may enable consumer targeting. The resulting analyses and segmentation may be linked directly to individual households for highly accurate targeting and direct to consumer marketing. The consumer tracking and targeting facility may enable extensibility to new data sources. The consumer tracking and targeting facility is built on an open and extensible data platform to allow for rapid inclusion of additional consumer data, such as client managed consumer surveys or specialized consumer panels. The consumer tracking and targeting facility enables comprehensive consumer and store models by relying on continuously updated information for up-to-date trend analysis of ethnicity and population. The consumer tracking and targeting facility enables integration of multiple consumer data sources. The consumer data fusion methodology enables integration of multiple sources of consumer data, including Frequent Shopper Data, Household Panel data, Shopper Survey Data, and the like. The consumer tracking and targeting facility enables more actionable insights. Granular household information supports precise household level targeting, to feed tactical merchandising processes and systems for neighborhood-level strategies in assortment, pricing, and promotion actions.

In an embodiment, the analytic platform 100 comprises a sales performance facility. The sales performance facility may enable detailed analysis of revenue and sales team performance. The sales performance facility may be aligned with the sales organization structure. The sales performance facility may include a set of pre-built reports and dashboards for key user groups such as Sales Executives, Regional Sales VPs, National Account Managers, and the like. The sales performance facility may be a foundation for automated sales operations tracking and benchmarking, using periodic retail sales information. The sales performance facility may enable key sales performance benchmarks and analysis of key performance metrics, such as Periodicity Benchmarks, Category Benchmarks, Account Benchmarks, Same Store Sales, Geography/Territory Benchmarks, Special Event/Holiday Benchmarks, and the like. The sales performance facility may enable sales performance monitoring to provide sales performance insights for each stakeholder. Sales performance insights may include Plan Tracking, Product Snapshot, Sales Report Card, Account Snapshot, Geography Snapshot, and the like. The sales performance facility may enable sales performance evaluation and detailed analysis for each stakeholder, such as Performance Ranking, Leader Report, Laggard Report, Performance Analysis (Sales Decomposition), Category Review, Account Review, and the like. The sales performance facility may enable sales plan projections based on current sales rates and trends. Sales plan projections may include Projected Sales by Product, Projected Sales by Account, Projected Sales by Geography, Projected Sales Performance Ranking, and the like. The sales performance facility may include a business rule driven dashboard for quick identification of areas and key performance indicators requiring attention. The sales performance facility provides a flexible sales organization model. Users may add multiple sales organization structures as the sales organization or the retailer organization evolves. Reports and metrics may be immediately updated. The sales performance facility provides a same-store sales analysis method and pre-built performance metrics for effective comparative analysis, such as versus category, versus competition, versus previous periods, and the like. The sales performance facility provides rapid automated data updates. Data, reports, and dashboards may be automatically updated periodically, such as weekly. The sales performance facility may be extended by integrating internal sales plans/targets to enable closed-loop tracking of plan-versus-actual performance.

In an embodiment, the analytic platform 100 comprises a total market integration facility. The total market integration facility may enable companies to establish a comprehensive view of total market performance, across geographies, and across channels. The total market integration facility may extend the analytic platform's ability to integrate information across disparate retailer sources, such as a convenience store, a wholesaler, and a grocer. The total market integration facility integrates enterprise shipment and inventory data. Similar methods apply for major global retailers. The total market integration facility addresses the "difficult" areas involved with large-scale market data integration, such as attribute-based data mapping, data alignment, service-based integration with enterprise systems, and the like. The total market integration facility may comprise a comprehensive product and store master dictionary. The comprehensive product and store master dictionary may comprise 30+ millions of items sold in the retail/consumer packaged goods industry. The data may include a set of attributes for effective marketing and sales analysis. The dictionary and its uses may be similar for Store master data. The total market integration facility may comprise integration tools to connect to a broad set of data sources and data structures for commonly used data sources, such as from major United States retailers. The total market integration facility may enable automated data mapping and matching, a configurable attribute-based mapping and enrichment of data from multiple data sources using web based tools. The total market integration facility may comprise flexible deployment architecture which may support implementation in an analytic platform-hosted model, an on-site enterprise model, or various hybrid models. The total market integration facility may comprise multiple data access methods. The total market integration facility may offer multiple methods of data access including: built-in reporting tools, web services SOAP/XML, MS Office integration, batch CSV file extraction, and the like. The total market integration facility provides automated item mapping and matching to streamline day-to-day data cleansing, alignment and mapping using the comprehensive product and store master dictionary data combined with automated data matching/mapping tools. The total market integration facility provides global total market integration to enable quick integration across multiple channels and multiple countries to increase productivity for analysts and sales and marketing support functions. The total market integration facility provides integration of client data sources. The total market integration facility provides flexible data to align market data to effectively integrate with internal enterprise systems. The total market integration facility may be extended by integrating internal sales plans/targets to enable closed-loop tracking of plan-versus-actual performance.

The analytic platform 100 may provide for a plurality of solutions 188 for CPG companies. Key CPG business process views may incorporate the various components of a business, such as marketing, sales, operations, or the like. The use of analytic platform solutions 188 may provide CPG businesses with increased performance, such as new product performance, sales performance, market performance, or the like, through the delivery of effective services and deliverables. Conceptual models and solution 188 structures for the aggregation, projecting, and releasing of post processed data may provide CPG companies with effective solutions 188 that improve their profitability and market share.

The analytic platform 100 may provide for a plurality of components, such as core data types, data science, category scope, attribute data, data updates, master data management hub 150, delivery platform, solutions 188, and the like. Core data types may include retail POS data, household panel data, TRV data, model data stores, CRX data, custom store audit data, or the like. Data science may include store demo attribution, store competition clustering, basic SCI adjustment, Plato projections, releasability, NBD adjustment, master data integration methods, or the like. Category scope may include review categories, custom categories, a subset of categories, all categories, or the like. Attribute data may include InfoBase attributes, Personix attributes, Medprofiler attributes, store attributes, trip type coding, aligned geo-dimension attributes, releasability and projection attributes, attributes from client specific hierarchies, web attribute capture, global attribute structure and mapping, or the like. Data updates may include POS, panel, store audit, or the like. Master data management hub 150 may include basic master data management hub 150 system, attribute cleaning and grouping, external attribute mapping, client access to master data management hub 150, or the like. Delivery platform may include new charts and grids, creation of custom aggregates, enhanced scheduled report 190 processing, solutions 188 support, automated analytic server model building, user load management, updated word processing integration, fully merged platform, or the like. Solutions may include sales performance, sales and account planning, neighborhood merchandising, new product performance, new product planning, launch management, enhanced solutions, bulk data extracts, replacement builders, market performance solution, market and consumer understanding, price strategy and execution, retailer solutions, or the like.

CPG company key business process views may be addressed by the analytic platform, such as in marketing, sales, operations, or the like. Within these business process views may be included various efforts, such as strategic planning, consumer and brand management, new product innovation, supply chain planning, sales execution, demand fulfillment, or the like. Within consumer and brand management process there may be a plurality of components that are associated with market performance solutions 188, such as consumer and category understanding, brand planning, marketing and media strategy, price strategy and execution, or the like. Within new product innovation processes there may be a plurality of components that are associated with new product performance solutions 188, such as new product planning, idea generation, product development, package development, launch management, or the like. Within sales execution processes there may be a plurality of components that are associated with sales performance solutions 188, such as sales and account planning, sales force management, neighborhood merchandising, trade promotion management, broker management, or the like.

The analytic platform 100 may provide for a plurality of solutions 188, such as new product performance solutions, sales performance solutions, market performance solutions, or the like. New product performance solutions 188 may provide CPG brand and new product organizations with advanced performance planning and analysis capabilities. Sales performance solutions 188 may provide CPG sales organizations with advanced sales performance planning and analysis capabilities to drive improved sales execution at the store level. Market performance solutions 188 may provide CPG market research and analyst organizations with advanced market analysis and consumer analysis capabilities with superior integrated category coverage and data granularity in a single high performance solution 188.

New product performance solutions 188 may include new product planning, such as portfolio analysis, product hierarchies, product attribute trend analysis, new product metrics, track actual vs. plan, forecast current sales, identify and monitor innovation type attributes, predict sales volume, integrate promotion and media plans, or the like. New product performance solutions may also include launch management, such as tracking sales rate index, new product alerts, product success percentile and trending, tracking trial and repeat performance, sales variance drivers analysis, relative time launch-aligned view, rapid product placement process, tracking trial and repeat, or the like.

Sales performance solutions 188 may include sales and account planning, such as sales account planning, tracking actual vs. planning, key account management, sales organization model mapped vs. retailer stores, sales team benchmarking, enhanced planning data entry UI, forecasting current quarterly sales, integration of trade promotion plans, alignment of sales vs. brand team plans, or the like. Sales performance solutions may include neighborhood merchandising, such as competitive store clusters, demographic store clusters, sales variance drivers analysis, same store sales analysis, assortment analysis workflow, or the like.

Market performance solutions 188 may include consumer and retail data, providing such as cross-category analysis, cross-category attribute trends, multi-attribute cross tab analysis, total market view, shopper segments, trip type analysis, Medprofiler integration, client-specific attributes, replacement builders, or the like. Market performance solutions may include price strategy and execution, such as store-level price analysis, additional strategy execution, or the like.

Analytic platform solutions 188 may have deliverables, with solution components such as solution requirements, core analytic server model, analytic server model extension, workflows and reports, sales demonstrations, summit demonstrations, additional demonstration data, sales and marketing materials, user interaction modes, solution deployment, end user documents, data and measure QA, PSR testing, or the like. Solution deliverables may include client solutions, such as new product performance, sales performance, market performance, or the like, which may include a number of elements, such as process scope, specifications, new product plans, sales data sheets, or the like. Solution deliverables may also include core models solutions, such as POS models, panel models, or the like.

The conceptual model and solution 188 structure for the analytic platform 100 may include a flow of data through the system. Starting data may include point of sale data, panel data, external data, or the like. This data may flow into client model and access definition, and be associated with the analytic platform's master data management hub 150. Data may then be accumulated as client-specific analytic server 134 models, such as POS models, panel models, or the like, and distributed through the shared delivery server infrastructure, which may be associated with a security facility. Solution-specific analytic server 134 models may then be delivered, such as by market performance, new product performance, sales performance, to internal users, or the like.

The analytic platform 100 may provide a bulk data extract solution 188. In this solution, data may initially flow from the analytic platform 100 to a plurality of modeling sets. A data selector may then aggregate data for bulk data extraction into analytic solutions and services. Components of the bulk data extraction solution may include manual bulk data extraction, specific measure set and casuals, enabled client stubs, custom aggregates for product dimension, incorporation of basic SCI adjustments, adding additional causal fact sets, batch data request API, incorporation of new projections, or the like.

The analytic platform 100 may provide solutions 188 relating to sales performance using a plurality of forecasting methodologies. For example, solutions may be based on a product brand where each financial quarter is forecasted independently. Sales performance forecasting may include, but is not limited to, volume sales, dollar sales, average price per volume, plan volume sales, plan dollar sales, actual vs. plan sales, actual vs. plan percentage, forecast volume sales, forecast dollar sales, forecast vs. plan, forecast vs. plan percentage, trend volume sales, trend dollar sales, trend vs. plan, trend vs. plan percentage, revised volume sales, revised dollar sales, revised vs. plan, revised vs. plan percentage, or some other information. Forecast may equal Actual Sales|Past Time+Plan Sales|Future time. Trend may equal Actual Sales|Past Time+(QTD Actual/QTD Plan)*Plan Sales|Future Time. Dollars, as used in the solution(s), may equal Volume*QTD Average Price per Volume.

Household panel data may be implemented on the analytic platform 100 and related analytic server 134. This data may support several solutions 188, including the ability for clients to analyze household purchase behavior across categories, geographies, demographics and time periods. The solution may include a broad set of pre-defined buyer and shopper groups, demographic and target groups. In embodiments, the analytic platform 100 may provide a solution for flexible shopper analysis based on disaggregated household panel data. Household panel data may include 2×52 week Static Panel groups. A household panel data set may be updated on quarterly basis, monthly basis, or some other time frame. Household demographic attributes may be set up as separate dimensions. Further demographic dimensions may be added without need for data reload or aggregation. Pre-aggregations of data via ETL may be minimized. Product attributes may be used to create product groups. Updates to the data and analytic server models may be made when new categories are added and/or new data becomes available. Product, geography and time dimensions may be consistent with that for the analytic platform POS Model. Similar measures for POS and panel data, such as Dollar Sales may be aligned and rationalized to permit the use of the best possible information source that is available.

In embodiments, the household panel data implemented on the analytic platform 100 and related analytic server 134 may include a product dimension. The product dimension may include an initial 100+ categories (e.g., similar categories as that loaded for POS Analytic platform). Household data may include 2 years data (2×52 week periods)—52 week static panel groups, Calendar Year 2005 and Calendar year 2006, and the like. Venue group dimensions may include US total, channels, regions, markets, chains, CRMAs, RMAs, and the like. A venue group may be associated with releasability attributes. Household projection weights may be used for each Venue Group. A time dimension may be used, and may include timeframes such as quad-week, 13-week, 26-week, and 52-week, and the like. The day of week may be a dimension. Other dimensions that may be used include a casual dimension, periodicity dimension, measures dimension, filter dimension, product buyer dimension, shopper dimension, demographics dimension, trip type dimension, life stage dimension, or some other type of dimension. A filter dimension may comprise a sample size control that is based on the number of raw buyers. A product buyer dimension may be pre-defined as category and subcategory buyers as well as top 10 Brands (or less where needed) per each category or the like. A shopper dimension may be pre-defined for all releasable US Retailers—for both "core" and "shoppers." A demographics dimension may include a set of standard household demographics (e.g., as provided by household panel data) and include detailed (i.e. Income) and aggregated (i.e. Affluence) demographic variables. A life stage dimension may include third party life stage/lifestyle segmentations (for example, Personicx). MedProfiler data may be used. In embodiments, other panel data may be used, including, but not limited to, third party attributes such as consumer interests/hobbies/religion (for example, from InfoBase). Trial and repeat measures may be used. POS crossover measures may be used. Quarterly updates of transaction data and related projection weights may be used. Household Loyalty groups may be used, for example, new, lost, retained buyers and shoppers, channel shoppers and heavy channel shoppers, standard shopper groups, and the like. Combination groups may be used (e.g., based on product and retailer combinations). Customizations may be used (e.g., custom product groups, custom demographic groups, and custom household/venue groups). Frequent shopper program data integration and NBD adjustment may be used.

In embodiments, the solution model for the household panel data may be aligned with dimension structures for the POS analytic platform model, including time, geography, and product dimensions. The household panel model may use a geography model structure consistent with the POS analytic platform. The overall venue group structure may support a multi-outlet scope of household panel data. The leaf level within the geography structure may be linked to a set of projected households.

In embodiments, a measures dimension may be projected by using the geography weight for the selected geography level. For example if "Detroit" is selected as the geography, the household market weight may be used to project measure results. Measure dimensions may include, but are not limited to, percentage of buyers repeating, percentage of household buying, buyer share, buyers-projected, loyalty dollars, loyalty units, loyalty volume, dollar sales, dollar sales per 1000 households, dollar sales per buyer, dollar sale per occasion, dollar share, dollar share L2, in basket dollars per trip, out of basket dollars per trip, price per unit, price per volume, projected household population, purchase cycle—wtd pairs, purchase occasions, purchase occasions per buyer, trip incidence, unit sales, unit sales per 1000 households, unit sales per buyer, unit sales per occasion, unit share unit share L2, volume sales, volume sales per 1000 households, volume sales per buyer, volume sales per occasion, volume share, volume share L2, dollars per shopper, dollars per trip, retailer dollars, retailer shoppers, retailer trips, shopper penetration, trips per shopper, buyer index, distribution of buyers, distribution of dollar sales, distribution of panel, distribution of shoppers, distribution of unit sales, distribution of volume sales, dollar index, shopper index, unit index, volume index, buyer closure, buyer conversion, trip closure, trip conversion, buyers-raw, shoppers-raw, transactions—raw, or some other type of measure dimension.

In embodiments, a time dimension may provide a set of standard pre-defined hierarchies. A household panel solution may use the same time dimension structure as a POS analytic platform solution. A time dimension may be derived from transaction data.

In embodiments, a trip type dimension may be based on the trip type attribute associated with each basket. Trip types may be independent of life stage or household demographics dimensions. In an example, trip Types may be organized in a two-level hierarchy—with 4 major trip types, and 5-10 sub types for each.

In embodiments, a life stage dimension may be based on a life stage attribute per each household derived, for example, from the Acxiom third party lifestage/lifestyle segmentations, database, such as Personicx. A life stage dimension may be independent of other household demographics dimensions. In an example, life stages may be organized in two-level hierarchy—with 17 major groups, and sub types for each.

In embodiments, demographic dimensions may be collections of households by a demographic characteristic. A solution may support dynamic filtering of any combination of demographic dimensions. Additional demographic variables may be added without reprocessing an existing data set. Demographic dimensions may include, but are not limited to, household size, household race, household income, household home ownership, household children age, household male education, household male age, household male work hours, household male occupation, household female education, household female age, household female work hours, household female occupation, household marital status, household pet ownership In embodiments, a shopper dimension may be a collection of types of household groups, for example, Core Shoppers: Households who have spent 50% or more of their Outlet dollars at a specific retailer, and Retailer Shoppers: Households who have had at least one shopping trip to a specific retailer. A Household ID may belong to multiple Shopper groups. Shopper groups may be based on a geography criterion (e.g., no product conditions included when creating the groups). Shopper groups may be based on the most recent 52 week time period.

In embodiments, a product buyer group dimension may be a collection of household groups that have purchased a product at least once. Household IDs may be hidden from end users. A Household ID may belong to multiple product buyer groups. Buyer groups may be based on product criteria only (i.e. no geography conditions included when creating the group). Buyer groups may be based on the most recent 52 week time period. Buyer groups may be provided "out-of-the-box" for top 20 brands in each category.

In embodiments, a combination group dimension may be a collection of household groups that have purchased a specific product at a specific retailer at least once. An example combination group may be "Safeway—Snickers Buyers". A Household ID may belong to multiple combination groups. A given combination group may have both product and geography criteria. Combination groups may be based on the most recent 52 week time period. Combination groups may be provided "out-of-the-box" for top 10 brands and top 10 chains in each category.

In embodiments, a filter dimension may be used to restrict end user access to measure results when a minimum buyer or shopper count has not been achieved. This may help to ensure that small sample sizes are not used. Filtering data may be permissible and not mandatory. Filtering data may be made so as to not permit override by an end user. Filtering data may be invisible to an end user.

In embodiments, a day of week dimension may be used to support a day of week analysis. Days may be ordered in calendar order and include an "all days" dimension.

In embodiments, a trip type may be derived using an algorithm to "type" trips based on measures of trip size and basket composition. In an example, every four weeks, the latest set of panelist purchase records may be processed through this algorithm. Datasets may be built that feed into the SIP application, and a Trip Type code appended to each "trip total" record (which documents the total trip expenditure) for the over 6 million individual trips over the two-year period of data provided in the SIP. SIP may be programmed to divide, or filter, all trips based on the trip type codes, collapse the trip types to the trip missions, and report standard purchase measures by trip type or trip mission.

In embodiments, the analytic platform 100 may enable tracking the performance of existing products and brands and new products at repeated time intervals, such as on a weekly basis. Pre-built, best-practice report workflows may be utilized within the analytic platform 100 for benchmarking and trend analysis, and to assist product-related decision making. Examples of pre-built reports may include, but are limited to, product portfolio analysis, product trend analysis, product planning, time alignment, performance benchmarks, competitive benchmarking, market and retailer benchmarking, integrated consumer analysis, or some other report type.

In embodiments, product portfolio analysis may include reviewing the strength of a current product portfolio, comparing products based on launch date and type of innovation to assess freshness of product own and competitors' line. This type of analysis may assist understanding the return on different types of product innovations.

In embodiments, product trend analysis may include identifying emerging product opportunities based on new product attributes and characteristics, comparing trends in adjacent categories to spot department and aisle issues, and/or performing flexible cross-tab analysis and filtering on any number of attributes.

In embodiments, product planning may include establishing product volume and launch plans, comparing actual vs. planned performance and tracking variances per product and per retailer, and/or estimating the likely performance of current quarter performance on week-by-week basis.

In embodiments, time alignment may include benchmarking product performance along a relative time scale (e.g., weeks since product launch for each product) for analyzing competitive products.

In embodiments, performance benchmarks may include assessing the strength of new products, comparing launch characteristics across categories and regions, and/or reviewing new product performance and distribution growth to identify opportunities to rebalance the product portfolio and sales and marketing investments.

In embodiments, competitive benchmarking may include comparing the performance of new products against its competitive set, and/or monitoring competitors' responses to analyze the results of the marketing and promotional actions taken during the launch period.

In embodiments, market and retailer benchmarking may include comparing new product performance across markets, channels, and retailers in order to identify performance issues and opportunities.

In embodiments, integrated consumer analysis may include integrating shopper analysis metrics to assist understanding actual consumer penetration and trial and repeat performance for new products.

In embodiments the output of the platform 100 and its various associated applications 184, solutions 188, analytic facilities 192 and services 194 may generate or populate reports 190. Reports 190 may include or be based on data or metadata, such as from the data mart 114, dimension information from the MDMH 150, model information from the model generator 148, projection information from the projection facility 178, and analytic output from the analytic server 134, as well as a wide range of other information. Reports 190 may be arranged to report on various facts along dimensions managed by the MDMH 150, such as specific to a product, a venue, a customer type, a time, a dimension, a client, a group of attributes, a group of dimensions, or the like. Reports 190 may report on the application of models to data sets, such as models using various analytic methodologies and techniques, such as predictive modeling, projection, forecasting, hindcasting, backcasting, automated coefficient generation, twinkle data processing, rules-based matching, algorithmic relationship inference, data mining, mapping, identification of similarities, or other analytic results.

The analytic platform 100 may provide for analysis of sales flow for category and brand reporting 190. Reporting may be provided in several steps, such as high-level analysis of sales, targeted and focused analysis of sales, root-cause due-to analysis, and the like. For high-level analysis of sales, the reporting may include a status of activity within a category, such as by channel, by category and product segment, by brand, across the nation, or the like. For targeted and focused analysis of sales, the reporting may include a status of where impact is the greatest, by category, such as by market, by retailer, by product, or the like.

For root-cause due-to analysis, the reporting 190 may include base sales and promoted/incremental sales. Base sales may include categories such as distribution, environmental, competition, consumer promotions, price, or the like. Incremental sales may include categories such as percent activity and weeks of support, which in turn may include price, quality, competition, or the like. Analysis of base sales may answer a plurality of questions concerning distribution, pricing, competitive activity and response, new product activity, or the like. Analysis of promoted/incremental sales may answer a plurality of questions concerning feature advertisements, displays, price reductions, or the like.

Analysis may help answer a plurality of questions on overall category, segment, and brand trends, such as how category performance compares to the brands and items being analyzed, how does category performance vary from segment to segment, how does category seasonality compare to the sales trend for the segments, are there regular promotional periods or spikes, and do these periods line up with promotional periods for the brands and items being analyzed, or the like. These questions may be answered by category, such as by national, market, or account channel.

In embodiments, the analytic platform 100 may provide solutions to enable sales executives within the CPG industry to have the ability to perform analysis of revenue and sales team performance in a manner that is directly aligned with the sales organization structure and user-defined territories. In embodiments, pre-built, best-practice report workflows for benchmarking and trend analysis may be provided to assist decision making.

In embodiments, the functional capabilities of the pre-built analyses and benchmarks may include, but is not limited to, custom geographies, sales planning and tracking, executive dashboards, sales performance benchmarks, same store sales, projected sales, driver analysis, stockholder reports, or some other type of report or benchmark.

In embodiments, custom geographies may be used to create and manage custom geography and store groups that are adapted to the sales and account organization for each CPG manufacturer. Projection factors may be updated without restatements as the organizational structures evolve.

In embodiments, sales planning and tracking may be used to create and manage sales plans per account and time period, and then track actual performance vs. plan on weekly, monthly, or some other basis.

In embodiments, executive dashboard reports may identify out-of-bound conditions and alert a user to areas and key performance indicators (KPIs) that require attention.

In embodiments, sales performance benchmarks may be used to analyze key performance metrics including account, category, and territory benchmarks, and designated competitive products.

In embodiments, same store sales may be used to perform any performance analysis on an all-stores or same-stores basis, for 4 week, 13 week, 52 week, or some other time frame.

In embodiments, projected sales reports may be used to project sales by product, account and geography during the course of the quarter. This may provide a user an early warning of expected quarterly and annual performance.

In embodiments, driver analysis reports may be use to better understand root cause drivers, such as category trends, price and promotion actions, and assortment changes. Shopper metrics may be used to help understand consumer penetration, shopping baskets, loyalty, and trial and repeat.

In embodiments, stakeholder reports may provide detailed evaluation and sales performance insights for each stakeholder (e.g., sales representatives, managers and executives) including plan tracking, account, product and geography snapshots, sales report cards, performance rankings, leader and laggard reporting, account and category reviews.

The analytic platform 100 may enable store profiling based at least in part on household demographic data within a local trading area. A store or plurality of stores may be selected and a cachement area of persons defined as, for example, those persons living within a selected distance from the store, by traditional block groups based method (e.g., 200-500 households), zip code or some other method. Demographic information used in store profiling may include, but is not limited to, educational level, income, marriage status, ethnicity, vehicle ownership, gender, adult population, length in residence, household size, family households, households, population, population density, life stage segment (multiple), age range with household, children's age range in household, number of children in household, number of adults in household, household income, homeowner/renter, credit range of new credit, buyer categories, net worth indicator, or some other demographic information.

In embodiments the output of the platform 100 and its various associated applications 184, solutions 188, analytic facilities 192 and services 194 may generate or help generate analyses 192, which may include presentations of predictive modeling, projection, forecasting, hindcasting, backcasting, automated coefficient generation, twinkle data processing, rules-based matching, algorithmic relationship inference, data mining, mapping, similarities, or some other analytic process or technique. Analyses may relate to a wide range of enterprise functions, including sales and marketing functions, financial reporting functions, supply chain management functions, inventory management functions, purchasing and ordering functions, information technology functions, accounting functions, and many others.

In embodiments, services 194, such as web services, may be associated with the platform 100. Services 194 may be used, for example, to syndicate the output of the platform 100, or various components of the platform 100, making the outputs available to a wide range of applications, solutions and other facilities. In embodiments such outputs may be constructed as services that can be identified in a registry and accessed via a services oriented architecture. Services may be configured to serve any of the applications, solutions and functions of an enterprise disclosed herein and in the documents incorporated by reference herein, as well as others known to those of ordinary skill in the art, and all such services that use the output of the platform 100 or any of its components are encompassed herein.

A data mart 114 may be a granting structure for releasability information that may include statistical information or other types of information. The data mart 114 may contain views and/or stored procedures to facilitate an analytic server 134 access to data mart 114 information. The data mart may be where clauses are stored during hierarchy creation and report selection generation.

Security 118 for a data mart 114 or other facility, element, or aspect of the present invention may include systems for physically securing the server hardware, securing and hardening the operating system, network security, limiting user access to the data mart 114 (for example and without limitation, through the use of user names and passwords), applying intrusion detection and prevention technology, and so on.

In embodiments, security 118 may include placing and securing the hardware in a controlled access environment such as a off-site hosting facility or an on-site Network Operation Center (NOC). Methods of controlling access may include requiring an escort, badges, use of keyed or keyless lock systems, and so on.

In embodiments, security 118 may include hardening the operating system upon which the data mart is installed. This may include removing of unnecessary services, changing all passwords from the default install, installing appropriate patches, and so on.

In embodiments, security 118 may include the use of firewalls to limit access to authorized networks. An additional aspect of network security may comprise requiring all or some of network communication with the data mart 114 to be encrypted.

An aspect of security 118 for a data mart 114 may include the use of user names and passwords to control access to the data stored in the data mart based upon privileges and/or roles. This access may include limiting which data can be read, written, changed, or the like.

The granting matrix 120 may be associated with determining whether data is releasable and/or enforcing rules associated with releasing data. In embodiments, a contract may dictate what data is releasable and the granting matrix 120 may embody and/or be used in the enforcement of the terms of the contract. Generally, one or more rules may be applied in determining whether data is releasable. These rules may be arranged hierarchically, with lower-level (or fine-grained) rules overriding higher-level (or coarse) rules. In other words, higher-level rules may provide defaults while lower-level rules provided overrides to those defaults, wherein the overrides are applied according to circumstance or other factors. Rules may be associated with products, suppliers, manufacturers, data consumers, supply chains, distribution channels, partners, affiliates, competitors, venues, venue groups, product categories, geographies, and so on. In embodiments, a dimension management facility may hold the rules and an aggregation facility and/or query-processing facility may implement the rules. In embodiments, a user may make a query; the user may be identified; and one or more rules from a hierarchy of rules may be chosen and used to supplement or provide governance of the query. In embodiments, the rules may be chosen on the basis of user, geography, contract management, buy/sell agreements associated with the data, a criteria, a product, a brand, a venue, a venue group, a measure, a value chain, a position in a value chain, a hierarchy of products, a hierarchy of an organization, a hierarchy of a value chain, any and all other hierarchies, type of data, a coupon, and so on. Those of skill in the art will appreciate that the granting matrix 120 may be implemented in an off-the-shelf database management system.

In embodiments, the granting matrix 120 may be associated with rules that relate to statistical releasability, private label masking, venue group scoping, category scoping, measure restrictions, category weights, and so on. Statistical releasability may be associated with an application of statistical releasability rules to measures or classes of measures. Private label masking may be associated with the masking of private label attributes. Venue group scoping may be associated determining which venue groups can be used by which customers for which purposes, and the like. Category scoping may be associated with limiting access to categories of data, or specific items within categories, to particular customers, by venue groups, and so on. Measure restrictions may be associated with restricting access to measures according to a set of business rules. For example and without limitation, some measures may only be available as intermediate measures and cannot, according to a business rule, be distributed directly to a user or recipient of the data. Category weights may comprise rules that apply to projection weights that are applied to categories, wherein categories may comprise a cross of dimensions, attributes, and the like. For example and without limitation, a category may be defined in terms of a cross of venue group and category. More generally, rules may be associated with categories irrespective of whether the rules apply to projection weights.

In embodiments, the granting matrix 120 may be implemented in a single facility or across any and all numbers of facilities. In the preferred embodiment, the analytic server 134 may handle hierarchy access security (i.e. member access) and measure restrictions. The data mart 114 may maintain a granting data structure (i.e. the rules arranged hierarchically) and scoped dimensions. A data aggregation operation may strip out unwanted products, attributes, and the like from data so that the resulting data is releasable.

In embodiments, the problem of enforcing releasability constraints and/or rules may require a large hierarchy of rules and query-time scoping of data. This may be due, in whole or in part, to the granularity of some of the rules that need to be supported in practice and the practical need to override the rules in some cases (such as and without limitation in a case where a particular client is granted special access to some of the data).

The grants table may establish a place where records of grants or instances of access rules are stored. This table may be implemented to allow for expression of the depicted relationships. In some embodiments, venue group and hierarchy key may be required. The other keys may be used or not, as required by a particular application. In any case, the rules may be associated with a specific category, a specific client, a specific venue group key, all clients, a specific client, all categories, any and all combinations of the foregoing, and so on. A rule may be configured to allow or deny access to data. A rule may be associated with any and all hierarchies, positions in hierarchies, groups, weights, categories, measurers, clients, and the like.

Data perturbation 122 may decrease the time it takes to aggregate data. Data may be queried in a dynamic fashion, which may be associated with reducing the amount of data that needs to be pre-aggregated. Embodiments may allow for facts of differing granularities to be joined in the same query while avoiding keeping intermediate tables, which could get quite large. Methods and systems for Data perturbation 122 include methods and systems for perturbing non-unique values in a column of a fact table and aggregating values of the fact table, wherein perturbing the non-unique values results in the column containing only unique values, and wherein a query associated with aggregating values is executed more rapidly due to the existence of only unique values in the column In an embodiment, OLAP application may produce an aggregation of data elements from one or more tables, such as fact tables and/or dimension tables, wherein the aggregation includes at least one non-aggregated dimension. Unlike a fixed OLAP cube structure, this non-aggregated dimension may be queried dynamically. The dimension may be associated with hierarchical, categorical information. In embodiments, a fact table may encompass a Cartesian product or cross join of two source tables. Thus, the fact table may be relatively large. In some embodiments, one of the source tables may itself consist of a fact table (e.g., a database table comprising tuples that encode transactions of an enterprise) and the other source table may consist of a projection table (e.g., a database table comprising tuples that encode projections related to the enterprise). In any case, the aggregation may comprise a data cube or data hypercube, which may consist of dimensions drawn from the fact table of which the aggregation is produced, wherein the dimensions of the fact table may be associated with the fact table's columns.

In an embodiment, a user of the OLAP application may engage the application in a data warehouse activity. This activity may comprise processing a query and producing an analysis of data. This data may reside in an aggregation that the OLAP application produces. The size and/or organization of the aggregation may result in a relatively long query processing time, which the user may experience during the data warehouse activity.

An aspect of an embodiment, may be to reduce the query processing time that the user experiences. One approach to reducing this query processing time may involve a pre-computing step. This step may involve pre-calculating the results of queries to every combination of information category and/or hierarchy of the aggregation. Alternatively or additionally, this step may involve pre-aggregating data so as to avoid the cost of aggregating data at query time. In other words, the OLAP application may utilize computing time and data storage, in advance of the user's data warehouse activity, to reduce the query processing time that the user experiences.

In an embodiment, another approach to reducing the query processing time that the user experiences may involve perturbing values in a fact table so that all values within a particular column of the fact table are unique. Having done this, an aggregating query may be rewritten to use a relatively fast query command. For example, in a SQL environment, with unique values in a particular column of a fact table, a SQL DISTINCT command may be used, instead of a relatively slow SQL CROSS JOIN command, or the like. This rewriting of fact table values may reduce the query processing time that it takes to execute the aggregating query, optionally without the relatively costly step of pre-aggregating data.

An embodiment may be understood with reference to the following example, which is provided for the purpose of illustration and not limitation. This example deals with queries that provide flexibility with respect to one dimension, but it will be appreciated that the present invention supports flexibility with respect to more than one dimension. Given a sales fact table (salesfact) including venue, item, and time dimensions and a projection fact table (projection) including venue, time, and venue group dimensions, and given that each sales fact in the fact table contains actual sales data and each fact in the projection table contains a projection weight to be applied to actual sales data so as to produce projected sales information, then the following query may produce a projected sales calculation and perform a distribution calculation. (In OLAP, a distribution calculation may happen when two fact tables are used to scope each other and one table has a higher cardinality than the other):

```
SELECT
venue_dim_key,
item_dim.attr1_key,
sum (distinct projection.projectedstoresales),
sum (projection.weight * salesfact.sales)
FROM salesfact, projection, item_dim, time_dim
WHERE (
    // 13 weeks of data
    (time_dim.qtr_key = 11248)
    // break out the 13 weeks
    AND (salesfact.time_dim_key = time_dim.time_dim_key)
    // join projection and salesfact on venue_dim_key
    AND (projection.venue_dim_key = salesfact.venue_dim_key)
    // join projection and salesfact on time_dim_key
    AND (projection.time_dim_key = salesfact.time_dim_key)
    // break out a group of venues
    AND (projection.venue_group_dim_key = 100019999)
    // some product categories
    AND (item_dim.attr1_key in (9886))
    // break out the items in the product categories
    AND (item_dim.item_dim_key = salesfact.item_dim_key))
GROUP BY venue_dim_key, item_dim.attr1_key
```

This example query adds up projected store sales for the stores that have sold any item in category 9886 during a relevant time period. Assuming that the data in the projection fact table is perturbed so that the values in projection-.projectedstoresales are unique, the expression sum (distinct projection.projectedstoresales) is sufficient to calculate the total projected sales for all of the stores that have sold any of those items during the relevant period of time.

As compared with operating on data that is not perturbed (an example of this follows), it will be appreciated that perturbing data in advance of querying the data provides this improved way to scrub out the duplications. This appreciation may be based on the observation that it is likely that multiple salesfact rows will be selected for each store. In tabulating the projected store sales for the stores that have any of the selected items sold during the relevant time period, each store should be counted only once. Hence the combination of first perturbing the data and then using the distinct clause. Moreover, if overlapping venue groups have the same stores, the above query also works. It follows that analogous queries may work with multiple time periods, multiple product attributes, and multiple venue groups. Such queries will be appreciated and are within the scope of the present disclosure.

In contrast if the data is not perturbed and so it is not guaranteed that the values in projection.projectedstoresales are unique, then the following sequence of queries may be required:

First:

```
CREATE TABLE store_temp AS SELECT
projection.venue_dim_key,
```

-continued

First:

```
projection.time_dim_key,
item_dim.attr1_key,
min(projectedstoresales)
FROM salesfact, projection, item_dim, time_dim
WHERE (
    // 13 weeks of data
    (time_dim.qtr_key = 11248)
    // break out the 13 weeks
    AND (salesfact.time_dim_key = time_dim.time_dim_key)
    // join projection and salesfact on venue_dim_key
    AND (projection.venue_dim_key = salesfact.venue_dim_key)
    // join projection and salesfact on time_dim_key
    AND (projection.time_dim_key = salesfact.time_dim_key)
    // break out a group of venues
    AND (projection.venue_group_dim_key = 100019999)
    // some product categories
    AND (item_dim.attr1_key in (9886))
    // break out the items in the product categories
    AND (item_dim.item_dim_key = salesfact.item_dim_key))
GROUP BY time_dim_key, venue_dim_key, item_dim.attr1_key
```

Second, apply a measure to calculate the distribution itself:

```
SELECT sum(projectedstoresales) FROM store_temp group by
venue_dim_key, item_dim.attr1_key
```

Finally, an additive part of the measure is required:

```
SELECT sum (projection.weight * salesfact.sales)
FROM salesfact, projection, item_dim, time_dim
WHERE (
    // 13 weeks of data
    (time_dim.qtr_key = 11248)
    // break out the 13 weeks
    AND (salesfact.time_dim_key = time_dim.time_dim_key)
    // join projection and salesfact on venue_dim_key
    AND (projection.venue_dim_key = salesfact.venue_dim_key)
    // join projection and salesfact on time_dim_key
    AND (projection.time_dim_key = salesfact.time_dim_key)
    // break out a group of venues
    AND (projection.venue_group_dim_key = 100019999)
    // some product categories
    AND (item_dim.attr1_key in (9886))
    // break out the items in the product categories
    AND (item_dim.item_dim_key = salesfact.item_dim_key))
GROUP BY venue_dim_key, item_dim.attr1_key
DROP TEMP TABLE store_temp
```

Figure 3:
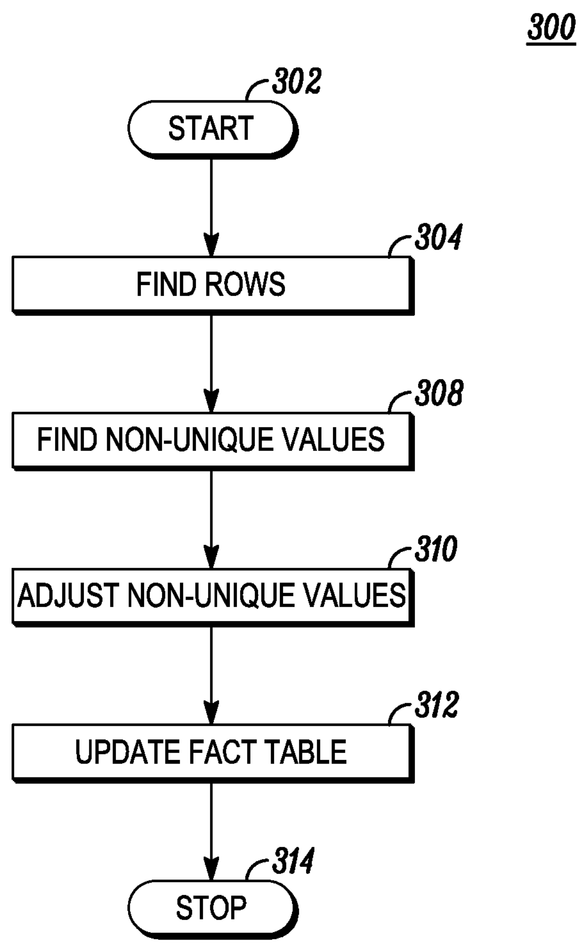
FIG. 3 illustrates a process of a data perturbation facility.

It will be appreciated that join explosions can result in the temporary table store_temp when a lot of attribute combinations are required for the query. For example, increasing the number of time periods, product attributes, and/or venue groups will multiply the number of records in the temporary table. Conversely, the perturbed data join of the present invention is not affected by this problem since both dimensions can be processed as peers even though the projection table has no key for the item dimension Referring to FIG. 3, a logical process 300 for perturbing a fact table is shown. The process begins at logical block 302 and may continue to logical block 304, where the process may find all of the rows in a fact table that match a targeted dimension member or value (subject, perhaps, to a filter). The process may continue to logical block 308, where the process may determine non-unique column values within those rows. Then, processing flow may continue to logical block 310 where an epsilon (possibly different if there are matching non-unique values) or other relatively small value may be added or subtracted to each of the non-unique values in such a manner as to render any and all of the column values to be unique. Next, processing flow may continue to logical block 312, where the values that were modified in the previous step are updated in the fact table so that the fact table contains the updated values. Finally, processing flow continues to logical block 314, where the procedure ends.

In an embodiment, this logical process 300 may speed up affected queries by allowing for a SQL DISTINCT clause to be used, instead of an extra join that would otherwise be needed to resolve the identical column values. In an embodiment, this process 300 may make it possible to use leaf-level data for hierarchical aggregation in OLAP applications, rather than using pre-aggregated data in such applications.

Referring again to FIG. 1, tuples 124 may provide for aggregation of data, including methods and systems that allow one or more flexible dimensions in aggregated data. Tuples 124 associated with aggregation allow the flexible dimensions to be defined at query time without an undue impact on the time it takes to process a query. Tuples 124 may be used for and/or in association with aggregating data, including accessing an aggregation of values that are arranged dimensionally; accessing an index of facts; and generating an analytical result, wherein the facts reside in a fact table; the analytical result depends upon the values and the facts; and the index is used to locate the facts. In embodiments the aggregation is a pre-aggregation. In embodiments the analytical result depends upon one of the dimensions of the aggregation being flexible. In embodiments the aggregation does not contain a hierarchical bias. In embodiments the analytical result is a distributed calculation. In embodiments the query processing facility is a projection method. In embodiments the fact table consists of cells. In embodiments the index of facts is a member list for every cell. In embodiments the aggregation is a partial aggregation. In embodiments the projected data set contains a non-hierarchical bias. In embodiments distributed calculations include a projection method that has a separate member list for every cell in the projected data set. In embodiments aggregating data does not build hierarchical bias into the projected data set. In embodiments a flexible hierarchy is provided in association with in the projected data set.

An aspect of the present invention may involve an aggregation facility for producing an aggregation of one or more fact tables and/or dimension tables, wherein at least one dimension of the aggregation is flexible. This flexible dimension may be designated and/or defined at or before the time when a query and/or lookup specified, wherein the query and/or lookup may be directed at the aggregation and associated with the dimension. The dimension may be associated with hierarchical, categorical information. The definition or designation of the dimension may encompass the specification of a particular level in the information's hierarchy. For example and without limitation, an aggregation may include a time dimension. Levels in this dimension's information hierarchy may include second, minute, hour, day, week, month, quarter, year, and so forth. In other words, the aggregation may include a time dimension that is aggregated at the level of seconds, minutes, hours, or any one of the hierarchical levels of the time dimension.

In embodiments, a fact table may encompass a Cartesian product or cross join of two source tables 114. It will be appreciated that the fact table 104 may be relatively large as a result of the cross join. In some embodiments, one of the source tables may itself consist of a source fact table (e.g., a database table comprising tuples that encode transactions or facts of an enterprise) and the other source table may consist of a projection fact table (e.g., a database table comprising tuples that encode projected transactions or facts of the enterprise). In any case, the aggregation may comprise a value, a tuple, a database table, a data cube, or a data hypercube. The aggregation may consist of dimensions that are associated with domains of the fact table, wherein the domains may be associated with the fact table's columns.

In applications, a user of a query processing facility may be engaged in a data warehouse activity. This activity may comprise and/or be associated with a query for producing an analytical result from an aggregation. The size and/or organization of the aggregation may result in a relatively long query processing time at the query processing facility, which the user may experience during the data warehouse activity. The dimensions of the aggregation may be fixed at particular levels in the dimensions' information hierarchies. The data warehouse activity may comprise data lookups in the aggregation. The query processing facility may process such lookups in a relatively speedy manner as compared with the time it takes the application facility to generate the aggregation.

In practice the user may want flexibility, at query time, with respect to one or more of the dimensions in the aggregation. In other words, the user may want to explore the aggregation with respect to user-selected levels of those dimensions' information hierarchies. In some circumstances, such as when the query processing facility may be providing a distribution measure, the aggregation may not lend itself to such flexibility. For example and without limitation, an aggregation may be provided with respect to three dimensions: sales, item, and venue group. The levels of the venue group dimension may include store, city, region, metropolitan statistical area, and so forth. Suppose the aggregation were provided by the aggregation facility with the venue group dimension aggregated and fixed at the regional level. If the user were to issue a query requesting the percentage of total sales that are attributed to a particular store, it might be impossible for the query processing facility to calculate the answer solely by referencing the aggregation: the sales of individual stores, in this example, are aggregated at the regional level in the venue group dimension and not the store level. To accommodate the user, the query processing facility may instruct the aggregation facility to generate another aggregation, this one with the venue group dimension fixed at the store level. Or, the query processing facility may use a pre-computed alternate aggregation in which the venue group dimension is fixed at the store level. In either case, an alternate aggregation may be required. An object of the present invention may to provide a way of accommodating the user without using an alternate aggregation.

An aspect of the present invention may be understood with reference to the following example, which is provided for the purpose of illustration and not limitation. This example deals with queries that provide flexibility with respect to one dimension, but it will be appreciated that the present invention supports flexibility with respect to more than one dimension. Given a sales fact table (sales fact) including venue, item, and time dimensions and a projection fact table (projection) including venue, time, and venue group dimensions, and given that each sales fact in the fact table contains actual sales data and each fact in the projection table contains a projection weight to be applied to actual sales data so as to produce projected sales information, then the following query may produce projected sales aggregations for all combinations of venue and product category:

```
SELECT
venue_dim_key,
item_dim.attr1_key,
sum(projection.weight * salesfact.sales)
FROM salesfact, projection, item_dim, time_dim
WHERE (
    // 13 weeks of data
    (time_dim.qtr_key = 11248)
    // break out the 13 weeks
    AND (salesfact.time_dim_key = time_dim.time_dim_key)
    // join projection and salesfact on venue_dim_key
    AND (projection.venue_dim_key = salesfact.venue_dim_key)
    // join projection and salesfact on time_dim_key
    AND (projection.time_dim_key = salesfact.time_dim_key)
    // break out a group of venues
    AND (projection.venue_group_dim_key = 100019999)
    // some product categories
    AND (item_dim.attr1_key in (9886, 9881, 9267))
    // break out the items in the product categories
    AND (item_dim.item_dim_key = salesfact.item_dim_key))
GROUP BY venue_dim_key, item_dim.attr1_key
```

It will be appreciated that this projection query could take a long time to process if the venue group involved is large (i.e., contains a lot of stores) and/or a long period of time is desired. An advantage of the present invention is provided through the pre-aggregation of sales data and projection weights into a projected facts table (not to be confused with the projection fact table). The projected facts table (projectedfact) contains projected facts stored keyed by time, item, and venue group. The projected facts table may contain projected sales (projectedfact.projectedsales) that result from aggregating projection.weight times sales facts.sales grouped by time, item, and venue group. Having calculated the projected facts table, it is possible to produce projected sales aggregations according to the following query:

```
SELECT
venue_dim_key,
item_dim.attr1_key,
sum(projectedfact.projectedsales)
FROM projectedfact, item_dim, time_dim
WHERE (
    // 13 weeks of data
    (time_dim.qtr_key = 11248)
    // break out the 13 weeks
    AND (projectedfact.time_dim_key = time_dim.time_dim_key)
    // break out a group of venues
    AND (projectedfact.venue_group_dim_key = 100019999)
    // some product categories
    AND (item_dim.attr1_key in (9886, 9881, 9267))
    // break out the items in the product categories
    AND (item_dim.item_dim_key = projectedfact.item_dim_key))
GROUP BY venue_dim_key, item_dim.attr1_key
```

As compared with the first example query, it will be appreciated that flexibility remains in the item_dim dimension while the number of fact tables is reduced to one. In addition, it will be appreciated that, due to the projected facts being aggregated on venue groups, facts that were originally represented by venue are compressed down into aggregated facts that correspond to venue groups. In embodiments, the number of venues in a group can exceed 1,000, so this compression can provide a significant (in this example, perhaps a 1000:1 or greater) reduction in the time required to produce projected sales aggregations. Similarly, the projected facts table may store projected sales that are aggregated by time period, which could still further reduce the time required to produce projected sales aggregations. In all, these improvements may accommodate the user 130 by reducing the time required to generate projected sales aggregations while providing flexibility with respect to at least one dimension. This reduction in the time required may be so significant that it allows the user 130 to interactively select a point along the flexible dimension and see the resulting projected sales aggregations in or near real time.

The binary 128 may comprise a bitmap index into a fact table, which may be generated by a bitmap generation facility. Domains of the index may be selected from the fact table so as to allow flexibility along a specific dimension of an aggregation. The binary 128 or bitmap index may be generated in response to a user input, such as and without limitation a specification of which dimension or dimensions should be flexible. Alternatively or additionally, the binary 128 may be generated in advance, such as and without limitation according to a default value. The binary 128 may be embodied as a binary and/or or may be provided by a database management system, relational or otherwise.

The following example is provided for the purposes of illustration and not limitation. One or more fact tables 104 encompassing an item domain, a time domain, a venue domain, and a venue group domain may be provided. Facts within these fact tables, which may be embodied as rows of the tables, may relate to actual and/or projected sales, wherein a sale may be encoded as a time of sale, an item sold, and the venue and/or venue group associated with the sale. The aggregation produced from the one or more fact tables may comprise a sales dimension, an item dimension, and a venue group dimension aggregated at the regional level. A user may specify (such as via the user input) that he is interested in the percentage of total sales that are attributed to a particular venue. Perhaps in response to this specification and/or perhaps in accordance with the default value, the bitmap generation facility may create a binary 128 containing a reference for each value in the venue and item domains of the one or more fact tables; any and all of the references may comprise an entry, vector, pointer, or the like. In other words, each of the references in the binary 128 may encode the location of the facts that correspond to each venue and each item. Given these locations, the total sales for a particular venue may be calculated: the location of all the facts that are associated with the venue are encoded in the index; a query processing facility may utilize the bitmap index to rapidly locate the facts that correspond to the venue. Since each fact may correspond to an item sold, the query processing facility may count the facts that it located to determine the number of items sold. Meanwhile, the total sales for all stores may be calculated by summing all of the sales values of all of the items in all of the venue groups of the aggregation. The ratio of total sales for the venue to total sales for all venue groups, which may be the analytical result, may be the percentage of total sales in which the user expressed interest. It will be appreciated that, in embodiments, it may not be possible to produce the analytical result for the user by simply counting the facts located via the index. In such cases, any and all of those facts may be accessed and one or more values of those facts may be summed, aggregated, or otherwise processed to produce the analytic result. In any case, it will be appreciated by those skilled in the art that the binary 128 may provide dramatic improvements in system performance of the query processing facility when it is producing an analytical result, such as and without limitation a percentage of total sales that are attributed to a particular venue and so forth.

The facts may be embodied as tuples or rows in a fact table and may comprise numbers, strings, dates, binary values, keys, and the like. In embodiments but without limitation, the facts may relate to sales. The facts may originate from the source fact table and/or the projection fact table. The source fact table may in whole or in part be produced by a fact-producing facility. The projection fact table may in whole or in part be produced by a projection facility (such as and without limitation the projection facility 178). In embodiments, the fact-producing facility may without limitation encompass a point-of-sale facility, such as a cash register, a magnetic stripe reader, a laser barcode scanner, an RFID reader, and so forth. In embodiments the projection facility may without limitation consist of computing facility capable of generating part or all of the projection fact table, which may correspond to projected sales. In embodiments, the bitmap generation facility may index the facts, producing the binary 128. The query processing facility may utilize the bitmap index when processing certain queries so that as to provide improved performance, as perceived by the user, without utilizing an auxiliary aggregation. In embodiments, there may or may not be at least one reference in the binary 128 for any and all of the facts. In embodiments, there may be indexes and/or references for aggregated, pre-aggregated, and/or non-aggregated facts. In embodiments, the index may be embodied as a bitmap index.

In embodiments, the query processing facility may use the fact table, the aggregation, and/or and the index to provide a user-defined data projection, which may be the analytical result. In an embodiment, the fact table may provide input to the projection facility, which may or may not utilize that input to produce the projection fact table. In an embodiment, the query processing facility may process the facts by pre-aggregating them in a predefined manner, for example and without limitation as may be defined by the user input or the default value. In embodiments, the predefined manner may include not pre-aggregating at least one domain of the fact table (wherein the one domain may or may not be used in a later query); generating an index that is directed at providing flexibility at query time with respect to at least one dimension of the pre-aggregation (whether or not one or more domains of the fact table have been pre-aggregated); and so forth. In embodiments, a user, a default value, a projection provider (which may be an entity that employs the present invention), a value associated with a market, or the like may define at least one domain and/or at least one dimension. This domain and/or this dimension may be the same for all of a plurality of users; may be different for some or all of the plurality of users; may be associated with a particular projection fact table and/or fact table; and so on. In an embodiment, the query processing facility may provide an output to an end user. The output may comprise or be associated with the user-defined data projection (i.e., the analytical result). The analytical result may be a value, table, database, relational database, flat file, document, data cube, data hypercube, or the like. In an embodiment, a user may submit a query in response to the analytical result and/or the analytical result may be a result that is produced by the query processing facility in response a query that is associated with the user.

As an example, an enterprise may track sales of various products from a plurality of stores. All of the facts associated with the different products may be collected and indexed in preparation for report generation, data mining, processing related to data relationships, data querying, or the like. All of the facts may be aggregated by the aggregation facility. Alternatively or additionally, the facts that relate to, pertain to, represent, or are associated with a particular domain may not be aggregated. The bitmap generation facility may generate a binary 128 or bitmap index to enable or expedite certain queries. In any case, the end user may be able to submit a query, perhaps in association with a data mining activity, that is received by the query processing facility and that results in the query processing facility generating an analytical result, wherein the production of the analytical result may have depended upon one or more of the dimensions of the aggregation being flexible. This flexibility may be associated with the query processing facility's use of the binary 128.

It should be appreciated that various combinations of fixed and flexible dimensions are supposed by the present invention. All such combinations are within the scope of the present disclosure. For example and without limitation, an embodiment may implement two fixed dimensions (i.e., venue [via venue group] and time dimensions) and two flexible dimensions (i.e., item and causal dimensions).

Causal Bitmap Fake 130 may be an intermediate table for use as a bridge table in data analysis, the bridge table containing only those causal permutations of the fact data that are of interest. It will be appreciated from the following disclosure that the causal bitmap fake 130 may reduce the number rows in the bridge table by a significant factor, increasing the speed with which aggregation or pre-aggregation queries may be applied with respect to the table, and thereby increasing the range and flexibility of queries that may be applied in or near real time to the fact data or an aggregation or pre-aggregation thereof: In essence, the causal bitmap fake 130 may involve utilizing and/or producing a bitmap that encodes combinations of causal data. In embodiments, the causal data may relate to merchandising activity and may, without limitation, encode an item, feature, display, price reduction, special pack, special feature, enhanced feature, special display, special price reduction, special census, and so on. Instead of generating a bridge table that encodes all possible permutations of the bitmap—such a table may contain half a million or more rows in practice—the causal bitmap fake 130 utilizes and/or produces a bridge table containing only the permutations of interest, the permutations that represent combinations of merchandising activity that are probable or possible, or the like. In practice, such bridge tables may contain tens or hundreds of rows. As a result, an aggregation query or other queries that involves a cross join between permutations of causal data and other facts or dimensions may involve far fewer calculations and result in a much smaller result set than would have been the case if all permutations of causal data were considered. In practice, it may be possible to recalculate the bridge table when the permutations of causal data in question become known and/or when the permutations in question change. By doing this, the bridge table may only contain the permutations in question and so calculating aggregations, which may involve processing the entire bridge table, may still be done rapidly as compared with an approach that considers a bridge table that contains all possible permutations.

Census integration 132 may comprise taking census data and combining it sample data that is taken more or less automatically. Associating the sample data with the census data may be some attribute, category, or the like. For example and without limitation, sample data and/or census data may be associated by venue, venue group, geography, demographic, and the like. The census data may be actual data, projected data, or any and all other kinds of data. In the preferred embodiment, the census integration 132 may be calculated as an estimation of a more complicated and, perhaps, somewhat more accurate matrix of calculations. The census integration 132 may be performed in a batch process or in real time.

Census integration 132 may be appreciated at least in part by considering the following example, which is provided for the purpose of illustration and not limitation: A company receives movement data that is automatically collected from point-of-sale machines that are installed at a group of census stores. The movement data may provide direct insight into what has sold. From that, it may be possible to infer some of the reasons as to why it sold. For example, suppose an item is selling better this week than it did last week. It might be clear from the movement data that the price of the product was reduced and that this seemed to drive sales. However, one might want to know whether this increase in sales may be associated with an in-store promotion, a re-positioning of the item on store shelves, or some other factor that may not be clear from the census data. To address this, the company may send sample takers to some of the stores to gather information relating to promotion, placement, and other factors associated with the item that are not necessarily captured in movement data. In practice, the number of stores in a census group may be large, so the company would find it prohibitive to visit and sample each of the stores. Instead, the company may visit a subset of the stores. Movement data may then be joined or combined with projections, sub-samples, or data from the samples. From such a combination, inferences (such as and without limitation causal inferences) may be drawn.

Generally, in embodiments, scanner-data-based products and services may primarily use two sources of data—movement data and causal data. Movement data may contain scanner-based information regarding unit sales and price. Based on these data, it may be possible to calculate volumetric measures (such as and without limitation sales, price, distribution, and so on). Causal data may contain detailed information in several types of promotions including—without limitation—price reductions, features, displays, special packs, and so on. In practice, information about the incidence of some of these types of promotions (i.e., price reductions and special packs) may be deduced from the scanner data. Also in practice, a field collection staff may gather information about other types of promotions (i.e. features and displays).

Given the relative ease of automatically collecting movement data as compared to deploying a field collection staff to gather information, in practice there may be far more movement data available than sample-based data. Therefore, movement data may have far less variance due to sampling and projection error and volumetric measures may have been far more accurate than their sample-based counterparts. Given the inherent difficulties in gathering causal measures data, it may not be possible to generate a full array of causal measures based on census data alone—generating a complete set of causal census data may be economically infeasible. Therefore, field-collected samples of causal data may be gathered from a representative sample of stores (the "sample stores").

In order to report a complete and consistent measure set, it may be necessary to combine the volumetric information collected from census stores with the causal information collected from a more limited set of sample stores. Census integration 132 (which may be referred to herein and elsewhere as "sample/census integration" or simply "SCI") may consist of two components: a special measure calculation; and a calculation and application for a SCI adjustment factor.

Some measures may be calculated directed from census data, some measures may be calculated from sample data, and some measures may integrate volumetric data from the census with causal data from the sample. Those measures/causal combinations that do not rely at all on field collected causal information may be calculated directly from census data using census projection weights. Examples of such measures may include unit sales, dollar sales, volume sales, and so on. For those measures/causal combinations that rely on field collected causal information, special measures may be used.

Causal information may be taken from a sample in the form of a rate of promotion. For example and without limitation, rather than directly calculating the measure "unit sales, display only," the sample data may be used to calculate a percentage of units selling with display only. This percentage may be calculated as follows (in this and subsequent examples in the context of describing census integration 132 the following shorthand may be used—(s) may indicate that the measure is calculated from projected sample data, (c) may indicate that the measure is calculated from projected census data):

$$\%\ \text{Unit Sales, Display, Display Only}(s) = \frac{\text{United Sales, Display Only}(s)}{\text{Unit Sales}(s)} \times 100$$

The percentages calculated from the sample may be calibrated to the volumetric data obtained from the census to produce an integrated measure as follows:

$$\text{Unit Sales, Display Only}(i) = \frac{\%\ \text{Unit Sales, Display Only}(s) \times \text{Unit Sales}(c)}{100}$$

The percentage of sales affected by the promotion in the sample may provide the best estimate of promotional activity available. The census-projected estimate of sales may be the most accurate estimate of sales available. By combining these two estimates, embodiments of the present invention may produce a single, integrated measure that takes advantage of, and reflects both, the detailed causal information collected from the sample stores, as well as the more accurate volumetric information obtained from the census stores. In embodiments, the integrated measure may be calculated all at once; at leach level of the time, geography, and product hierarchy; and so on. Integrating measures at each reporting level may eliminate a potential downward bias in causal measures that would result if the integrated measures were calculated at a lower level and then aggregated up the hierarchy. For example, under such an approach, items that move only in census stores would always be treated as not promoted.

Some measures may be calculated exclusively from sample data. These measures may fall into two categories—measures for which integration offers no benefit (e.g. All Commodity Value (ACV) Selling on promotion) and measures for which the integrated calculation may be too complex to be accommodated.

The second component of the SCI methodology is the SCI adjustment. While integrated measure calculations can eliminate many inconsistencies associated with sourcing volumetric information and causal information from different sources, other inconsistencies may remain. Specifically, the fact that an item's sales may make up a different proportion of sales within a brand (or time period) in the sample stores than in the census stores can result in inconsistencies between measure values at the UPC or week level and more aggregate levels in the product or time hierarchies.

In order to reduce the prevalence of these types of inconsistencies, the SCI adjustment may be applied to sample data prior to measure calculation.

The adjustment may effectively force the sample data to reflect the sales in the census data, so that the proportion of sales for items within aggregate levels in the stub (or more aggregate time periods) are the same in both the sample and the census.

A separate SCI adjustment may be calculated for both units and dollars at the UPC/chain/week level. The adjustment may be calculated at either the chain or sub-company level. The level at which the adjustment occurs may depend on the way in which projections are set-up. The adjustments may be calculated as follows:

$$\text{Unit } SCI \text{ Adjustment} = \frac{\text{Units(census)}}{\text{Units(sample)}}$$

$$\text{Dollar } SCI \text{ Adjustment} = \frac{\text{Dollars(census)}}{\text{Dollars(sample)}}$$

The Unit SCI Adjustment and Dollar SCI Adjustment may then be applied to units and base units and dollars and base dollars respectively at the UPC/store/week level.

The analytic server 134 may receive data, data shapes, data models, data cubes, virtual data cubes, links to data sources, and so on (in the context of the analytic server 134, collectively referred to as "data"). Embodiments of the analytic server may process data so as to provide data that comprises an analysis or analytical result, which itself may encompass or be associated with data that may represent or encompass one or more dimensions. The analytic server 134 may receive and/or produce data in an arrangement that is atomic, byte-oriented, fact-oriented, dimension-oriented, flat, hierarchical, network, relational, object-oriented, and so on. The analytic server 134 may receive, processes, and/or produce data in accordance with a program that is expressed functionally, a program that is expressed procedurally, a rule-based program, a state-based program, a heuristic, a machine-learning algorithm, and so on. In any case, the analytic server may receive, process, and/or produce data by or in association with a processing of business rules, database rules, mathematical rules, any and all combinations of the foregoing, and any other rules. The analytic server 134 may comprise, link to, import, or otherwise rely upon libraries, codes, machine instructions, and the like that embody numerical processing techniques, algorithms, heuristics, approaches, and so on. In embodiments, the analytic server may comprise, operate on, operate in association with, be accelerated by, or otherwise be enabled or assisted by one or more central processing units, math co-processors, ASICs, FPGAs, CPLDs, PALs, and so on. In any case, the analytic server 134 may provide math and/or statistical processing in accordance with a number of functions, which in embodiments may be predefined. Moreover, functions may be imported (such as and without limitation by loading and/or linking a library at compile time, at run-time, and so on), connected externally (such as and without limitation via a remote procedure call, a socket-level communication, inter-process communication, shared memory, and so on), and so forth. In embodiments, the analytic server may support configurable in-memory processing, caching of results, optimized SQL generation, multi-terabyte and larger datasets, dynamic aggregation at any and all levels of a hierarchy, n-dimensional analysis, and so on. In embodiments, the granting matrix 154 may be applied to the data to ensure that it is releasable in accordance with any and all applicable business rules.

The analytic server 134 may enable or support a defining of dimensions, levels, members, measures and other multi-dimensional data structures. In embodiments, a graphical user interface may be operatively coupled to or otherwise associated with the analytic server 134 so as to provide a user with a way of visually making the definition. The analytic server 134 may automatically verify the integrity of the data. In embodiments, the analytic server 134 may support at least hundreds of concurrent dimensions. The analytic server 134 may manage rules in complex models so as to capture any and all of the interdependencies of rules pertaining to a problem. In embodiments, the analytic server 134 may prioritize a large set of complex business rules, database rules, and mathematical rules. The analytic server 134 may provide time-dependent processing that produces data that is, for example and without limitation, associated with an absolute measure of time, a year, a quarter, a month, a relative measure of time, a month-to-month measure, a year-over-year measure, a quarter-to-date measure, a year-to-date measure, a custom time period, and the like. In embodiments, the analytic server 134 may receive, processes, and/or produce data that is associated with and/or represented in accordance with multiple hierarchies per dimension. The multiple hierarchies may enable and/or provide different perspectives on the same data—for example and without limitation, inventory data by region, by cost type, by ownership, and the like. In embodiments, the analytic server may provide an alert in association with a metric or group of metrics, which may be absolute or relative. Such metrics may comprise a target value, an upper bound, a lower bound, a tolerance, and so on. In embodiments, the alert may be an email message, a process interrupt, a process-to-process message, and so on. Such alerts may be delivered according to a frequency, wherein the frequency may be associated with and/or assigned by a user.

The Master Data Management Hub (MDMH) 150 may receive data, cleanse the data, standardize attribute values of the data, and so on. The data may comprise facts, which the MDMH 150 may be associated with dimensional information. The MDMH 150 may receive, generate, store, or otherwise access hierarchies of information and may process the data so as to produce an output that comprises the data in association with hierarchy. The MDMH 150 may provide syntactic and/or semantic integration, may synchronize definitions, may store domain rules, and so on. In embodiments, the MDMH 150 may utilize a federated data warehouse or any and all other kinds of data warehouse in which there persists a common definition of a record and, perhaps or perhaps not, the record itself.

Embodiments of the MDMH 150 may receive, generate, provide, or otherwise be associated with a venue group, category, time period, attribute, or the like, any and all of which may be scoped by deliverable. This may drive dimension table building. Embodiments of the MDMH 150 may measure packages by deliverable. This may drive model creation. Embodiments of the MDMH 150 may receive, generate, provide, or otherwise be associated with data sources and matrix data for the granting matrix 154.

The interface 158 may comprise a graphical user interface, a computer-to-computer interface, a network interface, a communications interface, or any and all other interfaces. The interface may employ a network communications protocol, a human-computer interface technique, an API, a data format, serialization, a remote procedure call, a data stream, a bulk data transfer, and so on. The interface may support or be associated with a web service, SOAP, REST, XML-RPC, and so on. The interface may be associated with a web page, HTTP, HTTPS, HTML, and so on. The interface may be standard, proprietary, open, closed, access controlled, public, private, protected, and so on. The interface may be addressable over a data network, such as and without limitation a local area network, wide area network, metropolitan area network, virtual private network, virtual local area network, and so on. The interface may comprise a physical, logical, or other operative coupling. The interface 158 may be defined and/or associated with hardware, software, or the like. The interface 158 may be fixed, expandable, configurable, dynamic, static, and so on. The interface 158 may support or be associated with failover, load balancing, redundancy, and so on. Many types of interfaces 158 will be appreciated and all such interfaces are within the scope of the present disclosure.

A data loader 160 may leverage/exploit operational data stores and processes that may be used to deliver data to clients. In embodiments, the methodology for leveraging/exploiting operational data stores may differ depending upon the data type (e.g. POS, Panel, Display Audit). In embodiments, the same concept of extracting data from existing data stores may be applied to transferring the data to a Linux platform, reformatting, keying the data, or the like, and then serving the data to the data loader 160 processes.

In an embodiment, the POS data extract system may be dependent upon a Unix Infoview delivery process. In embodiments, POS data extract work orders may be set up in a client order entry system (COES) and may define the item categories (stubs), projections, geographies, time periods, and other parameters needed to create the extract. Additional, a set of controls may specify that a data loader 160 extract may be required, including the Linux file system that may be the target for the extracts.

In embodiments, data requests may be submitted and tracked as standard Infoview runs. In an embodiment, intermediate files may be created in a job stream which may be the 'building blocks' for the Infoview aggregation engine. The intermediate files may be created by reading a number of operational data stores, applying various quality controls and business rules, and formatting the intermediate files. In embodiments, the output files may include information for building dimension hierarchies, facts, and causal mapping. In an embodiment, in the data loader 160 extract, the intermediates may be kept as a final Infoview output which may be downloaded to Linux for further preparation for data loader 160 processing.

In an embodiment, a panel data extract system may be created as a hybrid system to utilize the code base as well as newly created Linux/C++ components. An extraction order may be submitted through a mainframe system. In an embodiment, the extraction process may use inputs from a QS3/Krystal system and may extract the purchase data from a UPCSELECT database. In an embodiment, the extraction system may also communicate with a trip type data file, which may be created by a custom panel group. During the mainframe process, auxiliary files like a market basket, weight, or the like may also be created. In an embodiment, in a second part of the process flow, Linux files that may be created during the mainframe process and may be keyed by using dimensional files created by a DMS database. Additionally, shopper groups, buyer groups, releasability, default hierarchy files, or the like may be created for further processing in data loader 160 data flow.

In embodiments, the analytic platform 100 may enable 'batch' data pull functionality for bringing UPC Select type data into the analytic platform. The output of the data pulls may be passed to the Model Generator 148 for further analytic processing. The Model Generator 148 may be able to use the analytic platform 100 as its data extraction and aggregation platform, including instances when the Model Generator 148 is running analyses independently of the analytic server 134 or other features of the analytic platform.

In embodiments, the analytic platform 100 may have the ability to pass files containing UPC, store and time period lists and to use these files to execute a UPC Select type of data pull. UPC file formats may include a text file containing 13 digit UPC code as concatenated 2 digit system, 1 digit generation, 5 digit item, 5 digit item.

In embodiments, the analytic platform 100 may have the ability to skip any UPCs that cannot be found and provide a list of such UPCs in a log file. In embodiments, the analytic platform 100 may have the ability to handle any number of UPCs as determined by system limits (i.e., many thousands of UPCs may be passed to the LD engine).

In embodiments, a store file format may include a text file containing store numbers (long form, currently 7 digit format). In embodiments, the analytic platform 100 may have the ability to skip any store numbers that cannot be found and provide a list of such stores in a log file. In embodiments, the analytic platform 100 may have the ability to handle any number of stores as determined by system limits (i.e., many thousands of stores, such as a total census, may be handled).

In embodiments, a store file format may include a text file containing week numbers. In embodiments, the analytic platform 100 may have the ability to skip any week numbers it cannot find and provide a list of such weeks in a log file. In embodiments, the analytic platform 100 may be able to handle multiple year's worth of week numbers.

In embodiments, the analytic platform 100 may enable specifying the sort order of the standard UPC Select type output. The fields of the output may include, but are not limited to store, week, UPC, units, cents, feature, display In embodiments, the log file associated with a UPC Select type output may include a text file containing descriptive elements of the data pull including warnings, errors, system statistics, and the like.

Data manipulation and structuring 162 may modify the content, form, shape, organization, or other aspect of data. Data manipulation and structuring 162 may be applied automatically, in response to an explicit request, as a preprocessing step, as an optimization (such as and without limitation an optimization that facilitates future processing that is more rapid, accurate, convenient, or otherwise improved as compared with processing that would otherwise be possible without the optimization), and so on. In embodiments, the data manipulation and structuring facility 162 may perform operations, procedures, methods and systems including data cleansing, data standardization, keying, scrubbing data, validating data (e.g., inbound data), transforming data, storing data values in a standardized format, mapping and/or keying standardized data to a canonical view, or some other data manipulation or structuring procedure, method or system.

The staging table 164 may comprise an intermediate table of data that is drawn from a source table. The staging table 164 may comprise data that is transformed, aggregated, or otherwise processed as compared to its representation in the source table. For example and without limitation, the staging table 164 may contain data from which historical information has been removed, data from multiple sources has been combined or aggregated, and so on. From the staging table 164 a report table or other data may be drawn. In embodiments, the staging table 164 may comprise a hierarchical representation of data that is formed by the MDMH 150 in accordance with a dimension table 172 and/or a hierarchy formation 174. In embodiments, the staging tables 164 may be used as part of the synchronization 170, allowing the ability to adjust the data prior to dimension tables 172. In embodiments, the synchronization facility 170 may be used to synchronize data between the primary and secondary dimension tables 172.

In an embodiment, the data sandbox 168 may be used for storing data, joining data, or the like.

Synchronization 170 may comprise comparing and/or transferring information between two or more databases so as to produce identical data, functions, stored procedures, and the like within the two or more databases. Synchronization 170 may likewise be applied to hierarchies, projections, facts, dimensions, predictions, aggregations, or any and all other information that may be represented as data in a database. Synchronization 170 may occur between database that are available, unavailable, on-line, off-line, and the like. Synchronization 170 may occur as a batch processes or incrementally. Incremental synchronization 170 may cause the data in two or more databases to trend toward being identical over time.

Synchronization 170 may comprise controlling access to a resource, wherein the resource may be a database or an element thereof (i.e. a table, row, column, cell, etc.), a process thread, a memory area, a network connection, and the like. In embodiments, synchronization 170 may be embodied as a lock, semaphore, advisory lock, mandatory lock, spin lock, an atomic instruction, a totally ordered global timestamp, and so on. Synchronization 170 may be implemented in software, hardware, firmware, and the like. Synchronization 170 may comprise deadlock detection and prevention facilities. In embodiments involving a database, synchronization 170 may be associated providing synchronization between and/or within a transaction.

A dimension table 172 may be associated with a fact table. The fact table may contain movement data or other measures and foreign keys that refer to candidate keys in the dimension table 172. The dimension table 172 may comprise attributes or values that are used during an aggregation or other processing of the facts in the fact table. For example and without limitation, the facts in the fact table may contain a code that indicates the UPC of an item sold. A dimension table may contain attributes that are associated with the UPC, such as and without limitation product name, size of product, type of product, or the like. Rows in the dimension table 172 may be associated with or subject to overwrites, tuple-versioning, an addition of a new attribute, and so on, perhaps in association with a change in the attributes that are stored in the table 182.

The dimension tables 172 may be associated with or processed in association with filters. The filters may be stackable into a hierarchical arrangement. Each filter may comprise a query rule. In embodiments, the combination of dimension tables 172 and filters may create attributes that are specific to a particular cell, row, column, collection of cells, table, and so on. In other words, the filters may allow for the application or creation of custom data fields without having to re-engineer the underlying dimension table 172 or data structure.

In an embodiment, a hierarchy formation 174 may create custom hierarchies on demand and may allow a full measure of integrity of non-additive measures. In embodiments, there may be a plurality of custom hierarchies such as total, regional, market, custom market area, market area, all products, products by brand, products by manufacturer, products by carbohydrates, products by launch year, products by vendor, or the like.

In an embodiment, the total hierarchy may included a Venue Group Description for each Venue Group Type equal to a root, a Venue Group Description for each Venue Group Type equal to a Chain, a Venue Banner Name, a Venue Number, or the like.

In an embodiment, the region hierarchy may include a Venue Group Description for each Venue Group Type equal to a root, a Venue Group Description for each Venue Group Type equal to a region, a Venue Group Description for each Venue Group Type equal to a Chain, a Venue Banner Name, a Venue Number, or the like.

In an embodiment, the market hierarchy may include a Venue Group Description for each Venue Group Type equal to a root, a Venue Group Description for each Venue Group Type equal to a Market, a Venue Group Description for each Venue Group Type equal to a Chain, a Venue Banner Name, a Venue Number, or the like.

In an embodiment, the custom marketing area hierarchy may include a Venue Group Description for each Venue Group Type equal to a root, a Venue Group Description for each Venue Group Type equal to a Chain, a Venue Group Description for each Venue Group Type equal to a CRMA, a Venue Banner Name, a Venue Number, or the like.

In an embodiment, the marketing area hierarchy may include a Venue Group Description for each Venue Group Type equal to a root, a Venue Group Description for each Venue Group Type equal to a Chain, a Venue Group Description for each Venue Group Type equal to an RMA, a Venue Banner Name, a Venue Number, or the like.

In an embodiment, the products hierarchy may include an Item Category, an Item Type, an Item Parent, an Item Vendor, an Item Brand, an Item Description, or the like.

In an embodiment, the product by brand hierarchy may include an Item Category, an Item Brand, Item Description, or the like.

In an embodiment, the products by manufacturer hierarchy may include an Item Category, an Item Parent, an Item Description, or the like.

In an embodiment, the products by carbohydrates hierarchy may include an Item Category, an Item Carbohydrates Level, an Item Brand, an Item Description, or the like.

In an embodiment, the products by launch year hierarchy may include an Item Category, an Item Launch Year, an Item Brand, an Item Description, or the like.

In an embodiment, the products by vendor hierarchy may include an Item Category, an Item Launch Year, an Item Vendor, an Item Brand, an Item Description, or the like.

In an embodiment, there may be time hierarchies that may include by year (e.g. year, 13-week, week), 13-week (e.g. 13-week, week), quad (e.g. quarter, week), by week, by rolling 52 week, by rolling 13 week, or the like.

In embodiments, the analytic platform 100 may provide a vehicle for providing a range of services and for supporting a range of activities, either improving existing activities or enabling activities that would previously have been impractical. In embodiments, methods and systems may include a large-scale, global or universal database for new products, investment tools, benchmarks for lifting trade promotions, integration of data (such as integration of data relating to consumption with other data, such as T-Log data), broker portfolio analysis, as well as a range of tools, such as tools for supply chain evaluation, tools for analysis of markets (including efficient and affordable tools for analyzing small markets), tools for analyzing market share (such as retail market-share tools), tools for analyzing company growth, and the like.

In embodiments, the analytic platform 100 may provide a new product and packaging solution that may assist manufacturers or retailers in identifying and managing the attributes of their products, including, in embodiments, across national borders. The analytic platform 100 may be applied to analyze, aggregate, project, and release data gathered from product sales, and enable a distributor of those products improved dimensional flexibility and reduced query-time computational complexity, while allowing an effective integration of database content and releasability rules. The present invention may, among other things, provide for the automatic adjustment to national parameters, such as currency, taxation, trade rules, language, and the like.

In embodiments, the analytic platform 100 may provide improved insight to local, national, and international trends, such as allowing a user to project new product sales internationally based on data gathered from the global sales of similar products in the regions of interest. For example, a user may define an arbitrary geography, such as a sub-region, and using methods and systems disclosed herein, projections and analyses may be made for that arbitrarily defined sub-region, without requiring the modification or re-creation of the underlying database. The present invention may allow the user to more easily access the wide variety of international product sale data, and provide the user with an interface that allows flexibility in accounting for the international variability with greater flexibility and control. For instance, a manufacturer may want to launch a new instant rice product, and to analyze the potential success of the product internationally. The present invention may provide the analyst with data that has been gathered from other similar successful global products, and present the data to the analyst in a flexible format that may account for the variability of the international market place.

In embodiments, financial investment centers may utilize the analytic platform 100 to build a more total manufacturer view that enables the financial investment center a better understanding of the drivers of business gain and loss. Financial investment centers may then use this improved view to increase their ability to predict the effectiveness of a company's new product, and thus provide the financial investment center to better adjust their investments based on the projected success of products. The present invention may provide a user interface to financial investment centers that is customized to their needs, such as by providing tools that are more catered to the knowledge and skills of the financial analyst that is not a specialist in product sales analysis.

The present invention may also provide for services to financial investment centers that produce reports targeting their interests. For instance, the financial investment center may be interested in investing in a new company that is about to release a new line of frozen food products. The financial investment center may be interested in what makes a new line of frozen food products successful, or what parameters drive the success of the product. Knowing these drivers may allow the financial investment center to better predict the success or failure of the company's new venture, and thus better enable successful investment strategies in association with companies that may be affected by the new company's venture. Investment centers may be able to increase profits by utilizing the present invention to better understand the drivers of business gain and loss in association with product sales.

In an embodiment for sales analysis, the analytic platform 100 may allow for a trade promotion lift benchmark database to enable users to compare their lifts to competitor's lifts by RMA. For instance, a company may introduce a trade promotion lift at an end-cap in a supermarket, and want to analyze the effectiveness of their lift in relation to a competitor's lift. The trade promotion lift benchmark database, as a part of the analytic platform 100, may allow users to more effectively evaluate the relative effectiveness of promotion lifts.

In an embodiment for marketing, the analytic platform 100 may allow a user to have their internal consumption data integrated with T-Log data in order to help them better understand consumer response. For instance, a beverage company may integrate their own beverage consumption data with T-Log data within the analytic platform 100. This comparison may help the beverage company to better understand a customer's response to changes in product marketing.

In embodiments, merchandise brokers may use the present invention to better understand product line contributions to revenue and priority management. The analytic platform 100 may present data to brokers in a customized portfolio, such that the brokers may view their total product lines together. Such a simultaneous view format may provide the broker with a clearer picture of how various product lines are performing relative to one another with respect to overall revenue generation. This may enable a better understanding of how to manage their product lines, and how to better manage priorities to maximize the effectiveness of the portfolio of product lines. In embodiments, the portfolio may include a portfolio analysis facility. The portfolio may provide a convenient way to import product line data into the portfolio analysis facility in order to evaluate the effectiveness of changes to the portfolio, thereby allowing the broker to better manage changes in the dynamics of the various lines.

As an example of how brokers may use the analytic platform 100 to improve the performance of their product lines, the brokers may be managing a portfolio of health and beauty aid products. Various product lines may have their revenue data displayed in the presentation of the portfolio, for example through a graphical interface. The displayed data may allow the broker to quickly evaluate the relative performance of various products and product lines with their health and beauty aid product lines. Revenue from the various product lines for hair spray, for instance, may show that one line is experiencing a decline relative to the other product lines. The broker may then be able to use the portfolio analysis facility to change combinations of different product lines in order to better maximize revenue. The present invention may provide brokers with a portfolio tool that improves the efficiency of their product management.

In embodiments, the analytic platform 100 may enable manufactures that provide direct store delivery (DSD) to evaluate route driver performance. The analytic platform 100 may provide for clustering and trading area views to enable performance evaluation. These views may be provided in association with a graphical presentation, a tabular presentation, a text report presentation, a combination of presentations in a report format, or the like, of the route driver performance. Clustering and trading area views may be associated with data collected that links product performance and delivery schedules verses actual delivery times, personnel, time at location, time in route, and the like. The analytic platform 100 may enable DSD companies to better understand the effect of DSD on a company's overall revenue.

As an example of how the analytic platform 100's DSD clustering and trading area view may provide insight into the DSD's effect on revenue, suppose the company is a supplier of fresh bread. The manufacturer of the bread may rely on freshness and low product damage in maximizing product revenue. This DSD company may want to monitor the effect of driver, driver route, schedule, and the like, on revenue. The route driver performance may reveal that a driver is regularly on time, but despite this, has lower effective revenues associated with this driver relative to other drivers on similar routes. This may indicate that the driver may need additional training in displaying the bread products on the shelf. Without the ability to track such effects, through the analytic platform 100, the DSD company may not have noted the anomaly.

In embodiments the analytic platform 100 may provide an affordable facility for the marketers of small brands or smaller companies. The analytic platform 100 may include a self-serve analytics so smaller brands and companies may gain insights in an affordable manner. Smaller companies may not be able to typically have the resources to access market analysis. The present invention may provide facility to small brands or companies that are less supported, and more self guided and directed, than would typically be the case for a larger company with greater resources. This small company analytic platform facility may provide equivalent gains in insight, but in a more affordable manner.

An example of how a small company analytic platform may provide the desired insights into the market, yet at a more affordable level, might involve a small company with a narrow product line, such as small soft drink manufacturer. The soft drink manufacturer may have only a small number of different products, such as different flavors within the same product line. The small soft drink manufacturer may have a desire to track product sales through use of the analytics platform, but lack the financial resources to do so. In addition, the small soft drink manufacturer may require only limited access to the analytic platform, and thus desire a more limited form of access. The small soft drink manufacturer may only be interested in a limited geographic area, for instance. The self-serve small company analytic platform facility may provide a valuable analytical resource to such a user, allowing the user to gain insight into the marketing of their product, at a cost affordable to a small company.

In embodiments, the analytic platform 100 may enable performance insights to retailers to help them understand their market share and performance metrics. The retailer may want to have the ability to track their market share against competition. Data collected by the analytic platform 100 may allow retailers to see how competitive they are relative to their competition, as well as how similar products are selling across similar retailers. Retailers may also be able to track their own performance metrics using data from the analytic platform 100. Retailers may benefit from the aggregation and release of data from the general retailer market, available through the analytic platform 100.

An example of how the analytic platform 100 may enable retailers to better understand their market share may be the case of a pharmaceutical retailer, which sells many of the same products of other pharmaceutical retailers in the geographic area. These retailers may have significant overlap in the product lines they carry, and insight into how various products, and combination of products, sell may determine the degree of financial success achievable by the retailer. A retailer may develop performance metrics to help increase their market share, and the analytic platform 100 may provide the information that more easily allows the retailer to generate these metrics. The development of comprehensive market performance insights through the analytics platform, may help retailers better understand their market share and performance metrics.

In embodiments for mergers and acquisitions (M&A) within CPG companies, the analytic platform 100 may allow for the development of emerging new business insights that may detail growing companies, brands, and attributes. For instance, a company looking for M&A opportunities may be able to use the analytic platform 100's ability to provide insight into identifying and detailing growing companies for the purposes of M&A.

In an embodiment, shipment data integration may involve tracking retailers by the analytic platform 100. For example and without limitation, if a manufacturer sells products to a retailer but no data are accumulated from the retailer, then data related to shipment of product from the manufacturer to the retailer may be uses as a proxy for tracking and inferring retailer activity. Inferences may enable acquisition of data related to total sales across different channels and customers. Inferences may not be able to support share analysis or other measures involving other manufacturers' products in the same category.

In an embodiment, shipment pipeline analysis may be performed to compare shipments to sales. Shipment pipeline analysis may be used to analyze supply chain performance, review response to promotions, identify supply-demand patterns across different chains and distribution centers, and the like. For example and without limitation, shipment pipeline analysis may demonstrate a supply build-up associated with a specific retailer leading up to a promotion, and then the dissemination of the supply to different stores during the execution of the promotion.

In an embodiment, the analytic platform 100 may be configured to perform an out-of-stock analysis. Out-of-stock analysis may determine a root cause for an out-of-stock problem. For example, out-of-stock analysis may determine the root cause of an out-of-stock problem to be due to supply problems in shipments or at the distribution center level.

In an embodiment, the analytic platform 100 may be configured to perform forward buy analysis. Forward buy analysis may analyze customer buying patterns linked to price gaps or price changes. Forward buy analysis may be used to identify areas of lost margin due to customers buying a more than usual amount of goods, such as just before a price change, as part of a promotion, and the like. Forward buy analysis may also involve customers buying more than needed only to resell to another source. Forward buy analysis may identify price arbitrage.

In an embodiment, the analytic platform 100 may be configured to perform "population store" analysis. "Population store" analysis may enable the use of shipment data to better understand sales and performance for stores that traditionally are not tracked in detail. "Population store"

analysis may involve the collaboration of distributors in order to comprehend distributors' shipments to such smaller stores.

In an embodiment, shipment data integration may involve data scope and structure assumptions made by the analytic platform 100. For example and without limitation, each manufacturer may have different coding of item keys, geography keys, and time keys. In another example, each manufacturer may have both direct store delivery and warehouse-type distribution. In another example, each product may have only one mode of distribution for each store. In another example, warehouses or distribution centers may be managed by a manufacturer, a retailer, a third party distributor, and the like. In another example, for direct store delivery, a manufacturer may be able to provide store-level delivery data. In another example, for warehouse delivery, a manufacturer may be able to provide distribution center-level delivery data. In another example, for each retailer or distributor distribution center there may be a single mapping to a fixed set of stores to the distribution center.

In an embodiment, shipment data integration may involve data input assumptions. The manufacturer may handle the majority of any required data formatting and preparation so that the data sent to the analytic platform 100 will require minimal further processing besides mapping and loading. The analytic platform 100 may define a single data file input definition format to be used when manufacturers send their data. The input definition may include details regarding data column attributes and layout, data types, data format, exception handling (NULL, Missing values, etc.), required vs. optional fields, data restatement rules, special character rules, file size restrictions, and the like. The analytic platform 100 may load data files on a regular basis, such as hourly, daily, weekly, monthly, a custom time range, and the like. For example and without limitation, actual and planned shipment data may focus on unit shipments per week, per UPC, per shipment point, price data, other fact information, and the like. At a later release it can be expanded to include also other fact information such as price data.

In an embodiment, shipment data integration may involve data transforms and mapping. For example and without limitation, manufacturers may be required to provide a Universal Product Code ("UPC") for each item. Mapping may comprise association of the UPC with an item. A common code for each store or distribution center may be used. Manufacturers may submit data in a standard data format that may be transformed by the analytic platform 100 week keys as part of the analytic platform 100 data load process. The analytic platform 100 may maintain mapping of master data keys from each manufacturer versus the standard analytic platform 100 dictionary keys. In addition to mapping keys, the data may also include unit of measurement conversion factors for each item UPC. A plurality of manufacturer stock keeping units ("SKUs") may be mapped to analytic platform 100 UPC's since the manufacturer may have several revisions for each SKU. A manufacturer may use different SKUs for shipments of the same product (UPC) to different customers and/or markets.

In an embodiment, shipment data integration may involve data scale and performance. For example and without limitation, a data storage facility for holding manufacturer shipment data may be configured to support receiving and storing shipment data for multiple (e.g., ten) major manufacturers, multiple UPCs (e.g., up to one thousand, or thousands) each, and multiple distribution points (e.g., up to a thousand or thousands) each, for long periods of time (e.g., 250 weeks), and the like. The scale of these data sets may approach more than a billion records (e.g., 1.5 billion records), but may be significantly less due to data sparsity. Weekly update volumes may be reasonable, on the order of less than 0.5 million records per week. Manufacturers may only have access to their own respective data.

In an embodiment, an analytic platform 100 may comprise an internal data extract facility. Geographic variables may be used by the internal data extract facility, such as stores by region, stores by market, stores by retailer trading area, stores by population, stores by income, stores by Hispanic, stores by household size, stores by African-American, stores by distance to competitor, and the like. Product variables may be used by the internal data extract facility, such as all reviews products, products by band, products by manufacturer, product by launch year, products by brand/size, and the like. Causal members may be used by the internal data extract facility, such as any movement, any price reduction, any merchandising, feature only, display only, feature and display, any feature, feature or display, any display, no merchandising, any price reduction, advertised frequent shopper, and the like. Attribute dimensions may be used by the internal data extract facility, such as category, parent, vendor, brand, brand type, flavor/scent, package, size, color, total ounces, carbs, calories, sodium, saturated fat, total fat, cholesterol, fiber, vitamin A, vitamin C, calcium, and the like. Measures, by group, may be used by the internal data extract facility, such as distribution, sales, pricing, sales rate, promotion, assortment, and the like.

In an embodiment, an analytic platform 100 may comprise a market performance facility. Geographic variables may be used by the market performance facility, such as stores by region, stores by market, stores by retailer trading area, total market by region, total market by market, stores by population, stores by income, stores by Hispanic, stores by household size, stores by African-American, stores by distance to competitor, and the like. Product variables may be used by the market performance facility, such as all reviews products, products by band, products by manufacturer, products by brand/size, and the like. Causal members may be used by the market performance facility, such as any movement, any price reduction, any feature, feature or display, any display, no merchandising, any price reduction, advertised frequent shopper, and the like. Attribute dimensions may be used by the market performance facility, such as category, parent, vendor, brand, brand type, flavor/scent, package, size, color, total ounces, and the like.

In an embodiment, an analytic platform 100 may comprise a sales performance facility. Geographic variables may be used by the sales performance facility, such as stores by region, stores by market, stores by retailer trading area, and the like. Product variables may be used by the sales performance facility, such as all reviews products, products by band, products by manufacturer, products by brand/size, and the like. Causal members may be used by the sales performance facility, such as any movement, any price reduction, and the like. Attribute dimensions may be used by the sales performance facility, such as category, parent, vendor, brand, brand type, and the like. Measures, by group, may be used by the sales performance facility, such as sales performance, sales planning, and the like. Other dimensions may be used by the sales performance facility, such as same store sales dimension.

In an embodiment, an analytic platform 100 may comprise a new product performance facility. Geographic variables may be used by the new product performance facility, such as stores by region, stores by market, stores by retailer trading area, and the like. Product variables may be used by the new product performance facility, such as all reviews products, products by brand, products by manufacturer, product by launch year, and the like. Causal members may be used by the new product performance facility, such as any movement, any price reduction, and the like. Attribute dimensions may be used by the new product performance facility, such as category, parent, vendor, brand, brand type, flavor/scent, package, size, color, and the like. Measures, by group, may be used by the new product performance facility, such as new product benchmarking, new product planning, and the like. Other dimensions may be used by the new product performance facility, such as relative time dimension.

In an embodiment, an analytic platform 100 may comprise a shopper insight facility. Geographic variables may be used by the shopper insight facility, such as households by region, households by market, households by account, total market by region, total market by account, and the like. Product variables may be used by the shopper insight facility, such as all reviews products, products by band, products by manufacturer, product by launch year, products by brand/size, and the like. Causal members may be used by the shopper insight facility, such as any movement, and the like. Attribute dimensions may be used by the shopper insight facility, such as category, parent, vendor, brand, brand type, flavor/scent, package, size, color, total ounces, carbs, calories, sodium, saturated fat, total fat, cholesterol, fiber, vitamin A, vitamin C, calcium, and the like. Measures, by group, may be used by the shopper insight facility, such as shopper, consumer, loyalty, and the like.

In an embodiment, an analytic platform 100 may comprise a sales plan performance facility. The sales plan performance facility may provide a framework for consumer sales based planning, monitoring and evaluation of sales performance, and the like. The sales plan performance facility may enable detailed analysis of sales performance on a periodic basis for proactive planning, administration and coaching of the sales force, and the like. The sales plan performance facility may be employed by Sales Executives, Regional Sales VPs, National Account Managers, and the like. Key objectives of the sales plan performance facility may include facilitation of sales go-to-market design, facilitation of sales administration including establishing and monitoring sales play-book and monitoring trade promotion performance in conjunction with sales performance, facilitating brand team collaboration, and the like.

The sales plan performance facility may support consumer packaged goods (CPG) sales organizations. Users may include Account Sales Representatives, Regional/Sales Managers, Sales Executive, and the like. The sales plan performance facility may be designed to provide users with critical information and insights to facilitate efficient and effective sales execution. The sales plan performance facility may also support Brand Team users. For example and without limitation, a user of the sales plan performance facility may be a Brand/Category Managers. Brand/Category Managers may be CPG brand management personnel responsible for launching, tracking and improving brand performance. Brand/Category Managers may be responsible for collaborating with sales management to establish time period based sales targets, responsible for executing against the brand targets. Brand/Category Managers may be responsible for periodic monitoring of progress to ensure that sales targets are met or exceeded. Brand/Category Managers may be compensated in part based on brand performance. Brand/Category Managers may have limited or cumbersome access to critical sales performance information making it challenging to take corrective actions. Brand/Category Managers may be challenged with executing effectively and efficiently in a complex sales environment including competition, market conditions, consumer trends, category/brand interactions, and the like.

In another example, a user of the sales plan performance facility may be a Brand Marketing Manager. Brand Marketing Managers may be CPG brand marketing executives responsible for establishing and managing brand marketing plans and collaborating with the sales organization to define and align brand and sales goals. Brand Marketing Managers may be responsible for working with corporate executives to establish time period based sales, revenue, volume and profitability targets. Brand Marketing Managers may be responsible for the overall strategy and execution of brand marketing plans. Brand Marketing Managers may be responsible for periodic monitoring of progress to ensure that sales targets are met or exceeded. Brand Marketing Managers may be compensated in part based on sales performance and determine compensation for sales personnel based on sales performance. Brand Marketing Managers may have limited or cumbersome access to critical sales performance information making it challenging to take corrective actions. Brand Marketing Managers may be challenged with managing a sales force of different levels of experience and competencies in a complex and competitive environment.

CPG sales organizations may benefit from sales performance focused analysis. Sales performance focused analysis may provide the ability to quickly review and analyze sales and trade performance specific information, analysis and insights at the sales hierarchy and sales territory level. CPG sales organizations may benefit from brand collaboration. Brand collaboration may provide the ability to collaborate with sales management and align brand and sales team goals. CPG sales organizations may benefit from brand marketing collaboration. Brand marketing collaboration may provide the ability to align brand marketing plans with overall brand and sales goals.

In an embodiment, the sales plan performance facility may enable detailed analysis, using retail point of sale data and client specific plan data, of sales and trade promotion performance on a periodic basis for proactive planning, management and coaching of the sales force. The sales plan performance facility may facilitate collaboration with Brand teams to align brand and sales goals. The sales plan performance facility may enable improved sales go-to-market due to its flexible and maintainable sales hierarchy and territory allocation and proactive management of goal allocation based on sales performance. The sales plan performance facility may enable improved Brand team collaboration by providing alignment of brand and sales goals and alignment of brand marketing and sales execution. The sales plan performance facility may enable improved sales performance by providing a sales goals-based play-book to create and execute against.

In an embodiment, the sales plan performance facility may provide flexible maintenance of sales hierarchy and target allocations, tracking and monitoring of trade promotion performance and goals at a granular level of detail, collaboration with brand teams, sales play-book concept for effective execution against sales goals, and the like. The sales plan performance facility may enable sales planning, such as maintaining sales organization hierarchy, maintaining sales performance targets, and the like. The sales plan performance facility may enable sales management, such as sales administration and brand team collaboration. Sales administration may comprise monitoring sales performance including trade promotion performance, establishing and maintaining a sales play-book, and the like. Brand Team collaboration may comprise aligning brand and sales team goals, aligning brand marketing plans with sales objectives, and the like.

CPG sales organizations may have a matrix hierarchy defined to establish the specific scope of responsibilities assigned to the sales personnel. The hierarchy may be defined based on two key dimensions, venue and product (item). The sales plan performance facility may provide flexibility to represent and maintain the hierarchy using these two dimensions using custom hierarchies that are aligned with the sales organization. The custom hierarchies may be created initially and updated on a periodic basis. Initial creation of a custom hierarchy may involve a flat file based data being loaded into the sales hierarchy tables. Sales Organization Hierarchy Tables may be a Division Master containing a list of divisions, a Region Master: containing a list of regions, a Territory Master containing a list of territories which may be assigned to individual sales representatives, Territory Venue Master which may map the territories to the Venue hierarchy. The lowest level venues, such as stores, may be assigned to their respective territories. Sales organization hierarchies may be maintained automatically or manually.

Sales Executives and Sales Managers may define the sales targets to facilitate ongoing monitoring and evaluation of sales performance. Attributes of the sales targets may be Plan Volume (Volume in Lbs or other units), Plan Units (Number of units, Quantity), Plan Dollars (Sales dollars/revenue), Plan Trade Spend (Trade spend dollars), and the like. A user created plan may be disaggregated down to the weekly level using last year weighted week. The sales plan performance facility may support the periodic upload of sales plans. Users of this capability may be Sales Executives, Regional Sales Managers, and the like. Sales Performance targets may be defined with the following process steps: Access the 'Maintain Targets' workspace, Select Sales Rep, Time period Qtr, Update sales targets.

Certain dimensions may be applied to sales planning. Time may be a standard dimension. A user product may be a standard dimension that may be client specific created based on item groupings. A user territory may be a non-standard dimension that may be Client specific created based on geographies. Certain measures may be applied to sales planning. Plan volume, plan units, plan dollars, and plan trade spend may be non-standard measures governed by a UEV formula. User created plans may be stored in a separate database table. Attributes may include quarter, user territory, user product, week, plan volume, plan dollars, plan units, plan trade spend, and the like. The formula for plan volume may be Plan Volume*Last Year (LY) weighted. The formula for plan dollars may be Plan Dollars*LY weighted. The formula for plan units may be Plan Units*LY weighted. The formula for plan trade spend may be Plan Trade Spend*LY weighted.

In an embodiment, sales management may comprise monitoring sales performance to provide users with the ability to track promotion plan performance at the weekly level or some other defined period. Actual retail sales and promotion spend may be reviewed to compare against plan. The capabilities may be based on the sales hierarchy user type, such as Sales Executive, Regional Sales Manager, Sales Representative, and the like. Sales management users may be Sales Executives, Regional Sales Managers, Sales Representatives, and the like. A user workflow for monitoring sales performance may be: Access the 'Monitor Promo Performance' workspace, Access 'Promo Tracking' workspace (Displays current promotion activity, distribution, volume sales. Highlighted incremental volume impacts), Access 'Promo Comparison': (Compares current promotion activity with LY promotion performance), Access 'Promo Spend Tracking' (Compares current promotion spend against planned promotion spend), and the like. Certain dimensions may be applied to sales management. Time may be a standard dimension. A user product may be a non-standard. A user territory may be a non-standard dimension. Certain measures may be applied to sales management. Plan volume, plan units, plan dollars, and plan trade spend may be non-standard measures while actual volume, actual units, actual dollars, and actual trade spend may be standard measures. Plan variance amount may be a non-standard measure governed by the formula (Actual-Plan). Plan variance % may be a non-standard measure governed by the formula (Actual-Plan/Actual. Plan variance % may define conditional formatting for >10% variance.

In an embodiment, the sales performance facility comprises a sales playbook facility which may facilitate sales management. The sales playbook facility may provide sales personnel with key information to support the sales process given the sales objectives. The playbook may consist of key areas of reference, such as Market Performance (Key measures showing LY market performance and value to retailer), Goal Comparison (Comparison of current goals with LY performance), Weekly Status (Evaluation of sales targets at the weekly level to identify and track), Performance Analysis (Sales Decomposition) (Detailed due-to analysis on Account/product, Sales Representative performance—base volume, incremental volume, distribution, average items per store selling, Competitive set changes), and the like. Users of the sales playbook facility may be Sales Executives, Regional Sales Managers, Sales Representatives, and the like. A user workflow for a sales performance evaluation may be: Access the 'Sales Playbook' workspace, Access 'External Sales Playbook' (This capability may enable users to create an external sales playbook and access it from the sales performance facility), Access 'Market Performance' (Display LY sales performance metrics and value to retailer), Access 'Goal Comparison' (Display current sales targets, actual and LY performance), Access 'Weekly Status' (Display current week, week—1, week—2, and weekly sales target to assess performance trends and opportunities), Access 'Performance Analysis' (Display sales decomposition metrics—base volume, incremental volume, distribution, competitive activity for current week, week—1, week—2, week—3), and the like. Certain dimensions may be applied to the sales playbook facility. Time, account, and product may be standard dimensions. A territory may be a non-standard dimension that may be client specific created based on geographies. An account grouping may be a non-standard dimension that may be client specific created based on a sales representative assignment. A product grouping may be a non-standard dimension that may be client specific created based on a sales representative assignment. All measures described herein may be applied to the sales playbook facility.

In an embodiment, the sales performance facility comprises a Brand Team Collaboration facility to facilitate sales management. The Brand Team Collaboration facility facilitates collaboration between brand teams and sales teams. Certain objectives of the Brand Team Collaboration facility may be to ensure alignment of brand goals and sales objectives, ensure alignment of brand marketing plans with sales planning and activities, and the like. Users of the Brand Team Collaboration facility may include Sales Executives, Regional Sales Managers, Sales Representatives, Brand Executives, Brand Managers, and the like. A user workflow may be Access the 'Brand Collaboration' workspace, Access 'Sales Targets' folder (Display sales targets at the quarterly level for brand teams), Access 'Promo Performance' (Display sales and promo performance metrics at the quarterly level for brand teams), and the like. Certain dimensions may be applied to the Brand Team Collaboration facility. Time, account, and product may be standard dimensions. A territory may be a non-standard dimension that may be client specific created based on geographies. An account grouping may be a non-standard dimension that may be client specific created based on a sales representative assignment. A product grouping may be a non-standard dimension that may be client specific created based on a sales representative assignment. Certain non-standard measures may be applied to the Brand Team Collaboration facility, including Plan Volume, Plan Units, Plan Dollars, Plan Promo Spend, Actual Volume, Actual Units, Actual Dollars, % ACV Measures, and the like.

Measures that may be applied to the sales performance facility include standard measures such as Base Unit Sales, Base Volume Sales, Base Dollar Sales, Incremental Unit Sales, Incremental Volume Sales, Incremental Dollar Sales, Weighted Average Base Price per Unit, Price per Unit, Price per Volume, ACV Weighted Distribution, % Increase in Units, % Increase in Dollars, % Increase in Volume, Category Dollar Share, Category Unit Share, and Category Volume Share. Additional measures may include Total Category Dollar Sales, Total Category Unit Sales, Total Category Volume Sales, Account Sales Rate (Units) Index, Account Sales Rate (Dollars) Index, Account Sales Rate (Volume) Index, Product Sales Rate (Units) Index, Product Sales Rate (Dollars) Index, Product Sales Rate (Volume) Index, Product Price Index, Dollar Sales Category Rank, Unit Sales Category Rank, Volume Sales Category Rank, Category Incremental Volume, Category Incremental Dollars, Category Incremental Units, Number of TPR, Number of Display, Number of Feature, Category Number of TPR, Category Number of Display, Category Number of Feature, Planned Trade Spend, Actual Trade Spend, Trade Spend Variance Amount, Trade Spend Variance %, Planned Trade ROI, Actual Trade ROI, Trade ROI Variance Amount, Trade ROI Variance %, Incremental Volume Index (Incr. Volume/Category Incremental Vol), Incremental Dollars Index, Incremental Units Index, Sales performance criteria—Volume, Sales performance criteria—Revenue, Sales performance criteria—Units, Sales performance criteria—Trade spend, Sales performance threshold amount, Sales performance threshold quantity, Sales performance threshold %, Sales performance variance amount, Sales performance variance %, Compensation amounts, Projected compensation amount, Target Sales Volume, Target Sales Units, Target Sales Dollars, Target Category Share, and the like.

In an embodiment, incremental quality audit and assurance may ensure implementation of the specifications and requirements of the sales performance facility. In an embodiment, the sales performance facility may be associated with a user manual. The user manual may be a standard baseline user guide that describes the business process, workflow, use cases, and the like. The sales performance facility may be associated with an implementation guide. The implementation guide may include standard templates for timeline, project plan, configuration of the facility for a client, and the like. The sales performance facility may be associated with documentation of facility specific dimensions and measures including calculations used.

The analytic platform 100 may provide for a sales performance analyzer, an on-demand software application for CPG manufacturing sales. The analytic platform 100 may help maximize sales performance and improve attainment of revenue growth goals by giving sales management the ability to see the marketplace and their customers through hierarchies that represent their organization and that of their customers. It may provide sales executives within the CPG industry the ability to perform detailed analysis of revenue and sales team performance in a manner that is directly aligned with sales organization structure and user-defined territories. The sales performance analyzer may include workflows for benchmarking and trend analysis that may provide faster and more accurate response to sales activity.

The sales performance analyzer may support the end-to-end sales planning and management process, and may include a set of analyses and benchmarks, such as custom geographies, sales planning and tracking, executive dashboards, sales performance, same store sales, projected sales, driver analysis, stakeholder reports, or the like. Custom Geographies may create custom geography and store groups aligned to sales and account organizations, where projection factors may be updated without restatements as the organizations evolve. Sales planning and tracking may manage sales plans per account and time period, for example, tracking actual performance versus plan on weekly and monthly basis. Executive dashboards may identify out-of-bound conditions and quickly attend to areas and key performance indicators that require action. Sales performance may analyze key performance metrics, including account, category and territory benchmarks against designated competitive products. Same store sales may perform analysis on an all-stores or on a same-stores basis for periods of time, for instance for four, 13 and 52 week time periods. Projected sales may provide analysis on project sales by product, account, and geography during the course of a period of time, for instance quarterly, and get early updates of expected performance. Driver analysis may provide an understanding of the drivers behind sales movement, such as category trends, price, and promotion actions and assortment changes. Stakeholder reports may provide detailed evaluation and sales performance insights for each stakeholder, such as sales representatives, managers, executives and the like, including plan tracking, account, product and geography snapshots, sales report cards, performance rankings, leader and laggard reporting, account and category reviews, and the like.

The analytic platform 100 may provide a market and consumer information platform that combines advanced analytic sciences, data integration and high performance data operations to applications, predictive analytics, and business performance reports in an on-demand fashion. The analytic platform 100 may provide unique levels of cross-category and cross-attribute analysis, and feature flexible hierarchy capabilities to combine information based on common attributes and reduce the need for restatements. It may include data for any set of products, retailers, regions, panelists and stores at the lowest and most granular level.

In embodiments, consumer loyalty data may be available from a fact data source 102 and/or a dimension data source 104, and may be linked, such as through the use of a key. For example, key-based fusion of fact 102 and dimension loyalty data 104 can be used to relate loyalty card data (e.g., Grocery Store 1 loyalty card, Grocery Store 2 loyalty card, and Convenience Store 1 loyalty card) that are available for a single customer, so that the fact loyalty data from multiple sources can be used as a fused loyalty data source for analysis on desirable dimensions.

In embodiments the data loading facility 108 may comprise any of a wide range of loyalty data loading facilities, including or using suitable connectors, bridges, adaptors, extraction engines, transformation engines, loading engines, data filtering facilities, data cleansing facilities, data integration facilities, or the like, of the type known to those of ordinary skill in the art or as disclosed herein and in the documents incorporated herein by reference. In embodiments, the data loading facility 108 may include a data harvester 112. The data harvester 112 may be used to load data to the platform 100 from data sources of various types. In embodiment the data harvester 112 may extract fact loyalty data from fact data sources 102, such as legacy data sources. Legacy data sources may include any file, database, or software asset (such as a web service or business application) that supplies or produces data and that has already been deployed. In embodiments, the data loading facility 108 may include a causal fact extractor 110. A causal fact extractor 110 may obtain causal data that is available from the loyalty data sources and load it to the analytic platform 100. Causal loyalty data may include data relating to any action or item that is intended to influence consumers to purchase an item, and/or that tends to cause changes, such as data about product promotion features, product displays, product price reductions, special product packaging, or a wide range of other causal data. In various embodiments, there are many situations where a store will provide POS loyalty data and causal loyalty information relating to its store. For example, the POS loyalty data may be automatically transmitted to the loyalty facts database after the sales information has been collected at the stores' POS terminals. The same store may also provide information about how it promoted certain products, its store or the like. This data may be stored in another loyalty database; however, this causal loyalty information may provide one with insight on recent sales activities so it may be used in later sales assessments or forecasts. Similarly, a manufacturer may load product attribute data into yet another database and this data may also be accessible for sales assessment or projection analysis.

In embodiments, loyalty data that is obtained by the data loading facility 108 may be transferred to a plurality of facilities within the analytic platform 100, including the data mart 114. In embodiments the data loading facility 108 may contain one or more interfaces 182 by which the loyalty data loaded by the data loading facility 108 may interact with or be used by other facilities within the platform 100 or external to the platform. Interfaces to the data loading facility 108 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data loading facility 108. The interfaces 182 may support interactions with the data loading facility 108 by applications 184, solutions 188, reporting facilities 190, analyses facilities 192, services 194 (as described herein) or other entities, external to or internal to an enterprise. In embodiments these interfaces may be associated with interfaces 182 to the platform 100, but in other embodiments direct interfaces may exist to the data loading facility 108, either by other components of the platform 100, or by external entities.

In embodiments the data mart facility 114 may be used to store loyalty data loaded from the data loading facility 108 and to make the loyalty data loaded from the data loading facility 108 available to various other entities in or external to the platform 100 in a convenient format. Within the data mart 114 facilities may be present to further store, manipulate, structure, subset, merge, join, fuse, or perform a wide range of loyalty data structuring and manipulation activities. The data mart facility 114 may also allow storage, manipulation and retrieval of metadata, and perform activities on metadata similar to those disclosed with respect to data. Thus, the data mart facility 114 may allow storage of loyalty data and metadata about facts (including sales facts, causal facts, and the like) and dimension data, as well as other relevant data and metadata. In embodiments, the data mart facility 114 may compress the loyalty data and/or create summaries in order to facilitate faster processing by other of the applications 184 within the platform 100 (e.g. the analytic server 134). In embodiments the data mart facility 114 may include various methods, components, modules, systems, sub-systems, features or facilities associated with the loyalty data and metadata. For example, in certain optional embodiments the data mart 114 may include one or more of a security facility 118, a granting matrix 120, a data perturbation facility 122, a data handling facility, a data tuples facility 124, a binary handling facility 128, a dimensional compression facility 129, a causal bitmap fake facility 130 located within the dimensional compression facility 129, a sample/census integration facility 132 or other data manipulation facilities as described herein.

In embodiments the data mart facility 114 may contain one or more interfaces 182, by which the loyalty data loaded by the data mart facility 114 may interact with or be used by other facilities within the platform 100 or external to the platform. Interfaces to the data mart facility 114 may include human-readable user interfaces, application programming interfaces (APIs), registries or similar facilities suitable for providing interfaces to services in a services oriented architecture, connectors, bridges, adaptors, bindings, protocols, message brokers, extraction facilities, transformation facilities, loading facilities and other data integration facilities suitable for allowing various other entities to interact with the data mart facility 114. These interfaces may comprise interfaces 182 to the platform 100 as a whole, or may be interfaces associated directly with the data mart facility 114 itself, such as for access from other components of the platform 100 or for access by external entities directly to the data mart facility 114. The interfaces 182 may support interactions with the data mart facility 114 by applications 184, solutions 188, reporting facilities 190, analyses facilities 192, services 194 (each of which is describe in greater detail herein) or other entities, external to or internal to an enterprise.

In embodiments, the analytic platform 100 may process loyalty data based at least in part on the use of a model generator 148, analytic server 134, analytic workbench 144, master data management hub 150, projection facility 178, and/or similarity facility 180, as described herein.

In embodiments, the analytic platform 100 may provide for customer centric retailing through loyalty analytics solutions, where loyalty analytics may be grouped into a plurality of categories, such as assortment management, new products, promotion, pricing, CRM targeting, score-carding, diagnostics, profiling, and the like. Assortment management analytic solutions may include product item performance analysis of what items drive growth, product cross shopping analysis of how many customers cross shop a product, brand rationalization analysis addressing how to rationalize brands with minimal impact on category performance, brand switching analysis of what brand switching dynamics are within a category, assortment delisting analysis of which items may be delisted without negative impact on a category, or some other analytic solution.

New product loyalty analytic solutions may include new product key metrics addressing what the key metrics are for a new product, new product key metric trends addressing how product performance is trending, new item impact tracker addressing how new products perform and how this may affect a category, new product source of volume analysis of what the sources of volume are for a new product, new product trial and repeat analysis addressing how likely short and long term success would be for a new product, or some other product analysis.

Promotion loyalty analytic solutions may include a promotion tracker addressing how a recent promotional event compares against historical periods; promotion impact analysis addressing whether a product was positively impacted by a recent promotional event; promotion segment impact analysis addressing how customer segments respond to the promotion; brand promotion competitive impact analysis addressing how a brand's promotion affected competitors; single product event analysis addressing how a promotional event impacted a product, competitive products, and category; multi-product event analysis addressing how a multi-product event impacted participating products, competitive products, and category; basket distribution analysis addressing how a basket may vary by time, product, customer, and geography; and source of promoted volume analysis addressing how product volume may change as a result of new merchandising tactics.

Pricing loyalty analytic solutions may include a price tracker addressing how a price changes over time, price comparer addressing how an item's price compares to key competitors, price cliff analysis addressing what absolute price points drive substantial volume increases or decreases for an item, price gap analysis addressing how an item relative price influences volume, or some other type of pricing analysis.

CRM targeting loyalty analytic solutions may include CRM product targeting addressing who are the target households for a product CRM campaign, CRM product cross promotion targeting addressing who are the target households for a cross promotion CRM campaign, CRM usage and loyalty targeting addressing how to use usage and loyalty levels to create CRM targets, CRM migration analysis targeting addressing what households to target to offset migration trends, CRM targeting of the highest spending category addressing which categories do target households spend the most on, CRM targeting of the three highest spending categories addressing what top three categories do target households spend the most on, CRM targeting of the percentage of households purchasing categories addressing how many target households purchase each category in the store, CRM targeting of store distribution addressing what the best and worst stores are for the target households, CRM targeting of favorite brand in category addressing what brands are purchased most often for a selected category and particular segments, CRM targeting of the percentage of households purchasing brand in category addressing how many target households purchase each brand in a category, target share of category requirements for favorite brand addressing how many target households' category needs are met by their favorite brand within a category, or some other type of CRM analysis.

Scorecarding loyalty analytic solutions may include product key performance indicators (KPI) addressing what are the product KPIs, product KPI trends addressing what are the product KPI trends, customer segment KPIs addressing what are the customer segment KPIs, customer segment KPI trends addressing what are the customer segment KPI trends, geography KPIs addressing what are the geography KPIs, geography KPI trends addressing what are the geography KPI trends, or some other type of scorecarding analysis.

Diagnostic loyalty analytic solutions may include product trip key metrics addressing what trip types drive product performance; customer segment sales category drivers addressing what categories drive customer segment performance; store performance analysis addressing how performance compares across stores; target store distribution analysis addressing what the best and worst stores are for the target households; customer distribution analysis addressing how do customers vary by time, product, and geography; market basket analysis addressing what other items are purchased with my product, and the like.

Profiling loyalty analytic solutions may include product customer profile addressing which customer segments purchase my product, customer segment key metrics addressing what are the key metrics for the customer segments, customer segment item appeal addressing which items appeal to which customer segments, geography benchmarking addressing how the different geographies and store clusters compare against each other, and the like.

In embodiments, the analytic platform 100 may enable loyalty analytics associated with product key performance indicators, where the business issue may be the determination of product performance on key measures. The application of the analysis may include a decision group, such as key performance indicators, diagnostics, and the like, where the analysis specification may include a plurality of dimensions and measures. Dimensions may be by selected products, by listed measures, for selected geographies, for strategic customer segments, for a selected time period, and the like. Measures may include net dollars, percentage of net dollars, number of units, number of trips, net dollars per trip, number of households, share of households, net dollars per household, trips per household, units per household, and the like. In embodiments, this analysis may be performed on-demand, scheduled, ad-hoc, or according to some other criterion. In addition, the delivery of the analysis may include a plurality of methods, such as by email notification with a link to a web page containing the specific analytic, logging in to access the web page containing the specific analytic, and the like.

An example of a loyalty analytic that may help determine the product performance on key measures may be a manufacturer that produces prepackaged, refrigerated calzones. The manufacturer may want to determine the share of households in suburban north-west New Jersey that have purchased the product during the month of June 2007. In this instance, two dimensions have been chosen, for selected geographies and for selected time period, and one measure has been chosen, for the number of households. Alternatively, a measure of net dollars per trip could be added as a measure, thus providing the manufacturer with not only how many households purchased the product for the specified geographic region and time period, but also what kind of trip was associated with the product's purchase, such as a trip to the store specifically for that night's meal or purchased ahead of time as a part of a restocking trip. In embodiments, the loyalty analytic associated with product performance on key issues may enable a purveyor of food products to determine their product performance on key measurements.

In embodiments, the analytic platform 100 may enable loyalty analytics associated with geographic benchmarking, where the business issue may be the determination of how different geographies and store clusters compare with one another. The application of the analysis may include a decision group, such as profiling, diagnostics, and the like, where the analysis specification may include a plurality of dimensions and measures. Dimensions may be by listed measures, by selected geographies, for selected products, for a selected time period, for strategic customer segments, and the like. Measures may include net dollars, number of households, share of households, percentage of stores selling, net dollars that have changed vs. another time period (such as a year ago), number of households that have changed vs. another time period, net dollars per households that have changed vs. another time period, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how different geographies and store clusters compare against each other may be a retail chain-store owner who, having stores clusters in several different geographic regions, would like to determine how each store cluster is improving relative to certain selected products. For instance, the retail chain store may be a pharmaceutical/healthcare chain that also sells many of the products that a mini-market might sell, and the retailer would like to determine how their market share in those mini-market type items is growing in the various geographic locations. The retailer may then specify to analyze the dimensions for selected products and geographies, and the measures of net dollars per household vs. a year ago. In this way, the retailer may be able to see if household dollars are migrating to their stores for the specified products in the different geographic areas where they have store clusters. From the output of this analysis the retail store owner may see growth of markets in some geographic areas, but not in others. This information may in turn spur further analysis to determine the causes for these discrepancies and by doing so provide insight as to how to remove them, and thus increase their overall market share across all geographic regions. In embodiments, the loyalty analytic associated with geographic benchmarking may enable the comparison of different geographies and store clusters and compare them against one another.

In embodiments, the analytic platform 100 may enable loyalty analytics associated with store performance analysis, where the business issue may be how performance compares across stores. The application of the analysis may include a decision group, such as diagnostics, profiling, and the like, where the analysis specification may include a plurality of dimensions and measures. Dimensions may be by selected products, by listed measures, for selected products, for selected time periods, for strategic customer segments, and the like. Measures may include net dollars, share of dollars, number of households, share of households, net dollars change vs. a previous time period (such as a year ago), number of households change vs. a previous time period, net dollars per household change vs. a previous time period, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help compare the performance across stores may be the owner of a supermarket chain that is located across a given geographic area, who wants to determine how identical end-cap specials are performing across the store chain. In this instance, the owner of the supermarket chain may specify dimensions of selected products or strategic customer segments to match the end-cap product placements, and measures of net dollars or share of dollars relative to total store sales. With these dimensions and measures the store owner may be able to directly compare how each store is performing relative to one another, and thus begin a more detailed evaluation, and perhaps further analysis, to determine how to improve those stores that did not perform as well. In embodiments, the loyalty analytic associated with store performance analysis may enable a store owner to compare the performance across stores.

In embodiments, the analytic platform 100 may enable loyalty analytics associated with geography key performance indicators, where the business issue may be the determination of geography trends on key performance indicators. The applications of the analysis may include a decision group, such as key performance indicators, geography profiling, geography diagnostics, and the like, where the analysis specification may include a plurality of dimensions and measures. Dimensions may be by selected geographies, by listed measures, by selected time periods, for strategic customer segments, for selected products, and the like. Measures may include percent of net dollars, net dollars, units, number of trips, dollars per trip, share of households, number of households, dollars per household, trips per household, units per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine the geography trends on key performance indicators may be a manufacturer of suntan lotion, who sells their product in both the urban and suburban region around New York City. The manufacturer may want to determine how their products sell in these two different geographies during a summer heat wave, where people may be heading to the ocean beaches for relief from the heat. That is, where do people of these two geographic regions purchase their suntan lotion before going to the beach? In this instance, the manufacturer may choose the dimensions of selected geographies, for selected time periods, and for selected products, and measures of units sold and dollars per trip. These dimensions and measures may provide the manufacturer with insight as to where the consumer purchases their suntan lotion when going to the store specifically for the purchase of items for going to the beach on the spur of the moment. In embodiments, the analytics associated with geography trends on key performance indicators may enable the determination of how geography is affecting performance relative to geographic factors.

In embodiments, the analytic platform 100 may enable loyalty analytics associated with customer segment item appeal, where the business issue may be the determination of which items appeal to which customer segments. The application of the analysis may include a decision group, such as customer profiling, assortment, new products, and the like, where the analysis specification may include a plurality of dimensions and measures. Dimensions may be by measures, by strategic customer segments, for selected products, for selected geographies, for selected time periods, and the like. Measures may include the number of households, number of trips, segment of shares of dollars, segment penetration, segment share of trips, household index, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine which items may appeal to which customer segments may be a producer of organic milk, who may want to know what customer segments find an organic milk product to be appealing. In this instance, two dimensions may be chosen, such as strategic customer segments and selected products, as well as the measure of segment penetration. In this way, the producer may be able to determine what market penetration they have for the different customer segments. In embodiments, the loyalty analytic associated with which items may appeal to which customer segments may enable a user to better focus on customer segments that prefer their product.

In embodiments, the analytic platform 100 may enable loyalty analytics associated with customer segment sales category drivers, where the business issue may be the determination of which categories drive customer segment performance. The application of the analysis may include a decision group, such as profiling, and the like, where the analysis specification may include a plurality of dimensions and measures. Dimensions may be by selected categories, by strategic segments, for selected time period, for listed measures, for selected geographies, and the like. Measures may include number of households, net dollars per household, trips per household, units per household, percentage on any promotion, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine what categories drive customer segment performance may be a supermarket chain wanting to determine what products drive the performance amongst the elderly clientele. For instance, it may be bread and cereal products that determine, and drive, whether the elderly client base is performing well. In this instance, the most important dimension to evaluate may be by strategic segments, and the measures may include net dollars per household, units per household, and percent on any promotion. From these dimensions and measures the supermarket chain may be able to determine what products dominate as a percentage of sales to elderly clients, what products are common across all elderly clients, what products purchased in association with bread products are sold, and the like. In embodiments, the loyalty analytic associated with customer segment sales category drivers may help determine which categories drive customer segment performance.

In embodiments, the analytic platform 100 may enable loyalty analytics associated with promotion tracking, where the business issue may be how a recent promotional event compares against another time period. The application of the analysis may include a decision group, such as promotion, diagnostics, and the like, where the analysis specification may include a plurality of dimensions and measures. Dimensions may be by selected products, by listed measures, for selected time periods, for selected geographies, for strategic customer segments, and the like. Measures may include net dollars, number of units, number of households, dollars per unit, percent of promotional retail discount, percentage of net dollars on promotion, average percent on any markdown, average percent on retail markdown, average percent on manufactured markdown, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how a recent promotional event compares against another time period may be manufacturer of prepackaged lunch foods, who wants to determine how they have performed over the last few years as a result of their back-to-school promotional. In this instance, several dimensions may have been selected, such as selected products, selected time periods, and strategic customer segments. Measures selected may include number of units sold, percent net dollars on promotional, and number of households. These dimensions and measures may provide the manufacturer with how certain products did with respect to the targeted customer segment during subsequent back-to-school promotions. From this data, the manufacturer may be able to better correlate promotional focus, units sold, and product trends. It could be that a product sells better when promoted, sells despite promotion, or is trending down despite promotion. In embodiments, the loyalty analytic associated with promotional tracking may enable the manufacturer to determine how recent promotional events compare against another time period.

In embodiments, the analytic platform 100 may enable loyalty analytics associated with promotion segment impact analysis, where the business issue may be the determination of how customer segments respond to promotions. The application of the analysis may include a decision group, such as promotion, and the like, where the analysis specification may include a plurality of dimensions and measures. Dimensions may be by listed measures, by selected products, by strategic segments, for selected geographies, for selected time periods, and the like. Measures may include net dollars, number of households, net dollars per unit, percentage of promotional retail discount, percent net dollars on promotion, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how customer segments respond to the promotion may be a manufacturer of soda, who wants to know to what degree different customer segments purchase more soda when there is a promotion going. In this instance, the manufacturer may select to evaluate dimensions by selected products, by strategic segments, and selected time periods. Measures to be evaluated may include net dollars and percent net dollars on promotion. By selecting time periods during which a promotion is on, as well as a time period during which the promotion is off, the manufacturer may be able to determine how different customer segments are affected by the promotion. For instance, families may respond strongly to the promotion because they tend to drink a lot of soda, and buying in bulk during a promotion allows them to decrease their overall household cost over time. On the other hand, singles may not be greatly affected by the promotion because they don't drink a large amount of soda, and also tend to purchase as they need, as opposed to stocking ahead. As a result, the manufacturer may focus promotions on the family segment, and not on singles. In embodiments, the loyalty analytic associated with promotion segment impact analysis may enable a manufacturer to determine how customer segments respond to promotions.

In embodiments, the analytic platform 100 may enable loyalty analytics associated with price comparison, where the business issue may be the determination of how an item's price compares to a competitor's price. The application of the analysis may include a decision group, such as pricing, diagnostics, and the like, where the analysis specification may include a plurality of dimensions and measures. Dimensions may be by selected products, by listed measures, by actual and year ago, for selected geographies, for strategic customer segments, for selected time period. Measures may include net dollars per unit, percentage of promotional retail discount, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help in the comparison between an item's price and a competitor's price may be a manufacturer of deodorant, who wants to know how the price on their men's roll-on antiperspirant compares to the price of a competitor's men's roll-on antiperspirant. In this instance, the manufacturer may select to evaluate dimensions by selected products and by actual and a year ago. Measures to be evaluated may include net dollars per unit. By selecting product cost per unit for today's price and the price from a year ago, the manufacturer may be able to not only compare today's prices, but see how each product's price has trended over the past year. In embodiments, the loyalty analytic associated with price comparison may enable a manufacturer to determine how a competitor's prices compare to their own.

In embodiments, the analytic platform 100 may enable loyalty analytics associated with price tracking, where the business issue may be the determination of how a product's price and buying rates are trending. The application of the analysis may include a decision group, such as pricing, diagnostics, and the like, where the analysis specification may include a plurality of dimensions and measures. Dimensions may be by selected products, by selected time periods, for selected geographies, for strategic customer segments, and the like. Measures may include net dollars, number of units, dollars per unit, number of households, net dollars per households, units per household, number of trips, net dollars per trip, trips per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how a product's price and buying rates are trending may be a supermarket chain that has their own brand of paper towels, who wants to know how their store brand sells as a function of its price. In this instance, the supermarket chain may select to evaluate dimensions by selected products, and measures of dollars per unit and units per household. With this data, the supermarket chain may be able to determine the number of units sold as a function of the price of the product. For instance, as the price approaches the next least expensive brand name, people may begin to shift over to the brand name. Knowing this roll-off point, that is the price point at which sales begin to decline, may allow the supermarket chain to choose the optimum price for their store band of paper towels. In embodiments, the loyalty analytic associated with price tracking may enable the supermarket to determine how a product's price and buying rates are trending.

In embodiments, the analytic platform 100 may enable loyalty analytics associated with product key metric trends, where the business issue may be the determination of how a product's performance is trending on key measures. The application of the analysis may include a decision group, such as new products, profiling, diagnostics, and the like, where the analysis specification may include a plurality of dimensions and measures. Dimensions may be by listed measures, by selected time periods, for selected geographies, for selected products, for strategic customer segments, and the like. Measures may include net dollars, number of units, number of households, share of households, number of trips, number of stores selling, net dollars per unit, trips per household, net dollars per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how a product's performance is trending on key measures may be a manufacturer of frozen fruit bars, who wants to know how their product is selling in the key area of family households in suburban markets. In this instance, the manufacturer may select to evaluate dimensions for selected products and for strategic customer segments, and measures of share of households and net dollars per household. With this data, the manufacturer may be able to determine the number of units sold into a household, and the share of households that the products sold into. If selling into this market is a key measure of the performance of the product, then tracking this result over time may provide the manufacturer with a direct measure of how the product is performing in the marketplace. In embodiments, the loyalty analytic associated with product key metric trends, may enable a business to determine how a product's performance is trending on key measures.

In embodiments, the analytic platform 100 may enable loyalty analytics associated with promotion impact analysis, where the business issue may be the determination of the response during a recent promotional event. The application of the analysis may include a decision group, such as promotion, diagnostics, and the like, where the analysis specification may include a plurality of dimensions and measures. Dimensions may be by listed measures, by selected time periods, for selected geographies, for strategic customer segments, for selected products, and the like. Measures may include net dollars, number of households, net dollars per unit, percent of promotional retail discount, percent of net dollars on a promotional, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine the response to a recent promotional event may be a food store owner, who wants to understand the impact of a canned food promotion on the sales of non-promotional items in the same aisle as the canned food. In this instance, the food store owner may select to evaluate dimensions by selected products and selected time periods, and measures of net dollars per unit. With this data that food store owner may gain an understanding of what peripheral foods may be affected by the canned food promotional, and in the future may change what foods are in the canned food aisle during promotion in order to help move those products though association with the promotion. In embodiments, the loyalty analytic associated with promotion impact analysis may help determine the response to other products during a promotional event.

In embodiments, the analytic platform 100 may enable loyalty analytics associated with product key performance indicator trends, where the business issue may be the determination of product trends with respect to key performance indicators. The application of the analysis may include a decision group, such as key performance indicators, diagnostics, and the like, where the analysis specification may include a plurality of dimensions and measures. Dimensions may be by selected products, by listed measures, by selected time periods, for selected geographies, for strategic customer segments, and the like. Measures may include percent of net dollars, net dollars, number of units, number of trips, net dollars per trip, share of households, number of households, net dollars per households, trips per households, units per households, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine product trends with respect to key performance indicators may be a manufacturer of a hot chocolate, who wants to validate whether their key performance indicator of cold weather increases sales. In this instance, the manufacturer may select to evaluate dimensions by selected products and selected time periods, and measures of net dollars and units per household. With this data the manufacturer would expect to see that sales of hot chocolate increase with colder weather. However, the manufacturer may find that the data is somewhat inconsistent, and upon further analytic passes determines that it is not only cold weather that drives sales, but cold weather with snow, and as a result the manufacturer may alter their key performance indicators to reflect these new insights. In embodiments, the loyalty analytic associated with product key performance indicator trends may help determine product trends with respect to key performance indicators.

In embodiments, the analytic platform 100 may enable loyalty analytics associated with product item performance, where the business issue may be the determination of which items drive revenue growth. The application of the analysis may include a decision group, such as assortment, profiling, diagnostics, and the like, where the analysis specification may include a plurality of dimensions and measures. Dimensions may be by selected products, for selected geographies, for strategic customer segments, for selected time periods, and the like. Measures may include net dollars, net dollars percentage change vs. a year ago, number of households percent change vs. a year ago, number of trips percent change vs. a year ago, number of units percent change vs. a year ago, net dollars per trip change vs. a year ago, percent net dollars on promotion change vs. a year ago, net dollars per unit change vs. a year ago, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine which items drive revenue growth may be a store owner, who wants to know what items sell in correlation with the store's total revenue growth. In this instance, the store owner may select to evaluate dimensions by selected products and time periods, and measures of net dollars percentage change. With this data, and selecting time periods during key dips or spikes in total store revenue, the store owner may be able to determine if a product, or product line, correlates to the stores revenue growth. In this case, the store owner may have to iterate the analytic with different products in order to find products that appear to mirror store revenue trends. In embodiments, the loyalty analytic associated with product item performance may help determine which items drive revenue growth.

In embodiments, the analytic platform 100 may enable loyalty analytics associated with geography key performance indicators, where the business issue may be the determination of the geography key performance indicators. The application of the analysis may include a decision group, such as key performance indicators, diagnostics, and the like, where the analysis specification may include a plurality of dimensions and measures. Dimensions may be by selected geographies, by listed measures, for strategic customer segments, for selected products, for selected time periods, and the like. Measures may include net dollars, percent of net dollars, number of units, number of trips, net dollars per trip, number of households, share of households, net dollars per household, trips per household, units per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine geography key performance indicators may be a manufacturer of breakfast cereals, who wants to know what geographic indicators determine the performance of high sugar content cereals in urban, suburban, and rural areas. In this instance, the manufacturer may select to evaluate dimensions by selected geographies and for selected products, and measures by share of households and units per household. With this data the manufacturer may be able to determine which of the geographic regions sells the most high sugar cereals. With this insight, the manufacturer may be able to adjust distribution of product as per this new key performance indicator. In embodiments, the loyalty analytic associated with geography key performance indicators may help determine geography key performance indicators.

In embodiments, the analytic platform 100 may enable loyalty analytics associated with customer segment key performance indicator trends, where the business issue may be the determination of customer segments trends on key performance indicators. The application of the analysis may include a decision group, such as trending, diagnostics, and the like, where the analysis specification may include a plurality of dimensions and measures. Dimensions may be by strategic customer segments, by listed measures, selected time periods, for selected geographies, for selected products, and the like. Measures may include net dollars, percent of net dollars, number of units, number of trips, net dollars per trip, number of households, share of households, net dollars per households, trips per household, units per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine customer segments trends on key performance indicators may be a pharmacy owner, who wants to know how customer segments trend with purchases of cold remedies with respect to the key performance trend of cold and flu season. In this instance, the manufacturer may select to evaluate dimensions by strategic customer segments and selected products, and measures of share of households and units per household. With this data the owner of the pharmacy may be able to determine how various customer segments are shopping for cold and flu remedies as the cold and flu season progresses. For instance, if households are anticipating cold and flu season they may purchase remedies at the food store, but if households are acting reactively, the pharmacy may be the more convenient place to go. In addition, this behavior may be different for different customer segments. The insight delivered via this loyalty analytic may allow the owner of the pharmacy to adjust orders based on their current customer segment base. In embodiments, the loyalty analytic associated with promotion segment impact analysis may enable a store owner to determine customer segments trends on key performance indicators.

In embodiments, the analytic platform 100 may enable loyalty analytics associated with product trip key metrics, where the business issue may be the determination of what trip types drive product performance. The application of the analysis may include a decision group, such as assortment, profiling, diagnostics, and the like, where the analysis specification may include a plurality of dimensions and measures. Dimensions may be by trip missions, by listed measures, for selected products, for selected geographies, for strategic customer segments, for selected time periods, and the like. Measures may include net dollars, number of trips, number of households, share of net dollars, share of trips, share of households, net dollars per household, net dollars per unit, trips per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine what trip types drive product performance may be a dairy producer, who wants to know whether more milk is sold in restock trips or in quick trips. In this instance the manufacturer may select to evaluate dimensions by trip missions and listed measures of net dollars and number of trips. With this data the dairy producer may gain insight as to what types of trips may sell the most milk. This may in turn affect the types of stores that milk will typically sell better in, and perhaps even the time of the week, giving that restocking trips may be centered on the weekend and quick trips may be scattered during the week. With milk being a perishable, this insight may prevent loss of revenue due to spoilage. In embodiments, the loyalty analytic associated with product trip key metrics may help determine what trip types drive product performance.

In embodiments, the analytic platform 100 may enable loyalty analytics associated with product key metrics, where the business issue may be the determination of how a product performs on key measures. The application of the analysis may include a decision group, such as new products, profiling, diagnostics, and the like, where the analysis specification may include a plurality of dimensions and measures. Dimensions may be by selected products, by listed measures, for selected geographies, for strategic customer segments, for selected time periods, and the like. Measures may include net dollars, number of units, number of trips, number of stores selling, share of dollars, number of households, share of households, net dollars per household, net dollars per unit, trips per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how a product performs on key measures may be a bakery goods producer, who wants to know how their hamburger and hotdog rolls are performing as a function whether the weekends are to be sunny and warm. In this instance, the manufacturer may select to evaluate dimensions by selected products by listed measures of selected time periods. By selecting time periods during which the weather is sunny and warm the manufacturer may expect that the sales of hamburger and hotdog rolls will correlate with the nice weather. If it does, then the key measure is verified, but if not, then further analytics may be performed to help determine any hidden parameters that are affecting sales. In embodiments, the loyalty analytic associated with product key metrics may help determine how a product performs on key measures.

In embodiments, the analytic platform 100 may enable loyalty analytics associated with product customer profile, where the business issue may be the determination of which customer segments are purchasing product. The application of the analysis may include a decision group, such as profiling, diagnostics, and the like, where the analysis specification may include a plurality of dimensions and measures. Dimensions may be by listed measures, by strategic customer segments, for selected geographies, for selected time period, for selected products, and the like. Measures may include net dollars, number of units, number of trips, number of households, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine which customer segments are purchasing a product may be a manufacturer of frozen ice cream bars, who, having just released a new dark chocolate coated sorbet popsicle, wants to know what customer segments are purchasing the new product. In this instance, the manufacturer may select to evaluate dimensions by strategic customer segments and for selected products, and measures of number of units and number of trips. With this data, the manufacturer may be able to determine how well the product is doing within each of the strategic customer segments. Further, with this insight, the manufacturer will be able to adjust the focus of their advertisement dollars in order to better target markets. In embodiments, the loyalty analytic associated with product key metrics may help determine which customer segments are purchasing products.

In embodiments, the analytic platform 100 may enable loyalty analytics associated with new item impact tracking, where the business issue may be the determination of how a new product performed and how has it affected the category's performance. The application of the analysis may include a decision group, new products, diagnostics, and the like, where the analysis specification may include a plurality of dimensions and measures. Dimensions may be by selected products, by selected time periods, for selected geographies, for strategic customer segments, for listed measures, and the like. Measures may include net dollars, number of units, number of trips, number of stores selling, share of dollars, number of households, share of households, net dollar per households, net dollars per unit, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how a new product has performed and how it has affected the category's performance may be a supermarket, that has recently introduced a new frozen dinner product and wants to know how the new product has affected the rest of the frozen dinner category. In this instance, the supermarket may select to evaluate dimensions by selected products and time periods, and measures of number of units and share of dollars. From this data the manufacturer may be able to tell how the introduction of the new frozen dinner product affected sales of other frozen dinner products. For instance, the new product may have shifted existing frozen dinner customers away from other products and over to the new product. Alternately, the new product may draw new customers into, or back to, the frozen dinner category. In either case, the data may help the supermarket determine whether the new product yielded positive overall revenue gains, and how they should deal with the product in the future. In embodiments, the loyalty analytic associated with new item impact tracking may help determine how a new product performed and how it has affected the category's performance.

In embodiments, the analytic platform 100 may enable loyalty analytics associated with brand promotion competitive impact analysis, where the business issue may be the determination of how a brand's promotion affects competitors. The application of the analysis may include a decision group, such as promotion, diagnostics, and the like, where the analysis specification may include a plurality of dimensions and measures. Dimensions may be by listed measures, by selected brands, for selected time periods, for selected geographies, for selected customer segments, and the like. Measures may include net dollars, number of households, number of trips, number of units, net dollars per trip, units per trip, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine how a brand's promotion affects competitors may be a baker of packaged chocolate chip cookies, who wants to know how an end-cap promotion of their product affects the sales of their direct competitors. In this instance, the manufacturer may select to evaluate dimensions by selected brands and selected time periods, and measures by number of units and number of households. With this data the baker may be able to determine whether their promotion is hurting the competition, or merely boosting their own sales. Wherein both results yield higher sales of their chocolate chip cookies, the former may lead to an increase in market share, which in turn, may lead to further analytics associated with market share. In embodiments, the loyalty analytic associated with brand promotion competitive impact analysis may help determine how a brand's promotion affects competitors.

In embodiments, the analytic platform 100 may enable loyalty analytics associated with customer segment key performance indicators, where the business issue may be the determination of customer segment key performance indicators. The application of the analysis may include a decision group, such as key performance indicators, diagnostics, and the like, where the analysis specification may include a plurality of dimensions and measures. Dimensions may be by strategic customer segments, for listed measures, for selected geographies, for selected products, for selected time periods, and the like. Measures may include net dollars, percent of net dollars, number of units, number of trips, net dollars per trip, number of households, share of households, net dollars per households, trips per household, units per households, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine customer segment key performance indicators may be a manufacturer of energy bars, who wants to better understand the customer segments that are purchasing their product, and what indicators lead to increased sales. In this instance, the manufacturer may select to evaluate dimensions by strategic customer segments and selected products, and measures of share of households and units per household. With this data the manufacturer may begin to determine what customer segments and households may be interested in their product. For instance, it could be that the health food customer segment or the sports customer segment are markets that also purchase energy bars, and that purchase of other health food or sports food may be indicators of positive performance for energy bar sales. In embodiments, the loyalty analytic associated with customer segment key performance indicators may help determine customer segment key performance indicators.

In embodiments, the analytic platform 100 may enable loyalty analytics associated with customer segment key metrics, where the business issue may be the determination of differences among customers on key metrics. The application of the analysis may include a decision group, such as profiling, diagnostics, and the like, where the analysis specification may include a plurality of dimensions and measures. Dimensions may be by strategic customer segments, by listed measures, for selected geographies, for strategic customer segments, for selected time periods, and the like. Measures may include net dollars, number of units, number of trips, number of stores selling, share of dollars, number of households, share of households, net dollars per households, net dollars per unit, trips per household, and the like. In embodiments, this analysis may be performed on-demand, scheduled, ad-hoc, or the like. In addition, the delivery of the analysis may include a plurality of methods, such as by email notification with a link to a web page containing the specific analytic, logging in to access the web page containing the specific analytic, and the like.

An example of a loyalty analytic that may help determine differences among customers on key metrics may be a supermarket chain, who wants to better understand how different customer's total weekly purchases are affected by the number of trips they take. In this instance, the supermarket chain may select to evaluate dimensions by strategic customer segments and listed measures of number of trips. With this data, the supermarket chain may be able to determine if certain customer segments are more likely to spend more money when they make more trips to the supermarket. For instance, a typical family of four may be on a strict budget, and may not spend more with a greater number of trips, where a single may always pick up extra items per trip, and therefore spend more with more trips. In embodiments, the loyalty analytic associated with customer segment key metrics may help determine differences among customers on key metrics.

The analytic platform 100 may provide for a new product launch management solution, where key modules may include new product launch early warning benchmarking, buying behavior analysis, attribute analysis, target vs. goal analysis, predictive forecasting analysis, or the like. The new product launch early warning benchmarking may contain sub-modules, such as geographic benchmarking, promotional benchmarking, size based benchmarking, brand benchmarking, or the like.

New product geographic benchmarking may include distribution by geography, distribution ramp-up comparison, sales and volume comparison, sales rate index comparison, or the like. Distribution by geography may enable two products as filters so that they may be compared to each other, with one competitor UPC compared side-by-side with another competitor UPC. In addition, a chart may be provided to show the relevant data. A distribution ramp-up comparison may consist of choosing the particular UPC's recently launched, and then comparing the ramp-up by the individual regions selling the product. The screenshot may show a ramp-up based on absolute time, which would show a report available in relative time, such as in weeks from launch. Sales and volume may compare from the point the product has been in distribution to the total dollar sales and total volume sales. In embodiments, a chart may illustrate the report. The Geography chosen may be a non-overlapping geography. The goal may be to identify regions not performing well so the manufacturer may highlight those regions in a competitive response. Sales rate index comparison may compare two products based on the new Product Success Index. The analysis may place the two products side-by-side and allow the user to glean very quickly the regions where the product is worse off, not merely by looking at sales, but by looking at its non-promoted selling rate.

New product promotional benchmarking may include promotional benchmarking by brand, promotional benchmarking by geography, promotional benchmarking by time, or the like. Promotional benchmarking by brand analysis may show-case the aggregate Product Success Index as well as aggregate amount of promotion occurring by brand in the defined time period. For example, a diet drink with lime may be a more successful brand than a non-diet drink with lime, also obvious is that the promotional activity for the diet drink with lime may be higher than that of non-diet drink. Promotional benchmarking by geography analysis may showcase a comparison of the type of aggregate promotional activity since launch. The analysis may trend how competitors have been running promotions in different regions and how well they may have been able to keep up with each other in terms of promotional activity. Promotional benchmarking by time analysis may illustrate how two new products fared against each other and looks like with respect to promotional behavior along with New Product Success Index. The total revenue generated may also be highlighted.

New product packaging may be tailored to the customer, such as by new product solution for sales, new product solution for brand management, new product solution for category management, or the like. New product solution for sales may be associated with New Product Launch Early Warning Benchmarking, based on using POS data and ideas taken from the Benchmarking concepts discussed herein, such as Distribution and Velocity benchmarking or Geographic and Brand benchmarking; New Product Target Vs. Goal Analysis, focused on allowing integration of target input data entered into the data model, such as Sales versus Targets or Distribution versus Targets; New Product Predictive Forecasting Analysis, a predictive/modeling function; New Product Launch Trade Promotion Management, such as by geography or by brand; or the like. New product solution for category management may Launch Trade Promotion Management by geography or by brand, optimized price analytics, provide buying behavior analysis, provide attribute analysis, or the like.

The analytic platform 100 may provide for a new product predictor that may provide for an on-demand software application for the maximizing of launch performance for new products and their associated revenue. The new product predictor may help companies optimize their new product portfolio by identifying emerging trends and competitive issues early in the launch process. With it, new product and brand managers may track performance of newly launched products on a periodic basis, for instance, on a weekly basis. The new product predictor may include workflows for benchmarking and trend analysis to provide faster and more accurate decisions about product potential.

The new product predictor may support a new product innovation process, including a set of pre-built analyses and benchmarks, such as product portfolio analysis, product trend analysis, product planning, teim alignment, performance benchmarks, competitive benchmarking, market and retailer benchmarking, integrated consumer analysis, or the like. Product Portfolio Analysis may provide review of the strength of a client's current product portfolio and compare products based on launch date and type of innovation to assess products versus those of competitors. Product Trend Analysis may identify emerging product opportunities based on new product attributes and characteristics, compare trends in adjacent categories to spot department and aisle issues, perform flexible cross-tab analysis and filtering on any number of attributes, or the like. Product planning may establish product volume and launch plans, compare planned and actual performance, track variances by product and by retailer, estimate likely current quarter performance on a time period basis, such as week-by-week, or the like.

Time alignment may provide benchmark product performance using a relative time scale, such as weeks since product launch, for powerful analysis among competitive products. Performance benchmarks may assess the strength of new products using the product success index metric, compare launch characteristics across categories and regions, review new product performance and distribution growth to identify opportunities to rebalance the product portfolio, allocate sales and marketing investments, or the like. Competitive benchmarking may measure the performance of a new product against its competitive set, monitor competitors' responses, quickly evaluate the results of the marketing and promotional actions taken during the launch period, or the like. Market and retailer benchmarking may compare new product performance across markets, channels, and retailers to identify performance issues and opportunities. Integrated consumer analysis may use integrated shopper analysis metrics to help understand actual consumer penetration and trial and repeat performance for new products.

The analytic platform 100 may provide a market and consumer information platform that combines advanced analytic sciences, data integration and high performance data operations to applications, predictive analytics, and business performance reports in an on-demand fashion. The analytic platform 100 provides levels of cross-category and cross-attribute analysis, and features flexible hierarchy capabilities to combine information based on common attributes and may reduce the need for restatements. The analytic platform 100 may include data for any set of products, retailers, regions, panelists, stores, or the like, at the lowest and most granular level.

The analytic platform 100 may specify components, such as standard use cases, product target vs. goal analysis, product hierarchy, competitor product hierarchies, classifying new launches, panel analytics, new product forecasting, pace-setter reports, sample demo sets, or the like. The standard user may need to analyze data across basic dimensions and measure sets, such as items; new items; geographies, with an ability to look at RMA level, store level, total retailer level data, or the like, with an ability to view store demographics, such as ethnicity, income, suburban versus urban, or the like; time, such as time relative from launch, standard weekly data, or the like; product, such as by brands, by category, by flavor, by year of launch, by size, or the like; by HH panel data, such as by repeat buyers, by trial buyers, or the like; or other like basic dimensions.

The analytic platform 100 may be available for various categories, such as analysis that may allow for Strategic new product building perspective; analysis that may allow brand managers to analyze the latest trends in buyer behavior, ranging from flavors to sizes, to buyer profiles, or the like, that may enable a brand manager to create the right product and determine the right market to target with that product; analysis that aids the actual launch of a new product, that may focus on weaknesses in initial launch execution and determine ways of improving execution, as well as determine when a product is not meant for success despite all execution efficiencies; or the like.

The strategic analysis may require the application to be able to use all available data, and may require analysis such as sales, distribution, promotional lift, no-deal Sales Rate indexes, as well as other velocity measures, to be available at total US-Retailer levels. The analysis may be able to look at macro views across all data and use those to determine optimal flavors, price, sizes, categories, demographics of consumers to target, or the like. The system may allow this type of analysis at the total US level for Sales and Distribution, and other core measures. The analytic platform 100 may be able to improve the time taken to run the sales rate index calculations, a way to efficiently create relative time hierarchy that may be applied across all launches. Some of these may require pre-aggregations at the database level, the sales rate indexes as well as the relative time hierarchies calculated in the ETL loading routine or handled at the AS/RPM level by running overnight reports so that a scheduled report runs in advance.

The new product target vs. goal component may illustrate the success of the launch in comparison with the set targets. In this case it may be essential to enter a target for each RMA in a variety of ways, such as by inputting a file that has target data for each RMA, allowing the user to set ACV targets by week at the RMA level, using data entered for one RMA and copy the same targets to another RMA, or the like. The target data may appear in a plurality of forms, such as sales targets where revenue or unit sales may specified, ACV targets where the ACV distribution is specified, distribution targets where the percent store selling by time period is specified, or the like. Differences from the sales performance may focus on revenue plans and consist of quad-weekly totals. The New Product Solution may require target measures such as percent store selling, percent activity, sales revenues, or the like. Additional measures may be similar to the Sales Performance application, such as plan, or variance from the plan.

The competitor product hierarchy component may be a way for a new product brand manager to access automated means of comparing a launch to a competitor's launches, and may have certain characteristics, such as the same category as the launched product, belong to a different manufacturer, launched in the same year, or the like. The analytic platform 100 may allow the user to select either of these options to determine competitors that meet this criterion. A component may allow for the classifying of new launches, where it may be possible to classify a new product launch by the type of launch, such as line extensions, incremental innovation, breakthrough innovation, or the like. These may appear as attributes for each new product going forward. Additionally it may be possible to retroactively apply these classifications for products already launched.

The new product forecasting component may utilize Sales Rate measures. Tiers of new product launches may need to be created based on where the new product falls. The product may provide projections using average Sales Rate growth of that particular tier. Hence the first task may establish which tier the new product falls in. An average sales rate projection may be established for the particular tier, linking with the projected average Sales rate for that tier. The Pacesetter report component, that may measure media and coupons, and the sample demo set component, providing basic new product analysis, may also contribute to the analytic platform 100.

In addition, the analytic platform 100 may have measure definitions and calculations associated with it, such as ACV Weighted Distribution, percent Stores Selling, Dollar Sales, Unit Sales, Volume Sales, Average Items per Store Selling, percent Dollars, percent Volume, percent Units, Weighted Average percent Price Reduction, percent Increase in Volume, Base Volume, Base Dollars, Incremental Volume, Incremental Dollars, percent Base Volume, percent Base Dollars, Price per Volume, Price per Unit, Dollar Share of Category, Volume Share of Category, Unit Share of Category, Total Points of Distribution, or the like. In addition to these standard measures, the New Product Performance Solution may also require application-specific measures.

In an embodiment, the analytic platform 100 may be enabled to continuously analyze the performance of models, projections, and other analyses, based at least in part on the real occurrence or non-occurrence of facts, events, data, and the like that the analytic platform predicted would occur or not occur (e.g. detecting drift). For example, a predictive model may be applied to a foreign system. As applied to the foreign system, it may be possible to detect a degradation of model fit due to factors of the foreign environment which differ from those used to create the predictive model. The results that the model predicted may be compared to the actual results found in the foreign system, and the model updated and improved to better model the phenomena of the foreign system. The updating of the model may be automated so that no human intervention, or less human intervention, is necessary to continuously improve the model. This may enable models to be applied to a broader array of novel datasets and adapt to the idiosyncrasies of the new data in order to produce a model with sufficient predictive utility.

In an embodiment, anomalies between a predictive model and a dataset may be used to prune the data that is necessary for the model to optimally perform. For example, when applied to a new dataset, a predictive model may be found to retain its predictive utility in spite of the fact that the new dataset does not include a data type or plurality of data types that were used in the creation of the predictive model. This may suggest that the model's predictive utility may be obtained by using a smaller dataset, or a different dataset than that originally used to create the model. The use of smaller datasets, or different datasets, may have economic, data processing, or some other efficiency.

In an embodiment, models and the like may be placed in competition, and anomalies between their performance used to optimize the models, and/or create a new model or plurality of models. For example, a logic model and a neural model may compete and their outputs used and compared to optimize performance. In an embodiment, the comparison, competition and analysis of model performance may be used to divide models into their functional components and further analyze how each component was generated, how multiple models may interact, or perform some other analysis of model performance.

In an embodiment, an optimization engine may be used in the analytic platform 100. In an embodiment, optimization engine(s) and optimization rules may be integrated into the analytic platform 100 and be associated with the analytic server 134 and related solutions 188, neural networks, and/or the solutions present in applications 184 (e.g. SAS solutions).

Figure 15:
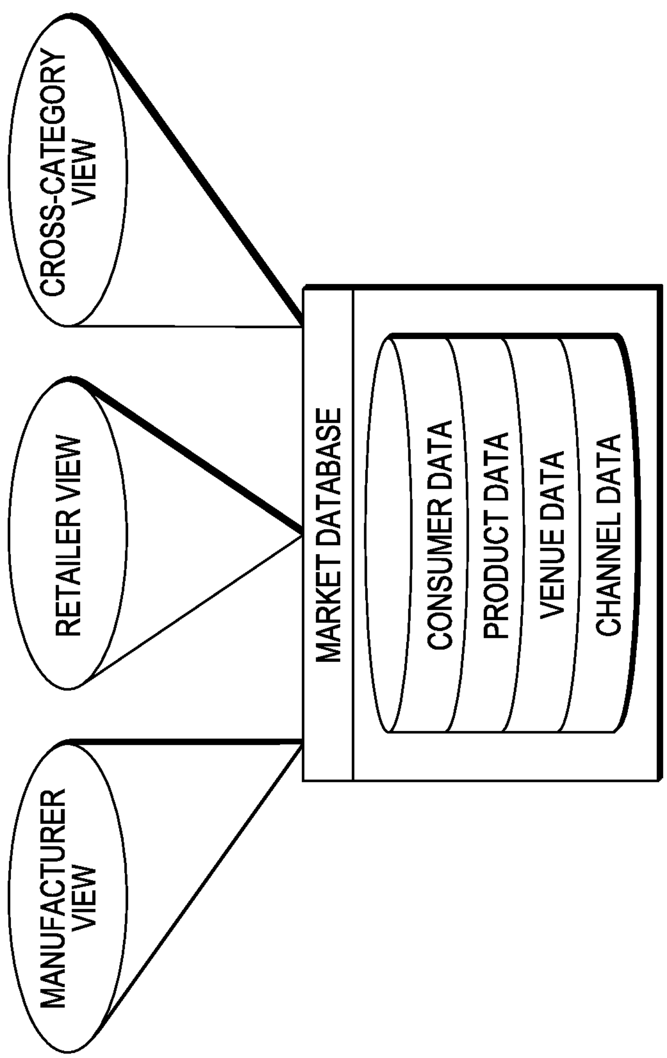
FIG. 15 illustrates a single database containing market data from which multiple unique data views may be created.

As illustrated in FIG. 15, the analytic platform 100 may be associated with a single database containing market type data, for example, consumer data, product data, brand data, channel or venue data, or some other type of market data. The database may be further associated with multiple views, each of which may relate to a particular group, market interest, analyst, and so forth. In an example, a database such as that shown in FIG. 15 may have a manufacturer view and retailer view with which it is associated. The underlying data that is stored in the database is flat and is not tailored to either view. Each view may define consumer solutions, product clusters, geographies, and other collections of attributes or market data as described herein in a manner that is unique to a particular view. Thus, a manufacturer may look to the combination of product and sales data, for example, in one view while a retailer uses the same database to analyze product and sales data in a retailer-specific view.

Figure 16:
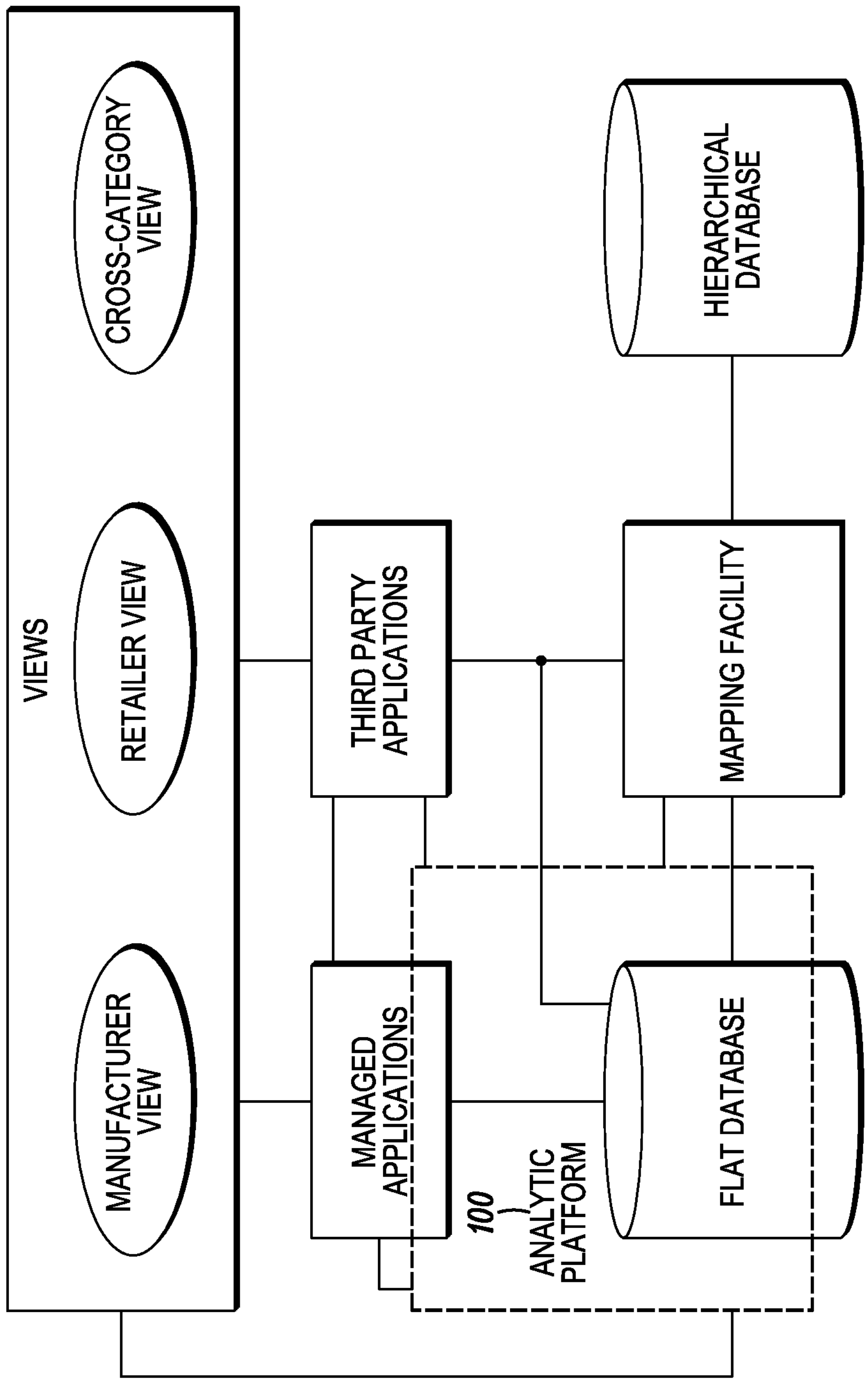
FIG. 16 illustrates associating a flat database and hierarchical database for market data analysis and viewing.

As illustrated in FIG. 16, the analytic platform 100 may be associated with a flat, non-hierarchical database that is further associated with an existing market data system (e.g. a legacy database) utilizing a hierarchical structure. In embodiments, a mapping facility may be utilized to map the data from the flat, non-hierarchical database to the existing market data system. This may enable the hierarchical legacy data system to be utilized in a manner as if the legacy data system were a flat, non-hierarchical database. In embodiments, a managed application, or plurality of applications, may be used to generate views, for example, a manufacturer or retailer view. Views may be simple queries or may utilize the full capabilities of the analytic platform 100 (e.g. hierarchy formation, data perturbation, data mart creation, or any of the other capabilities described herein). In embodiments, a third party application may be used to access the combination of the flat and hierarchical databases and associated mapping facility.

In embodiments, the analytic platform 100 may include a plurality of data visualization, data alert, analytic output-to-text, and other techniques for visualizing and reporting analytic results. In embodiments, these techniques may be associated with a user interface 182. In an embodiment, the analytic platform 100 may enable tree graph visualizations, forest graph visualizations, and related techniques. For example, a tree graph may include data and output in a format in which any two vertices are connected by exactly one path. A forest graph may graph data and output in a format in which any two vertices are connected by at most one path. An equivalent definition is that a forest is a disjoint union of trees. In an embodiment, the analytic platform 100 may enable a bubble-up measure. Bubble-up measures may be used, in part, to automatically alert a user to a circumstance that arises in the data that may be, for example, of interest or importance. In an example, a bubble-up measure may be used to alert a user to a trend or events in a dataset or analysis that otherwise would be missed. In an embodiment, the analytic platform 100 may enable text generation. Text generation may include, but is not limited to, a triggering event in the data/analysis. In an example, text may be generated by the analytic platform 100 stating "sales of product X are up 10% because of Y." This text may, in turn, be sent by text message, email, or some other format to a manager for his/her review.

In an embodiment, analytic platform 100 dimensions may include relative time. Relative time may enable analysis of marketing and consumer data based on "time aligned with the life cycle of each item," such that time "starts" with the first movement for each item. In embodiments, this functionality may be extended to allow for retailer-specific analysis (based, for example, on when an item started selling at a specific retailer). The same methodology may also be used to "time align" information linked to specific events, merchandising activities, and other calendar-based events. A specific set of measures may be configured to be enabled with the Relative Time dimension. Uses may relate to new product launch analysis and benchmarking, at total market or at retailer level, and the like.

In an embodiment, analytic platform 100 dimensions may include same store sales. This dimension may provide built-in analysis of "same store sales" to enable an "apples-to-apples" comparison of growth trends in the market. This methodology may include sophisticated data modeling and projection constructs to adjust the store set in each time period that is being compared.

In embodiments, the analytic platform 100 may enable on-demand calculation of non-additive measures. In an example, on-demand calculation of non-additive measures may include on-the-fly creation of custom product groups from a report view. In an example, on-demand calculation of non-additive measures may include creating custom product groups from a "power-user" selector view. In embodiments, both static and dynamic custom product groups may be created, and product groups may be based on search criteria on members, attributes, or some other criterion. In embodiments, on-demand calculation of non-additive measures may be implemented in the analytic server 134. In embodiments, on-demand calculation of non-additive measures may enable an end user to, for example, drill on a custom group and see the selected members, as well as use an "INFO-bar" to view members and other selection rules used for custom product group.

In embodiments, the user interface 182 associate with the analytic platform 100 may enable a user to save and organize new store groups in folders, to publish store groups to users and user groups, to control access to individual store groups to specific users and groups, to search store groups based on description and other attributes, to generate large number of store groups based on iterating over specific variables (such as one store group for each state), to enable/disable store groups, to rename store groups, or some other functionality. In embodiments, store group selection may be based on any combination and/or of any store level attribute, including a specific list of stores.

In embodiments, the analytic platform 100 may enable "1-click" exporting to Microsoft Excel from active report grid to Microsoft Excel. This export report grid may also include an image of a chart (if present).

In embodiments, the analytic platform 100 may enable "1-click" export to Microsoft PowerPoint from active report grid to Microsoft Excel. This export report grid may also include an image of a chart (if present)

In embodiments, the analytic platform 100 may enable a scheduled report, for example, delivery to Microsoft Excel. This may also include support for "iterating" one or multiple dimensions present in page filters in the base report. Each iteration may be placed on a separate worksheet in Microsoft Excel. This output may be saved as a link and/or delivered as attachment to user or groups of users.

In embodiments, the analytic platform 100 may enable export to Microsoft Excel of multi-page workspaces. This functionality will enable the export of all pages in an active workspace, placing each page into a separate worksheet in Microsoft Excel document In embodiments, the analytic platform 100 may enable export to Microsoft Excel with the ability for a user to use page-filter drop down selections while working in actual Excel document.

In embodiments, the analytic platform 100 may enable export to Microsoft Excel with the ability for a user to do 1-click refresh of the Microsoft Excel document based on latest data. In embodiments, this same functionality may be used for Microsoft PowerPoint.

In embodiments, the analytic platform 100 may use custom clusters including, but not limited to, Hispanic, Afr. American, household income, size of household (e.g. number of persons), city population density, number of children, renters vs. own home, car ownership, wealth level/total assets, religious/faith categories, urban/rural, different life-stage groups, or some other cluster. Other store attributes may include size of store (sq. ft.), remodel status, price zone, ad zone, division, in-store (pharmacy, photo-center, bakery, floral, etc.), number of check out lanes, and so forth. In embodiments, custom clusters may be analyzed using the analytic platform 100 to determine changes over time. In embodiments, data relating to the temporal changes in custom clusters over time may be shared among users and/or user groups, for example, retailers and manufacturers.

In embodiments, the analytic platform 100 may enable retailer-manufacturer models including, but not limited to, sharing information related to supply chain, forecasting, ordering, UCCnet-related models, create/share store groups and store clusters, and the related attributes (and related attributes), create/share retailer definition of product hierarchies/category definitions (and related attributes), create/share retailer shopper group definitions (based on demographics and other household attributes), collaboration with item master data for purpose of automated item matching and mapping—involving a 3rd party to facilitate the mapping through providing a common item master, or some other model basis.

Figure 17:
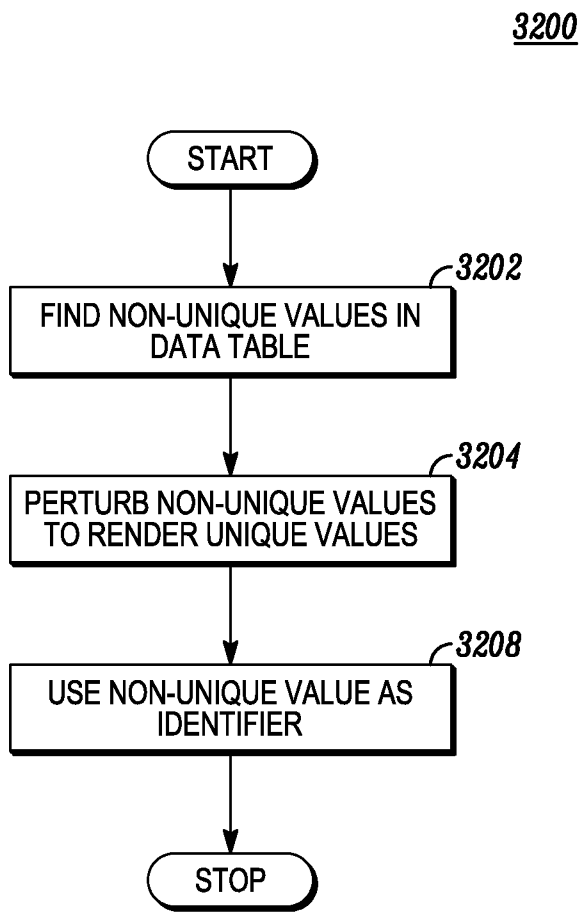
FIG. 17 depicts data perturbation of non-unique values.

Referring to FIG. 17, a logical process 3200 for creating a data perturbation dataset is shown. The process begins at logical block 3202 where the process may find a non-unique value in a data table. Next, the non-unique values may be perturbed to render unique values 3204. In embodiments, the non-unique value may be used as an identifier 3208.

In embodiments, a permission to perform a data perturbation action may be based on the availability condition. A process may permit the data perturbation action if the data perturbation action is not forbidden by the availability condition.

In embodiments, the data table may be a fact data table. In embodiments, the fact data table may encompass a Cartesian product or cross join of two source tables. Therefore, the fact table may be relatively large.

In embodiments, the fact data table may be a retail sales dataset. In other embodiments, the fact data table may be a syndicated sales dataset.

In embodiments, the syndicated sales dataset is a scanner dataset.

In embodiments, the syndicated sales dataset is an audit dataset.

In embodiments, the syndicated sales dataset is a combined scanner-audit dataset.

In an embodiment, the fact data table may be a point-of-sale data.

In another embodiment, the fact data table may be a syndicated causal dataset.

In another embodiment, the fact data table may be an internal shipment dataset.

In yet another embodiment, the fact data table may be an internal financial dataset.

In embodiments, the data table may be a dimension data table. In an embodiment, the dimension may a hierarchy.

In embodiments, systems and methods may involve using a platform as disclosed herein for applications described herein where the systems and methods involve perturbing data (as described herein). The systems and methods may involve finding non-unique values in a data table and perturbing at least one the non-unique value to render a unique value in the data table. Then the process may involve using the non-unique value as an identifier for a data item in the data table and using an online analytic processing application to access the data table based on the identifier.

Figure 18:
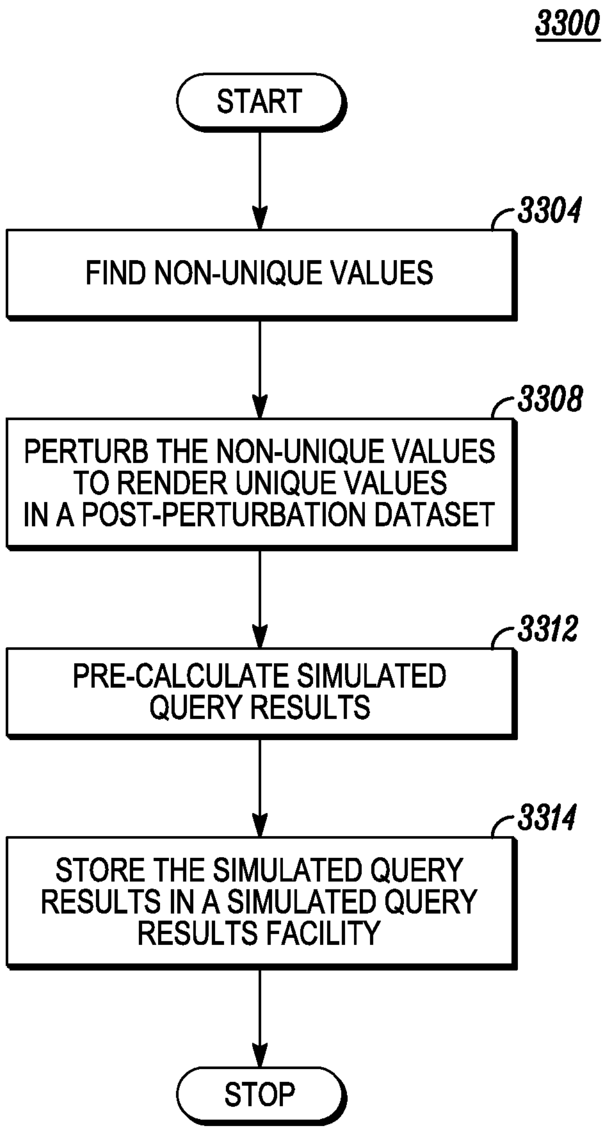
FIG. 18 depicts simulated queries and data perturbation.

In embodiments, systems and methods may involve using a platform as disclosed herein for applications described herein where the systems and methods involve perturbing data (as described herein). Referring to FIG. 18, the systems and methods may involve perturbing at least one non-unique value in a data table to render a unique value in a post-perturbation data set 3308. The process may also involve pre-calculating a plurality of simulated query results, wherein the plurality of simulated query results simulates a query result for each possible combination of a plurality of data dimensions within the post-perturbation data set 3312. The process may further involve storing the simulated query results in a simulated query results facility 3314.

In embodiments, systems and methods may involve using a platform as disclosed herein for applications described herein where the systems and methods involve perturbing data (as described herein). The systems and methods may involve perturbing at least one non-unique value in a data table to render a unique value in a post-perturbation data set. The process may also involve pre-calculating a plurality of simulated query results, wherein the plurality of simulated query results simulates a query result for each possible combination of a plurality of data dimensions within the post-perturbation data set. The process may further involve storing the simulated query results in a simulated query results facility.

In embodiments, systems and methods may involve using a platform as disclosed herein for applications described herein where the systems and methods involve perturbing data (as described herein). The systems and methods may involve associating a user interface with a simulated query results facility, wherein the facility stores simulated query results previously performed using a data table that received a data perturbation action. The process may also involve submitting a query to the simulated query results facility using the user interface. The process may then involve selecting a simulated query result from the simulated query results facility that is responsive to the submitted query and presenting the simulated query result to the user interface.

In embodiments the user interface enables interactive drill-down within a report, interactive drill-up within a report, interactive swap among reports, interactive pivot within a report, graphical dial indicators, flexible formatting dynamic titles, is accessible through the Internet or performs another function.

In embodiments, systems and methods may involve using a platform as disclosed herein for applications described herein where the systems and methods involve associating an availability condition with a query type. It may then involve assessing a permission to perform the query type based on the availability condition. It may also involve permitting a query of the query type when the query type is not forbidden by the availability condition. It may also involve associating a user interface with a simulated query results facility, wherein the facility stores simulated query results previously performed using a data table that received a data perturbation action. It may also involve submitting the query of the permitted query type to the simulated query results facility using the user interface. It may also involve selecting a simulated query result from the simulated query results facility that is responsive to the submitted query; and presenting the simulated query result to the user interface.

In embodiments, the availability condition may be based on statistical validity, based on sample size, permission to release data, qualification of an individual to access the data, type of data, permissibility of access to combinations of data, a position of an individual within an organization or some other factor, condition or information.

Figure 19:
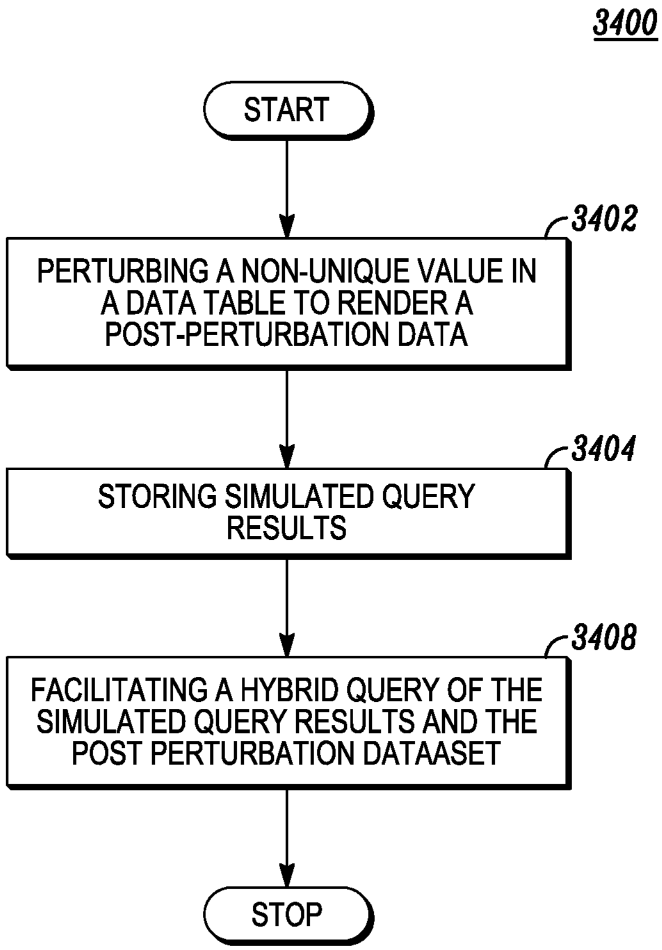
FIG. 19 depicts simulated queries, data perturbation and hybrid queries.

In embodiments, systems and methods may involve using a platform as disclosed herein for applications described herein where the systems and methods involve perturbing data (as described herein). Referring to FIG. 19, the systems and methods may involve perturbing a non-unique value in a data table to render a post-perturbation data set having a unique value 3402. The process may then involve storing results for a plurality of simulated queries, each simulated query using a unique value in the post-perturbation data set as an identifier for a data item retrieved by the simulated query to produce a simulated query data set 3404. The process may then involve providing a user interface whereby a user may execute a hybrid query, the hybrid query enables retrieval of data from the simulated query data set and from the post-perturbation data set 3408.

In embodiments the user interface enables interactive drill-down within a report, interactive drill-up within a report, interactive swap among reports, pivot within a report, graphical dial indicators, flexible formatting dynamic titles, is accessible through the Internet or allows another function or is otherwise accessible.

In embodiments, systems and methods may involve using a platform as disclosed herein for applications described herein where the systems and methods involve associating an availability condition with a hybrid query type, wherein the hybrid query type includes a query component pre-calculated in a simulated query results facility and a query component absent from the simulated query results facility. It may also involve assessing a permission to perform the hybrid query type based on the availability condition and permitting a hybrid query of the query type when the query type is not forbidden by the availability condition.

In embodiments, the availability condition may be based on statistical validity, sample size, permission to release data, qualification of an individual to access the data, type of data, permissibility of access to combinations of data, a position of an individual within an organization, or other such information.

Figure 20:
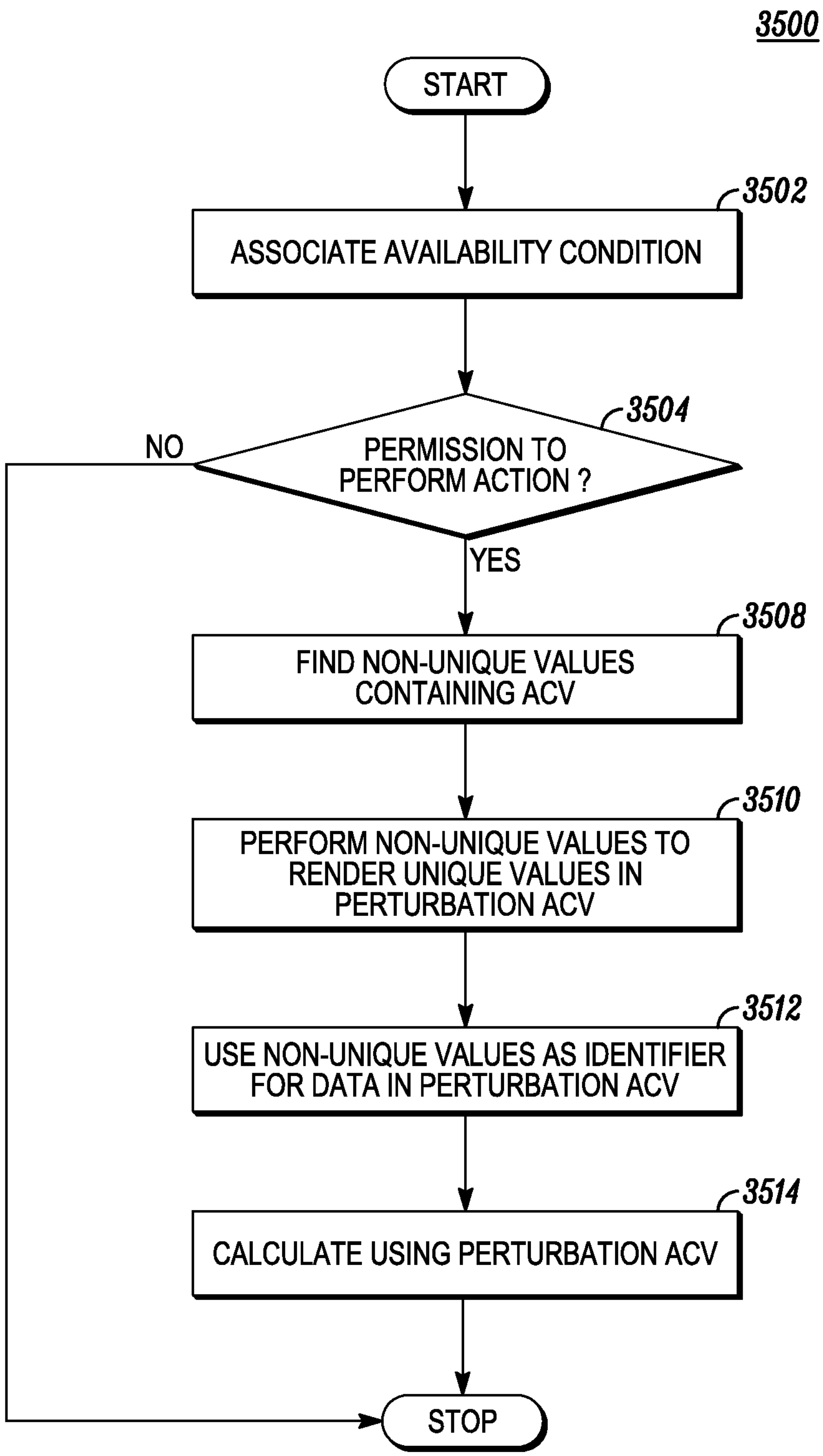
FIG. 20 depicts data perturbation and all commodity value calculation.

In embodiments, systems and methods may involve using a platform as disclosed herein for applications described herein where the systems and methods involve perturbing data (as described herein). As indicated by FIG. 20, the systems and methods may involve finding non-unique values in a data table containing total all commodity value (ACV) data 3505. Then perturbing at least one non-unique value to render a unique value in a perturbation ACV dataset. The process may also involve using at least one non-unique value as an identifier for a data item in the perturbation ACV dataset 3512 and performing an ACV-related calculation using the perturbation ACV dataset 3514.

In embodiments, systems and methods may involve using a platform as disclosed herein for applications described herein where the systems and methods involve perturbing data (as described herein). The systems and methods may involve finding non-unique values in a data table containing total all commodity value (ACV) data. Then perturbing at least one non-unique value to render a unique value in a perturbation ACV dataset. The process may also involve using at least one non-unique value as an identifier for a data item in the perturbation ACV dataset and performing an ACV-related calculation using the perturbation ACV dataset.

In embodiments, systems and methods may involve using a platform as disclosed herein for applications described herein where the systems and methods involve perturbing data (as described herein). The systems and methods may involve finding non-unique values in a data table containing data suitable to calculate total all commodity value (ACV). It may also involve perturbing the non-unique values to render unique values in a perturbation ACV dataset. It may also involve using the non-unique values as an identifier for a data item in the perturbation ACV dataset. The process may further involve associating an availability condition with the perturbed dataset. The process may also involve, subject to the availability condition, performing an ACV-related calculation using the perturbation ACV dataset. In embodiments, the availability condition may be based on statistical validity, sample size, permission to release data, qualification of an individual to access the data, a type of data, the permissibility of access to combinations of data, a position of an individual within an organization or other such information.

Figure 21:
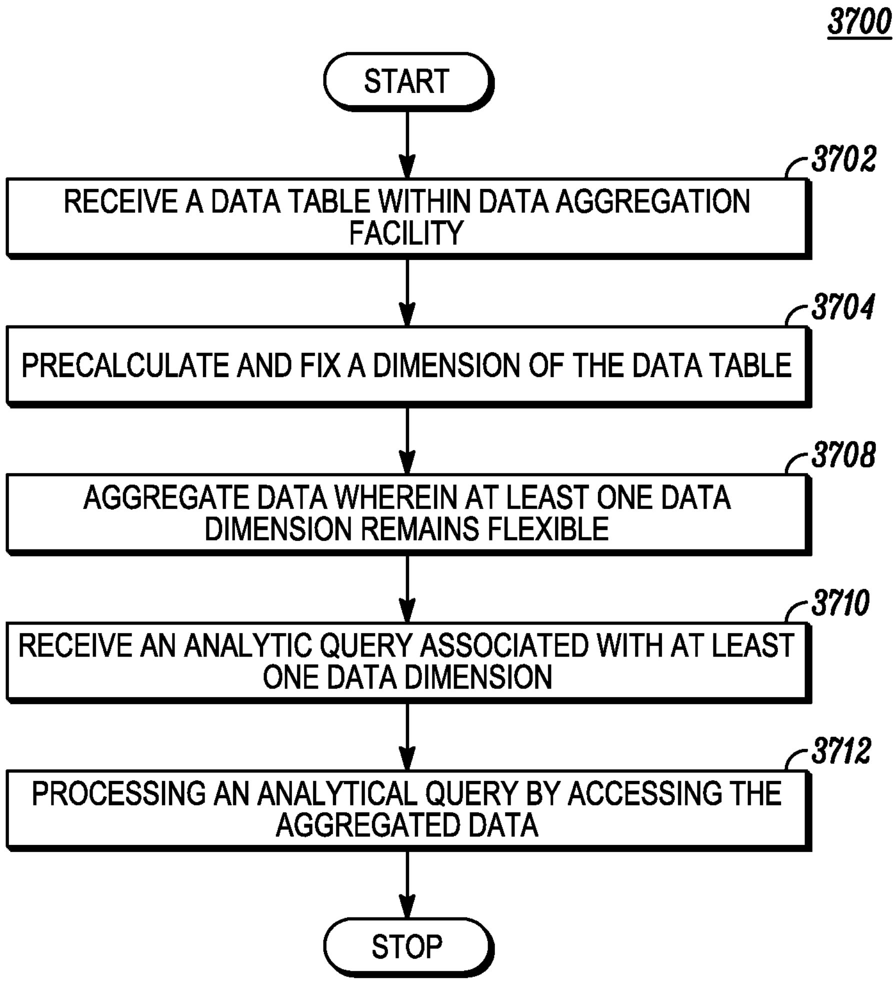
FIG. 21 depicts aggregating data and utilizing a flexible dimension.

FIG. 21 illustrates a flow chart explaining a method for aggregating data and utilizing a flexible dimension according to an embodiment of the present invention. The process begins at logical block 3702, where a data table may be received within data aggregation facility. A dimension of the data table may be precalculated and fixed 3704. In embodiments, data may be aggregated, wherein at least one data dimension remains flexible 3708. An analytic query may be received that is associated with at least one data dimension 3710. An analytic query may be processed by accessing the aggregated data 3712.

Figure 22:
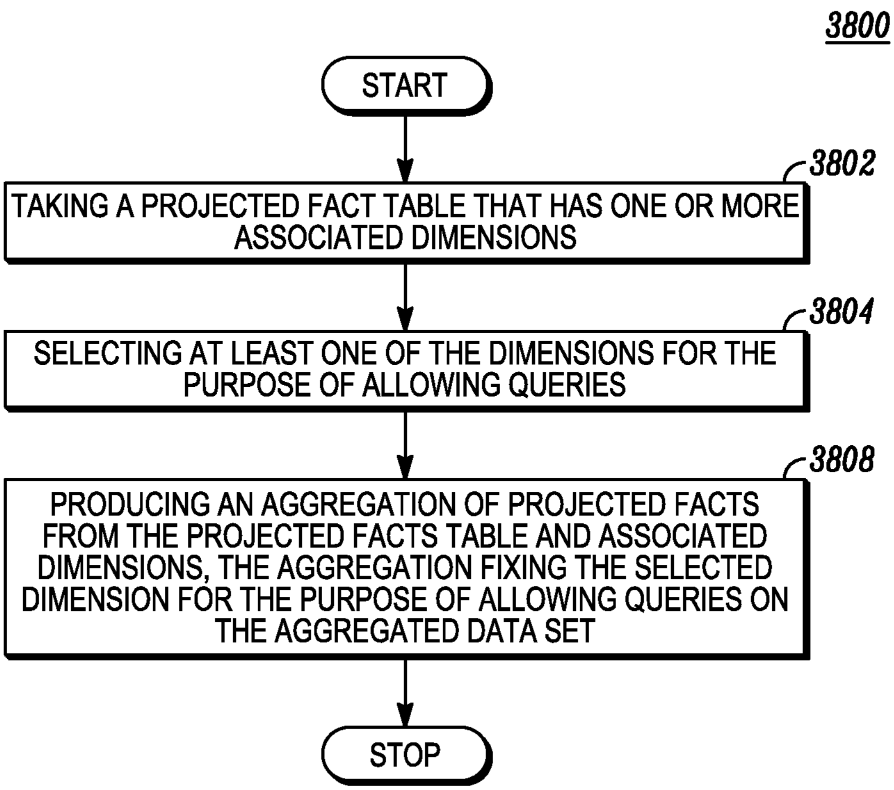
FIG. 22 depicts aggregation of projected fact data and associated dimension data.

In embodiments, referring to FIG. 22, systems and methods may involve using a platform as disclosed herein for applications described herein where the systems and methods involve taking a projected facts table that has one or more associated with one or more dimensions 3802. The process may also involve fixing at least one of the dimensions for the purpose of allowing queries 3804 and producing an aggregation of projected facts from the projected facts table and associated dimensions, the aggregation fixing the selected dimension for the purpose of allowing queries on the aggregated dataset 3808. In embodiments, the remaining dimensions of the projected dataset remain flexible.

In embodiments, the dimension may be a store, hierarchy, category, data segment, time, venue, geography, demographic, behavior, life stage, consumer segment, or the like.

Figure 23:
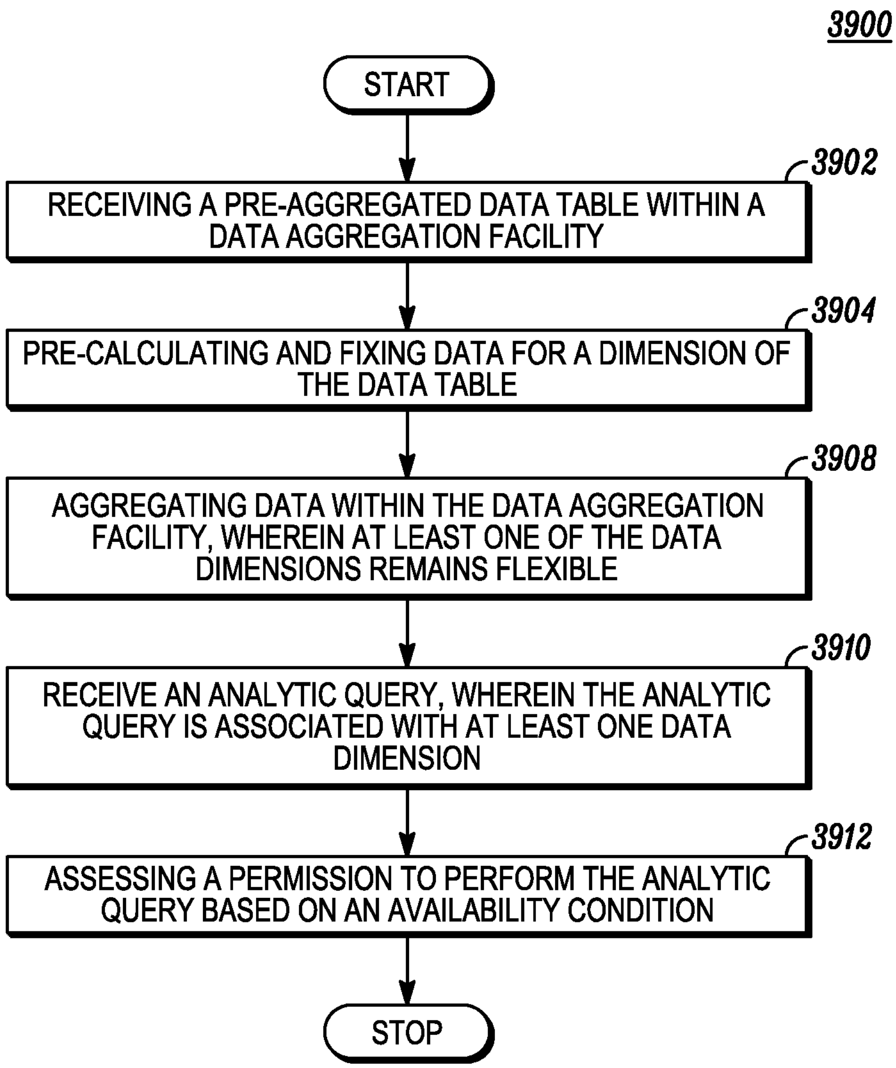
FIG. 23 depicts utilizing aggregated data based on an availability condition.

In embodiments, referring to FIG. 23, systems and methods may involve using a platform as disclosed herein for applications described herein where the systems and methods involve receiving a pre-aggregated data table within a data aggregation facility 3902. The process may then involve pre-calculating and fixing data for a dimension of the data table 3904. The data may then me within the data aggregation facility, wherein at least one of the data dimensions remains flexible 3908. The system may receive an analytic query, wherein the analytic query is associated with at least one data dimension 3910. The process may then involve assessing a permission to perform the analytic query based on an availability condition 3912.

In embodiments, the availability condition is based on statistical validity, sample size, permission to release data, qualification of an individual to access the data, type of data, permissibility of access to combinations of data, position of an individual within an organization, or the like.

Figure 24:
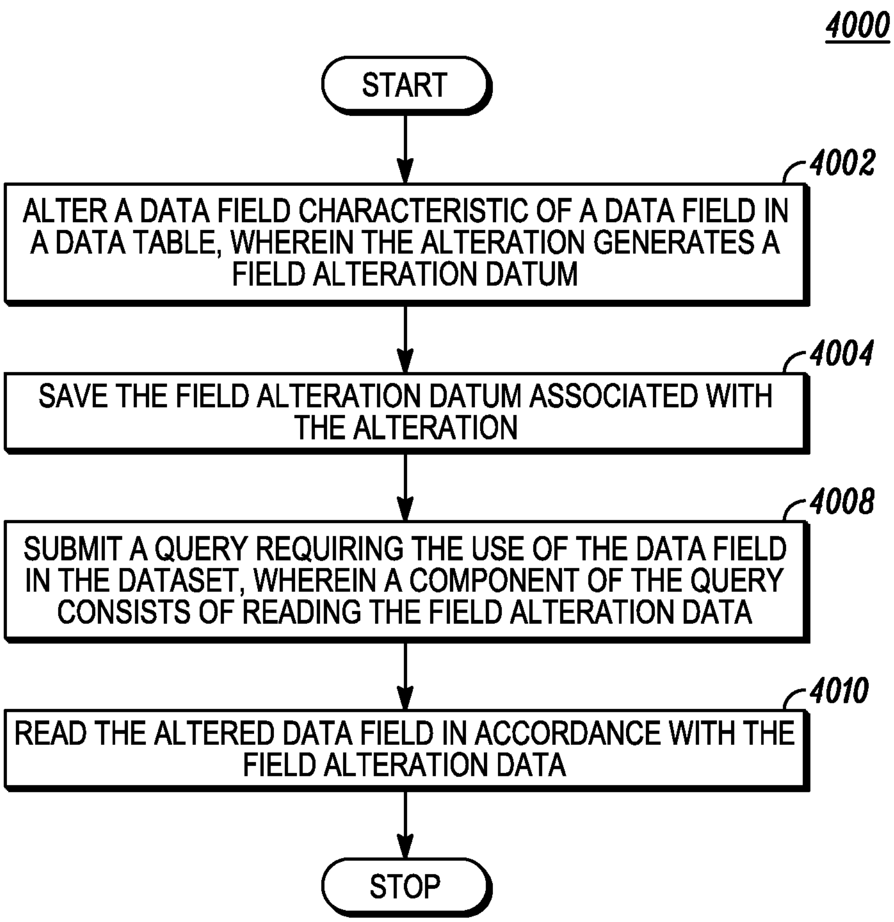
FIG. 24 depicts creating and storing a data field alteration datum.

An aspect of the present invention may be understood by referring to FIG. 24. In embodiments, the process 4000 begins at logical block 4002, where a data field characteristic of a data field may be altered in a data table. The data field may generate a field alteration datum. In embodiments, a characteristic of the sales data field may be altered in the analytical platform 100. In embodiments, the bit size of the sales data field may be altered in the data table to reduce the processing time required to utilize the sales data. For example, the bit size of the sales data field may be altered to 6 bits in the data table.

In embodiments, the data table may be a fact data table and may include dimension data. In embodiments, the fact data table may be a retails sales dataset, a syndicated sales dataset, point-of-sale data, syndicated causal dataset, an internal shipment dataset, an internal financials dataset or some other type of data set. In embodiments, the syndicated sales dataset may be a scanner dataset, an audit dataset, a combined scanner-audit dataset or some other type of data set. In embodiments, dimension may be a store, hierarchy, category, a data segment, a time, a venue, a geography, a demographic, a behavior, a life stage, a consumer segment or some other type of attribute.

At logical block 4004, the field alteration datum associated with the alteration may be stored. In embodiments, the field alteration datum may be stored in the data mart 114. For example, a record of the alteration of the 6 bit size of sales data field may be tracked by the analytic platform 100 and stored in a database. The database may be accessed by other facilities of the analytic platform 100. At logical block 4008, a query for the use of data field in the dataset may be submitted. The component of the query may consist of reading the flied alteration data. For example, an analytic query (e.g., "compute average sales by store") indicating the sales data to a 6 bit size may be submitted. The query may consist of reading the field alteration data. Finally, at logical block 4010, the altered data field may be read in accordance with the field alteration data. For example, the sales data field corresponding to 6 bits may be read.

Figure 25:
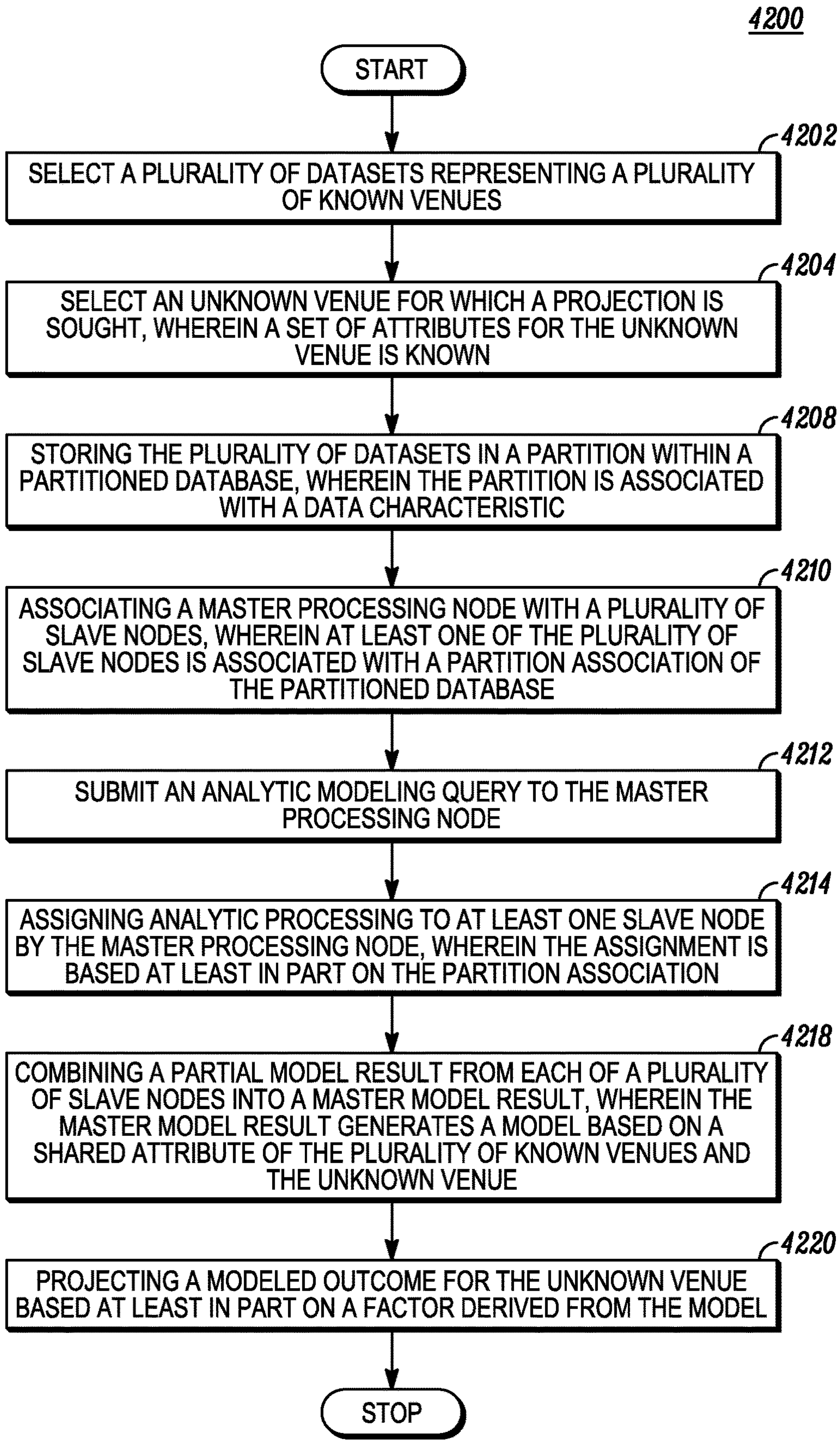
FIG. 25 depicts projecting and modeling an unknown venue using cluster processing.

In embodiments, referring to FIG. 25, systems and methods may involve using a platform as disclosed herein for applications described herein where the systems and methods involve selecting a plurality of datasets representing a plurality of known venues 4202. It may also involve selecting an unknown venue for which a projection is sought, wherein a set of attributes for the unknown venue is known 4204. It may also involve storing the plurality of datasets in a partition within a partitioned database, wherein the partition is associated with a data characteristic 4208. It may also involve associating a master processing node with a plurality of slave nodes, wherein at least one of the plurality of slave nodes is associated with a partition association of the partitioned database 4210. It may also involve submitting an analytic modeling query to the master processing node 4212. It may also involve assigning analytic processing to at least one slave node by the master processing node, wherein the assignment is based at least in part on the partition association 4214. It may also involve combining a partial model result from each of a plurality of slave nodes into a master model result, wherein the master model result generates a model based on a shared attribute of the plurality of known venues and the unknown venue 4218. It may also involve projecting a modeled outcome for the unknown venue based at least in part on a factor derived from the model 4220.

Figure 26:
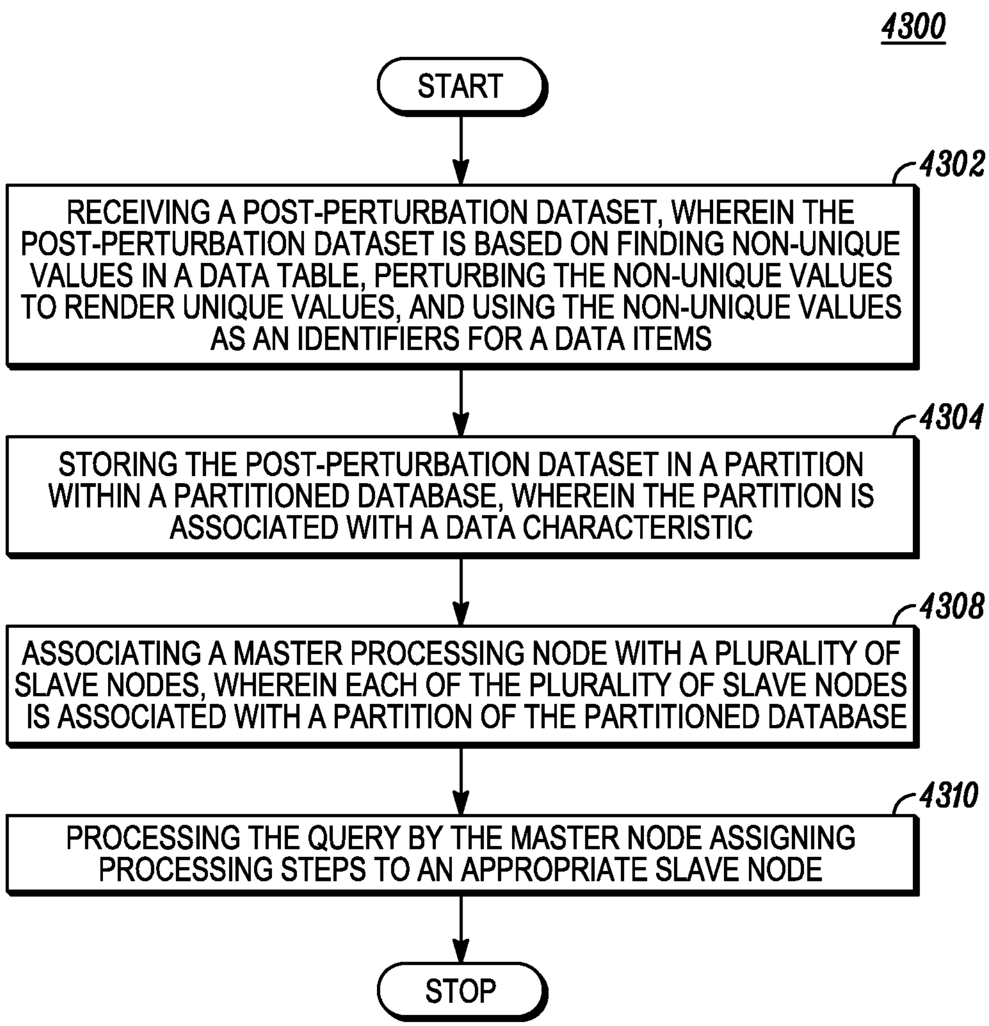
FIG. 26 depicts cluster processing of a perturbation dataset.

In embodiments, referring to FIG. 26, systems and methods may involve using a platform as disclosed herein for applications described herein where the systems and methods involve receiving a post-perturbation dataset, wherein the post-perturbation dataset is based on finding non-unique values in a data table, perturbing the non-unique values to render unique values, and using non-unique values as identifiers for data items 4302. It may also involve storing the post-perturbation dataset in a partition within a partitioned database, wherein the partition is associated with a data characteristic 4304. It may also involve associating a master processing node with a plurality of slave nodes, wherein each of the plurality of slave nodes is associated with a partition of the partitioned database 4308. It may also involve submitting an analytic query to the master processing node; and processing the query by the master node assigning processing steps to an appropriate slave node 4310.

Figure 27:
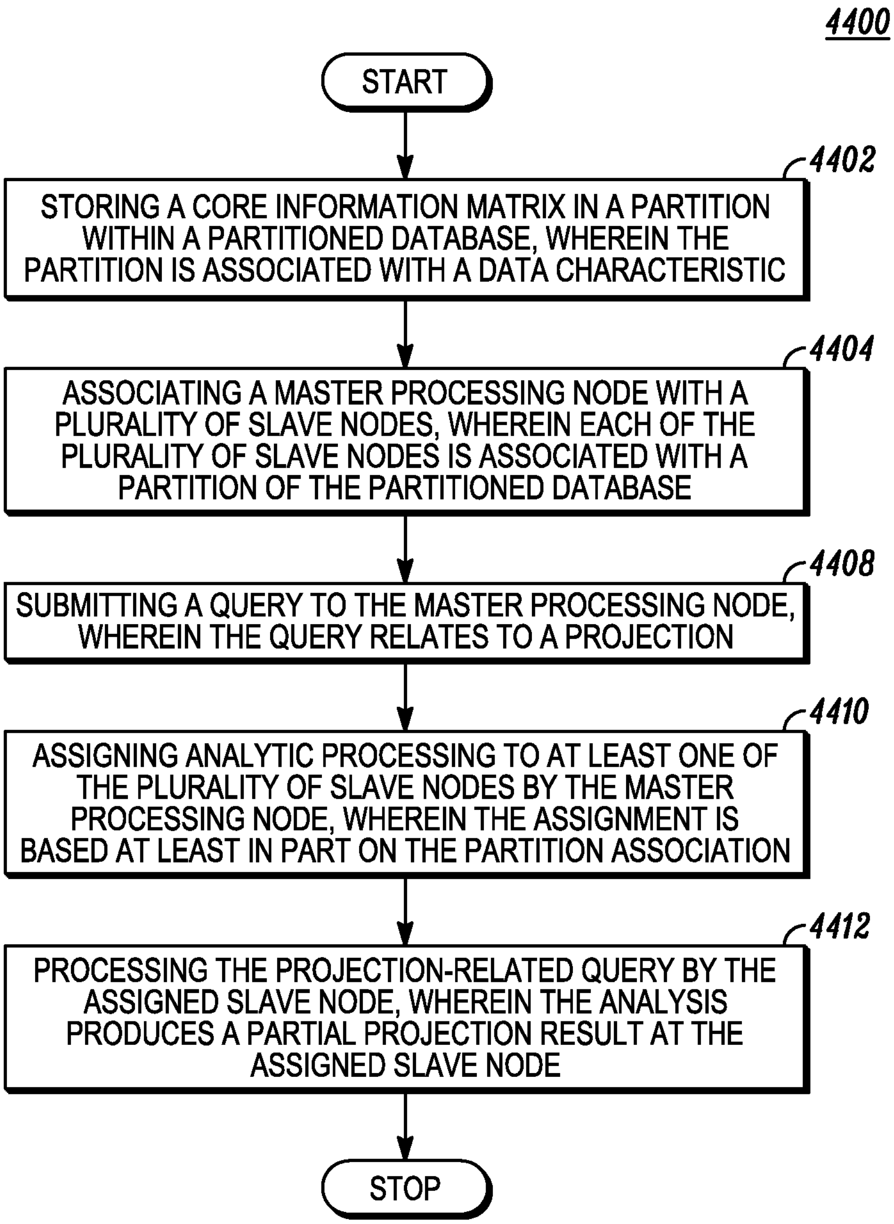
FIG. 27 depicts cluster processing of a projection core information matrix.

In embodiments, referring to FIG. 27, systems and methods may involve using a platform as disclosed herein for applications described herein where the systems and methods involve storing a core information matrix in a partition within a partitioned database, wherein the partition is associated with a data characteristic 4402. It may also involve associating a master processing node with a plurality of slave nodes, wherein each of the plurality of slave nodes is associated with a partition of the partitioned database 4404. It may also involve submitting a query to the master processing node, wherein the query relates to a projection 4408. It may also involve assigning analytic processing to at least one of the plurality of slave nodes by the master processing node, wherein the assignment is based at least in part on the partition association 4410. It may also involve processing the projection-related query by the assigned slave node, wherein the analysis produces a partial projection result at the assigned slave node 4412. In embodiments, the methods and systems may further involve combining the partial projection results from each of the plurality of slave nodes by the master processing node into a master projection result.

Figure 28:
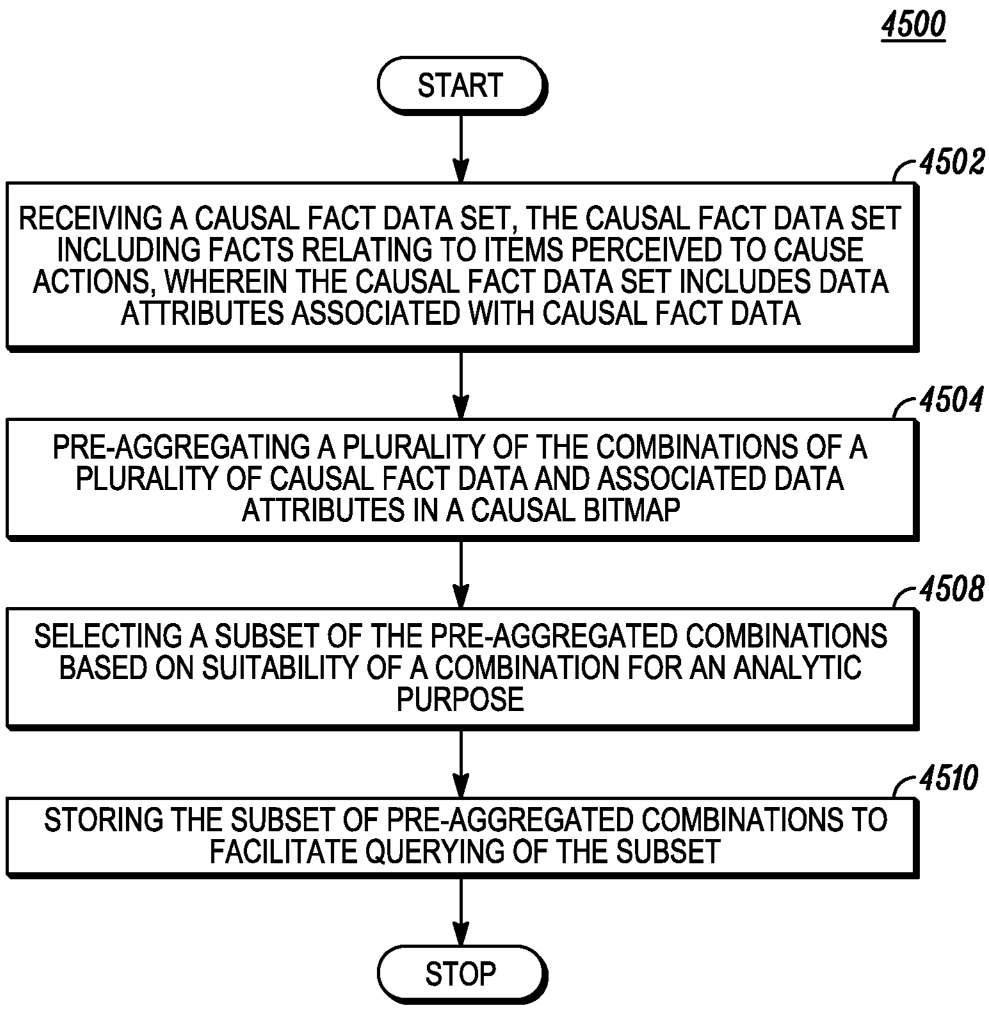
FIG. 28 depicts dimensional compression in an analytic data table.

In embodiments, referring to FIG. 28, systems and methods may involve using a platform as disclosed herein for applications described herein where the systems and methods involve receiving a causal fact dataset including facts relating to items perceived to cause actions, wherein the causal fact dataset includes a data attribute that is associated with a causal fact datum 4502. It may also involve pre-aggregating a plurality of the combinations of a plurality of causal fact data and associated data attributes in a causal bitmap 4504. It may also involve selecting a subset of the pre-aggregated combinations based on suitability of a combination for the analytic purpose 4508. It may also involve storing the subset of pre-aggregated combinations to facilitate querying of the subset 4510.

Figure 29:
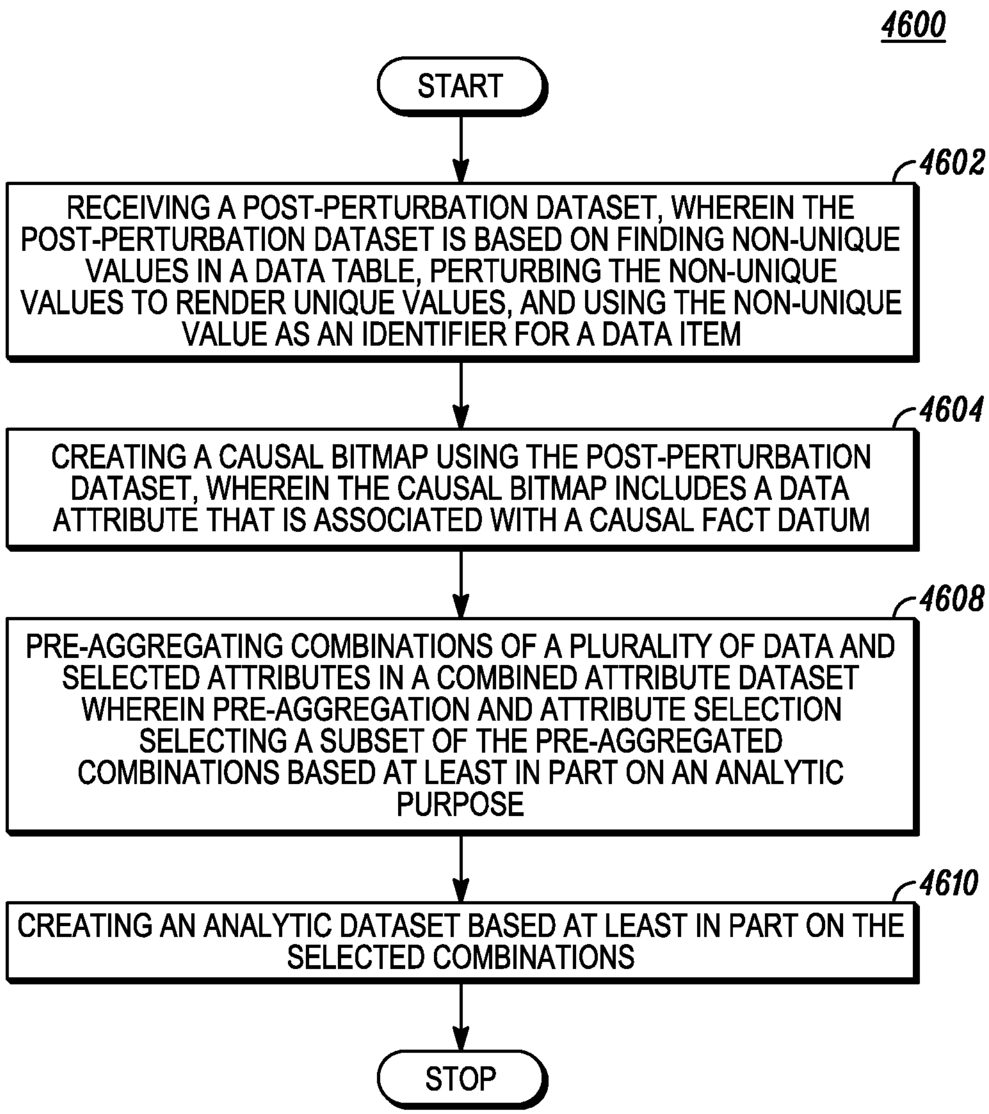
FIG. 29 depicts dimensional compression in association with a perturbation data table.

In embodiments, referring to FIG. 29, systems and methods may involve using a platform as disclosed herein for applications described herein where the systems and methods involve receiving a post-perturbation dataset, wherein the post-perturbation dataset is based on finding non-unique values in a data table, perturbing the non-unique values to render unique values, and using the non-unique value as an identifier for a data item 4602. It may also involve creating a causal bitmap using the post-perturbation dataset, wherein the causal bitmap includes a data attribute that is associated with a causal fact datum 4604. It may also involve pre-aggregating a combination of a plurality of data and selected attributes in a combined attribute dataset wherein pre-aggregation and attribute selection based at least in part on an analytic purpose 4608. It may also involve creating an analytic dataset based at least in part on the selected combinations 4610.

Figure 30:
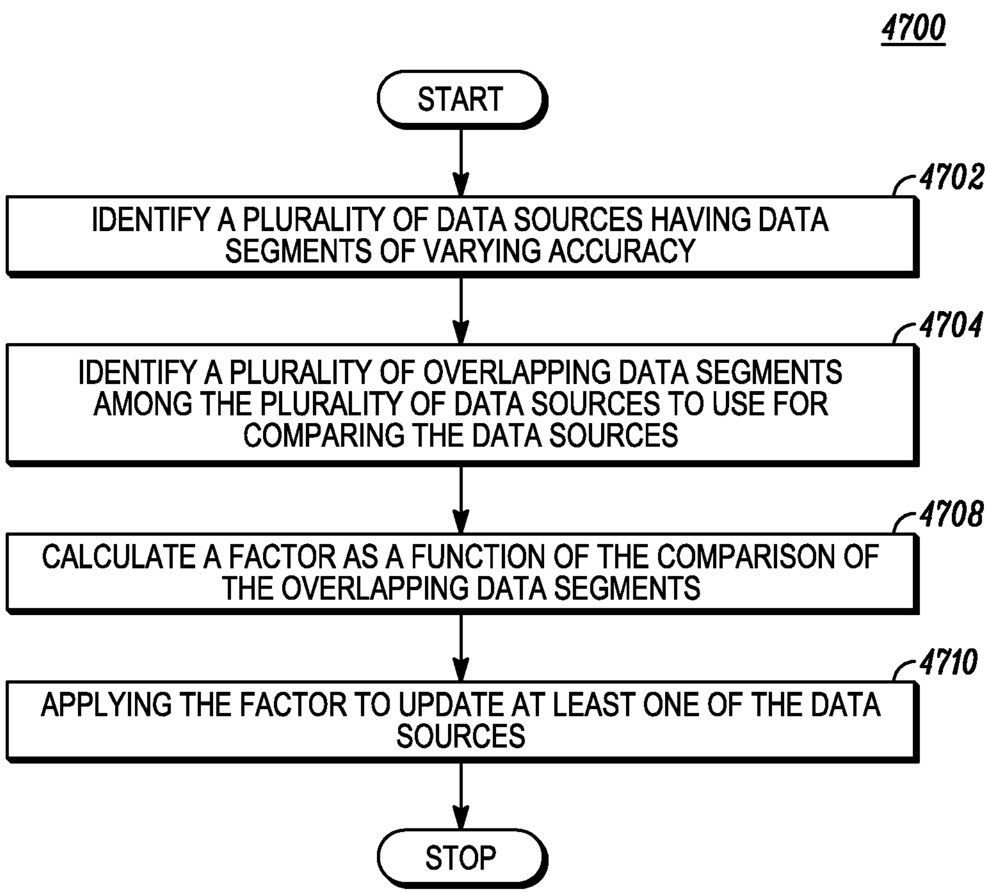
FIG. 30 depicts attribute segments and data table bias reduction.

Referring to FIG. 30, a logical process 4700 in accordance with various embodiments of the present invention is shown. The process 4700 is shown to include various logical blocks. However, it should be noted that the process 4700 may have all or fewer of the logical blocks shown in the FIG. 30. Those skilled in the art would appreciate that the logical process 4700 can have more logical blocks in addition to the logical blocks depicted in the FIG. 30 without deviating from the scope of the invention.

In embodiments, a plurality of data sources may be identified at logical block 4702. The data sources may have data segments of varying accuracy. The data sources may be a fact data source similar to the fact data source 102. The fact data source may be a retail sales dataset, a point-of-sale dataset, a syndicated casual dataset, an internal shipment dataset, an internal financial dataset, a syndicated sales dataset, and the like. The syndicated sales dataset may further be a scanner dataset, an audit dataset, a combined scanner-audit dataset and the like.

In embodiments, the data sources may be such that the plurality of data sources have data segments of varying accuracy. For example, in case the data sources are retail sales datasets for financial year 2006-07, then the retail sales dataset which was updated most recently may be considered as the most accurate dataset. Further, at least a first data source may be more accurate than a second data source.

Following the identification of the data sources, a plurality of attribute segments that may be used for comparing the data sources may be identified at logical block 4704. For example, in case the identified data sources include a retail sales data set and a point-of-sale dataset. The retail sales dataset may include attributes such as amount of sale, retailer code, date of sale and the like. Similarly, the attributes for the point-of-sale dataset may be venue of sale, retailer code, date of sale, and the like. In this case, attributes such as retailer code and date of sale are overlapping attribute segments and may be used for comparing the data sources.

Further, the plurality of overlapping attribute segments may include a product attribute, a consumer attribute, and the like. The product attribute may be a nutritional level, a brand, a product category, and physical attributes such as flavor, scent, packaging type, product launch date, display location, and the like. The product attribute may be based at least in on a SKU.

The consumer attribute may include a consumer geography, a consumer category such as a core account shopper, a non-core account shopper, a top-spending shopper, and the like, a consumer demographic, a consumer behavior, a consumer life stage, a retailer-specific customer attribute, an ethnicity, an income level, presence of a child, age of a child, marital status, education level, job status, job type, pet ownership status, health status, wellness status, media usage type, media usage level, technology usage type, technology usage level, household member attitude, a user-created custom consumer attribute, and the like.

Further, the overlapping attribute segments may include venue data (e.g. store, chain, region, country, etc.), time data (e.g. day, week, quad-week, quarter, 12-week, etc.), geographic data (including breakdowns of stores by city, state, region, country or other geographic groupings), and the like.

At logical block 4708, a factor as a function of each of the plurality of overlapping attribute segments may be calculated. Following this, the factors calculated at logical block 4708 may be used to update a group of values in the less accurate data sources, such as the second data source at logical block 4710. This may reduce the bias in the data sources.

Figure 31:
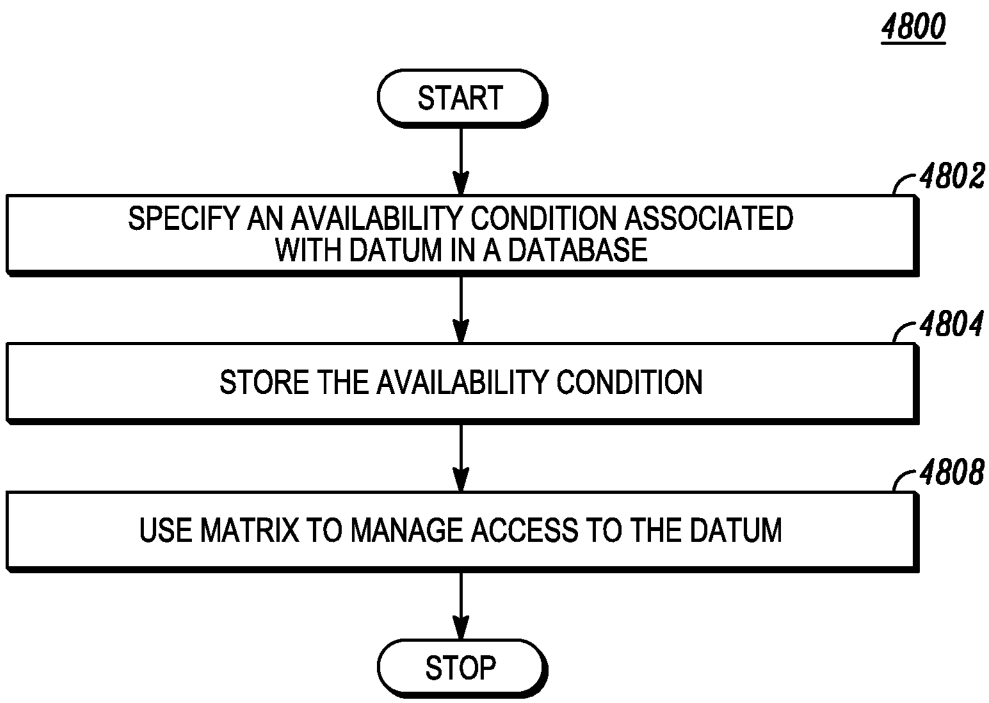
FIG. 31 depicts a specification and storage of an availability condition in a granting matrix.

In embodiments, referring to FIG. 31, systems and methods may involve using a platform as disclosed herein for applications described herein where the systems and methods involve specifying an availability condition associated with datum in a database 4802. It may involve storing the availability condition in a matrix 4804 and using the matrix to manage access to the datum 4808. In embodiments the specification of the availability condition does not require modification of the datum or restatement of the database. In embodiments the matrix stores at least two of an availability condition based on statistical validity, an availability condition based on permissibility of release of the data, an availability condition based on the application for which the data will be used, and an availability condition based on the authority of the individual seeking access to the data.

Figure 32:
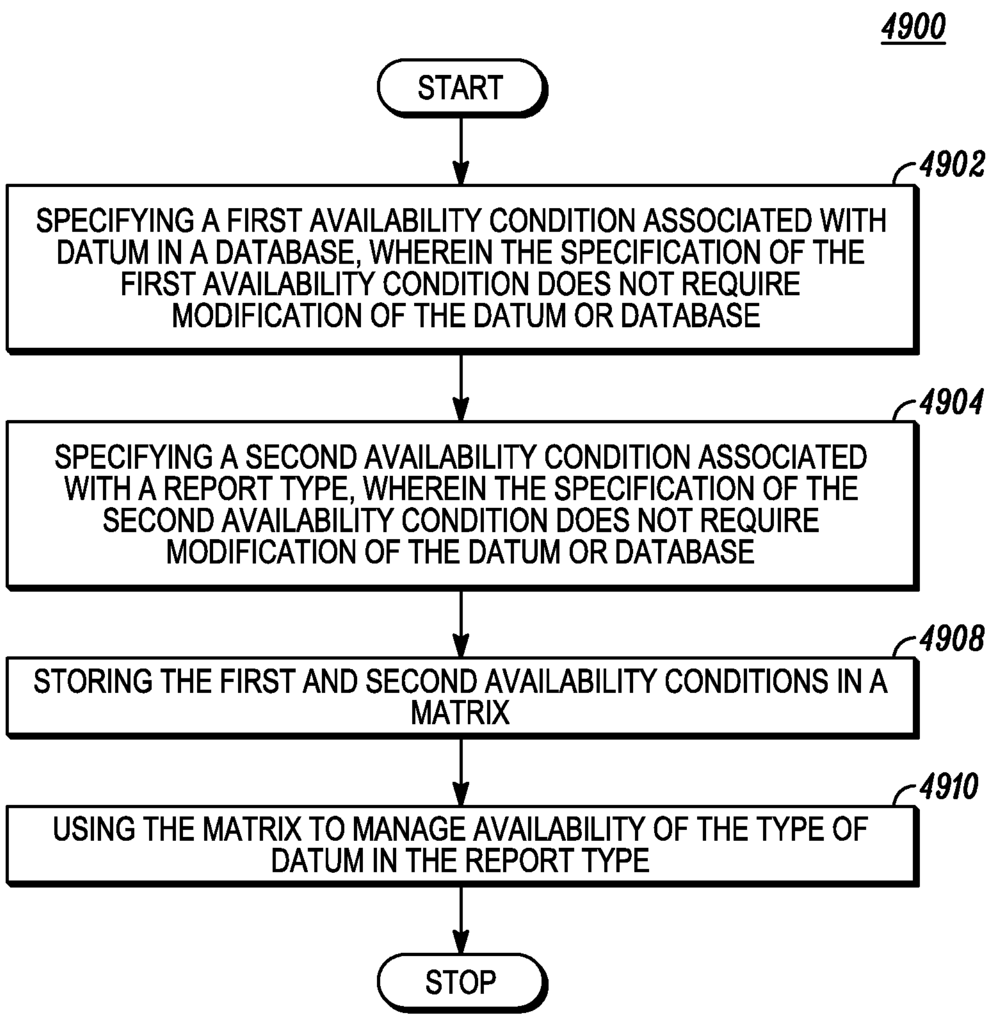
FIG. 32 depicts associating a business report with an availability condition in a granting matrix.

In embodiments, referring to FIG. 32, systems and methods may involve using a platform as disclosed herein for applications described herein where the systems and methods involve specifying a first availability condition associated with datum in a database, wherein the specification of the first availability condition does not require modification of the datum or database 4902. It may also involve Specifying a second availability condition associated with a report type, wherein the specification of the second availability condition does not require modification of the datum or database 4904. It may also involve storing the first and second availability conditions in a matrix 4908. It may also involve using the matrix to manage availability of the type of datum in the report type 4910.

Figure 33:
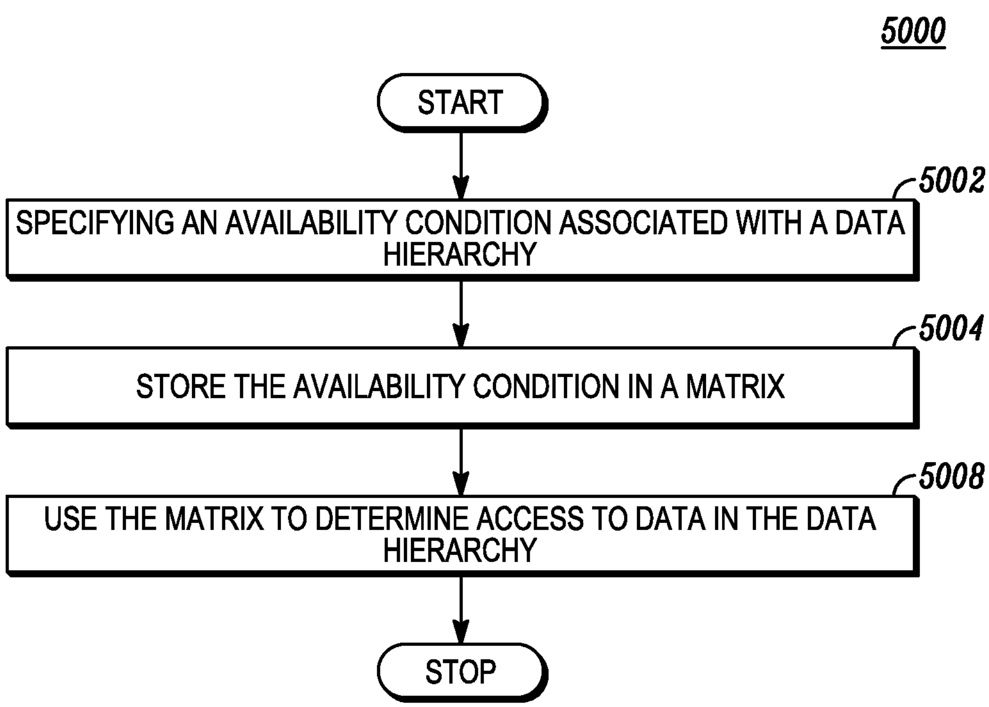
FIG. 33 depicts associating a data hierarchy with an availability condition in a granting matrix.

In embodiments, referring to FIG. 33, systems and methods may involve using a platform as disclosed herein for applications described herein where the systems and methods involve specifying an availability condition associated with a data hierarchy in a database 5002. It may also involve storing the availability condition in a matrix 5004 and using the matrix to determine assess to data in the data hierarchy 5008. In embodiments, the data hierarchy may be a flexible data hierarchy wherein a selected dimension of data within the hierarchy may be held temporarily fixed while flexibly accessing other dimensions of the data. In embodiments, the process may further involve specifying an availability condition, wherein the specification of the availability condition does not require modification of the datum or restatement of the database.

Figure 34:
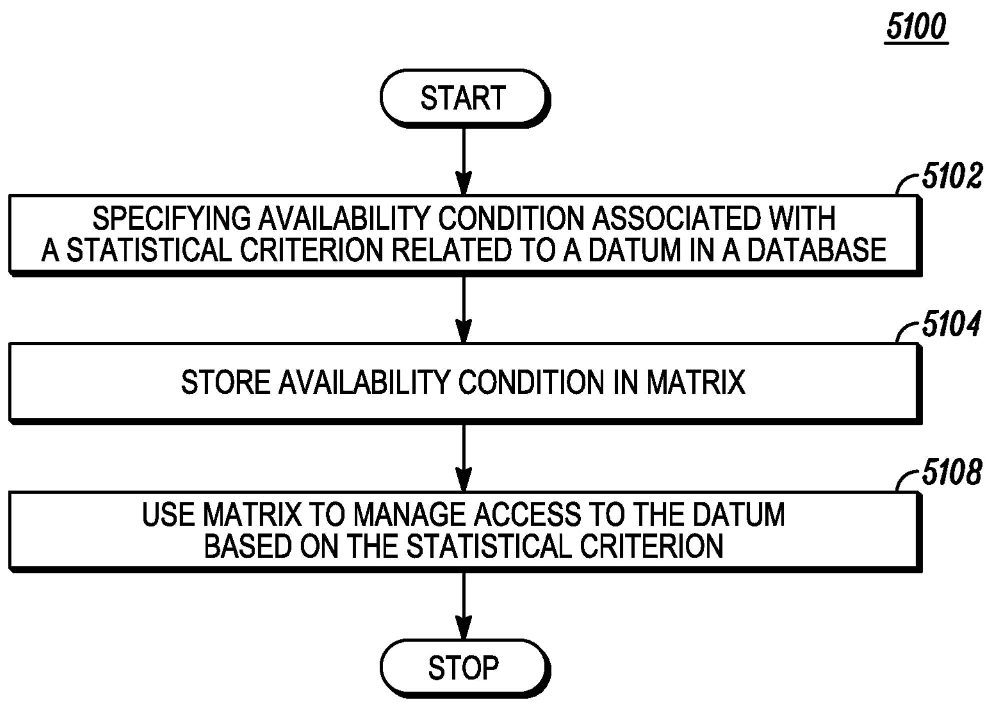
FIG. 34 depicts associating a statistical criterion with an availability condition in a granting matrix.

In embodiments, referring to FIG. 34, systems and methods may involve using a platform as disclosed herein for applications described herein where the systems and methods involve specifying an availability condition associated with a statistical criterion related to a datum in a database 5102. It may also involve storing the availability condition in a matrix 5104 and using the matrix to managed access to the datum based on the statistical criterion 5108. In embodiments the process may further involve creating an availability condition, wherein the creation of the availability condition does not require restatement of the database or modification of the datum.

Figure 35:
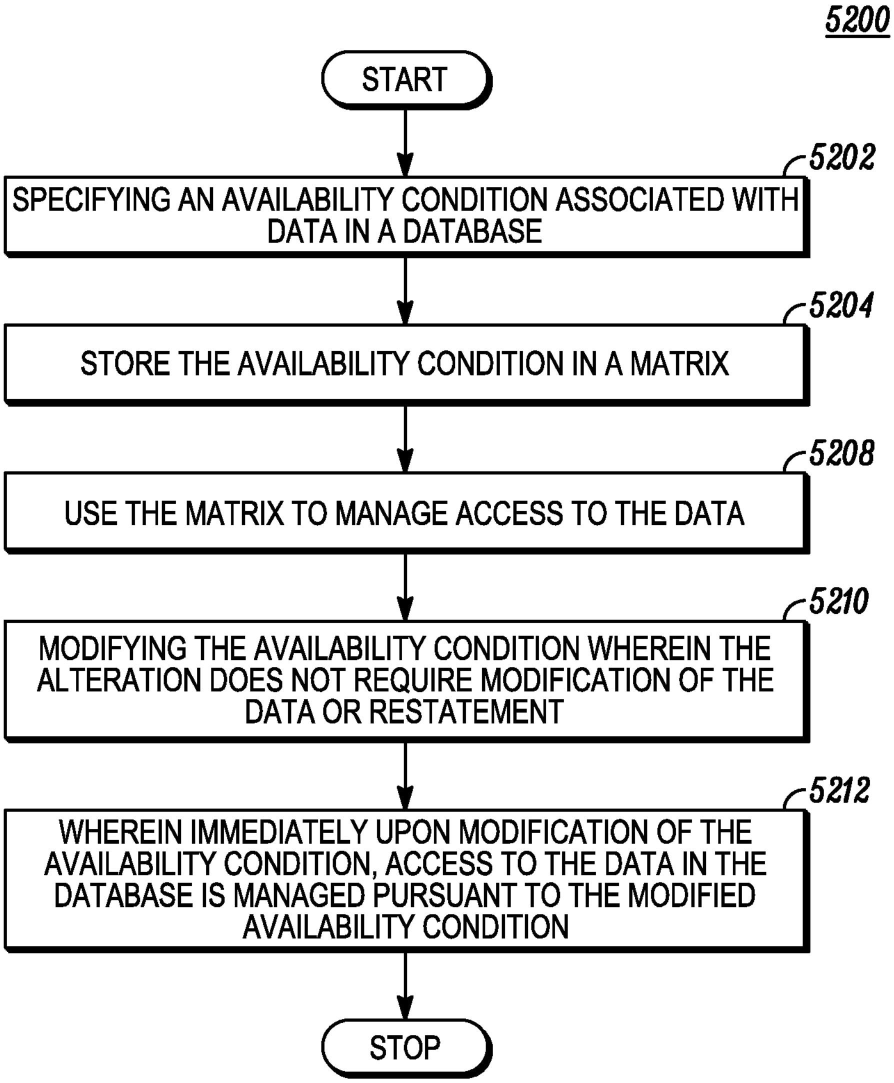
FIG. 35 depicts real-time alteration of an availability condition in a granting matrix.

In embodiments, referring to FIG. 35, systems and methods may involve using a platform as disclosed herein for applications described herein where the systems and methods involve specifying an availability condition associated with data in a database 5202. It may also involve storing the availability condition in a matrix 5204. It may also involve using the matrix to manage access to the data 5208. It may also involve modifying the availability condition, wherein the alteration does not require modification of the data or restatement 5210. In the process, immediately upon modification of the availability condition, access to the data in the database may be managed pursuant to the modified availability condition 5212.

Figure 36:
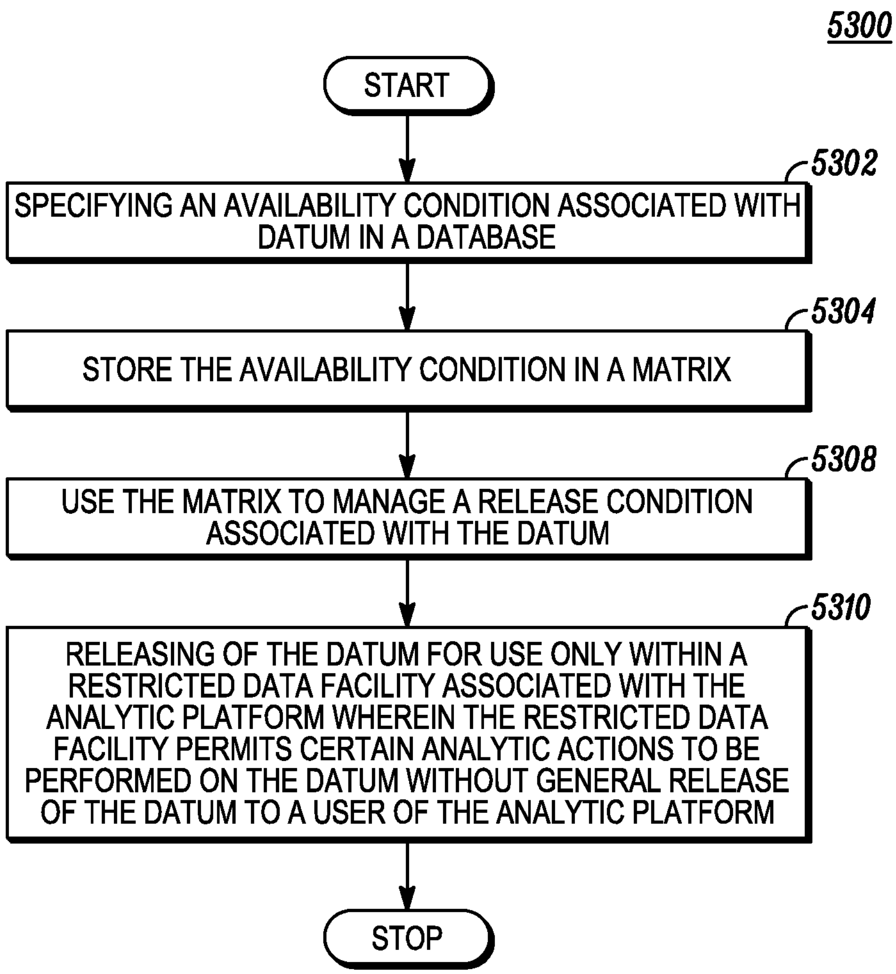
FIG. 36 depicts releasing data to a data sandbox based on an availability condition in a granting matrix.

In embodiments, referring to FIG. 36, systems and methods may involve using a platform as disclosed herein for applications described herein where the systems and methods involve specifying an availability condition associated with datum in a database 5302. It may also involve storing the availability condition in a matrix 5304. It may also involve using the matrix to manage a release condition associated with the datum 5308. It may also involve releasing of the datum for use only within a restricted data facility associated with the analytic platform, wherein the restricted data facility permits certain analytic actions to be performed on the datum without general release of the datum to a user of the analytic platform 5310. In embodiments, the restricted data facility is a data sandbox. In embodiments the specification of the availability condition does not require modification of the datum or restatement of the database.

Figure 37:
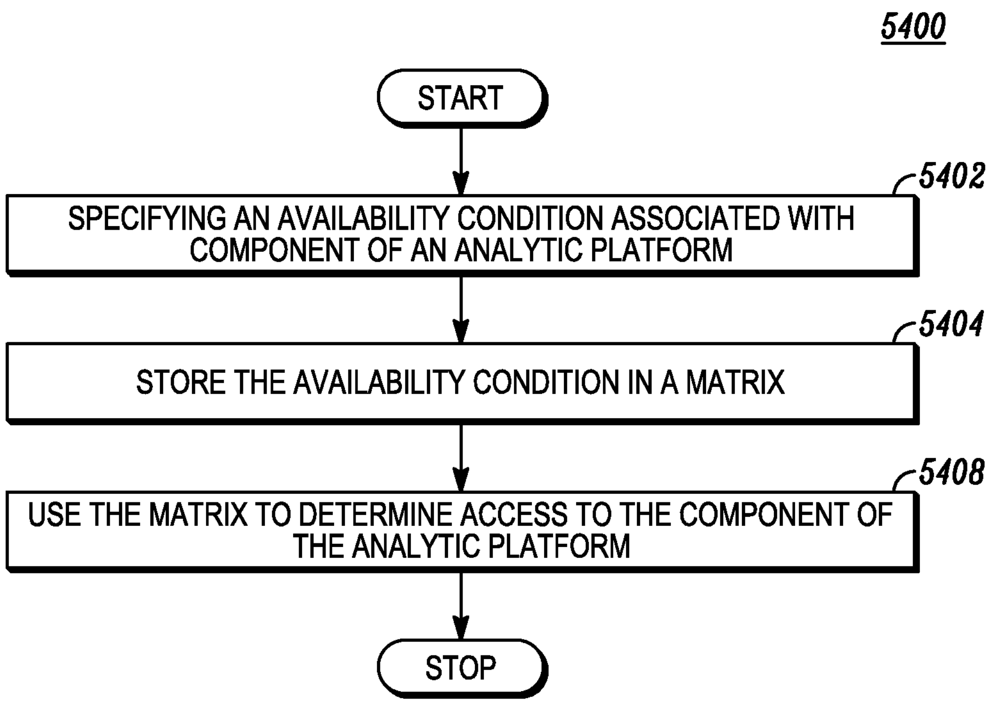
FIG. 37 depicts associating a granting matrix with an analytic platform.

In embodiments, referring to FIG. 37, systems and methods may involve using a platform as disclosed herein for applications described herein where the systems and methods involve specifying an availability condition associated with a component of an analytic platform 5402. It may involve storing the availability condition in a matrix 5404. It may involve using the matrix to determine access to the component of the analytic platform 5408.

Figure 38:
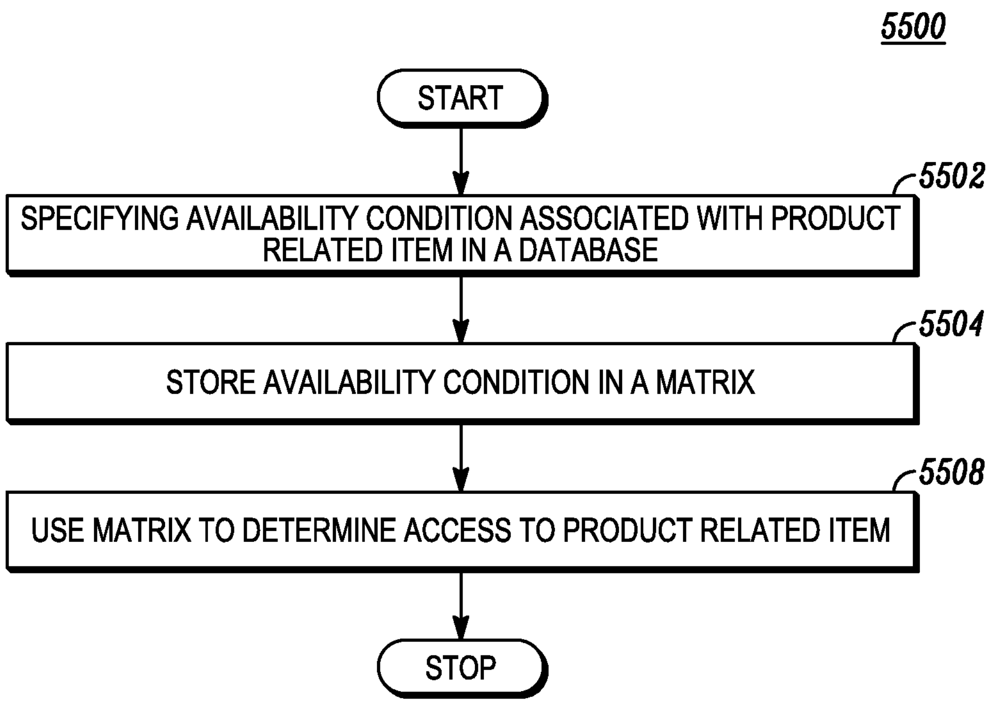
FIG. 38 depicts associating a granting matrix with a product and product code-combination.

In embodiments, referring to FIG. 38, systems and methods may involve using a platform as disclosed herein for applications described herein where the systems and methods involve specifying an availability condition associated with a product-related item in a database 5502. It may also involve storing the availability condition in a matrix 5504 and using the matrix to determine access to the product-related item 5508. In embodiments, the process may further involve specifying an availability condition associated with a data item related to combination of a product-related item and a product code. In embodiments, the specification of the availability condition does not require modification of the product-related item or restatement of the database.

Figure 39:
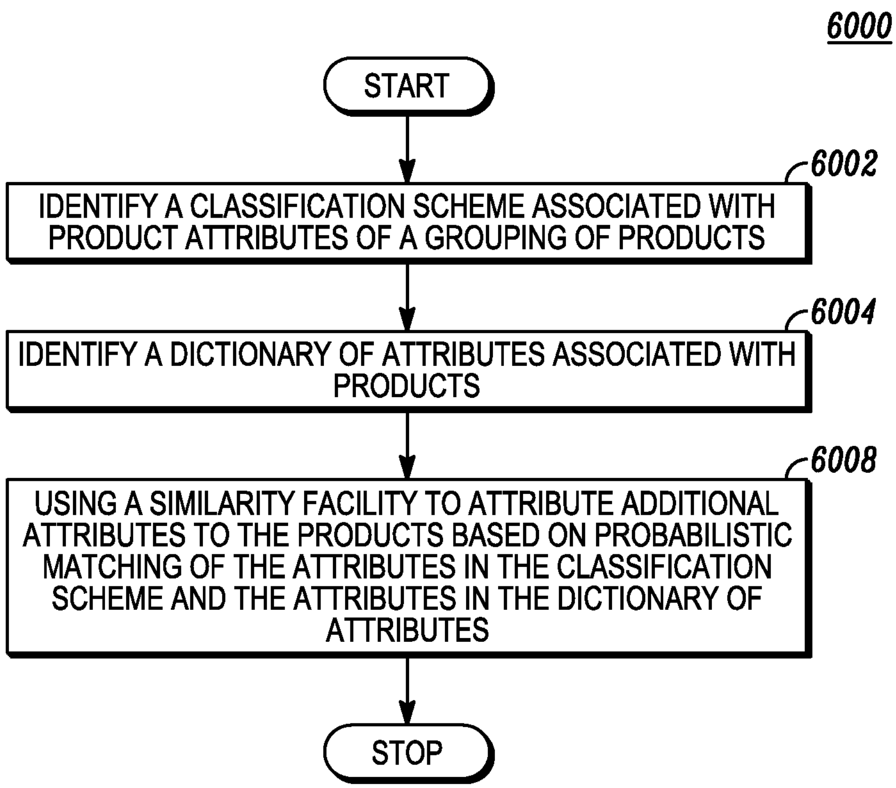
FIG. 39 depicts similarity matching based on product attribute classification.

In embodiments, referring to FIG. 39, systems and methods may involve using a platform as disclosed herein for applications described herein where the systems and methods involve identifying a classification scheme associated with a plurality of product attributes of a grouping of products 6002. It may also involve identifying a dictionary of attributes associated with products 6004. It may also involve using a similarity facility to attribute additional attributes to the products based on probabilistic matching of the attributes in the classification scheme and the attributes in the dictionary of attributes 6008.

Figure 40:
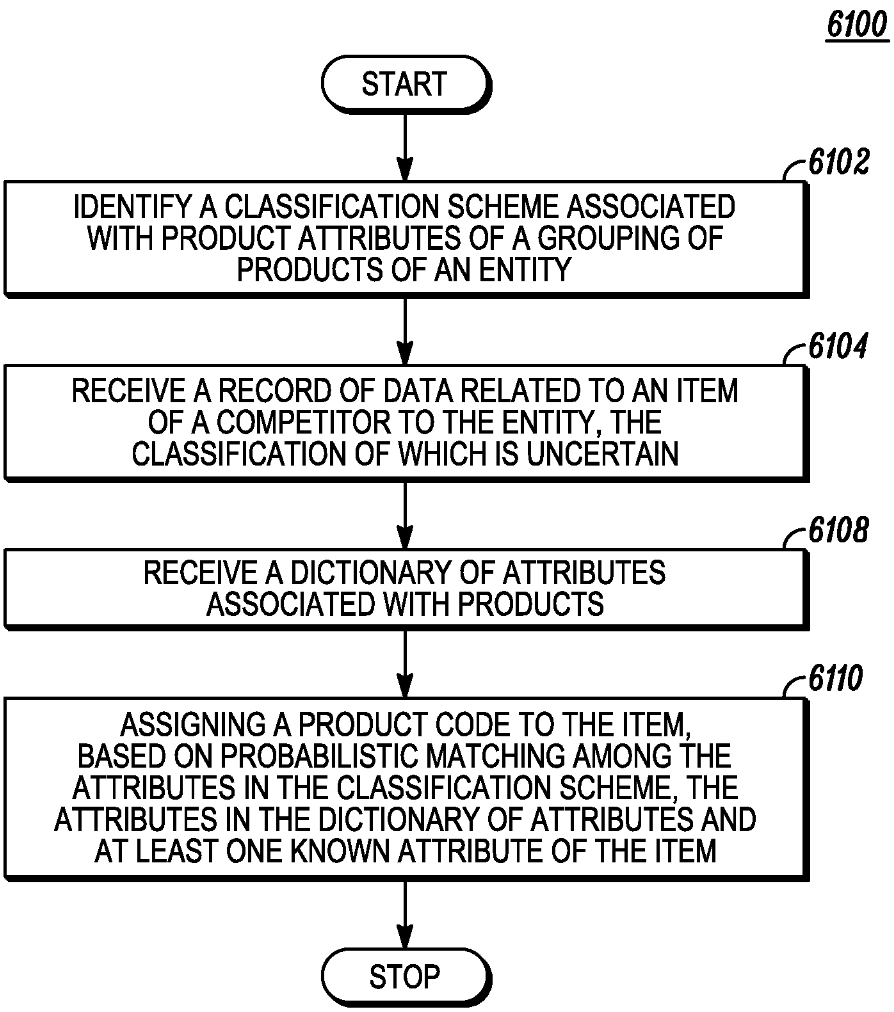
FIG. 40 depicts similarity matching of a competitor's products.

In embodiments, referring to FIG. 40, systems and methods may involve using a platform as disclosed herein for applications described herein where the systems and methods involve identifying a classification scheme associated with product attributes of a grouping of products of an entity 6102. It may also involve receiving a record of data relating to an item of a competitor to the entity, the classification of which is uncertain 6104. It may also involve receiving a dictionary of attributes associated with products 6108. It may also involve assigning a product code to the item, based on probabilistic matching among the attributes in the classification scheme, the attributes in the dictionary of attributes and at least one known attribute of the item 6110.

Figure 41:
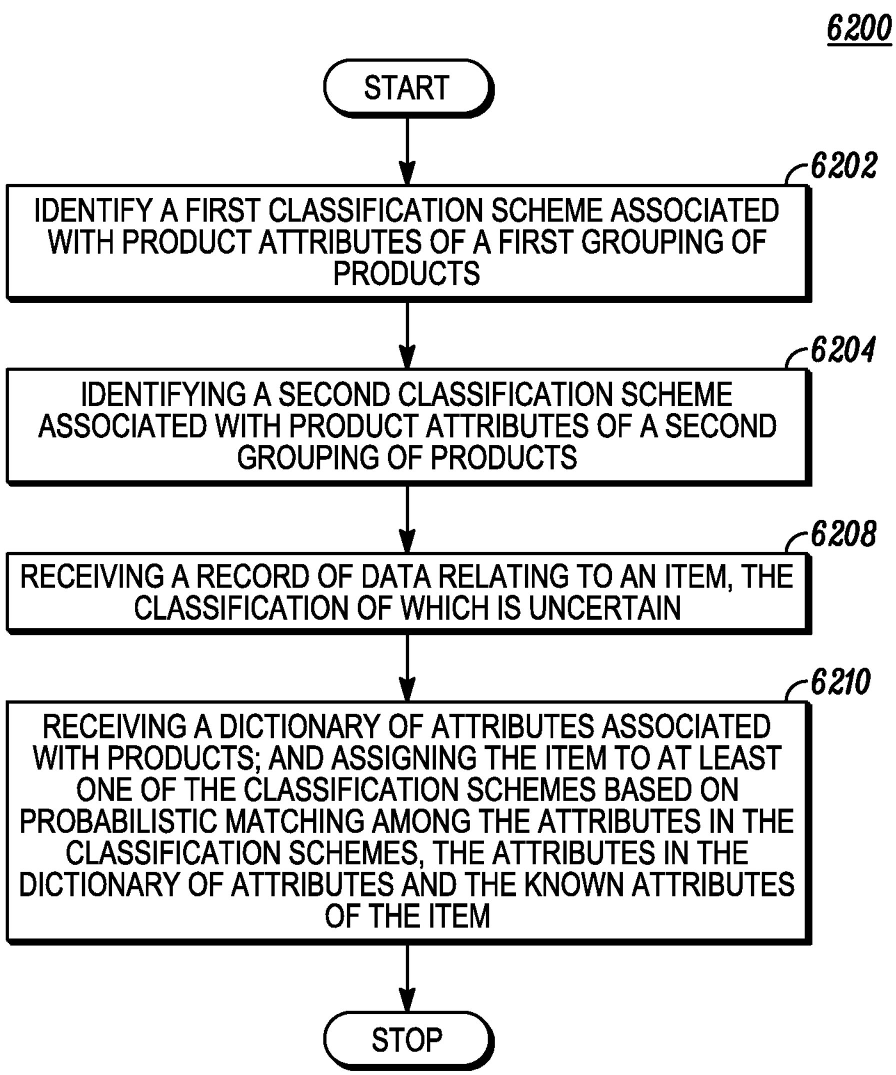
FIG. 41 depicts similarity matching of products based on multiple classification schemes.

In embodiments, referring to FIG. 41, systems and methods may involve using a platform as disclosed herein for applications described herein where the systems and methods involve identifying a first classification scheme associated with product attributes of a first grouping of products 6202. It may also involve identifying a second classification scheme associated with product attributes of a second grouping of products 6204. It may also involve receiving a record of data relating to an item, the classification of which is uncertain 6208. It may also involve receiving a dictionary of attributes associated with products and assigning the item to at least one of the classification schemes based on probabilistic matching among the attributes in the classification schemes, the attributes in the dictionary of attributes and the known attributes of the item 6210.

An aspect of the present invention relates to using similarity matching technique for product code assignment. Similarity technique may be useful for assessing the similarity of products, items, departments, stores, environments, real estate, competitors, markets, regions, performance, regional performance, and a variety of other things. This may also be helpful in the new product launch. Referring to FIG. 1, a Master Data Management Hub (MDMH) 150 may be associated with a Similarity Facility 180. The similarity facility 180 may receive an input data hierarchy within the MDMH 150 and analyze the characteristics of the hierarchy and select a set of attributes that may be salient to a particular analytic interest. For example, a product selection by a type of consumer, product sales by a type of venue, and so forth. The similarity facility 180 may select primary attributes, match attributes, associate attributes, and block attributes and prioritize the attributes. In another aspect of the invention, the similarities facility 180 may use a probabilistic matching engine where the probabilistic matching engine compares all or some subset of attributes to determine the similarity.

Figure 42:
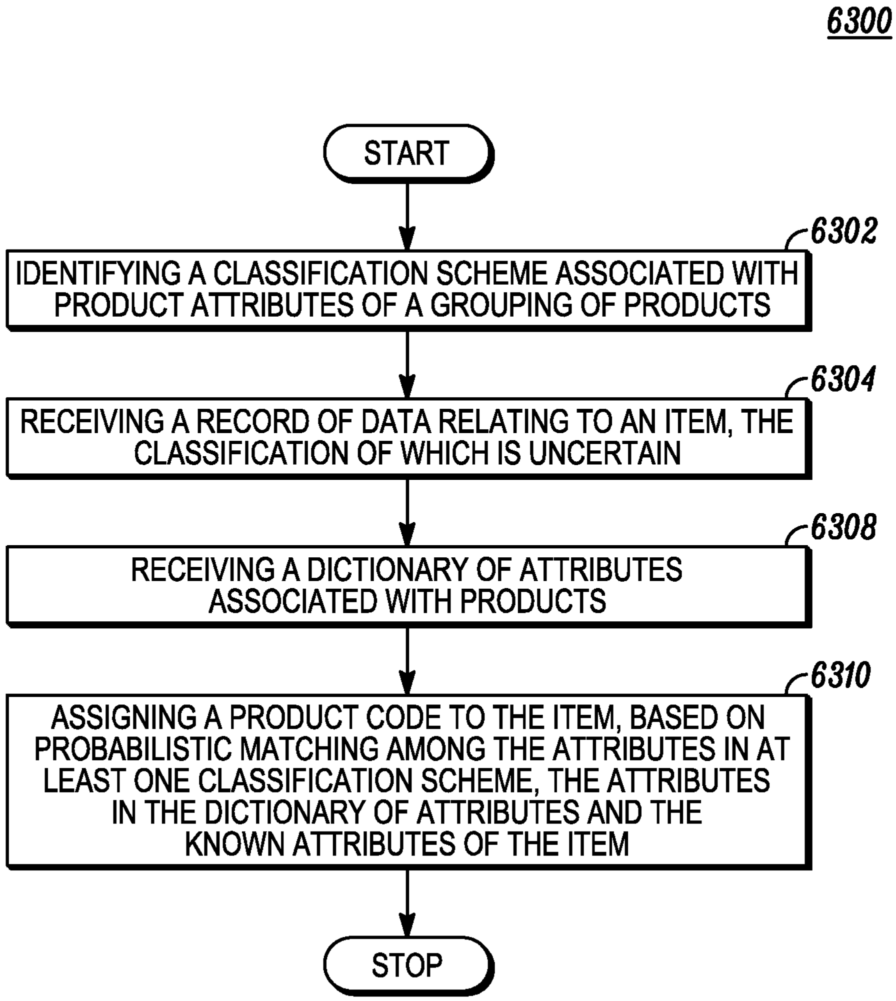
FIG. 42 depicts using similarity matching for product code assignment.

An aspect of the present invention may further be understood by referring to FIG. 42. In an embodiment the process 6300 begins at logical block 6302 where the process may identify a classification scheme. The classification scheme may be associated with product attributes of a grouping of products.

In embodiments, the product attribute may be a nutritional level, a brand, a product category, or a physical attribute. In an embodiment, the physical attribute may be a flavor, a scent, a packaging type, a product launch date, or a display location. In embodiments, the product attribute may be based at least in part on a Stock Keeping Unit (SKU).

At logical block 6304, the process may receive a record of data relating to an item. In embodiments, the classification of the item may be uncertain. In embodiments, the process may receive the record of data relating to a plurality of items.

The process may continue to logical block 6308, where the process may receive a dictionary of attributes. The dictionary of attributes may include the attributes associated with products. Further, at logical block 6310, the process may assign a product code to the item or the plurality of items. In embodiments, the assignment of the product code may be based on probabilistic matching among the attributes in at least one classification scheme. In embodiments, the probabilistic matching may be among the attributes in the dictionary of attributes and the known attributes of the item.

Figure 43:
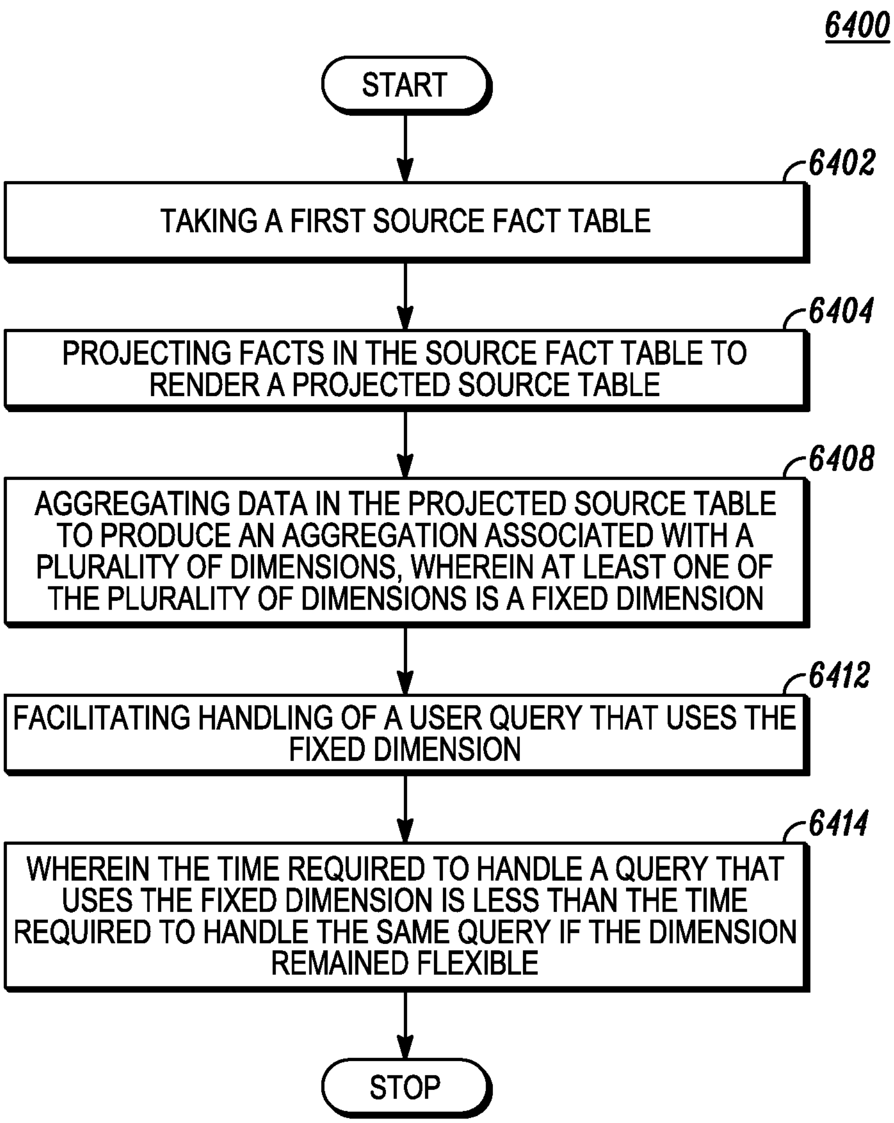
FIG. 43 depicts utilizing aggregated data.

Referring to FIG. 43, a logical process 6400 in accordance with various embodiments of the present invention is shown. The process 6400 is shown to include various logical blocks. However, it should be noted that the process 6400 may have all or fewer of the logical blocks shown in the FIG. 43. Further, those skilled in the art would appreciate that the logical process 6400 can have more logical blocks in addition to the logical blocks depicted in the FIG. 43 without deviating from the scope of the invention.

In embodiments, a first source fact table may be provided at logical block 6402. The data set may be a fact table 104. The fact table 104 may include a large number of facts. Further, the fact table 104 may utilize a bitmap index associated with a bitmap generation facility 140. The bitmap index may be generated in relation to the user input and may include a domain. In addition, the bitmap index may include a reference and may aid in the selection of a flexible dimension. Moreover, the bitmap index may be related to report generation, data mining, processing related to data relationships, and data querying. Further, the bitmap index may be generated prior to the user input In embodiments, facts may be provided in the source fact table to render a projected source table 6404. Data in the projected source table may be aggregated to produce an aggregation associated with a plurality of dimensions, wherein at least one of the plurality of dimensions is a fixed dimension 6408. In embodiments, handling of a user query that uses the fixed dimension may be facilitated 6412, the time required to handle a query that uses the fixed dimension is less than the time required to handle the same query if the dimension remained flexible 6414.

In embodiments, one or more dimension of the multiple dimensions may be a flexible dimension. The flexible dimension may be specified by the user at the time of query. Alternatively, the flexible dimension may be selected prior to the user query. Further, the flexible dimension may be related to a level of hierarchy within the fact table 104.

In embodiments, a user may be able to generate a query in association with a query processing facility 128. In embodiments, the query may be related to a use of the flexible dimension. The use of the flexible dimension may provide the user with flexibility at the time of the query. Further, the use of flexible dimension may reduce the number of fact tables associated with the aggregation.

Finally, an analytic result may be presented to the user based on the user query. In embodiments, an elapsed time between the query and the presentation of the analytic results may be relatively small as compared to the time taken to execute the query without utilizing the flexible dimension.

Figure 44:
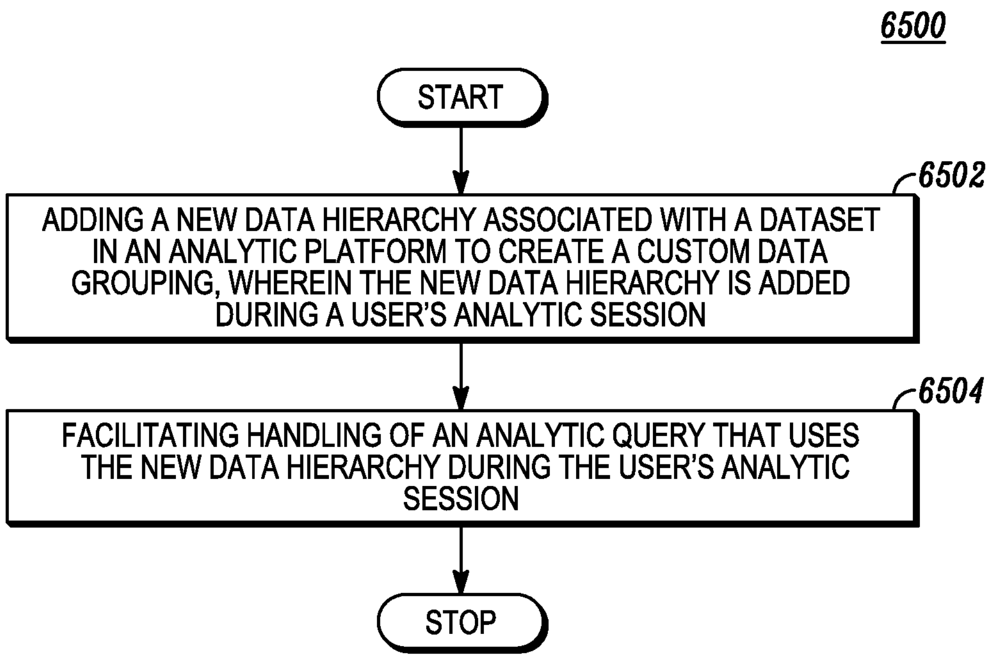
FIG. 44 depicts the introduction and analysis of a new dataset hierarchy in a single analytic session.

In embodiments, referring to FIG. 44, systems and methods may involve using a platform as disclosed herein for applications described herein where the systems and methods involve adding a new data hierarchy associated with a dataset in an analytic platform to create a custom data grouping, wherein the new data hierarchy is added during a user's analytic session 6502. It may further involve facilitating handling of an analytic query that uses the new data hierarchy during the user's analytic session 6504. In embodiments the analytic platform is a platform for analyzing data regarding sales of products.

The process may further continue to logical block 6312, where the process may iterate the probabilistic matching until a statistical criterion is met. However, the present invention may not be limited to the presence of the statistical criterion.

Figure 45:
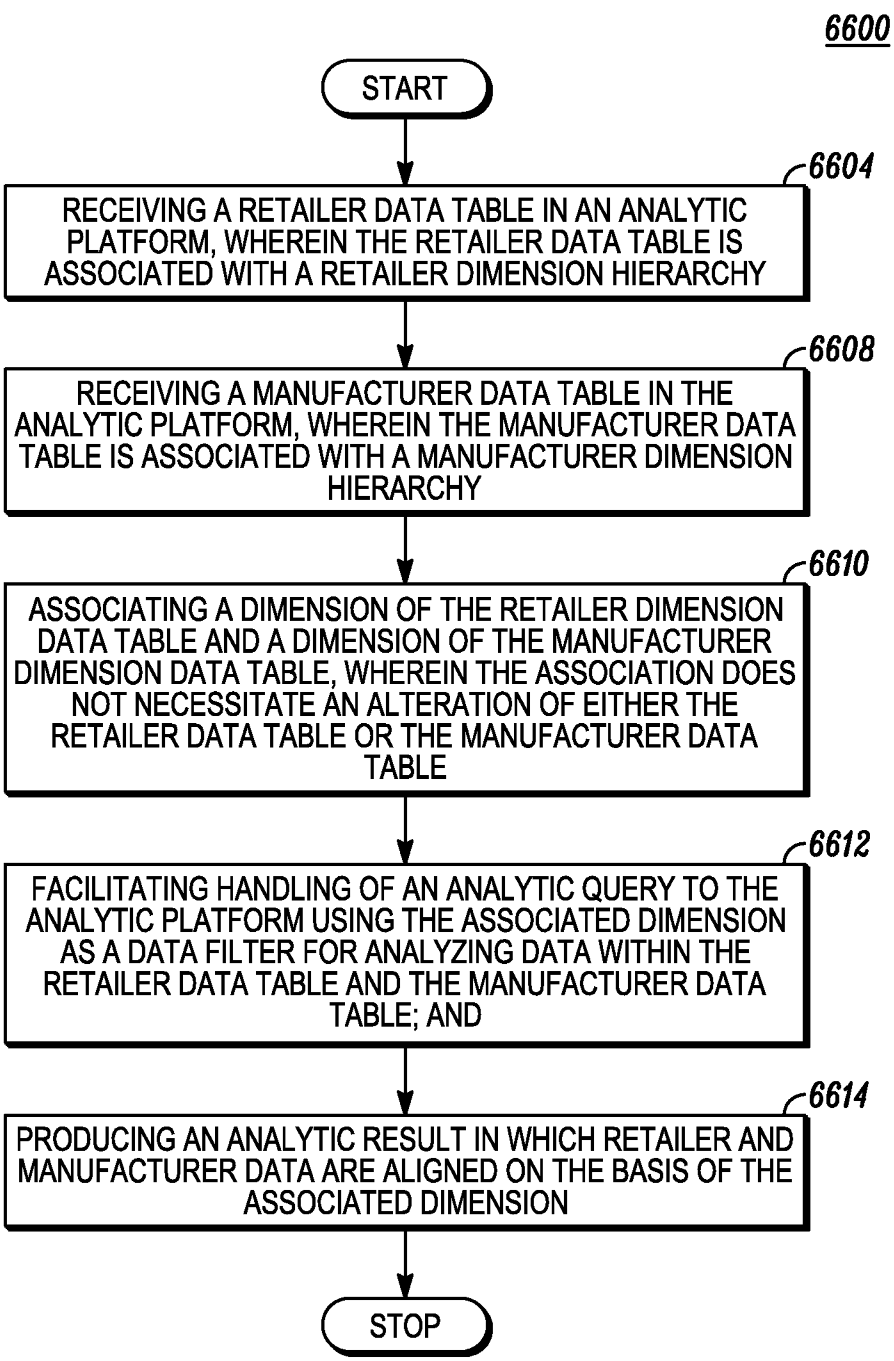
FIG. 45 depicts mapping retailer-manufacturer hierarchy structures using a multiple data hierarchy view in an analytic platform.

In embodiments, referring to FIG. 45, systems and methods may involve using a platform as disclosed herein for applications described herein where the systems and methods involve receiving a retailer data table in an analytic platform, wherein the retailer data table is associated with a retailer dimension hierarchy 6604. It may also involve receiving a manufacturer data table in the analytic platform, wherein the manufacturer data table is associated with a manufacturer dimension hierarchy 6608. It may also involve associating a dimension of the retailer dimension data table and a dimension of the manufacturer dimension data table, wherein the association does not necessitate an alteration of either the retailer data table or the manufacturer data table 6610. It may also involve facilitating handling of an analytic query to the analytic platform using the associated dimension as a data filter for analyzing data within the retailer data table and the manufacturer data table 6612. It may also involve producing an analytic result in which retailer and manufacturer data are aligned on the basis of the associated dimension 6614.

Figure 46:
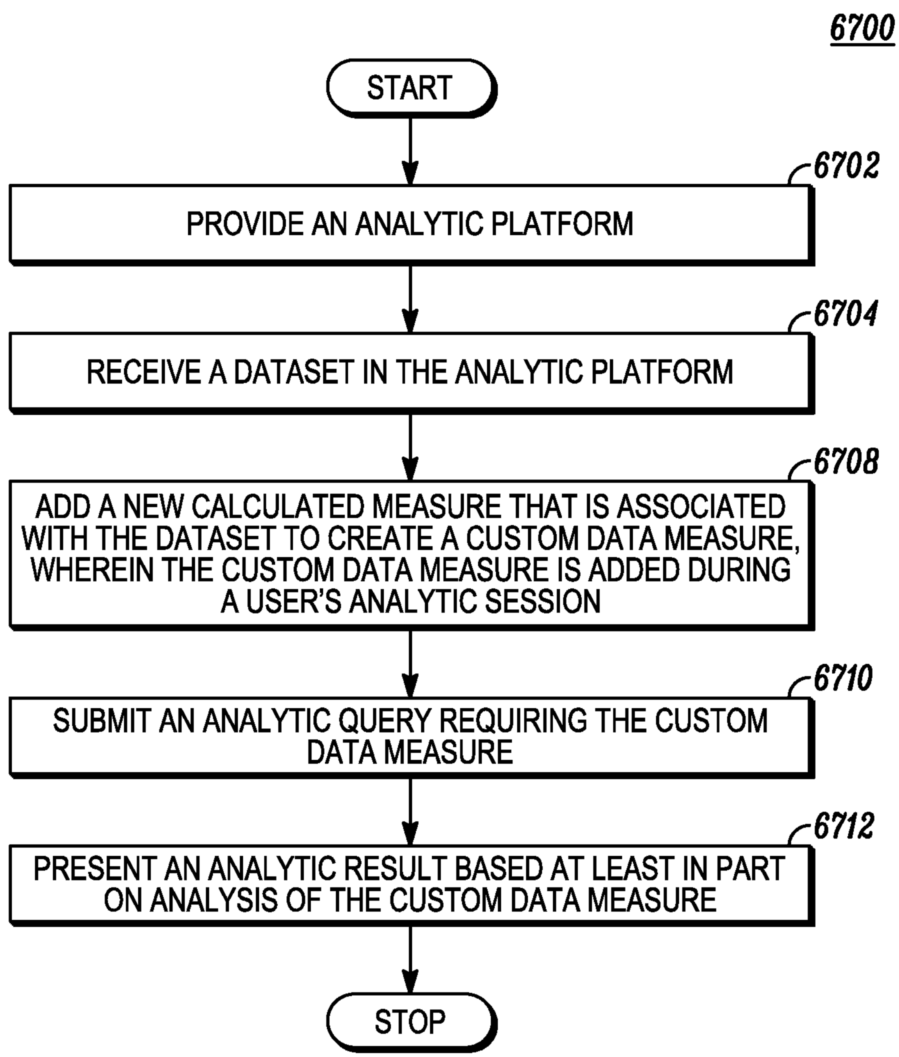
FIG. 46 depicts associating a new calculated measure with a dataset using an analytic platform.

Referring to FIG. 46, a logical process 6700 in accordance with various embodiments of the present invention is shown. The process 6700 is shown to include various logical blocks. However, it should be noted that the process 6700 may have all or fewer of the logical blocks shown in the FIG. 46. Further, those skilled in the art would appreciate that the logical process 6700 can have a few more logical blocks in addition to the logical blocks depicted in the FIG. 46 without deviating from the scope of the invention.

In embodiments, the analytic platform 100 may be provided at logical block 6702. The analytic platform 100 may include a range of hardware systems, software modules, data storage facilities, application programming interfaces, human-readable interfaces, and methodologies, as well as a range of applications, solutions, products, and methods that use various outputs of the analytic platform 100, as more particularly detailed in conjunction with various figures of the specifications.

In embodiments, the analytic platform 100 receives a dataset at logical block 6704. After receiving the dataset, a new measure for the dataset is calculated. The new measure may be a measure which is specific to a user. For example, the new measure could be mean of the sales at a particular venue during the weekends. Further, the new calculated measure is added to create a custom data measure at logical block 6708. In embodiments, the custom data measure may be added during a user's analytic session. In this case, the custom data measure may be added on-the-fly during the user's analytic session.

After the custom data measure has been added, the user may submit an analytic query that may require the custom data measure for execution at logical block 6710. Further, the analytic query is executed based at least in part on analysis of the custom data measure. Following this, an analytic result based on the execution of the analytic query is presented at logical block 6712.

An aspect of the present invention relates to obfuscation of data. Referring to FIG. 1, there can be large variety of data sources, such as panel data source 198, a fact data source 102, a dimension data source 104 from which commercial activities, such as consumer behaviors, may be analyzed, projected, and used to better understand and predict commercial behavior. The panel data source 198 may refer to a panel data such as consumer panel data set. The dimension data source 104 may refer to the dimensions along which various items may be measured. The fact data source 102 may refer to the facts that may be measured with respect to the dimensions. In embodiments, the fact data source 102 may be a consumer point-of-sale dataset. The factual data may be a household panel data and a loyalty card data. Further, as illustrated in FIG. 1, a data fusion facility 200 may be used to fuse, blend, combine, aggregate, join, merge, or perform some other data fusion technique on individual data types and sources, such as the panel data source 198, the fact data source 102, and the dimension data source 104. This may be effective in extending the utility of the available data sources by providing enhanced estimates. However, in some cases the data availability may be dependent on factors such as a retailer's willingness to share the loyalty card data. Therefore, data obfuscation may be used to address similar factors. In embodiments, dithering may be used to obfuscate data.

Figure 47:
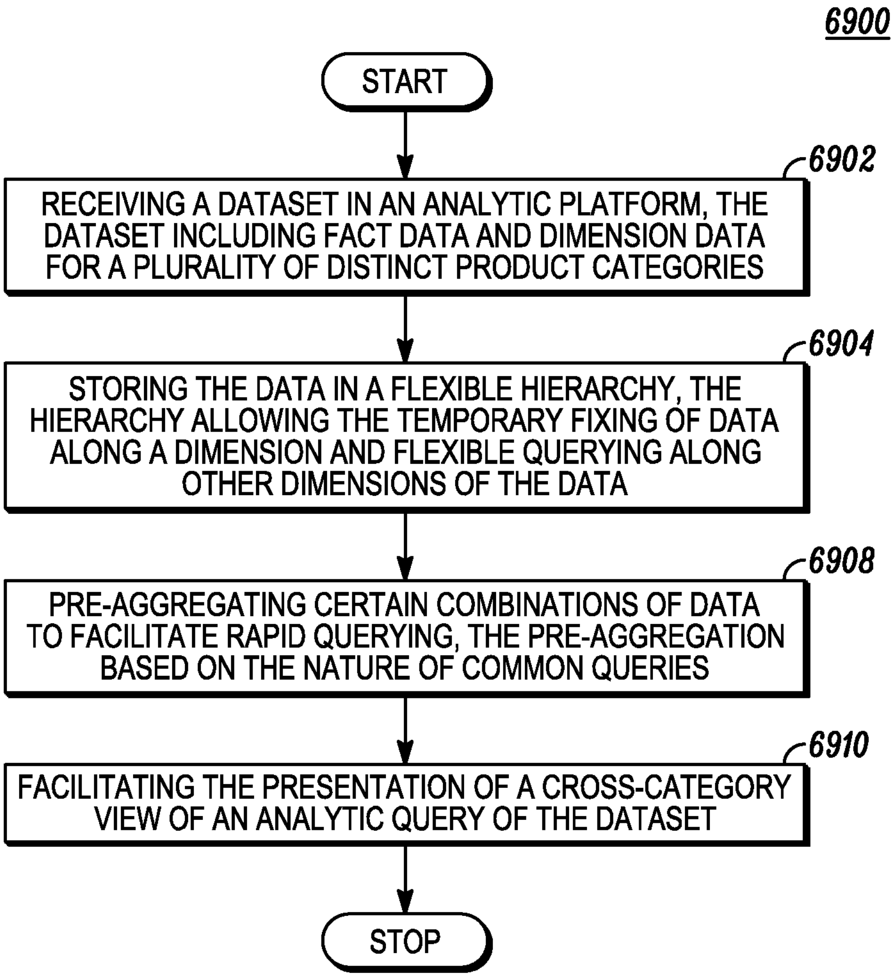
FIG. 47 depicts cross-category view of a dataset using an analytic platform.

In embodiments, referring to FIG. 47, systems and methods may involve using a platform as disclosed herein for applications described herein where the systems and methods involve receiving a dataset in an analytic platform, the dataset including fact data and dimension data for a plurality of distinct product categories 6902. It may also involve storing the data in a flexible hierarchy, the hierarchy allowing the temporary fixing of data along a dimension and flexible querying along other dimensions of the data 6904. It may also involve pre-aggregating certain combinations of data to facilitate rapid querying, the pre-aggregation based on the nature of common queries 6908. It may also involve facilitating the presentation of a cross-category view of an analytic query of the dataset 6910. In embodiments, the temporarily fixed dimension can be rendered flexible upon an action by the user.

Figure 48:
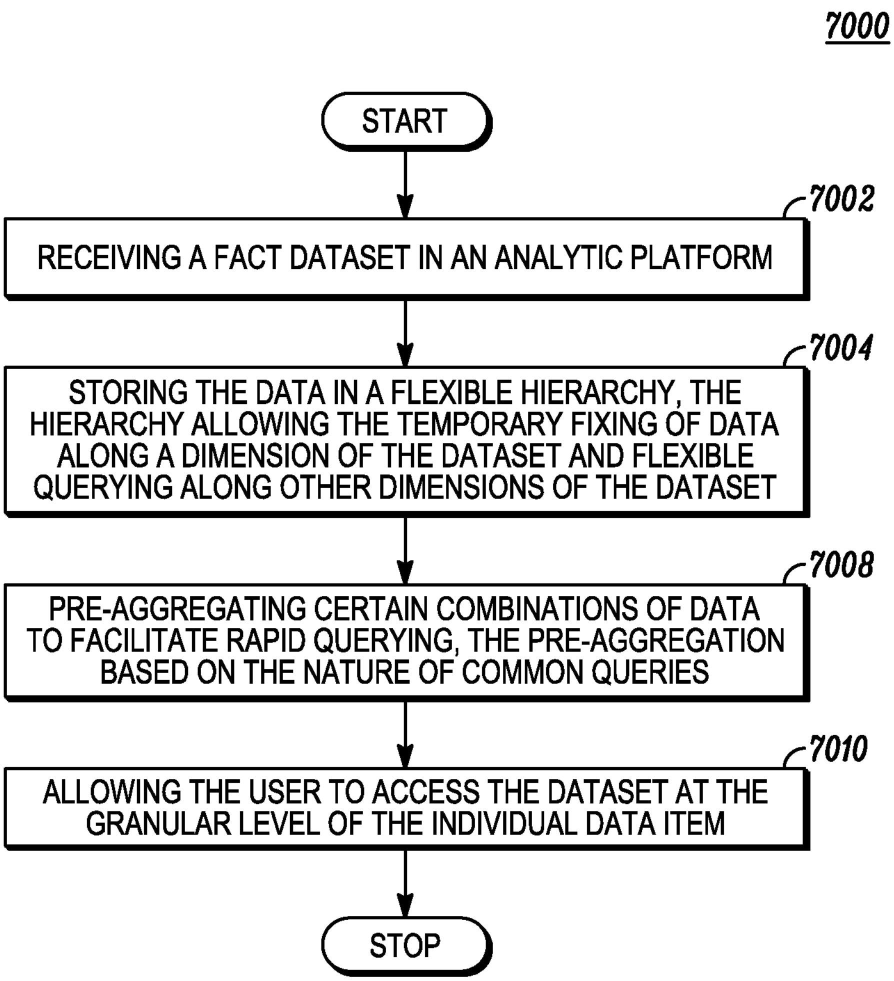
FIG. 48 depicts a causal bitmap fake in association with utilizing aggregated data that is stored at a granular level.

In embodiments, referring to FIG. 48, systems and methods may involve using a platform as disclosed herein for applications described herein where the systems and methods involve receiving a fact dataset in an analytic platform 7002. It may also involve storing the data in a flexible hierarchy, the hierarchy allowing the temporary fixing of data along a dimension of the dataset and flexible querying along other dimensions of the dataset 7004. It may also involve pre-aggregating certain combinations of data to facilitate rapid querying, the pre-aggregation based on the nature of common queries 7008. It may also involve allowing the user to access the dataset at the granular level of the individual data item 7010.

Figure 49:
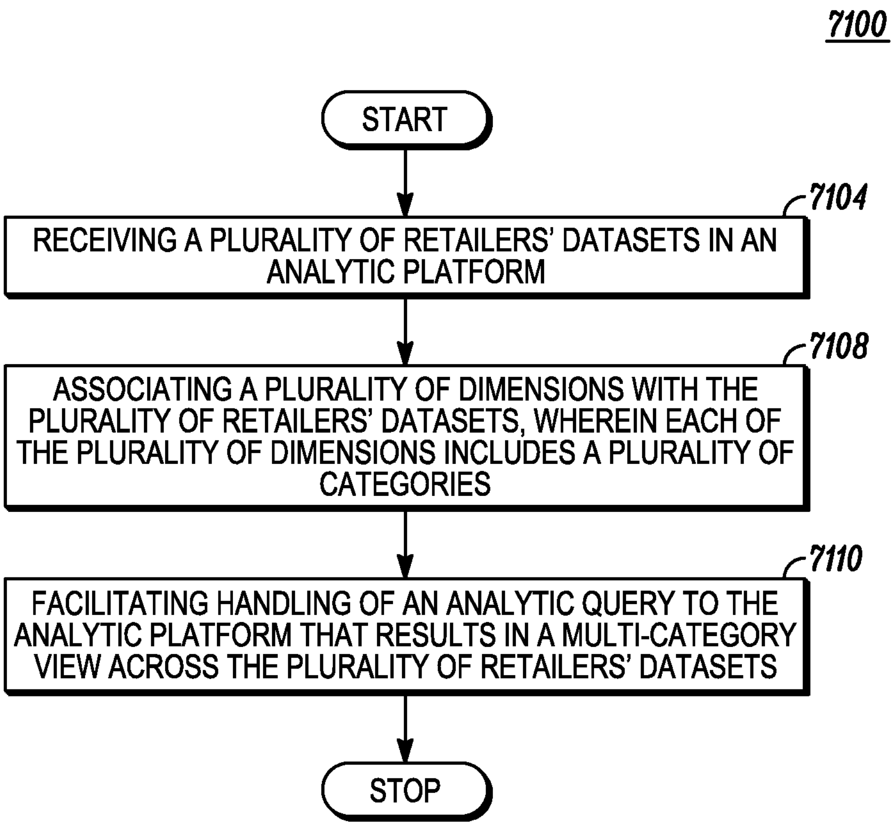
FIG. 49 depicts multiple-category visualization of a plurality of retailers' datasets using an analytic platform.

In embodiments, referring to FIG. 49, systems and methods may involve using a platform as disclosed herein for applications described herein where the systems and methods involve receiving a plurality of retailers' datasets in an analytic platform 7104. It may also involve associating a plurality of dimensions with the plurality of retailers' datasets, wherein each of the plurality of dimensions includes a plurality of categories 7108. It may also involve facilitating handling of an analytic query to the analytic platform that results in a multi-category view across the plurality of retailers' datasets 7110. In embodiments, the presentation does not require modification of the data in retailers' datasets or restatement of the retailers' datasets.

An analytic platform may be associated with a model structure that may facilitate internal data extracts and solutions for market performance, sales performance, new product performance, shopper insight, and the like. A model structure as describe herein may be associated with various dimensions by which internal data extract and solutions may be characterized. The dimensions may include dimension categories such as geography, product, casual members, attributes, measures (e.g. by group), other dimensions, and the like. Geography dimensions may include stores by region, market, RMA; households by region, market, account; total market by region, market; stores by retailer, population, income, race, household size, ethnicity; distance to competitor, and the like. Product dimensions may product reviews, brand, manufacturer, launch year, brand/size, and the like. A casual members dimension may include any movement, price reduction, merchandizing, feature, display, and the like. Casual members dimension may also include a feature only dimension, a display only dimension, feature and display dimensions, feature or display dimensions, no merchandizing, an advertised frequent shopper, and the like. Attribute dimensions may include category, parent, vendor, brand, brand type, flavor/scent, package, size, color, total ounces, carbohydrates, calories, sodium, saturated fat, total fat, cholesterol, fiber, vitamin A, vitamin C, calcium, and the like. Measures dimensions may include distribution, sales, pricing, sales rate, promotion, assortment, sales performance, sales planning, new product benchmarking, new product planning, relative time, aligned time, shopper, consumer, loyalty, and the like. Other dimensions that may be associated with a model structure may include relative time dimensions, same store sales dimensions, and the like.

Each of the aspects of an analytic platform model structure described herein may be combined. In an example, a model structure for solving market performance may be combined with a total market by region geography dimension, a products by brand dimension, feature only casual member dimension, category, parent, and vendor attribute dimensions, pricing measures dimension, a relative time dimension, and the like. One or more than one dimension from each category of dimensions may be combined in an application of the model structure to facilitate solving one or more of market performance, sales performance, new product performance, shopper insight, and the like. An analytic platform model structure may include any number of solutions as herein described.

A household panel data may be implemented on a dedicated analytic platform, such as a software platform on a related analytic server. This data may support several solutions, including, without limitation, the ability for clients to analyze household purchase behavior across categories, geographies, demographics, time periods and the like. Any of the supported solutions may include a broad set of pre-defined buyer and shopper groups, demographic, target groups, and other dimensions of data.

One potential approach to a household panel data solution includes providing a core analytic platform solution for flexible shopper analysis based on disaggregated household panel data. Static panel data may be updated on a quarterly basis, monthly basis, or other basis as needed to maintain flexible shopper analysis. Household demographic attributes may be set up as separate dimensions. Further demographic dimensions may be added without need for data reload or aggregation. Also, pre-aggregations via ETL may be minimized. Product attributes may be used to create product groups. Updates to the data and analytic server models may be made when new categories are added and/or new data becomes available. Product, Geography and Time dimensions may be consistent with that for the analytic platform POS Model. Similar measures for POS and panel data, such as dollar sales, may be aligned and rationalized to facilitate using the best possible information source that is available.

An alternate solution approach may be characterized as follows: A product dimension may initially include one-hundred or more categories (e.g., similar categories as that loaded for a POS analytic platform). Household data may include 2 years of data (e.g. 2×52 week periods), such as calendar year based 52 week static panel groups. A venue group dimension may include US TOTAL, channels, regions, markets, chains, CRMAs, RMAs. The venue group may be associated with releasability attributes. Household projection weights may be used for each venue group. Time dimension may be quad-week, 13-week, 26-week, and 52-week, and the like. As an example, day of week may be a dimension. In this solution approach causal dimension may be optional, and therefore a dimension of any movement may be selected. A periodicity dimension may only use actual data. A measures dimension may include a core set of measures similar to shopper insights solutions. A filter dimension may comprise a sample size control that is based on a number of raw buyers. A product Buyer dimension may be pre-defined as category and sub-category buyers as well as top 10 brands (or less where needed) per each category. Shopper dimension may be pre-defined for all releasable US retailers, such as for both core and shoppers. Demographics dimensions may include a set of standard household demographics (as provided by household panel data) including detailed (i.e. Income) and aggregated (i.e. Affluence) standard dimension variables. The approach may include a trip type dimension. A life stage dimension may include third party life-stage/lifestyle segmentations. MedProfiler data may be used as well as other panel data, including, but not limited to, third party attributes such as consumer interests/hobbies/religion (for example, InfoBase). Trial and Repeat Measures may be used. POS crossover measures may be used. Quarterly updates of transaction data and related projection weights may be used.

Yet another alternate solution approach may be characterized by: household loyalty groups (e.g. new\lost\retained buyers and shoppers), channel shoppers and heavy channel choppers, standard shopper groups, 3rd Party life stage/lifestyle segmentation attributes, combination groups (i.e. based on product AND retailer combinations), customizations (e.g., custom product groups, custom demographic groups, and custom household/venue groups), FSP data integration, NBD adjustment, and the like.

Data attributes and dimension hierarchies may be associated with a solution model for the household panel data that may be aligned with dimension structures for the POS analytic platform model, including Time, Geography, and Product dimensions.

The household Panel model may use Geography model structure consistent with a POS analytic platform. Also the overall Venue Group structure may be expanded to support the broader multi-outlet scope of household Panel data. There is a file that may hold the information for all panel stores/chains tracked. The file may be used to create the custom Geo lists that panelists may see. A process may port the information in the Unified store database for POS chains/stores so that it is the first level of information used for POS chains/stores (e.g. Grocery/Drug/Mass). The information for chains/outlets that is unique to Panel may be added to the database as well. There may be no default member. A surrogate member for rank may exist and a surrogate member for custom hierarchies may not exist.

Overall, the same Geography structure may be used as is used for the analytic platform POS model with the exception that the leaf level may be linked to a set of projected households, rather than to projected venues as for POS data. A user may optionally not be able to drill to Household level data. The definition of Markets, Regions, CRMAs, and RMAs may be the same for POS as for household Panel data. Projected hierarchies may be used for household Panel data. Alternatively, no custom venue groups may be based on new household groups. Data for non releasable Venue Groups may be blanked out to the end user. Transactions that occurred at non-releasable Venue Groups may be included when calculating measure results. The releasability status of each Venue Group may be provided in Panel data load files.

The Households in the household Panel data set may function similarly to Venue-to-Venue Group mapping in the Analytic platform solution for POS data. A similar projection table mechanism may be used to project individual Households onto the Venue Group level that is used in reporting. While there may be no store level data released for the panel data, the household Panel model may use the same Venue Group master as for the POS analytic platform Model. A separate releasability key may be added to Standard Venue Attributes to control releasability of Venue Groups for Panel data.

All measures dimensions may be projected, unless noted to not be, by using the geography weight for the selected geography level. For example if "Detroit" is selected as the geography, the Household Market weight would be used to project measure results. The following Measures may be made available in the solution.

Standard measures may include any measure that may be more accurately available from POS data. Such measures may be based on POS data for such Venue Group. This may require different calculation methods for certain measures (such as Dollar Sales, Unit Sales, Volume Sales). In the future, NBD adjustment may need to be applied.

POS/Panel model crossover measures that may be included from the POS model include: percent ACV distribution, dollar sales, volume sales, dollars/mm ACV, and the like.

The percent ACV distribution measure may be characterized by the following dimensional alignment/releasability:

PERIOD: this measure may be available for all time periods.

PRODUCT: this measure may be available for all product levels that have sufficient panel sample size to release (i.e. this measure shall never show for a product that can't release its panel data).

MARKET: All Outlets may use the FDM % ACV dist for all geos that match, US, Region, Mkt; Food may use Food % ACV dist for all geos that match, US, Region, Mkt; Drug may use Drug % ACV dist for all geos that match, US, Region, Mkt; No other Channel may have % ACV dist; Accounts, RMAs, CRMAs may report % ACV dist as long as the client may not be a retailer. No retailers may see another account's store data.

household SEGMENTATION: % ACV Dist may show, as indicated above for whatever segment of household may be selected.

TRIP SEGMENTATION: % ACV Dist may show, as indicated above for whatever trip type may be selected.

The dollar sales (POS) measure may be characterized by the following dimensional alignment/releasability:

PERIOD: this measure may be available for all time periods.

PRODUCT: this measure may be available for all product levels that have sufficient panel sample size to release (i.e. this measure shall never show for a product that can't release its panel data).

MARKET: Food may use Food Dollar Sales (POS) for all geos that match, US, Region, Mkt; Drug may use Drug Dollar Sales (POS) for all geos that match, US, Region, Mkt; No other Channel may use Dollar Sales (POS); Accounts, RMAs, CRMAs may report Dollar Sales (POS) as long as the client may not be a retailer. No retailers may see another account's store data.

household SEGMENTATION: Dollar Sales POS may show, as indicated above ONLY when ALL household are selected.

TRIP SEGMENTATION: Dollar Sales POS may show, as indicated above ONLY when ALL TRIPS are selected.

The volume sales (POS) measure may be characterized by the following dimensional alignment/releasability:

PERIOD: this measure may be available for all time periods.

PRODUCT: this measure may be available for all product levels that have sufficient panel sample size to release (i.e. this measure shall never show for a product that can't release its panel data).

MARKET: Food may use Food Volume Sales (POS) for all geos that match, US, Region, Mkt; Drug may use Drug Volume Sales (POS) for all geos that match, US, Region, Mkt; No other Channel may use Volume Sales (POS); Accounts, RMAs, CRMAs may report Volume Sales (POS) as long as the client may not be a retailer. No retailers may see another account's store data.

household SEGMENTATION: Volume Sales POS may show, as indicated above ONLY when ALL household are selected.

TRIP SEGMENTATION: Volume Sales POS may show, as indicated above ONLY when ALL TRIPS are selected.

The dollars/mm ACV (POS) measure may be characterized by the following dimensional alignment/releasability:

PERIOD: this measure may be available for all time periods.

PRODUCT: this measure may be available for all product levels that have sufficient panel sample size to release (i.e. this measure shall never show for a product that can't release its panel data).

MARKET: Food may use Food $/MM ACV (POS) for all geos that match, US, Region, Mkt; Drug may use Drug $/MM ACV (POS) for all geos that match, US, Region, Mkt; No other Channel may use $/MM ACV (POS); Accounts, RMAs, CRMAs may report $/MM ACV (POS) as long as the client may not be a retailer. No retailers may see another account's store data.

household SEGMENTATION: $/MM ACV POS may show, as indicated above ONLY when ALL household are selected.

TRIP SEGMENTATION: $/MM ACV POS may show, as indicated above ONLY when ALL TRIPS are selected Traffic measures may include Average Weekly Buyer Traffic, Traffic Fair Share Index, Annual Buyer Traffic, Traffic Opportunity Dollars, and the like.

A basic purchase collection may include percent buyers—repeating that may be defined as a Percent of buyers purchasing a product two or more times, and may be calculated as a number of households buying the product two or more times divided by the total number of households buying the product, multiplied by 100.

(Buyers−Repeating/Buyers−Projected)*100

A basic purchase collection may include percent household buying that may be defined as a percent of households in the geography purchasing the product, and may be calculated as a Number of households buying the product divided by the number of households in the Geography (Total Us, Region, Market, etc.), multiplied by 100, such as in the formula:

(Buyers−Projected/Projected Household Population)*100

A basic purchase collection may include Buyer Share that may be defined as a percent of category buyers who purchased the product, and may be calculated as a Number of households who purchased the product divided by the number of households who purchased the category.

A basic purchase collection may include buyers projected that may be defined as a projected number of households. Used to predict a total census of product buyers, and may be calculated as a Sum of household weights within a given geography who purchased the product.

A basic purchase collection may include loyalty dollars that may be defined as Among buyers of the product, the percent of Loyalty Dollars that the product represents to the buying households, and may be calculated as a Among product buyers, their product dollars divided by their Loyalty Dollars, multiplied by 100.

A basic purchase collection may include loyalty units that may be defined as Among buyers of the product, the percent of Loyalty Units that the product represents to the buying households, and may be calculated as a Among product buyers, their product units divided by their Loyalty Units, multiplied by 100.

A basic purchase collection may include loyalty volume that may be defined as Among buyers of the product, the percent of Loyalty Volume that the product represents to the buying households, and may be calculated as Among product buyers, their product volume divided by their Loyalty Volume, multiplied by 100.

A basic purchase collection may include dollar sales that may be defined as a sum of dollars, and may be calculated as a household weight*dollars.

A basic purchase collection may include Dollar Sales per 1000 household that may be defined as Dollars spent on the product per 1000 households, and may be calculated as: (Dollar Sales/Projected Household Population)*1000.

A basic purchase collection may include Dollar Sales per Buyer that may be defined as an Average number of product dollars spent per buying household, and may be calculated as: (Dollar Sales/Buyers−Projected).

A basic purchase collection may include dollar sales per occasion that may be defined as n Average number of product dollars spent per purchase occasion, and may be calculated as: (Dollar Sales/Purchase Occasions).

A basic purchase collection may include dollar share that may be defined as a percent of category dollars for the product, and may be calculated as: (Product Dollar Sales/Category Dollar Sales)*100

A basic purchase collection may include dollar share L2 that may be defined as a Percent of L2 Dollars (child level of Category) for the product, and may be calculated as: (Product Dollar Sales/Level2 Dollar Sales)*100

A basic purchase collection may include In Basket Dollars per Trip that may be defined as a Average dollar value of a trip when the product was included, and may be calculated as:

1. Count the distinct number of Trip transactions that included the product within the geography and time period. (create a unique Trip ID for each record)

2. Sum Dollar Sales for all Total Spend transactions found in Step 1

3. Divide Dollar Sales from Step 2 by the transaction count from Step 1 to arrive at "In Basket Dollars per Trip"

(Total Trip Dollars including the Product/Total Number of Purchase Occasions that included the Product)

To calculate this measure a unique Trip ID may need to be created based on Panel ID, Date of Trans, Outlet and Chain. During the process to create these ID's product transactions may be found that do not have a parent Trip record. This typically occurs when purchases are entered by a household near midnight, which may cause the Trip ID to fall the day after the process of entering purchases begins.

When a Trip record cannot be found, first look for the Trip record in the next day by Panel ID, Outlet, Chain and Date of Trans that may be one day greater than the Product transactions. If no Trip record can be found within the following day, set the Trip ID=0. The later situation rarely happens, but it does occur due to an existing issue within the Panel data collection process.

A basic purchase collection may include Out of Basket Dollars per Trip that may be defined as a Average trip dollar value for buyers of the product when the product may not be included in the trip. This measure answers the question: On average how much do buyers of the product spend when the product may not be included in the trip, and may be calculated by deriving "Buyer Total Basket Dollars" for each household who purchased the product within the geography and time period. This may be the sum of all Trip Dollars, trips that did and did not include the product, from trips made by households who purchased the product within the geography and time period; deriving "Buyer In Basket Dollars" for each household who purchased the product within the geography and time period. This may be the sum of Trip Dollars, that did include the product, from trips made by households who purchased the product within the geography and time period; deriving "Buyer Total Purchase Occasions" for each household who purchased the product within the geography and time period. This may be the sum of all Trips, trips that did and did not include the product, from trips made by households who purchased the product within the geography and time period.

(Buyer Total Basket Dollars−Buyer In Basket Dollars)/(Buyer Total Purchase Occasions−Purchase Occasions)

A basic purchase collection may include price per unit that may be defined as a Average product dollars spent per unit purchased, and may be calculated as: (Dollar Sales/Unit Sales)

A basic purchase collection may include price per volume that may be defined as a Average product volume purchased per unit purchased, and may be calculated as: (Volume Sales/Unit Sales)

A basic purchase collection may include Projected Household Population that may be defined as a Census projection of households within Total US, Regions, or Markets, and may be calculated as a Sum of household projections within a Geography A basic purchase collection may include Purchase Cycle—Wtd Pairs that may be defined as a Among households with 2 or more Purchase Occasions, the average number of days between purchases, and may be calculated as:

1. Determine the households who purchased the product 2 or more times within the selected geography and time period 2. For each household from Step 1, determine the number of days between the first and last purchase of the product within the selected geography and time period 3. For each household Step 1, determine the number of Purchase Occasions made by the household for the product within the geography and time period and subtract 1 from the total number of Purchase Occasions 4. For each household from Step 1, divide the total number of days from Step 2 by the Purchase Occasion count Step 3. This may yield the Purchase Cycle for a given household.

5. Sum the Purchase Cycle results from Step 4 for all households found in Step 1 and divide by the total number of households from Step 1 to arrive at Purchase Cycle—Wtd Pairs A basic purchase collection may include Purchase Occasions that may be defined as a Total number of trips that included the product, and may be calculated as:

1) For each household determine the number of trips that included the product

2) Multiply the count from Step 1 by the household's weight for the selected Geography 3) Sum Step 2 for all households who purchased the product A basic purchase collection may include Purchase Occasions per Buyer that may be defined as a Average number of purchase occasions among buying households, and may be calculated as: (Purchase Occasions/Buyers−Projected)

A basic purchase collection may include Trip Incidence that may be defined as a Percentage of Trips that included the product, and may be calculated as: (Purchase Occasions/Retailer Trips)

A basic purchase collection may include Unit Sales that may be defined as a Sum of Units, and may be calculated as: Household Weight*Units A basic purchase collection may include Unit Sales per 1000 household that may be defined as a Units spent on the product per 1000 households, and may be calculated as: (Unit Sales/Projected Household Population)*1000

A basic purchase collection may include Unit Sales per Buyer that may be defined as a Average number of product Units spent per buying household, and may be calculated as: (Unit Sales/Buyers−Projected).

A basic purchase collection may include Unit Sales per Occasion that may be defined as an Average number of product Units spent per purchase occasion, and may be calculated as: (Unit Sales/Purchase Occasions).

A basic purchase collection may include Unit Share that may be defined as a Percent of Category Units for the product, and may be calculated as: (Product Unit Sales/Category Unit Sales)*100.

A basic purchase collection may include Unit Share L2 that may be defined as a Percent of L2 Units (child level of Category) for the product, and may be calculated as: (Product Unit Sales/Level2 Unit Sales)*100.

A basic purchase collection may include Volume Sales that may be defined as a Sum of Volume, and may be calculated as: Household Weight*Volume.

A basic purchase collection may include Volume Sales per 1000 household that may be defined as a Purchased Product Volume per 1000 households, and may be calculated as: (Volume Sales/Projected Household Population)*1000.

A basic purchase collection may include Volume Sales per Buyer that may be defined as a Average purchased product Volume per buying household, and may be calculated as: (Volume Sales/Buyers−Projected).

A basic purchase collection may include Volume Sales per Occasion that may be defined as a Average purchased product Volume per purchase occasion, and may be calculated as: (Volume Sales/Purchase Occasions).

A basic purchase collection may include Volume Share that may be defined as a Percent of Category Volume for the product, and may be calculated as: (Product Volume Sales/Loyalty Volume Sales)*100.

A basic purchase collection may include Volume Share L2 that may be defined as a Percent of L2 Volume (child level of Category) for the product, and may be calculated as: (Volume Sales/Level2 Volume Sales)*100.

A basic shopper collection may include Dollars per Shopper that may be defined as a Average Dollars spent by shoppers, and may be calculated as: (Retailer Dollars/Retailer Shoppers).

A basic shopper collection may include Dollars per Trip that may be defined as a Dollars spent per Retailer Trip, and may be calculated as: (Retailer Dollars/Retailer Trips).

A basic shopper collection may include Retailer Dollars that may be defined as a Total trip dollars spent in a Geography, and may be calculated as: Trip Dollars*Projection Weight for the selected geography.

A basic shopper collection may include Retailer Shoppers that may be defined as a Distinct number of households who had at least one trip in the geography, and may be calculated as:

1) Determine the number of distinct households who had at least one trip within the geography.

2) Sum the geographic weights for each household found in Step 1.

A basic shopper collection may include Retailer Trips that may be defined as a Total household trips within a geography, and may be calculated as:

1) Determine the number of trips made by each household in the selected geography.

2) For each Household multiply the result from Step 1 by the household geography weight.

3) Sum all results from Step 2.

A basic shopper collection may include Shopper Penetration that may be defined as a Percent of Households in the Geography that shopped in an Outlet or Chain, and may be calculated as: (Retailer Shoppers/Projected Household Population)*100.

A basic shopper collection may include Trips per Shopper that may be defined as a Average trips made by shoppers within the geography, and may be calculated as: (Retailer Trips/Retailer Shoppers.

A basic demographic collection may include Buyer Index that may be defined as a Provides insight into the kind of households that skew toward or away from the product. Generally indices of 115 or greater indicate that significantly more households within that demo break buy the product than the general population. An index below 85 indicates the demo break purchased significantly less, and may be calculated as: (Distribution of Buyers/Distribution of Panel).

A basic demographic collection may include Distribution of Buyers that may be defined as a Number of households buying from the demographic group divided by all buyers, and may be calculated as: (Buyers Projected from demographic group/Buyers Projected).

A basic demographic collection may include Distribution of Dollar Sales that may be defined as a Product dollars spent by households within the demographic group divided by product dollars spent by all households, and may be calculated as: (Product Dollar Sales for households within demographic group/Product Dollar Sales for all households)*100.

A basic demographic collection may include Distribution of Panel that may be defined as a Percent of all households who belong to the demographic group, and may be calculated as: (Number of Households within the demographic group/Total Number of Households)*100.

A basic demographic collection may include Distribution of Shoppers that may be defined as a Percent of all households who belong to the demographic group that shopped within a Geography, and may be calculated as: (Number of Households within the demographic group shopping in the Geography/Total Number of Households)*100.

A basic demographic collection may include Distribution of Unit Sales that may be defined as a Product units purchased by households within the demographic group divided by product units purchased by all households, and may be calculated as: (Product Unit Sales for households within demographic group/Product Unit Sales for all households)*100.

A basic demographic collection may include Distribution of Volume Sales that may be defined as a Product volume purchased by households within the demographic group divided by product volume purchased by all households, and may be calculated as: (Product Volume Sales for households within demographic group/Product Volume Sales for all households)*100.

A basic demographic collection may include Dollar Index that may be defined as a Provides insights into whether the product's dollar sales skew to or away from various demographic segments. Generally indices of 115 or greater indicate that significantly more product dollars are coming from households within that demo than the general population. An index below 85 indicates the demo break purchased significantly less on a dollar basis, and may be calculated as: (Distribution of Dollar Sales/Distribution of Panel)*100.

A basic demographic collection may include Shopper Index that may be defined as a Provides insights into whether the a geography's shoppers skew to or away from various demographic segments. Generally indices of 115 or greater indicate that significantly more shoppers are coming from households within that demo than the general population. An index below 85 indicates the demo break shopped significantly less, and may be calculated as: (Distribution of Shoppers/Distribution of Panel)*100.

A basic demographic collection may include Unit Index that may be defined as a Provides insights into whether the product's unit sales skew to or away from various demographic segments. Generally indices of 115 or greater indicate that significantly more product units are coming from households within that demo than the general population. An index below 85 indicates the demo break purchased significantly less on a unit basis, and may be calculated as: (Distribution of Unit Sales/Distribution of Panel)*100.

A basic demographic collection may include Volume Index that may be defined as a Provides insights into whether the product's volume sales skew to or away from various demographic segments. Generally indices of 115 or greater indicate that significantly more product volume may be coming from households within that demo than the general population. An index below 85 indicates the demo break purchased significantly less on a volume basis, and may be calculated as: (Distribution of Volume Sales/Distribution of Panel)*100.

A conversion/closure collection may include Buyer Closure that may be defined as a Percent of outlet buyers who purchased the product in a chain, and may be calculated as: (Number of households who purchased the product in the Chain/Number of households who purchased the product in the Outlet)*100.

A conversion/closure collection may include Buyer Conversion that may be defined as a Percent of account shoppers (from Shopper Group) who purchased the product in the chain, who also purchased the product within the geography, and may be calculated as: (Number of households in the Shopper Group who purchased the product in the Chain/Number of households in the Shopper Group who purchased the product in the Geography)*100.

A conversion/closure collection may include Trip Closure that may be defined as a Percent of outlet shopper Purchase Occasions that included the product in a chain, and may be calculated as: (Number of household Purchase Occasions in the Chain/Number of household Purchase Occasions in the Outlet)*100.

A conversion/closure collection may include Trip Conversion that may be defined as a Percent of account shopper (from Shopper Group) Purchase Occasions that occurred within the chain, that also occurred within the geography, and may be calculated as: (Number of Purchase Occasions made by the Shopper Group within the Chain/Number of Purchase Occasions made by the Shopper Group within the Geography)*100.

A raw collection may include Buyers—Raw that may be defined as a Raw count of households purchasing the product, and may be calculated as: Distinct count of households purchasing the product.

A raw collection may include Buyers Shoppers—Raw that may be defined as a Raw count of household trips within a geography, and may be calculated as: Distinct count of households shopping a geography.

A raw collection may include Buyers Transactions—Raw that may be defined as a Raw count of household transactions within a geography, and may be calculated as: Distinct count of household transactions within a geography.

Data attributes and dimension hierarchies may include time dimensions which may include time hierarchies and time attributes. The time dimension may provide a set of standard pre-defined hierarchies. The household panel solution may use same time dimension structure as POS analytic platform solution. However, the rolling week time hierarchies used in POS analytic platform model may not be applicable for household Panel data. Panel data may be blanked out for these hierarchies. The time dimension may be derived from the transaction data. The panel input file may contain both DATAOFTRANS, which may be expressed in YYYYMMDD format, and IRIWEEKKEY, which may be a multi-digit alphanumeric string. The time period "Week Ending" names may be derived by creating a report, such as in a report generating facility or functionality.

A standard time attribute may include time dimension hierarchies that may use the same attributes as defined for the POS analytic platform solution model.

Data attributes and dimension hierarchies may include trip type dimensions that may include standard trip type members and client-specific trip types, among others. The trip type dimension may be based on trip type attribute on each basket. Trip type information may be based on default values or may be predefined. Trip types may be independent on life stage or household demographics dimensions. Trip types may be organized in a two level hierarchy, such as with four major trip types, and five to ten sub types for each trip type.

Data attributes and dimension hierarchies may include standard live stage members. The life stage dimension may be based on life stage attribute per each household derived from 3rd Party lifestage/lifestyle Segmentations, such as Personicx database. Life stage dimensions may be independent of other household demographics dimensions. Life stages may be organized in a two level hierarchy, such as with seventeen major groups with a plurality of sub types for each major group.

Data attributes and dimension hierarchies may include demographic dimensions. The demographic dimensions may be collections of households by demographic characteristic. The solution may support dynamic filtering of any combination of demographic dimensions. Additional demographic variables may be possible to add without reprocessing the existing data set. The Standard Demographic dimensions may include household Size, household Race, household Income, household Home Ownership, household Children Age, household Male Education, household Male Age, household Male Work Hours, household Male Occupation, household Female Education, household Female Age, household Female Work Hours, household Female Occupation, household Marital Status, household Pet Ownership, and the like.

Each collection may be created as a separate dimension. Hierarchies of detailed demographics may be represented by:

All [Demographic Dimension Name]

|_Member 1

|_Member N

Demographic dimensions may include aggregated demographics, such as other panelist attributed (e.g. target groups) that may be derived from existing demographic attributes. The aggregates may be implemented under a demographic dimension. These aggregates may be presented to a user of the analytic platform as:

INCOME: 0-20K, 20-30K, and others.

AGE (Female HOHH): 18-29, 30-25, and others.

AFFLUENCE: Getting By, Living Comfortably, Doing Well, and others

However based on a nesting nature of these attributes, a secondary hierarchy structure within the demo dimension may be presented as:

Aggregated Demos: AFFLUENCE, LIFESTAGE, PRESENCE OF CHILDREN

Detailed Demos: INCOME, AGE of Female HoHH

Data attributes and dimension hierarchies may include shopper dimensions. The Shopper dimension may be a collection of types of Household groups, such as core shoppers, retail shoppers, and other groups. Core shoppers may include households who have spent 50% or more of their outlet dollars at a specific retailer. Retailer shoppers may include households who have had at least one shopping trip to a specific retailer.

A household ID can belong to multiple Shopper groups. Shopper groups may be based on geography criteria only (i.e. no product conditions may be included when creating these groups). Shopper groups may be based on the most recent 52 week time period. Shopper groups may be predetermined. Groups may or may not be end user-created. Core shoppers and retailer shoppers may be provided "out-of-the-box" for all releasable total US retailers (e.g. top RELEASIBLE retailers in each channel). Examples of releasable accounts include: Club Channel may be unlikely to have more than four releasable accounts; Conv Gas may have none, Mass & SC may have approximately four.

The shopper group hierarchies may be created as:

All Core Shoppers

|_Retailer X Core Shoppers

|_Retailer Y Core Shoppers

All Retailer Shoppers

|_Retailer X Retailer Shoppers

|_Retailer Y Retailer Shoppers

A panel model may be able to use hierarchical methods to align shopper groups with their current year and year ago data without having to use two separate shopper group members.

Data attributes and dimension hierarchies may include product buyer dimensions. The product buyer group dimensions may be a collection of household groups that have purchased a product at least once. Additionally, household IDs may or may not be shown to end users. A household ID can belong to multiple product buyer groups. Buyer groups may be based on product criteria (i.e. geography conditions may or may not be included when creating these groups). Buyer groups may be based on the most recent fifty-two week time period. Buyer groups may be predetermined or may be end user-created. Buyer groups may be provided "out-of-the-box" for top brands in each category.

The product buyer group hierarchies may be created as shown:

All product buyer Groups

|_Category X Buyers

|_SubCategory X Buyers

|_Product X Buyers

Data attributes and dimension hierarchies may include combination group dimensions. The combination group dimensions may be a collection of household groups that have purchased a specific product at a specific retailer at least once. An example combination group could be "Safeway—Snickers Buyers". There are additional factors to be considered for combination group dimensions. These include: a household ID can belong to multiple combination groups; a given combination group may have both Product and Geography criteria; combination groups may be based on the most recent 52 week time period; combination groups may be predetermined or may be end user-created; combination groups may be provided "out-of-the-box" for top brands and top chains in each category.

The combination group hierarchies may be created as follows per each category.

All combination groups

|_Category A

|_<Retailer X>"–"<Brand Y>"Buyers"

Data attributes and dimension hierarchies may include filter dimensions. The filter dimensions may be used to restrict end user access to measure results when a minimum buyer or shopper count has not been achieved. This helps to ensure small sample sizes are identified and may be filtered. However, filtering data may be mandatory. End users may or may not be permitted to override filtering data and filtering data may be invisible to end users. In an example of filter data overriding, only panel product management users may approve changes to a sample size floor to permit small sample sizes to be analyzed. In another example, the minimum count can be set to any number of raw buyers or shoppers. The filter dimension may be a "relative measure" dimension. It does not have to be generated under constraints of various hierarchies. In an example, a sample minimum member may contain formulas to restrict output of measures by a defined shopper or buyer count.

A filter dimension member may be set to apply a filter rule by default so that filtering may be entirely invisible to end users and there may be no override possible for an admin user (e.g. the client).

Filter dimensions may be applied to shopper insights and shopper insights sample size floors may represent a default. As an example of a shopper insight sample size floor default, no data may be displayed unless fifty product buyers or one hundred-fifty shopper buyers are represented in the data.

Data attributes and dimension hierarchies may include day of week dimensions. As an example, the household panel solution may support day of week analysis using day of week dimensions. In a day of week dimension, days may be ordered in calendar order:

All Days

|_Sunday

|_Monday

|_Tuesday

|_Wednesday

|_Thursday

|_Friday

|_Saturday

Data attributes and dimension hierarchies may include casual dimensions. The casual dimensions may or may not be used for a household panel model. All calculations may be based on the equivalent of "Any Movement" as defined in the POS analytic platform model. Causal integration may also be included in the platform model.

Data attributes and dimension hierarchies may include periodicity dimensions. The household panel data may have inherent limitations for comparing between different static periods (e.g. each year). Therefore, the periodicity dimensions may or may not be used for the household panel model. All calculations may be based on the equivalent of "Actual" as defined in the POS analytic platform model. Periodicity dimensions may facilitate methods to provide comparable static sets between years.

Data attributes and dimension hierarchies may include product attribute dimensions. The standard product attribute based dimensions may be used for the household panel model. However, sample size may put restrictions on any extensive use of one or multiple such attributes.

Household panel data loading scope may be aligned with data loading for POS data. The household Panel data set may or may not be limited to most recent one hundred-four weeks, whereas the POS data may be extended to longer time periods.

Data releasability may be defined for various dimensions including geography, product, filter, measures, and the like. For geography dimensions each venue group may include specific attributes if household panel data may be releasable or not. In an example, at run time this attribute may be applied as part of the calculation in filter dimension. Data for non-releasable venue groups may be blanked out. If household data is not releasable, a user should not be able to drill to household level data. Product dimension data releasability controls may be the same as for POS data. Filter dimension data releasability may affect the dimension and/or its sample minimum member so that either may be hidden from client's users, such as admin users and end users.

To support data releasability for measures dimensions, a small number of intermediate measures may be placed in a separate folder (e.g. named Hidden). Measures in this folder may not be to be used for actual client reports, but may be used for internal calculation purposes only. Examples of intermediate measures that may be placed in a hidden folder include projected household population and measures that are not children of the "Basic Purchase Collection", "Basic Shopper Collection", "Demographic Collection", "Conversion/Closure Collection", "Raw Collection" collections, and the like.

The following sections describe details of panelist attributes, aggregated attributes, lifestyle attributes, health condition attributes, shopper groups, buyer groups, trip types, and traffic measures.

Panelists' unique identifier may be pan_id code and country as shown below.

SCAN KEY PANELIST (derived from panelist type from pan_demo_imputed file)
a. 7, 8, 9=Yes
b. Other=No household INCOME
a. 1=LESS THAN $9,999
b. 2=$10,000 TO $11,999
c. 3=$12,000 TO $14,999
d. 4=$15,000 TO $19,999
e. 5=$20,000 TO $24,999
f. 6=$25,000 TO $34,999
g. 7=$35,000 TO $44,999
h. 8=$45,000 TO $54,999
i. 9=$55,000 TO $64,999
j. 10=$65,000 TO $74,999
k. 11=$75,000 TO $99,999
l. 12=$100,000 AND OVER household SIZE (non-keyed)
a. actual number of member in household. (values 0-16)

household MEMBERS
a. ONE OR TWO MEMBERS
b. THREE MEMBERS
c. FOUR MEMBERS
d. FIVE MEMBERS OR MORE household HEAD RACE
a. 1=WHITE
b. 2=BLACK-AFRICAN AMERICAN
c. 3=HISPANIC
d. 4=ASIAN
e. 5=OTHER RACE
f. 6=AMERICAN INDIAN-ALASKA NATIVE
g. 7=NATIVE HAWAIIAN-PACIFIC ISLANDER HOME OWNERSHIP
a. 1=RENT HOME
b. 2=OWN HOME
c. 0, 98, 99, NULL=UNKNOWN COUNTY TYPE
a. A=A COUNTY
b. B=B COUNTY
c. C=C COUNTY
d. D=D COUNTY
e. Null=UNKNOWN household HEAD AGE
a. 0=0-17 YEARS OLD
b. 1=18-24 YEARS OLD
c. 2=25-34 YEARS OLD
d. 3=35-44 YEARS OLD
e. 4=45-54 YEARS OLD
f. 5=55-64 YEARS OLD
g. 6=65 AND OVER
h. NULL=UNKNOWN household HEAD EDUCATION
a. 1=SOME GRADE SCHOOL
b. 2=COMPLETED GRADE SCHOOL
c. 3=SOME HIGH SCHOOL
d. 4=GRADUATED HIGH SCHOOL
e. 5=TECHNICAL/TRADE SCHOOL
f. 6=SOME COLLEGE
g. 7=GRADUATED COLLEGE
h. 8=POST GRADUATE SCHOOL
i. 0, 98, 99, NULL=UNKNOWN household HEAD OCCUPATION
a. 1, null=PROFESSIONAL/TECHNICAL
b. 2=MANAGER/ADMINISTRATOR
c. 3=SALES
d. 4=CLERICAL
e. 5=CRAFTSPERSON
f. 6=MACHINE OPERATOR
g. 7=LABORER
h. 8=CLEANING/FOOD SERVICE
i. 9=PRIVATE household WORKER
j. 10=RETIRED
k. 13=NO OCCUPATION MALE AGE
a. see household_head_age for attribute values MALE EDUCATION
a. see household_education for attribute values MALE OCCUPATION
a. see household_occupation for attribute values MALE WORK HOURS
a. 1=NOT EMPLOYED
b. 2=EMPLOYED LT 35 HOURS/WEEK
c. 3=EMPLOYED GE 35 HOURS/WEEK
d. 4=RETIRED
e. 5=HOMEMAKER
f. 6=STUDENT
MALE SMOKES
a. 0=NO
b. 1=YES
FEMALE AGE
a. see household_head_age for attribute values
FEMALE EDUCATION
a. see household_education for attribute values
FEMALE OCCUPATION
a. see household_occupation for attribute values
FEMALE WORK HOURS
a. see male_work_hours for attribute values
FEMALE SMOKES
a. see male_smokes for attribute values
NUM OF DOGS (non-keyed)
a. 0-5 (max of five, more than 5 may be still 5)
DOG OWNERSHIP
a. 1=ONE DOG
b. >1=MORE THAN ONE DOG
c. 0=NO DOG
NUM OF CATS (non-keyed)
a. 0-5 (max of five, more than 5 may be still 5)
CAT OWNERSHIP
a. 1=ONE CAT
b. >1=MORE THAN ONE CAT
c. 0=NO CAT
CHILDREN AGE GROUP
a. 1=0 TO 5 ONLY
b. 2=6 TO 11 ONLY
c. 3=12 TO 17 ONLY
d. 4=0 TO 5 AND 6 TO 11
e. 5=0 TO 5 AND 12 TO 17
f. 6=6 TO 11 AND 12 TO 17
g. 7=0 TO 5, 6 TO 11 AND 12-17
h. 8=No Children 17 Or Under
MARITAL STATUS
a. 1=SINGLE—NEVER MARRIED
b. 2=MARRIED
c. 3=DIVORCED
d. 4=WIDOWED
e. 5=SEPARATED
household LANG CODE
a. 1=ONLY ENGLISH
b. 2=ONLY SPANISH
c. 3=MOSTLY ENGLISH
d. 4=MOSTLY SPANISH
e. 5=Both Regularly
NUM OF TV (non-keyed)
a. number of actual TVs
NUM OF CABLE TV (non-keyed)
a. number of actual cable ready TVs
HISP FLAG
a. 1=male or female with Hispanic race
b. 0=non-Hispanic race
c. 1=no male or female race information found
HISP CAT
a. 1=Central American
b. 2=Cuban
c. 3=Dominican
d. 4=Mexican
e. 5=Puerto Rican
f. 6=South American
g. 7=Hispanic category other household RACE=RACE2 (race of females in family or males if no females. Set to 97 if more then one race may be found. Race Hispanic changed to 'Other Race'.)
a. 1=WHITE
b. 2=BLACK-AFRICAN AMERICAN
c. 3=HISPANIC
d. 4=ASIAN
e. 5=OTHER RACE
f. 6=AMERICAN INDIAN-ALASKA NATIVE
g. 7=Native HAWAIIAN-PACIFIC ISLANDER
h. 97=MORE THAN ONE RACE FOUND household RACE WITH PRECEDENCE=RACE3 (Race selected based on the precedence logic for families with members from multiple races)
a. 1=WHITE
b. 2=BLACK-AFRICAN AMERICAN
c. 3=HISPANIC
d. 4=ASIAN
e. 5=OTHER RACE
f. 6=AMERICAN INDIAN-ALASKA NATIVE
g. 7=NATIVE HAWAIIAN-PACIFIC ISLANDER
MICROWAVE
a. 1=OWN MICROWAVE
b. Null=NO MICROWAVE
ZIP
a. (keyed value, same as the one used by venue dimension)
FIPS
a. (keyed value, same as the one used by venue dimension)

3RD PARTY LIFESTAGE/LIFESTYLE SEGMENTATIONS (EXAMPLE SUCH AS PERSONICX) SEGMENT 2006
a. (70 segments or clusters)
IRI LIFE STAGE 2006
a. (18 life stages)

Attributes of med profile data may include health conditions, other attributers, wellness segment data as herein described.

Health conditions:
Attribute: 'household suffering from High Cholesterol 2005"
Attribute "High Cholesterol sufferers treating condition"
Attribute: 'household suffering from Diabetes 2005"
Attribute "Diabetes sufferers treating condition"
Attribute: 'household suffering from High Blood Pressure 2005"
Attribute "High Blood Pressure sufferers treating condition"
Attribute: 'household suffering from Heartburn etc 2005"
Attribute "Heartburn etc sufferers treating condition"
Other Attributes:
Attribute: 'I try to eat whole grains 2005"
Attribute: 'Concern about trans fatty acids 2005"
Attribute: 'Concern with refined or processed foods 2005"
Wellness Segment Data
Attribute: Proactive Managers 2005
Attribute: Unconcerned Gratifiers 2005
Attribute: Health Obsessed 2005

Aggregated attributes details are shown below.
AFFLUENCE
a. GETTING BY
a. household_size=1
b. household_income=1, 2, 3, 4
or c. household_size=2, 3, 4, 5, 6, 7, 8, 9, 10, 11, 12, 13
d. household_income=1, 2, 3, 4, 5, 6
b. LIVING COMFORTABLY
a. household_size=1
b. household_income=5, 6
OR
c. household_size=2, 3, 4, 5, 6, 7, 8, 9, 10, 11, 12, 13
d. household_income=7, 8
c. DOING WELL
a. household_size=1
b. household_income=7, 8, 9, 10, 11, 12
OR
c. household_size=2, 3, 4, 5, 6, 7, 8, 9, 10, 11, 12, 13
d. household_income=9, 10, 11, 12
household CHILDREN GROUP
a. HOUSEHOLDS WITH YOUNGER CHILDREN
i. household_size=2, 3, 4, 5, 6, 7, 8, 9, 10, 11, 12, 13
ii. children_age_group=1, 2, 4
b. HOUSEHOLDS WITH OLDER CHILDREN
i. household_size=2, 3, 4, 5, 6, 7, 8, 9, 10, 11, 12, 13
ii. children_age_group=3, 5, 6, 7
household TYPE
a. YOUNG SINGLES
i. household_size=1
ii. household_head_age 1, 2, 3
b. OLDER SINGLES
i. household_size=1
ii. household_head_age=4, 5, 6
c. YOUNG COUPLES
i. household_size=2, 3, 4, 5, 6, 7, 8, 9, 10, 11, 12, 13
ii. children_age_group=8, null
iii. household_head_age=1, 2, 3
d. OLDER COUPLES
i. household_size=2, 3, 4, 5, 6, 7, 8, 9, 10, 11, 12, 13
ii. children_age_group=8, null
iii. household_head age=4, 5, 6
household WITH CHILDREN
a. YES
i. children_age_group=1, 2, 3, 4, 5, 6, 7
b. NO
i. children_age_group=8, null
HISPANIC household
a. NO
i. household_head_race=1, 2, 4, 5
b. YES
i. household_head race=3
Occupation groupings (household HEAD OCCUPATION GROUP, FEMALE OCCUPATION GROUP, MALE OCCUPATION GROUP)
a. WHITE COLLAR
i. Occupation=1, 2, 3, 4, null
b. BLUE COLLAR
i. Occupation=5, 6, 7
c. OTHER COLLAR
i. Occupation=8, 9

Lifestyle groupings attributes for sports and outdoors, homebodies, upscale, computer/stereo/TV, and ethnicity/religion details are shown below.

Sports and outdoors: athletics may be checked 2+ and may include biking, golf, running/jogging, snow skiing, tennis, and the like; campgrounder may be checked 2+ and may include boating/sailing, camping/hiking, motorcycling, RVs, and the like; club sports may be checked 2+ and may include bicycling, snow skiing, tennis; field & stream may be checked 2+ and may include boating/sailing, fishing, hunting/shooting; fitness may be checked 2+ and may include biking, health/natural foods, physical fitness/exercise, running/jogging, self-improvement; outdoors may be checked 3+ and may include Boating/Sailing, Camping/Hiking, Fishing, Hunting/Shooting, Motorcycling, RVs, and the like; Tri-athlete may be checked 2+ and may include bicycling, health/natural foods, physical fitness, running/jogging, walking, and others.

Homebodies may include collector which may be checked 2+ and may include collect arts/antiques, coins/stamps, other collectibles/collections; do-it-yourself may be checked 2+ and may include automotive work, RVs, home workshop, motorcycling, electronics, and others; domestics may be checked 3+ and may include crafts, home workshop, house plants, sewing, gourmet, cooking/fine foods, needlework/knitting, gardening, book reading, and others; handicrafts may be checked 2+ and may include crafts, needlework/knitting, sewing, and others; home and garden may be checked 2+ and may include gardening, house plants, pets, home workshop, home decorating, and others; mechanic may be checked 2+ and may include electronics, home workshop, automotive work, motorcycling, and the like; traditionalist may be checked 2+ and may include bible/devotional reading, health/natural foods, sweepstakes/contents, grandchildren, our nation's heritage, stamp/coin collecting, and the like.

Upscale may include blue chip which may be checked 2+ and may include community/civic, self improvement, real estate investments, stock/bonds; connoisseur which may be checked 2+ and may include culture/arts events, fine foods, gourmet cooking, wines, foreign travel; culture which may be checked 2+ and may include arts/antique collecting, cultural art events, collectibles, foreign travel, crafts, and others; ecologist which may be checked 2+ and may include our nation's heritage, science/technology, wildlife/environmental issues; the good life which may be checked 3+ and may include cultural arts events, fashion clothing, gourmet cooking/fine foods, wines, health/natural foods, foreign travel, home furnishing/decorating; intelligentsia which may be checked 3+ and may include book reading, cultural arts events, current affairs, politics, art/antique collecting, foreign travel, community/civic activities; investor which may be checked 2+ and may include real estate, stocks/bonds, money making opportunities and others; professional which may be checked 2+ and may include career oriented activities, self improvement, money making opportunities, and the like.

Computer/stereo/TV may include audio/visual which may be checked 2+ and may include cable TV viewer, stereo/tapes/cds photography, home video recording, own CD player, buy recorded videos, video games, and the like; chiphead which may be checked 2+ and may include electronics, video games, PCs, science/new tech; technology which may be checked 3+ and may include electronics, home computer, photography, video games, stereo/CD/tapes, home video recording, science/new technology, and the like; TV Guide which may be checked 2+ and may include view cable TV, golf, watching sports on TV, buy recorded videos, home video recording, and others.

Ethnicity and religion may be represented by religious codes as follows: B=Buddhist, C=Catholic, H=Hindu, I=Islamic, J=Jewish, P=Protestant, X=Not known or unmatched (this may be the default).

Health condition attribute details are included for each health condition. Available values include at least "Yes" and "No". Some examples are provided below.

Example 1

If a household has just one member with condition that treats with Rx only then the attribute may be set as follows.

'HHs suffering from _______'='Yes',
'_______suffers treating with Rx only'='Yes'
'_______suffers treating with OTC only'='No'
'_______suffers treating with Rx and OTC='No'

Example 2

If a household has two members with the condition one treats with Rx only and one member treats with OTC only.
'HHs suffering from _______'='Yes',
'_______suffers treating with Rx only'='Yes'
'_______suffers treating with OTC only'='Yes'
'_______suffers treating with Rx and OTC='No'

Example 3

If a household has one member with condition that marked on the survey 'Rx and OTC' for the health condition.
'HHs suffering from _______'='Yes',
'_______suffers treating with Rx only'='No'
'_______suffers treating with OTC only'='No'
'_______suffers treating with Rx and OTC='Yes'

Other Attributes:

Attribute: 'I try to eat whole grains': Attribute value ('Yes', 'No') If any one in household marked 'agree' on survey this may be set to 'Yes'.

Attribute: 'Concern about trans fatty acids': Attribute value ('Yes', 'No') If any one in household marked 'very' or 'somewhat' on survey this may be set to 'Yes' for the household.

Attribute: 'Concern with refined or processed foods': Attribute value ('Yes', 'No') If any one in household marked 'very' or 'somewhat' on survey this may be set to 'Yes' for the household.

Wellness Segment Data attributes include:

Attribute: Proactive Managers: Attribute value ('Yes', 'No')

Attribute: Unconcerned Gratifiers: Attribute value ('Yes', 'No')

Attribute: Health Obsessed: Attribute value ('Yes', 'No')

Attribute: "Med Profiler Participant": Available values ('Yes', 'No')

Buyer group details include shopper groups and buyer groups. The shopper group file may contain information about the shopping habits of each panelist in regards to the top key accounts in terms of dollars in the U.S. total geography. For each panelist it may indicate if the panelist may be a core shopper in any of the top key accounts and in which of the top key accounts the panelist shops. In addition an "Any Shopper" record may be generated for every panelist in the market basket file without regard to the top key accounts. Following are steps that may facilitate creating the shopper group file:

1. Weight the Market Basket file Basket Dollars using the U.S. Total Weight file.

2. Summarize the Market Basket file by Key Account accumulating the weighted Market Basket Dollars. Fields in the summary file are Key Account and the aggregated Dollars.

3. Sort the summary file on the summarized Dollars in descending sequence.

4. Select the 1st 20 records in the sorted file. These are the top 20 Key Accounts.

5. For each Panelist in the Market Basket file aggregate the Market Basket Dollars for each of the top 20 Key Accounts. Also aggregate the total Market Basket Dollars spent in any Key Account.

6. Calculate the percentage spent in each of the top 20 Key Accounts by dividing by the Dollars spent in any Key Account. If the percentage may be >50% in any Key Account, that Panelist may be a Core Shopper in that Key Account. If the Dollar amount may be >0 for any of the 20 top Key Accounts, that Panelist may be a Retailer Shopper.

7. Create an output file that contains the Panelists ID, the Shopper Group Key, and the Shopper Type Key. A given Panelist could have up to 22 records created base on their shopping habits.

For buyer groups, the product group file may contain information about the shopping patterns of each panelist in regards to the top products in a category based on dollars spent. For each panelist that purchased the category it may indicate that the panelist bought the category, which sub-categories or types within the category the panelist purchased, and which of the top products the panelist purchased in the category. If a panelist did not purchase any products in the category a product group record may not be generated for that panelist. Following are steps that may facilitate creating the buyer group file:

1. Weight the Purchase file Dollars using the U.S. Total Weight file.

2. Using the DMS file classify each purchase record with it's Category, Sub-Category (Type), and Brand codes.

3. Using the DMS create a hierarchy of Category, Type, and Brand. This file may be used to define the parent/child relationships for each Category. See Appendix B for an example of the Keys and Output file structure.

4. For each Category:

a. Summarize the Category purchases by Brand accumulating the weighted Dollars. The fields in the summary file are the Brand code and the aggregated Dollars.

b. Sort the summary file on the summarized Dollars in descending sequence.

c. Select the 1st 20 records in the sorted file. These are the top 20 Brands in the Category.

d. For each Panelist scan the Category purchases and set indicators of which of the Sub-Categories were purchased and which of the Top 20 Brands were purchased.

e. Create an output file that contains the Panelists ID, the Product Category Key, the Product Type Key, and the Product Brand Key. A Panelist may have a record generated for every Category, Type, and Product combination they purchase.

Trip type details include how it works, what may be shown, and uses.

How it works: An algorithm to "type" trips based on measures of trip size and basket composition. Every four weeks, the latest set of panelist purchase records are processed through this algorithm. When building the datasets that feed into the SIP application, this Trip Type code (1-31) is appended to each "trip total" record (which documents the total trip expenditure) for over 6 million individual trips over the two-year period of data provided in the SIP. SIP may be programmed to divide or filter all trips based on the 31 trip type codes, collapse the 31 trip types to the 4 trip missions, and report standard purchase measures by trip type or trip mission.

What may be shown: An additional dimension in SIP labeled Trip Mission may be shown, in addition to the existing dimensions of measure, geography, product, consumer demographic group, and time period. In addition to showing average expenditure per trip (market basket), average expenditure on Pantry Stocking trips vs. Quick trips is shown. In addition to showing how many trips were made to retailer A versus retailer B, the quantity of Fill In trips that were made to retailer A versus retailer B are shown. In addition to showing a % of all trips (in any specified geography, outlet/retailer, and the like) including RTE, what is shown includes whether RTEC may be more commonly purchased on a Pantry Stocking, Fill In, Special Purpose, or Quick trip.

Uses: Trip type may facilitate identifying the shopper missions that drive category & brands' sales by outlet and by retailer. Trip type details may be used to facilitate refining shelving, pricing, and merchandising tactics to align with the type of trip on which a product may be most commonly purchased in a particular geography, outlet, or retailer. Also trip type may be used to determine specialized roles for different available brands based on shoppers' missions to a channel or retailer.

Traffic measure details may include average weekly buyer traffic, traffic fair share index, annual buyer traffic, traffic opportunity dollars, and the like. Traffic measures may be created by combining panel (consumer) and store (census) data. 1) Annual buyer traffic may be the number of annual category or type trips that were made within the geography. This may be an indicator of overall size of category and importance of opportunity. 2) Average weekly buyer traffic/store may be the average number of category or type trips made per week within the average store of the category. This may be used to benchmark category traffic across chains. 3) Traffic fair share index may be the average weekly traffic per store for the selected chain divided by the average weekly traffic per store for the comparison geography (usually the CRMA). This may be used to benchmark opportunities across chains for a single category or designate the opportunities across categories within a chain. 4) Traffic opportunity dollars may be the difference between the potential traffic (trips based on fair share) in the category and the actual trips generated times the value of each trip.

ACCOUNT TRAFFIC MEASURES may include DIMENSIONALITY of Alignment/releasability that may hold (Consistent w/Account Traffic Builder releasability)

PERIOD: these measures may be available for all time periods

PRODUCT: these measure may be available for all product levels that have sufficient panel sample size to release (i.e. this measure shall never show for a product that can't release its panel data)

MARKET: Food may use Food traffic measures or all geos that match, US, Region, Mkt; Drug may use Drug traffic measures for all geos that match, US, Region, Mkt; No other Channel may use traffic measures; Accounts, RMAs, CRMAs may report traffic measures as long as the client may not be a retailer. No retailers may see another account's store data.

household SEGMENTATION: Traffic measures may show, as indicated above ONLY when ALL household are selected.

In embodiments, the current invention may provide a capability to address new product launches, which may also include work done on New Product Launch Management. This initiative may bring New Product Management solutions into an analytic platform. The solution may encompass Point-of-Sale data, Panel data, and may also allow the integration of customer data directly into the system. The solution may offer a dynamic way for users to access rich analytical modules along key areas of New Product Launch Management, the analytics may not require more than a browser to access and may allow dynamic drilling ability that may lead to key root-cause analysis. Thus users may be able to determine specifically in which regions they may not be performing well in, or which regions may not result in the return from a promotion they may have just introduced. Aside from relevant analytical modules available on-demand for categories of data in a syndicated manner, the solution may allow alerting and forecasting capability, from an alerting perspective the solution may alert based on exception-based criterion that users may define, so that they may not be required to review specific analytics unless there is a key reason to do so, for example Trial rates for a brand new product is exceptionally high, the user may get alerted upon such an event, similarly the alerting could be triggered based the New Product Success Index that may be being positioned by the UK folks (NDSI index). The current invention may take more of a predictive and insightful look, encompassing Panel metrics, as well as Sales and other Causal metrics.

The present invention may develop a syndicated New Product Launch Solution that encompasses aspects that are relevant for New Product Launch Management. Ultimately, this solution may provide clients the ability to look across the new product launch measures and determine key benchmarks that can help them improve the chances of success. The product may leverage standard and newly defined measures for tracking New Products, but may also define new analytics where necessary. Hence the measures for calculating a new product's sales rate as well as the sales rate of the category as a whole may need to be imbedded in the system. The current invention may utilize weekly data, however the issue of potentially using daily data may still be left open further down the road. The core issue that the product addresses may be the fact that most new products fail, over 90% and creating an application that gives both a concise view on the initial sales rates of the new products and allows for further diagnostic reporting which may ultimately allow brand managers to adjust and improve the chances of overall success.

Figure 50:
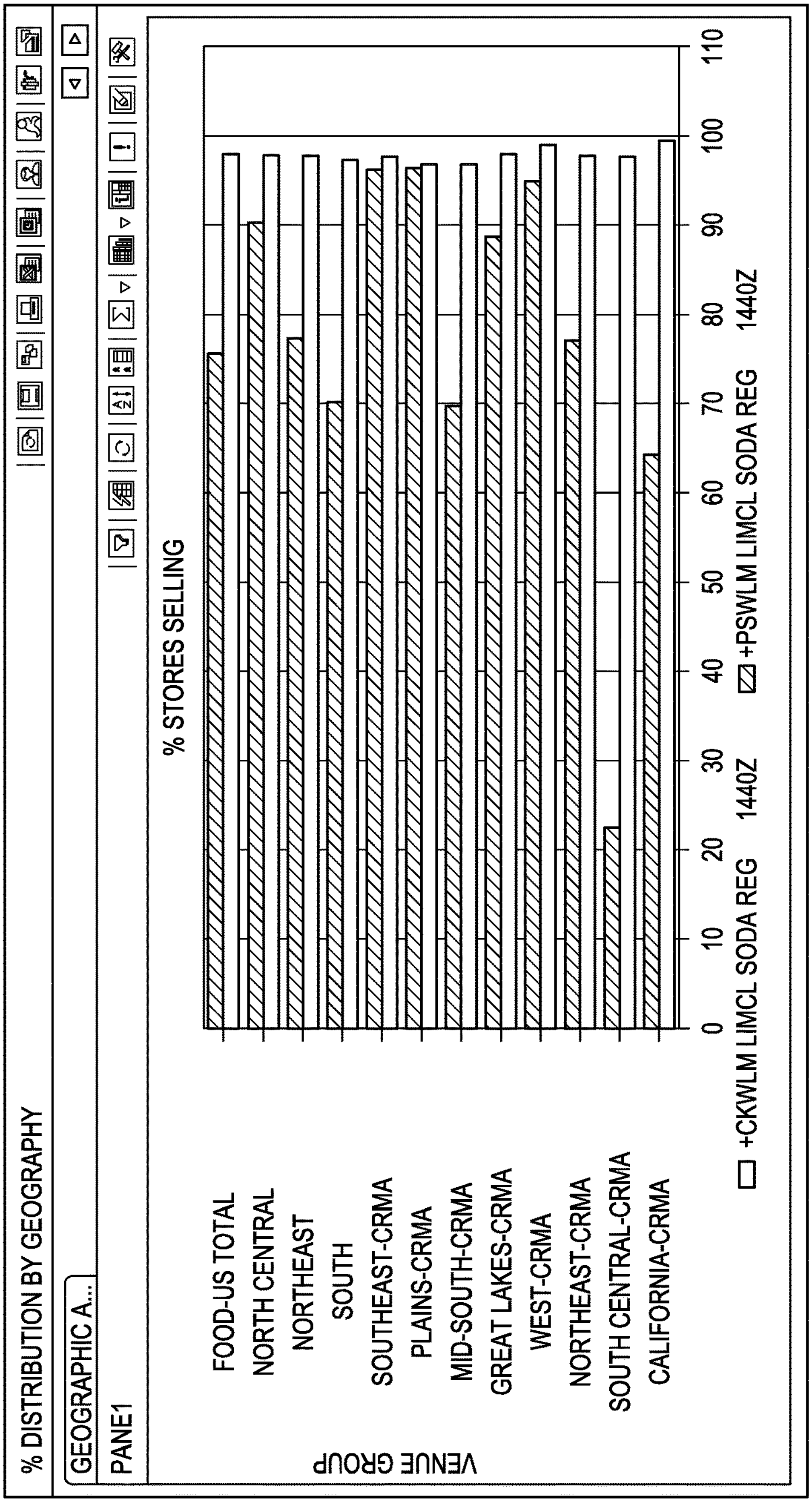
FIG. 50 depicts one embodiment of a distribution by geography.

In embodiments, there may be new product geographic benchmarking, where distribution is by geography. FIG. 50 illustrates one embodiment of a distribution by geography. Data Enhancement may provide a current report aggregated over time requiring a pre-selection of products. Going forward this report may be possible for all new products by category. Additionally the creation of a time hierarchy that may automatically include the weeks that the product has been in distribution. When showing a chart it may need to allow two products as filters so that they can be compared to each other. Hence one competitor UPC may be selected on the left and a second competitor UPC on the right and then have the chart show the relevant chart.

Figure 51:
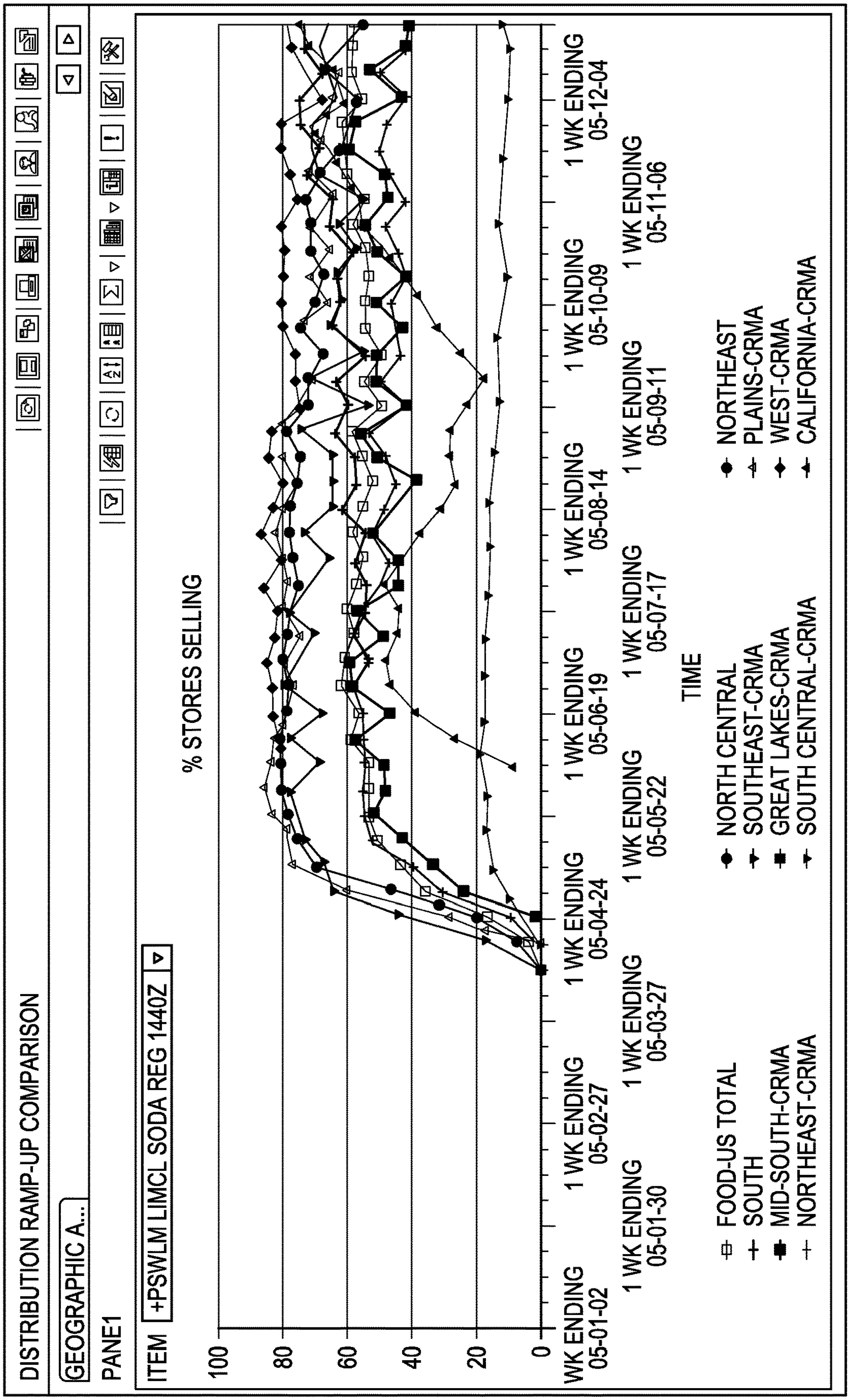
FIG. 51 depicts one embodiment of a distribution ramp-up comparison.

In embodiments, there may be a distribution ramp-up comparison. FIG. 51 illustrates one embodiment of a distribution ramp-up comparison. The report may consist of choosing the particular UPC's recently launched, and then comparing the ramp-up by the individual regions selling the product. There may be a ramp-up based on absolute time, a report of this type may be available in relative time (i.e. weeks from launch). In terms of data enhancement, the Geography hierarchy may be somewhat confusing, with RMA's and CRMA's overlapping, ideally there needs to be one hierarchy available that does not have any overlap, this does not need to be the only hierarchy, the RMA's and CRMA's may be available as a separate hierarchy as well. In terms of UI Enhancement, it may be difficult to show two product graphs since the data may become over-bearing and the trend lines become hard to follow, ideally the UI may allow comparison charting where two products may be compared—the dual pane report does may not provide a good display of the trends, the charting may allow for dual charting integrating the reports better.

Figure 52:
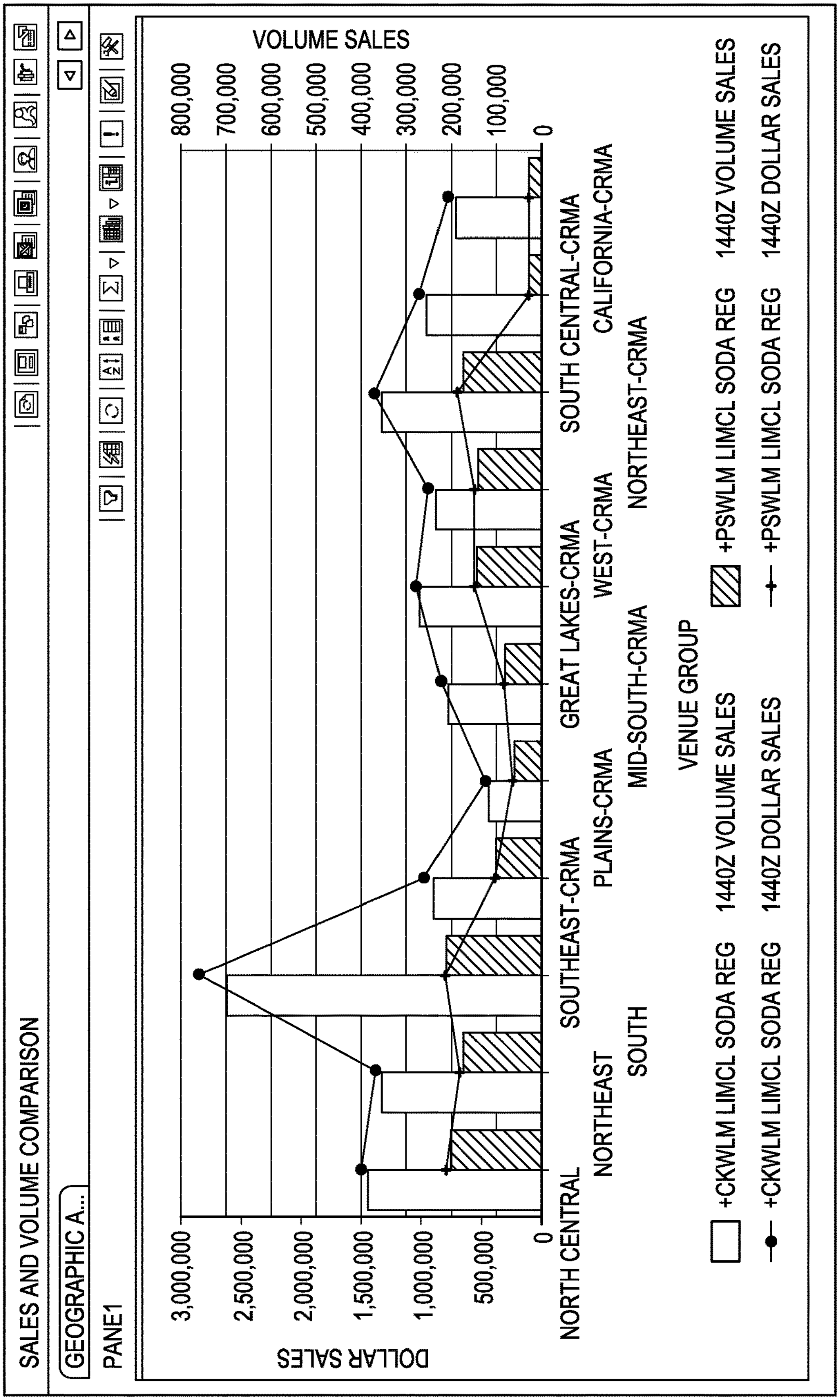
FIG. 52 depicts one embodiment of a sales and volume comparison.

In embodiments, there may be a sales and volume comparison. FIG. 52 illustrates one embodiment of a sales and volume comparison. The report needs to compare from the point the product has been in distribution the total dollar sales and total volume sales. The report is illustrated by a chart. The Geography chosen should be a non-overlapping geography. The goal is to identify regions not performing well so that the manufacturer can highlight those regions in a competitive response. Data Enhancement: A time hierarchy that is based on time in circulation, or even using the relative time hierarchy should be possible. The products needs to be easily available through a new product launch hierarchy available by category. UI Enhancement: There should be a way to allow comparison of multiple products together. Hence just as defined above a dual filter option where two products can be put side by side automatically.

Figure 53:
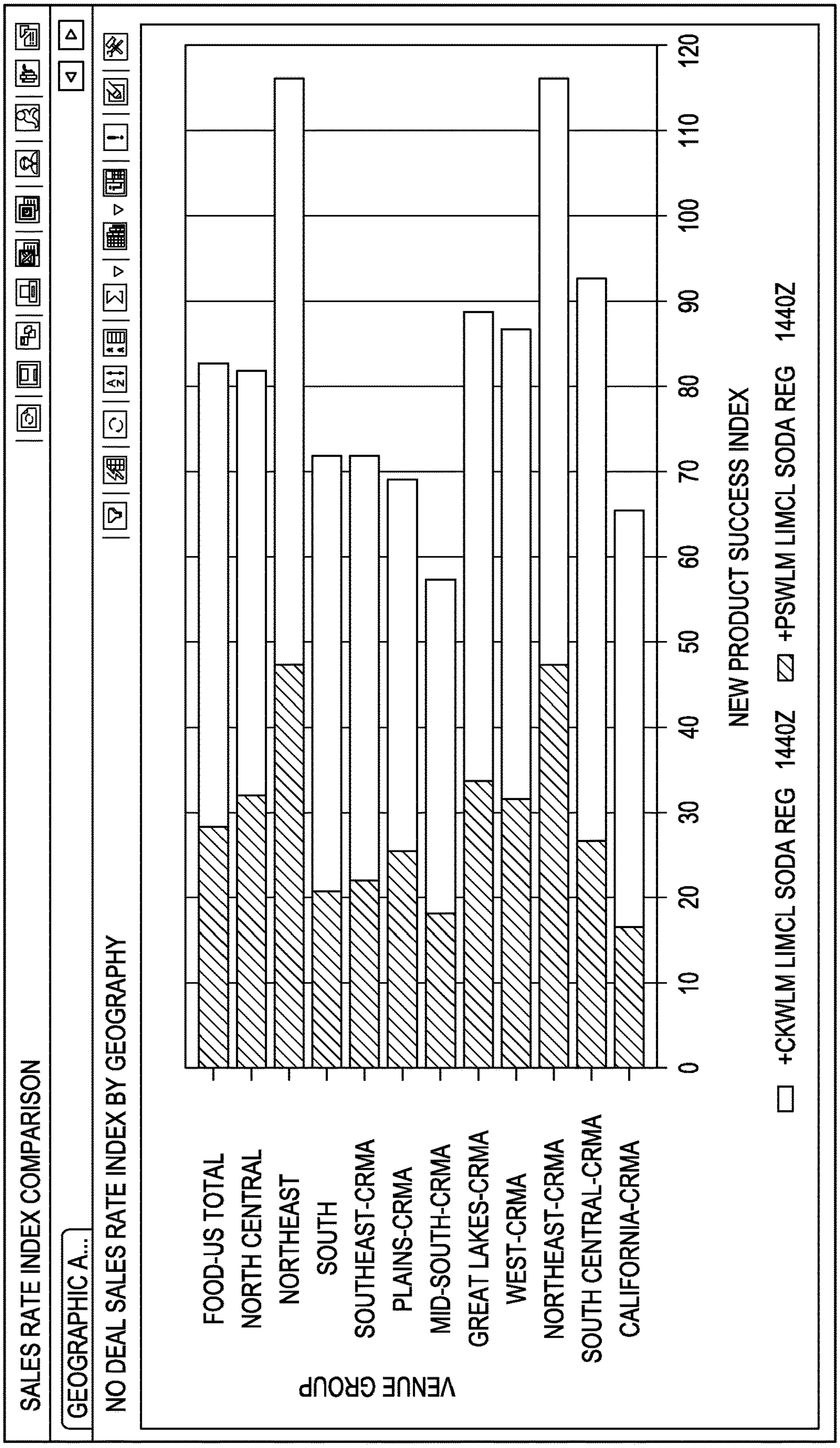
FIG. 53 depicts one embodiment of a sales rate index comparison.

In embodiments, there may be a sales rate index comparison. FIG. 53 illustrates one embodiment of a sales rate index comparison. This analysis may compare two products based on a new Product Success Index. It should be noted that this analysis may put the two products side by side and allow the user to glean very quickly regions where the product may be worse off—not merely by looking at sales but by looking at its non-promoted selling rate. Data Enhancements may include the ability to choose new products by category, and the ability to choose the relative time hierarchy show-casing the aggregate index automatically from the date of launch. UI Enhancements may provide the user to choose multiple products on the UI and therefore may have multi-filters so that the user can decide to compare a different product set should be available.

Figure 54:
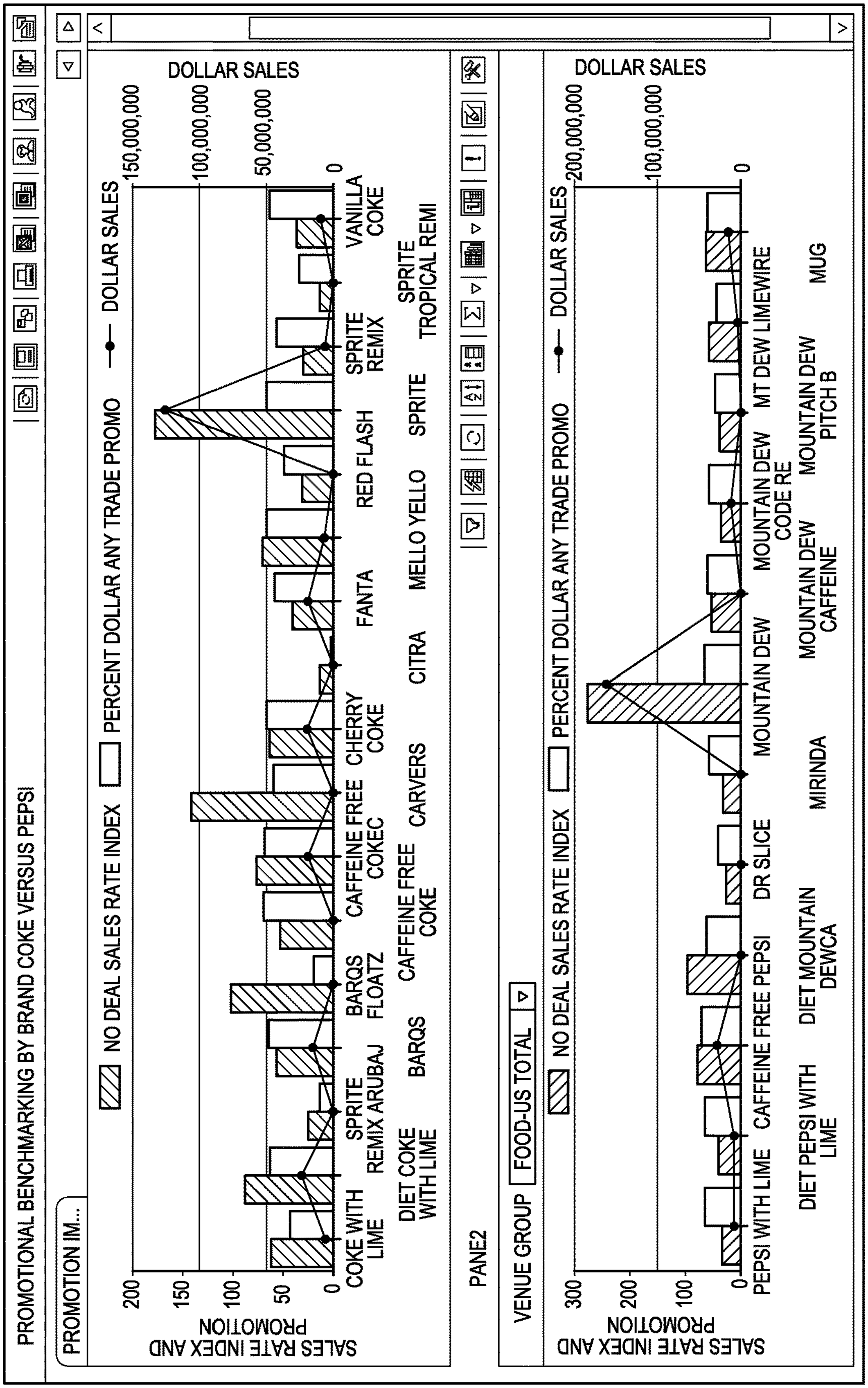
FIG. 54 depicts one embodiment of a promotional benchmarking by brand.

In embodiments, there may be new product promotional benchmarking, where promotional benchmarking may be by brand. FIG. 54 illustrates one embodiment of a promotional benchmarking by brand. This analysis may show-case the aggregate Product Success Index as well as aggregate amount of promotion occurring by brand in the defined time period. For example, a diet drink with lime may be a more successful brand than a non-diet drink with lime, also the promotional activity for diet drink with lime may be higher than that of non-diet drink. Through Data Enhancement it may be possible to select new brands by category as opposed to individually picking the new brands, additionally the relative time filter may dynamically pick the time since in distribution for the product. In terms of UI Enhancement, it may be possible to do side by side, or in this case vertical, comparison through one report definition process as opposed to multiple ones.

Figure 55:
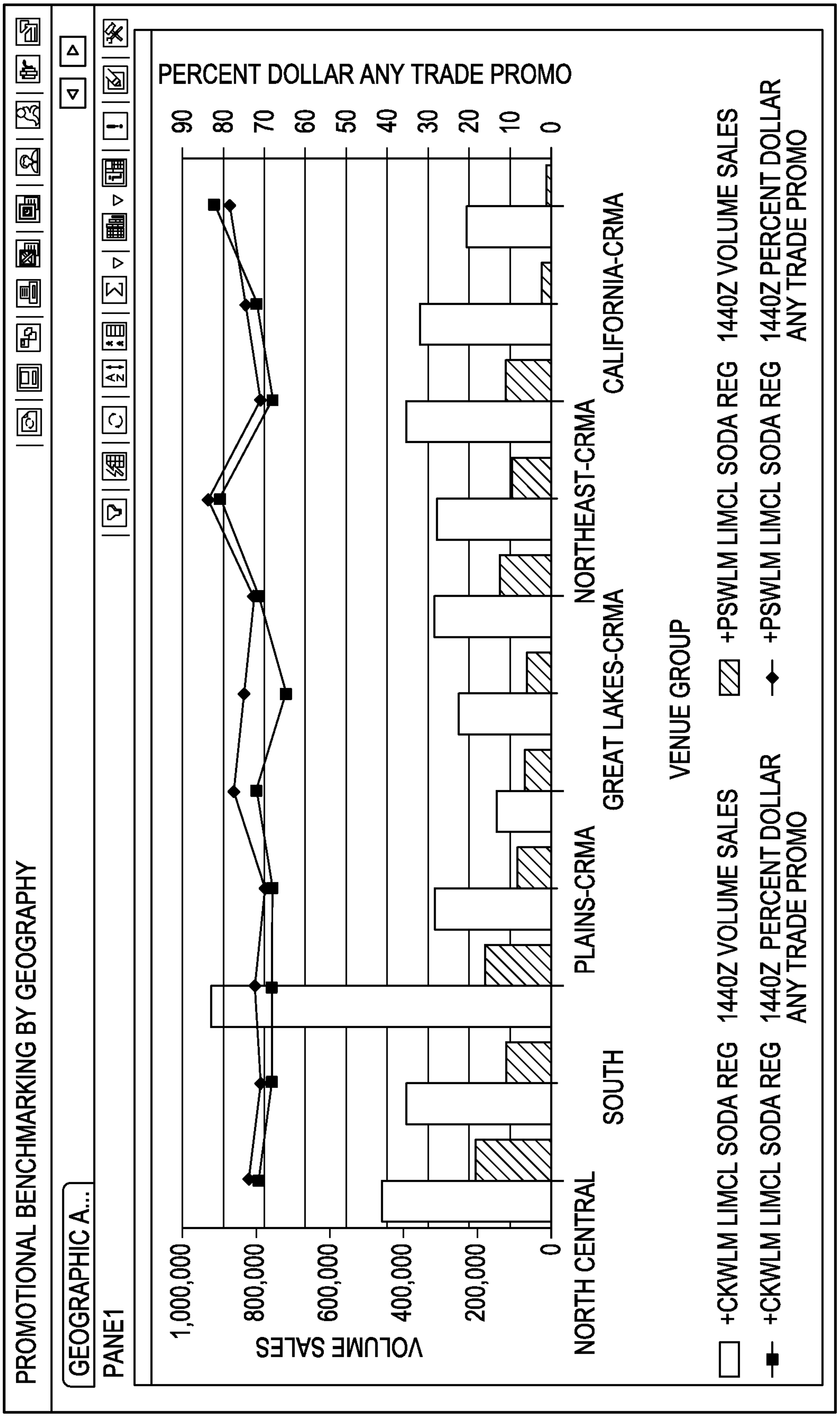
FIG. 55 depicts one embodiment of a promotional benchmarking by geography.

In embodiments, there may be new product promotional benchmarking, where promotional benchmarking may be by geography. FIG. 55 illustrates one embodiment of a promotional benchmarking by geography. This analysis may show-case a comparison of the type of aggregate promotional activity since launch. The analysis may show trends for how competitors may have been running promotions in different regions and how well they may have been able to keep up with each other in terms of promotional activity. Additionally highlighted here is that in the Great Lakes Region where one competitor does approximately 10% less in promotions its volume sales is less than a forth of a second competitor while in other regions. In terms of data enhancement, the new product hierarchy and the standard venue geography that avoids overlaps may greatly enhance the analysis, i.e. make it easier to compare products etc. Also, the relative time hierarchy may be useful in the analysis. In terms of UI enhancement, multi-product filters, as indicated herein, may only provide one filter per dimension available. In embodiments, there may also be provided multiple filters per dimension.

Figure 56:
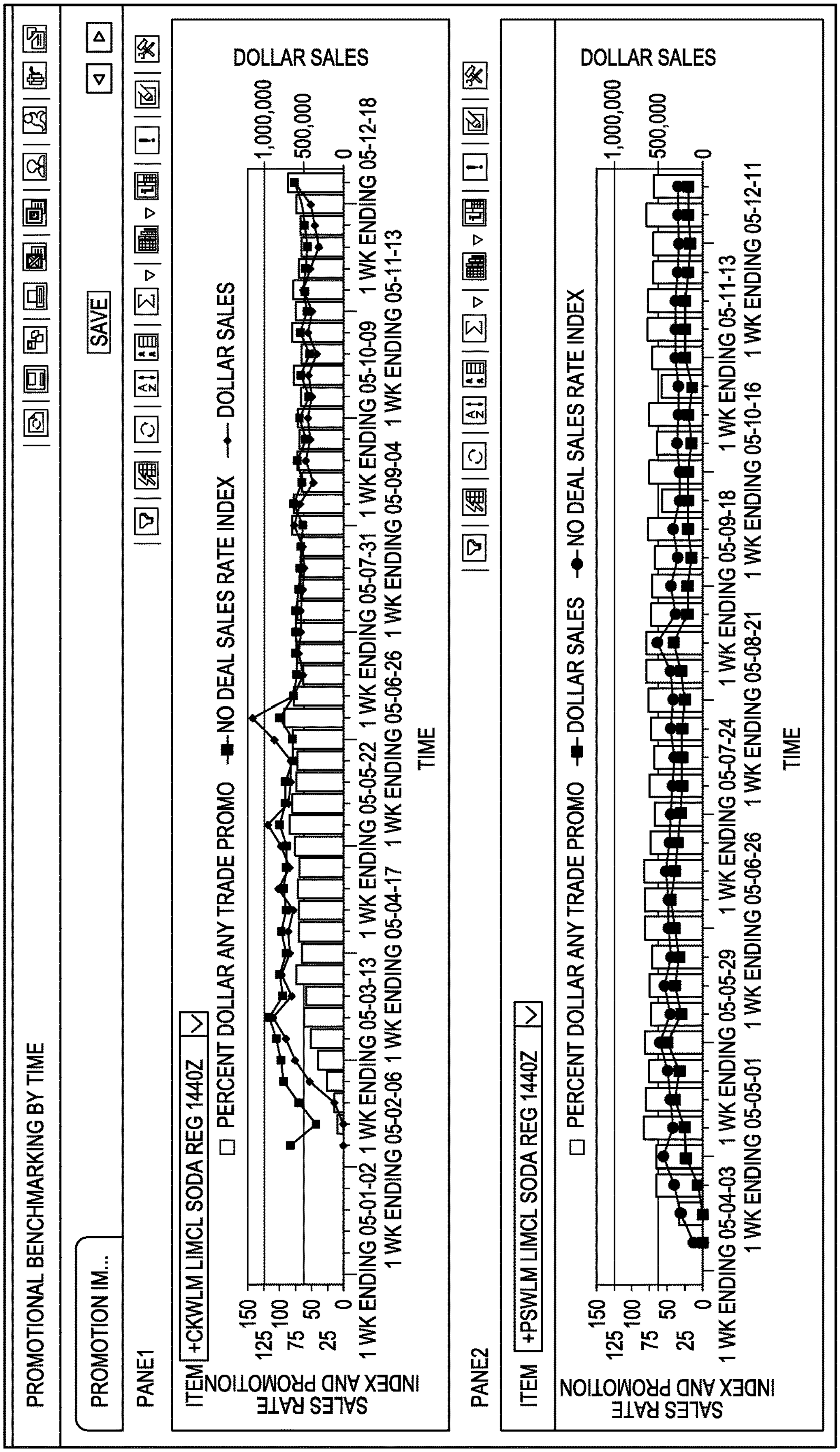
FIG. 56 depicts one embodiment of a promotional benchmarking by time.

In embodiments, there may be new product promotional benchmarking, where promotional benchmarking may be by time. FIG. 56 illustrates one embodiment of a promotional benchmarking by time. The analysis illustrates how two new products fared against each other and looks at promotional behavior along with New Product Success Index, also highlighting the total dollars generated. The analysis may show the trend by time, hence in this case though there may be absolute time shown, the report may be illustrated by relative time. In terms of data enhancements, a new product hierarchy may be shown, where new products may be available and the analysis can be quickly carried out for any new product. Relative time hierarchy may be applied to the new products. In terms of UI enhancements, there may be an ability to pick a new product and compare it, where multi filters per dimension may also be used.

In embodiments, new product packaging may be tailored to a functional customer, such as for new product solution for sales, new product solution for brand management, new product solution for category management, and the like. For new product solution for sales, a New Product Launch Early Warning Benchmarking, based on using POS data, may be provided, such as by Distribution and Velocity benchmarking, Geographic and Brand benchmarking, and the like. New Product Target Vs. Goal Analysis, focused on allowing integration of target input data, may be entered into the data model, such as in Sales versus Targets, Distribution versus Targets, and the like. New Product Predictive Forecasting Analysis may be provided, including a predictive/modeling function. New Product Launch Trade Promotion Management may also be provided. For new product solution for brand management, a New Product Launch Early Warning Benchmarking, based on using POS data, may be provided, including New Product Brand Benchmarking; New comparative benchmarking by size, by flavor, by color; and the like. New Product Buying Behavior Analysis, which may involve the addition of panel data that focused on new item specific measures, may be provided. New product target vs. goal analysis may be included, such as sales vs. targets, distribution vs. targets, and the like. In addition, new product predictive forecasting analysis may be provided.

In embodiments, new product solutions for category management may be provided, such as new product launch trade promotion management by geography, by brand, or the like. New product optimal price analytics, new product buying behavior analysis, new product attribute analysis, may also be provided.

In embodiments, the standard user may need to be able to analyze data across a plurality of basic dimensions and measure sets, such as new items, geographies, time, product, by panel data, and the like. Geographies may include an ability to look at RMA levels, store levels, total retailer levels, while maintaining the ability to look as store demographics such as by ethnicity, income, suburban versus city, and the like. Time, which may be relative time from launch, may include standard periodic roll-ups. Product may be by brand, category, flavor, year of launch, size, or the like. HH panel data may be by repeat buyers, by trial buyers, and the like.

In embodiments, the product may be available in several high level categories. One such category may be an analysis that allows for Strategic new product building perspective, analysis that may allow brand managers to analyze the latest trends in buyer behavior, ranging from flavors to sizes, to buyer profiles, etc that can enable a brand manager to create the right product and determine the right market to target with that product. Another such category may be an analysis that may aid the actual launch of a new product, this may be meant to focus on a particular launch determine weakness in initial launch execution and determine ways of improving execution, as well as determine when a product may not be meant for success despite all execution efficiencies.

In embodiments, the strategic analysis may therefore require an application to be able to be able to use all available data, hence may require analysis such as sales, distribution, promotional lift, No deal Sales Rate indexes, and other velocity measures, to be available at total Retailer levels. The analysis may be meant to be able to look at macro views across all data and use those to determine, optimal flavors, price, sizes, categories, demographics of consumers to target.

From a specific launch tracking perspective, the current system may be limited in the same way as it may be for a macro strategic analysis, specifically because of the delay in the sales rate index calculations. Making these calculations more efficient may aid the overall application. The current new product system may incorporate a way to determine future sales, to project the success/failure of a product, projecting sales, and the like. These may be done in a workflow-like manner. The addition of HH panel data may have benefits, such as trial and repeat rates on new products, knowing the type of buyer and characteristics of target consumers, and the like.

In embodiments, with the addition of newer data, there may be a general requirement from a new product perspective to improve the time taken to run the sales rate index calculations, additionally there may need to be a way to efficiently create relative time hierarchy that can be applied across all launches. Some of these might require pre-aggregations at the database level, the sales rate indexes as well as the relative time hierarchies could be calculated in the ETL loading routine or could be handled at the AS/RPM level by running overnight reports so that a scheduled report runs these in advance.

In embodiments, there may be a way to illustrate the success of the launch in comparison with a set of targets. In this case it may be essential to enter a target for each RMA, such as inputting a file that may have target data for each RMA, allowing the user to set ACV targets by time period at the RMA level, using data entered for one RMA and copy the same targets to another RMA, and the like. The target data can appear as sales targets, where the dollar or unit sales may be specified; ACV targets, where the ACV distribution is specified; distribution targets, where the percent store selling by time period may be specified, and the like. The data may be provided at a weekly granularity, however standard weekly roll-ups may apply. FIG. 57 provides an illustration of one embodiment of a distribution report.

In embodiments, additional new product hierarchy may be provided by launch year, where there may be no hierarchy for product launches by launch year independent of categories, hence there may not be a hierarchy that can provide new products across all categories based on the year chosen.

In embodiments, competitor product hierarchies may be provided. where there may need to be a way for the new product brand manager to have an automated means of comparing a launch to competitors, competitive launches, and the like, and may include characteristics such as same category as the launched product, belonging to a different manufacturer, launched in the same year, or other ways of determining competitors such as size and flavor. Additionally, the user may select either of these options to determine competitors that meet a criterion.

In embodiments, classifying new launches may be provided. I may be possible to classify a new product launch into a plurality of types of launches, such as line extensions, incremental innovation, breakthrough innovation, and the like. These may appear as attributes for new products. Additionally it may be possible to retroactively apply the classifications described herein for products already launched, thus the fact tables may in include these items.

Figure 58:
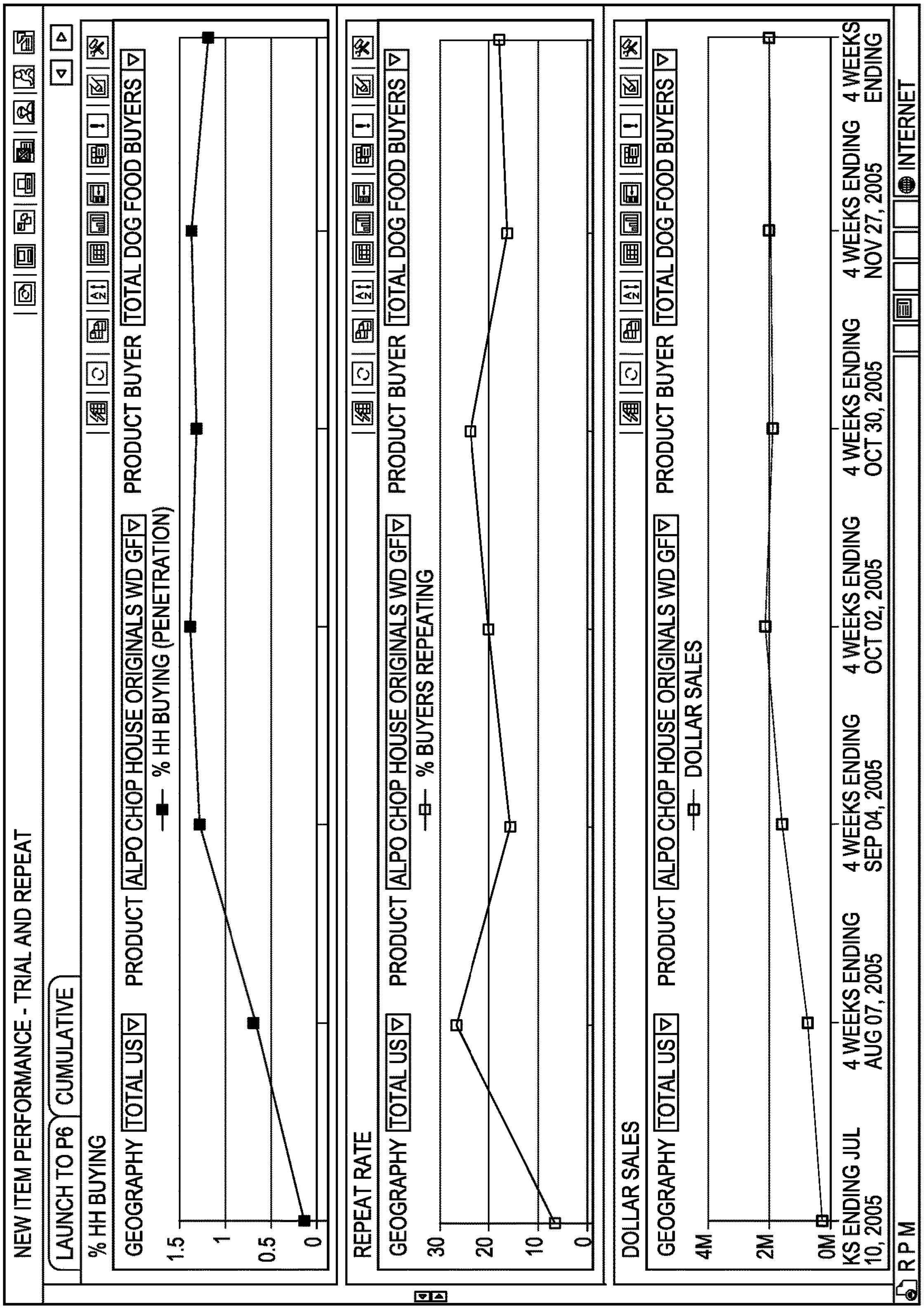
FIG. 58 depicts one embodiment of a panel analytics.
Figure 59:
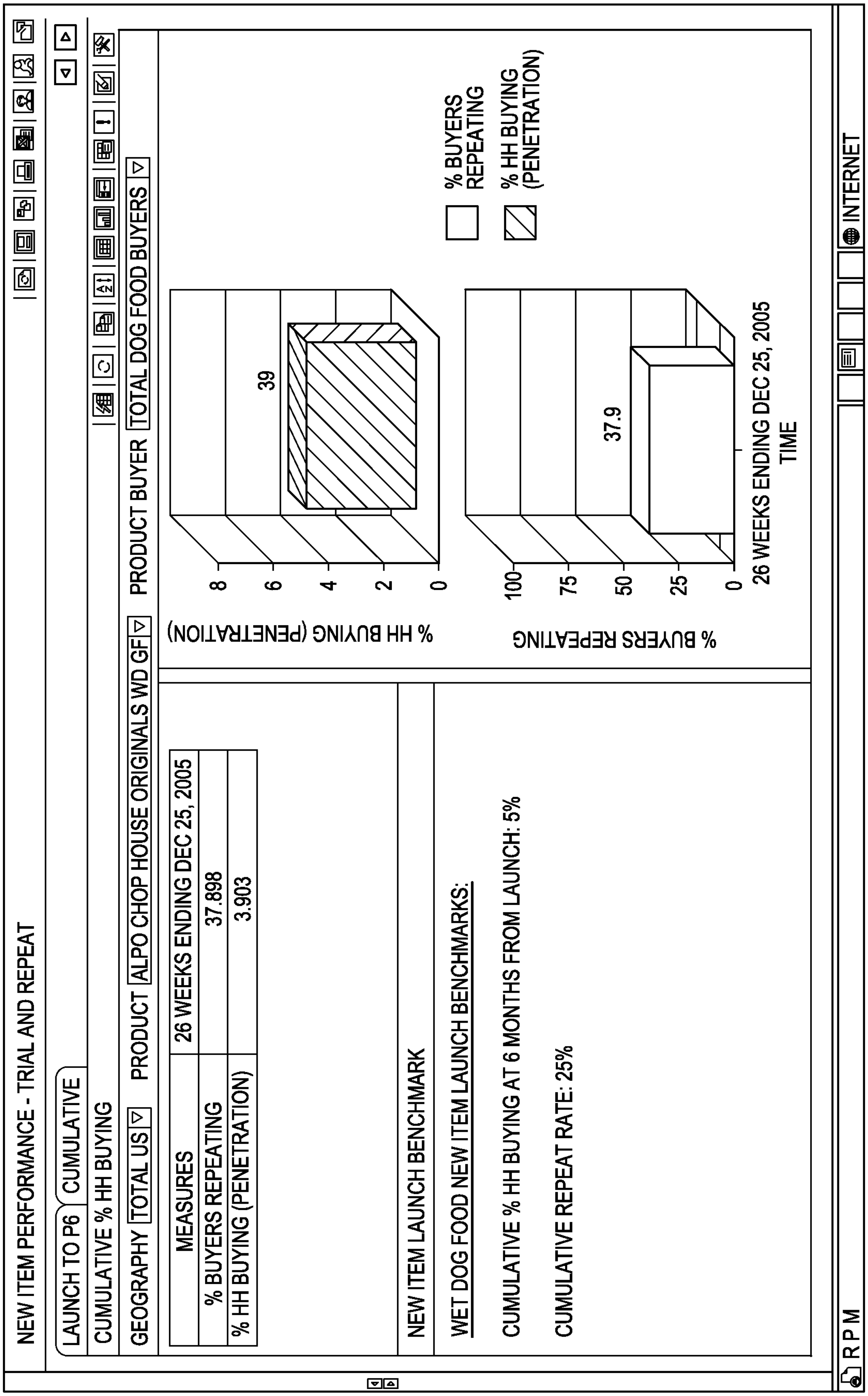
FIG. 59 depicts one embodiment of a panel analytics.
Figure 60:
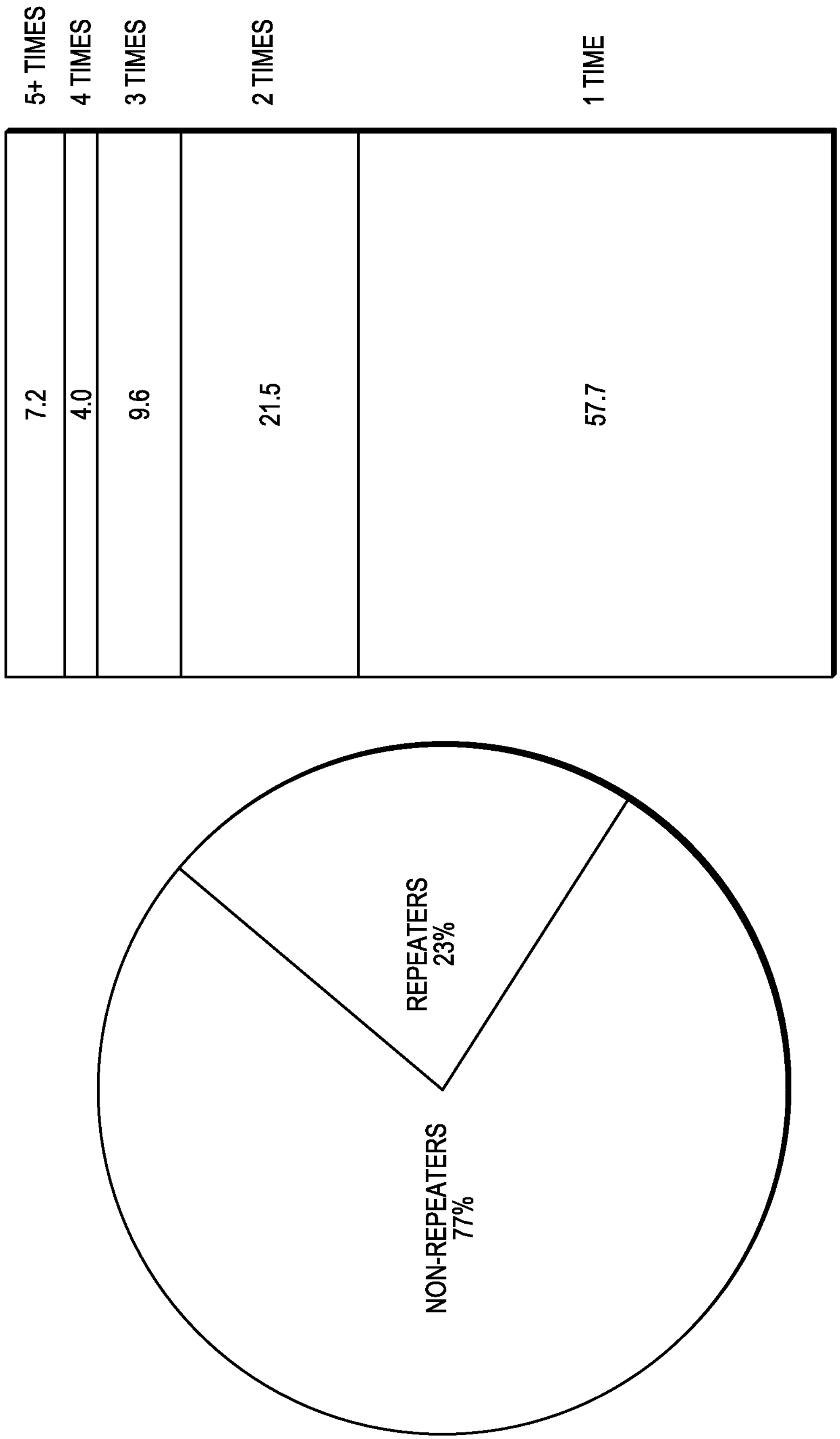
FIG. 60 depicts one embodiment of a panel analytics.

FIGS. 58-60 provide examples of panel analytics that may be relevant for product analytics, such as trial and repeat rates.

Figure 61:
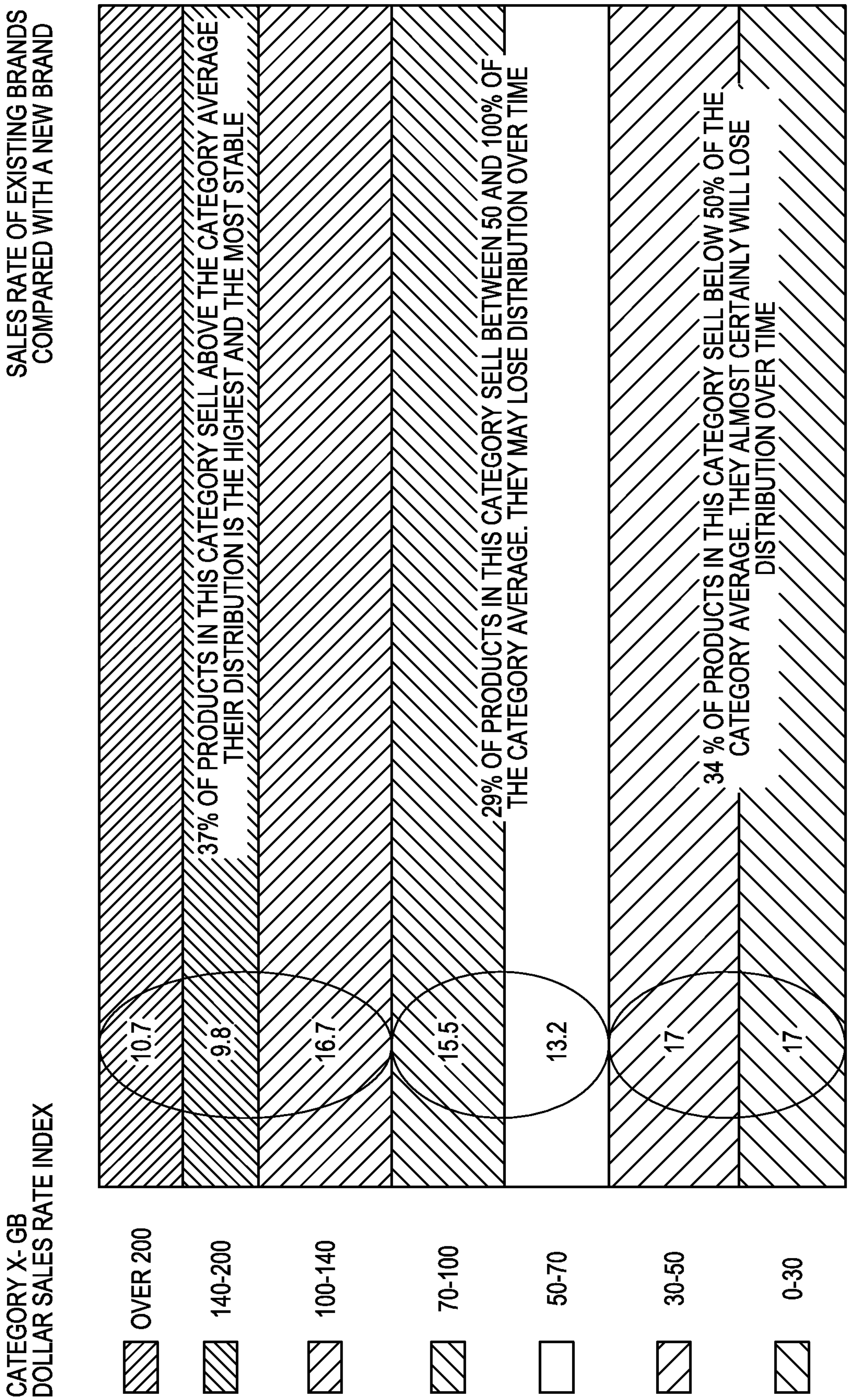
FIG. 61 depicts one embodiment of an illustration for new product forecasting.

In embodiments, new product forecasting may be provided. FIG. 61 provides one embodiment of an illustration for new product forecasting. The new product forecast may be based on utilizing Sales Rate measures. Tiers of new product launches may need to be created based on where the new product falls, the product may be projected using average Sales Rate growth of that particular tier. Hence the first task may be to establish which tier the new product falls in, secondly an average sales rate projection may be established for the particular tier, the new product may then be linked with the projected average Sales rate for that tier.

In embodiments, pace setter reports may be provided, where the pace setter excel may be reproduced automatically, as opposed to manual handling of data. The pace setter may measure in association with Media and Coupons.

In embodiments, there may be a plurality of measure definitions, such as ACV Weighted Distribution, % Stores Selling, Dollar Sales, Unit Sales, Volume Sales, Average Items per Store Selling, % Dollars, % Volume, % Units, Weighted Average % Price Reduction, % Increase in Volume, Base Volume, Base Dollars, Incremental Volume, Incremental Dollars, % Base Volume, % Base Dollars, Price per Volume, Price per Unit, Dollar Share of Category, Volume Share of Category, Unit Share of Category, Total Points of Distribution, and the like. In addition to these standard measures, the New Product Performance Solution may also require application-specific measures, such as Dollars per Point of Distribution per Item, Volume per Point of Distribution per Item, Units per Point of Distribution per Item, Dollar Sales, Volume Sales Rate Index, Units Sales Rate Index, Non Promoted Dollar Sales Rate, Promoted Volume Sales Rate, Non Promoted Unit Sales Rate, Dollars per $MM per Item, Volume per $MM per Item, Units per $MM per, Non Promoted Dollar Sales Rate, Unit Sales Rate Index, Volume Sales Rate Index, Units Sales Rate Index, and the like.

Figure 62:
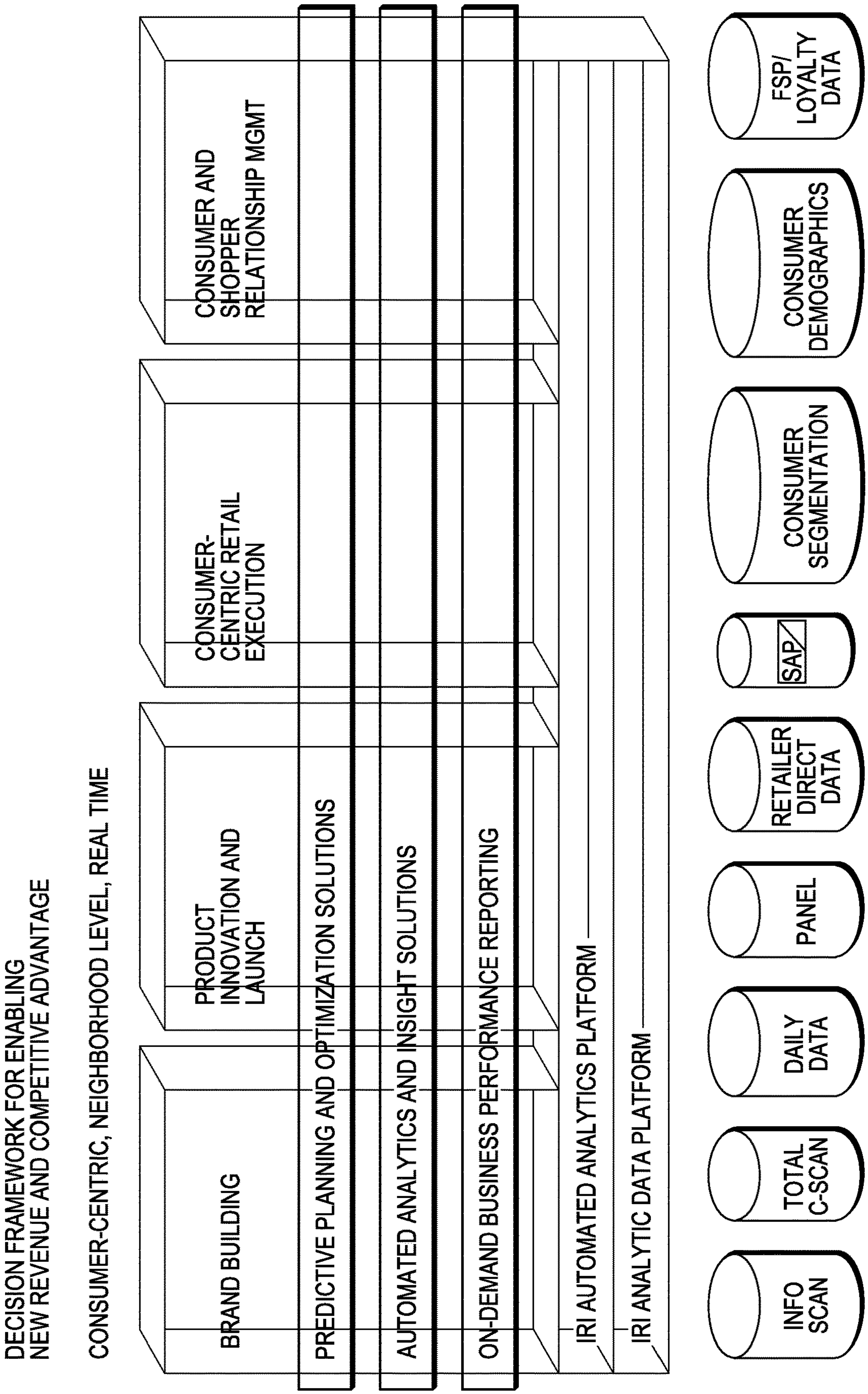
FIG. 62 depicts a decision framework for enabling new revenue analysis.

Referring to FIG. 62, the analytic platform may enable automated analytics. Automated analytics may include on-demand business performance reporting, automated analytics and insight solutions, predictive planning and optimization solutions, or some other type of automated analytics. The automated platform may support a revenue and competitive decision framework relating to brand building, product innovation and product launch, consumer-centric retail execution, consumer and shopper relationship management, or some other type of decision framework. In embodiments, the analytic platform may be associated with a data repository. A data repository may include infoscan, total c-scan, daily data, panel data, retailer direct data, a SAP dataset, consumer segmentation data, consumer demographics, FSP/loyalty data, or some other type of data repository.

Figure 63:
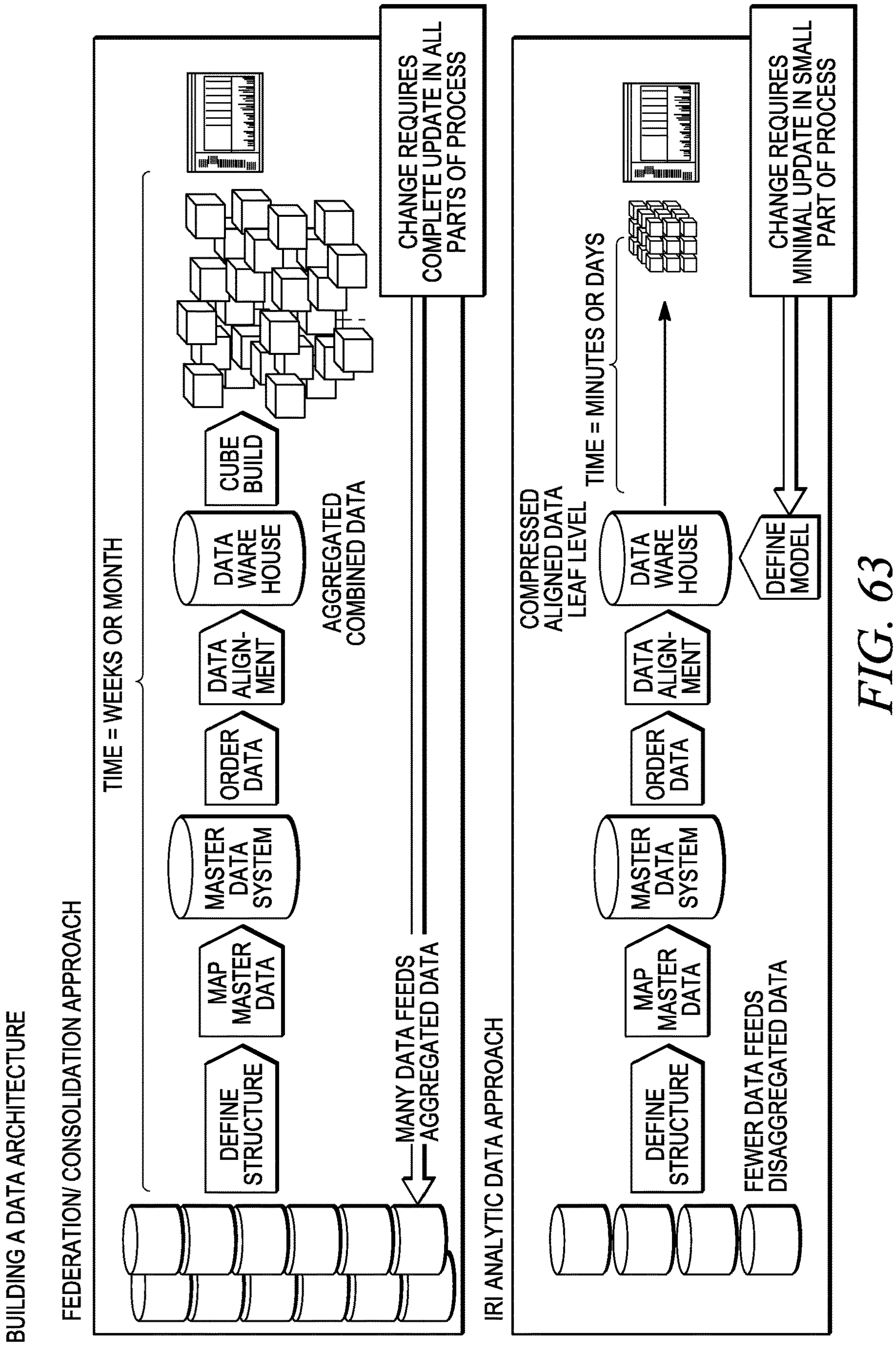
FIG. 63 depicts a data architecture.

Referring to FIG. 63, the analytic platform may build a data architecture. The data architecture may include federation/consolidation approach, IRI analytic data approach or some other approach. In embodiment, the federation/consolidation approach may aggregate data received from multiple data feed. The data received from multiple feed may include updating in all parts of the process. The data feeds may be connected to a master data system by a defined structure facility and a map master data facility. The map master facility may provide mapping of data received from data structure facility and convert it into a format acceptable by master data system. The master data system may be connected to a data warehouse through order data facility and data alignment facility. The cube build facility may transform the aggregated data received from warehouse into multiple data cubes Furthermore, consolidation of data may be performed using an improved IRI analytic technique. The IRI data approach include a fewer data feeds than the consolidation approach. The data feeds may be connected to master data system through a defined structure facility and a map master facility. The master data facility may be connected to a data warehouse through an order data facility and a data alignment facility. In the improved IRI analytic data approach, the data warehouse receives changes that require minimal updates in small part of process through a defined model facility. The data warehouse may have compressed aligned data at leaf level.

In embodiments, the analytic data platform may provide improved capabilities including total number of databases/cubes, adding new product or store hierarchy, adding new calculated measure, adding new data source or new attribute, calculating distribution measures, cross category analysis, attribute analysis across categories, ability to extend to additional categories and true integration of panel and POS data.

Figure 64:
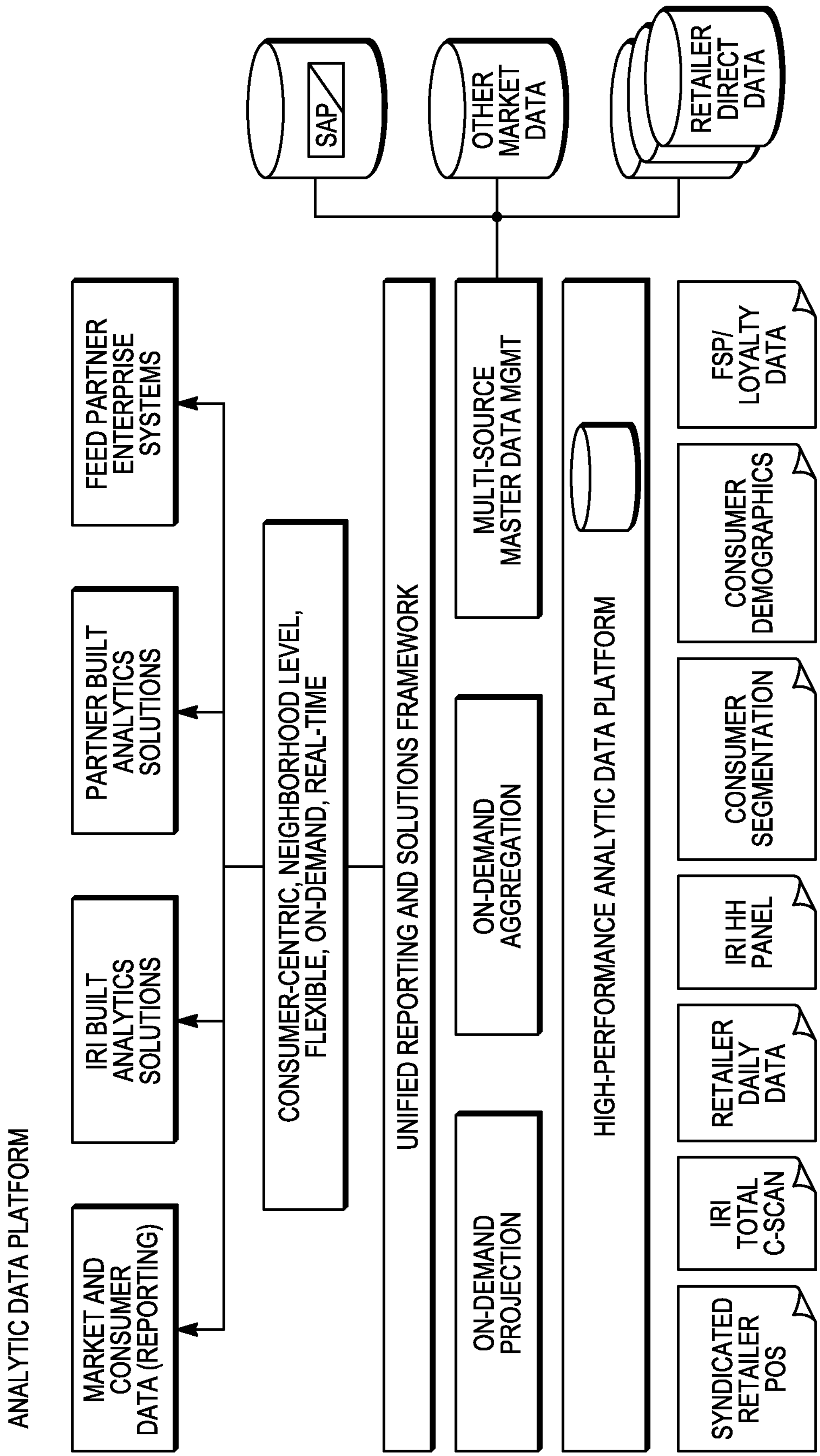
FIG. 64 depicts aspects of the analytic platform.

Referring to FIG. 64, the analytic platform may include a unified reporting and solution framework, high performance analytic data platform, on-demand projection, on-demand aggregation, and multi-source master data management. The unified reporting and solution framework may support market and consumer data reporting, IRI built analytic solutions, partner built analytic solutions and feed partner enterprise system by providing consumer centric, neighborhood level, flexible, on-demand and real time information. The multi-source master data management may be connected with multiple data repositories including SAP dataset, market database, and retail direct database. The high performance analytic data platform may include a data repository. In embodiments, the high performance analytic data platform that may be associated with syndicated retailer point of sales (POS), IRI total c-scan, retailer daily data, IRI HH panel, consumer segmentation, consumer demographics, and FSP/locality data.

Figure 65:
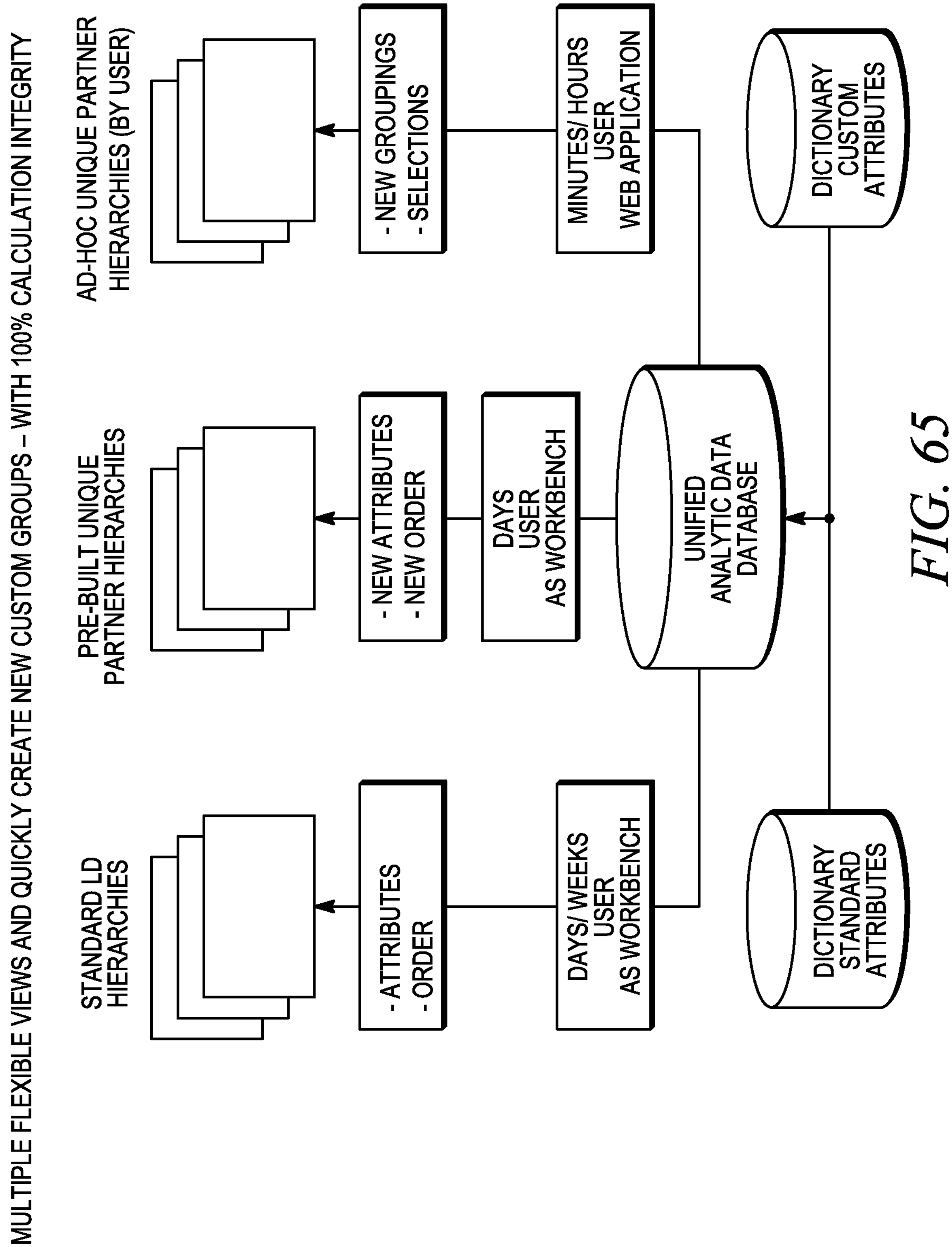
FIG. 65 depicts flexible views enabled by the analytic platform.

Referring to FIG. 65, in embodiments, the unified reporting and solution framework may include on-demand and scheduled reports, automated scheduled report, multi-page and multi-pane reports for guided analysis, interactive drill down, dynamic filter/sort/rank, multi-user collaboration, dashboards with summary views and graphical dial indicators, flexible formatting options—dynamic titles, sorting, filtering, exceptions, data and conditional formatting tightly integrated with Excel and PowerPoint.

In embodiments, the unified reporting and solution framework may provide non-additive measures for custom product groups. The non-additive measures may create custom product groups in minutes, respond faster to new opportunities and provide full measure calculation integrity. In embodiments, the unified reporting and solution framework may eliminate restatements to save significant time and efforts. In addition, the elimination of restatement may create and implement new structures in days, not months, allow data to run immediately and allow multiple hierarchies to exist in parallel.

In embodiments, the unified reporting and solution framework may provide cross-category visibility to spot emerging trends. In embodiments, cross-category visibility may be provided by analyzing competitive advantage as partners expand perspective to adjacent categories, and tailoring aisle views by retail customer at a cluster/store level. In embodiments, the unified reporting and solution framework may provide total market picture. The total market picture may be provided by seeing the overall market picture, SWOT analysis, reviewing whole department/aisle view, identifying competitor portfolio and significant time saving.

In embodiments, the unified reporting and solution framework may provide granular data on demand for viewing detailed retail performance. In embodiments, the granular data on demand may be performed by clustering stores to facilitate neighborhood insights and by ability to develop current ‘analyses’ within Analytic Data platform. In addition, granular data on demand may provide management of store groups dynamically. In embodiments, the unified reporting and solution framework may provide attribute driven analysis for the next level of market insights. The attribute driven analysis may provide viewing new trends and opportunities, attribute mining-geographies and products and custom attributes and groupings.

In embodiments, the unified reporting and solution framework may provide integrated panel, scan and audit on one system for rapid analysis. The integrated panel may provide new insights in shorter time, analysis of trip and lifestage alongside all measures, and full set of disaggregated panel and disaggregated store data.

In embodiments, the unified reporting and solution framework may accelerate analytics work using rapid bulk data extracts. In embodiments, analytic work may provide cementing partner reputation for being first with high quality market analyses, reducing time to extract source data that feeds math models and quickly refining requests based on analytic findings.

In embodiments, the analytic platform may provide consumer and shopper relationship management, new product innovation and launch, consumer-centric retail execution, and Brand building. The consumer and shopper relationship management may include loyalty insights, neighborhood insights, shopper insights, health and wellness insights and consumer tracking and targeting solution. The new product innovation and launch may include emerging category insights and product launch management. The consumer-centric retail execution may include sales performance insights, daily out-of-stock insights, assortment planning solution and store insights. The brand building may include on-demand pricing insights.

In embodiments, the analytic platform may leverage FSP by process census card data and link to panel. In embodiments, leverage may be provided by loyalty insights solution, proprietary data fusion techniques that may blend FSP, HH panel, and Acxiom data to deliver superior shopper segmentation, best in class consumer segmentation models, 100% processing vs. sub-sample enables detailed household level targeting and facilitating manufacturer-retailer collaboration—common language for decisions. Further, in embodiments, FSP data may be isolated from other sources.

In embodiments, the analytic platform may provide fully projected store clusters on the fly including IRI neighborhood insights solution. In embodiments, the IRI neighborhood insights solution may provide clustering of frequent retailer request, segmenting and selecting stores on-the-fly via data or attributes, distribution dynamically—differentiate partner's analysis. In embodiments, the IRI neighborhood insights solution provides core data for consumer-centric merchandising initiatives. In embodiments, clustering of stores may be based on household demographic/ethnicity, local competition, tactic (e.g. Ad-zones) or some other type of clustering.

In embodiments, the analytic platform may provide a clear shopper understanding. The shopper understanding may be provided by shopper insight solutions. In embodiments, shopper understanding may include expectation that partners will lead with shopper understanding, detailed recommendations based on share of basket, ability to offer proprietary models for segmentation—trip type and lifestage, disaggregated dynamic panel solution that always leverages fresh data, and fully integrates with IRI scan data in a single user tool. In embodiments, outcomes may be closer retail relationship and high value-add through innovative or customized analysis.

In embodiments, the analytic platform may provide linking product sales to consumer wellness groups. In embodiments, health and wellness insights solution may provide understanding health and wellness limited to attribute and qualitative research, enhance H&W product attributes by gathering all ingredient data and extend with partner specific product attributes. In embodiments, health and wellness insights solution may provide ailment and attitude to well being attributes for panelists including creating custom groups and hierarchy views across multiple categories and overlay SVC by matching profiles to uncover new insights.

In embodiments, the analytic platform may provide consumer tracking and targeting solution. In embodiments, the consumer tracking and targeting solution may include blending of panel and Acxiom with FSP data. For example, data may include 110,000,000 U.S. households. The household data may be transformed using proprietary IRI segmentation framework. The household data may be scored with personicx codes or profiled with infobase. The household data may be segmented initially for food, drug and mass, linked via personicx code keys. The household data may be segmented on broad products, services and media including consumer packaged goods, linkable consumer durables/services, linkable media behavior data sources and integrate consumer decision tree analytics. The household data may be segmented on all stores including by retailer, stores clusters and stores and best in class store trading area methods. The household data may be segmented on all time periods including by trip, by day, by week, by period.

In embodiments, the analytic platform may provide emerging category insights and/or new product insights. In embodiments, attribute trends may provide unique perspectives such as pack, flavor, launch year and the like. In embodiments, the analytic platform may provide unified view of emerging trends across countries, develop KPI's for partners, and identify buyer characteristics and addition of new attribute.

In embodiments, the analytic platform may provide predicting of new product success. In embodiments, a product launch optimization solution may provide IRI solution that allows real-time monitoring, initial data modeled to accurately forecast product's destiny that allows partners to re-apportion funds, new products/items and simple comparisons and automated predictive solutions based on benchmarking 1000's of products in multiple geographies.

In embodiments, the analytic platform may provide real-time sales reporting by sales optimization solutions. In embodiments, the sales optimization solutions may provide input for current targets and tailor reporting structure to mirror yours, offers management of all reporting, built-in same store sales analysis and quick adaptable structure to changes in organization or retailer M&A activities.

In embodiments, the analytic platform may provide field sales to address OOS in real time. In embodiments, daily OOS insight solution may provide completely automated solution for chronic OOS—global solution, integrate with shipment and space information for root cause analysis, event planning/analysis, merchandizing/day of week and new product launch.

In embodiments, the analytic platform may provide assortment planning and optimization solution. In embodiments, assortment planning and optimization solution may provide ability to drive down to individual store level, fully-automated process from planning to execution, integration with price, promotion, and space planning solutions, scenario comparison, and financial analysis on-the-fly.

In embodiments, the analytic platform may provide total store insight solution. In embodiments, the total store insight solution may provide custom audit groups created and analyzed 'on-the-fly', new measures and comparisons can be added in seconds without the need to re-run and increased automation and access to more users.

In embodiments, the analytic platform may provide on-demand pricing insights solution. The on-demand pricing insights solution may provide instant analysis for any/all products on demand including sales and marketing access to store-level price and compliance in minutes, integrated analysis, finding the stores where you need to act and valuable pricing applications with trade promotions and new products.

In embodiments, the data analytic platform may provide information management. The information management may include analytic data, flexibility structure, performance and ease of use, open data and technical architecture, analytic data and the like.

In embodiments, the data analytic platform may provide flexibility and structure. The flexibility may provide multiple hierarchies in same database, rapidly create new custom hierarchies/views, rapidly add new measures, any number of dimensions (attributes, demographics, etc.), and rapidly add new data sources and attributes. In embodiments, the structure may provide publishing/subscribing reports to broader user base, multiple user classes with different privileges, and extensive security access controls to data integration LDAP/SSO infrastructure.

Referring to FIG. 65 the data analytic platform may include an IRI analytic data database. The IRI analytic data database may be connected with a dictionary standard attributes and a dictionary custom attributes. The IRI analytic data database may be associated with multiple workbench's including day/week as workbench, days as workbench, minutes/hours as workbench. In embodiments, day/week as workbench may be associated attributes, order and may provide standard LD hierarchies. In embodiments, days as workbench, may be associated with new attributes, new order and may provide pre-build unique partner hierarchies. In embodiments, minutes/hours as workbench may be associated new grouping, selections and may provide ad-hoc unique partner hierarchies.

In embodiments, the multi-source data master data management may provide analytic data master data management solution that provide a single master data dictionary for data attributes standardized measure definitions across data providers, products and stores may be matched across attributes including partner defined attributes, changes to dimensions tracked over time, harmonization may occurs before aggregation and projection which improves accuracy and consistency across providers, solution based on WPC & information server and IRI MDM solution can be hosted and operated by Kraft or 3rd party to process non-cooperative data vendors.

Figure 66:
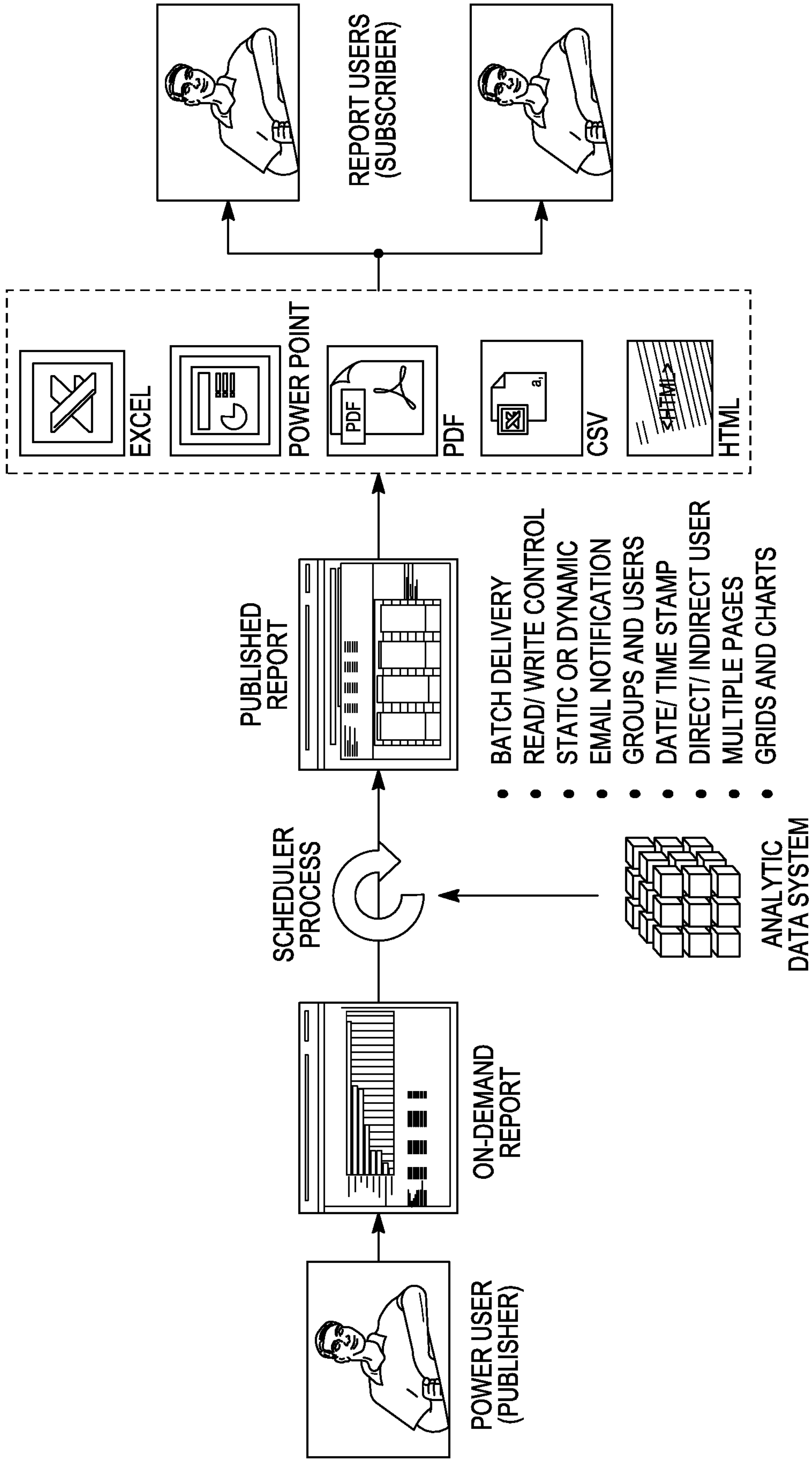
FIG. 66 depicts integrated report publishing.

Referring to FIG. 66, in embodiments, data analytic system may be associated with scheduler process. The scheduler may provide published report or on-demand reports relating to batch delivery, read/write control, static or dynamic, email notification, groups and users, date/time stamp, direct/indirect user, multiple pages and grids and charts and the like. In embodiments, the published report may be in different formats such as excel, PowerPoint, pdf, cvs, html or some other format. The published or on-demand reports may be displayed to the user.

In embodiments, the information management may provide performance and ease of use. In embodiments, the performance may be provide proven query performance for TB-sized system=a few seconds, demonstrated hands-on live system to numerous users, leading-edge hardware and software platform, unique data structure optimizations provide 5× to 30× increase, system horizontally scalable at each tier, patented multi-user cache mechanism, system proven on 24 tb database, and will be scaled further. In embodiments, the ease of use may provide world-class web application for integrated analysis, seamless integration with ms office, single tool set for all data types (IRI, 3rd Party, Kraft-Internal), built-in web collaboration capabilities and zero footprint web platform (i.e. 6.0+).

In embodiments, analytic data may be based on DB platform. The DB platform may provide a high-end commercial grade data foundation. In addition to this, the solution may implement several fundamental optimization methods to deliver on-demand query performance for TB-sized data sets.

Figure 67:
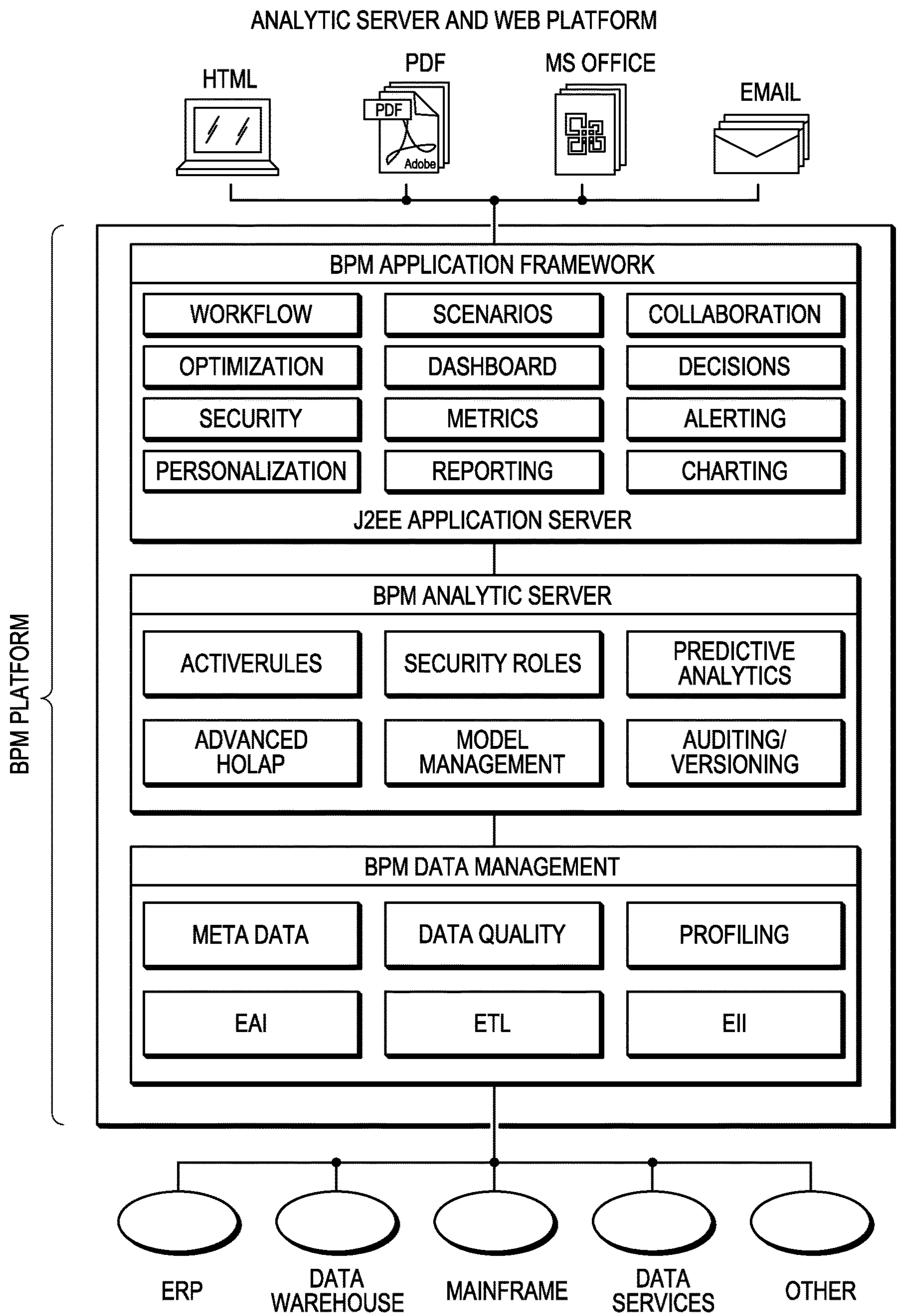
FIG. 67 depicts an analytic server and web platform.

Referring to FIG. 67, a BPM platform is shown. The platform includes BPM application framework, BPM analytic server and a BPM data management. The BPM application framework may include workflow, scenarios, collaboration, optimization, dashboard, decisions, security, metrics, altering, personalization, reporting, charting and the like. The BPM analytic server may include active rules, security roles, predictive analytics, advanced HOLAP, model management, auditing/versioning and the like. The BPM data manage may include metadata, data quality, profiting, EAI, ETL, EIT and the like. In embodiments, the BPM platform may provide browser based, zero client portal integration (JSR 168), extensive MS Office integration, IHS for HTTP/S compression, Role/user/group based security w/ LDAP, personalization and self-service wizards, web services enabled (MDX, SOAP/XML), integrated scheduler for alerts and reports, J2EE App Server platform, model-centric rule-based processing, multi-user cache and optimization, read-write decision processing, model-to-model for extreme scalability, 64-bit Linux and Solaris support, access multiple heterogeneous sources, relational and non-relational data, web-based data loading and mapping, advanced attribute mapping and dimension and hierarchy management In embodiments, unified reporting and solution framework may be provided. The unified reporting and solution framework may provide on-demand and scheduled reports, automated scheduled report delivery, multi-page and multi-pane reports for guided analysis, interactive drill down/up, swap, pivot, dynamic filter/sort/rank, and attribute filtering, multi-user collaboration and report sharing, dashboards with summary views and graphical dial indicators, flexible formatting dynamic titles, sorting, filtering, exceptions and tightly integrated with excel and PowerPoint and the like.

In embodiments, seamless integration with other applications such as MS Office may be provided. The seamless integration with other applications may provide zero refresh—instant access to your data, tight integration with excel and PowerPoint for user friendly data access and manipulation, advanced analytic reporting capabilities, integrated with advanced data selection, flexible formatting options—dynamic titles, sorting, filtering, exception highlighting, dynamic data and conditional formatting and shared web repository—reports and custom objects stored directly on web repository.

In embodiments, open data and tech architecture may be provided. The open data and tech architecture may support partner best-of-breed data strategy including minimizing dependency on proprietary data structures, minimizing exposure to 3rd party database or network, minimizing coordination of restatements and minimizing need to acquire specialized data sets. In embodiments, the open data and tech architecture may support open technology standards that may provide APIs at each tier (ODBC/JDBC, MDX, SOAP/XML), commercial database tools (high-end), feeding existing partner marketing and sales applications and feeding partner enterprise (SAP) systems using standard connectors.

Figure 68:
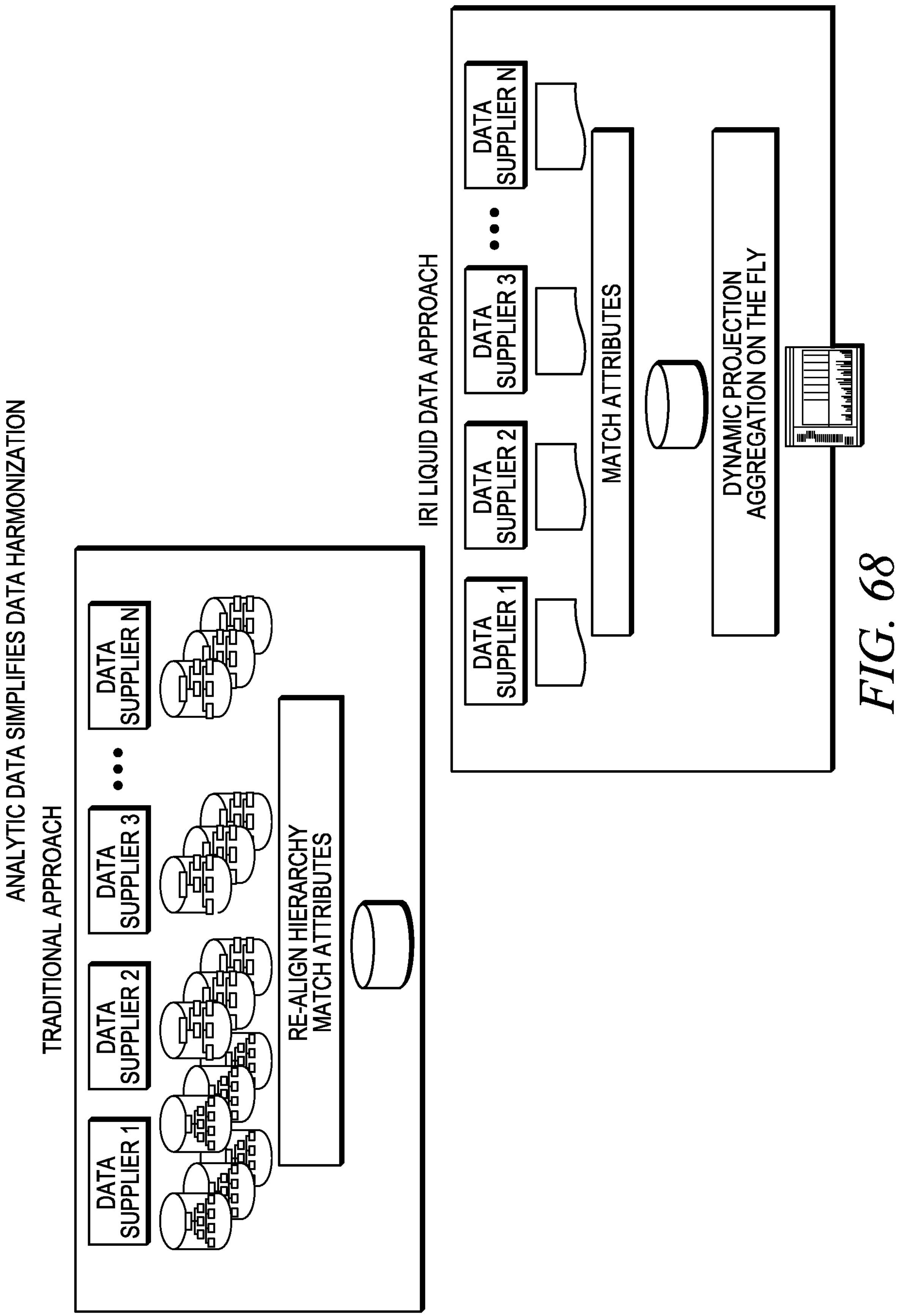
FIG. 68 depicts data harmonization using the analytic platform.

In embodiment, the analytic data may simplify data harmonization. Referring to FIG. 68, in traditional approach multiple data suppliers may receive data feed from multiple data sources. The multiple data source feed may re-align hierarchy match attributes from the repository. In embodiments, an improved IRI liquid data analytic approach is shown. The approach provides multiple suppliers associated with repository that may provide matching of attributes and dynamic projection aggregation on the fly. In embodiments, number of databases processed may be significantly reduced (10× reduction), data providers may deliver raw fact data instead of projected aggregated data, processing of raw fact data reduces harmonization to attribute matching problem, standardization and timed delivery across multiple data providers is not required and category definitions and new product placements may be quickly adjusted without restatements, harmonization occurs before aggregation and projection which improves accuracy and consistency across providers.

Figure 69:
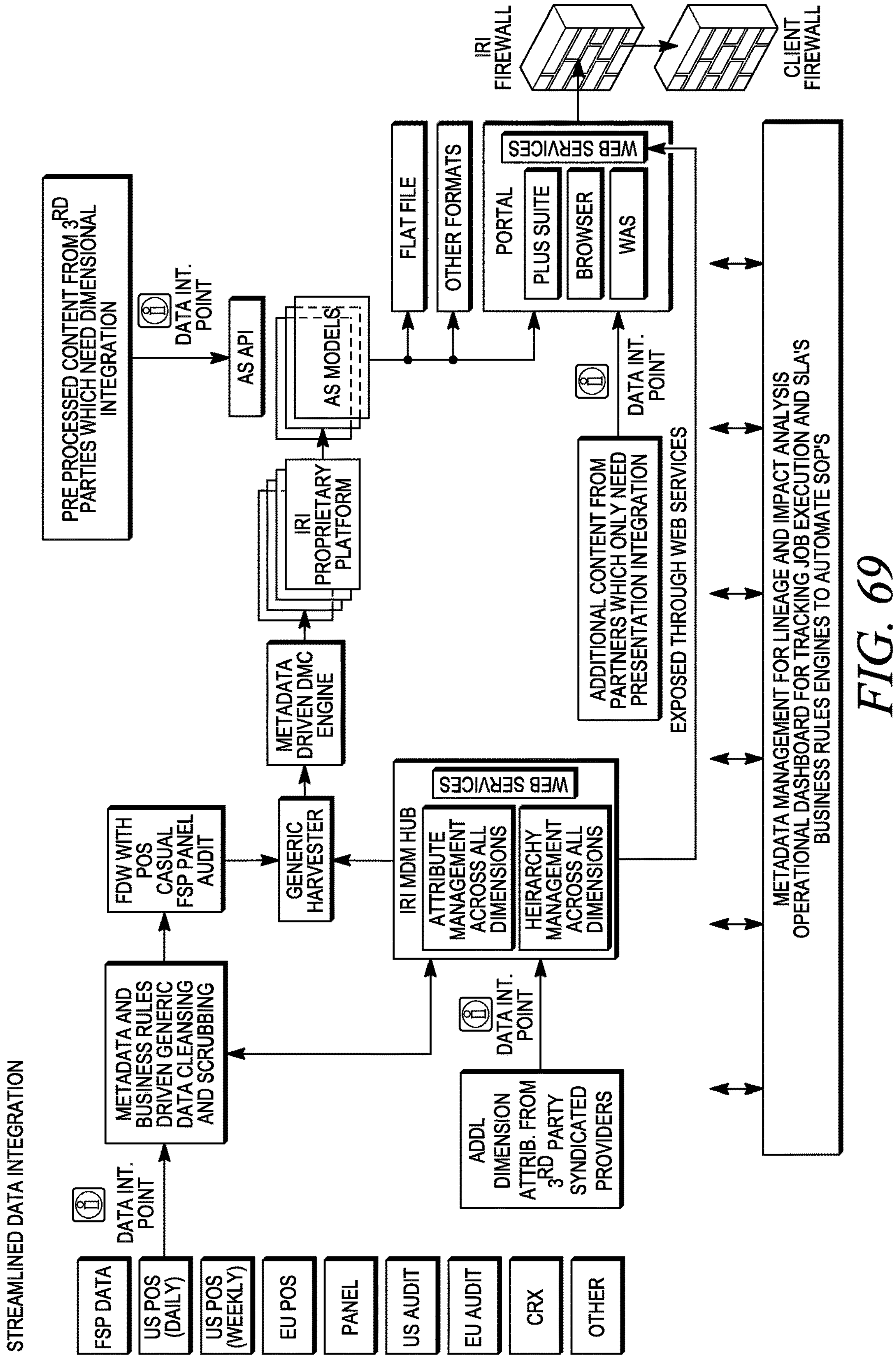
FIG. 69 depicts streamlined data integration using the analytic platform.

Referring to FIG. 69, in embodiments, streamlined data integration may be provided. The process may be associated with metadata management for lineage and impact analysis, operational dashboard for tracking job execution and SLA's and business rule engines to automate SOP's. The process may start with data integration point associated FSP data, US POS daily, US POS weekly, EU POS, panel, US audit, EU audit, CRX or some other type of data integration. The data integration may be interfaced with metadata & business rules driven generic data cleaning and scrubbing. The metadata & business rules driven generic data cleaning and scrubbing may be associated with IRI MDM HUB and FDW with POS, causal, FSP, Panel and audit and the like. The IRI MDM HUB may include attribute management across all dimensions, Hierarchy management across all dimensions and web services. The IRI MDM HUB and FDW with POS, causal, FSP, Panel and audit may be linked to generic harvester. The generic harvester may be linked to metadata driven DMC engine that may further be linked to multiple IRI propriety platform. The IRI propriety platform may be linked AS module that may be associated with flat file, other format and portal. The AS models may also be associated with pre-processed content from 3 rd parties through an AS API. The portal may include plus suite, browser, WAS, web services and may receive inputs from IRI MDM HUB and partners in form of additional content from partners which may need presentation integration.

In embodiment, a forecast and trend may be provided the analytic platform for sales performance data. The platform may also provided revised volume for history weeks and may show actual data for sales performance data. In embodiments, a forecast may be projected for plan, trend & revised volumes.

Figure 70:
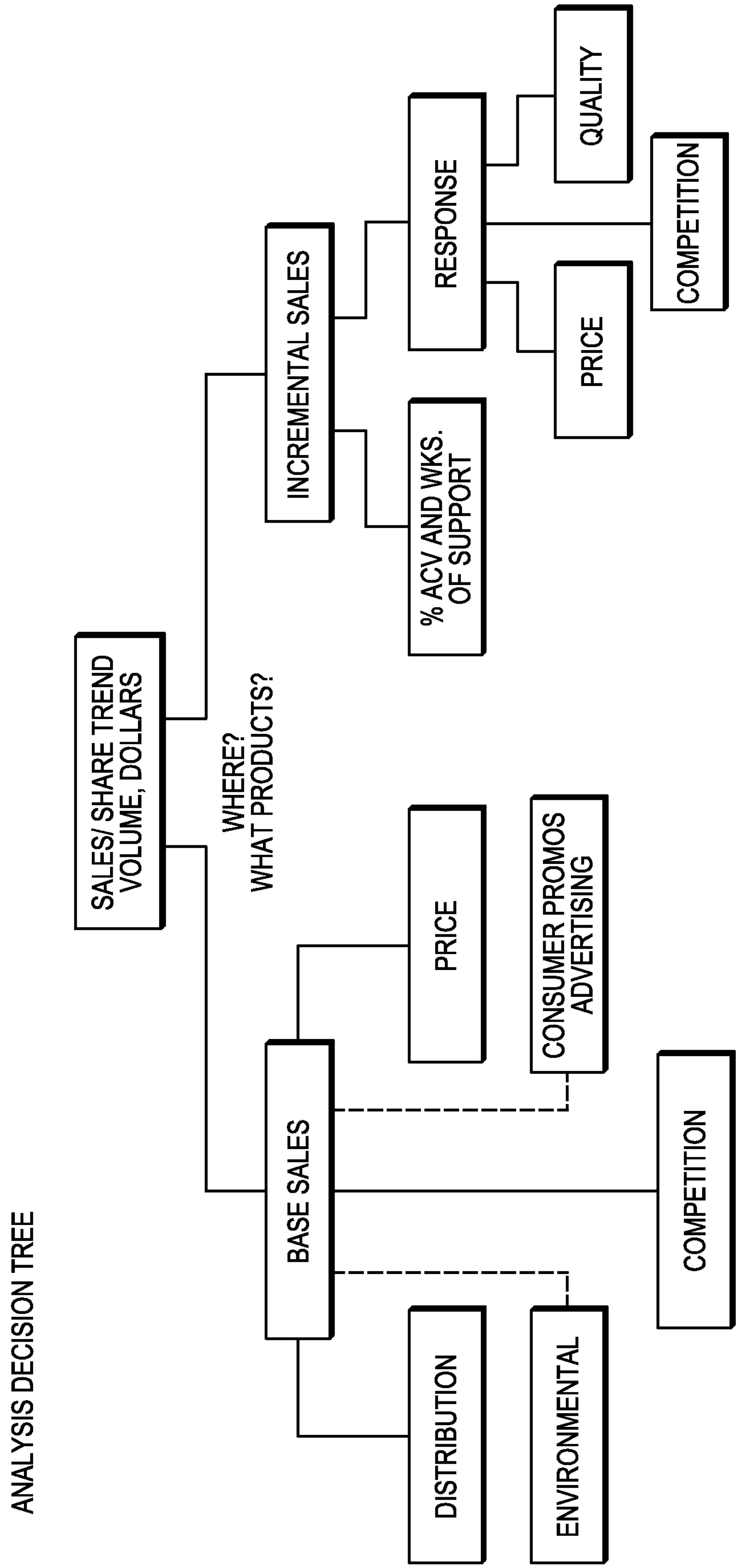
FIG. 70 depicts an analytic decision tree.

For a successful analysis for brand reporting, it may be useful to have a framework. Referring to FIG. 70, the framework may be an analysis decision tree. The analysis decision tree may depict the key variables that may influence a product's trend.

In embodiments, a category or a brand reporting may include a high level analysis. For example in the high level analysis for sales, a status for sales may be determined by various variables such as a nationality, a channel, a category or a product segment, a brand, or some other type of variable. The analysis may further involve analyzing the trends for the category, the segment, or the brand. For example, a trend between the category performance and the brands may be analyzed. Another example may involve analyzing category performance across various segments. Yet another example may be to determine category seasonality and comparing it to the sales trend for the segments, brands, and items. In embodiments, presence of regular promotional periods or spikes may be established and this may be analyzed with the promotion periods for the brands and the items. Further, in embodiments, the analysis may be performed to determine a fastest-growing or a fastest-declining channel. In embodiments, a targeted or a focused analysis may be performed for the brand reporting. This may be useful in analyzing the impact of sales by various variables such as by a market, a retailer, a product, or some other type of variables. In embodiments, the analysis by a product may be by a product size, an item, or some other type. In embodiments, a root cause or due-to analysis may be performed for the brand reporting. The root cause analysis may be based on variables such as base sales, incremental/promoted sales. Further, in embodiments the incremental sales may be based on a merchandising type. In an aspect of the invention, the root cause analysis for the base sales may further be based on variables such as a distribution, price, competitive activity, a new product activity, cannibalization, advertising and couponing. For example, the root cause analysis based on distribution variable may be used to determine information such as the type of products that may be losing or gaining distribution in a market, the type of distribution change. Further, the root cause analysis based on distribution variable may be used to determine new items that may be gaining distribution, items that may be phased out, distribution opportunities, changes in the number of items. The distribution analysis for changes in number of items may further be analyzed for variables such as category/category segment, key brands. In embodiments, the root cause analysis for the base sales based on pricing may include analysis for price changes. For example, the price for a commodity may vary by geography, or an account. Further, a price gap may be determined and analyzed against competitors and private labels. A clear price segment may also be determined to compare its performance against other price segments. Also, pricing analysis may be performed to compare high price to low price gaps and base to promoted price gap. In embodiments, the competitive activity analysis may be performed to determine competitive brands that are gaining share and distribution in the market. Further, the competitive activity analysis may be performed to determine information such as new items that may be responsible for the growth of the brands, competitors that are gaining items per store, change in pricing by the competitors, change in merchandising, growth in competitive activity based on category and share, and other such type of information. In embodiments, the new product activity analysis for base sales may include information such as type of new items, areas of performance for new items (markets, accounts), number and distribution of Stock Keeping Units (SKUs), trial sizes and their performance, comparison of new item rates and sales with existing items, level and type of merchandising support available, items that are losing distribution, existing items that are de-listed, and some other type of information.

In embodiments, the root cause analysis for the incremental sales may further be based on variables such as feature advertising, display activity, temporary price reductions, and other type of variables. In embodiments, the feature advertising analysis for incremental sales may further be performed to determine information such as a level of feature support (ACV, Weeks of Support), type and quality of features used, average price, time for featuring, response rates to features, competitive feature activity, and other such type of information. In embodiments, competitive feature price and response may be compared to the analyzed brands. In embodiments, the display activity analysis for incremental sales may include information on the level of display support, commonly used display locations, average time and time of displays, response rates of displays, response rates of displays in combination with the features, competitive display activity, comparison of competitive display and feature display against the analyzed brands, and some other type of information. In an embodiment, the price reduction analysis for incremental sales may include information such as level of TPR support (ACV, Weeks of Support), an average depth of price reductions, response rates to TPRs, competitive price reduction activity, comparison of competitive price reduction against the analyzed brands, and some other type of information.

Conventionally, stores may be profiled in accordance with traditional block groups based method (200-500 households). However, zip codes may be too large for targeting. In an embodiment, the stores may be profiled based on Household demographics within a local trading area. In embodiments, the household demographics may include, education level (various), income, marriage status, ethnicity, vehicle ownership, gender, adult population, length in residence, household size, family households, population, population density, life stage segment (multiple), age range in household, children's age range in household, number of children and adults, household income, homeowner, renter, credit range of new credit, buyer categories, net worth indicator, and some other type of demographics. For example, a store may be profiled for consumers within x minute driving distance.

The analytic platform may provide for a plurality of components, such as core data types, data science, category scope, attribute data, data updates, master data management hub, delivery platform, solutions, and some other type of components. Core data types may include retail POS data, household panel data, TRV data, model data stores, CRX data, custom store audit data, and some other type of core data types. Data science may include store demo attribution, store competition clustering, basic SCI adjustment, Plato projections, releasability, NBD adjustment, master data integration methods, and some other type of data science. Category scope may include review categories, custom categories, and a subset of categories, all categories, and some other type of category. Attribute data may include InfoBase attributes, Personix attributes, Medprofiler attributes, store attributes, trip type coding, aligned geo-dimension attributes, releasability and projection attributes, attributes from client specific hierarchies, web attribute capture, global attribute structure and mapping, and some other type of attribute date. Data updates may include POS, panel, store audit, and some other type of data updates. Master data management hub may include basic master data management hub system, attribute cleaning and grouping, external attribute mapping, client access to master data management hub. Delivery platform may include new charts and grids, creation of custom aggregates, enhanced scheduled report processing, solutions support, automated analytic server model building, user load management, updated word processing integration, fully merged platform, and some other type of delivery platform. Solutions may include sales performance, sales and account planning, neighborhood merchandizing, new product performance, new product planning, launch management, enhanced solutions, bulk data extracts, replacement builders, market performance solution, market and consumer understanding, price strategy and execution, retailer solutions, and some other type of solutions.

For example, for a company the key sales processes of a company may be strategic planning, consumer and brand management, new product innovation, supply chain planning, sales execution, and demand fulfillment. Further, consumer and brand management may include processes such as consumer and category understanding; brand planning, marketing and media strategy, price strategy and execution. The new product innovation may include processes such as product planning, idea generation, product development, package development, and launch management. Similarly, sales execution may include account planning, sales force management, neighborhood merchandising, trade promotion management, and broker management. In embodiments, the analytic platform may provide solutions with focus on market performance, new product performance, and sales performance.

Figure 71:
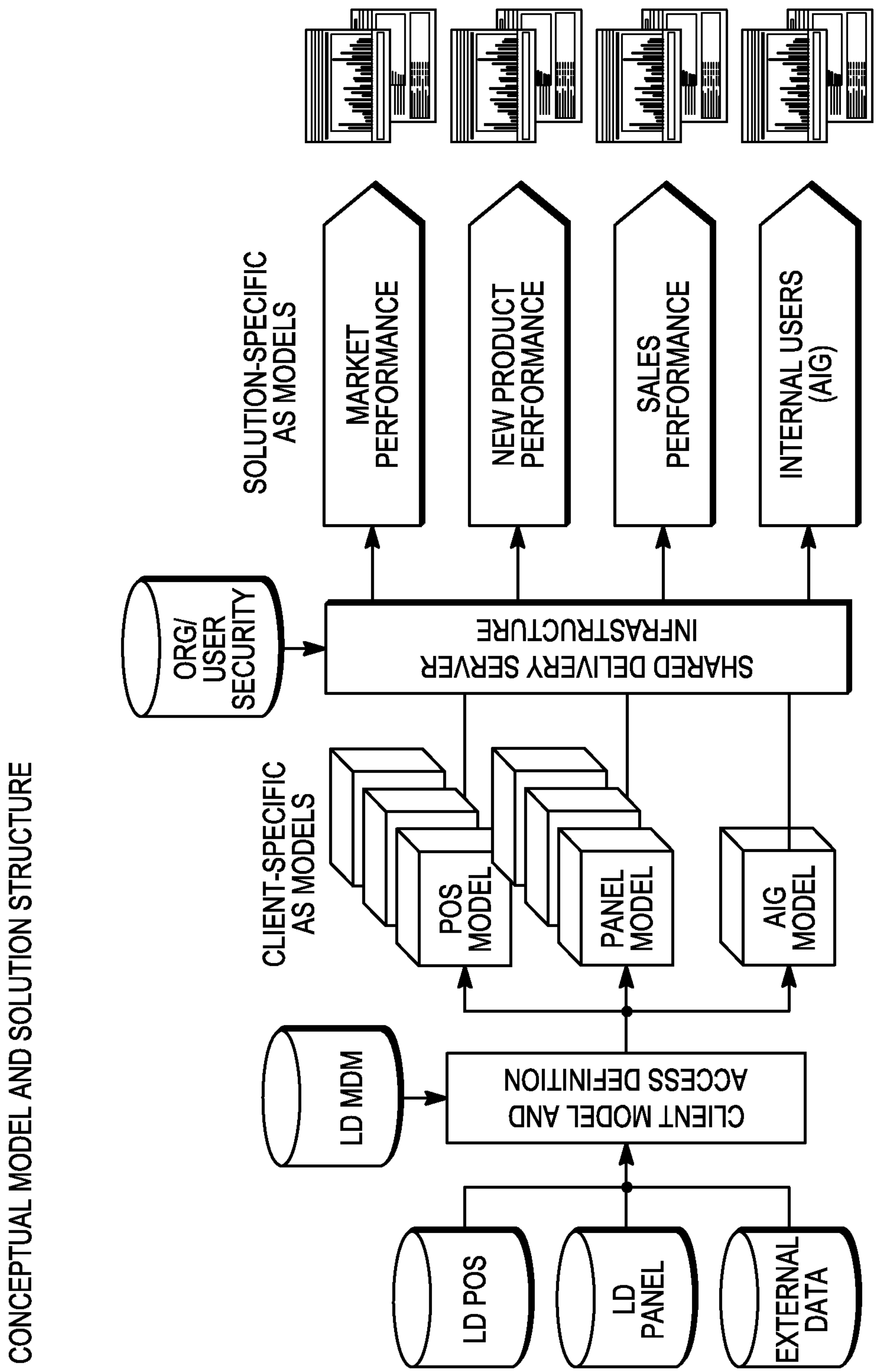
FIG. 71 depicts a solution structure.

Referring to FIG. 71, a model and solution structure may be provided. The new product performance solution may provide new product organizations and a CPG brand with advanced performance planning and analysis capabilities to drive improved new success. In embodiments, the new product planning may include portfolio analysis, hierarchies by release year, product attribute trend analysis, new product metrics (pace setters), track actual vs. plan (volume and distribution account and total, weekly) forecast current quarter sales, innovation type attribute, prediction of $1^{st}$ year sales volume, and integrate promo and media plans. In embodiments, a launch management may include tracking sales rate index, new product alerts, product success percentile and trend, track trial and repeat performance, sales variance drivers analysis, relative time launch-aligned view, rapid product placement process, track trial and repeat.

In embodiments, the sales performance solution may provide CPG sales organizations with advanced sales performance, planning, and analysis capabilities to drive improved sales execution at store level. In embodiments, the sales performance solution may include sales and account planning and neighborhood merchandising. In embodiments, the sales and account planning may include track actual vs. plan (brand/account/quarter/sales volume), key accounts (non-projected), sales organization model mapped vs. retailer stores, key accounts and regions/markets, sales team benchmarking, enhanced plan data entry user interface, and forecast current quarter sales. In embodiments, the neighborhood merchandising may include competitive store clusters (WM), demographic store clusters, sales variance drivers analysis, same store sales analysis. In embodiments, the market performance solution may provide CPG market research and analyst organizations with advanced market analysis and consumer analysis capabilities with superior integrated category coverage and data granularity in a single high performance solution. In embodiments, the market performance solution may include consumer and category and price strategy and execution. In embodiments, the consumer and category may include cross category analysis, cross category attribute trends, multi-attribute cross tab analysis, total market view, shopper segments (life stage, core shoppers, product buyers), trip type analysis, MedProfiler integration. In embodiments, price strategy and execution may include store level price analysis and additional functionality. The analytic platform may provide a bulk data extract solution. In this solution, data may initially flow from the analytic platform to a plurality of modeling sets. A data selector may then aggregate data for bulk data extraction into analytic solutions and services. Components of the bulk data extraction solution may include manual bulk data extraction, specific measure set and casuals, enabled client stubs, custom aggregates for product dimension, incorporation of basic SCI adjustments, adding additional causal fact sets, batch data request API, and incorporation of new projections In embodiments, analytic platform solutions may have deliverables, with solution components such as solution requirements, core analytic server model, analytic server model extension, workflows and reports, sales demonstrations, summit demonstrations, additional demonstration data, sales and marketing materials, user interaction modes, solution deployment, end user documents, data and measure QA, PSR testing, and some other type of analytic platform solutions. The solution deliverables may include client solutions, such as new product performance, sales performance, market performance, or the like, which may include a number of elements, such as process scope, specifications, new product plans, sales data sheets, and some other type of solution deliverables. The solution deliverables may also include core models solutions, such as POS models, panel models, and some other type of core model solutions.

The analytic platform 100 may include consumer level tracking capability that may facilitate promotion evaluation, such as promotion event evaluation. In addition to evaluating casual conditions associated with a promotion, the analytic platform 100 may leverage special casual data collected through in-store collection facilities and traffic data to provide a robust evaluation that extends to a variety of customer segments. The evaluation may facilitate characterizing which consumers reacted to the promotion. The evaluation may facilitate determining if store loyal customers reacted, or if competitor loyal customers were drawn by the promotion. The evaluation may also facilitate determining if the promoted brand loyal customers reacted, or if other brand loyal customers were drawn to the promotion. In this way, the analytic platform 100 may facilitate a deeper understanding of the effect of a promotion than just quantifying the general 'lift' associated with it. One aspect of the methods and systems of the platform that may facilitate promotion event evaluation is the fusing of disparate data source datasets, such as panel data, fact data, and dimension data into a dataset that can be analyzed more deeply. In an example, combining trip mission typology with promotion event results may facilitate understanding the impact of the promotion on the typology and/or the impact of the typology on the promotion results. Promotion evaluation with the analytic platform 100 may provide results that are timely and actionable at a fine consumer granularity.

Figure 72:
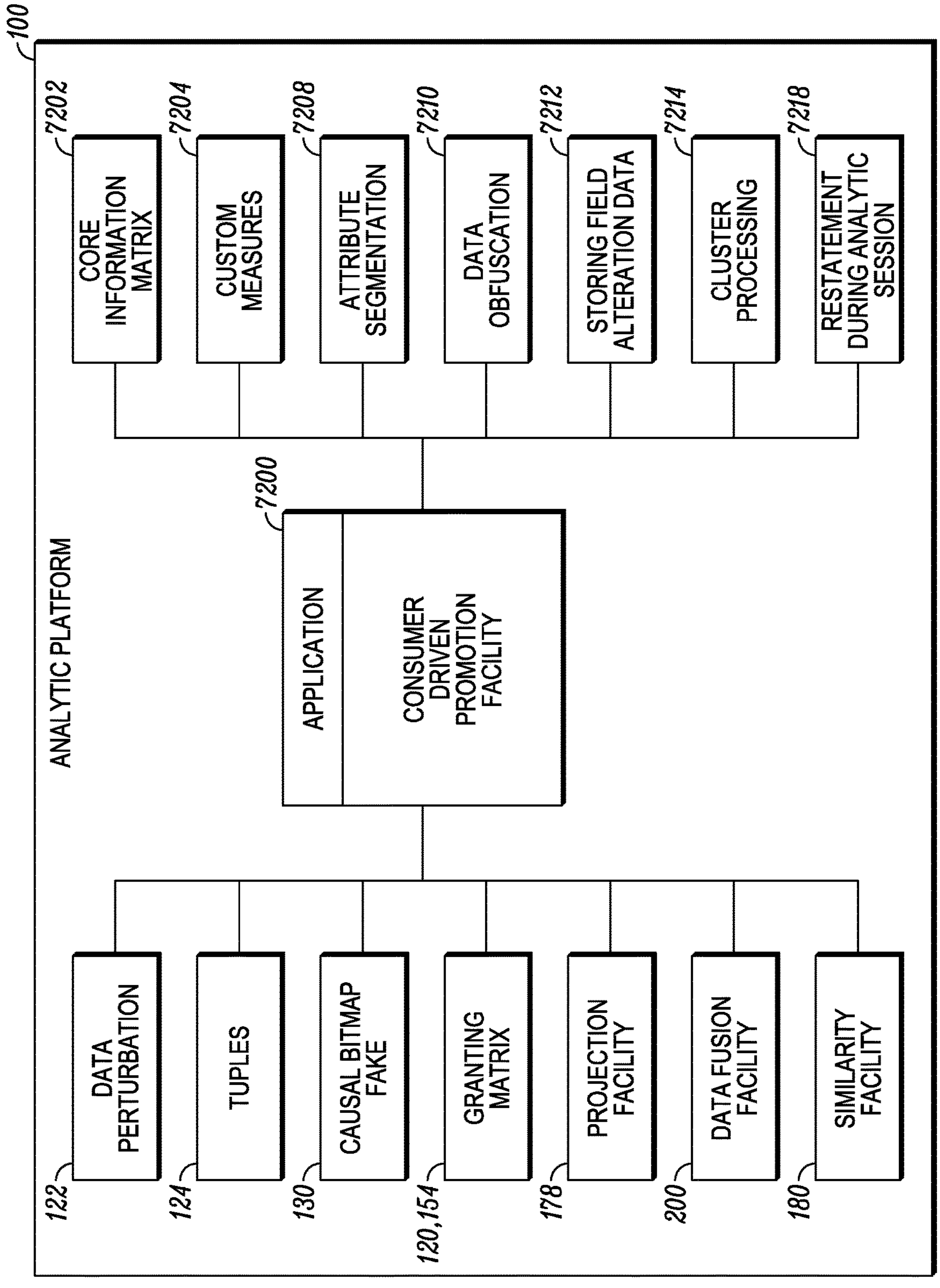
FIG. 72 depicts a consumer driven promotion application.

Referring to FIG. 72 which depicts consumer driven promotion evaluation as may be performed by aspects of the analytic platform 100, a data fusion facility 178 that may be associated with the analytic platform 100 may receive one or more panel data source datasets 198, one or more fact data source datasets 102, one or more dimension data source datasets 104. The data fusion facility 200, as herein described, may associate the received datasets with a standard population database. The datasets received by the data fusion facility 200 may be fused into a consumer panel dataset based at least in part on an encryption key, wherein the encryption key embodies at least one association between the standard population database and the datasets received in the data fusion facility 200. A promotion event may be associated with the fused consumer panel dataset and the analytic platform 100 may analyze the fused consumer panel dataset to determine consumer responses to the promotion event. The fused consumer panel dataset may be segmented, providing segmented analytic results; the segmenting based, at least in part, on the analysis of the fused consumer panel dataset. The segmented analytic results may be presented within a user interface 182 that may be associated with the analytic platform 100.

The promotion event may include one or more of a price reduction (e.g. product price reduction), an in-store display, a coupon, an in-store program, and the like. The promotion event may include an advertisement, including an advertisement for television, radio, print, a trade publication, the Internet, a billboard, interaction, and the like. Alternatively, the promotion event may relate to a media type. The promotion event may include a change of a promotion characteristic, or may be a combination of promotion characteristics. The promotion event may be a change in intensity of a promotion, such as a frequency of advertisement placement, size of the promotion (e.g. area of a print or Internet advertisement), advertisement duration, and the like.

The analytic results may be summarized in a report. The report may be presented to a user in the user interface 182. The report may also be generated on-demand or scheduled, such as for automated delivery. The report may be a management scorecard. The report may be multi-page, multi-pane, or may be published in a user-selected format (e.g. ".doc", ".ppt", ".csv", ".pdf", and HTML). The user-selected format may be determined by a report publisher or may be determined by a subscribed user. The report may be distributed to a subscribed user or a plurality of subscribed users, or distributed in a batch delivery. The report may be distributed with a read/write control setting that may be determined automatically, by the publisher, or by a report type. The report may be associated with a user group.

In embodiments, non-unique values in a data table may be found, where the data table may be associated with a consumer promotion data set. The non-unique values may be perturbed to render unique values; and the non-unique value may be used as an identifier for a data item in the consumer promotion data set, where the consumer promotion data set may be used for an analytic purpose relating to modeling the effect of a promotion on consumer behavior with respect to a proposed new product.

In embodiments, a projected facts table may be taken in a consumer promotion data set that has one or more associated dimensions. At least one of the dimensions to be fixed may be selected, where the selection of a dimension may be based on an analytic purpose relating to modeling the effect of a promotion on consumer behavior with respect to a proposed new product. In addition, an aggregation of projected facts may be produced from the projected facts table and associated dimensions, where the aggregation may fix the selected dimension for the purpose of allowing queries on the aggregated consumer promotion data set.

In embodiments, a plurality of data sources having data segments of varying accuracy may be identified, where the data sources may contain data relevant to an analytic purpose relating to modeling the effect of a promotion on consumer behavior with respect to a proposed new product. A plurality of overlapping data segments may be identified among the plurality of data sources to use for comparing the data sources. A factor may be calculated as a function of the comparison of the overlapping data segments. In addition, the factor may be applied to update a consumer promotion data set containing at least one of the data sources.

In embodiments, a data field characteristic of a data field in a data table of a consumer promotion data set may be altered, where the alteration generates a field alteration datum. The field alteration datum may be associated with the alteration in a data storage facility may be saved. A query requiring the use of the data field in the consumer promotion data set may be submitted, where a component of the query consists of having read the field alteration data and the query relates to an analytic purpose related to modeling the effect of a promotion on consumer behavior with respect to a proposed new product. In addition, the altered data field may be read in accordance with the field alteration data.

In embodiments, a consumer promotion data set may be stored in a partition within a partitioned database, where the partition may be associated with a data characteristic of the consumer promotion data set. A master processing node may be associated with a plurality of slave nodes, where each of the plurality of slave nodes may be associated with a partition of the partitioned database. An analytic query relating to modeling the effect of a promotion on consumer behavior with respect to a proposed new product to the master processing node may be submitted. In addition, the query may be processed by the master node assigning processing steps to an appropriate slave node.

In embodiments, a consumer promotion data set may be received, where the consumer promotion data set may include facts relating to items perceived to cause actions, where the consumer promotion data set includes data attributes associated with the fact data stored in the consumer promotion data set. A plurality of the combinations of a plurality of fact data and associated data attributes may be pre-aggregated in a causal bitmap. A subset of the pre-aggregated combinations may be selected based on suitability of a combination for an analytic purpose relating to modeling the effect of a promotion on consumer behavior with respect to a proposed new product. In addition, the subset of pre-aggregated combinations may be stored to facilitate querying of the subset.

In embodiments, an availability condition associated with a data hierarchy in a database may be specified, where the data hierarchy may include a consumer promotion data set, where the availability condition may relate to the availability of data in the consumer promotion data set for an analytic purpose relating to modeling the effect of a promotion on consumer behavior with respect to a proposed new product. The availability condition may be stored in a matrix; and the matrix to determine assess to the consumer promotion data set in the data hierarchy may be used. A dimension may be fixed but may allow flexible queries.

A consumer promotion data set having a plurality of dimensions may be taken. A dimension of the consumer promotion data set may be fixed for purposes of pre-aggregating the data in the consumer promotion data set for the fixed dimension, where the fixed dimension may be selected based on suitability of the pre-aggregation to facilitate rapidly serving an analytic purpose relating to modeling the effect of a promotion on consumer behavior with respect to a proposed new product. In addition, an analytic query of the consumer promotion data set may be allowed, where the query may be executed using pre-aggregated data if the query does not seek to vary the fixed dimension and the query may be executed on the un-aggregated consumer promotion data set if the query seeks to vary the fixed dimension.

In embodiments, a panel data source data set may be received in a data fusion facility. A fact data source data set in a data fusion facility may be received. A dimension data source data set may be received in a data fusion facility. An action may be performed in the data fusion facility, where the action associates the data sets received in the data fusion facility with a standard population database. In addition, data from the data sets received in the data fusion facility may be fused into a new fused consumer promotion data set based at least in part on a key, where the key embodies at least one association between the standard population database and the data sets received in the data fusion facility, where the consumer promotion data set may be intended to be used for an analytic purpose relating to modeling the effect of a promotion on consumer behavior with respect to a proposed new product.

In embodiments, a classification scheme associated with a plurality of attributes of a grouping of items in a consumer promotion data set may be identified. A dictionary of attributes associated with the items may be identified. A similarity facility may be used to attribute additional attributes to the items in the consumer promotion data set based on probabilistic matching of the attributes in the classification scheme and the attributes in the dictionary of attributes. In addition, the modified consumer promotion data set may be used for an analytic purpose relating to modeling the effect of a promotion on consumer behavior with respect to a proposed new product.

In embodiments, certain data in a consumer promotion data set may be obfuscated to render a post-obfuscation consumer promotion data set, access to which may be restricted along at least one specified dimension. In addition, the post-obfuscation consumer promotion data set may be analyzed to produce an analytic result, where the analytic result may be related to modeling the effect of a promotion on consumer behavior with respect to a proposed new product and may be based in part on information from the post-obfuscation consumer promotion data set while the restricted data may be kept from release.

In embodiments, an analytic platform may be provided for executing queries relating to an analytic purpose relating to modeling the effect of a promotion on consumer behavior with respect to a proposed new product. A consumer promotion data set may be received in the analytic platform. A new calculated measure may be added that may be associated with the consumer promotion data set to create a custom data measure, where the custom data measure may be added during a user's analytic session. An analytic query requiring the custom data measure during the user's analytic session may be submitted. In addition, an analytic result may be presented based at least in part on analysis of the custom data measure during the analytic session.

In embodiments, a new data hierarchy associated with a consumer promotion data set may be added in an analytic platform to create a custom data grouping, where the new data hierarchy may be added during a user's analytic session. In addition, handling of an analytic query relating to modeling the effect of a promotion on consumer behavior may be facilitated with respect to a proposed new product that uses the new data hierarchy during the user's analytic session.

In embodiments, a consumer promotion data set may be taken and desired to obtain a projection for an analytic purpose relating to modeling the effect of a promotion on consumer behavior with respect to a proposed new product. A core information matrix may be developed for the consumer promotion data set, where the core information matrix may include regions representing the statistical characteristics of alternative projection techniques that can be applied to the consumer promotion data set. In addition, a user interface may be provided whereby a user can observe the regions of the core information matrix to facilitate selecting an appropriate projection technique.

In embodiments, a consumer promotion data set may be taken from which it may be desired to obtain a projection, where a user of an analytic platform may select at least one dimension on which the user wishes to make a projection from the consumer promotion data set, where the projection being for an analytic purpose relating to modeling the effect of a promotion on consumer behavior with respect to a proposed new product. A core information matrix may be developed for the consumer promotion data set, where the core information matrix including regions representing the statistical characteristics of alternative projection techniques that can be applied to the consumer promotion data set, statistical characteristics that may include relating to projections using any selected dimensions. In addition, a user interface may be provided whereby a user can observe the regions of the core information matrix to facilitate selecting an appropriate projection technique.

The analytic platform 100 may include consumer-level tracking capability that may make possible segmenting and targeting consumers based upon a portion of their shopping behavior, not just their consumer attributes. This may allow manufacturers to reframe a product category based on a complete understanding of consumers' buying relationships. In an example the analytic platform 100 may facilitate planning assortments and measuring performance by store clusters and executing marketing plans against these micro-segments. The analytic platform 100 may also facilitate a new level of understanding of consumers' share of wallet across a portfolio, thereby potentially enabling internal growth of products within a loyal customer base and external growth through identification of opportunity buyers. Because an analytic framework facilitated by the analytic platform 100 methods and systems may allow for the integration of existing and new media data, the analytic platform 100 may enable a more accurate assessment of media impact, such as the interaction between consumers, media, and venues. This may improve marketing spend efficiency and assist in the development of more effective media plans based upon a more complete understanding of target consumers' media habits.

Figure 73:
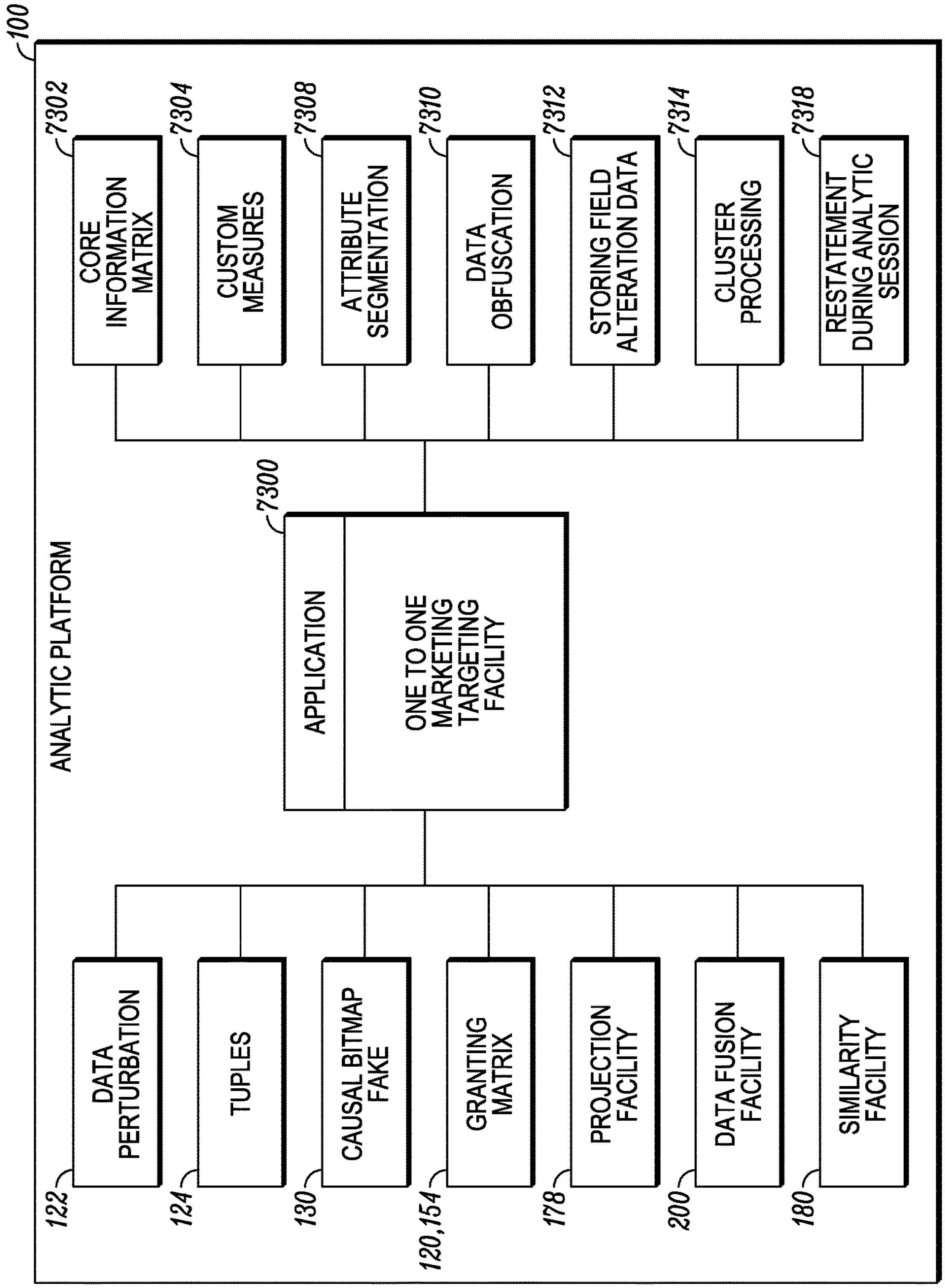
FIG. 73 depicts a one-to-one marketing targeting application.

Referring to FIG. 73 which depicts one-to-one marketing—targeting as may be performed by aspects of the analytic platform 100, a data fusion facility 200 that may be associated with the analytic platform 100 may receive one or more panel data source datasets 198, one or more fact data source datasets 102, one or more dimension data source datasets 104. The data fusion facility 200, as herein described, may associate the received datasets with a standard population database. The datasets received by the data fusion facility 200 may be fused into a consumer panel dataset based at least in part on an encryption key, wherein the encryption key embodies at least one association between the standard population database and the datasets received in the data fusion facility 200. A consumer behavior may be associated with the fused consumer panel dataset and the analytic platform 100 may analyze the fused consumer panel dataset to determine a consumer type. The fused consumer panel dataset may be segmented, providing segmented analytic results; the segmenting based, at least in part, on the consumer type. A future action may be associated with a consumer type to provide an associated future action. The segmented analytic results and the associated future action may be presented within a user interface 182 that may be associated with the analytic platform 100.

The encryption key may embody an association relating to temporal data, to a geography, to a venue, to a product, or to a time. The fused consumer panel dataset may include existing data and new media data. The consumer type may be an opportunity buyer. Additionally, the segmented analytic results may be summarized in a report.

In embodiments, non-unique values may be found in a data table, where the data table may be associated with a consumer characteristic data set. The non-unique values may be perturbed to render unique values. In addition, the non-unique value may be used as an identifier for a data item in the consumer characteristic data set, where the consumer characteristic data set may be used for an analytic purpose relating to the effect of targeting individuals having certain characteristics with respect to the launch of a proposed product.

In embodiments, a projected facts table in a consumer characteristic data set that has one or more associated dimensions may be taken. At least one of the dimensions to be fixed may be selected, where the selection of a dimension may be based on an analytic purpose relating to the effect of targeting individuals having certain characteristics with respect to the launch of a proposed product. In addition, an aggregation of projected facts may be produced from the projected facts table and associated dimensions, where the aggregation may fix the selected dimension for the purpose of allowing queries on the aggregated consumer characteristic data set.

In embodiments, a plurality of data sources having data segments of varying accuracy may be identified, where the data sources may contain data relevant to an analytic purpose relating to the effect of targeting individuals having certain characteristics with respect to the launch of a proposed product. A plurality of overlapping data segments may be identified among the plurality of data sources to use for comparing the data sources. A factor may be calculated as a function of the comparison of the overlapping data segments. In addition, the factor may be applied to update a consumer characteristic data set containing at least one of the data sources.

In embodiments, a data field characteristic of a data field in a data table of a consumer characteristic data set may be altered, where the alteration generates a field alteration datum. The field alteration datum associated with the alteration may be saved in a data storage facility. A query requiring the use of the data field in the consumer characteristic data set may be submitted, where a component of the query consists of reading the field alteration data and the query relates to an analytic purpose related to the effect of targeting individuals having certain characteristics with respect to the launch of a proposed product. In addition, the altered data field may be read in accordance with the field alteration data.

In embodiments, a consumer characteristic data set may be stored in a partition within a partitioned database, where the partition may be associated with a data characteristic of the consumer characteristic data set. A master processing node may be associated with a plurality of slave nodes, where each of the plurality of slave nodes may be associated with a partition of the partitioned database. An analytic query relating to the effect of targeting individuals having certain characteristics with respect to the launch of a proposed product may be submitted to the master processing node. In addition, the query may be processed by the master node assigning processing steps to an appropriate slave node.

In embodiments, a consumer characteristic data set may be received, where the consumer characteristic data set may include facts relating to items perceived to cause actions, where the consumer characteristic data set includes data attributes associated with the fact data stored in the consumer characteristic data set. A plurality of the combinations of a plurality of fact data and associated data attributes may be pre-aggregated in a causal bitmap. A subset of the pre-aggregated combinations may be selected based on suitability of a combination for an analytic purpose relating to the effect of targeting individuals having certain characteristics with respect to the launch of a proposed product. In addition, the subset of pre-aggregated combinations may be stored to facilitate querying of the subset.

In embodiments, an availability condition associated with a data hierarchy in a database may be specified, where the data hierarchy may include a consumer characteristic data set, where the availability condition may relate to the availability of data in the consumer characteristic data set for an analytic purpose relating to the effect of targeting individuals having certain characteristics with respect to the launch of a proposed product. The availability condition may be stored in a matrix. In addition, the matrix may be used to determine assess to the consumer characteristic data set in the data hierarchy.

In embodiment, a consumer characteristic data set having a plurality of dimensions may be taken. A dimension of the consumer characteristic data set may be fixed for purposes of pre-aggregating the data in the consumer characteristic data set for the fixed dimension, where the fixed dimension may be selected based on suitability of the pre-aggregation to facilitate rapidly serving an analytic purpose relating to the effect of targeting individuals having certain characteristics with respect to the launch of a proposed product. In addition, an analytic query of the consumer characteristic data set may be allowed, where the query may be executed using pre-aggregated data if the query does not seek to vary the fixed dimension and the query may be executed on the un-aggregated consumer characteristic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received may be fused in the data fusion facility into a new fused consumer characteristic data set based at least in part on a key, where the key embodies at least one association between the standard population database and the data sets received in the data fusion facility, where the consumer characteristic data set may be intended to be used for an analytic purpose relating to the effect of targeting individuals having certain characteristics with respect to the launch of a proposed product.

In embodiments, a classification scheme associated with a plurality of attributes of a grouping of items in a consumer characteristic data set may be identified. A dictionary of attributes associated with the items may be identified. A similarity facility may be used to attribute additional attributes to the items in the consumer characteristic data set based on probabilistic matching of the attributes in the classification scheme and the attributes in the dictionary of attributes. In addition, the modified consumer characteristic data set may be used for an analytic purpose relating to the effect of targeting individuals having certain characteristics with respect to the launch of a proposed product.

In embodiments, certain data in a consumer characteristic data set may be obfuscated to render a post-obfuscation consumer characteristic data set, access to which may be restricted along at least one specified dimension. In addition, the post-obfuscation consumer characteristic data set may be to produce an analytic result, where the analytic result may be related to the effect of targeting individuals having certain characteristics with respect to the launch of a proposed product and may be based in part on information from the post-obfuscation consumer characteristic data set while keeping the restricted data from release.

In embodiments, an analytic platform may be provided for executing queries relating to an analytic purpose relating to the effect of targeting individuals having certain characteristics with respect to the launch of a proposed product. A consumer characteristic data set may be received in the analytic platform. A new calculated measure that may be associated with the consumer characteristic data set may be added to create a custom data measure, where the custom data measure may be added during a user's analytic session. An analytic query requiring the custom data measure may be submitted during the user's analytic session. In addition, an analytic result may be presented based at least in part on analysis of the custom data measure during the analytic session.

In embodiments, a new data hierarchy associated with a consumer characteristic data set may be added in an analytic platform to create a custom data grouping, where the new data hierarchy may be added during a user's analytic session. In addition, handling of an analytic query relating to the effect of targeting individuals having certain characteristics with respect to the launch of a proposed product that uses the new data hierarchy during the user's analytic session may be facilitated.

In embodiments, a consumer characteristic data set may be taken from which it may be desired to obtain a projection for an analytic purpose relating to the effect of targeting individuals having certain characteristics with respect to the launch of a proposed product. A core information matrix may be developed for the consumer characteristic data set, where the core information matrix may include regions representing the statistical characteristics of alternative projection techniques that can be applied to the consumer characteristic data set. In addition, a user interface may be provided whereby a user can observe the regions of the core information matrix to facilitate selecting an appropriate projection technique.

In embodiments, a consumer characteristic data set may be taken from which it may be desired to obtain a projection, where a user of an analytic platform may select at least one dimension on which the user wishes to make a projection from the consumer characteristic data set, where the projection may be for an analytic purpose relating to the effect of targeting individuals having certain characteristics with respect to the launch of a proposed product. A core information matrix may be developed for the consumer characteristic data set, where the core information matrix may include regions representing the statistical characteristics of alternative projection techniques that can be applied to the consumer characteristic data set, including statistical characteristics relating to projections using any selected dimensions. In addition, a user interface may be provided whereby a user can observe the regions of the core information matrix to facilitate selecting an appropriate projection technique.

Integrating traditional base-and-incremental analyses promotional information with in-store and traffic-based special causal data may provide a broad level of data-related insights. As an example, traffic-level-corrected "lift" coefficients for a variety of in-store conditions may be determined. This may be enabled by extending standard lift model analysis to include more granular causal conditions from a large number of stores' census data. The platform may also allow the use of high-quality POS data as a calibrated proxy for traffic data in cases where such data are not available but in-store layout/conditions are known.

In-store media presence and conditions may also be integrated to facilitate providing additional insights on this emerging communications medium. In addition, by using information from other data providers, the content of the in-store media can be associated with specific product categories and types which may allow for the evaluation of the impact of in-store media conditions on consumer purchasing behaviors at an aggregated (store) level. POS data may provide excellent granularity and "control group" options, thereby enabling the extension of standard media models along this analysis dimension. In addition, the analytic platform may facilitate a process by which at least hundreds of in-store media models could be analyzed very cost effectively.

The analytic platform may facilitate opportunities to utilize multi-source data sources including in-store data to enhance the assortment and space planning processes. In an example, the interaction of store traffic with the assortment and space allocation may be analyzed to enhance the decision-making process in this critical application.

The analytic platform may facilitate providing innovative consumer insight, such as to meet user in-store marketing analysis needs. As an example, the analytic platform may integrate consumer to create an integrated, complete, actionable view of consumers, such as an explicit understanding of the relationship between consumers and stores. A basic approach may be to leverage the platform's data fusion capabilities to characterize U.S. households at the household level by fusing consumer network data and specialty panels, loyalty data from retailers, and other consumer data sources against a universal framework based upon an industry standard population database. This fusion can be done based upon household attributes/clusters or at the exact household-level via the use of irreversible-encryption keys. This may significantly enhance the granularity and quality of insights derivable from panel data.

The analytic platform fusion capability may provide a "Super Panel" of U.S. households through the use of multi-level data fusion logic within the context of a generalized framework within which various data sources' measures of the product purchased by a consumer at a point in time may be aligned, compared, and merged. As a simplified example, consumer network data and specialty panels may be used in combination with psychographic/demographic segmentation schemas to impute household-level purchases across the universe of U.S. households. The platform may then be used to fuse these initial estimates with other data sources in several ways.

In the event that a data source provides a household-level match, its estimate may be blended directly with the initial estimate (e.g. using an inverse-variance-weighted approach). Should a household-level match not be available, the initial and new estimates may be competitively fused along an aggregate of the consumer/household, venue, product, or time dimension, such as with the subsequent disaggregation of the results via imputation along household attributes/clusters. Alternatively, complementary fusion may be used to fill in "voids" in the data framework. This fusion approach may be iterated across data sources at the appropriate levels of aggregation, and may result in creating increasingly accurate estimates at the household level. Household-level results may then be aggregated and competed against measures that are available only at aggregate levels, such as store point-of-sale data. Examples of data sources that may be fused in this way may include loyalty data from one or more retailers, custom research data, attitude and usage data, permission-based marketing data, and the like.

A high-level overview of the data fusion logic used to provide household-level purchase and behavior estimates may be determined from considering an objective (e.g. over a specified period of time) of determining a composition of a household's product-venue activities. The process may begin by estimating a household's purchases by its similarity to one or more known household profiles. While these estimates may be relatively inaccurate at the household level, they may provide an unbiased (in aggregate) starting point. Next, if the household is a member of one or more loyalty card programs, then—for those retailers—the initial estimates may be competitively fused with the loyalty data to increase their accuracy (e.g. filling in the gaps). This competitive fusion may be via one of several methods. For example, a bias correction may take the form of a coverage-like adjustment. Alternatively, the bias correction may result from a choice model or other analytical formulation.

Any biases in the initial estimates may also be used to enhance the estimates for other households for which loyalty data are not available via complementary fusion. This iterative approach may be used with other data sources (e.g. credit card purchases, independent channel/retailer/category estimates, and the like) at whatever level of aggregation is appropriate. In this way, the estimates may be continuously improved, such as through a series of successive approximations.

The resulting, populated analytic platform data framework may provide an unprecedented, multi-dimensional consumer insight capability with granularity by household and customer segment, store and store cluster, trip and trip mission that may be analyzable by consumer segment, including ethnicity and the like. Propensity scores by product, household, and store may enable enhanced consumer targeting and CRM analyses and programs, such as enhanced consumer response and tracking models. In addition, the data framework may facilitate manufacturer-retailer interactions through the ability to enable cross-segmentation alignments amongst various views of the consumer. A potential impact of the platform on a user's ability to perform in-store marketing condition analyses may be a substantial increase in the analyzable sample size, thereby allowing for more granular analyses and more actionable decisions. This may significantly enhance the granularity and quality of insights derivable from panel data.

Figure 74:
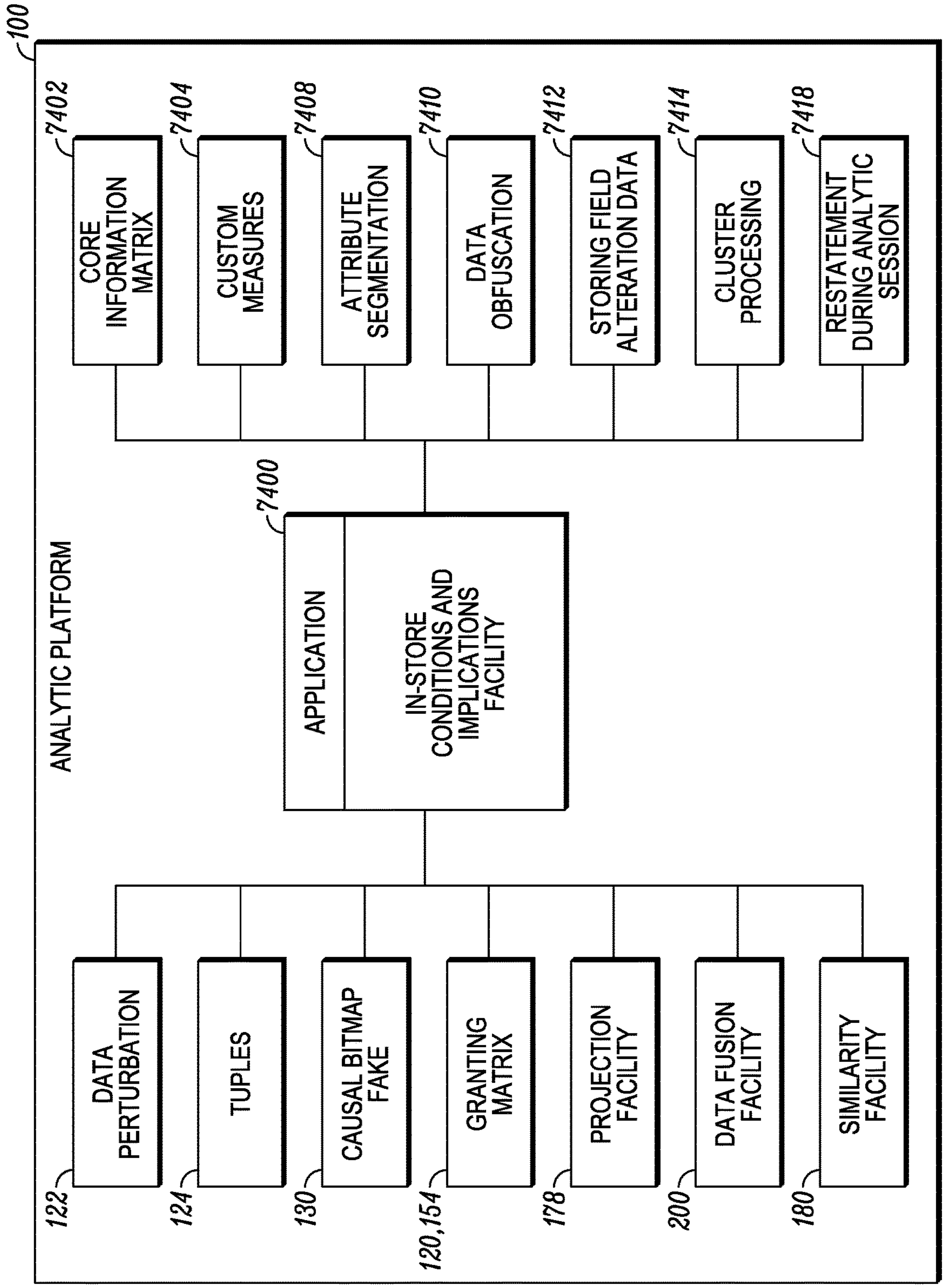
FIG. 74 depicts an in-store conditions and implications application.

Referring to FIG. 74 which depicts in-store conditions and implications as related to an analytic platform, a data fusion facility 200 may receive an in-store consumer research dataset, an in-store consumer activities dataset, and a dimension data source dataset 104. The data fusion facility 200 may associated the datasets received with a standard population database. The data fusion facility 200 may also fuse data from the datasets received into a fused consumer panel dataset based at least in part on an encryption key, wherein the encryption key embodies at least one association between the standard population database and the datasets received. A product characteristic dataset may be associated with the fused consumer panel dataset. The fused consumer panel dataset may be analyzed using an analytic platform 100, wherein the analysis may determine an association between a consumer research datum, a consumer activity datum, and a product characteristic datum. A matrix with values may be populated based at least in part on the association, providing a populated matrix.

A data projection may be calculated based on a received statistical characteristic of the data projection using a calculation that is selected based on it producing the data projection with the statistical characteristic. At least one of the values of the populated matrix may be selected as an input to the calculation. The data projection and a projection output may be stored. The fused consumer panel dataset may be segmented based at least in part on the projection output, providing a segmented analytic result. The segmented analytic results may be presented within a user interface 182.

The encryption key may embody one or more of an association relating to temporal data, an association relating to a geography, an association relating to a venue, and an association relating to a product.

The in-store consumer research dataset may include one or more of consumer opinion data, consumer decision making data, data regarding trip type, data regarding a consumer's need state, data regarding store shelf conditions, data regarding product assortment information, data regarding store trading area, data regarding store promotions, data regarding basket analysis, data regarding consumer lifestage, or data regarding a store attribute.

The consumer activity may be one or more of a planned product purchase, associated with a trip type, an unplanned product purchase (e.g. an in-store department choice or an in-store at-the-shelf choice).

Alternatively, an in-store media characteristic dataset may be associated with the fused consumer panel dataset in order to determine an association between a media characteristic and a consumer activity.

In an embodiment, a store shelf characteristic dataset may be associated with the fused consumer panel dataset in order to determine an association between a shelf characteristic and a consumer activity. The shelf characteristic may be related to shelf assortment, shelf size, or shelf placement.

Still referring to FIG. 74, in embodiments, non-unique values in a data table may be found, where the data table may be associated with an in-store consumer research data set. The non-unique values may be perturbed to render unique values. In addition, the non-unique value may be used as an identifier for a data item in the in-store consumer research data set, where the in-store consumer research data set may be used for an analytic purpose relating to determining the implication of an in-store factor on product sales.

In embodiments, a projecting facts table may be taken in an in-store consumer research data set that may have one or more associated dimensions. At least one of the dimensions to be fixed may be selected, where the selection of a dimension may be based on an analytic purpose related to determine the implication of an in-store factor on product sales. In addition, an aggregation of projected facts may be produced from the projected facts table and associated dimensions, where the aggregation may fix the selected dimension for the purpose of allowing queries on the aggregated in-store consumer research data set.

In embodiments, a plurality of data sources may be identified that may have data segments of varying accuracy, where the data sources containing data relevant to an analytic purpose may be related to determining the implication of an in-store factor on product sales. A plurality of overlapping data segments may be identified among the plurality of data sources to use for comparing the data sources. A factor may be calculated as a function of the comparison of the overlapping data segments. In addition, the factor to update an in-store consumer research data set may be applied to contain at least one of the data sources.

In embodiments, a data field characteristic of a data field in a data table of an analytic data set may be altered, where the alteration may generate a field alteration datum. The field alteration datum associated with the alteration in a data storage facility may be saved. A query requiring the use of the data field in the in-store consumer research data set may be submitted, where a component of the query may consist of reading the field alteration data and the query may relate to an analytic purpose related to determining the implication of an in-store factor on product sales. In addition, the altered data field may be read in accordance with the field alteration data.

In embodiments, an in-store consumer research data set may be received, where the in-store consumer research data set may include facts relating to items perceived to cause actions, and the in-store consumer research data set may include data attributes associated with the fact data stored in the in-store consumer research data set. A plurality of the combinations of a plurality of fact data and associated data attributes in a causal bitmap may be pre-aggregated. A subset of the pre-aggregated combinations may be selected based on suitability of a combination for an analytic purpose relating to determining the implication of an in-store factor on product sales. The subset of pre-aggregated combinations to facilitate querying of the subset may be stored.

In embodiments, an availability condition associated with a data hierarchy in a database may be specified, where the data hierarchy may include an in-store consumer research data set, and the availability condition relating to the availability of data in the in-store consumer research data set for an analytic purpose may relate to determining the implication of an in-store factor on product sales. The availability condition in a matrix may be stored. In addition, the matrix may be used to determine access to the in-store consumer research data set in the data hierarchy.

In embodiments, an in-store consumer research data set having a plurality of dimensions may be taken. A dimension of the in-store consumer research data set may be fixed for purposes of pre-aggregating the data in the in-store consumer research data set for the fixed dimension, where the fixed dimension may be selected based on the suitability of the pre-aggregation to facilitate rapidly serving an analytic purpose related to determining the implication of an in-store factor on product sales. In addition, an analytic query of the in-store consumer research data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action in the data fusion facility may be performed, where the action may associate the data sets received in the data fusion facility with a standard population database. In addition, data from the data sets received in the data fusion facility may be fused into a new fused analytic data set based at least in part on a key, where the key may embody at least one association between the standard population database and the data sets received in the data fusion facility, and the in-store consumer research data set may be intended to be used for an analytic purpose relating to determining the implication of an in-store factor on product sales.

In embodiments, a classification scheme may be identified associated with a plurality of attributes of a grouping of items in an analytic data set. A dictionary of attributes associated with the items may be identified. In addition, a similarity facility may be used to attribute additional attributes to the items in the in-store consumer research data set based on probabilistic matching of the attributes in the classification scheme and the attributes in the dictionary of attributes.

In embodiments, certain data in an in-store consumer research data set may be obfuscated to render a post-obfuscation analytic data set, where access to which may be restricted along at least one specified dimension. In addition, the post-obfuscation analytic data set may be analyzed to produce an analytic result, and the analytic result may be related to determining the implication of an in-store factor on product sales and based in part on information from the post-obfuscation analytic data set while keeping the restricted data from release.

In embodiments, an analytic platform for executing queries relating to an analytic purpose relating to determining the implication of an in-store factor on product sales may be provided. An in-store consumer research data set may be received in the analytic platform. A new calculated measure that may be associated with the in-store consumer research data set may be added to create a custom data measure, where the custom data measure may be added during a user's analytic session. An analytic query may be submitted requiring the custom data measure during the user's analytic session. An analytic result based at least in part on analysis of the custom data measure during the analytic session may be presented.

In embodiments, a new data hierarchy associated with an in-store consumer research data set may be added in an analytic platform to create a custom data grouping, where the new data hierarchy may be added during a user's analytic session. Handling of an analytic query relating to determining the implication of an in-store factor on product sales may be facilitated that uses the new data hierarchy during the user's analytic session.

In embodiments, an in-store consumer research data set may be taken from which it may be desired to obtain a projection for an analytic purpose relating to determining the implication of an in-store factor on product sales. A core information matrix may be developed for the in-store consumer research data set, where the core information matrix may include regions representing the statistical characteristics of alternative projection techniques that may be applied to the in-store consumer research data set. In addition, a user interface may be provided whereby a user may observe the regions of the core information matrix that may facilitate selecting an appropriate projection technique.

In embodiments, an in-store consumer research data set may be stored in a partition within a partitioned database, where the partition may be associated with a data characteristic of the in-store consumer research data set. A master processing node may be associated with a plurality of slave nodes, where each of the plurality of slave nodes may be associated with a partition of the partitioned database. An analytic query may be submitted relating to determining the implication of an in-store factor on product sales to the master processing node. In addition, the query may be processed by the master node assigning processing steps to an appropriate slave node.

In embodiments, an in-store consumer research data set may be taken from which it may be desired to obtain a projection, where a user of an analytic platform may select at least one dimension on which the user wishes to make a projection from the in-store consumer research data set, the projection being for an analytic purpose relating to determining the implication of an in-store factor on product sales. A core information matrix may be developed for the in-store consumer research data set, the core information matrix including regions representing the statistical characteristics of alternative projection techniques that may be applied to the in-store consumer research data set, including statistical characteristics relating to projections using any selected dimensions. In addition, a user interface may be provided whereby a user may observe the regions of the core information matrix to facilitate selecting an appropriate projection technique.

Figure 75:
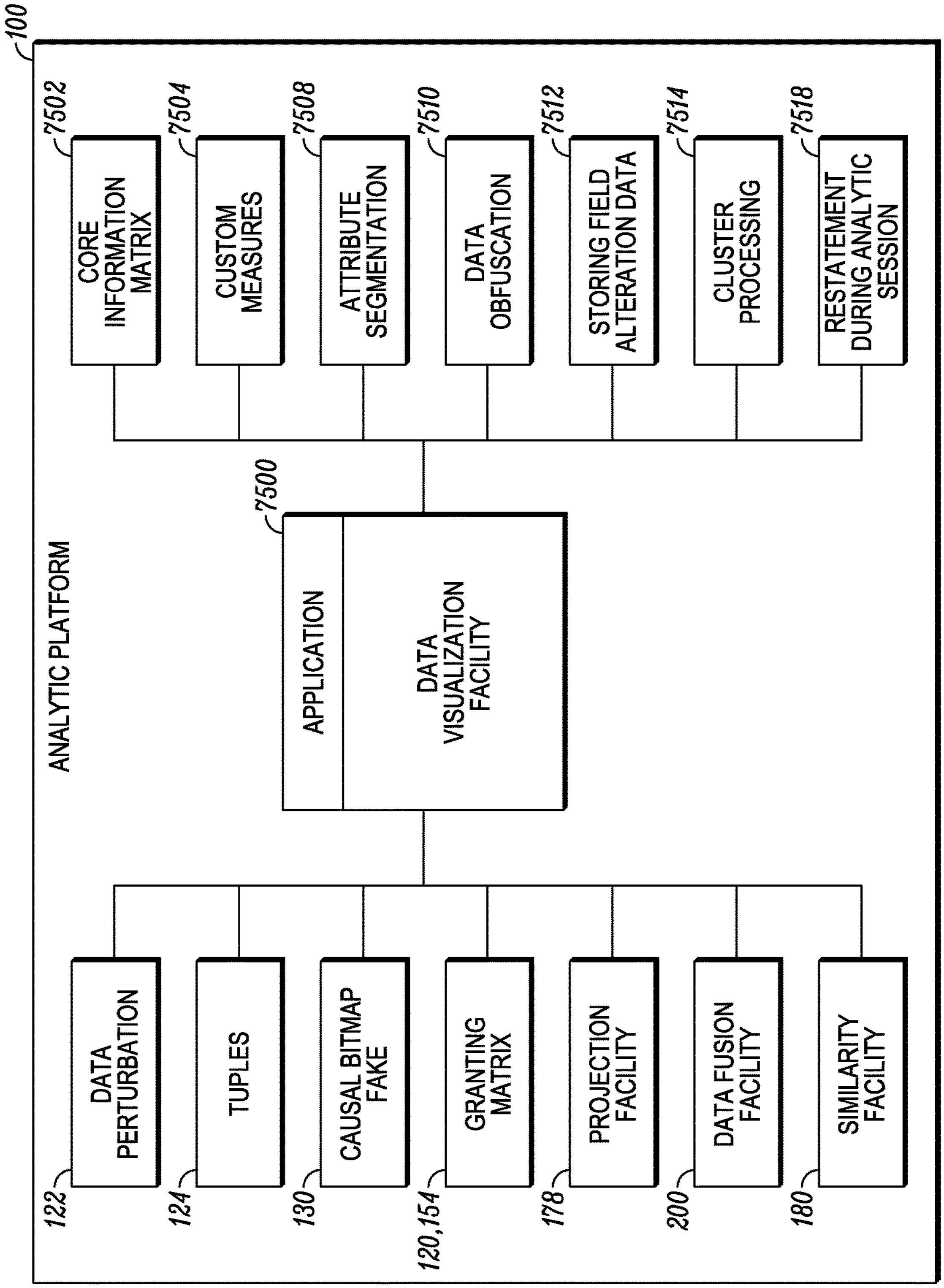
FIG. 75 depicts a data visualization application.

Referring to FIG. 75, in embodiments, non-unique values in a data table may be found, where the data table may be associated with an analytic data set. The non-unique values to render unique values may be perturbed. In addition, the non-unique value as an identifier for a data item in the analytic data set may be used, where the analytic data set may be used for an analytic purpose relating to visualizing data in the analytic data set.

In embodiments, a projected facts table in an analytic data set may be taken that has one or more associated dimensions. At least one of the dimensions to be fixed may be selected, where the selection of a dimension may be based on an analytic purpose relating to visualizing data in the analytic data set. In addition, an aggregation of projected facts from the projected facts table and associated dimensions may be produced, where the aggregation may fix the selected dimension for the purpose of allowing queries on the aggregated analytic data set.

In embodiments, a plurality of data sources may be identified having data segments of varying accuracy, where the data sources containing data relevant to an analytic purpose may relate to visualizing data in the analytic data set. A plurality of overlapping data segments among the plurality of data sources may be identified to use for comparing the data sources. A factor may be calculated as a function of the comparison of the overlapping data segments. In addition, the factor may be applied to update an analytic data set containing at least one of the data sources.

In embodiments, a data field characteristic of a data field in a data table of an analytic data set may be altered, where the alteration may generate a field alteration datum. The field alteration datum associated with the alteration in a data storage facility may be saved. A query may be submitted requiring the use of the data field in the analytic data set, where a component of the query may consist of reading the field alteration data and the query may relate to an analytic purpose related to visualizing data in the analytic data set. In addition, the altered data field may be read in accordance with the field alteration data.

In embodiments, an analytic data set may be received, where the analytic data set may include facts relating to items perceived to cause actions, and the analytic data set may include data attributes associated with the fact data stored in the analytic data set. A plurality of the combinations of a plurality of fact data and associated data attributes in a causal bitmap may be pre-aggregated. A subset of the pre-aggregated combinations may be selected based on suitability of a combination for an analytic purpose relating to visualizing data in the analytic data set. In addition, the subset of pre-aggregated combinations may be stored to facilitate querying of the subset.

In embodiments, an availability condition associated with a data hierarchy in a database may be specified, where the data hierarchy may include an analytic data set, and the availability condition may relate to the availability of data in the analytic data set for an analytic purpose relating to visualizing data in the analytic data set. The availability condition in a matrix may be stored. In addition, the matrix may be used to determine access to the analytic data set in the data hierarchy.

In embodiments, an analytic data set may be taken having a plurality of dimensions. A dimension of the analytic data set may be fixed for purposes of pre-aggregating the data in the analytic data set for the fixed dimension, where the fixed dimension may be selected based on suitability of the pre-aggregation to facilitate rapidly serving an analytic purpose relating to visualizing data in the analytic data set. An analytic query of the analytic data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action in the data fusion facility may be performed, where the action may associate the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, and the analytic data set may be intended to be used for an analytic purpose relating to visualizing data in the analytic data set.

In embodiments, a classification scheme associated with a plurality of attributes of a grouping of items may be identified in an analytic data set. A dictionary of attributes associated with the items may be identified. In addition, a similarity facility may be used to attribute additional attributes to the items in the analytic data set based on probabilistic matching of the attributes in the classification scheme and the attributes in the dictionary of attributes.

In embodiments, certain data in an analytic data set may be obfuscated to render a post-obfuscation analytic data set, where access to which may be restricted along at least one specified dimension. In addition, the post-obfuscation analytic data set may be analyzed to produce an analytic result, where the analytic result may be related to visualizing data in the analytic data set and may be based in part on information from the post-obfuscation analytic data set while keeping the restricted data from release.

In embodiments, an analytic platform may be provided for executing queries relating to an analytic purpose relating to visualizing data in the analytic data set. An analytic data set may be received in the analytic platform. A new calculated measure may be added that may be associated with the analytic data set to create a custom data measure, where the custom data measure may be added during a user's analytic session. An analytic query requiring the custom data measure may be submitted during the user's analytic session. In addition, an analytic result based at least in part on analysis of the custom data measure may be presented during the analytic session.

In embodiments, a new data hierarchy associated with an analytic data set in an analytic platform may be added to create a custom data grouping, where the new data hierarchy may be added during a user's analytic session. In addition, handling of an analytic query relating to visualizing data in the analytic data set may be facilitated that uses the new data hierarchy during the user's analytic session.

In embodiments, an analytic data set from which it may be desired to obtain a projection for an analytic purpose relating to visualizing data in the analytic data set may be taken. A core information matrix for the analytic data set may be developed, where the core information matrix may include regions representing the statistical characteristics of alternative projection techniques that may be applied to the analytic data set. In addition, a user interface may be provided whereby a user may observe the regions of the core information matrix to facilitate selecting an appropriate projection technique.

In embodiments, an analytic data set may be stored in a partition within a partitioned database, where the partition may be associated with a data characteristic of the analytic data set. A master processing node may be associated with a plurality of slave nodes, where each of the plurality of slave nodes may be associated with a partition of the partitioned database. An analytic query may be submitted relating to visualizing data in the analytic data set to the master processing node. In addition, the query may be processed by the master node assigning processing steps to an appropriate slave node.

In embodiments, an analytic data set may be taken from which it may be desired to obtain a projection, where a user of an analytic platform may select at least one dimension on which the user wishes to make a projection from the analytic data set, the projection being for an analytic purpose relating to visualizing data in the analytic data set. A core information matrix may be developed for the analytic data set, the core information matrix including regions representing the statistical characteristics of alternative projection techniques that may be applied to the analytic data set, including statistical characteristics relating to projections using any selected dimensions. In addition, a user interface may be provided whereby a user may observe the regions of the core information matrix to facilitate selecting an appropriate projection technique.

Figure 76:
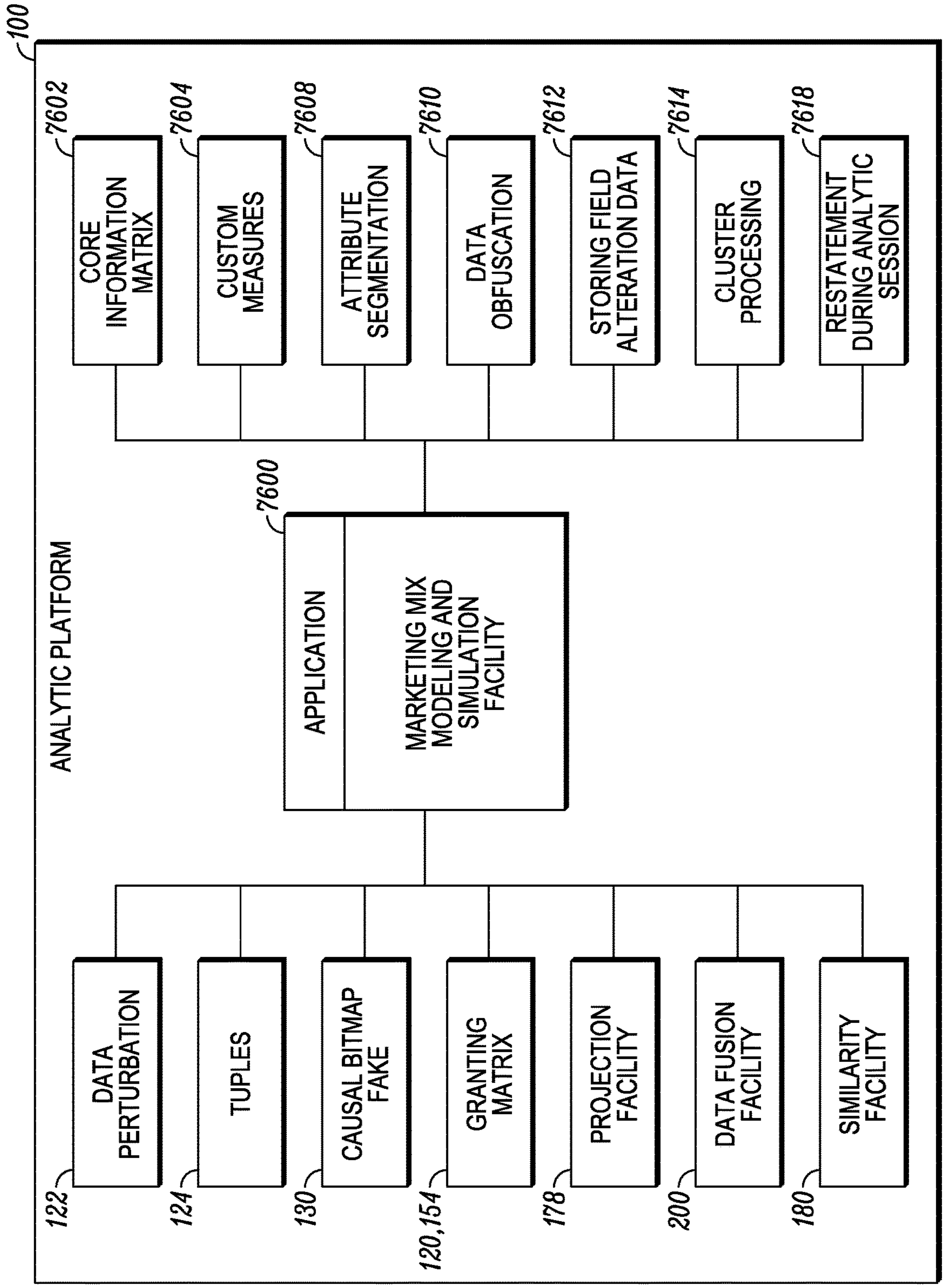
FIG. 76 depicts a marketing mix solution and simulation application.

Referring to FIG. 76, an automated analytic platform 100 may be associated with a promotion characteristic dataset and a fused consumer panel dataset, where the datasets used in the fused dataset may be derived from known geographies. In selecting an unknown geography for which a projection is sought, a set of attributes for the unknown geography may be known. Analyzing the fused consumer panel dataset using the automated analytic platform 100, the analysis may populate a matrix with values based at least in part on the association between a promotion characteristic and a consumer panel characteristic. The system may receive a statistical characteristic of a data projection in a projection facility 176, and select a calculation that produces the data projection with the statistical characteristic, where the system may select at least one of the values from the matrix as an input to the calculation. Generating the data projection may be provided by performing the calculation, and storing a coefficient derived from the data projection in a centralized database, where the database may be accessible to users throughout an organization based at least in part on a permission provided within a granting matrix. A simulating effect in the unknown geography may be based at least in part on adjusting of a marketing mix model, where the marketing mix model may project an effect of a promotion characteristic alteration. The effect of the marketing mix model may then be forecasted, published for access by a user of a user group, and presented with the forecast to the user within a user interface 182.

In embodiments, iterating the simulation of the effect may be based at least in part on a statistical criterion, such as a goodness of fit a co-linearity between independent variables used in the data projection, model stability, validity, a standard error of an independent variable, a residual, a user-specified criterion, and the like. In embodiments, there may be a promotion characteristic, such as a television advertisement, a radio advertisement, a print advertisement, a trade publication advertisement, a price reduction, an in-store display, a coupon, an in-store program, an Internet advertisement, a billboard advertisement, an interactive advertisement, and the like. In addition, the promotion characteristic alteration may be a change from one promotion characteristic to another promotion characteristic, where the promotion characteristic alteration is a change in the intensity of a promotion, such as a frequency of advertisement placement, a size of the promotion, a size of the promotion is an area of a print advertisement, a of the promotion is an area of an Internet advertisement, a size of the promotion is a duration of an advertisement. The promotion characteristic alteration may also be a combination of promotion characteristics.

In embodiments, insights may be delivered on how to optimize a user's return on marketing investment via the most efficient set of return on investment (ROI) tools that enable the user to determine holistically where to allocate funding and resources; with pricing activity directly included to guide pricing decisions. Providing the most accurate decomposition of volume around each due-to variable may be critical to the successful management of marketing investment. Therefore, marketing mix modeling and simulation optimization models may account for most components of the marketing mix, helping to ensure a complete view of the drivers of volume, and key elements of the mix that may not be masked to the residual volume. In addition, the model may directly account for the impact of new product introductions by isolating that influence.

In embodiments, the full set of statistical coefficients may quantify the relationship between changes in sales and both in-store and consumer marketing activities. This may mean the due-to analysis will include in-store-variables such as value (stat volume, unit and dollar), share (stat volume, unit and dollar), distribution (cum pts & % ACV), pricing (shelf price, promo price/% discount, average price expressed in stat volume, unit or dollars), merchandising (disp only, feature only, feature & display, TPR only), and shelving: (# of UPCs); marketing variables such as TV, print, radio, PR, out of home (billboard), interactive, samples, FSI coupons, catalina coupons, newsAmerica programs, and sport marketing and sponsorships; and the like. In addition, the models will also account for the impact of new product introductions, category trend, seasonality, and the like.

In embodiments, the system may need metrics of either impressions or GRPs for each marketing variable listed above. These impressions or GRPs may also need to be tied back to a specific week and store. In many instances, the system can provide the required data to feed the statistical models. In other cases, the system may rely on the user or other suppliers to provide the data. Specifically, the system may work with a user and its suppliers to determine the best data sources around variables such as PR, out of home, interactive, samples, catalina coupons, newsAmerica programs and sports marketing.

In embodiments, not all channels and retailers may have the same quality of data and causal information. An automated approach may be used for those accounts and channels where the system has access to census or sample point-of-sale (POS) data. This approach may be applied to the food, drug and mass channels.

In embodiments, for channels where POS data and/or causal data are not as readily available, the system may customize models as appropriate to fit the data set. In this case, although the same state-of-the-art statistical approach and diagnostics may be used, the models are tailored to the available data for the channel and/or retail. Because the modeling approach is data neutral and may integrate third-party data at the most granular level via the analytic platform, the system may have the capability to use all data sources in its models. The system may work with P&G to identify the best sources of data for each retailer and channel where traditional POS is not available. Models will be run on best available data.

In embodiments, the user may have the option to update coefficients annually, semi-annually or quarterly. For categories with more frequent product introductions, the system may recommend a quarterly update; for more stable categories, a semi-annual or annual update may suffice.

In embodiments, an automated analytic approach and custom modeling approach may be based on state-of-the-art statistical modeling providing the accurate and actionable results. The system may measure activity capable of having a material impact on business, provided metrics exists to reflect the level of that activity occurring in the marketplace. The system may use a regression model that provides an integrated way to quantify the effects of marketing vehicles on sales, as well as the effects of other factors such as everyday price and competitive behaviour.

In embodiments, some benefits of the approach may include addresses marketing mix, price and promotion, as well as forecasting and simulation requirements all within the same model; evaluation of each marketing activity at the level it occurs; highly scalable, repeatable, and comparable over different situations, enabling complete automation; and the like. Store-level data may also have important benefits, such as accurate response estimates for price and trade promotion variables that vary by store. models that are based on aggregate market-level data cannot reliably measure price elasticity and in-store promotion effects; provides thousands more observations than could be provided by aggregate data, dramatically improving the reliability of the model results; enables IRI to measure marketing effects for custom store clusters, enabling evaluation of targeted marketing efforts; and the like.

In embodiments, the system may utilize Bayesian shrinkage to take advantage of information at different levels of detail to improve the models reliability. Rather than modeling each market individually, the system Bayesian model looks at all stores and outlets at the same time, allowing the model to realize the benefits of all available information. The essence of Bayesian shrinkage is that it may adjust or "shrink" the sales response estimates as appropriate using the information from other chains or markets to keep all estimates within a reasonable and consistent range. In this way, the model produces reliable marketing response estimates across any aggregate of stores. This way the system can provide tactical insights for each marketing element at the level at which that element is planned and executed. The Bayesian shrinkage model may use a non-linear multiplicative model formation to capture the true effect of each marketing mix element leveraging its own best known functional form in a multiplicative model to capture the interaction of each element, making the formulation a more accurate representation of the real world.

In embodiments, a logarithmic transformation may be used to estimate the fixed and random effects using restricted maximum likelihood (REML). The REML estimation may allow the model to estimate response to marketing mix stimuli at the level in which they occur, such as: TV advertising is measured at the DMA level, FSI is measured at the market level, trade promotions are measured at the RMA level or store level, and the like.

The random effect measures how marketing response at a lower geographical level may deviate from total US (fixed) effect. Every time a marketing mix model is updated, the system will provide the user with a wide range of model diagnostics, such as goodness of fit, co-linearity between the independent variables, model stability, validation, standard errors of independent variables, residual plots, and the like. The diagnostic measures may also be integrated as part of the automatically generated output.

In embodiments, many new media activities may be targeted towards specific consumers and not a mass audience. Consumer-based methods may often succeed over traditional store- or market-based methods of ROI measurement for new media. Consumer driver suite (CDS) is a panel-based choice model that predicts the probability a consumer will purchase a product based on the media and other marketing stimuli to which they've been exposed. Marketing response may be measured at the consumer group level, which can be defined based on purchasing patterns, demographics, lifestyle clusters, and the like.

In embodiments, analysis may provide the user with additional insight into the impact of advertising on consumer decisions and help better align marketing plans with strategic growth segments within the user's consumer base. For instance, an objective of growing trial requires understanding what advertising copies are most influential to new buyers; alternatively an objective of growing core buyers will require an understanding of what drives core buyers to purchase multiple franchise products.

The execution of the analysis may be conducted outside of the analytic platform 100 and coefficient generator process, but the results will be integrated with the store-based ROI results on the analytic platform 100. This integration may provide an additional layer of insights decomposing the overall mix ROI into consumer-specific results.

In embodiments, a fully integrated capability platform versus current one-off capabilities may no longer need to run multiple models at the store and/or market level to assess all of our spending but purchase a single solution that addresses all of user needs. The automated analytics platform 100 may use the system's centralized and exhaustive coefficient generator to quantify the impact of all marketing activities while controlling for the impact of seasonality, trend, and new products. The coefficients may be available through IRI's Liquid Data platform, providing an intuitive and easy-to-use web-based tool for analysis and simulations.

In embodiments, these coefficients will be derived from fully specified models that and meet the requirements of multiple service. The solution may provide both a strategic and a tactical view; with drill-down capabilities from channels to retailers pricing zones. There may also be the ability to drill down by products (from category down to SKU), time periods (down to single week) and measures (all marketing and in-store elements). Results will be available in stat case volume, units or dollars. The solution may also be capable of incorporating special user-defined events to derive customized trade ROI.

In embodiments, the ideal solution may allow the user to simulate real-time business questions/budget changes to ensure decisions will deliver incremental volume/NOS to users. The simulation capability may provide users with the ability to use holistic assessment of total marketing plans or individual marketing vehicles to optimize user's plans in a dynamic forecast using syndicated data and refreshed models to measure, track and forecast user brand volume and NOS.

In embodiments, what-if scenario analyses may be supported by a flexible planning application. Users may view historic due-tos and sales drivers and enter assumptions for the plan period in weekly marketing calendar layout. Product, geography, time, and even sales driver detail can be "unfolded" to the most granular level (PPG/Account/Week/TV GRPs by Campaign) or collapsed back to summary levels (Brand/National/Year/Total TV GRPs) based on user preferences. In addition, the planning system may have "auto-fill" functions so that individual product/market/week/driver assumptions don't have to be input "by hand". Instead, a planned base price can be entered at an aggregate level, and the tool will push the adjustment down appropriately to all individual products, geographies, and weeks.

In embodiments, the platform may further allow for easy saving and retrieval of scenarios, including an organized file structure for power users to access many scenarios quickly. Tabular and graphical comparisons of multiple scenarios can be viewed in a reporting tab, and outputs can be easily exported to MS Excel. Analysts may also run full-scale, mathematical optimization of the marketing mix to identify plans that maximize sales revenue, margin, or some combination. Optimization runs may be created using straight forward point-and-click or fill-in setup screens, and, importantly, the system may support end-user definition of multiple business rules governing outcome of optimization. For example, rules may be used to set bounds on changes to specific marketing activity levels vs. prior years (based on non-model information, strategy, etc.), and this may help make results more credible & actionable for business executives.

In embodiments, optimization may reduce a business problem to a set of mathematical equations. The equations may be composed of marketing activity variables, model-based measures of response, marketing costs, and product margins. Once this set of equations is fixed, the inputs may be systematically varied until the objective is optimized, resulting in weekly advertising, promotion, and pricing levels that maximize revenue, margin, or a combination of the two. The optimization module uses advanced mathematical algorithms to handle complex problems involving even 0-1 decision variables and large numbers of detailed constraints. This engine has handled very large-scale problems, such as optimizing over 100,000 decisions in minutes using an "interior point" algorithm.

In embodiments, an additional capability beyond standard what-if analysis may be the "Suggest Function". It represents what we believe to be the industry's first guided what-if capability. Halfway between one-at-a-time scenario evaluation and full optimization, "Suggest" lets decision-makers quickly identify the most impactful changes to the marketing plan relative to a volume, revenue, or margin goal. Using information drawn from the optimization algorithm, it color codes cells (Large+, +, –, Large –) in the plan according to the impact a change would have on business results.

In embodiments, the forecast tracking component may quickly and accurately identify why sales are tracking above or below plan. The tool compares estimated sales and due-to's from a final stored plan scenario with sales and due-to's based on actuals, e.g., year-to-date, current quarter, current month. Alternatively, target volumes from a user business plan could be loaded and tracked against actuals.

In embodiments, this module may report the total gap and decomposes it into increments based on each driver's year-to-date departure from planned level. Unexplained variance (including model error) can be allocated proportionally to drivers or reported as a separate bucket. Results are presented in the same waterfall format (with similar product, geographic, and other drilldowns) as historical sales analysis in drivers on demand. Graphical and tabular views may be exported, respectively, to MS Word or PowerPoint and MS Excel.

Still referring to FIG. 76, in embodiments, non-unique values may be found in a data table, where the data table may be associated with a promotion characteristic data set. The non-unique values may be perturbed to render unique values. In addition, the non-unique value may be used as an identifier for a data item in the promotion characteristic data set, where the promotion characteristic data set may be used for an analytic purpose relating to optimizing a proposed product mix for retail marketing.

In embodiments, a projected facts table may be taken in a promotion characteristic data set that has one or more associated dimensions. At least one of the dimensions may be selected to be fixed, where the selection of a dimension may be based on an analytic purpose relating to optimizing a proposed product mix for retail marketing. In addition, an aggregation of projected facts may be produced from the projected facts table and associated dimensions, where the aggregation fixing the selected dimension may be for the purpose of allowing queries on the aggregated promotion characteristic data set.

In embodiments, a plurality of data sources may be identified having data segments of varying accuracy, where the data sources containing data relevant to an analytic purpose may be related to optimizing a proposed product mix for retail marketing. A plurality of overlapping data segments may be identified among the plurality of data sources to use for comparing the data sources. A factor may be calculated as a function of the comparison of the overlapping data segments. The factor may be applied to update a promotion characteristic data set containing at least one of the data sources.

In embodiments, a data field characteristic of a data field may be altered in a data table of a promotion characteristic data set, where the alteration may generate a field alteration datum. The field alteration datum associated with the alteration may be saved in a data storage facility. A query may be submitted requiring the use of the data field in the promotion characteristic data set, where a component of the query may consist of reading the field alteration data and the query relates to an analytic purpose related to optimizing a proposed product mix for retail marketing. In addition, the altered data field may be read in accordance with the field alteration data.

In embodiments, a promotion characteristic data set may be stored in a partition within a partitioned database, where the partition may be associated with a data characteristic of the promotion characteristic data set. A master processing node may be associated with a plurality of slave nodes, where each of the plurality of slave nodes may be associated with a partition of the partitioned database. An analytic query may be submitted relating to optimizing a proposed product mix for retail marketing to the master processing node. In addition, the query may be processed by the master node assigning processing steps to an appropriate slave node.

In embodiments, a promotion characteristic data set may be received, where the promotion characteristic data set may include facts relating to items perceived to cause actions. In some embodiments, the promotion characteristic data set may include data attributes associated with the fact data stored in the promotion characteristic data set. A plurality of the combinations of a plurality of fact data and associated data attributes may be pre-aggregated in a causal bitmap. A subset of the pre-aggregated combinations may be selected based on suitability of a combination for an analytic purpose relating to optimizing a proposed product mix for retail marketing. In addition, the subset of pre-aggregated combinations may be stored to facilitate querying of the subset.

In embodiments, an availability condition associated with a data hierarchy may be specified in a database, where the data hierarchy may include a promotion characteristic data set. In some embodiments, the availability condition may relate to the availability of data in the promotion characteristic data set for an analytic purpose relating to optimizing a proposed product mix for retail marketing. The availability condition may be stored in a matrix. In addition, the matrix may be used to determine access to the promotion characteristic data set in the data hierarchy.

In embodiments, a promotion characteristic data set having a plurality of dimensions may be taken. A dimension of the promotion characteristic data set may be fixed for purposes of pre-aggregating the data in the promotion characteristic data set for the fixed dimension, where the fixed dimension may be selected based on suitability of the pre-aggregation to facilitate rapidly serving an analytic purpose relating to optimizing a proposed product mix for retail marketing. An analytic query of the promotion characteristic data set may be allowed, where the query may be executed using pre-aggregated data if the query does not seek to vary the fixed dimension and the query is executed on the un-aggregated promotion characteristic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action may associate the data sets received in the data fusion facility with a standard population database. In addition, data from the data sets received may be fused in the data fusion facility into a new fused promotion characteristic data set based at least in part on a key, where the key may embody at least one association between the standard population database and the data sets received in the data fusion facility. In some embodiments, the promotion characteristic data set may be intended to be used for an analytic purpose relating to optimizing a proposed product mix for retail marketing.

In embodiments, a classification scheme associated with a plurality of attributes of a grouping of items may be identified in a promotion characteristic data set. A dictionary of attributes associated with the items may be identified. A similarity facility may be used to attribute additional attributes to the items in the promotion characteristic data set based on probabilistic matching of the attributes in the classification scheme and the attributes in the dictionary of attributes. In addition, the modified promotion characteristic data set may be used for an analytic purpose relating to optimizing a proposed product mix for retail marketing.

In embodiments, certain data may be obfuscated in a promotion characteristic data set to render a post-obfuscation promotion characteristic data set, where access to which may be restricted along at least one specified dimension. In addition, the post-obfuscation promotion characteristic data set may be analyzed to produce an analytic result. In some embodiments, the analytic result may be related to optimizing a proposed product mix for retail marketing and may be based in part on information from the post-obfuscation promotion characteristic data set while keeping the restricted data from release.

In embodiments, an analytic platform may be provided for executing queries relating to an analytic purpose relating to optimizing a proposed product mix for retail marketing. A promotion characteristic data set may be received in the analytic platform. A new calculated measure that is associated with the promotion characteristic data set may be added to create a custom data measure, where the custom data measure may be added during a user's analytic session. An analytic query requiring the custom data measure may be submitted during the user's analytic session. In addition, an analytic result based at least in part on analysis of the custom data measure may be presented during the analytic session.

In embodiments, a new data hierarchy associated with a promotion characteristic data set may be added in an analytic platform to create a custom data grouping, where the new data hierarchy may be added during a user's analytic session. In addition, handling of an analytic query relating to optimizing a proposed product mix for retail marketing that uses the new data hierarchy may be facilitated during the user's analytic session.

In embodiments, a promotion characteristic data set from which it is desired to obtain a projection may be taken for an analytic purpose relating to optimizing a proposed product mix for retail marketing. A core information matrix may be developed for the promotion characteristic data set, where the core information matrix may include regions representing the statistical characteristics of alternative projection techniques that can be applied to the promotion characteristic data set. A user interface may be provided whereby a user can observe the regions of the core information matrix to facilitate selecting an appropriate projection technique. In addition, the selected projecting technique may be used, projecting the effect of using a particular promotion technique in a set of venues.

In embodiments, a promotion characteristic data set may be taken from which it is desired to obtain a projection, where a user of an analytic platform may select at least one dimension on which the user wishes to make a projection from the promotion characteristic data set. In some embodiments, the projection may be for an analytic purpose relating to optimizing a proposed product mix for retail marketing. A core information matrix may be developed for the promotion characteristic data set, where the core information matrix may include regions representing the statistical characteristics of alternative projection techniques that can be applied to the promotion characteristic data set, including statistical characteristics relating to projections using any selected dimensions. A user interface may be provided whereby a user can observe the regions of the core information matrix to facilitate selecting an appropriate projection technique. In addition, the selected projecting technique may be used, projecting the effect of using a particular promotion technique in a set of venues.

In an embodiment, the present invention may provide an analytic platform 100. The analytic platform 100 may receive a household panel data source dataset in a data fusion facility 200 associated with the analytic platform 100, receive a fact data source dataset in the data fusion facility 200, receive a dimension data source dataset in the data fusion facility 200 and perform an action in the data fusion facility, where the action associates the datasets 7710 received in the data fusion facility 200 with a standard population database. The data may then be fused from the datasets received in the data fusion facility 200 into a fused consumer panel dataset based at least in part on an encryption key, where the encryption key embodies at least one association between the standard population database and the datasets received in the data fusion facility 200. A product attribute may be associated with the fused consumer panel dataset. The fused consumer panel dataset may then be analyzed using an analytic platform 100, wherein the analysis may determine an association between the product attribute and a household demographic within the fused consumer panel dataset. The fused consumer panel dataset may be segmented into a consumer segment based at least in part on the analysis. A consumer segment analysis result may be presented within an interactive user interface 182, where the interactive user interface 182 may enable a user to repeat the analysis using an altered segmentation criterion. The fused consumer panel dataset may then be segmented into a second consumer segment, based at least in part on the analysis using the altered segmentation criterion. In addition, a second consumer segment analysis result may be presented within the interactive user interface 182.

In embodiments, the consumer segment analysis may be published to a presentation-ready format, where the presentation-ready format may be a table, a chart, a spreadsheet, a text, and the like. In addition, the presentation-ready format may have a presentation software file format. The altered segmentation criterion may be an altered geography, an altered product attribute, a nutritional level altered product attribute, an altered consumer attribute, an altered consumer attribute associated with a consumer geography, and the like. The product attribute may be a brand, a product category, based at least in part on a SKU, and the like. The product attribute may be a physical attribute, such as a flavor, a scent, a packaging type, a product launch date, a display location, and the like. The consumer attribute may be a consumer category, where the consumer category is a core account shopper, a non-core account shopper, a top-spending shopper, and the like, and the consumer attribute may be a consumer demographic, a consumer behavior, a consumer life stage, a retailer-specific customer attribute, an ethnicity, an income level, the presence of a child, an age of a child, a marital status, an educational level, a job status, a job type, a pet ownership status, a health status, a wellness status, media usage type, a media usage level, a technology usage type, a technology usage level, a household member attitude, a user-created custom consumer attribute, and the like. The altered segmentation criterion may be an altered household demographic, where the household demographic is an ethnicity, an income level, the presence of a child, an age of a child, a marital status, an educational level, a job status, a job type, a pet ownership status, a health status, a wellness status, a media usage type, a media usage level, a technology usage type, a technology usage level, a household member attitude, a user-created custom household demographic, and the like.

In embodiments, the present invention may provide shopper insights, where manufacturers, consumers, retailers, and shoppers may meet and collaborate. Manufacturers be asked to assume a lead role in shopper marketing efforts for their retailer partners. This may require a new, more complex level of collaboration with retailers, which in turn may require an understanding of the shoppers who are making product purchase decisions either at home or in the store. Questions that may need to be answered about shoppers include who are they, why did they choose to come to this store today, did they plan to buy this category, what else did they plan to buy, what else did they actually buy, why did they buy it, what type of promotions appeal to them, and the like. The present invention may answer these questions and help to interpret and validate consumer and shopper insights gained from other sources. Some advantages of the present invention may include providing new insights and leading to stronger retailer relationships and improved business results, saving time, scalability across brands and retailers, increasing productivity and establishing consistency, enhanced visualization and interactivity, providing a more pleasant user experience, and the like.

In embodiments, the present invention may provide continuous access to consumer data, enriched with a powerful set of attributes and measures that deepen a manufacturer's understanding of all products on the market, the shopping trips on which they are purchased, the shoppers who buy them, and the consumers who use them. Product attributes may include nutrition facts, physical attributes (e.g., flavor/scent, pack type), product launch date, and the like. Shopping trip attributes may include trip mission coding segmentation, basket size, day of week, and the like. Shopper attributes may include core vs. non-core account shoppers, top spending shoppers, and any number of retailer-specific segmentation schemes that may be available. Consumer attributes may include standard household demographics (e.g., age, income, ethnicity), custom demographics, attitudinal or behavior segmentations (based on syndicated IRI or client-specific surveys), and the like.

In embodiments, the present invention may use a rapid calculation engine to perform complex queries, create dynamic shopper and buyer groups, produce presentation-ready worksheets and decks in seconds or minutes vs. hours or days, and the like. The present invention may use a single panel database that includes data for all categories and all geographies, at all levels of detail. This may enable near-immediate sharing of best practice analyses and reports by adding or switching categories or geographies, as needed.

In embodiments, the present invention may provide analyses and reports that are available in both table and chart form, and may enable users to interact and explore by drilling, pivoting, filtering, grouping, sorting, conditionally formatting, zooming, and the like. This may allow users to personalize their analysis methods to suit their own style and pace, which may result in a more effective, higher-impact insight.

In embodiments, the present invention provide a combination of detailed information about panelists, including item and basket purchase, the location of their purchase, their profiles, and their geographical location, and merging it with other data sources such as survey responses, media exposure, and the like. All of this information may be available to the user at a granular level.

Figure 77:
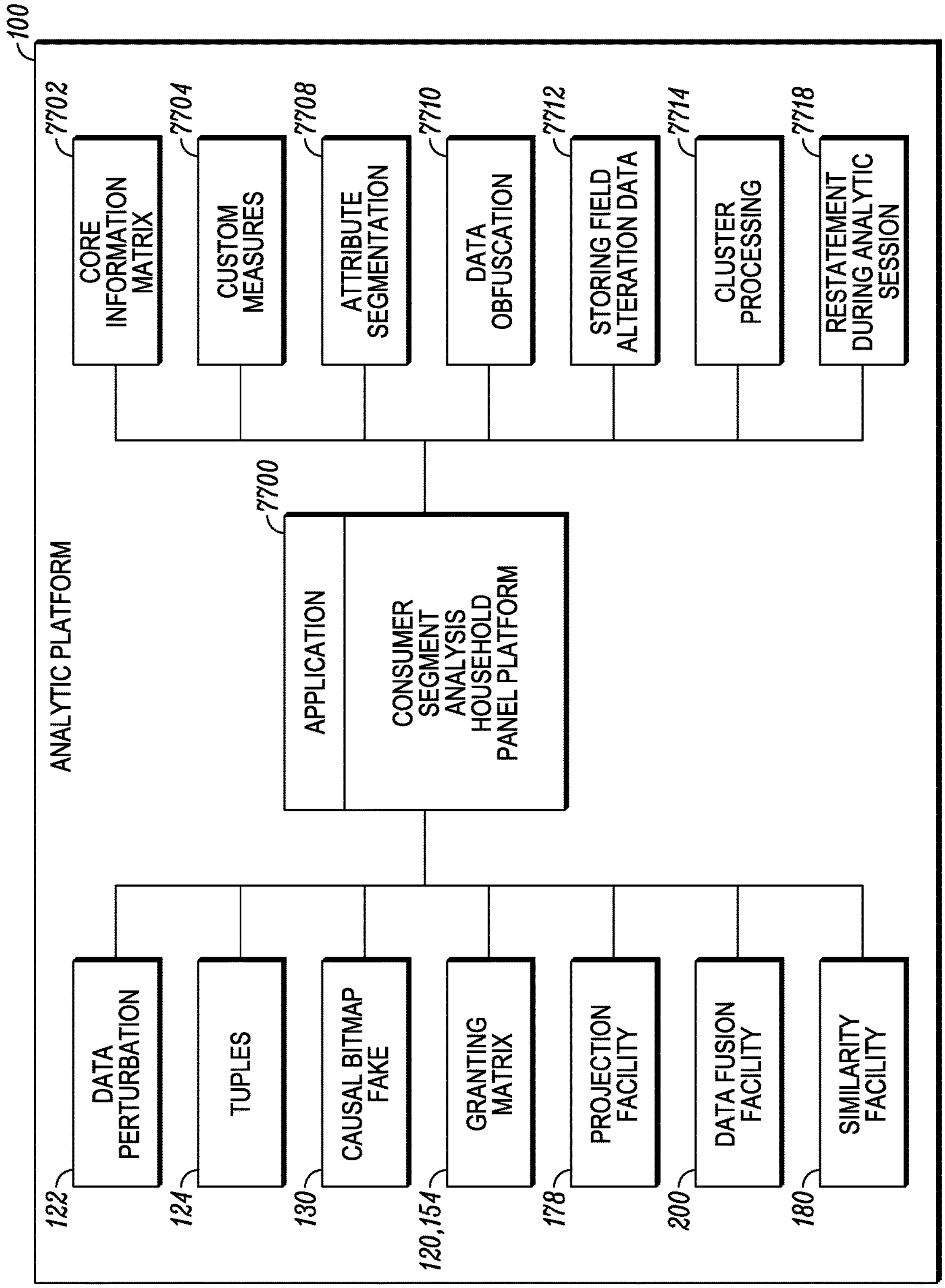
FIG. 77 depicts a consumer segment analysis application.

Referring to FIG. 77, in embodiments, non-unique values may be found in a data table, the data table associated with a household panel data set. The non-unique values may be perturbed to render unique values. In addition, the non-unique value may be used as an identifier for a data item in the household panel data set, where the household panel data set may be used for an analytic purpose relating to analyzing motivations of a customer segment to purchase products.

In embodiments, a projected facts table may be taken in a household panel data set that has one or more associated dimensions. At least one of the dimensions may be selected to be fixed, where the selection of a dimension may be based on an analytic purpose relating to analyzing motivations of a customer segment to purchase products. In addition, an aggregation of projected facts may be produced from the projected facts table and associated dimensions, where the aggregation may fix the selected dimension for the purpose of allowing queries on the aggregated household panel data set.

In embodiments, a plurality of data sources may be identified having data segments of varying accuracy, where the data sources may contain data relevant to an analytic purpose relating to analyzing motivations of a customer segment to purchase products. A plurality of overlapping data segments may be identified among the plurality of data sources to use for comparing the data sources. A factor may be calculated as a function of the comparison of the overlapping data segments. In addition, the factor may be applied to update a household panel data set containing at least one of the data sources.

In embodiments, a data field characteristic of a data field may be altered in a data table of a household panel data set, where the alteration may generate a field alteration datum. The field alteration datum associated with the alteration may be saved in a data storage facility. A query requiring the use of the data field may be submitted in the household panel data set, where a component of the query may consist of reading the field alteration data and the query may relate to an analytic purpose related to analyzing motivations of a customer segment to purchase products. In addition, the altered data field may be read in accordance with the field alteration data.

In embodiments, a household panel data set may be stored in a partition within a partitioned database, where the partition may be associated with a data characteristic of the household panel data set. A master processing node may be associated with a plurality of slave nodes, where each of the plurality of slave nodes may be associated with a partition of the partitioned database. An analytic query relating to analyzing motivations of a customer segment to purchase products may be submitted to the master processing node. In addition, the query may be processed by the master node assigning processing steps to an appropriate slave node.

In embodiments, a household panel data set may be received, where the household panel data set may include facts relating to items perceived to cause actions. In some embodiments, the household panel data set may include data attributes associated with the fact data stored in the household panel data set. A plurality of the combinations of a plurality of fact data and associated data attributes may be pre-aggregated in a causal bitmap. A subset of the pre-aggregated combinations may be selected based on suitability of a combination for an analytic purpose relating to analyzing motivations of a customer segment to purchase products. In addition, the subset of pre-aggregated combinations may be stored to facilitate querying of the subset.

In embodiments, an availability condition associated with a data hierarchy may be specified in a database, where the data hierarchy may include a household panel data set. In some embodiments, the availability condition relating to the availability of data in the household panel data set for an analytic purpose may relate to analyzing motivations of a customer segment to purchase products. The availability condition may be stored in a matrix. In addition, the matrix may be used to determine access to the household panel data set in the data hierarchy.

In embodiments, a household panel data set may be taken having a plurality of dimensions. A dimension of the household panel data set may be fixed for purposes of pre-aggregating the data in the household panel data set for the fixed dimension, where the fixed dimension may be selected based on suitability of the pre-aggregation to facilitate rapidly serving an analytic purpose relating to analyzing motivations of a customer segment to purchase products. In addition, an analytic query of the household panel data set may be allowed, where the query may be executed using pre-aggregated data if the query does not seek to vary the fixed dimension and the query is executed on the un-aggregated household panel data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action may associate the data sets received in the data fusion facility with a standard population database. In addition, data from the data sets received in the data fusion facility may be fused into a new fused household panel data set based at least in part on a key, where the key may embody at least one association between the standard population database and the data sets received in the data fusion facility. In some embodiments, the household panel data set may be intended to be used for an analytic purpose relating to analyzing motivations of a customer segment to purchase products.

In embodiments, a classification scheme associated with a plurality of attributes of a grouping of items may be identified in a household panel data set. A dictionary of attributes associated with the items may be identified. A similarity facility may be used to attribute additional attributes to the items in the household panel data set based on probabilistic matching of the attributes in the classification scheme and the attributes in the dictionary of attributes. In addition, the modified household panel data set may be used for an analytic purpose relating to analyzing motivations of a customer segment to purchase products.

In embodiments, certain data in a household panel data set may be obfuscated to render a post-obfuscation household panel data set, where access to which may be restricted along at least one specified dimension. In addition, the post-obfuscation household panel data set may be analyzed to produce an analytic result, where the analytic result may be related to analyzing motivations of a customer segment to purchase products and may be based in part on information from the post-obfuscation household panel data set while keeping the restricted data from release.

In embodiments, an analytic platform may be provided for executing queries relating to an analytic purpose relating to analyzing motivations of a customer segment to purchase products. A household panel data set may be received in the analytic platform. A new calculated measure that is associated with the household panel data set may be added to create a custom data measure, where the custom data measure may be added during a user's analytic session. An analytic query requiring the custom data measure may be submitted during the user's analytic session. An analytic result based at least in part on analysis of the custom data measure may be presented during the analytic session.

In embodiments, a new data hierarchy associated with a household panel data set in an analytic platform may be added to create a custom data grouping, where the new data hierarchy may be added during a user's analytic session. In addition, handling of an analytic query relating to analyzing motivations of a customer segment to purchase products that uses the new data hierarchy may be facilitated during the user's analytic session.

In embodiments, a household panel data set may be taken from which it is desired to obtain a projection for an analytic purpose relating to analyzing motivations of a customer segment to purchase products. A core information matrix may be developed for the household panel data set, where the core information matrix may include regions representing the statistical characteristics of alternative projection techniques that can be applied to the household panel data set. In addition, a user interface may be provided whereby a user can observe the regions of the core information matrix to facilitate selecting an appropriate projection technique.

In embodiments, a household panel data set may be taken from which it is desired to obtain a projection, where a user of an analytic platform may select at least one dimension on which the user wishes to make a projection from the household panel data set. In some embodiments, the projection may be for an analytic purpose relating to analyzing motivations of a customer segment to purchase products. A core information matrix may be developed for the household panel data set, where the core information matrix may include regions representing the statistical characteristics of alternative projection techniques that can be applied to the household panel data set, including statistical characteristics relating to projections using any selected dimensions. In addition, a user interface may be provided whereby a user can observe the regions of the core information matrix to facilitate selecting an appropriate projection technique.

In embodiments, the present invention provides an automated analytic platform 100, associating a product characteristic dataset with a fused household panel dataset, wherein the datasets used in the fused dataset are derived from known geographies. An unknown geography may be selected for which a projection may be sought, wherein a set of attributes for the unknown geography maybe known. The fused consumer panel dataset may be analyzed using the automated analytic platform 100, where the analysis populates a matrix with values based at least in part on the association between a product characteristic and a household panel characteristic. A statistical characteristic may be received for a data projection; and selecting a calculation that may produce the data projection with the statistical characteristic, the values may be selected from the matrix as an input to the calculation. The data projection may be generated by performing the calculation, and storing a coefficient derived from the data projection in a centralized database, wherein the database may be accessible to users throughout an organization based at least in part on a permission provided within a granting matrix. An effect in the unknown geography may be simulated based at least in part on adjusting the product attributes included in a product attribute model, where the product attribute model may project an effect of a modeled product attribute on a consumer segment. A consumer segment effect may then be forecasted for the product attribute model, publishing the forecast for access by a user of a user group, and presenting the forecast to the user within a user interface 182.

In embodiments, the simulation may be iterated for the effect based at least in part on a statistical criterion, where the statistical criterion may be a goodness of fit, a colinearity between independent variables used in the data projection, model stability. validity, an independent variable, a residual, a user-specified criterion, and the like. The simulation may be iterated for the effect based at least in part on a temporal criterion, where the temporal criterion is a fiscal year, a user-specified time period, and the like. The consumer segment effect may be a projected consumer spending amount, a projected number of store trips, a projected consumer spending amount per store trip, a projected share-of-wallet, and the like. The product attribute may be a nutritional level, a brand, a price, a product category, based at least in part on a SKU, and the like. The product attribute may be a physical attribute, such as a flavor, a scent, a packaging type, a product launch date, a display location, and the like. The consumer segment may be a consumer geography, a consumer category, a core account shopper consumer category, a non-core account shopper consumer category, a top-spending shopper consumer category, a consumer demographic, a consumer behavior, a consumer life stage, a retailer-specific customer segment, and the like. The analytic results may also be summarized in a report. Household demographic may be an ethnicity, an income level, the presence of a child, an age of a child, a marital status, an educational level, a job status, a job type, a pet ownership status, a health status, a wellness status, a media usage type, a media usage level, a technology usage type, a technology usage level, a household member attitude, a user-created custom household demographic, and the like.

In embodiments, the present invention may provide shopper insights, where manufacturers, consumers, retailers, and shoppers may meet and collaborate. Manufacturers be asked to assume a lead role in shopper marketing efforts for their retailer partners. This may require a new, more complex level of collaboration with retailers, which in turn may require an understanding of the shoppers who are making product purchase decisions either at home or in the store. Questions that may need to be answered about shoppers include who are they, why did they choose to come to this store today, did they plan to buy this category, what else did they plan to buy, what else did they actually buy, why did they buy it, what type of promotions appeal to them, and the like. The present invention may answer these questions and help to interpret and validate consumer and shopper insights gained from other sources. Some advantages of the present invention may include providing new insights and leading to stronger retailer relationships and improved business results, saving time, scalability across brands and retailers, increasing productivity and establishing consistency, enhanced visualization and interactivity, providing a more pleasant user experience, and the like.

In embodiments, the present invention may provide continuous access to consumer data, enriched with a powerful set of attributes and measures that deepen a manufacturer's understanding of all products on the market, the shopping trips on which they are purchased, the shoppers who buy them, and the consumers who use them. Product attributes may include nutrition facts, physical attributes (e.g., flavor/scent, pack type), product launch date, and the like. Shopping trip attributes may include trip mission coding segmentation, basket size, day of week, and the like. Shopper attributes may include core vs. non-core account shoppers, top spending shoppers, and any number of retailer-specific segmentation schemes that may be available. Consumer attributes may include standard household demographics (e.g., age, income, ethnicity), custom demographics, attitudinal or behavior segmentations (based on syndicated IRI or client-specific surveys), and the like.

In embodiments, the present invention may use a rapid calculation engine to perform complex queries, create dynamic shopper and buyer groups, produce presentation-ready worksheets and decks in seconds or minutes vs. hours or days, and the like. The present invention may use a single panel database that includes data for all categories and all geographies, at all levels of detail. This may enable near-immediate sharing of best practice analyses and reports by adding or switching categories or geographies, as needed.

In embodiments, the present invention may provide analyses and reports that are available in both table and chart form, and may enable users to interact and explore by drilling, pivoting, filtering, grouping, sorting, conditionally formatting, zooming, and the like. This may allow users to personalize their analysis methods to suit their own style and pace, which may result in a more effective, higher-impact insight.

In embodiments, the present invention provide a combination of detailed information about panelists, including item and basket purchase, the location of their purchase, their profiles, and their geographical location, and merging it with other data sources such as survey responses, media exposure, and the like. All of this information may be available to the user at a granular level.

Figure 78:
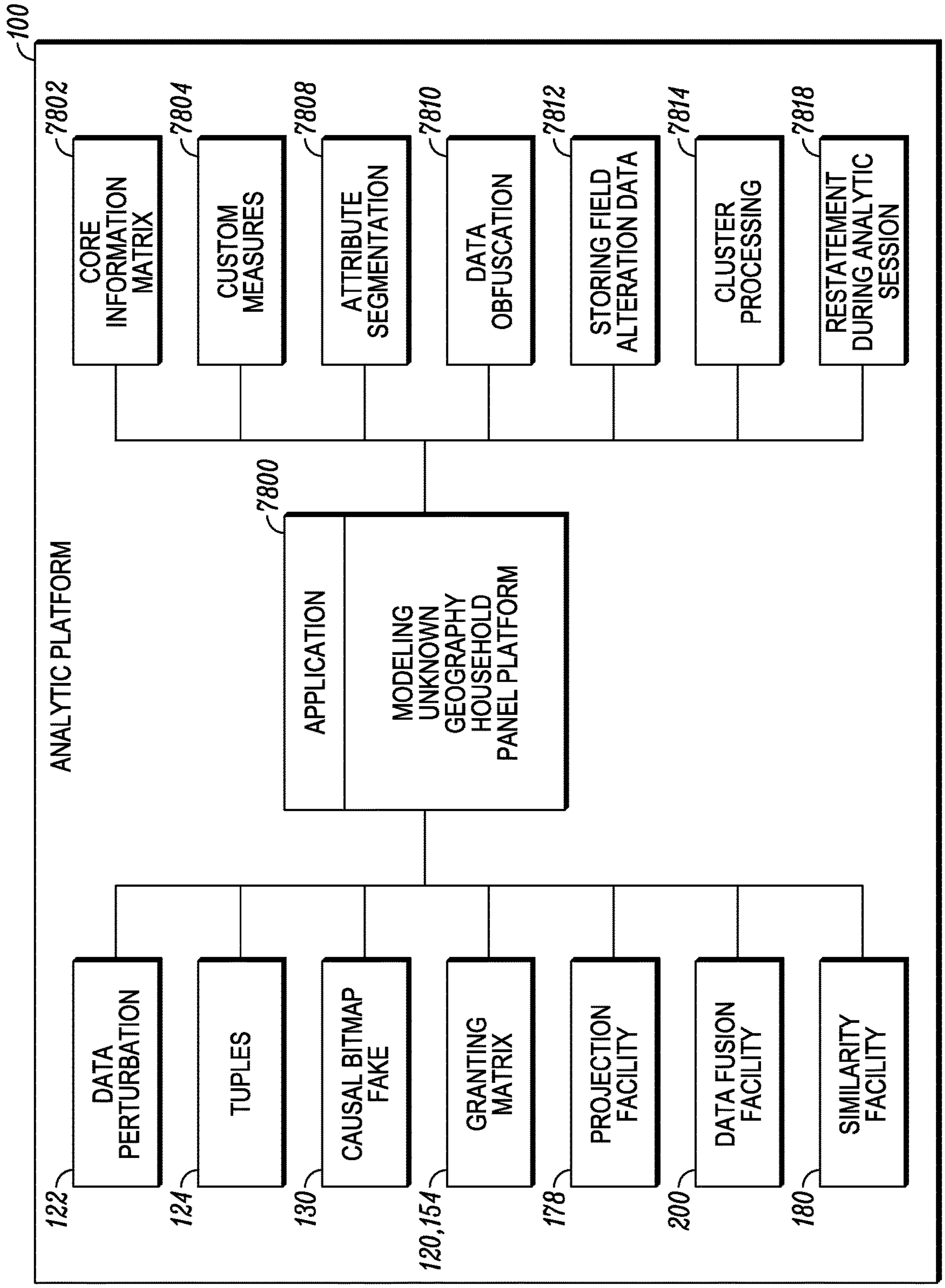
FIG. 78 depicts an unknown geography modeling application.

Referring to FIG. 78, in embodiments, non-unique values in a data table may be found, where the data table may be associated with a household panel data set. The non-unique values may be perturbed to render unique values. In addition, the non-unique value may be used as an identifier for a data item in the household panel data set, where the household panel data set may be used for an analytic purpose relating to modeling consumer activity with respect to a geography for which consumer activity may be unknown.

In embodiments, a projected facts table in a household panel data set that has one or more associated dimensions may be taken. At least one of the dimensions may be fixed, where the selection of a dimension may be based on an analytic purpose may be related to modeling consumer activity with respect to a geography for which consumer activity may be unknown. In addition, an aggregation of projected facts may be produced from the projected facts table and associated dimensions, where the aggregation of the selected dimension may be fixed for the purpose of allowing queries on the aggregated household panel data set.

In embodiments, a plurality of data sources may be identified having data segments of varying accuracy, where the data sources may contain data relevant to an analytic purpose may be related to modeling consumer activity with respect to a geography for which consumer activity may be unknown. A plurality of overlapping data segments may be identified among the plurality of data sources to use for comparing the data sources. A factor may be calculated as a function of the comparison of the overlapping data segments. In addition, the factor may be applied to update a household panel data set containing at least one of the data sources.

In embodiments, a data field characteristic of a data field in a data table of a household panel data set may be altered, where the alteration generates a field alteration datum. The field alteration datum associated with the alteration may be saved in a data storage facility. A query may be submitted requiring the use of the data field in the household panel data set, where a component of the query consists of reading the field alteration data and the query relates to an analytic purpose related to modeling consumer activity with respect to a geography for which consumer activity may be unknown. In addition, the altered data field may read in accordance with the field alteration data.

In embodiments, a household panel data set may be stored in a partition within a partitioned database, where the partition may be associated with a data characteristic of the household panel data set. A master processing node may be associated with a plurality of slave nodes, where each of the plurality of slave nodes may be associated with a partition of the partitioned database. An analytic query relating to modeling consumer activity with respect to a geography for which consumer activity may be unknown may be submitted to the master processing node. In addition, the query may be processed by the master node assigning processing steps to an appropriate slave node.

In embodiments, a household panel data set may be received, where the household panel data set may include facts relating to items perceived to cause actions, where the household panel data set includes data attributes associated with the fact data stored in the household panel data set. A plurality of the combinations of a plurality of fact data and associated data attributes may be pre-aggregated in a causal bitmap. A subset may be selected of the pre-aggregated combinations based on suitability of a combination for an analytic purpose relating to modeling consumer activity with respect to a geography for which consumer activity may be unknown. In addition, the subset of pre-aggregated combinations may be stored to facilitate querying of the subset.

In embodiments, an availability condition associated with a data hierarchy in a database may be specified, where the data hierarchy may include a household panel data set, where the availability condition may be related to the availability of data in the household panel data set for an analytic purpose relating to modeling consumer activity with respect to a geography for which consumer activity may be unknown. The availability condition may be stored in a matrix; and the matrix may be used to determine assess to the household panel data set in the data hierarchy.

In embodiments, a household panel data set having a plurality of dimensions may be taken. A dimension of the household panel data set may be fixed for purposes of pre-aggregating the data in the household panel data set for the fixed dimension, where the fixed dimension may be selected based on suitability of the pre-aggregation to facilitate rapidly serving an analytic purpose relating to modeling consumer activity with respect to a geography for which consumer activity may be unknown. In addition, an analytic query of the household panel data set may be allowed, where the query may be executed using pre-aggregated data if the query does not seek to vary the fixed dimension and the query may be executed on the un-aggregated household panel data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused household panel data set based at least in part on a key, where the key embodies at least one association between the standard population database and the data sets received in the data fusion facility, where the household panel data set may be intended to be used for an analytic purpose relating to modeling consumer activity with respect to a geography for which consumer activity may be unknown.

In embodiments, a classification scheme associated with a plurality of attributes of a grouping of items in a household panel data set may be identified. A dictionary of attributes associated with the items may be identified. A similarity facility may be used to attribute additional attributes to the items in the household panel data set based on probabilistic matching of the attributes in the classification scheme and the attributes in the dictionary of attributes. In addition, the modified household panel data set may be used for an analytic purpose relating to modeling consumer activity with respect to a geography for which consumer activity may be unknown.

In embodiments, certain data in a household panel data set may be obfuscated to render a post-obfuscation household panel data set, access to which may be restricted along at least one specified dimension. In addition the post-obfuscation household panel data set may be analyzed to produce an analytic result, where the analytic result may be related to modeling consumer activity with respect to a geography for which consumer activity may be unknown and may be based in part on information from the post-obfuscation household panel data set while the restricted data may be kept from release.

In embodiments, an analytic platform may be provided for queries that may be executed relating to an analytic purpose relating to modeling consumer activity with respect to a geography for which consumer activity may be unknown. A household panel data set may be received in the analytic platform. A new calculated measure may be added that may be associated with the household panel data set to create a custom data measure, where the custom data measure may be added during a user's analytic session. An analytic query may be submitted requiring the custom data measure during the user's analytic session. In addition, an analytic result may be presented based at least in part on analysis of the custom data measure during the analytic session.

In embodiments, a new data hierarchy associated with a household panel data set in an analytic platform may be added to create a custom data grouping, where the new data hierarchy may be added during a user's analytic session. In addition, handling of an analytic query relating to modeling consumer activity may be facilitated with respect to a geography for which consumer activity may be unknown that uses the new data hierarchy during the user's analytic session.

In embodiments, a household panel data set may be taken from which it may be desired to obtain a projection for an analytic purpose relating to modeling consumer activity with respect to a geography for which consumer activity may be unknown. A core information matrix for the household panel data set may be developed, where the core information matrix for regions representing the statistical characteristics of alternative projection techniques that can be applied to the household panel data set may be included. In addition, a user interface may be provided whereby a user can observe the regions of the core information matrix to facilitate selecting an appropriate projection technique.

In embodiments, a household panel data set may be taken from which it may be desired to obtain a projection, where a user of an analytic platform may select at least one dimension on which the user wishes to make a projection from the household panel data set, where the projection may be for an analytic purpose may be related to modeling consumer activity with respect to a geography for which consumer activity may be unknown. A core information matrix may be developed for the household panel data set, where the core information matrix may include regions representing the statistical characteristics of alternative projection techniques that can be applied to the household panel data set. Statistical characteristics relating to projections using any selected dimensions may be included. In addition, a user interface may be provided whereby a user can observe the regions of the core information matrix to facilitate an appropriate projection technique may be selected.

An analytic platform may facilitate a media data enabling several systems and analytic services, helping decide which types of media make the most sense: TV, print, radio, out-of-home, interactive. An analytic platform can integrate all of the above media sources, plus additional media including digital, internet, blogs, and others. An analytic platform solution may integrate all client preferred media streams with additional POS and panel data for sophisticated modeling. Media-related modeled analyses may include media response, allocation, halo effect, wear-out, and the like. The platform may provide regular data and analytic capability over several product cycles, such as weekly data over three or more years. Additionally, media data and analysis may be provided in a customizable web-based interface or in supplier-supported web interfaces.

Vast consumer choice offers an opportunity to re-imagine media planning by integrating media behavior with consumer offline behavior from a variety of sources including POS, consumer panel, retailer frequent shopper program (FSP) data, and other sources. Integrating disparate consumer media choices onto one platform provides ROI accountability, such as for integrated marketing and communication plans. The analytic platform may expertly integrate across traditional linear mass media (TV, Print, Radio, OOH) and new and emerging media providers (Tivo, comScore, Charter Communications) to measure non-linear and on-demand media. This may result in integrating the on-demand consumer in a non-linear media world (Interactive, Video on Demand, DVRs, targetable advertising and the like) with traditional media consumption, providing one consolidated view that generates multiple optimization and targeting opportunities.

An analytic platform may provide a platform for both new and emerging media consumer behavior to be linked back to consumer buying behavior (POS, Panel, FSP) or custom segmentations to get beyond age/sex media planning to put the consumer at the center of all media measurement.

The analytic platform supports a variety of media inputs for use in modeling, testing and making decisions on the appropriate media vehicles. Data integration via an analytic platform may create an effective view of total market performance. Media data from provides such as TV media research companies, print media researchers, internet data, digital video recorder marketing data, blogosphere data, sports marketing data, and the like may be input to the analytic platform to fulfill a broad marketing data mix. TV data may allow for determining reach and frequency and may facilitate calculating log and polynomial distributed lags. Print data may facilitate flowcharting weekly-level detail, lag effect, and distribution curves. Internet data may facilitate determining reach as a function of impressions and/or frequency. DVR data may facilitate understanding the impact of DVR on commercial viewing and skipping behavior. Blogosphere data may facilitate analysis that incorporates blog awareness, chat room, and conversation volume information. Sports marketing may help analysis of stadium advertising, auto racing, and the like by calculating both impressions delivered from any sports marketing event and the quality of that impression (e.g. time on screen and quality of images). A wide variety of other media data sources may be provide to and analyzed by the analytic platform including radio, coupon data for coupon circulation and value (e.g. redemption and/or face value), email, text messaging, branded entertainment event variables, and out-of-home event variables.

As effectiveness of traditional advertising continues to decline, manufacturers are turning to alternate forms of communication to engage consumers. For example, household use of DVRs can reduce sales response in price sensitive categories like paper goods by nearly 8% and reduce trial response for new products by up 10%.

Increasingly, progressive marketers are shifting budgets from traditional advertising to new and emerging media, especially online and interactive media. Many industry forecasts suggest that companies will reallocate 15-25% of the advertising budgets, currently allocated primarily to TV, to new and emerging media forms to improve media effectiveness and overall ROI.

The analytic platform may receive input from a wide variety of sources to facilitate advanced measurement of new media. By facilitating deep consumer insights, world-class analytics and data integration capabilities to quantify "Return on Media Investments" across both traditional and new media, including non-linear media such as Interactive, Video on Demand, Blogs and Social Networks, and DVRs, the analytic platform offers broad media value to users.

These new data sources recognize the emergence of the on-demand consumer newly empowered by technology. Therefore the analytic platform may provide linkage of their media behavior to offline and online buying. The on-demand consumer leverages technology to control their content selection and consumers may avoid irrelevant messaging. The analytic platform facilitates marketers adjusting from a push to a pull advertising model. This may also leading to continued fragmentation as consumers gain control of the message.

The analytic platform may provide a new model that supports an 'experiment, model, and track' approach that exploits the depth and breadth of consumer behavior and integrates that media data onto one platform for a total market view. As an example non-linear media (e.g., the impact of DVRs) may be leveraged to experiment with interactive TV and Mobile advertising.

The analytic platform may facilitate quantifying the ROI of interactive, targetable TV with mobile messaging, commercial ratings, commercial interaction, and video on demand requests by integrating this new media data with traditional advertising inputs to provide a total market view of consumers' interaction with this new media.

This new form of advertising offers new channels for promotion, retailer cooperation, and sampling. Real-time consumer feedback such as 'Request For Information' can be seamlessly integrated on the analytic platform to measure consumer effectiveness and optimize those programs based on various measures of media and purchase efficacy. The analytic platform may provide an ROI measurement capability to holistically understand consumer engagement and compare ROI across multiple media types and channels. This may facilitate establishing a unified approach for allocation of overall media spend across traditional and new media channels.

Digital video recorder data may allow detailed analysis of the impact that DVRs have on viewing habits and product sales. This may guide advertisers in effective reallocation of traditional TV advertising spend to other mediums such as in-store. This may facilitate experimenting with both existing and new media before launching new marketing programs nationally.

Aspect of the analytic platform may facilitate linking sales with exposure to linear media, and understanding viewing and sales response to non-linear media like Video on Demand and Interactive.

Internet use data may allow the platform to facilitate detailed analysis of the impact of Internet use and of ad exposure on product sales. The analytic platform may include the following capabilities: a single source internet tracking for sales response models; determining what websites attract buyers or key prospects; deep-dive profiling and ROI of internet data; creating a consumer profile of households that are exposed to advertisements and determine if they actually generate sales.

Figure 79:
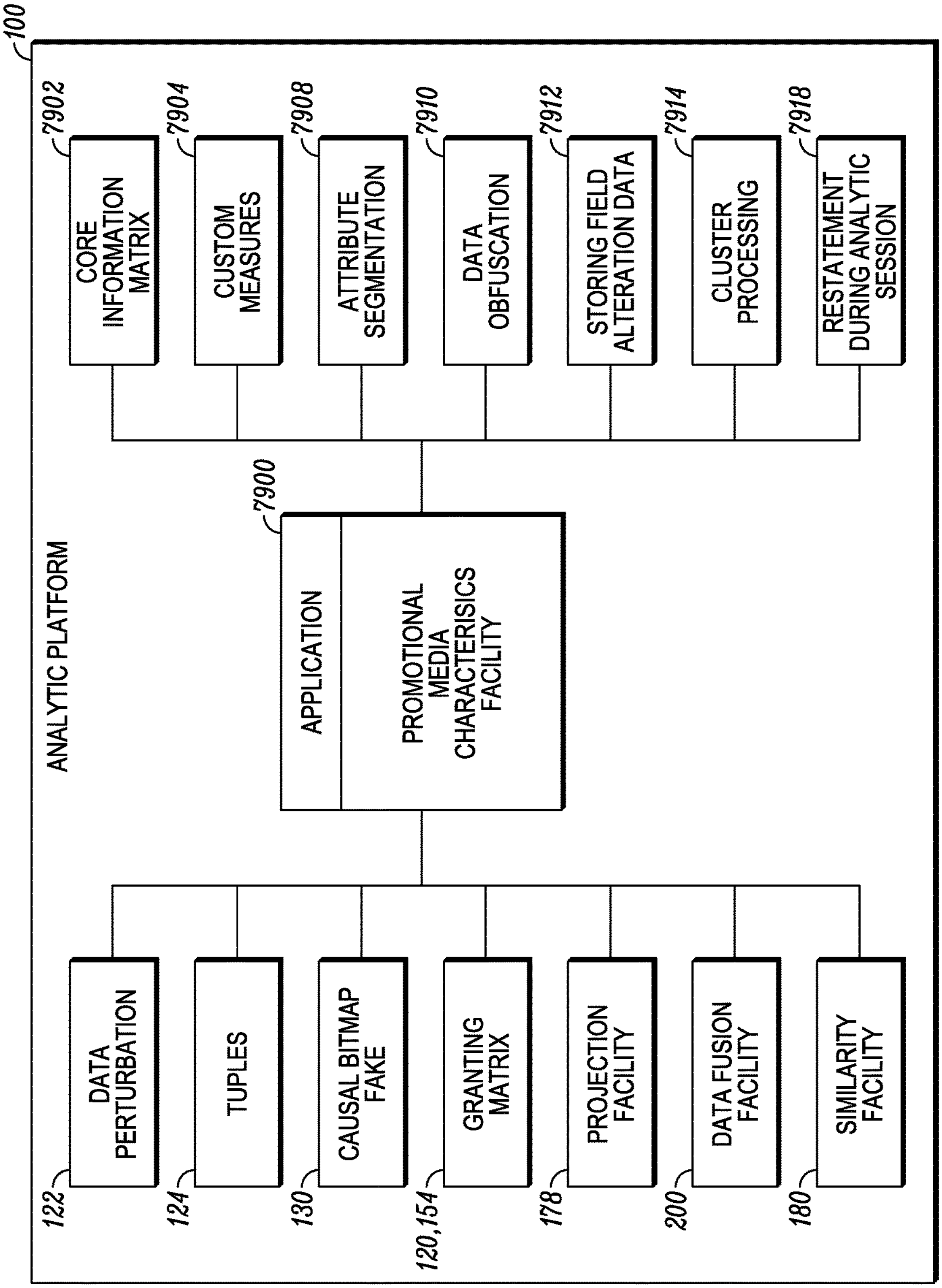
FIG. 79 depicts a promotional media characteristics application.

Referring to FIG. 79, which depicts a media data application of the analytic platform methods and systems, an analytic platform 100 may associate a promotional media characteristic dataset with a fused consumer panel dataset, wherein the datasets used in the fused dataset are derived from known geographies. The fused consumer panel dataset may be analyzed using the analytic platform 100, wherein the analysis populates a matrix with values based at least in part on the association between a promotional media characteristic and a consumer panel characteristic. A statistical characteristic of a data projection may be received by a projection facility that may be associated with the analytic platform 100. A calculation may be selected so that the calculation produces a data projection with the statistical characteristic. At least one of the values from the matrix may be selected as an input to the calculation, and the data projection may be projected by the projection facility by performing the calculation. A coefficient derived from the data projection may be stored in a centralized database, wherein the database is accessible to users throughout an organization based at least in part on a permission provided within a granting matrix.

An unknown geography for which a projection is sought may be selected, wherein a set of attributes for the unknown geography is known. The analytic platform may be used to simulate an effect on a consumer segment in the unknown geography based at least in part on adjusting a promotional media model, wherein the effect of the promotional media model on the consumer segment is based at least in part on an alternation of a promotional media characteristic.

An effect of a marketing mix model may be forecast by aspects of the analytic platform 100 to produce a marketing mix forecast. The forecast may be published for access through a user interface 182 by a user of a user group.

The effect of a marketing media model may be a return-on-investment, a promotional effectiveness metric, and the like. The promotional media characteristic may relate to a media type, may be one or more of a television advertisement, a radio advertisement, a print advertisement, a trade publication advertisement, a price reduction, an in-store display, a coupon, an in-store program, an Internet advertisement, a billboard advertisement, an interactive advertisement, and any other type of promotion, advertisement, or communication.

The alteration of the promotion media characteristic may be a change from one promotion characteristic to another promotion characteristic. The alteration may be a change in the intensity of a promotion, such as a frequency of advertisement placement or a size of the promotion (e.g. an area of a print advertisement, an area of an Internet advertisement, or duration of an advertisement). The alteration may be a combination of promotion characteristics.

The consumer segment may be a consumer demographic, a consumer behavior, a consumer life stage, a retailer-specific customer segment, a consumer geography or a consumer category, such as a core account shopper, a non-core account shopper, a top-spending shopper, and the like.

The forecast may be summarized in a report.

Alternatively, iterating a simulation of the effect may be based at least in part on a statistical criterion, such as goodness of fit, co-linearity between independent variables used in the data projection, model stability, validity, a standard error of an independent variable, a residual, a user-specified criterion, or other criterion.

Referring to FIG. 79, in embodiments, non-unique values in a data table may be found, where the data table may be associated with a promotional media characteristic data set. The non-unique values may be perturbed to render unique values; and the non-unique value may be used as an identifier for a data item in the promotional media characteristic data set, where the promotional media characteristic data set may be used for an analytic purpose relating to modeling the effect of a promotion on consumer behavior.

In embodiments, a projected facts table may be taken in a promotional media characteristic data set that has one or more associated dimensions. At least one of the dimensions to be fixed may be selected, where the selection of a dimension may be based on an analytic purpose relating to modeling the effect of a promotion on consumer behavior. In addition, an aggregation of projected facts may be produced from the projected facts table and associated dimensions, where the aggregation of the selected dimension for the purpose of allowing queries on the aggregated promotional media characteristic data set may be fixed.

In embodiments, a plurality of data sources having data segments of varying accuracy may be identified, where the data sources may be contained of data relevant to an analytic purpose relating to modeling the effect of a promotion on consumer behavior. A plurality of overlapping data segments may be identified among the plurality of data sources to use for comparing the data sources. A factor may be calculated as a function of the comparison of the overlapping data segments. In addition, the factor may be applied to update a promotional media characteristic data set containing at least one of the data sources.

In embodiments, a data field characteristic of a data field may be altered in a data table of a promotional media characteristic data set, where the alteration generates a field alteration datum. The field alteration datum associated with the alteration may be saved in a data storage facility. A query requiring the use of the data field in the promotional media characteristic data set may be submitted, where a component of the query consists of reading the field alteration data and the query relates to an analytic purpose related to modeling the effect of a promotion on consumer behavior. In addition, the altered data field may be read in accordance with the field alteration data.

In embodiments, a promotional media characteristic data set may be stored in a partition within a partitioned database, where the partition may be associated with a data characteristic of the promotional media characteristic data set. A master processing node may be associated with a plurality of slave nodes, where each of the plurality of slave nodes may be associated with a partition of the partitioned database. An analytic query relating to modeling the effect of a promotion on consumer behavior to the master processing node may be submitted. In addition, the query may be processed by the master node assigning processing steps to an appropriate slave node.

In embodiments, a promotional media characteristic data set may be received, where the promotional media characteristic data set may include facts relating to items perceived to cause actions, where the promotional media characteristic data set includes data attributes associated with the fact data stored in the promotional media characteristic data set. A plurality of the combinations of a plurality of fact data and associated data attributes may be pre-aggregated in a causal bitmap. A subset of the pre-aggregated combinations may be selected based on suitability of a combination for an analytic purpose relating to modeling the effect of a promotion on consumer behavior. In addition, the subset of pre-aggregated combinations may be stored to facilitate querying of the subset.

In embodiments, an availability condition associated with a data hierarchy in a database may be specified, where the data hierarchy may include a promotional media characteristic data set, where the availability condition may be related to the availability of data in the promotional media characteristic data set for an analytic purpose relating to modeling the effect of a promotion on consumer behavior. The availability condition may be stored in a matrix; and the matrix may be used to determine assess to the promotional media characteristic data set in the data hierarchy.

A promotional media characteristic data set having a plurality of dimensions may be taken. A dimension of the promotional media characteristic data set may be fixed for purposes of pre-aggregating the data in the promotional media characteristic data set for the fixed dimension. Here the fixed dimension being selected may be rapidly served based on suitability of the pre-aggregation to facilitate an analytic purpose relating to modeling the effect of a promotion on consumer behavior. In addition, an analytic query of the promotional media characteristic data set may be allowed, where the query may be executed using pre-aggregated data if the query does not seek to vary the fixed dimension and the query may be executed on the un-aggregated promotional media characteristic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused promotional media characteristic data set based at least in part on a key, where the key embodies at least one association between the standard population database and the data sets received in the data fusion facility, where the promotional media characteristic data set may be intended to be used for an analytic purpose relating to modeling the effect of a promotion on consumer behavior.

In embodiments, a classification scheme associated with a plurality of attributes of a grouping of items may be identified in a promotional media characteristic data set. A dictionary of attributes associated with the items may be identified. A similarity facility may be used to attribute additional attributes to the items in the promotional media characteristic data set based on probabilistic matching of the attributes in the classification scheme and the attributes in the dictionary of attributes. In addition, the modified promotional media characteristic data set may be used for an analytic purpose relating to modeling the effect of a promotion on consumer behavior.

In embodiments, certain data in a promotional media characteristic data set may be obfuscated to render a post-obfuscation promotional media characteristic data set, access to which may be restricted along at least one specified dimension. In addition the post-obfuscation promotional media characteristic data set may be analyzed to produce an analytic result, where the analytic result may be related to modeling the effect of a promotion on consumer behavior and may be based in part on information from the post-obfuscation promotional media characteristic data set while the restricted data from release may be kept.

In embodiments, an analytic platform may be provided for executing queries relating to an analytic purpose relating to modeling the effect of a promotion on consumer behavior. A promotional media characteristic data set may be received in the analytic platform. A new calculated measure that may be associated with the promotional media characteristic data set may be added to create a custom data measure, where the custom data measure may be added during a user's analytic session. An analytic query requiring the custom data measure may be submitted during the user's analytic session. In addition, an analytic result may be presented based at least in part on analysis of the custom data measure during the analytic session.

In embodiments, a new data hierarchy associated with a promotional media characteristic data set in an analytic platform may be added to create a custom data grouping, where the new data hierarchy may be added during a user's analytic session. In addition, handling of an analytic query relating to modeling the effect of a promotion on consumer behavior that uses the new data hierarchy may be facilitated during the user's analytic session.

In embodiments, a promotional media characteristic data set may be taken from which it may be desired to obtain a projection for an analytic purpose relating to modeling the effect of a promotion on consumer behavior. A core information matrix may be developed for the promotional media characteristic data set, where the core information matrix may include regions representing the statistical characteristics of alternative projection techniques that can be applied to the promotional media characteristic data set. In addition, a user interface whereby a user can observe the regions of the core information matrix may be provided to facilitate selecting an appropriate projection technique.

In embodiments, a promotional media characteristic data set from which it may be desired to obtain a projection may be taken, where a user of an analytic platform may select at least one dimension on which the user wishes to make a projection from the promotional media characteristic data set, where the projection being for an analytic purpose relating to modeling the effect of a promotion on consumer behavior. A core information matrix may be developed for the promotional media characteristic data set, where the core information matrix may include regions representing the statistical characteristics of alternative projection techniques that can be applied to the promotional media characteristic data set. Statistical characteristics relating to projections using any selected dimensions may be included. In addition, a user interface may be provided whereby a user can observe the regions of the core information matrix to facilitate selecting an appropriate projection technique.

Business reporting associated with an analytic platform 100 may support a user interface 182 that facilitates user access to business reporting, such as through a login process. Such a user interface 182 to business reporting may facilitate easy user access to rich attributes and granular data associated with the analytic platform 100 methods and systems. The business reporting interface may be intuitive and facilitate easy navigation to access business reporting features, such as exporting to Microsoft Office applications. It may include rich and attractive graphics that may be tailored to reporting granular data, such as visualization through a suite of relevant report and graph types and an ability to blend text and web pages. Data surfing within business reporting may be facilitated by features of the business reporting interface, such as zoom and the like.

For a user who has a need to produce a simple report, business reporting may include turnkey report capabilities. For a user who has a need to produce an on-demand report, business reporting may provide rapid report building and fast report execution and output. Additional features or capabilities of business reporting may include data extract, building multi-source analysis, user direct alerts (e.g. email, text message, voice message, instant message, and the like) based on user specified criteria that include information (e.g. links) to facilitate direct access to relevant business reports, data-based guided analysis for determining next analysis steps, easily managed analysis and reporting workflows, and the like.

Business reporting may also simplify regular tasks and provide each user with a personalized dashboard upon login that facilitates access to reports and analysis that may be tailored for the user. Such a dashboard may facilitate a user accessing pre-built reports, selecting guided analysis workflow, or building a report from scratch. Pre-built reports may include user specifiable flexibility based at least in part on the flexibility provided in the report and possibly based on user task setting that may be associated with the user login. Pre-built reports may also include a visualization tool that, while reducing report storage requirements, also makes it easier to spot exceptions, trends, or other aspects of the underlying data. Guided analysis work flow may use advanced logic to chart a course through the underlying multi-source data and may be based on the data itself, business rules, user login attributes, and the like. Users may rapidly build a report from scratch, including choosing customization and publishing options.

Business reporting dashboards and reports may exist for a wide variety of users, such as based on user level of experience, user type, and the like. As way of example, business reporting may provide power reporting for power users, flexible reports and extracts for analytic users, published reports for casual users, on-demand reports for ad-hoc users, and nearly any other combination of report and user. Business reporting may provide easy to use dashboards that can be created in a few minutes and personalized to a user while providing fast, easy access to key reports and enabling a user to define alert criteria and select guided analysis. Guided analysis may utilize logical guided analysis that may recommend reports based on data available or selected by the user. Guided analysis can speed the identification of insights associated with the data without the user identifying a specific report or workflow. Business reporting may provide integrated point of sale (POS) panels, loyalty insights, same store sales, custom geo-demographic clustering, automated shipment integration analysis, store or product level data visualization, deep panel insights to facilitate retail collaboration, product and customer attribute analysis, everyday operational analytics, and the like.

Business reporting may include publishing, and may provide a publishing process that may be available through a user interface associated with the analytic platform. Business reporting publishing may facilitate a user selecting publishing criteria that may include a schedule for running and publishing a report, users to receive the report, report manipulation flexibility for each user, delivery format, presentation format, user specific text (e.g. instructions, reference to the author, and the like), and other criteria that facilitates publishing. A report may be published in one or more delivery formats including all Microsoft Office formats, HTML, PDF, and the like. Scheduling execution and publication of reports may benefit users because a published report may be presented to the user within a few seconds of being requested. Requesting a report on-demand, instead of requesting a published report, may take much longer to be presented to the user because the on-demand report must be executed when requested, whereas the published report is pre-executed.

Business reporting may also facilitate logic guided analysis of business related data to facilitate delivering insights into and about the data. Logic guided analysis may use allow a user to set criteria associated with various aspects of the data, reports, events, and the like to determine how to proceed through a data analysis and report workflow. Alternatively, criteria may be determined from prior data analysis activity, such as a frequency of reporting or a frequency of data updates and the like. Criteria may include a default value and a user or the system may override the default value. The criteria may apply to an analytic outcome so that based on results of data analysis and criteria associated with the analysis, the user may be guided to additional analysis workflow steps.

Business reporting may also support smart text reporting. Based on analysis results, one or more smart text elements may be generated and included in a report of the analysis. Smart text may be enabled and used on any of the business reporting outputs including on-demand reports, published reports, logic guided analysis reports, and the like.

Figure 80:
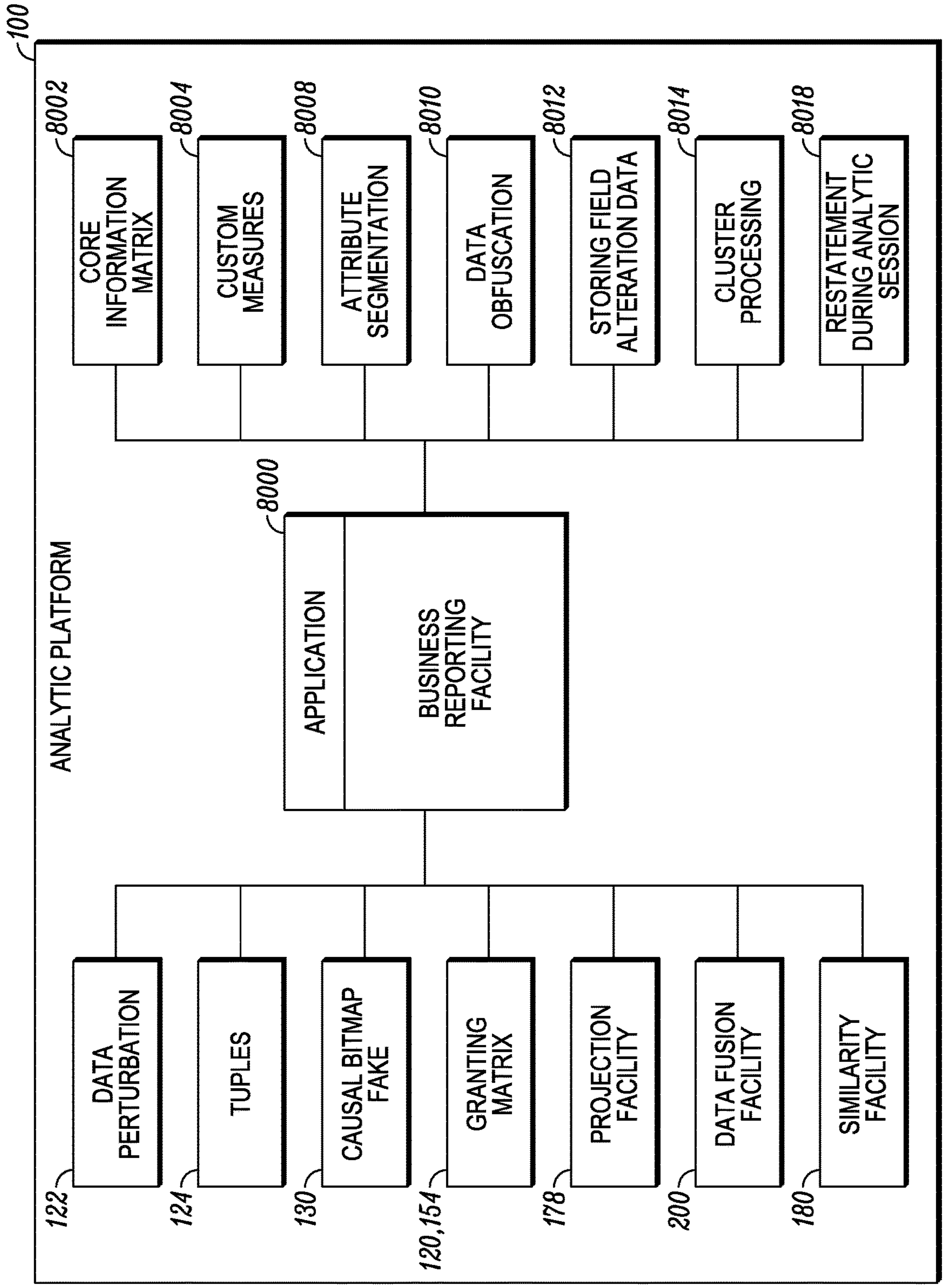
FIG. 80 depicts a business reporting application.

Referring to FIG. 80, which depicts business reporting that may be associated with an analytic platform, a data fusion facility 200 that may be associated with the analytic platform 100 may receive one or more panel data source datasets 198, one or more fact data source datasets 102, one or more dimension data source datasets 104. The data fusion facility 200, as herein described, may associate the received datasets with a standard population database. The datasets received by the data fusion facility 200 may be fused into a consumer panel dataset based at least in part on an encryption key, wherein the encryption key embodies at least one association between the standard population database and the datasets received in the data fusion facility 200.

A logic-based reporting framework may be associated with the fused consumer panel dataset within the analytic platform 100. The logic-based reporting framework may assist a user in a step-by-step rules-based model-building procedure.

Business reporting may facilitate creating and storing a user task setting. The user task setting may be created and/or stored within the analytic platform 100. The user task setting may be associated with a user login setting that may be based at least in part on an availability condition provided within a granting matrix. A user may log onto the platform 100 through a data visualization user interface associated with the analytic platform 100. The logged on user may be presented with a menu of possible analytic actions including creating a user dashboard, viewing a pre-built report, participating in a guided analysis, or a building an analysis. The logged on user may be restricted to selecting only those possible analytic actions for which the user is granted permission by the availability condition. Using the data visualization user interface, the logged on user be permitted to perform a subset of analysis tasks. The subset of analysis tasks may be determined based at least in part on the logged on user's task setting.

The fused consumer panel dataset may be analyzed with the analytic platform 100 to produce one or more of a pre-built report, a guided analysis, or a self-built analysis.

Based at least in part on the type of user selected analysis, a matrix with values may be populated.

A data projection may be generated in a projection facility by performing a calculation on at least one of the values of the matrix. The calculation to be performed may be selected based on it producing a data projection with a predetermined statistical characteristic. The projection and a projection output may be stored. The projection output may also be presented to the logged on user through the data visualization user interface. The presentation may be a multimedia presentation.

A projection report based at least in part on the projection output and a defined report criterion may be published as herein described.

The fused panel dataset may include data relating to a store attribute or to a product attribute, such as a nutritional level, a brand, a price, a product category, a physical attribute, a flavor, a scent, a packaging type, a product launch date, display location. The product attribute may also be based at least in part on a SKU.

The fused panel dataset may include data relating to a consumer attribute. The consumer attribute may be a consumer geography, a consumer category (e.g. a core account shopper, a non-core account shopper, or a top-spending shopper), a consumer demographic, a consumer behavior, a consumer life stage, a retailer-specific customer attribute, an ethnicity, an income, the presence of a child, an age of a child, a marital status, an educational level, a job status, a job type, a pet ownership status, a health status, a wellness status, media usage type, a media usage level, a technology usage type, a technology usage level, a household member attitude, a user-created custom consumer attribute.

In embodiments, non-unique values may be found in a data table, where the data table may be associated with a product, store or customer attribute data set. The non-unique values may be perturbed to render unique values. In addition, the non-unique value may be used as an identifier for a data item in the product, store or customer attribute data set, where the product, store or customer attribute data set may be used for an analytic purpose relating to providing a business report with respect to the effect of an attribute on the purchase of products by customers.

In embodiments, a projected facts table in a product, store or customer attribute data-set that has one or more associated dimensions may be taken. At least one of the dimensions to be fixed may be selected, where the selection of a dimension may be based on an analytic purpose relating to providing a business report with respect to the effect of an attribute on the purchase of products by customers. In addition, an aggregation of projected facts may be produced from the projected facts table and associated dimensions, where the aggregation may fix the selected dimension for the purpose of allowing queries on the aggregated product, store or customer attribute data set.

In embodiments, a plurality of data sources having data segments of varying accuracy may be identified, where the data sources containing data relevant to an analytic purpose may relate to providing a business report with respect to the effect of an attribute on the purchase of products by customers. A plurality of overlapping data segments among the plurality of data sources may be identified to use for comparing the data sources. A factor may be calculated as a function of the comparison of the overlapping data segments. In addition, the factor may be applied to update a product, store or customer attribute data set containing at least one of the data sources.

In embodiments, a data field characteristic of a data field may be altered in a data table of a product, store or customer attribute data set, where the alteration generates a field alteration datum. The field alteration datum associated with the alteration may be saved in a data storage facility. A query requiring the use of the data field in the product, store or customer attribute data set may be submitted, where a component of the query consists of reading the field alteration data and the query relates to providing a business report with respect to the effect of an attribute on the purchase of products by customers. In addition, the altered data field may be read in accordance with the field alteration data.

In embodiments, a product, store or customer attribute data set may be stored in a partition within a partitioned database, where the partition may be associated with a data characteristic of the product, store or customer attribute data set. A master processing node may be associated with a plurality of slave nodes, where each of the plurality of slave nodes may be associated with a partition of the partitioned database. An analytic query relating to providing a business report with respect to the effect of an attribute on the purchase of products by customers to the master processing node may be submitted. In addition, the query may be processed by the master node assigning processing steps to an appropriate slave node.

In embodiments, a product, store or customer attribute data set may be received, where the product, store or customer attribute data set may include facts relating to items perceived to cause actions, where the product, store or customer attribute data set includes data attributes associated with the fact data stored in the product, store or customer attribute data set. A plurality of the combinations of a plurality of fact data and associated data attributes may be pre-aggregated in a causal bitmap. A subset of the pre-aggregated combinations may be selected based on suitability of a combination for an analytic purpose relating to providing a business report with respect to the effect of an attribute on the purchase of products by customers. In addition, the subset of pre-aggregated combinations may be stored to facilitate querying of the subset.

In embodiments, an availability condition associated with a data hierarchy in a database may be specified, where the data hierarchy may include a product, store or customer attribute data set, where the availability condition may relate to the availability of data in the product, store or customer attribute data set for an analytic purpose relating to providing a business report with respect to the effect of an attribute on the purchase of products by customers. The availability condition may be stored in a matrix. In addition, the matrix may be used to determine assess to the product, store or customer attribute data set in the data hierarchy.

In embodiments, a product, store or customer attribute data set having a plurality of dimensions may be taken. A dimension of the product, store or customer attribute data set may be fixed for purposes of pre-aggregating the data in the product, store or customer attribute data set for the fixed dimension, where the fixed dimension may be selected based on suitability of the pre-aggregation to facilitate rapidly serving an analytic purpose relating to providing a business report with respect to the effect of an attribute on the purchase of products by customers. In addition, an analytic query of the product, store or customer attribute data set may be allowed, where the query may be executed using pre-aggregated data if the query does not seek to vary the fixed dimension and the query may be executed on the un-aggregated product, store or customer attribute data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received may be fused in the data fusion facility into a new fused product, store or customer attribute data set based at least in part on a key, where the key embodies at least one association between the standard population database and the data sets received in the data fusion facility, where the product, store or customer attribute data set may be intended to be used for an analytic purpose relating to providing a business report with respect to the effect of an attribute on the purchase of products by customers.

In embodiments, a classification scheme associated with a plurality of attributes of a grouping of items in a product, store or customer attribute data set may be identified. A dictionary of attributes associated with the items may be identified. A similarity facility may be used to attribute additional attributes to the items in the product, store or customer attribute data set based on probabilistic matching of the attributes in the classification scheme and the attributes in the dictionary of attributes. In addition, the modified product, store or customer attribute data set may be used for an analytic purpose relating to providing a business report with respect to the effect of an attribute on the purchase of products by customers.

In embodiments, certain data in a product, store or customer attribute data set may be obfuscated to render a post-obfuscation product, store or customer attribute data set, access to which may be restricted along at least one specified dimension. In addition, the post-obfuscation product, store or customer attribute data set may be analyzed to produce an analytic result, where the analytic result may be related to providing a business report with respect to the effect of an attribute on the purchase of products by customers and may be based in part on information from the post-obfuscation product, store or customer attribute data set while keeping the restricted data from release.

In embodiments, an analytic platform may be provided for executing queries relating to an analytic purpose relating to providing a business report with respect to the effect of an attribute on the purchase of products by customers. A product, store or customer attribute data set may be received in the analytic platform. A new calculated measure that may be associated with the product, store or customer attribute data set to create a custom data measure may be added, where the custom data measure may be added during a user's analytic session. An analytic query requiring the custom data measure during the user's analytic session may be submitted. In addition, an analytic result may be presented based at least in part on analysis of the custom data measure during the analytic session.

In embodiments, a new data hierarchy associated with a product, store or customer attribute data set may be added in an analytic platform to create a custom data grouping, where the new data hierarchy may be added during a user's analytic session. In addition, handling of an analytic query relating to providing a business report with respect to the effect of an attribute on the purchase of products by customers that uses the new data hierarchy during the user's analytic session may be facilitated.

In embodiments, a product, store or customer attribute data set from which it may be desired may be taken to obtain a projection for an analytic purpose relating to providing a business report with respect to the effect of an attribute on the purchase of products by customers. A core information matrix may be developed for the product, store or customer attribute data set, where the core information matrix may include regions representing the statistical characteristics of alternative projection techniques that can be applied to the product, store or customer attribute data set. In addition, a user interface may be provided whereby a user can observe the regions of the core information matrix to facilitate selecting an appropriate projection technique.

In embodiments, a product, store or customer attribute data set from which it may be desired to obtain a projection may be taken, where a user of an analytic platform may select at least one dimension on which the user wishes to make a projection from the product, store or customer attribute data set, where the projection may be for an analytic purpose relating to providing a business report with respect to the effect of an attribute on the purchase of products by customers. A core information matrix may be developed for the product, store or customer attribute data set, where the core information matrix may include regions representing the statistical characteristics of alternative projection techniques that can be applied to the product, store or customer attribute data set, including statistical characteristics relating to projections using any selected dimensions. In addition, a user interface may be provided whereby a user can observe the regions of the core information matrix to facilitate selecting an appropriate projection technique.

Figure 81:
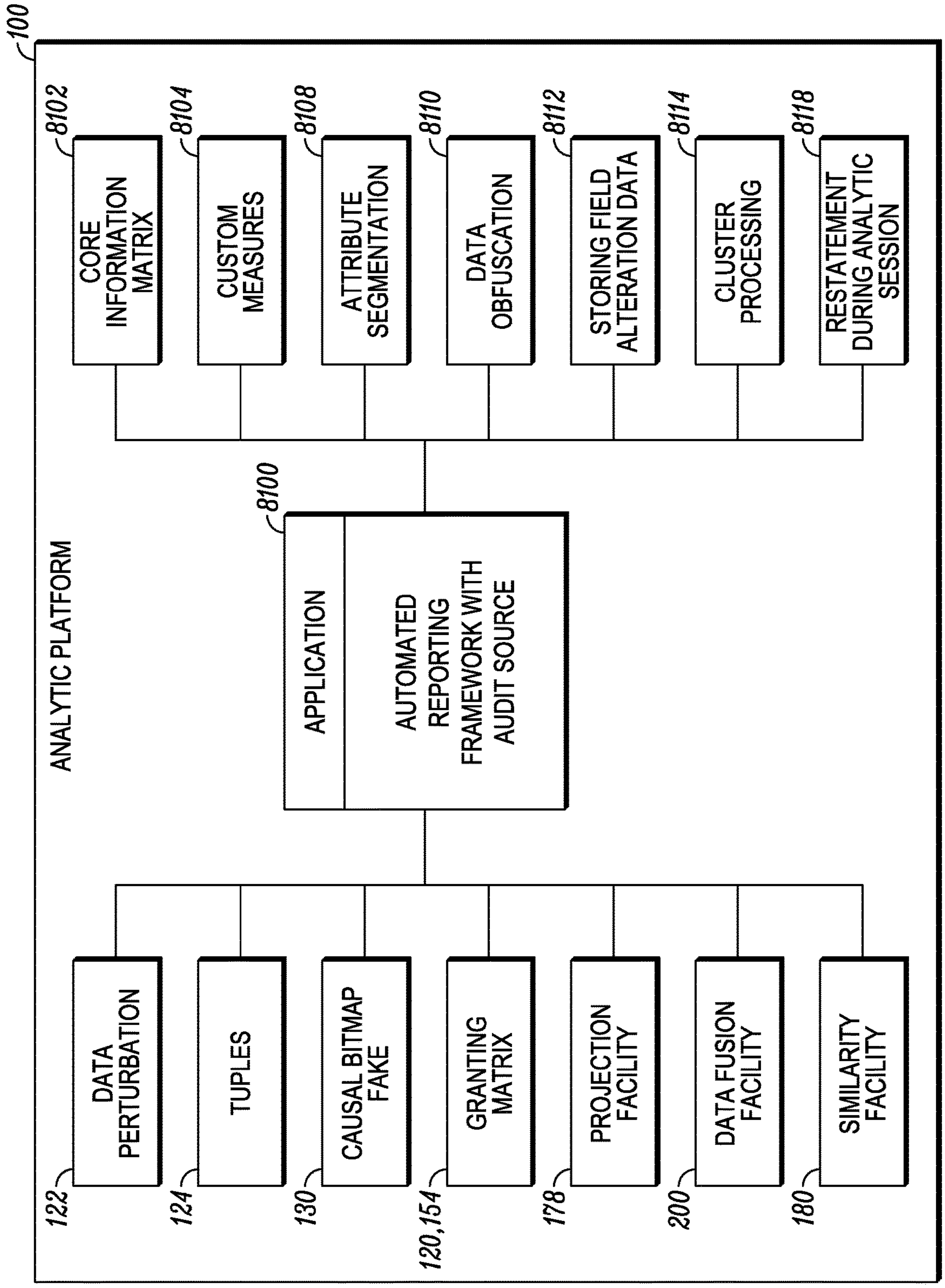
FIG. 81 depicts an automated reporting framework.

Referring to FIG. 81, in embodiments, non-unique values may be found in a data table, where the data table may be associated with a retail characteristic data set. The non-unique values may be perturbed to render unique values. In addition, the non-unique value may be used as an identifier for a data item in the retail characteristic data set, where the retail characteristic data set may be used for an analytic purpose relating to the effect of a retail characteristic in the retail characteristic dataset on retail product sales.

In embodiments, a projected facts table in a retail characteristic data set that has one or more associated dimensions may be taken. At least one of the dimensions to be fixed may be selected, where the selection of a dimension may be based on an analytic purpose relating to the effect of a retail characteristic in the retail characteristic dataset on retail product sales. In addition, an aggregation of projected facts may be produced from the projected facts table and associated dimensions, where the aggregation may fix the selected dimension for the purpose of allowing queries on the aggregated retail characteristic data set.

In embodiments, a plurality of data sources having data segments of varying accuracy may be identified, where the data sources may contain data relevant to an analytic purpose relating to the effect of a retail characteristic in the retail characteristic dataset on retail product sales. A plurality of overlapping data segments among the plurality of data sources may be identified to use for comparing the data sources. A factor may be calculated as a function of the comparison of the overlapping data segments. In addition, the factor may be applied to update a retail characteristic data set containing at least one of the data sources.

In embodiments, a data field characteristic of a data field in a data table of a retail characteristic data set may be altered, where the alteration generates a field alteration datum. The field alteration datum associated with the alteration may be stored in a data storage facility. A query requiring the use of the data field in the retail characteristic data set may be submitted, where a component of the query consists of reading the field alteration data and the query relates to an analytic purpose related to the effect of a retail characteristic in the retail characteristic dataset on retail product sales. In addition, the altered data field may be read in accordance with the field alteration data.

In embodiments, a retail characteristic data set may be stored in a partition within a partitioned database, where the partition may be associated with a data characteristic of the retail characteristic data set. A master processing node may be associated with a plurality of slave nodes, where each of the plurality of slave nodes may be associated with a partition of the partitioned database. An analytic query relating to the effect of a retail characteristic in the retail characteristic dataset on retail product sales to the master processing node may be submitted. In addition, the query may be processed by the master node assigning processing steps to an appropriate slave node.

In embodiments, a retail characteristic data set may be received, where the retail characteristic data set may include facts relating to items perceived to cause actions, where the retail characteristic data set includes data attributes associated with the fact data stored in the retail characteristic data set. A plurality of the combinations of a plurality of fact data and associated data attributes may be pre-aggregated in a causal bitmap. A subset of the pre-aggregated combinations may be selected based on suitability of a combination for an analytic purpose relating to the effect of a retail characteristic in the retail characteristic dataset on retail product sales. In addition, the subset of pre-aggregated combinations may be stored to facilitate querying of the subset.

In embodiments, an availability condition associated with a data hierarchy in a database may be specified, where the data hierarchy may include a retail characteristic data set, where the availability condition may relate to the availability of data in the retail characteristic data set for an analytic purpose relating to the effect of a retail characteristic in the retail characteristic dataset on retail product sales. The availability condition may be stored in a matrix. In addition the matrix may be used to determine access to the retail characteristic data set in the data hierarchy.

In embodiment, a retail characteristic data set having a plurality of dimensions may be taken. A dimension of the retail characteristic data set may be fixed for purposes of pre-aggregating the data in the retail characteristic data set for the fixed dimension, where the fixed dimension may be selected based on suitability of the pre-aggregation to facilitate rapidly serving an analytic purpose relating to the effect of a retail characteristic in the retail characteristic dataset on retail product sales. In addition, an analytic query of the retail characteristic data set may be allowed, where the query may be executed using pre-aggregated data if the query does not seek to vary the fixed dimension and the query may be executed on the un-aggregated retail characteristic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received may be fused in the data fusion facility into a new fused retail characteristic data set based at least in part on a key, where the key embodies at least one association between the standard population database and the data sets received in the data fusion facility, where the retail characteristic data set may be intended to be used for an analytic purpose relating to the effect of a retail characteristic in the retail characteristic dataset on retail product sales.

In embodiments, a classification scheme associated with a plurality of attributes of a grouping of items may be identified in a retail characteristic data set. A dictionary of attributes associated with the items may be identified. A similarity facility may be used to attribute additional attributes to the items in the retail characteristic data set based on probabilistic matching of the attributes in the classification scheme and the attributes in the dictionary of attributes. In addition, the modified retail characteristic data set may be used for an analytic purpose relating to the effect of a retail characteristic in the retail characteristic dataset on retail product sales.

In embodiments, certain data in a retail characteristic data set may be obfuscated to render a post-obfuscation retail characteristic data set, access to which may be restricted along at least one specified dimension. In addition, the post-obfuscation retail characteristic data set may be analyzed to produce an analytic result, where the analytic result may be related to the effect of a retail characteristic in the retail characteristic dataset on retail product sales and may be based in part on information from the post-obfuscation retail characteristic data set while keeping the restricted data from release.

In embodiments, an analytic platform may be provided for executing queries relating to an analytic purpose that may relate to the effect of a retail characteristic in the retail characteristic dataset on retail product sales. A retail characteristic data set may be received in the analytic platform. A new calculated measure that may be associated with the retail characteristic data set may be added to create a custom data measure, where the custom data measure may be added during a user's analytic session. An analytic query requiring the custom data measure during the user's analytic session may be submitted. In addition, an analytic result may be presented based at least in part on analysis of the custom data measure during the analytic session.

In embodiments, a new data hierarchy associated with a retail characteristic data set in an analytic platform may be added to create a custom data grouping, where the new data hierarchy may be added during a user's analytic session. In addition, handling of an analytic query relating may be facilitated to the effect of a retail characteristic in the retail characteristic dataset on retail product sales that uses the new data hierarchy during the user's analytic session.

In embodiments, a retail characteristic data set may be taken from which it may be desired to obtain a projection for an analytic purpose relating to the effect of a retail characteristic in the retail characteristic dataset on retail product sales. A core information matrix for the retail characteristic data set may be developed, where the core information matrix may include regions representing the statistical characteristics of alternative projection techniques that can be applied to the retail characteristic data set. In addition, a user interface may be provided whereby a user can observe the regions of the core information matrix to facilitate selecting an appropriate projection technique.

In embodiments, a retail characteristic data set from which it may be desired to obtain a projection may be taken, where a user of an analytic platform may select at least one dimension on which the user wishes to make a projection from the retail characteristic data set, where the projection may be for an analytic purpose relating to the effect of a retail characteristic in the retail characteristic dataset on retail product sales. A core information matrix may be developed for the retail characteristic data set, where the core information matrix may include regions representing the statistical characteristics of alternative projection techniques that can be applied to the retail characteristic data set, and including statistical characteristics relating to projections using any selected dimensions. In addition, a user interface may be provided whereby a user can observe the regions of the core information matrix to facilitate selecting an appropriate projection technique.

Figure 82:
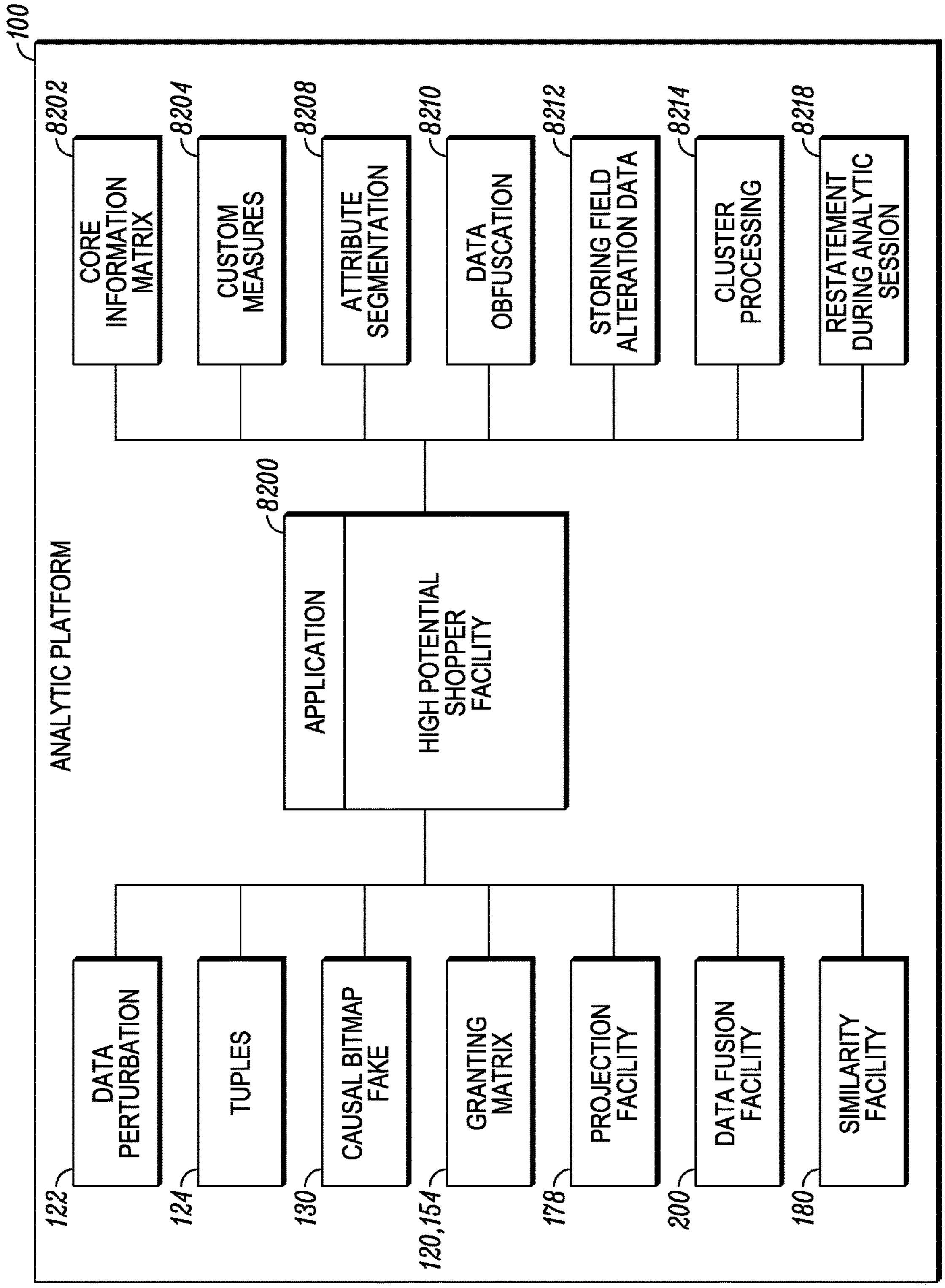
FIG. 82 depicts an application for identifying high potential shoppers.

Referring to FIG. 82, in embodiments, non-unique values may be found in a data table, where the data table may be associated with an analytic data set. The non-unique values may be perturbed to render unique values. In addition, the non-unique value may be used as an identifier for a data item in the analytic data set, where the analytic data set may be used for an analytic purpose relating to identifying a high potential shopper among a plurality of consumers.

In embodiments, a projected facts table may be taken in an analytic data set that has one or more associated dimensions. At least one of the dimensions may be selected to be fixed, where the selection of a dimension may be based on an analytic purpose relating to identifying a high potential shopper among a plurality of consumers. In addition, an aggregation of projected facts may be produced from the projected facts table and associated dimensions, where the aggregation fixing the selected dimension for the purpose of allowing queries on the aggregated analytic data set.

In embodiments, a plurality of data sources having data segments of varying accuracy may be identified, where the data sources may contain data relevant to an analytic purpose relating to identifying a high potential shopper among a plurality of consumers. A plurality of overlapping data segments may be identified among the plurality of data sources to use for comparing the data sources. A factor may be calculated as a function of the comparison of the overlapping data segments. In addition, the factor may be applied to update an analytic data set containing at least one of the data sources.

In embodiments, a data field characteristic of a data field in a data table of an analytic data set may be altered, where the alteration generates a field alteration datum. The field alteration datum associated with the alteration may be saved in a data storage facility. A query requiring the use of the data field in the analytic data set may be submitted, where a component of the query consists of reading the field alteration data and the query relates to an analytic purpose related to identifying a high potential shopper among a plurality of consumers. In addition, the altered data field may be read in accordance with the field alteration data.

In embodiments, an analytic data set in a partition may be stored within a partitioned database, where the partition may be associated with a data characteristic of the analytic data set. A master processing node may be associated with a plurality of slave nodes, where each of the plurality of slave nodes may be associated with a partition of the partitioned database. An analytic query relating may be submitted to identify a high potential shopper among a plurality of consumers to the master processing node. In addition, the query may be processed by the master node assigning processing steps to an appropriate slave node.

In embodiments, an analytic data set may be received, where the analytic data set may include facts relating to items perceived to cause actions, where the analytic data set includes data attributes associated with the fact data stored in the analytic data set. A plurality of the combinations of a plurality of fact data and associated data attributes may be pre-aggregated in a causal bitmap. A subset of the pre-aggregated combinations may be selected based on suitability of a combination for an analytic purpose relating to identifying a high potential shopper among a plurality of consumers. In addition, the subset of pre-aggregated combinations may be stored to facilitate querying of the subset.

In embodiments, an availability condition associated with a data hierarchy in a database may be specified, where the data hierarchy may include an analytic data set, where the availability condition may relate to the availability of data in the analytic data set for an analytic purpose relating to identifying a high potential shopper among a plurality of consumers. The availability condition may be stored in a matrix. In addition, the matrix may be used to determine assess to the analytic data set in the data hierarchy.

In embodiment, an analytic data set having a plurality of dimensions may be taken. A dimension of the analytic data set may be fixed for purposes of pre-aggregating the data in the analytic data set for the fixed dimension, where the fixed dimension may be selected based on suitability of the pre-aggregation to facilitate rapidly serving an analytic purpose relating to identifying a high potential shopper among a plurality of consumers. In addition, an analytic query of the analytic data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, where the analytic data set may be intended to be used for an analytic purpose relating to identifying a high potential shopper among a plurality of consumers.

In embodiments, a classification scheme associated with a plurality of attributes of a grouping of items in an analytic data set may be identified. A dictionary of attributes associated with the items may be identified. A similarity facility may be used to attribute additional attributes to the items in the analytic data set based on probabilistic matching of the attributes in the classification scheme and the attributes in the dictionary of attributes. In addition, the modified analytic data set may be used for an analytic purpose relating to identifying a high potential shopper among a plurality of consumers.

In embodiments, certain data may be obfuscated in an analytic data set to render a post-obfuscation analytic data set, access to which may be restricted along at least one specified dimension. In addition, the post-obfuscation analytic data set may be analyzed to produce an analytic result, where the analytic result may be related to identifying a high potential shopper among a plurality of consumers and may be based in part on information from the post-obfuscation analytic data set while keeping the restricted data from release.

In embodiments, an analytic platform may be provided for executing queries relating to an analytic purpose relating to identifying a high potential shopper among a plurality of consumers. An analytic data set may be received in the analytic platform. A new calculated measure that may be associated with the analytic data set to create a custom data measure may be added, where the custom data measure may be added during a user's analytic session. An analytic query requiring the custom data measure during the user's analytic session may be submitted. In addition, an analytic result may be presented based at least in part on analysis of the custom data measure during the analytic session.

In embodiments, a new data hierarchy associated with an analytic data set in an analytic platform to create a custom data grouping may be added, where the new data hierarchy may be added during a user's analytic session. In addition, handling of an analytic query relating to identifying a high potential shopper among a plurality of consumers that uses the new data hierarchy during the user's analytic session may be facilitated.

In embodiments, an analytic data set may be taken from which it may be desired to obtain a projection for an analytic purpose relating to identifying a high potential shopper among a plurality of consumers. A core information matrix may be developed for the analytic data set, where the core information matrix may include regions representing the statistical characteristics of alternative projection techniques that can be applied to the analytic data set. In addition, a user interface may be provided whereby a user can observe the regions of the core information matrix to facilitate selecting an appropriate projection technique.

In embodiments, an analytic data set may be taken from which it may be desired to obtain a projection, where a user of an analytic platform may select at least one dimension on which the user wishes to make a projection from the analytic data set, where the projection may be for an analytic purpose relating to identifying a high potential shopper among a plurality of consumers. A core information matrix may be developed for the analytic data set, where the core information matrix may include regions representing the statistical characteristics of alternative projection techniques that can be applied to the analytic data set, including statistical characteristics relating to projections using any selected dimensions. In addition, a user interface may be provided whereby a user can observe the regions of the core information matrix to facilitate selecting an appropriate projection technique.

Figure 83:
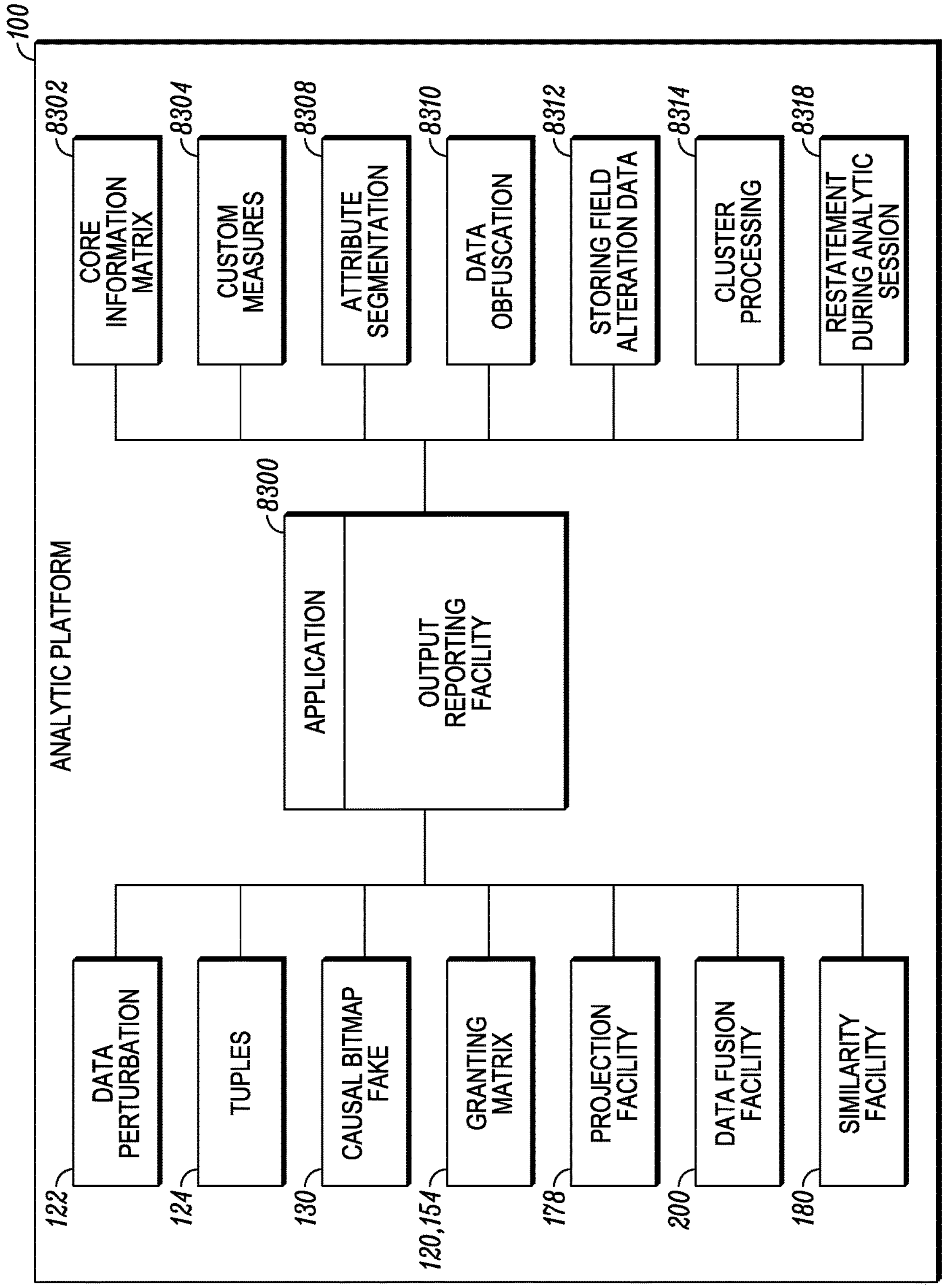
FIG. 83 depicts an output reporting facility.

Referring to FIG. 83, the current invention provides an analytic platform 100 receiving a panel dataset in a data fusion facility 200 associated with the analytic platform 100, receiving a consumer point-of-sale dataset in the data fusion facility 200, receiving a dimension data source dataset in the data fusion facility 200, and performing an action in the data fusion facility, wherein the action associates the datasets received in the data fusion facility with a standard population database. Data may be fused from the datasets received in the data fusion facility 200 into a fused consumer panel dataset based at least in part on an encryption key, wherein the encryption key embodies at least one association between the standard population database and the datasets received in the data fusion facility 200. A product attribute may be associated with the fused consumer panel dataset, analyzing the fused consumer panel dataset using an analytic platform 100, wherein the analysis determines an association between an attribute in the fused consumer panel dataset and the product attribute. Values may populate a matrix based at least in part on the association, receiving a statistical characteristic of a data projection, and selecting a calculation that produces the data projection with the statistical characteristic. At least one of the values may be selected from the matrix as an input to the calculation. The data projection may be generated by performing the calculation, wherein the data projection models a measure for a retail channel. The projection and projection output may be stored, and the projection output may be presented within a user interface 182.

In embodiments, a retail channel characteristic dataset may be associated with the fused consumer panel dataset in order to determine an association between a retail channel characteristic and a consumer activity, where the retail channel characteristic may be a retail channel currently used by a manufacturer, a retail channel currently used by a retailer, a retail channel not currently used by a manufacturer, a retail channel not currently used by a retailer, and the like. The measure for a retail channel may be a growth opportunity channel, presented by fiscal quarter, presented by year, presented by month, presented by week, segmented by a product attribute, segmented by a consumer attribute, segmented by a venue, segmented by a time, segmented by a vendor, segmented by a manufacturer, segmented by a retailer, segmented by store, wherein the measure for a retail channel is an estimate of a consumer activity within a retail channel, and the like. Consumer activity may be a planned product purchase, an unplanned product purchase, an unplanned product purchase is an in-store department choice, an unplanned product purchase is an in-store at-the-shelf choice, associated with a trip type, and the like. The model may be associated with an alert if a model estimate that fails to meet a statistical criterion. In addition, the encryption key may embody an association relating to temporal data, relating to a geography, relating to a venue, relating to a product, or the like.

In embodiments, the system may provide an increased understanding of the retail market across all channels in which it competes, including cooperating retailers, non-cooperating retailers and retailers in non-traditionally tracked channels.

In embodiments, one of CPG manufacturers' most pressing needs in the area of retail sales measurement may be the issue of "coverage." Coverage includes both the number of channels in which measurements are reported and the business usefulness of those measurements. While point-of-sale (POS) based services provide excellent coverage of the Food/Grocery, Drug, Mass, Convenience, and Military channels, these channels may account for only 50% of a manufacturer's sales—and as little as 20% of its sales growth. Non-tracked, growth channels are, thus, becoming an increasingly important part of manufacturers' businesses while at the same time having little available in the way of actionable sales measurement information.

In embodiments, the system provides the ability to see how products are performing relative to competition and the overall category, so that users know where to allocate its marketing dollars and how to get the most out of them across channels. It utilizes multiple best-in-class data sources including POS store-level data and data from a plurality Scan-Key Consumer Network Household panel. These sources are combined with data fusion methodology to remove bias from panelist reporting, creating highly accurate estimates of sales.

In embodiments, the data fusion methodology reliably identifies predictable reasons why sales estimates from a consumer panel are inconsistent with POS data in known channels. It quantifies the degree to which products with common attributes require correction and it adjusts the consumer panel sales estimates for channels without POS to correct for biases. In addition, the methodology is built to allow for continuous improvement in the accuracy of sales estimates over time.

In embodiments, the current invention may provide a reliable, complete view of the market, and visibility into competitors' and private label performance in channels such as Wal-Mart. The data fusion methodology produces more accurate data than solutions that make no correction for panelist bias, which is the major contributor to total error, that is, Total $\text{Error}^2=\text{Sampling Error}^2+\text{Bias}^2$, where Relative magnitude is associated with the bias that typically accounts for as much as 80% of total error. For example, a 4× panel size increase may cut sampling error in half, but total error by only 10%.

In embodiments, another major advantage of data fusion techniques may be the elimination of many of the challenges of using shipment data as the sole source for data adjustment, such as creating more accurate granular data by making unique adjustments each week at the UPC level, whereas shipment data, to be useful as predictors of consumer sales, must be smoothed and can create only a vendor or brand level coverage factor for use over long time periods; tracks competitors and private label more accurately by making attribute-based adjustments uniquely for each UPC in a category, whereas shipment data aren't available for all products (such as Private Label), leaving some products with no adjustments, or based on some other manufacturer's shipments; accounts for the unique overstatement patterns panelist-reported data shows for new products, whereas shipment data rarely map well to consumption for new products.

In embodiments, the current invention may provide an all-outlet solution to clients on a custom basis. This solution may extend the methodology to other channels, including some in which partial POS data are available, such as Dollar, Club, and Pet. All-outlet solutions may support many of the flexible reporting options required by users, such as sales measures at the channel level, as well as an all-outlet aggregate, such as for quarterly and 52-week time periods; category, type, and major vendors and brands; full integration into POS databases, on the same update schedule; and the like.

In embodiments, the methodology leverages existing data model/framework in which sales are positioned along product, venue, consumer, and time dimension hierarchies. Characteristics of the data source determine the level of aggregation at which the data can be positioned in the framework. For example, POS data may be available weekly in a particular channel; however, direct store delivery (DSD) data may be available at a daily level, and still other measures may be available only at a monthly or quarterly level. The situation is similar along the product and venue dimensions—ranging from the specificity of the sale of a particular UPC-coded item at a particular store to the generality of total category sales within a channel (across all geographies).

In embodiments, once this data framework is populated, the data fusion process may be iterative, utilizing both competitive and complementary fusion methods. In competitive fusion, two or more data sources that provide overlapping measurements along at least one dimension are compared ("competed") against each other at some level of aggregation along the product, venue, and time dimensions. More accurate/reliable sources are used to correct less accurate/reliable sources. In complementary fusion, relationships modeled where data sources overlap are projected to areas of the data framework in which fewer (or even a single) sources exist, enhancing the accuracy/reliability of those fewer (or single) sources even in the absence of the other sources upon which the models were based. The process is iterative in that the competitive and complementary fusion methodologies can be repeated at varying level of aggregation of the data framework.

In embodiments, and for purposes of illustration, assume that the channel of interest is Wal-Mart. The process begins well-removed from this channel based on Food-Drug-Mass (excluding Wal-Mart) or POS data. The alignment of volumetrically-projected panel data with POS-based volumetric data exhibits considerable variability.

In embodiments, a competitive fusion step POS data are statistically compared against the all-outlet consumer network panel (Panel) data in order to identify, quantify, and correct for any non-channel-, non-outlet-specific errors (or biases) in the Panel data. Identification and quantification of a "private label" bias in the panel data may be evident across products and channels. After being tested for statistical significance, this bias can be corrected for, and, thus, removed in volumetric reporting. This can be repeated for other product attributes, as available. This may be repeated at the Mass-x level to quantify any mass-channel-specific (but non-outlet-specific) errors. A key element of this competitive fusion step is the methodology developed to identify and process unusual observations ("outliers"). This may be done prior to the competitive fusion process (input-filtering) and/or after the competitive fusion process (output-filtering). The net result of these competitive fusion steps may be better volumetric alignment between bias-corrected panel and POS data.

In embodiments, upon the completion of the competitive fusion step, complementary fusion may be used to "project" these results/relationships onto Panel data in the major brand channel—substantially enhancing the accuracy of the Panel data source. At this point, competitive fusion may be used again in several possible ways and at some level of aggregation along the venue, time, and/or product dimensions in order to develop independent estimates against which the complementary-fused estimate may be competed. Publicly-available data about the major brand channel (e.g., channel reports, reported sales/financials, store databases, geo-demographics, etc.) may be used to develop an independent venue (channel) estimate. This may, alternatively, be considered to be quantification of outlet-specific errors. Publicly-available data about the category of interest (e.g., category studies, industry reports, reported sales/financials, etc.) may be used to develop an independent category estimate. Private data from manufacturer-partners (e.g., shipment data, delivery data, retailer-supplied data, etc.) may be used to develop independent channel and category estimates. Due to the potentially sensitive nature of some of these data sources, this competitive fusion may be performed inside a manufacturer's facility, such as in an auxiliary input to the baseline model. The net result of this process may be an enhanced measurement of retail sales performance in non-POS-tracked channels.

In embodiments, a "single source" can provide integrated data across all the retail channels that users compete, covering required dimensionality and measures, and accessible on the web, through standard reports, and through ad-hoc delivery. For the retailer, the system may offer a new value proposition, and one that may significantly motivate non-cooperating retailers in alternate channels to share their data. The analytic platform 100 may bring together multiple data sets to create alternative channel views. This may offer a way to protect any particular outlet because a given retailer's data is integrated within a broader set of data sources so that market exposure risk is mitigated.

In embodiments, for users, data integration may be essential for an effective view of total market performance and for close alignment with internal enterprise systems. Traditional systems for market and consumer data are typically based on proprietary data structures and create significant challenges for the integration of user's internal or other third-party data. The analytical platform 100 may enable open data architecture, allowing data alignment and integration at several points along the data processing flow (data source, web service, data query, and within the user interface—visual integration). This unique capability may allow the user to effectively integrate existing POS data from alternate channel retailers, shipment and distributor information, and data from other 3$^{rd}$ parties. The analytical platform may offers an alternative approach to extending coverage. Multiple data sources may be integrated at the leaf level, allowing unprecedented flexibility in aggregating and analyzing data on-the-fly at virtually any layer of the hierarchy because the facts are simply aligned to the same structures and keys, then are made available for inclusion in all the calculations.

In embodiments, for clearly dimensionalized data from non-traditional channels can provide directly to the system, it will be possible to integrate these data directly via the analytical platform 100 integration solution, and may make the integrated and expanded channel view available to users. The analytical platform may also provide for cost effective deployment as additional data sources are added or integrated (data or metadata).

In embodiments, features of the system may support both advanced power users as well as the casual user. Reports created may be analyzed interactively via the User Interface. The UI can be accessed directly as a web site or can be linked to an internal user portal. Alternatively, templates built in the UI can be exported in multiple formats at scheduled times to feed existing applications or as regular reports/presentations. Users may have the option to access data through Excel using a tool with which they are already familiar. The notion of tiered deliverables may be simplified using the control mechanisms inherent in the platform. Data and access may be scoped in a straightforward, easy to manage way.

In embodiments, features of the User Interface may include both on-demand and scheduled reports with automated scheduled report delivery; Interactive drill down/up, swap, and pivot Dynamic filter/sort/rank, and attribute filtering; Conditional formatting and highlighting; Unique on-the-fly custom hierarchies and aggregates; Calculated measures and members; Numerous built-in chart types; Integrated alerts, with optional email delivery; Multi-user collaboration and report sharing; Easy-to-use dashboards with summary views and graphical dial indicators; Publish and subscribe to reports and dashboards; and the like.

In embodiments, the current invention may allow analysis across product, time, and geographic (including account and channel) dimensions. The source may span sales-based facts (volume, price, share, etc.), distribution and causal based facts (ACV distribution and merchandising), consumer (shopper) facts/demographics and media data, and the like.

In embodiments, the system may utilize data fusion to characterize households at the household level by fusing consumer network and specialty panels, loyalty data from retailers, and other consumer data sources against a universe framework based upon an industry standard population database. This fusion may be done based upon household attributes/clusters or at the exact household-level via the use of irreversible-encryption keys. This may significantly enhance the granularity and quality of insights derivable from panel data.

In embodiments, the current invention may construct a "Super Panel" of households through the use of multi-level data fusion logic within the context of a generalized framework within which various data sources' measures of the product purchased by a consumer at a point in time may be aligned, compared, and merged. At its simplest level, consumer network and specialty panels may be used in combination with psychographic/demographic segmentation schemas to impute household-level purchases across the universe of households. These initial estimates are then fused with other data sources in several ways.

In embodiments, in the event that a data source provides a household-level match, its estimate may be blended directly with the initial estimate, using for example, an inverse-variance-weighted approach. Should a household-level match not be available, the initial and new estimates may be competitively fused along an aggregate of the consumer/household, venue, product, or time dimension with the subsequent disaggregation of the results via imputation along household attributes and clusters, where complementary fusion may be used to fill in "voids" in the data framework. This fusion approach is iterated across data sources at the appropriate levels of aggregation, in effect creating increasingly accurate estimates at the household level. Household-level results may be aggregated and competed against measures that are available only at aggregate levels, e.g., store point-of-sale data. Examples of data sources that may be fused in this way include loyalty data from one or more retailers, custom research data, attitude and usage data, and permission-based marketing data.

In embodiments, the resulting, populated data framework may provide an unprecedented, multi-dimensional consumer insight capability with granularity by household and customer segment, store and store cluster, trip and trip mission. Propensity scores by product, household, and store will enable enhanced consumer targeting and CRM analyses and programs, including enhanced consumer response and tracking models. In addition, the data framework will facilitate manufacturer-retailer interactions through the ability to enable cross-segmentation alignments amongst various views of the consumer.

In embodiments, a high-level overview of the data fusion logic may be provided to be used to provide household-level purchase and behavior estimates in the analytic platform 100 consumer data offering, consider the illustration to the right, in which the objective, over a specified period of time, may be to determine the composition of that household's product-venue activities. If the household of interest is a member of the consumer network panel (CNP), then this is a matter of collecting the household's known (reported) purchases and bias-correcting them.

In embodiments, for a household that is not a member of the CNP, the process may begin by estimating that household's purchases by its similarity to one or more "donor" households who are in the CNP. While these estimates may be relatively inaccurate at the household level, they provide an unbiased (in aggregate) starting point. Next, if the household is a member of one or more loyalty card programs, then—for those retailers—the initial estimates may be competitively fused with the loyalty data to increase their accuracy (filling in the gaps). Any biases in the initial estimates may also be used to enhance the estimates for other households for which loyalty data are not available via complementary fusion. This iterative approach may be used with other data sources—e.g., credit card purchases, independent channel/retailer/category estimates, etc.) at whatever level of aggregation is appropriate. In this way, the estimates are continuously improved through a series of successive approximations.

Still referring to FIG. 83, in embodiments, non-unique values may be found in a data table, where the data table may be associated with an analytic data set. The non-unique values may be perturbed to render unique values. In addition, the non-unique value may be used as an identifier for a data item in the analytic data set, where the analytic data set may be used for reporting activities of retail outlets.

In embodiments, a projected facts table in an analytic data set that has one or more associated dimensions may be taken. At least one of the dimensions to be fixed may be selected, where the selection of a dimension may be based on an analytic purpose relating to reporting activities of retail outlets. In addition, an aggregation of projected facts may be produced from the projected facts table and associated dimensions, where the aggregation may fix the selected dimension for the purpose of allowing queries on the aggregated analytic data set.

In embodiments, a plurality of data sources having data segments of varying accuracy may be identified, where the data sources may contain data relevant to an analytic purpose relating to reporting activities of retail outlets. A plurality of overlapping data segments among the plurality of data sources may be identified to use for comparing the data sources. A factor may be calculated as a function of the comparison of the overlapping data segments. In addition, the factor may be applied to update an analytic data set containing at least one of the data sources.

In embodiments, a data field characteristic of a data field in a data table of an analytic data set may be altered, where the alteration generates a field alteration datum that may save the field alteration datum associated with the alteration in a data storage facility. A query requiring the use of the data field in the analytic data set may be submitted, where a component of the query consists of reading the field alteration data and the query relates to an analytic purpose related to reporting activities of retail outlets. In addition, the altered data field may be read in accordance with the field alteration data.

In embodiments, an analytic data set in a partition may be stored within a partitioned database, where the partition may be associated with a data characteristic of the analytic data set. A master processing node may be associated with a plurality of slave nodes, where each of the plurality of slave nodes may be associated with a partition of the partitioned database. An analytic query relating to reporting activities of retail outlets to the master processing node may be submitted. In addition, the query by the master node assigning processing steps to an appropriate slave node may be processed.

In embodiments, an analytic data set may be received, where the analytic data set may included facts relating to items perceived to cause actions, where the analytic data set may include data attributes associated with the fact data stored in the analytic data set. A plurality of the combinations of a plurality of fact data and associated data attributes in a causal bitmap may be pre-aggregated. A subset of the pre-aggregated combinations may be selected based on suitability of a combination for an analytic purpose relating to reporting activities of retail outlets. In addition, the subset of pre-aggregated combinations may be stored to facilitate querying of the subset.

In embodiments, an availability condition associated with a data hierarchy in a database may be specified, where the data hierarchy may include an analytic data set, where the availability condition relating to the availability of data in the analytic data set for an analytic purpose may relate to reporting activities of retail outlets. The availability condition may be stored in a matrix. In addition, the matrix may be used to determine assess to the analytic data set in the data hierarchy.

In embodiment, an analytic data set having a plurality of dimensions may be taken. A dimension of the analytic data set may be fixed for purposes of pre-aggregating the data in the analytic data set for the fixed dimension, where the fixed dimension may be selected based on suitability of the pre-aggregation to facilitate rapidly serving an analytic purpose relating to reporting activities of retail outlets. In addition, an analytic query of the analytic data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, where the analytic data set may be intended to be used for an analytic purpose relating to reporting activities of retail outlets.

In embodiments, x a classification scheme associated with a plurality of attributes of a grouping of items in an analytic data set may be identified. A dictionary of attributes associated with the items may be identified. A similarity facility may be used to attribute additional attributes to the items in the analytic data set based on probabilistic matching of the attributes in the classification scheme and the attributes in the dictionary of attributes. In addition, the modified analytic data set may be used for an analytic purpose relating to reporting activities of retail outlets.

In embodiments certain data in an analytic data set may be obfuscated to render a post-obfuscation analytic data set, access to which may be restricted along at least one specified dimension. In addition, the post-obfuscation analytic data set may be analyzed to produce an analytic result, where the analytic result may be related to reporting activities of retail outlets and may be based in part on information from the post-obfuscation analytic data set while keeping the restricted data from release.

In embodiments, an analytic platform may be provided for executing queries relating to an analytic purpose relating to reporting activities of retail outlets. An analytic data set in the analytic platform may be provided. A new calculated measure that may be associated with the analytic data set to create a custom data measure may be added, where the custom data measure may be added during a user's analytic session. An analytic query requiring the custom data measure during the user's analytic session may be submitted. In addition, an analytic result may be presented based at least in part on analysis of the custom data measure during the analytic session.

In embodiments, a new data hierarchy associated with an analytic data set in an analytic platform to create a custom data grouping may be added, where the new data hierarchy may be added during a user's analytic session. In addition, handling of an analytic query relating to reporting activities of retail outlets that uses the new data hierarchy during the user's analytic session may be facilitated.

In embodiments, an analytic data set may be taken from which it may be desired to obtain a projection for an analytic purpose relating to reporting activities of retail outlets. A core information matrix may be developed for the analytic data set, where the core information matrix may include regions representing the statistical characteristics of alternative projection techniques that can be applied to the analytic data set. In addition, a user interface may be provided whereby a user can observe the regions of the core information matrix to facilitate selecting an appropriate projection technique.

In embodiments, an analytic data set may be taken from which it may be desired to obtain a projection, where a user of an analytic platform may select at least one dimension on which the user wishes to make a projection from the analytic data set, where the projection may be for an analytic purpose relating to reporting activities of retail outlets. core information matrix for the analytic data set may be developed, where the core information matrix including regions representing the statistical characteristics of alternative projection techniques that can be applied to the analytic data set, including statistical characteristics relating to projections using any selected dimensions. In addition, a user interface may be provided whereby a user can observe the regions of the core information matrix to facilitate selecting an appropriate projection technique.

Figure 84:
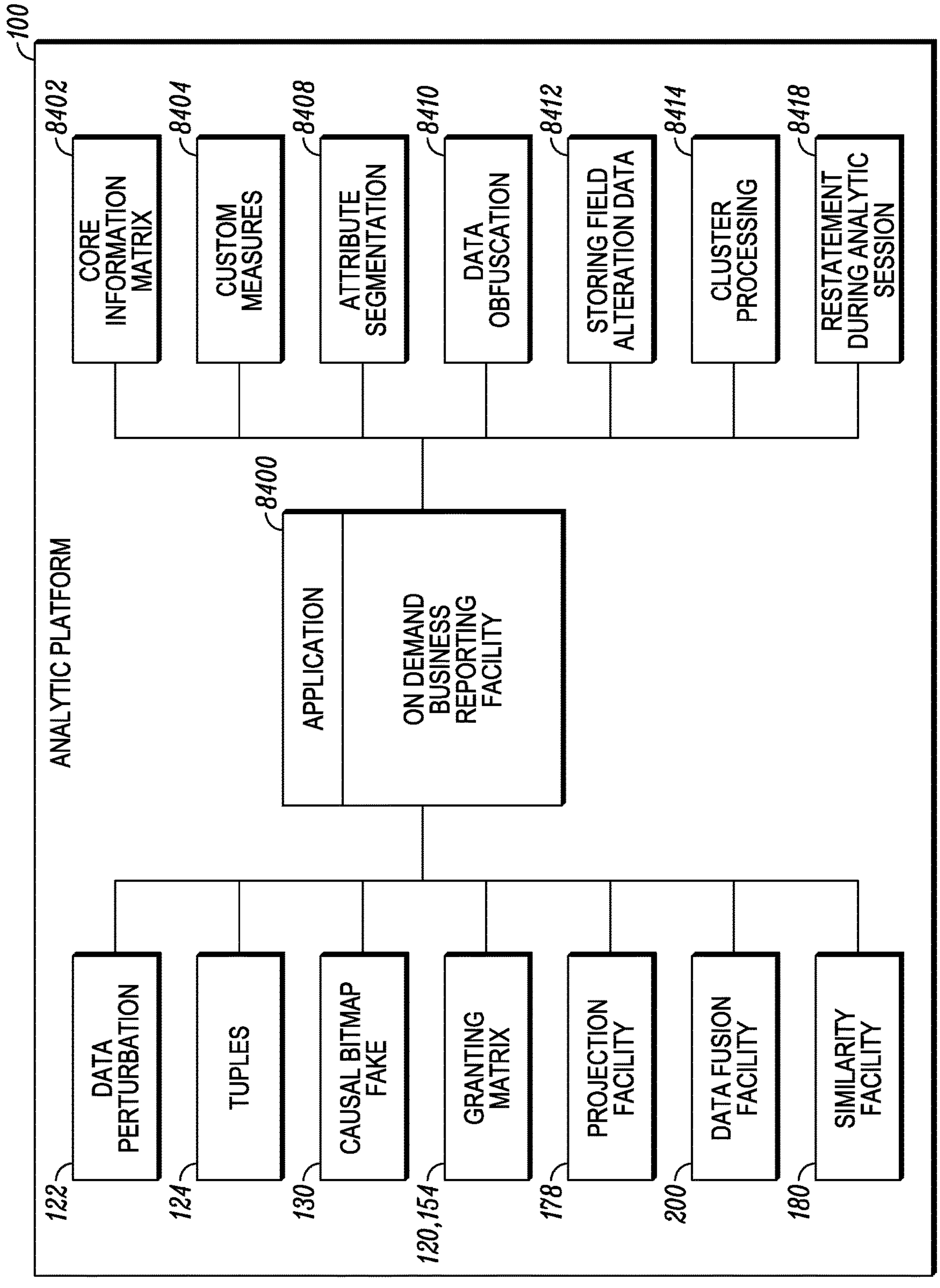
FIG. 84 depicts an on demand business reporting facility.

Referring to FIG. 84, in embodiments, non-unique values in a data table may be found, the data table associated with an analytic data set. the non-unique values may be perturbed to render unique values. In addition, the non-unique value may be used as an identifier for a data item in the analytic data set, where the analytic data set may be used for generating an on-demand business report.

In embodiments, a projected facts table in an analytic data set may be taken that has one or more associated dimensions. At least one of the dimensions to be fixed may be selected, where the selection of a dimension may be based on an analytic purpose relating to producing an on-demand business report. In addition, an aggregation of projected facts may be produced from the projected facts table and associated dimensions, the aggregation fixing the selected dimension for the purpose of allowing queries on the aggregated analytic data set.

In embodiments, a plurality of data sources having data segments of varying accuracy may be identified, the data sources containing data relevant to producing an on-demand business report. A plurality of overlapping data segments among the plurality of data sources may be identified to use for comparing the data sources. A factor may be calculated as a function of the comparison of the overlapping data segments. In addition, the factor applied to update an analytic data set containing at least one of the data sources.

In embodiments, a data field characteristic of a data field in a data table of an analytic data set may be altered, where the alteration may generate a field alteration datum. The field alteration datum associated with the alteration in a data storage facility may be saved. A query may be submitted requiring the use of the data field in the analytic data set, where a component of the query may consist of reading the field alteration data and the query relates to an analytic purpose related to producing an on-demand business report. In addition, the altered data field may be read in accordance with the field alteration data.

In embodiments, an analytic data set may be received, the analytic data set including facts relating to items perceived to cause actions, where the analytic data set includes data attributes associated with the fact data stored in the analytic data set. A plurality of the combinations of a plurality of fact data and associated data attributes in a causal bitmap may be pre-aggregated. A subset of the pre-aggregated combinations may be selected based on suitability of a combination for generating an on-demand business report. In addition, the subset of pre-aggregated combinations may be stored to facilitate querying of the subset.

In embodiments, an availability condition may be specified associated with a data hierarchy in a database, the data hierarchy including an analytic data set, the availability condition relating to the availability of data in the analytic data set for generating an on-demand business report. The availability condition may be stored in a matrix. In addition, the matrix may be used to determine access to the analytic data set in the data hierarchy.

In embodiments, an analytic data set may be taken having a plurality of dimensions. A dimension of the analytic data set may be fixed for purposes of pre-aggregating the data in the analytic data set for the fixed dimension, the fixed dimension being selected based on suitability of the pre-aggregation to facilitate rapidly producing an on-demand business report. In addition, an analytic query of the analytic data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action may associate the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, and the analytic data set may be used for generating an on-demand business report.

In embodiments, a classification scheme may be identified associated with a plurality of attributes of a grouping of items in an analytic data set. A dictionary of attributes may be identified associated with the items. A similarity facility may be used to attribute additional attributes to the items in the analytic data set based on probabilistic matching of the attributes in the classification scheme and the attributes in the dictionary of attributes, where a modified analytic data set may be used to generate an on-demand business report.

In embodiments, certain data in an analytic data set to render a post-obfuscation analytic data set may be obfuscated, access to which may be restricted along at least one specified dimension. In addition, the post-obfuscation analytic data set may be analyzed to produce an analytic result, where the analytic result may be related to producing an on-demand business report and may be based in part on information from the post-obfuscation analytic data set while keeping the restricted data from release.

In embodiments, an analytic platform may be provided for executing queries and producing an on-demand business report. An analytic data set may be received in the analytic platform. A new calculated measure may be added that may be associated with the analytic data set to create a custom data measure, where the custom data measure may be added during a user's analytic session. An analytic query may be submitted requiring the custom data measure during the user's analytic session. In addition, an analytic result may be presented based at least in part on analysis of the custom data measure during the analytic session.

In embodiments, a new data hierarchy associated with an analytic data set in an analytic platform may be added to create a custom data grouping, where the new data hierarchy may be added during a user's analytic session. In addition, an on-demand business report may be produced that uses the new data hierarchy during the user's analytic session.

In embodiments, an analytic data set may have been taken from which it may be desired to obtain a projection for generating an on-demand business report. A core information matrix may be developed for the analytic data set, the core information matrix including regions representing the statistical characteristics of alternative projection techniques that may be applied to the analytic data set. A user interface may be provided whereby a user may observe the regions of the core information matrix to facilitate selecting an appropriate projection technique. In addition, the selected projection may be used to produce an on-demand business report.

In embodiments, an analytic data set may be stored in a partition within a partitioned database, where the partition may be associated with a data characteristic of the analytic data set. A master processing node may be associated with a plurality of slave nodes, where each of the plurality of slave nodes may be associated with a partition of the partitioned database. An analytic query may be submitted relating to producing an on-demand business report to the master processing node. In addition, the query may be processed by the master node assigning processing steps to an appropriate slave node.

In embodiments, an analytic data set may be taken from which it may be desired to obtain a projection, where a user of an analytic platform may select at least one dimension on which the user wishes to make a projection from the analytic data set, the projection being for generating an on-demand business report. A core information matrix may be developed for the analytic data set, the core information matrix including regions representing the statistical characteristics of alternative projection techniques that may be applied to the analytic data set, including statistical characteristics relating to projections using any selected dimension. A user interface may be provided whereby a user may observe the regions of the core information matrix to facilitate selecting an appropriate projection technique. In addition, the selected projection may be used to produce an on-demand business report.

Figure 85:
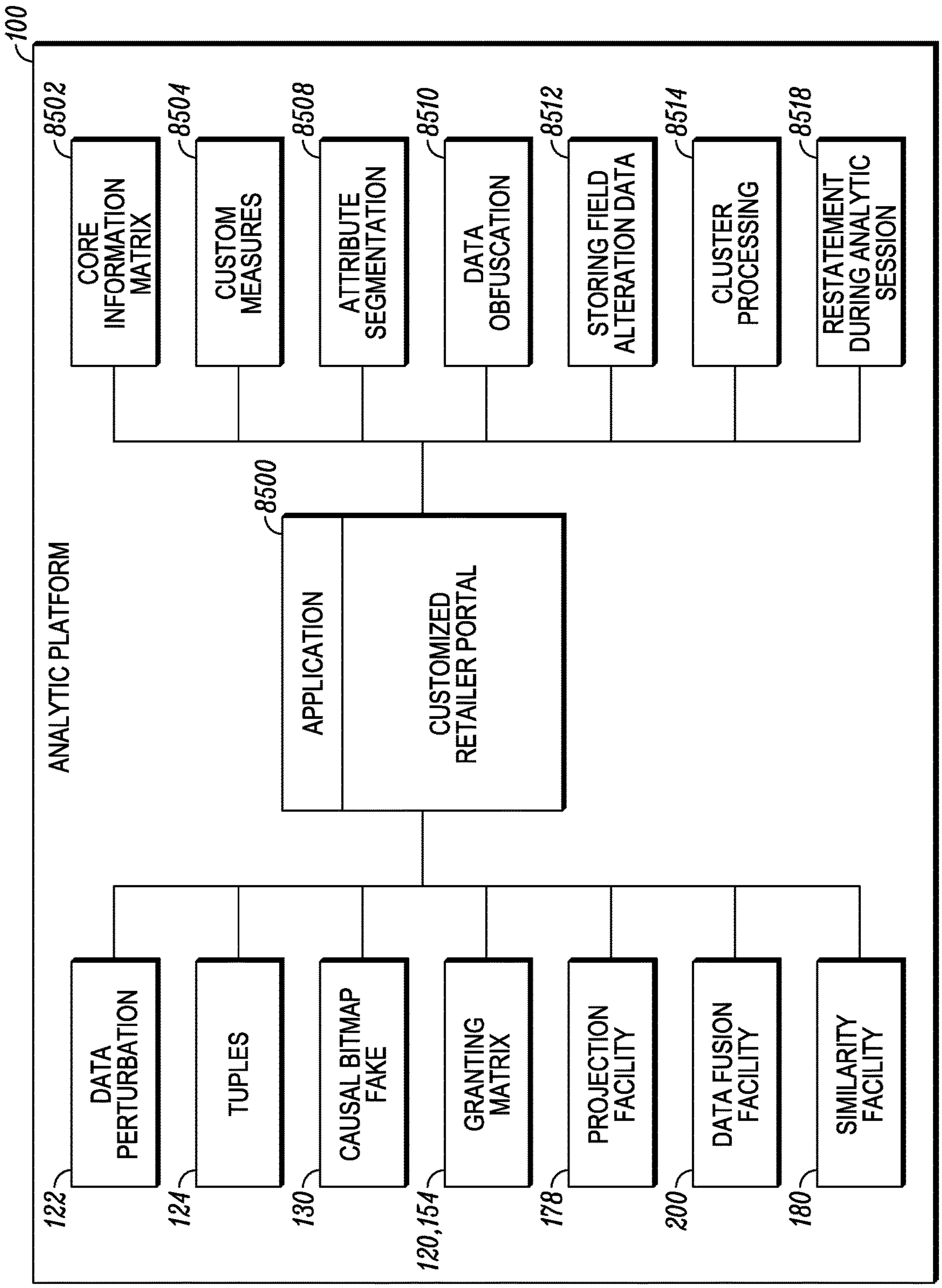
FIG. 85 depicts customized retailer portal application.

Referring to FIG. 85, in embodiments, non-unique values in a data table may be found, the data table associated with an analytic data set. The non-unique values may be perturbed to render unique values. In addition, the non-unique value as an identifier for a data item in the analytic data set may be used, where the analytic data set may be used for supporting display of analytic information in a retailer portal.

In embodiments, a projected facts table in an analytic data set that has one or more associated dimensions may be taken. At least one of the dimensions may be selected to be fixed, where the selection of a dimension may be based on supporting display of analytic information in a retailer portal. In addition, an aggregation of projected facts may be produced from the projected facts table and associated dimensions, the aggregation fixing the selected dimension for the purpose of allowing queries on the aggregated analytic data set.

In embodiments, a plurality of data sources may be identified having data segments of varying accuracy, the data sources containing data relevant to supporting display of analytic information in a retailer portal. A plurality of overlapping data segments may be identified among the plurality of data sources to use for comparing the data sources. A factor may be calculated as a function of the comparison of the overlapping data segments. In addition, the factor may be applied to update an analytic data set containing at least one of the data sources.

In embodiments, a data field may be altered characteristic of a data field in a data table of an analytic data set, where the alteration generates a field alteration datum. The field alteration datum may be saved associated with the alteration in a data storage facility. A query requiring the use of the data field may be submitted in the analytic data set, where a component of the query consists of reading the field alteration data and the data set may be used for supporting display of analytic information in a retailer portal. In addition, the altered data field may be read in accordance with the field alteration data.

In embodiments, an analytic data set may be received, the analytic data set including facts relating to items perceived to cause actions, where the analytic data set includes data attributes associated with the fact data stored in the analytic data set. A plurality of the combinations of a plurality of fact data and associated data attributes in a causal bitmap may be pre-aggregated. A subset of the pre-aggregated combinations may be selected based on suitability of a combination for supporting display of analytic information in a retailer portal. In addition, the subset of pre-aggregated combinations may be stored to facilitate querying of the subset.

In embodiments, an availability condition may be specified associated with a data hierarchy in a database, the data hierarchy including an analytic data set, the availability condition relating to the availability of data in the analytic data set for supporting display of analytic information in a retailer portal. The availability condition in a matrix may be stored. In addition, the matrix may be used to determine access to the analytic data set in the data hierarchy.

In embodiments, an analytic data set may be taken having a plurality of dimensions. A dimension of the analytic data set may be fixed for purposes of pre-aggregating the data in the analytic data set for the fixed dimension, the fixed dimension being selected based on suitability of the pre-aggregation to facilitate rapidly serving supporting display of analytic information in a retailer portal. In addition, an analytic query of the analytic data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, where the analytic data set may be intended to be used for supporting display of analytic information in a retailer portal.

In embodiments, a classification scheme may be identified associated with a plurality of attributes of a grouping of items in an analytic data set. A dictionary of attributes may be identified associated with the items. A similarity facility may be used to attribute additional attributes to the items in the analytic data set based on probabilistic matching of the attributes in the classification scheme and the attributes in the dictionary of attributes. In addition, the data set may be used for supporting display of analytic information in a retailer portal.

In embodiments, certain data in an analytic data set may be obfuscated to render a post-obfuscation analytic data set, access to which may be restricted along at least one specified dimension. In addition, the post-obfuscation analytic data set may be analyzed to produce an analytic result, where the analytic result may be related to supporting display of analytic information in a retailer portal and may be based in part on information from the post-obfuscation analytic data set while keeping the restricted data from release.

In embodiments, an analytic platform may be provided for executing queries relating to supporting display of analytic information in a retailer portal. An analytic data set may be received in the analytic platform. A new calculated may be added measure that may be associated with the analytic data set to create a custom data measure, where the custom data measure may be added during a user's analytic session. An analytic query requiring the custom data measure may be submitted during the user's analytic session. In addition, an analytic result may be presented based at least in part on analysis of the custom data measure during the analytic session.

In embodiments, a new data hierarchy may be added associated with an analytic data set in an analytic platform to create a custom data grouping, where the new data hierarchy may be added during a user's analytic session. In addition, handling of an analytic query relating to supporting display of analytic information may be facilitated in a retailer portal that uses the new data hierarchy during the user's analytic session.

In embodiments, an analytic data set may be taken from which it may be desired to obtain a projection for supporting display of analytic information in a retailer portal. A core information matrix may be developed for the analytic data set, the core information matrix including regions representing the statistical characteristics of alternative projection techniques that may be applied to the analytic data set. In addition, a user interface may be provided whereby a user may observe the regions of the core information matrix to facilitate selecting an appropriate projection technique.

In embodiments, an analytic data set may be stored in a partition within a partitioned database, where the partition may be associated with a data characteristic of the analytic data set. A master processing node may be associated with a plurality of slave nodes, where each of the plurality of slave nodes may be associated with a partition of the partitioned database. An analytic query may be submitted to the master processing node. The query may be processed by the master node assigning processing steps to an appropriate slave node. In addition, the response for display of analytic information may be delivered in a retailer portal.

In embodiments, an analytic data set may be taken from which it may be desired to obtain a projection, where a user of an analytic platform may select at least one dimension on which the user wishes to make a projection from the analytic data set, the projection being for supporting display of analytic information in a retailer portal. A core information matrix may be developed for the analytic data set, the core information matrix including regions representing the statistical characteristics of alternative projection techniques that may be applied to the analytic data set, including statistical characteristics relating to projections using any selected dimensions. In addition, a user interface may be provided whereby a user may observe the regions of the core information matrix to facilitate selecting an appropriate projection technique.

Figure 86:
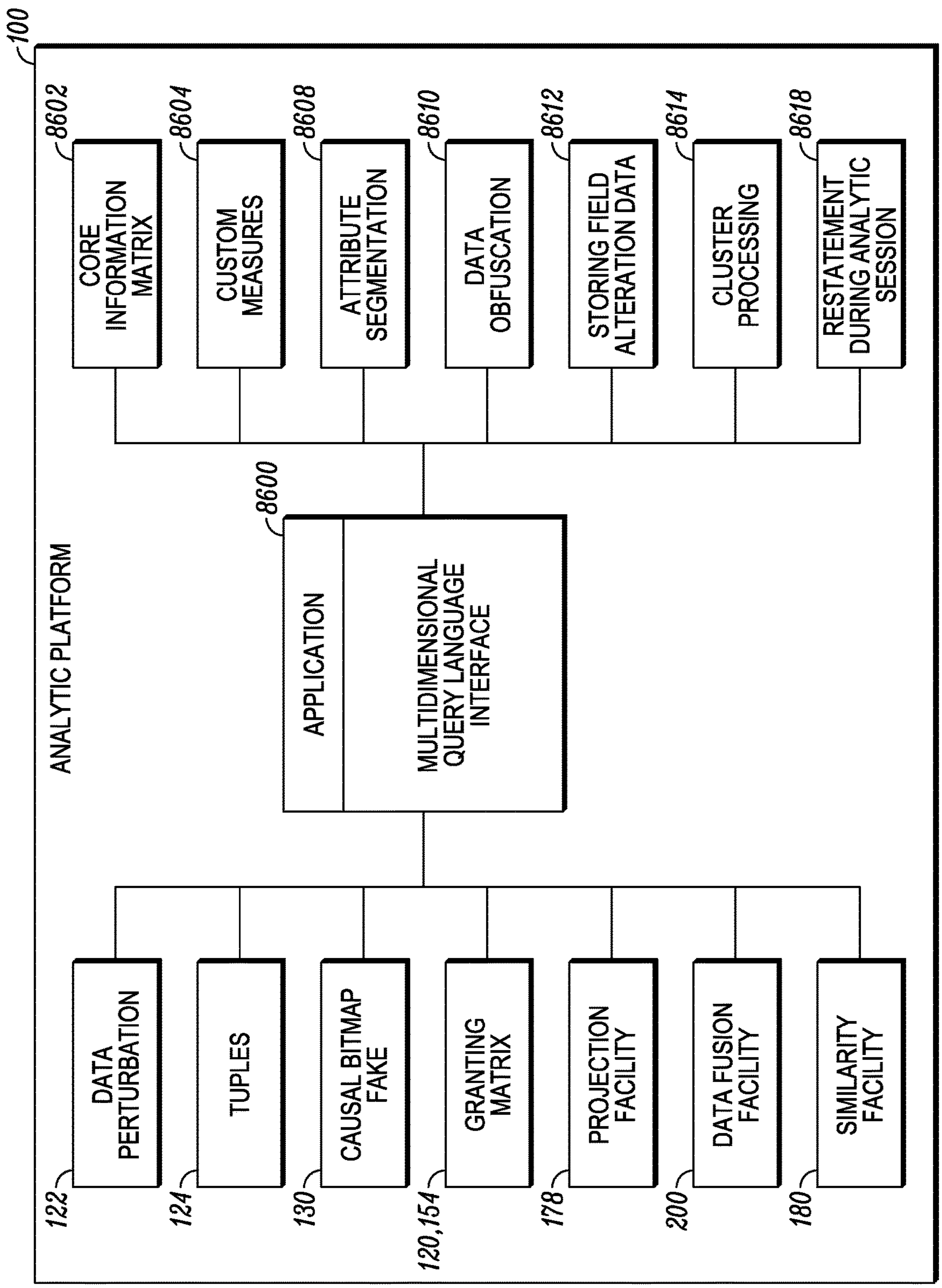
FIG. 86 depicts a multidimensional query language interface.

Referring to FIG. 86, in embodiments, non-unique values may be found in a data table, where the data table may be associated with a multidimensional data set. The non-unique values may be perturbed to render unique values. The non-unique value may be used as an identifier for a data item in the multidimensional data set, where the multidimensional data set may be used for an analytic purpose relating to determining the suitability of a proposed product for a retail launch.

In embodiments, a projected facts table in a multidimensional data set that has one or more associated dimensions may be taken. At least one of the dimensions to be fixed may be selected, where the selection of a dimension may be based on an analytic purpose relating to determining the suitability of a proposed product for a retail launch. An aggregation of projected facts may be produced from the projected facts table and associated dimensions, where the aggregation may fix the selected dimension for the purpose of allowing queries on the aggregated multidimensional data set.

In embodiments, a plurality of data sources having data segments of varying accuracy may be identified, where the data sources contain data relevant to an analytic purpose may be related to determining the suitability of a proposed product for a retail launch. A plurality of overlapping data segments may be identified among the plurality of data sources to use for comparing the data sources. A factor may be calculated as a function of the comparison of the overlapping data segments. In addition, the factor may be applied to update a multidimensional data set containing at least one of the data sources.

In embodiments, a data field characteristic of a data field may be altered in a data table of a multidimensional data set, where the alteration may generate a field alteration datum. The field alteration datum associated with the alteration may be saved in a data storage facility. A query may be submitted requiring the use of the data field in the multidimensional data set, where a component of the query may consist of reading the field alteration data and the query may relate to an analytic purpose related to determining the suitability of a proposed product for a retail launch. In addition, the altered data field may be read in accordance with the field alteration data.

In embodiments, a multidimensional data set may be stored in a partition within a partitioned database, where the partition may be associated with a data characteristic of the multidimensional data set. A master processing node may be associated with a plurality of slave nodes, where each of the plurality of slave nodes may be associated with a partition of the partitioned database. An analytic query may be submitted relating to determining the suitability of a proposed product for a retail launch to the master processing node. In addition, the query may be processed by the master node assigning processing steps to an appropriate slave node.

In embodiments, a multidimensional data set may be received, where the multidimensional data set may include facts relating to items perceived to cause actions, wherein the multidimensional data set includes data attributes associated with the fact data stored in the multidimensional data set. A plurality of the combinations of a plurality of fact data and associated data attributes may be pre-aggregated in a causal bitmap. A subset of the pre-aggregated combinations may be selected based on suitability of a combination for an analytic purpose relating to determining the suitability of a proposed product for a retail launch. In addition, the subset of pre-aggregated combinations may be stored to facilitate querying of the subset.

In embodiments, an availability condition associated with a data hierarchy may be specified in a database, where the data hierarchy may include a multidimensional data set, where the availability condition may be related to the availability of data in the multidimensional data set for an analytic purpose relating to determining the suitability of a proposed product for a retail launch. The availability condition may be stored in a matrix. In addition, the matrix may be used to determine access to the multidimensional data set in the data hierarchy.

In embodiments, a multidimensional data set may be taken having a plurality of dimensions. A dimension of the multidimensional data set may be fixed for purposes of pre-aggregating the data in the multidimensional data set for the fixed dimension, where the fixed dimension may be selected based on suitability of the pre-aggregation to facilitate rapidly serving an analytic purpose relating to determining the suitability of a proposed product for a retail launch. In addition, an analytic query may be allowed of the multidimensional data set, where the query may be executed using pre-aggregated data if the query does not seek to vary the fixed dimension and the query may be executed on the un-aggregated multidimensional data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action may associate the data sets received in the data fusion facility with a standard population database. In addition, data from the data sets received in the data fusion facility may be fused into a new fused multidimensional data set based at least in part on a key, where the key may embody at least one association between the standard population database and the data sets received in the data fusion facility, where the multidimensional data set may be intended to be used for an analytic purpose relating to determining the suitability of a proposed product for a retail launch.

In embodiments, a classification scheme associated with a plurality of attributes of a grouping of items may be identified in a multidimensional data set. A dictionary of attributes may be identified associated with the items. A similarity facility may be used to attribute additional attributes to the items in the multidimensional data set based on probabilistic matching of the attributes in the classification scheme and the attributes in the dictionary of attributes. In addition, the modified multidimensional data set may be used for an analytic purpose relating to determining the suitability of a proposed product for a retail launch.

In embodiments, certain data in a multidimensional data set may be obfuscated to render a post-obfuscation multidimensional data set, where access to which may be restricted along at least one specified dimension. In addition, the post-obfuscation multidimensional data set may be analyzed to produce an analytic result, where the analytic result may be related to determining the suitability of a proposed product for a retail launch and may be based in part on information from the post-obfuscation multidimensional data set while keeping the restricted data from release.

In embodiments, an analytic platform may be provided for executing queries relating to an analytic purpose relating to determining the suitability of a proposed product for a retail launch. A multidimensional data set may be received in the analytic platform. A new calculated measure that is associated with the multidimensional data set may be added to create a custom data measure, where the custom data measure may be added during a user's analytic session. An analytic query requiring the custom data measure may be submitted during the user's analytic session. In addition, an analytic result based at least in part on analysis of the custom data measure may be presented during the analytic session.

In embodiments, a new data hierarchy associated with a multidimensional data set in an analytic platform may be added to create a custom data grouping, where the new data hierarchy may be added during a user's analytic session. In addition, handling of an analytic query related to determining the suitability of a proposed product for a retail launch that uses the new data hierarchy may be facilitated during the user's analytic session.

In embodiments, a multidimensional data set from which it is desired to obtain a projection may be taken for an analytic purpose relating to determining the suitability of a proposed product for a retail launch. A core information matrix may be developed for the multidimensional data set, where the core information matrix may include regions representing the statistical characteristics of alternative projection techniques that can be applied to the multidimensional data set. In addition, a user interface may be provided whereby a user can observe the regions of the core information matrix to facilitate selecting an appropriate projection technique.

In embodiments, a multidimensional data set may be taken from which it is desired to obtain a projection, where a user of an analytic platform may select at least one dimension on which the user wishes to make a projection from the multidimensional data set, the projection may be for an analytic purpose relating to determining the suitability of a proposed product for a retail launch. A core information matrix may be developed for the multidimensional data set, where the core information matrix may include regions representing the statistical characteristics of alternative projection techniques that can be applied to the multidimensional data set, and may include statistical characteristics relating to projections using any selected dimensions. In addition, a user interface may be provided whereby a user can observe the regions of the core information matrix to facilitate selecting an appropriate projection technique.

Figure 87:
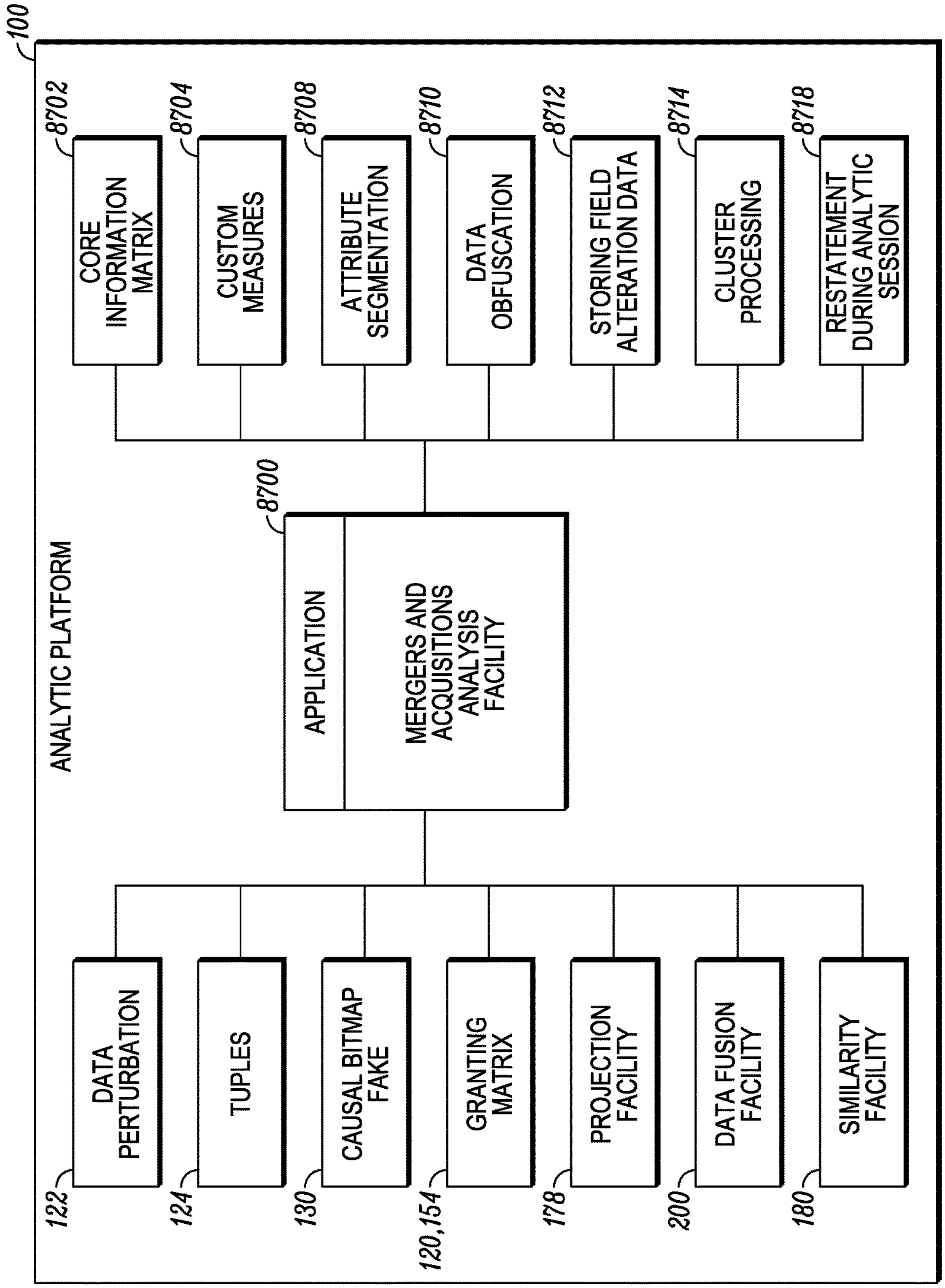
FIG. 87 depicts a mergers and acquisitions analysis application.

Referring to FIG. 87, in embodiments, non-unique values in a data table may be found, where the data table may be associated with a target company data set. The non-unique values may be perturbed to render unique values. In addition, the non-unique value may be used as an identifier for a data item in the target company data set, where the target company data set may be used for an analytic purpose relating to determining the suitability of a target company for acquisition.

In embodiments, a projected facts table may be taken in a target company data set that has one or more associated dimensions. At least one of the dimensions to be fixed may be selected, where the selection of a dimension may be based on an analytic purpose related to determining the suitability of a target company for acquisition. In addition, an aggregation of projected facts may be produced from the projected facts table and associated dimensions, where the aggregation may fix the selected dimension for the purpose of allowing queries on the aggregated target company data set.

In embodiments, a plurality of data sources may be identified that may have data segments of varying accuracy, where the data sources containing data relevant to an analytic purpose may be related to determining the suitability of a target company for acquisition. A plurality of overlapping data segments may be identified among the plurality of data sources to use for comparing the data sources. A factor may be calculated as a function of the comparison of the overlapping data segments. In addition, the factor may be applied to update a target company data set containing at least one of the data sources.

In embodiments, a data field characteristic of a data field may be altered in a data table of a target company data set, where the alteration may generate a field alteration datum. The field alteration datum associated with the alteration may be saved in a data storage facility. A query requiring the use of the data field in the target company data set may be submitted, where a component of the query may consist of reading the field alteration data and the query may relate to an analytic purpose related to determining the suitability of a target company for acquisition. In addition, the altered data field may be read in accordance with the field alteration data.

In embodiments, a target company data set may be stored in a partition within a partitioned database, where the partition may be associated with a data characteristic of the target company data set. A master processing node may be associated with a plurality of slave nodes, where each of the plurality of slave nodes may be associated with a partition of the partitioned database. An analytic query relating to determining the suitability of a target company for acquisition may be submitted to the master processing node. In addition, the query may be processed by the master node assigning processing steps to an appropriate slave node.

In embodiments, a target company data set may be received, where the target company data set may include facts relating to items perceived to cause actions. In some embodiments, the target company data set may include data attributes associated with the fact data stored in the target company data set. A plurality of the combinations of a plurality of fact data and associated data attributes may be pre-aggregated in a causal bitmap. A subset of the pre-aggregated combinations may be selected based on suitability of a combination for an analytic purpose relating to determining the suitability of a target company for acquisition. In addition, the subset of pre-aggregated combinations may be stored to facilitate querying of the subset.

In embodiments, an availability condition associated with a data hierarchy in a database may be specified, where the data hierarchy may include a target company data set. In some embodiments, the availability condition may relate to the availability of data in the target company data set for an analytic purpose relating to determining the suitability of a target company for acquisition. The availability condition may be stored in a matrix. In addition, the matrix may be used to determine access to the target company data set in the data hierarchy.

In embodiments, a target company data set having a plurality of dimensions may be taken. A dimension of the target company data set may be fixed for purposes of pre-aggregating the data in the target company data set for the fixed dimension, where the fixed dimension may be selected based on suitability of the pre-aggregation to facilitate rapidly serving an analytic purpose relating to determining the suitability of a target company for acquisition. In addition, an analytic query of the target company data set may be allowed, where the query may be executed using pre-aggregated data if the query does not seek to vary the fixed dimension and the query is executed on the un-aggregated target company data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action may associate the data sets received in the data fusion facility with a standard population database. In addition, data from the data sets received may be fused in the data fusion facility into a new fused target company data set based at least in part on a key, where the key may embody at least one association between the standard population database and the data sets received in the data fusion facility, where the target company data set may be intended to be used for an analytic purpose relating to determining the suitability of a target company for acquisition.

In embodiments, a classification scheme associated with a plurality of attributes of a grouping of items may be identified in a target company data set. A dictionary of attributes associated with the items may be identified. A similarity facility may be used to attribute additional attributes to the items in the target company data set based on probabilistic matching of the attributes in the classification scheme and the attributes in the dictionary of attributes. In addition, the modified target company data set may be used for an analytic purpose relating to determining the suitability of a target company for acquisition.

In embodiments, certain data in a target company data set may be obfuscated to render a post-obfuscation target company data set, where the access to which may be restricted along at least one specified dimension. In addition, the post-obfuscation target company data set may be analyzed to produce an analytic result, where the analytic result may be related to determining the suitability of a target company for acquisition and may be based in part on information from the post-obfuscation target company data set while keeping the restricted data from release.

An analytic platform may be provided for executing queries relating to an analytic purpose relating to determining the suitability of a target company for acquisition. A target company data set may be received in the analytic platform. A new calculated measure that is associated with the target company data set may be added to create a custom data measure, where the custom data measure may be added during a user's analytic session. An analytic query requiring the custom data measure may be submitted during the user's analytic session. In addition, an analytic result based at least in part on analysis of the custom data measure may be presented during the analytic session.

In embodiments, a new data hierarchy associated with a target company data set in an analytic platform may be added to create a custom data grouping, where the new data hierarchy may be added during a user's analytic session. In addition, handling of an analytic query relating to determining the suitability of a target company for acquisition that uses the new data hierarchy may be facilitated during the user's analytic session.

In embodiments, a target company data set from which it is desired to obtain a projection for an analytic purpose relating to determining the suitability of a target company for acquisition may be taken. A core information matrix may be developed for the target company data set, where the core information matrix may include regions representing the statistical characteristics of alternative projection techniques that can be applied to the target company data set. In addition, a user interface may be provided whereby a user can observe the regions of the core information matrix to facilitate selecting an appropriate projection technique.

In embodiments, a target company data set from which it is desired to obtain a projection may be taken, where a user of an analytic platform may select at least one dimension on which the user wishes to make a project form the target company data set, the projection being for an analytic purpose relating to determining the suitability of a target company for acquisition. A core information matrix may be developed for the target company data set, where the core information matrix may include regions representing the statistical characteristics of the alternative projection techniques that can be applied to the target company data set, including statistical characteristics relating to projections using any selected dimensions. In addition, a user interface may be provided whereby a user can observe the regions of the core information matrix to facilitate selecting an appropriate projection technique.

Figure 88:
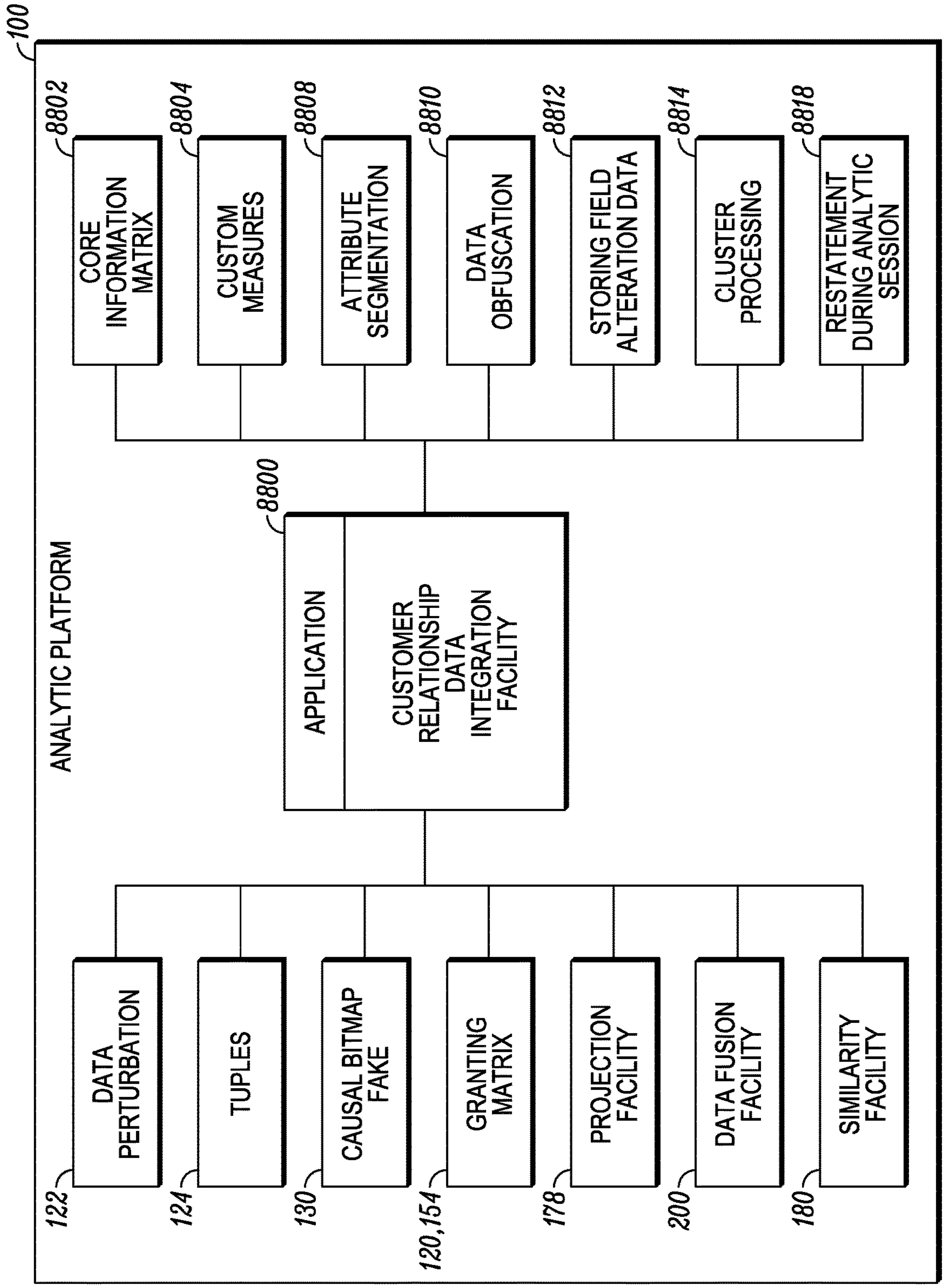
FIG. 88 depicts a customer relationship data integration application.

Referring to FIG. 88, in embodiments, non-unique values in a data table may be found, the data table associated with a customer relationship management data set. The non-unique values to render unique values may be perturbed. In addition, the non-unique value may be used as an identifier for a data item in the customer relationship management data set, where the customer relationship management data set may be used for an analytic purpose relating to determining customer motivation to purchase a product.

In embodiments, a projected facts table in a customer relationship management data set may be taken that has one or more associated dimensions. At least one of the dimensions to be fixed may be selected, where the selection of a dimension may be based on an analytic purpose relating to determining customer motivation to purchase a product. In addition, an aggregation of projected facts may be produced from the projected facts table and associated dimensions, the aggregation fixing the selected dimension for the purpose of allowing queries on the aggregated customer relationship management data set.

In embodiments, a plurality of data sources may be identified having data segments of varying accuracy, the data sources containing data relevant to an analytic purpose relating to determining customer motivation to purchase a product. A plurality of overlapping data segments may be identified among the plurality of data sources to use for comparing the data sources. A factor may be calculated as a function of the comparison of the overlapping data segments. In addition, the factor may be applied to update a customer relationship management data set containing at least one of the data sources.

In embodiments, a data field characteristic of a data field in a data table of an customer relationship management data set may be altered, where the alteration generates a field alteration datum. The field alteration datum associated with the alteration in a data storage facility may be saved. A query may be submitted requiring the use of the data field in the customer relationship management data set, where a component of the query consists of reading the field alteration data and the query relates to an analytic purpose related to determining customer motivation to purchase a product. In addition, the altered data field may be read in accordance with the field alteration data.

In embodiments, a customer relationship management data set may be received, the customer relationship management data set including facts relating to items perceived to cause actions, where the customer relationship management data set includes data attributes associated with the fact data stored in the customer relationship management data set. A plurality of the combinations of a plurality of fact data and associated data attributes in a causal bitmap may be pre-aggregated. A subset of the pre-aggregated combinations may be selected based on suitability of a combination for an analytic purpose relating to determining customer motivation to purchase a product. In addition, the subset of pre-aggregated combinations may be stored to facilitate querying of the subset.

In embodiments, an availability condition may be specified associated with a data hierarchy in a database, the data hierarchy including a customer relationship management data set, the availability condition relating to the availability of data in the customer relationship management data set for an analytic purpose relating to determining customer motivation to purchase a product. The availability condition in a matrix may be stored. In addition, the matrix may be used to determine access to the customer relationship management data set in the data hierarchy.

In embodiments, a customer relationship management data set may be taken having a plurality of dimensions. A dimension of the customer relationship management data set may be fixed for purposes of pre-aggregating the data in the customer relationship management data set for the fixed dimension, the fixed dimension being selected based on suitability of the pre-aggregation to facilitate rapidly serving an analytic purpose relating to determining customer motivation to purchase a product. In addition, an analytic query of the customer relationship management data set may be allowed, where the query may be executed using pre-aggregated data if the query does not seek to vary the fixed dimension and the query may be executed on the un-aggregated customer relationship management data set if the query seeks to vary the fixed dimension.

In embodiments, a panel data source data set may be received in a data fusion facility. A fact data source data set may be received in a data fusion facility. A dimension data source data set may be received in a data fusion facility. An action in the data fusion facility may be performed, where the action associates the data sets received in the data fusion facility with a standard population database. In addition, data from the data sets received in the data fusion facility may be fused into a new fused customer relationship management data set based at least in part on a key, where the key embodies at least one association between the standard population database and the data sets received in the data fusion facility, where the customer relationship management data set may be intended to be used for an analytic purpose relating to determining customer motivation to purchase a product.

In embodiments, a classification scheme may be identified associated with a plurality of attributes of a grouping of items in an customer relationship management data set. A dictionary of attributes associated with the items may be identified. In addition, a similarity facility may be used to attribute additional attributes to the items in the customer relationship management data set based on probabilistic matching of the attributes in the classification scheme and the attributes in the dictionary of attributes.

In embodiments, certain data in a customer relationship management data set may be obfuscated to render a post-obfuscation customer relationship management data set, access to which may be restricted along at least one specified dimension. In addition, the post-obfuscation customer relationship management data set may be analyzed to produce an analytic result, where the analytic result may be related to determining customer motivation to purchase a product and may be based in part on information from the post-obfuscation customer relationship management data set while keeping the restricted data from release.

In embodiments, an analytic platform may be provided for executing queries relating to an analytic purpose relating to determining customer motivation to purchase a product. A customer relationship management data set may be received in the analytic platform. A new calculated measure may be added that may be associated with the customer relationship management data set to create a custom data measure, where the custom data measure may be added during a user's analytic session. An analytic query may be submitted requiring the custom data measure during the user's analytic session. In addition, an analytic result may be presented based at least in part on analysis of the custom data measure during the analytic session.

In embodiments, a new data hierarchy associated with a customer relationship management data set may be added in an analytic platform to create a custom data grouping, where the new data hierarchy may be added during a user's analytic session. In addition, handling of an analytic query relating to determining customer motivation may be facilitated to purchase a product that uses the new data hierarchy during the user's analytic session.

In embodiments, a customer relationship management data set from which it may be desired may be taken to obtain a projection for an analytic purpose relating to determining customer motivation to purchase a product. A core information matrix for the customer relationship management data set may be developed, the core information matrix including regions representing the statistical characteristics of alternative projection techniques that may be applied to the customer relationship management data set. In addition, a user interface may be provided whereby a user may observe the regions of the core information matrix to facilitate selecting an appropriate projection technique.

In embodiments, a customer relationship management data set may be stored in a partition within a partitioned database, where the partition may be associated with a data characteristic of the customer relationship management data set. A master processing node may be associated with a plurality of slave nodes, where each of the plurality of slave nodes may be associated with a partition of the partitioned database. An analytic query may be submitted relating to determining customer motivation to purchase a product to the master processing node. In addition, the query may be processed by the master node assigning processing steps to an appropriate slave node.

In embodiments, a customer relationship management data set may be taken from which it may be desired to obtain a projection, where a user of an analytic platform may select at least one dimension on which the user wishes to make a projection from the customer relationship management data set, the projection being for an analytic purpose relating to determining customer motivation to purchase a product. A core information matrix may be developed for the customer relationship management data set, the core information matrix including regions representing the statistical characteristics of alternative projection techniques that may be applied to the customer relationship management data set, including statistical characteristics relating to projections using any selected dimensions. In addition, a user interface may be provided whereby a user may observe the regions of the core information matrix to facilitate selecting an appropriate projection technique.

Figure 89:
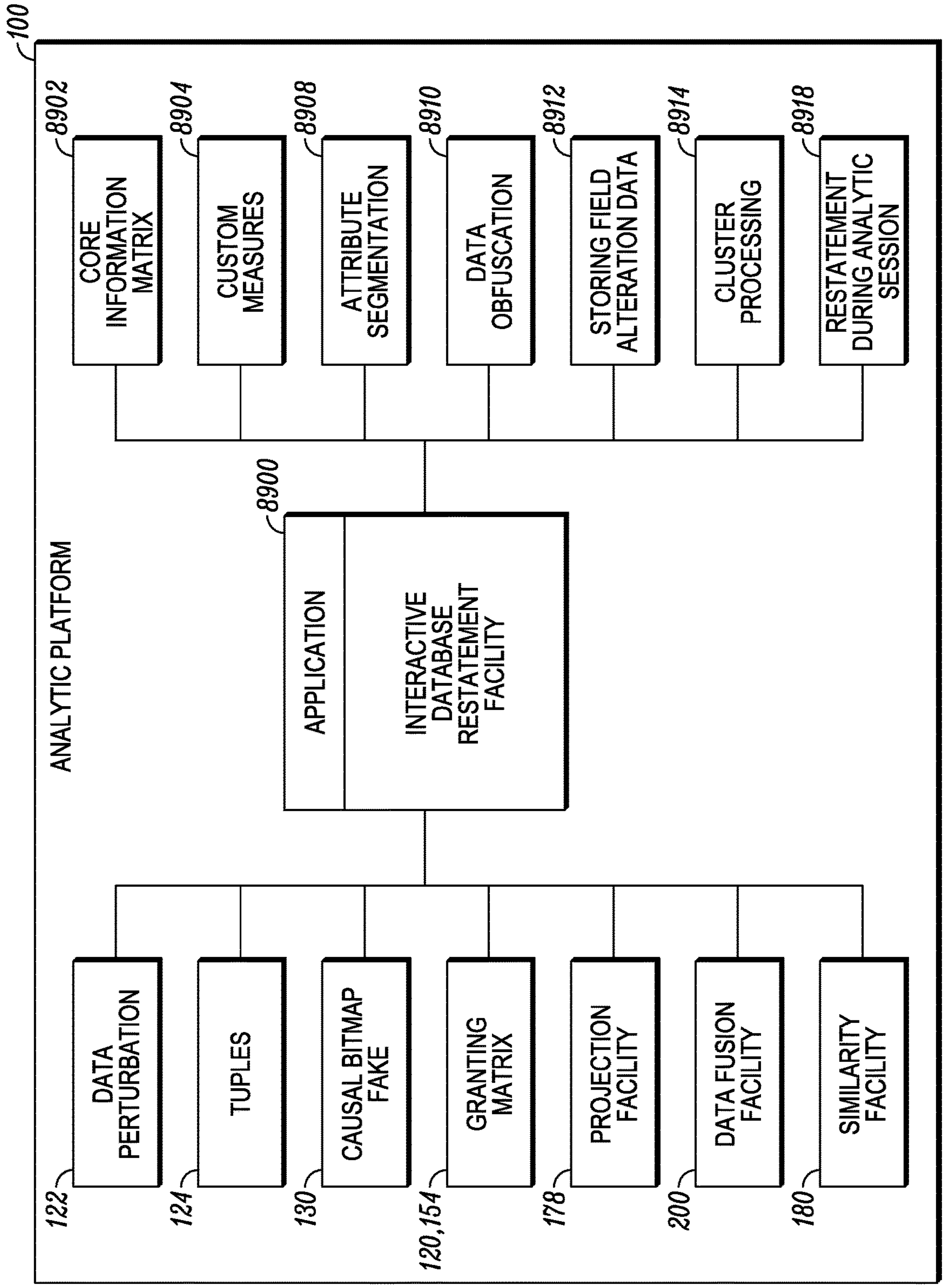
FIG. 89 depicts an interactive database restatement application.

Referring to FIG. 89, in embodiments, non-unique values in a data table may be found, the data table associated with an analytic data set. The non-unique values to render unique values may be perturbed. In addition, the non-unique value may be used as an identifier for a data item in the analytic data set, where the post-perturbation analytic data set may be used to assist with restating the analytic data set to render it more suitable for a desired analytic purpose.

In embodiments, taken a projected facts table in an analytic data set that has one or more associated dimensions. At least one of the dimensions may be selected to be fixed, where the selection of a dimension may be for the purpose of restating the analytic data set to render it more suitable for a desired analytic purpose. In addition, an aggregation of projected facts may be produced from the projected facts table and associated dimensions, the aggregation fixing the selected dimension for the purpose of allowing queries on the aggregated analytic data set.

In embodiments, a plurality of data sources may be identified having data segments of varying accuracy, the data sources containing data relevant to restating an analytic data set to render it more suitable for a desired analytic purpose. A plurality of overlapping data segments may be identified among the plurality of data sources to use for comparing the data sources. A factor may be calculated as a function of the comparison of the overlapping data segments. In addition, the factor may be applied to update an analytic data set containing at least one of the data sources.

In embodiments, a data field characteristic of a data field may be altered in a data table of an analytic data set, where the alteration may generate a field alteration datum and the alteration may be related to restating the data for a desired analytic purpose. The field alteration datum associated with the alteration may be saved in a data storage facility. A query may be submitted requiring the use of the data field in the analytic data set, where a component of the query consists of reading the field alteration. In addition, the altered data field may be read in accordance with the field alteration data.

In embodiments, an analytic data set may be received, the analytic data set including facts relating to items perceived to cause actions, where the analytic data set includes data attributes associated with the fact data stored in the analytic data set. A plurality of the combinations of a plurality of fact data and associated data attributes in a causal bitmap may be pre-aggregated. A subset of the pre-aggregated combinations may be selected based on suitability of a combination for the purpose of rendering it suitable for a desired analytic purpose. In addition, the subset of pre-aggregated combinations may be stored to facilitate querying of the subset.

In embodiments, an availability condition may be specified associated with a data hierarchy in a database, the data hierarchy including an analytic data set, the availability condition relating to the availability of data in the analytic data set for restatement. The availability condition may be stored in a matrix. In addition, the matrix may be used to determine access to the analytic data set in the data hierarchy.

In embodiments, an analytic data set may be taken having a plurality of dimensions. A dimension of the analytic data set may be fixed for purposes of pre-aggregating the data in the analytic data set for the fixed dimension, the fixed dimension being selected based on suitability of the pre-aggregation to facilitate rapidly serving an analytic purpose relating to restating the analytic data set to render it more suitable for a desired analytic purpose. In addition, an analytic query may be allowed of the analytic data set, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action may associate the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, where the data fusion facility may be intended to be used for restating the analytic data set to render it more suitable for a desired analytic purpose.

In embodiments, a classification scheme associated with a plurality of attributes of a grouping of items may be identified in an analytic data set. A dictionary of attributes associated with the items may be identified. In addition, a similarity facility may be used to attribute additional attributes to the items in the analytic data set based on probabilistic matching of the attributes in the classification scheme and the attributes in the dictionary of attributes in order to restate the data set for an analytic purpose relating to using the classification scheme.

In embodiments, certain data in an analytic data set may be obfuscated to render a post-obfuscation analytic data set, access to which may be restricted along at least one specified dimension. The post-obfuscation analytic data set may be restated to render it more suitable for a desired analytic purpose that may be based in part on information from the post-obfuscation analytic data set. In addition, the restricted data may be kept from release.

In embodiments, an analytic platform may be provided for executing queries. An analytic data set may be received in the analytic platform. A new calculated measure may be added that may be associated with the analytic data set to create a custom data measure, where the custom data measure may be added during a user's analytic session to render the platform more suitable for a desired analytic purpose. An analytic query may be submitted requiring the custom data measure during the user's analytic session. In addition, an analytic result may be presented based at least in part on analysis of the custom data measure during the analytic session.

In embodiments, a new data hierarchy associated with an analytic data set may be added in an analytic platform to create a custom data grouping, where the new data hierarchy may be added during a user's analytic session. In addition, handling of an analytic query relating to restating the analytic data set may be facilitated to render it more suitable for a desired analytic purpose.

In embodiments, an analytic data set may be taken from which it may be desired to obtain a projection for an analytic purpose relating to restating the analytic data set to render it more suitable for a desired analytic purpose. A core information matrix may be developed for the analytic data set, the core information matrix including regions representing the statistical characteristics of alternative projection techniques that may be applied to the analytic data set. In addition, a user interface may be provided whereby a user may observe the regions of the core information matrix to facilitate selecting an appropriate projection technique.

In embodiments, an analytic data set may be stored in a partition within a partitioned database, where the partition may be associated with a data characteristic of the analytic data set and the portioning scheme may be related to restating the analytic data set to render it more suitable for a desired analytic purpose. A master processing node may be associated with a plurality of slave nodes, where each of the plurality of slave nodes may be associated with a partition of the partitioned database. An analytic query may be submitted relating to restating the analytic data set to render it more suitable for a desired analytic purpose to the master processing node. In addition, the query may be processed by the master node assigning processing steps to an appropriate slave node In embodiments, an analytic data set may be taken from which it may be desired to obtain a projection, where a user of an analytic platform may select at least one dimension on which the user wishes to make a projection from the analytic data set, the projection being for an analytic purpose relating to restating the analytic data set to render it more suitable for a desired analytic purpose. A core information matrix may be developed for the analytic data set, the core information matrix including regions representing the statistical characteristics of alternative projection techniques that may be applied to the analytic data set, including statistical characteristics relating to projections using any selected dimensions. In addition, a user interface may be provided whereby a user may observe the regions of the core information matrix to facilitate selecting an appropriate projection technique.

In embodiments, the present invention provides an analytic platform 100, which may receive a loyalty data source dataset in a data fusion facility 200 associated with the analytic platform 100, and receive a fact data source dataset in the data fusion facility 200 and a dimension data source dataset in the data fusion facility. An action may be performed in the data fusion facility 200, where the action associates the datasets received in the data fusion facility 200 with a standard population database, and fuses the data from the datasets received in the data fusion facility 200 into a fused consumer loyalty dataset based at least in part on an encryption key. The encryption key, in turn, may embody at least one association between the standard population database and the datasets received in the data fusion facility. An analytic shopper behavior framework may be provided to evaluate at least one of a shopper behavior, shopper insight, shopper attitude, and shopper attribute, where a purchase event may be associated with the fused consumer loyalty dataset. The fused loyalty dataset may be analyzed using an analytic platform 100, where the analysis may determine consumer motivation for the purchase event. Product affinities may be generated from market basket data across a plurality of channels, where product affinity information may be used to create a behavioral customer segment, trip mission, neighborhood cluster, and the like. The fused consumer loyalty dataset may be segmented based at least in part on the analysis, and the segmented analytic results may then be presented within a user interface 182.

In embodiments, the analytic platform 100 may enable multi-user collaboration, report sharing, dynamic filtering, attribute filtering, sorting, ranking, and the like. A user interface 100 may provide multiple concurrent product hierarchies based upon a store attribute are maintained during a user session, multiple concurrent store hierarchies based upon a store attribute are maintained during a user session, a non-traditional store hierarchy is maintained during a user session, data hierarchies are adaptable based at least in part on a scenario, and the like, where a scenario may be a planned merger, planned acquisition, product launch, product removal from the marketplace, and the like. The user interface may enable an interactive drill-down within a report, interactive drill-up within a report, interactive swap among reports, interactive pivot within a report, graphical dial indicators, flexible formatting dynamic titles, may be accessible through the Internet, and the like. The fact data source may be a retail sales dataset, point-of-sale data, a syndicated causal dataset, an internal shipment dataset, an internal financial dataset, and the like. The fact data source may also be a syndicated sales dataset, where the syndicated sales dataset may be a scanner dataset, audit dataset, combined scanner-audit dataset, and the like.

In embodiments, shopper insights may determine strategic decisions and execution, and may provide an approach to CPGs and retailers to improve overall performance. Effective shopper driven programs may build up a detailed understanding of the shopper based on many elements, including behavior (what they buy and how they buy), attitudes (why they buy), demographics (what they look like), and the like. These enterprises may then localize execution based on the similarity of attributes of the shoppers in given areas—stores, neighborhoods and trading areas, driving assortment, pricing, promotion, store layout, and shelf layout based on shopper metrics. In marketing, enterprises may use these detailed understandings of the shopper and their propensity to execute far more efficient and effecting promotions and targeted marketing campaigns.

In embodiments, the analytics platform 100 may provide improved speed, power, analytics, data integration and business information visualization across shopper solutions. The analytics platform 100 may operate very differently from the typical approaches to database construction. It may solve issues associated with frustrations that have existed in the area of the invention for decades, and in doing so, may enable new insights into products, retailers and shoppers. For instance, instead of pre-building databases with every possible combination of product, store and measure, the analytics platform 100 may submit queries in real time, and process these dynamically on-demand. No measures or sub-totals may have to be pre-calculated. The analytics platform's database may include a plurality of categories and data sources, such as (pos, panel, loyalty, shipment, media, and the like, that may be first integrated and then aligned across a common framework, such as in time, geography, product, household, and the like. Adding new data may be relatively easy, where instead of a plurality of separate databases containing multiple categories and data types, the analytics platform may operate just one. The data may be stored at a granular level, where store level, UPC level, and the like, may be available, provided the user has the rights to view the raw data. The analytics platform may use a query engine that manages calculations, projections (when estimating for non-participating stores), houses the dimensions of the data 'cubes' which may be built in order to fulfill each query, and the like, where multiple databases are replaced by consolidating hierarchies. The analytics platform may separate the dimensions (hierarchy, structure) from the data and only reference them when a query is submitted, treating attributes as dimensions, making them available to users to add as data filters, and the like. Separating the hierarchies may offer productivity and flexibility gains and using attributes of products, stores and shoppers as dimensions to drive new insights. Productivity gains may include a minimizing of restatements, where they may only be required when fundamental structures of a database are changed, such as a change to the hierarchy by a retailer, a new hierarchy created to match a market structure, new products which require re-placement, new measure creation, and the like.

In embodiments, the present invention may be associated with attributes. The analytic platform may treat the product, store and shopper attributes as dimensions, enabling new insights which in turn, may drive revenue and competitive advantage. For example, product attributes analysis may be by ingredient, fat content, packaging type, form, flavor, health & wellness, and the like. Store attributes analysis may be by local ethnic percentages in the store trading area, income and population, and the like. Shopper attribute analysis may be by the life stage of the panelist according to a profile. In addition, the analytics platform's user interface may provide an important point of interaction between analytic platform and the user. Capabilities of the user interface include ad-hoc data queries with interactive visualization, rapid building of applications, analyses and workflows, automated publishing, alerts and guided analysis, data extracts that may feeding third party and user internal solutions, sharing and collaboration internally across departments and externally with retailers, and the like.

In embodiments, the present invention may provide for shopper segmentation analytics, which may utilize granular, basket-level data as an information source, such as frequent shopper data, pos transactions, panel purchasing records, and the like data may be organized and integrated from disparate sources into a single view of shopper transactions. The analytics leverage individual shopper purchasing details at the trip, store, date and time, and upc-level and grouped by manufacturer, sub-brand, brand, category, department, and the like. Other information sources may include relevant store level attributes, such as location, zones, formats, retail store clusters, as well as shopper-specific classifications. These may include: important ethnic marketing segments, such as Hispanics, African Americans, and Asians; geo-demographics shopper classifications; life stage classifications, proprietary shopper segments; and retail shopper segments. Furthermore, integration of trip-specific classifications may be provided, such as retail trip missions. Shopper segmentation analytics may provide for a plurality of tools for evaluation, such as shopper behavioral segmentation, shopper value and loyalty segments, shopper share of wallet analysis, shopper product affinity analysis, shopper trip mission segments, behavioral based store clusters, shopper attitudinal segmentation, and the like.

In embodiments, the present invention may provide for shopper behavioral segmentation, where shopper behavioral segmentation may be a foundation for customer strategy. This analysis may identify distinct, relevant, and actionable shopper segments from the shopper purchasing details. Users may not have a clear sense of a retailer's segments but also a full set of buying behaviors, segment economics and segment profiles. The analysis may also include a view of shopper segment's likelihood to purchase, and to respond to price, promotion, and CRM. This information are key component in the investment analysis described below and may be employed to place the shopper-centric customer strategy into operation. The segments may be the basis for segment based CRM campaign that integrate in-store merchandising and for marketing priorities and messaging based on purchase propensities.

In embodiments, the present invention may provide for shopper value and loyalty segments, where shopper value segments and shopper loyalty segments may enhance the insights gained from shopper behavior segments. Shopper value segments may provide a distribution profile of the value of shoppers in total, by segment and by trip based on spending bands or deciles. The user may have a clear sense of each segment, buying behavior, behavioral segments and geo-demographic profiles. Shopper loyalty segments may measure loyalty by tracking in total, by segment, and by trip. Users may also have visibility into shoppers' loyalty trends.

In embodiments, the present invention may provide for shopper share of wallet analysis, where shopper share of wallet analysis may provide a full view of selected shopper segments by matching corresponding groups in an insights panel. The user may understand the total buying behavior and cross outlet shopping in total and by segment. Furthermore, the analysis assists with qualifying user and a retailer's upside opportunities by segment. The analysis may help define the competitive landscape and shape the investment analysis that follows.

In embodiments, the present invention may provide for shopper product affinity analysis, where shopper product affinity analysis may provide insight into which products and groups of products tend to be purchased on same shopping trips. Users may gain understanding of the core set of product groups whose members are most likely to be purchased together. The analysis may serve as an essential building block of shopper trip missions analysis and for marketing and merchandising planning. For example, the building blocks may be inputs for more effective merchandising layouts and cross promotions.

In embodiments, the present invention may provide for shopper trip mission segments, where shopper trip mission segments may be provide by a need for formatting in the retail marketplace. CPGs and retailers should understand trip mission dynamics in order to compete effectively and efficiently. Consumer panel data alone may not be adequate because trip mission dynamics differ by channel and may require a view of total store purchasing. The analysis may profile each trip mission in terms of its product drivers, behavioral segment mix and economics and, it helps the retailer clearly understand which trips are critical to success. Users and the retailer may better understand "core" vs. "differentiated" vs. "marginal" trips. The retailer's go to market strategies may be interrelated to the trip missions that focus of objectives. The same insights will enable a user to position its brand portfolio as retail trip drivers.

In embodiments, the present invention may provide for behavioral based store clusters, where behavioral based store clusters may enable improved success for merchandising localization. Category managers and store operators may be challenged by dealing with the needs of distinct shopper segments. Store clusters may be a much more practical way of localizing assortment, space management and promotion decisions. Store clusters may be created from statistical store-level analysis of behavior segments and their trip mission mixes. Each store cluster may be profiled in terms of its buying behavior, economics, segments mix, trip mix, geo-demographics, and the like. The retailer and the user may learn the similarities within and differences between store clusters. Thus, each store cluster may be treated as its own business with merchandising strategies defined for each cluster separately.

In embodiments, the present invention may provide for shopper attitudinal segmentation, where shopper attitudinal analysis may address the reasons behind the a purchase. It may provide insights on shopper rationale for store choice generally and by trip mission specifically. The insights may be linked back to shopper segments, store clusters, trips, and the like. These insights may drive segment based messaging and overall marketing messaging.

In embodiments, these segments, trips and clusters, may be "branded" to communicate the concepts and accelerate adoption. Shopper segmentation consultants may work with user teams to provide detailed recommendations related to: shopper segment investment, trip mission priorities, corporate product priorities, and the like.

In embodiments, the present invention may provide for shopper-centric merchandising applications. A shopper solution suite may include a plurality of applications that may utilize shopper data to drive shopper insight based decisions, including a category business planner, assortment planning, and the like. The category business planner may automate the development of shopper driven category business plans and may include scorecards and kpi's for ongoing measurement. Full category plans may be developed that highlight and focus on critical shopper segments, trip types, store clusters, and the like. Multiple scenarios may be planned, with full what-if analysis. The assortment planner may bring together market basket analysis, shopper segments and trips, and the rest of market to help category planners build optimal assortments for several clusters. Full scenario analysis, what-if capability, and analytics may be provided.

In embodiments, the present invention may provide a shopper analysis platform. The loyalty analytics platform may extend the analytics and insights of SIE into ongoing shopper driven merchandising programs providing an ongoing platform for shopper centric category management, including assortment, new items, promotion, pricing, and diagnostics all driven and measured through the lens of shopper segments, trip types and clusters. The loyalty analytics platform may deliver a plurality of pre-designed analytics designed to answer user needs such as product item performance, which items are driving category growth/decline? This report may illustrates, at an item level, purchase behavior trends in terms of dollars, dollars on promotion, units, and buying rate. A user may identify items that are driving overall brand/category growth or decline, as well as cross reference items against one another to benchmark performance. Customer segment item appeal, which items appeal to which customer segments? This report may identify a mix of products that appeal to a given customer segment while allowing to cross compare over multiple customer segments. A user may recognize similar buying behaviors among customers, while understanding which products are unique and different from each other within their buying mix. Geography benchmarking, how do different geographies and store clusters compare to each other. This report may provide profiling metrics across geographies and store clusters. Users may understand synergies and differences within geographies to better target product marketing, as well as develop objectives and goals based on store performance. New product key metric trends, how is a new item trending against key metrics? This report may show a new item's trended performance against key metrics. A user may track a new item's success to date in terms of penetration, dollars, household share, trips, distribution, and buying rate. Store performance analysis, how do performance compare across stores? This report may provide key profiling metrics at the store level for a particular product and customer segment. Users may understand synergies and differences by store to better target product marketing, as well as develop objectives and goals based on store performance. Product trip key metrics, what trip types drive a product's performance? This report may show how trip types and consumer segments compose the overall sales of an item. As an end result users may better direct marketing strategies to gear to the right consumers, and make product placement recommendations in accessible locations based on the trip mission. Promotion segment impact, how did customer segments respond to a promotion? This report may show the effect a promotional event had on customer segments. Specifically, it may identify the impact on household penetration and buying rate, while allowing a user to quickly compare impact across segments in one snapshot. Trial and repeat, what is the likely short/long term success of a new product? The trial & repeat analysis may evaluate a new product's introductory performance by tracking initial trial and repeat purchasing for up to a year after introduction. By quantifying the success with which a brand attracts and maintains its buyer franchise, the analysis may deliver timely insights that provide direction for refining or altering marketing tactics. Brand switching, where is my brand's volume going to/coming from? The brand switching analysis may help explain why a brand is gaining or losing sales through: brand switching, increased/decreased consumption and/or category expansion/contraction. This analysis may be used to identify which competitive brands are gaining/losing share to the brand, examine which brands may have more interaction, identify which brands may be viewed as substitutable and determine if cannibalization is a factor within a brand's line of products. Brand rationalization, which brands can be rationalized within a category? The brand rationalization analysis allows you to identify which brands may be eliminated with minimal sales impact to the category. This analysis may also be used to fine tune assortment decision by store clusters.

In embodiments, the present invention may integrate, house and manage user shopper data to provide a comprehensive, real-time environment for shopper insights, analytics and collaboration, integrating billions of basket-level transactions from multiple sources, segments, trips, clusters and other dimensional data, and product, store and household attributes into a platform for action every day in merchandising and marketing. In addition, loyalty analytics platform may be extended via the web directly to the retailer for real-time collaboration and workflow. The user and the retailer may collaborate on loyalty analytics may make shopper insights actionable.

Figure 90:
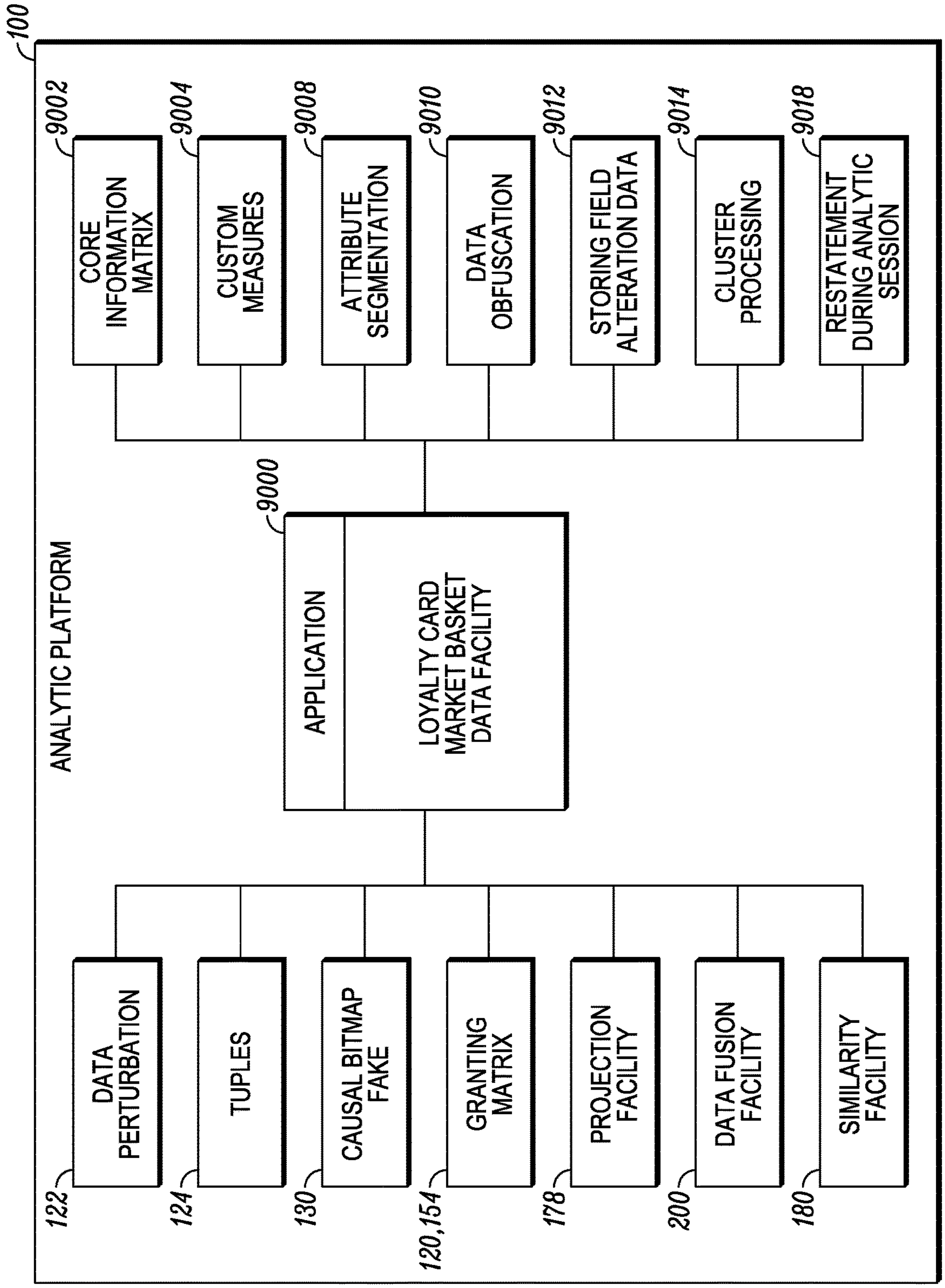
FIG. 90 depicts a loyalty card market basket data application.

Referring to FIG. 90, in embodiments, non-unique values in a data table may be found, where the data table may be associated with a loyalty card market basket data set. The non-unique values may be perturbed to render unique values. The non-unique value may be used as an identifier for a data item in the loyalty card market basket data set, where the loyalty card market basket data set may be used for an analytic purpose relating to determining consumer motivation for a purchase event. In addition, product affinities across a plurality of channels may be determined, where product affinity information may be used to create a conclusion relating to at least one of a behavioral customer segment, a trip mission, and a neighborhood cluster.

In embodiments, a projected facts table in a loyalty card market basket data set may be taken that has one or more associated dimensions. At least one of the dimensions to be fixed may be selected, where the selection of a dimension may be based on an analytic purpose relating to determining consumer motivation for a purchase event. An aggregation of projected facts from the projected facts table and associated dimensions may be produced, where the aggregation may fix the selected dimension for the purpose of allowing queries on the aggregated loyalty card market basket data set. In addition, product affinities across a plurality of channels may be determined, where product affinity information may be used to create a conclusion relating to at least one of a behavioral customer segment, a trip mission, and a neighborhood cluster.

In embodiments, a plurality of data sources having data segments of varying accuracy may be identified, where the data sources may contain data relevant to an analytic purpose relating to determining consumer motivation for a purchase event. A plurality of overlapping data segments among the plurality of data sources may be identified to use for comparing the data sources. A factor may be calculated as a function of the comparison of the overlapping data segments. The factor to update a loyalty card market basket data set containing at least one of the data sources may be applied. In addition, product affinities across a plurality of channels may be determined, where product affinity information may be used to create a conclusion relating to at least one of a behavioral customer segment, a trip mission, and a neighborhood cluster.

In embodiments, a data field characteristic of a data field in a data table of an loyalty card market basket data set may be altered, where the alteration may generate a field alteration datum. The field alteration datum associated with the alteration in a data storage facility may be saved. A query requiring the use of the data field in the loyalty card market basket data set may be submitted, where a component of the query may consist of reading the field alteration data and the query may relate to an analytic purpose related to determining consumer motivation for a purchase event. The altered data field may be read in accordance with the field alteration data. In addition, product affinities across a plurality of channels may be determined, where product affinity information may be used to create a conclusion relating to at least one of a behavioral customer segment, a trip mission, and a neighborhood cluster In embodiments, a loyalty card market basket data set may be received, where the loyalty card market basket data set may include facts relating to items perceived to cause actions, and the loyalty card market basket data set includes data attributes associated with the fact data stored in the loyalty card market basket data set. A plurality of the combinations of a plurality of fact data and associated data attributes in a causal bitmap may be pre-aggregated. A subset of the pre-aggregated combinations may be selected based on suitability of a combination for an analytic purpose relating to determining consumer motivation for a purchase event. The subset of pre-aggregated combinations may be stored to facilitate querying of the subset. In addition, product affinities across a plurality of channels may be determined, where product affinity information may be used to create a conclusion relating to at least one of a behavioral customer segment, a trip mission, and a neighborhood cluster.

In embodiments, an availability condition associated with a data hierarchy in a database may be specified, where the data hierarchy may include a loyalty card market basket data set, and the availability condition may relate to the availability of data in the loyalty card market basket data set for an analytic purpose relating to determining consumer motivation for a purchase event. The availability condition in a matrix may be stored. The matrix may be used to determine access to the loyalty card market basket data set in the data hierarchy. In addition, product affinities may be determined across a plurality of channels, where product affinity information may be used to create a conclusion relating to at least one of a behavioral customer segment, a trip mission, and a neighborhood cluster.

In embodiments, a loyalty card market basket data set having a plurality of dimensions may be taken. A dimension of the loyalty card market basket data set may be fixed for purposes of pre-aggregating the data in the loyalty card market basket data set for the fixed dimension, where the fixed dimension being selected may be based on suitability of the pre-aggregation to facilitate rapidly serving an analytic purpose relating to determining consumer motivation for a purchase event. An analytic query of the loyalty card market basket data set may be allowed, where the query may be executed using pre-aggregated data if the query does not seek to vary the fixed dimension and the query may be executed on the un-aggregated loyalty card market basket data set if the query seeks to vary the fixed dimension. In addition, product affinities across a plurality of channels may be determined, where product affinity information may be used to create a conclusion relating to at least one of a behavioral customer segment, a trip mission, and a neighborhood cluster.

In embodiments, a panel data source data set may be received in a data fusion facility. A fact data source data set may be received in a data fusion facility. A dimension data source data set may be received in a data fusion facility. An action in the data fusion facility may be performed, where the action may associate the data sets received in the data fusion facility with a standard population database. Data from the data sets received in the data fusion facility may be fused into a new fused loyalty card market basket data set based at least in part on a key, where the key may embody at least one association between the standard population database and the data sets received in the data fusion facility, and the loyalty card market basket data set may be intended to be used for an analytic purpose relating to determining consumer motivation for a purchase event. In addition, product affinities across a plurality of channels may be determined, where product affinity information may be used to create a conclusion relating to at least one of a behavioral customer segment, a trip mission, and a neighborhood cluster.

In embodiments, a classification scheme associated with a plurality of attributes of a grouping of items in an loyalty card market basket data set may be identified. A dictionary of attributes associated with the items may be identified. A similarity facility may be used to attribute additional attributes to the items in the loyalty card market basket data set based on probabilistic matching of the attributes in the classification scheme and the attributes in the dictionary of attributes. In addition, product affinities may be determined across a plurality of channels, where product affinity information may be used to create a conclusion relating to at least one of a behavioral customer segment, a trip mission, and a neighborhood cluster In embodiments, certain data in a loyalty card market basket data set may be obfuscated to render a post-obfuscation loyalty card market basket data set, access to which may be restricted along at least one specified dimension. The post-obfuscation loyalty card market basket data set may be analyzed to produce an analytic result, where the analytic result may be related to determining consumer motivation for a purchase event and may be based in part on information from the post-obfuscation loyalty card market basket data set while keeping the restricted data from release. In addition, product affinities may be determined across a plurality of channels, where product affinity information may used to create a conclusion relating to at least one of a behavioral customer segment, a trip mission, and a neighborhood cluster.

In embodiments, an analytic platform may be provided for executing queries relating to an analytic purpose relating to determining consumer motivation for a purchase event. A loyalty card market basket data set may be received in the analytic platform. A new calculated measure may be added that may be associated with the loyalty card market basket data set to create a custom data measure, where the custom data measure may be added during a user's analytic session. An analytic query requiring the custom data measure may be submitted during the user's analytic session. An analytic result may be presented based at least in part on analysis of the custom data measure during the analytic session. In addition, product affinities may be determined across a plurality of channels, where product affinity information may be used to create a conclusion relating to at least one of a behavioral customer segment, a trip mission, and a neighborhood cluster.

In embodiments, a new data hierarchy may be added associated with a loyalty card market basket data set in an analytic platform to create a custom data grouping, where the new data hierarchy may be added during a user's analytic session. Handling of an analytic query may be facilitated relating to determining consumer motivation for a purchase event that may use the new data hierarchy during the user's analytic session. In addition, product affinities may be determined across a plurality of channels, where product affinity information may be used to create a conclusion relating to at least one of a behavioral customer segment, a trip mission, and a neighborhood cluster.

In embodiments, a loyalty card market basket data set may be taken from which it may be desired to obtain a projection for an analytic purpose relating to determining consumer motivation for a purchase event. A core information matrix may be developed for the loyalty card market basket data set, the core information matrix may include regions representing the statistical characteristics of alternative projection techniques that may be applied to the loyalty card market basket data set. A user interface may be provided whereby a user may observe the regions of the core information matrix to facilitate selecting an appropriate projection technique. In addition, a selected projection technique may be used for determining product affinities across a plurality of channels, where product affinity information may be used to create a conclusion relating to at least one of a behavioral customer segment, a trip mission, and a neighborhood cluster.

In embodiments, a loyalty card market basket data set may be stored in a partition within a partitioned database, where the partition may be associated with a data characteristic of the loyalty card market basket data set. A master processing node may be associated with a plurality of slave nodes, where each of the plurality of slave nodes may be associated with a partition of the partitioned database. An analytic query may be submitted relating to determining consumer motivation for a purchase event to the master processing node. The query may be processed by the master node assigning processing steps to an appropriate slave node. In addition, product affinities may be determined across a plurality of channels, where product affinity information may be used to create a conclusion relating to at least one of a behavioral customer segment, a trip mission, and a neighborhood cluster.

In embodiments, a loyalty card market basket data set may be taken from which it may be desired to obtain a projection, where a user of an analytic platform may select at least one dimension on which the user wishes to make a projection from the loyalty card market basket data set, the projection being for an analytic purpose relating to determining consumer motivation for a purchase event. A core information matrix may be developed for the loyalty card market basket data set, the core information matrix including regions representing the statistical characteristics of alternative projection techniques that may be applied to the loyalty card market basket data set, including statistical characteristics relating to projections using any selected dimensions. A user interface may be provided whereby a user may observe the regions of the core information matrix to facilitate selecting an appropriate projection technique. In addition, a selected projection technique for determining product affinities across a plurality of channels may be used, where product affinity information may be used to create a conclusion relating to at least one of a behavioral customer segment, a trip mission, and a neighborhood cluster.

Figure 91:
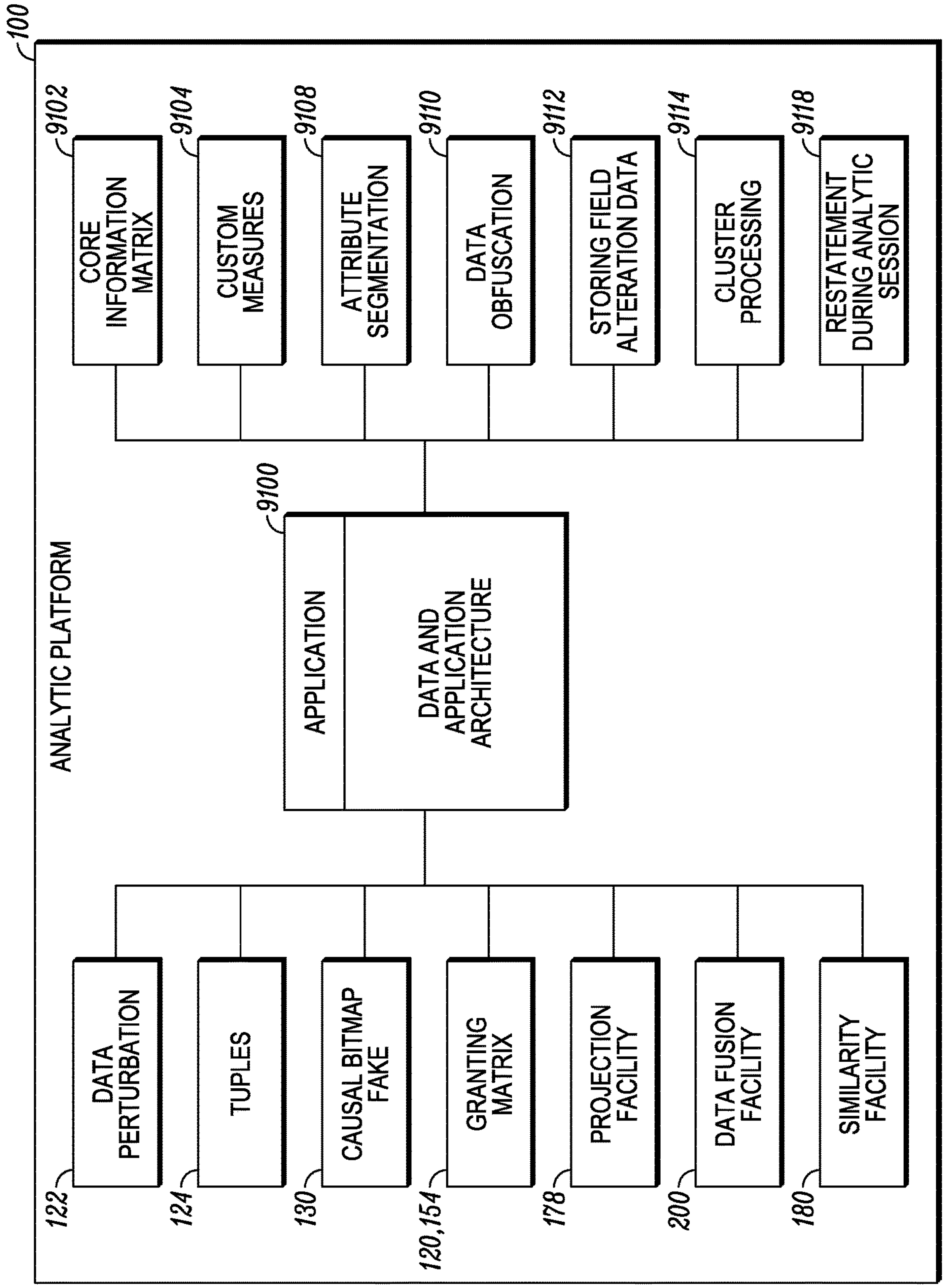
FIG. 91 depicts a data and application architecture.

Referring to FIG. 91, in embodiments, a data and application architecture may be provided within the analytic platform 100 and associated with a data perturbation facility, a tuples facility, a causal bitmap fake facility, granting matrix, projection, facility, similarity facility, core information matrix, custom measures, attribute segmentation, data obfuscation, storing field alteration data, cluster processing, restatement during analytic session facility, or some other analytic platform component.

Figure 92:
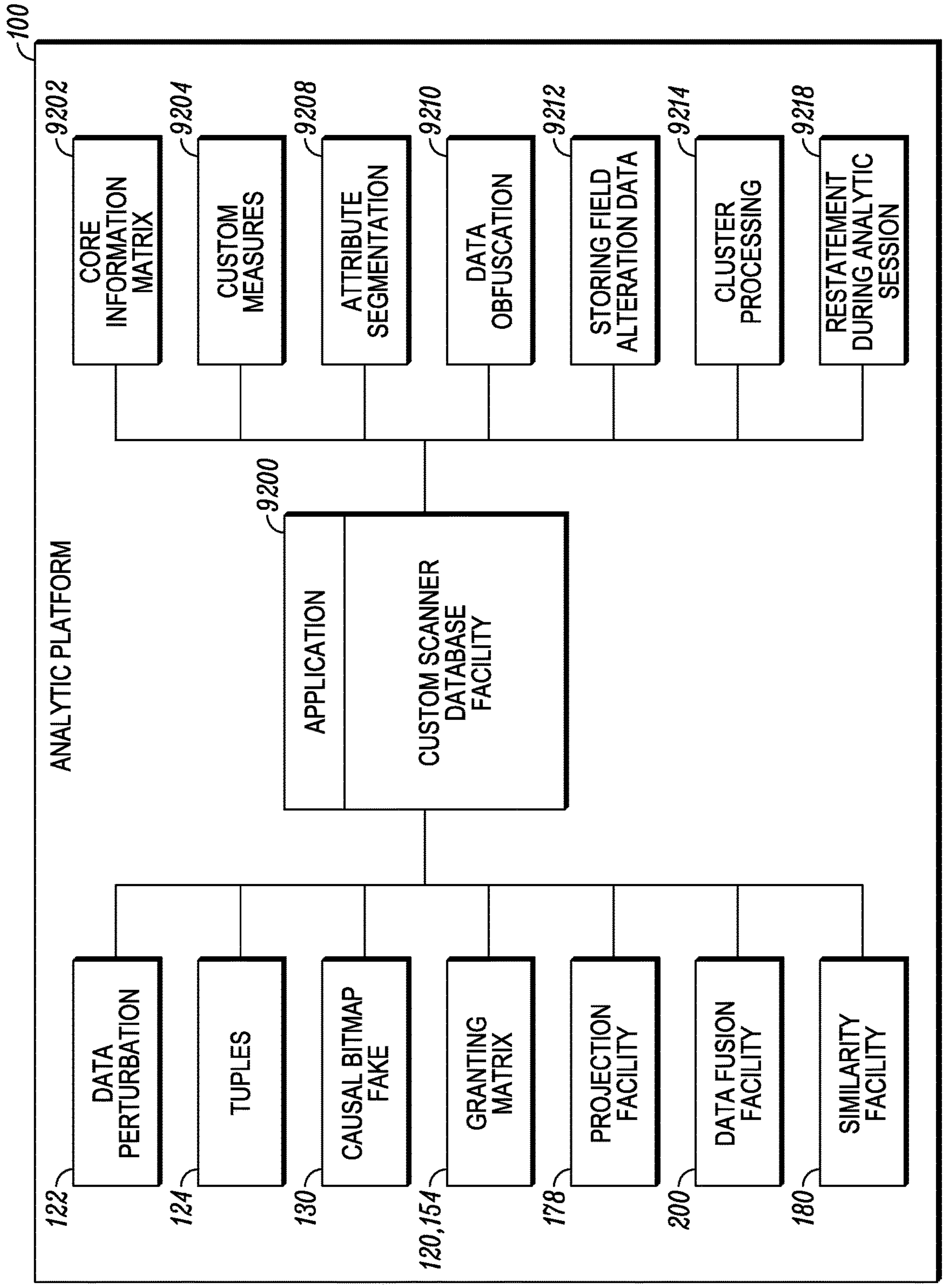
FIG. 92 depicts a custom scanner database application.

Referring to FIG. 92, in embodiments, non-unique values in a data table may be found, the data table associated with an analytic data set. The non-unique values may be perturbed to render unique values. In addition, the non-unique value may be used as an identifier for a data item in the analytic data set, where the analytic data set may be used to enable a custom scanner database.

In embodiments, a projected facts table may be taken in an analytic data set that has one or more associated dimensions. At least one of the dimensions may be selected to be fixed, where the selection of a dimension may be used to enable a custom scanner database. In addition, an aggregation of projected facts may be produced from the projected facts table and associated dimensions, the aggregation fixing the selected dimension for the purpose of allowing queries on the aggregated analytic data set.

In embodiments, a plurality of data sources may be identified having data segments of varying accuracy, the data sources containing data relevant to enabling a custom scanner database. A plurality of overlapping data segments may be identified among the plurality of data sources to use for comparing the data sources. A factor may be calculated as a function of the comparison of the overlapping data segments. In addition, the factor may be applied to update an analytic data set containing at least one of the data sources.

In embodiments, a data field characteristic of a data field in a data table of an analytic data set may be altered, where the alteration generates a field alteration datum. In addition, the field alteration datum associated with the alteration in a custom scanner database may be saved.

In embodiments, an analytic data may be stored set in a partition within a partitioned database, where the partition may be associated with a data characteristic of the analytic data set. A master processing node may be associated with a plurality of slave nodes, where each of the plurality of slave nodes may be associated with a partition of the partitioned database. An analytic query may be submitted in a custom scanner database to the master processing node. In addition, the query may be processed by the master node assigning processing steps to an appropriate slave node.

In embodiments, may be received an analytic data set, the analytic data set including facts relating to items perceived to cause actions, where the analytic data set includes data attributes associated with the fact data stored in the analytic data set. A plurality of the combinations of a plurality of fact data and associated data attributes may be pre-aggregated in a causal bitmap. A subset of the pre-aggregated combinations may be selected based on suitability of a combination for use in a custom scanner database. In addition, the subset of pre-aggregated combinations may be stored to facilitate querying of the subset.

In embodiments, an availability condition may be specified associated with a data hierarchy in a database, the data hierarchy including an analytic data set, the availability condition relating to the availability of data in the analytic data set for a custom scanner database. The availability condition in a matrix may be stored. In addition, the matrix may be used to determine access to the analytic data set in the data hierarchy.

In embodiments, an analytic data set having a plurality of dimensions may be taken. A dimension of the analytic data set may be fixed for purposes of pre-aggregating the data in the analytic data set for the fixed dimension, the fixed dimension being selected based on suitability of the pre-aggregation to facilitate rapidly serving a custom scanner database. In addition, an analytic query of the analytic data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, where the analytic data set may be intended to be used to enable a custom scanner database.

In embodiments, a classification scheme may be identified associated with a plurality of attributes of a grouping of items in an analytic data set. A dictionary of attributes associated with the items may be identified. A similarity facility may be used to attribute additional attributes to the items in the analytic data set based on probabilistic matching of the attributes in the classification scheme and the attributes in the dictionary of attributes. In addition, the modified analytic data set may be used for an analytic purpose relating to enable a custom scanner database.

In embodiments, certain data may be obfuscated in an analytic data set to render a post-obfuscation analytic data set, access to which may be restricted along at least one specified dimension. The post-obfuscation analytic data set may be analyzed to produce an analytic result. In addition, the post-obfuscation result may be stored in a custom scanner database that uses information from the post-obfuscation analytic data set while keeping the restricted data from release.

In embodiments, an analytic platform may be provided for executing queries on a custom scanner database. An analytic data set may be received in the analytic platform. A new calculated measure may be added that may be associated with the analytic data set to create a custom data measure, where the custom data measure may be added during a user's analytic session. An analytic query requiring the custom data measure during the user's analytic session may be submitted. In addition, an analytic result may be presented based at least in part on analysis of the custom data measure during the analytic session.

In embodiments, a new data hierarchy may be added associated with an analytic data set in an analytic platform to create a custom data grouping, where the new data hierarchy may be added during a user's analytic session. In addition, handling of an analytic query may be facilitated in a custom scanner database that uses the new data hierarchy during the user's analytic session.

In embodiments, an analytic data set may be taken from which it may be desired to obtain a projection for an analytic purpose using a custom scanner database. A core information matrix may be developed for the analytic data set, the core information matrix including regions representing the statistical characteristics of alternative projection techniques that may be applied to the analytic data set. In addition, a user interface may be provided whereby a user may observe the regions of the core information matrix to facilitate selecting an appropriate projection technique.

In embodiments, an analytic data set may be taken from which it may be desired to obtain a projection, where a user of an analytic platform may select at least one dimension on which the user wishes to make a projection from the analytic data set, the projection being for an analytic purpose using a custom scanner database. A core information matrix may be developed for the analytic data set, the core information matrix including regions representing the statistical characteristics of alternative projection techniques that may be applied to the analytic data set, including statistical characteristics relating to projections using any selected dimensions. In addition, a user interface may be provided whereby a user may observe the regions of the core information matrix to facilitate selecting an appropriate projection technique.

Figure 93:
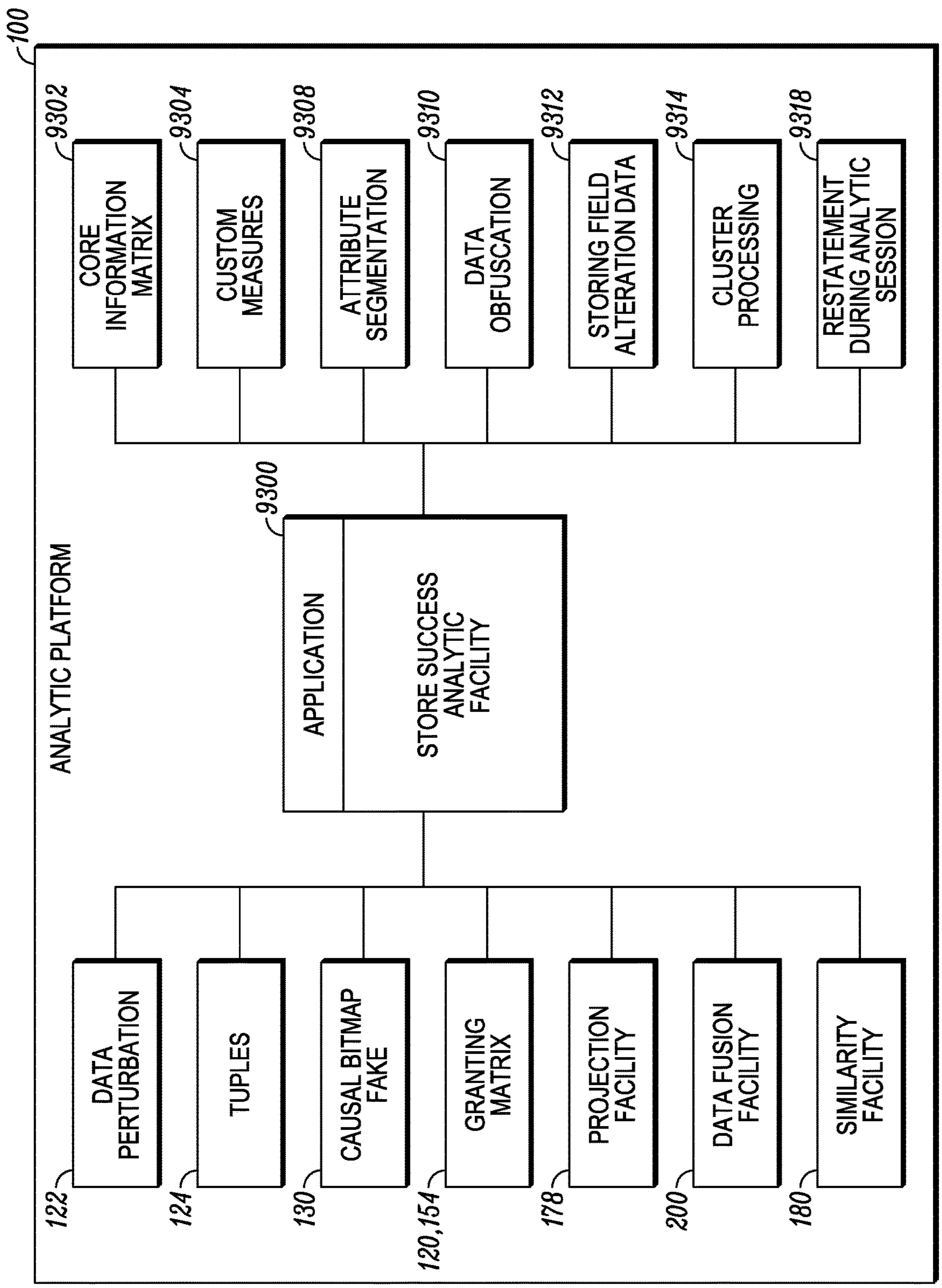
FIG. 93 depicts a store success analysis application.

Referring to FIG. 93, in embodiments, non-unique values may be found in a data table, the data table associated with a retailer data set. The non-unique values may be perturbed to render unique values. In addition, the non-unique value may be used as an identifier for a data item in the retailer data set, where the retailer data set may be used for an analytic purpose relating to identifying a highly successful store among a plurality of stores.

In embodiments, a projected facts table may be taken in a retailer data set that has one or more associated dimensions. At least one of the dimensions may be selected to be fixed, where the selection of a dimension may be based on an analytic purpose relating to identifying a highly successful store among a plurality of stores. In addition, an aggregation of projected facts may be produced from the projected facts table and associated dimensions, the aggregation fixing the selected dimension for the purpose of allowing queries on the aggregated retailer data set.

In embodiments, a plurality of data sources having data segments of varying accuracy may be identified, the data sources containing data relevant to an analytic purpose relating to identifying a highly successful store among a plurality of stores. A plurality of overlapping data segments may be identified among the plurality of data sources to use for comparing the data sources. A factor may be calculated as a function of the comparison of the overlapping data segments. In addition, the factor may be applied to update a retailer data set containing at least one of the data sources.

In embodiments, a data field characteristic of a data field in a data table of an retailer data set may be altered, where the alteration generates a field alteration datum. The field alteration datum associated with the alteration in a data storage facility may be saved. A query may be submitted requiring the use of the data field in the retailer data set, where a component of the query consists of reading the field alteration data and the query relates to an analytic purpose related to identifying a highly successful store among a plurality of stores. In addition, the altered data field may be read in accordance with the field alteration data.

In embodiments, a retailer data set may be stored in a partition within a partitioned database, where the partition may be associated with a data characteristic of the retailer data set. A master processing node may be associated with a plurality of slave nodes, where each of the plurality of slave nodes may be associated with a partition of the partitioned database. An analytic query relating to identifying a highly successful store may be submitted among a plurality of stores to the master processing node. In addition, the query may be processed by the master node assigning processing steps to an appropriate slave node.

In embodiments, a retailer data set may be received, the retailer data set including facts relating to items perceived to cause actions, where the retailer data set includes data attributes associated with the fact data stored in the retailer data set. A plurality of the combinations of a plurality of fact data and associated data attributes in a causal bitmap may be pre-aggregated. A subset of the pre-aggregated combinations may be selected based on suitability of a combination for an analytic purpose relating to identifying a highly successful store among a plurality of stores. In addition, the subset of pre-aggregated combinations may be stored to facilitate querying of the subset.

In embodiments, an availability condition may be specified associated with a data hierarchy in a database, the data hierarchy including a retailer data set, the availability condition relating to the availability of data in the retailer data set for an analytic purpose relating to identifying a highly successful store among a plurality of stores. The availability condition may be stored in a matrix. In addition, the matrix may be used to determine access to the retailer data set in the data hierarchy.

In embodiments, a retailer data set may be taken having a plurality of dimensions. A dimension of the retailer data set may be fixed for purposes of pre-aggregating the data in the retailer data set for the fixed dimension, the fixed dimension being selected based on suitability of the pre-aggregation to facilitate rapidly serving an analytic purpose relating to identifying a highly successful store among a plurality of stores. In addition, an analytic query of the retailer data set may be allowed, where the query may be executed using pre-aggregated data if the query does not seek to vary the fixed dimension and the query may be executed on the un-aggregated retailer data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused retailer data set based at least in part on a key, where the key embodies at least one association between the standard population database and the data sets received in the data fusion facility, where the retailer data set may be intended to be used for an analytic purpose relating to identifying a highly successful store among a plurality of stores.

In embodiments, a classification scheme may be identified associated with a plurality of attributes of a grouping of items in an retailer data set. A dictionary of attributes may be identified associated with the items. A similarity facility may be used to attribute additional attributes to the items in the retailer data set based on probabilistic matching of the attributes in the classification scheme and the attributes in the dictionary of attributes. In addition, the modified retailer data set may be used for an analytic purpose relating to identifying a highly successful store among a plurality of stores.

In embodiments, certain data in a retailer data set may be obfuscated to render a post-obfuscation retailer data set, access to which may be restricted along at least one specified dimension. In addition, the post-obfuscation retailer data set may be analyzed to produce an analytic result, where the analytic result may be related to identifying a highly successful store among a plurality of stores and may be based in part on information from the post-obfuscation retailer data set while keeping the restricted data from release.

In embodiments, an analytic platform may be provided for executing queries relating to an analytic purpose relating to identifying a highly successful store among a plurality of stores. A retailer data set may be received in the analytic platform. A new calculated measure may be added that may be associated with the retailer data set to create a custom data measure, where the custom data measure may be added during a user's analytic session. An analytic query may be submitted requiring the custom data measure during the user's analytic session. In addition, an analytic result may be presented based at least in part on analysis of the custom data measure during the analytic session.

In embodiments, a new data hierarchy may be added associated with a retailer data set in an analytic platform to create a custom data grouping, where the new data hierarchy may be added during a user's analytic session. In addition, handling of an analytic query may be facilitated relating to identifying a highly successful store among a plurality of stores that uses the new data hierarchy during the user's analytic session.

In embodiments, a retailer data set may be taken from which it may be desired to obtain a projection for an analytic purpose relating to identifying a highly successful store among a plurality of stores. A core information matrix may be developed for the retailer data set, the core information matrix including regions representing the statistical characteristics of alternative projection techniques that may be applied to the retailer data set. In addition, a user interface may be provided whereby a user may observe the regions of the core information matrix to facilitate selecting an appropriate projection technique.

In embodiments, a retailer data set may be taken from which it may be desired to obtain a projection, where a user of an analytic platform may select at least one dimension on which the user wishes to make a projection from the retailer data set, the projection being for an analytic purpose relating to identifying a highly successful store among a plurality of stores. A core information matrix may be developed for the retailer data set, the core information matrix including regions representing the statistical characteristics of alternative projection techniques that may be applied to the retailer data set, including statistical characteristics relating to projections using any selected dimensions. In addition, a user interface may be provided whereby a user may observe the regions of the core information matrix to facilitate selecting an appropriate projection technique.

Figure 94:
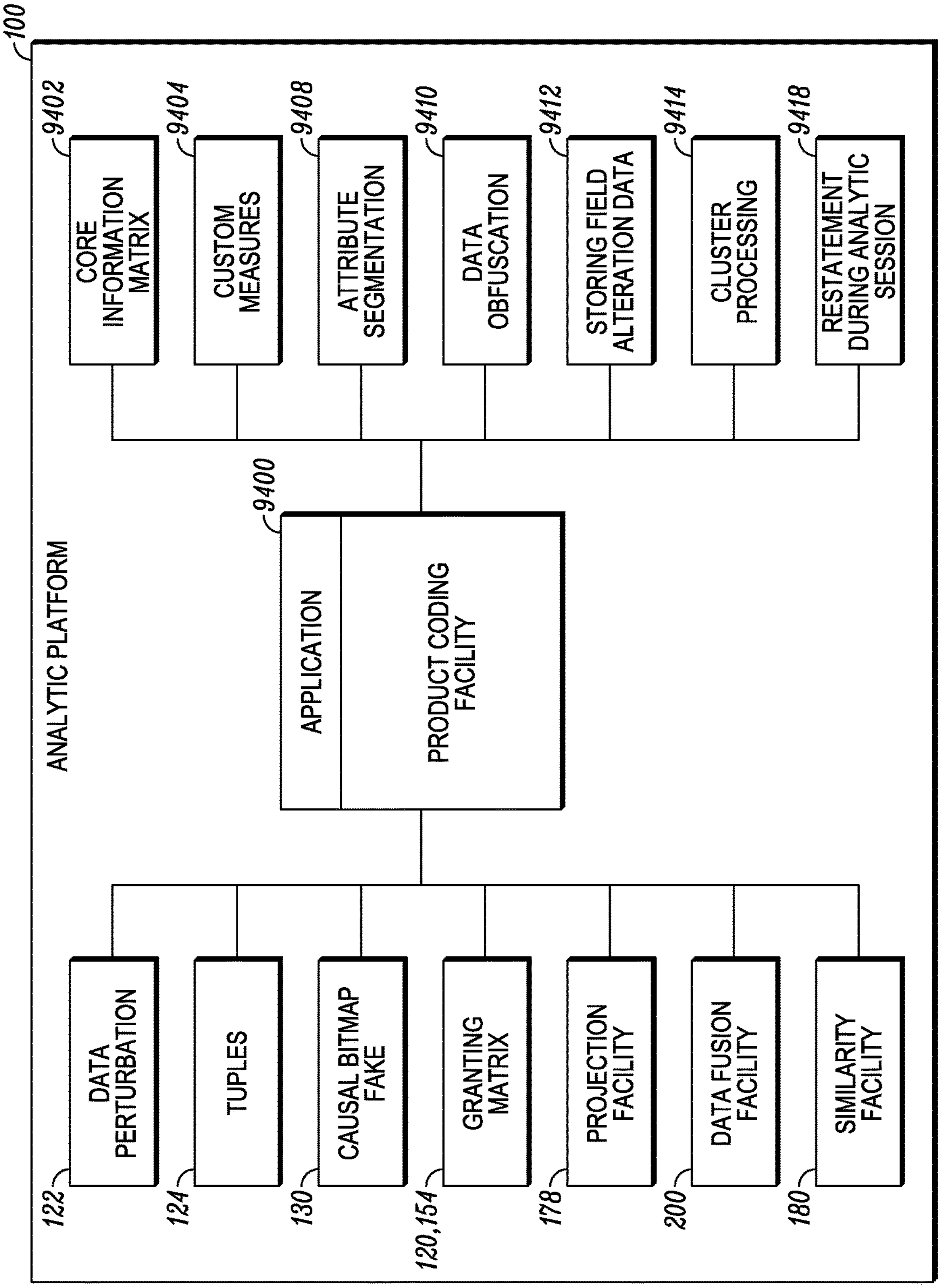
FIG. 94 depicts a product coding application.

Referring to FIG. 94, in embodiments, non-unique values may be found in a data table, the data table associated with a product data set. The non-unique values may be perturbed to render unique values. In addition, the non-unique value may be used as an identifier for a data item in the product data set, where the product data set may be used for an analytic purpose relating to product coding.

In embodiments, a projected facts table may be taken in a product data set that has one or more associated dimensions. At least one of the dimensions may be selected to be fixed, where the selection of a dimension may be based on an analytic purpose relating to product coding. In addition, an aggregation of projected facts from the projected facts table and associated dimensions may be produced, the aggregation fixing the selected dimension for the purpose of allowing queries on the aggregated product data set.

In embodiments, a plurality of data sources may be identified having data segments of varying accuracy, the data sources containing data relevant to an analytic purpose relating to product coding. A plurality of overlapping data segments may be identified among the plurality of data sources to use for comparing the data sources. A factor may be calculated as a function of the comparison of the overlapping data segments. In addition, the factor may be applied to update a product data set containing at least one of the data sources.

In embodiments, a data field characteristic of a data field in a data table of an product data set may be altered, where the alteration generates a field alteration datum. The field alteration datum associated with the alteration in a data storage facility may be saved. A query may be submitted requiring the use of the data field in the product data set, where a component of the query consists of reading the field alteration data and the query relates to an analytic purpose related to product coding. In addition, the altered data field may be read in accordance with the field alteration data.

In embodiments, a product data set may be stored in a partition within a partitioned database, where the partition may be associated with a data characteristic of the product data set. A master processing node may be associated with a plurality of slave nodes, where each of the plurality of slave nodes may be associated with a partition of the partitioned database. An analytic query may be submitted relating to product coding to the master processing node. In addition, the query may be processed by the master node assigning processing steps to an appropriate slave node.

In embodiments, a product data set may be received, the product data set including facts relating to items perceived to cause actions, where the product data set includes data attributes associated with the fact data stored in the product data set. A plurality of the combinations of a plurality of fact data and associated data attributes may be pre-aggregated in a causal bitmap. A subset of the pre-aggregated combinations may be selected based on suitability of a combination for an analytic purpose relating to product coding. In addition, the subset of pre-aggregated combinations may be stored to facilitate querying of the subset.

In embodiments, an availability condition associated with a data hierarchy may be specified in a database, the data hierarchy including a product data set, the availability condition relating to the availability of data in the product data set for an analytic purpose relating to product coding. The availability condition may be stored in a matrix. In addition, the matrix may be used to determine access to the product data set in the data hierarchy.

In embodiments, a product data set having a plurality of dimensions may be taken. A dimension of the product data set may be fixed for purposes of pre-aggregating the data in the product data set for the fixed dimension, the fixed dimension being selected based on suitability of the pre-aggregation to facilitate rapidly serving an analytic purpose relating to product coding. In addition, an analytic query of the product data set may be allowed, where the query may be executed using pre-aggregated data if the query does not seek to vary the fixed dimension and the query may be executed on the un-aggregated product data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused product data set based at least in part on a key, where the key embodies at least one association between the standard population database and the data sets received in the data fusion facility, where the product data set may be intended to be used for an analytic purpose relating to product coding.

In embodiments, a classification scheme may be identified associated with a plurality of attributes of a grouping of items in an product data set. A dictionary of attributes may be identified associated with the items. A similarity facility may be used to attribute additional attributes to the items in the product data set based on probabilistic matching of the attributes in the classification scheme and the attributes in the dictionary of attributes. In addition, the modified product data set may be used for an analytic purpose relating to product coding.

In embodiments, certain data in a product data set may be obfuscated to render a post-obfuscation product data set, access to which may be restricted along at least one specified dimension. In addition, the post-obfuscation product data set may be analyzed to produce an analytic result, where the analytic result may be related to product coding and may be based in part on information from the post-obfuscation product data set while keeping the restricted data from release.

In embodiments, an analytic platform may be provided for executing queries relating to an analytic purpose relating to product coding. A product data set may be received in the analytic platform. A new calculated measure may be added that may be associated with the product data set to create a custom data measure, where the custom data measure may be added during a user's analytic session. An analytic query may be submitted requiring the custom data measure during the user's analytic session. In addition, an analytic result may be presented based at least in part on analysis of the custom data measure during the analytic session.

In embodiments, a new data hierarchy may be added associated with a product data set in an analytic platform to create a custom data grouping, where the new data hierarchy may be added during a user's analytic session. In addition, handling of an analytic query may be facilitated relating to product coding that uses the new data hierarchy during the user's analytic session.

In embodiments, a product data set may be taken from which it may be desired to obtain a projection for an analytic purpose relating to product coding. A core information matrix may be developed for the product data set, the core information matrix including regions representing the statistical characteristics of alternative projection techniques that may be applied to the product data set. In addition, a user interface may be provided whereby a user may observe the regions of the core information matrix to facilitate selecting an appropriate projection technique.

In embodiments, a product data set may be taken from which it may be desired to obtain a projection, where a user of an analytic platform may select at least one dimension on which the user wishes to make a projection from the product data set, the projection being for an analytic purpose relating to product coding. A core information matrix may be developed for the product data set, the core information matrix including regions representing the statistical characteristics of alternative projection techniques that may be applied to the product data set, including statistical characteristics relating to projections using any selected dimensions. In addition, a user interface may be provided whereby a user may observe the regions of the core information matrix to facilitate selecting an appropriate projection technique.

Figure 95:
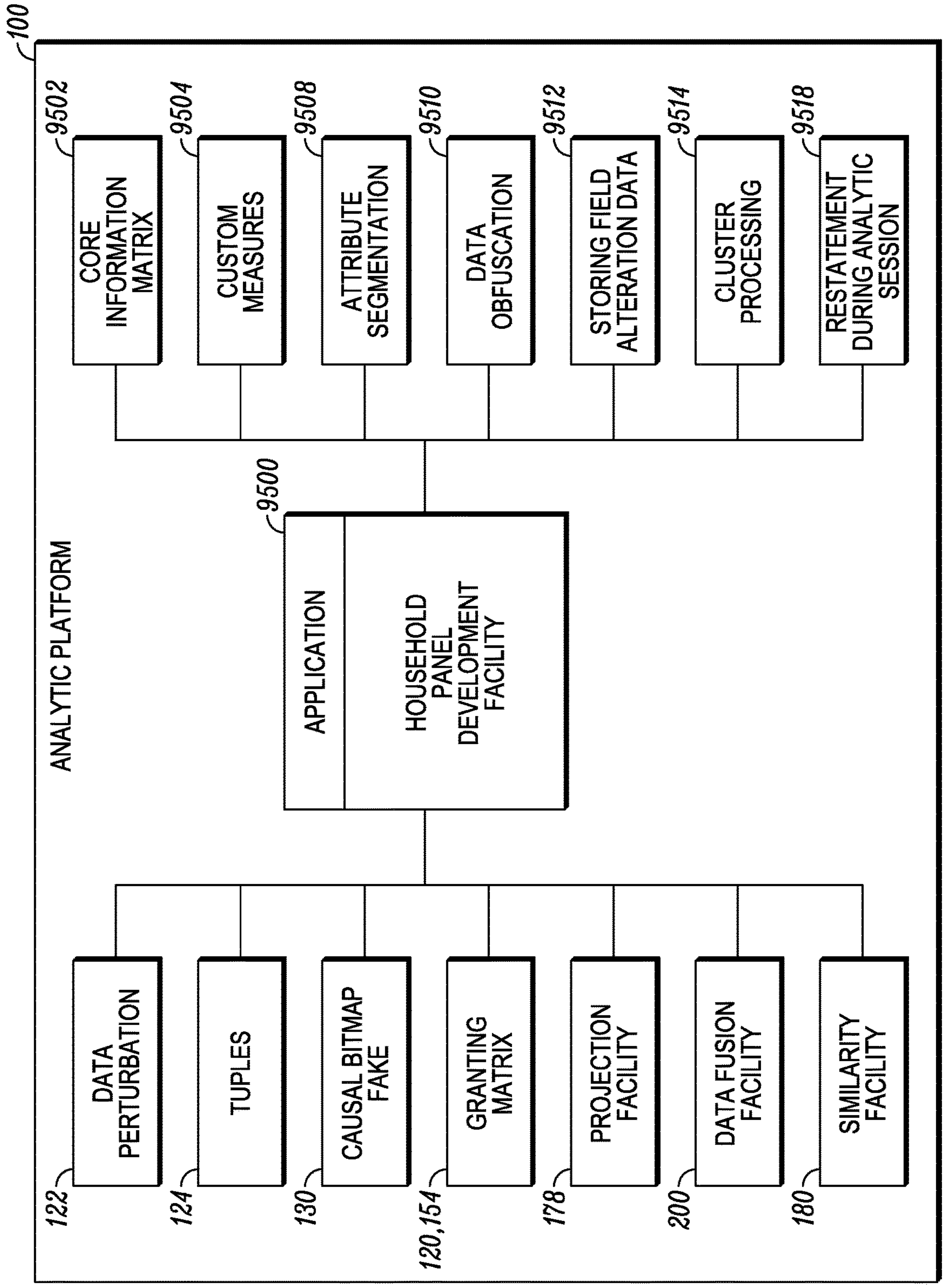
FIG. 95 depicts a household panel development application.

Referring to FIG. 95, in embodiments, non-unique values may be found in a data table, the data table associated with a household panel data set. The non-unique values may be perturbed to render unique values. In addition, the non-unique value may be used as an identifier for a data item in the household panel data set, where the household panel data set may be used for an analytic purpose relating to developing a suitable household panel for projecting consumer behavior.

In embodiments, a projected facts table in a household panel data set may be taken that has one or more associated dimensions. At least one of the dimensions may be selected to be fixed, where the selection of a dimension may be based on an analytic purpose relating to developing a suitable household panel for projecting consumer behavior. In addition, an aggregation of projected facts may be produced from the projected facts table and associated dimensions, the aggregation fixing the selected dimension for the purpose of allowing queries on the aggregated household panel data set.

In embodiments, a plurality of data sources may be identified having data segments of varying accuracy, the data sources containing data relevant to an analytic purpose relating to developing a suitable household panel for projecting consumer behavior. A plurality of overlapping data segments among the plurality of data sources may be identified to use for comparing the data sources. A factor may be calculated as a function of the comparison of the overlapping data segments. In addition, the factor may be applied to update a household panel data set containing at least one of the data sources.

In embodiments, a data field characteristic of a data field may be altered in a data table of an household panel data set, where the alteration generates a field alteration datum. The field alteration datum may be saved associated with the alteration in a data storage facility. A query may be submitted requiring the use of the data field in the household panel data set, where a component of the query consists of reading the field alteration data and the query relates to an analytic purpose related to developing a suitable household panel for projecting consumer behavior. In addition, the altered data field may be read in accordance with the field alteration data.

In embodiments, a household panel data set may be stored in a partition within a partitioned database, where the partition may be associated with a data characteristic of the household panel data set. A master processing node may be associated with a plurality of slave nodes, where each of the plurality of slave nodes may be associated with a partition of the partitioned database. An analytic query may be submitted relating to developing a suitable household panel for projecting consumer behavior to the master processing node. In addition, the query may be processed by the master node assigning processing steps to an appropriate slave node.

In embodiments, a household panel data set may be received, the household panel data set including facts relating to items perceived to cause actions, where the household panel data set includes data attributes associated with the fact data stored in the household panel data set. A plurality of the combinations of a plurality of fact data and associated data attributes in a causal bitmap may be pre-aggregated. A subset of the pre-aggregated combinations may be selected based on suitability of a combination for an analytic purpose relating to developing a suitable household panel for projecting consumer behavior. In addition, the subset of pre-aggregated combinations may be stored to facilitate querying of the subset.

In embodiments, an availability condition may be specified associated with a data hierarchy in a database, the data hierarchy including a household panel data set, the availability condition relating to the availability of data in the household panel data set for an analytic purpose relating to developing a suitable household panel for projecting consumer behavior. The availability condition may be stored in a matrix. In addition, the matrix may be used to determine access to the household panel data set in the data hierarchy.

In embodiments, a household panel data set having a plurality of dimensions may be taken. A dimension of the household panel data set may be fixed for purposes of pre-aggregating the data in the household panel data set for the fixed dimension, the fixed dimension being selected based on suitability of the pre-aggregation to facilitate rapidly serving an analytic purpose relating to developing a suitable household panel for projecting consumer behavior. In addition, an analytic query of the household panel data set may be allowed, where the query may be executed using pre-aggregated data if the query does not seek to vary the fixed dimension and the query may be executed on the un-aggregated household panel data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused household panel data set based at least in part on a key, where the key embodies at least one association between the standard population database and the data sets received in the data fusion facility, where the household panel data set may be intended to be used for an analytic purpose relating to developing a suitable household panel for projecting consumer behavior.

In embodiments, a classification scheme associated with a plurality of attributes of a grouping of items may be identified in an household panel data set. A dictionary of attributes associated with the items may be identified. A similarity facility may be used to attribute additional attributes to the items in the household panel data set based on probabilistic matching of the attributes in the classification scheme and the attributes in the dictionary of attributes. In addition, the modified household panel data set may be used for an analytic purpose relating to developing a suitable household panel for projecting consumer behavior.

In embodiments, certain data in a household panel data set may be obfuscated to render a post-obfuscation household panel data set, access to which may be restricted along at least one specified dimension. In addition, the post-obfuscation household panel data set may be analyzed to produce an analytic result, where the analytic result may be related to developing a suitable household panel for projecting consumer behavior and may be based in part on information from the post-obfuscation household panel data set while keeping the restricted data from release.

In embodiments, an analytic platform may be provided for executing queries relating to an analytic purpose relating to developing a suitable household panel for projecting consumer behavior. A household panel data set may be received in the analytic platform. A new calculated measure may be added that may be associated with the household panel data set to create a custom data measure, where the custom data measure may be added during a user's analytic session. An analytic query may be submitted requiring the custom data measure during the user's analytic session. In addition, an analytic result may be presented based at least in part on analysis of the custom data measure during the analytic session.

In embodiments, a new data hierarchy associated with a household panel data set may be added in an analytic platform to create a custom data grouping, where the new data hierarchy may be added during a user's analytic session. In addition, handling of an analytic query may be facilitated relating to developing a suitable household panel for projecting consumer behavior that uses the new data hierarchy during the user's analytic session.

In embodiments, a household panel data set may be taken from which it may be desired to obtain a projection for an analytic purpose relating to developing a suitable household panel for projecting consumer behavior. A core information matrix may be developed for the household panel data set, the core information matrix including regions representing the statistical characteristics of alternative projection techniques that may be applied to the household panel data set. In addition, a user interface may be provided whereby a user may observe the regions of the core information matrix to facilitate selecting an appropriate projection technique.

In embodiments, a household panel data set may be taken from which it may be desired to obtain a projection, where a user of an analytic platform may select at least one dimension on which the user wishes to make a projection from the household panel data set, the projection being for an analytic purpose relating to developing a suitable household panel for projecting consumer behavior. A core information matrix may be developed for the household panel data set, the core information matrix including regions representing the statistical characteristics of alternative projection techniques that may be applied to the household panel data set, including statistical characteristics relating to projections using any selected dimensions. In addition, a user interface may be provided whereby a user may observe the regions of the core information matrix to facilitate selecting an appropriate projection technique.

Figure 96:
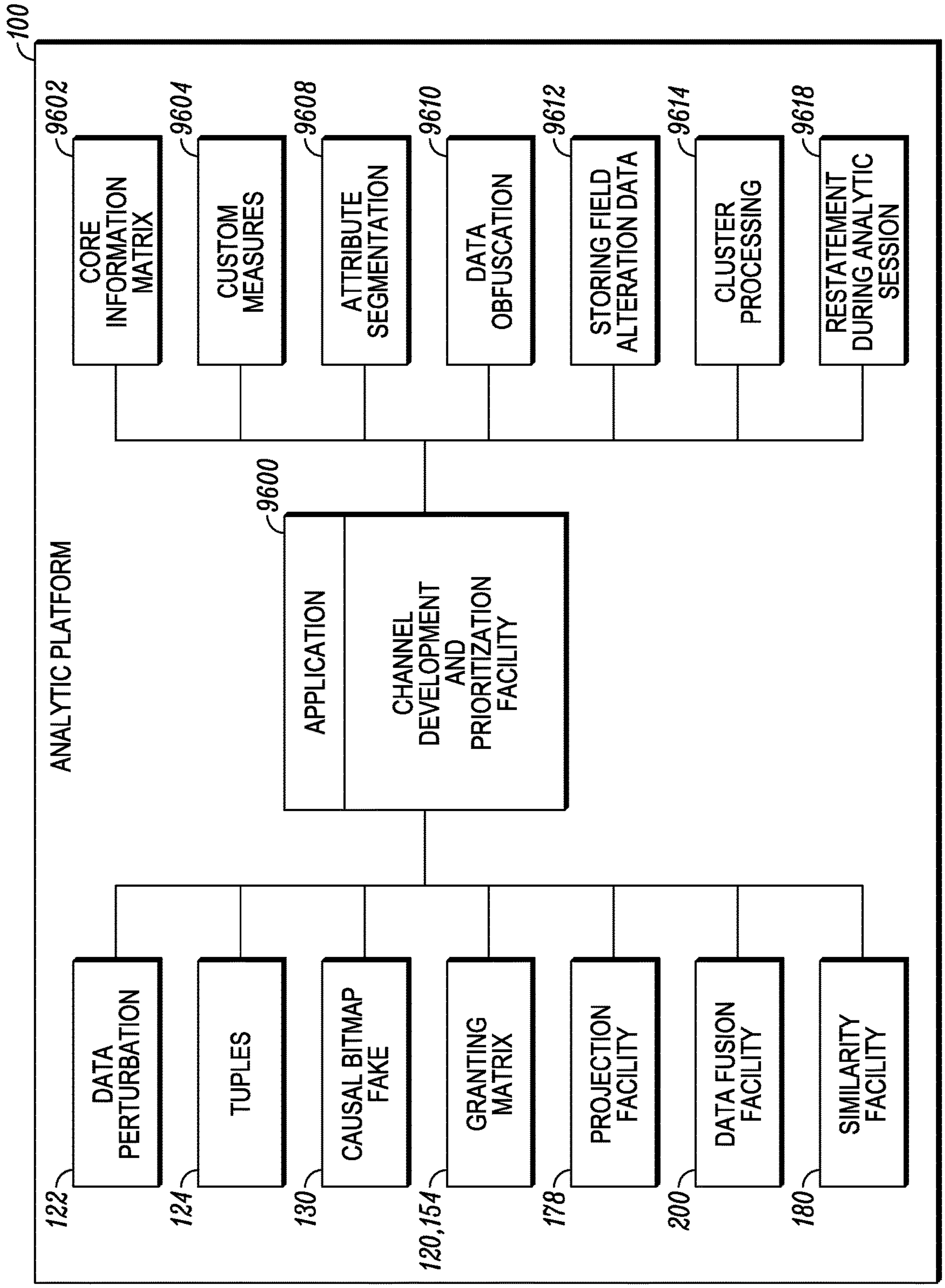
FIG. 96 depicts a channel development and prioritization application.

Referring to FIG. 96, in embodiments, non-unique values may be found in a data table, the data table associated with a retail channel data set. The non-unique values may be perturbed to render unique values. In addition, the non-unique value may be used as an identifier for a data item in the retail channel data set, where the retail channel data set may be used for an analytic purpose relating to prioritizing the development of sales channels in a retail environment.

In embodiments, a projected facts table may be taken in a retail channel data set that has one or more associated dimensions. At least one of the dimensions may be selected to be fixed, where the selection of a dimension may be based on an analytic purpose relating to prioritizing the development of sales channels in a retail environment. In addition, an aggregation of projected facts may be produced from the projected facts table and associated dimensions, the aggregation fixing the selected dimension for the purpose of allowing queries on the aggregated retail channel data set.

In embodiments, a plurality of data sources may be identified having data segments of varying accuracy, the data sources containing data relevant to an analytic purpose relating to prioritizing the development of sales channels in a retail environment. A plurality of overlapping data segments may be identified among the plurality of data sources to use for comparing the data sources. A factor may be calculated as a function of the comparison of the overlapping data segments. In addition, the factor may be applied to update a retail channel data set containing at least one of the data sources.

In embodiments, a data field characteristic of a data field in a data table of an retail channel data set may be altered, where the alteration generates a field alteration datum. The field alteration datum associated with the alteration in a data storage facility may be saved. A query may be submitted requiring the use of the data field in the retail channel data set, where a component of the query consists of reading the field alteration data and the query relates to an analytic purpose related to prioritizing the development of sales channels in a retail environment. In addition, the altered data field may be read in accordance with the field alteration data.

In embodiments, a retail channel data set may be stored in a partition within a partitioned database, where the partition may be associated with a data characteristic of the retail channel data set. A master processing node may be associated with a plurality of slave nodes, where each of the plurality of slave nodes may be associated with a partition of the partitioned database. An analytic query may be submitted relating to prioritizing the development of sales channels in a retail environment to the master processing node. The query may be processed by the master node assigning processing steps to an appropriate slave node.

In embodiments, a retail channel data set may be received, the retail channel data set including facts relating to items perceived to cause actions, where the retail channel data set includes data attributes associated with the fact data stored in the retail channel data set. A plurality of the combinations of a plurality of fact data and associated data attributes may be pre-aggregated in a causal bitmap. A subset of the pre-aggregated combinations may be selected based on suitability of a combination for an analytic purpose relating to prioritizing the development of sales channels in a retail environment. In addition, the subset of pre-aggregated combinations may be stored to facilitate querying of the subset.

In embodiments, an availability condition may be specified associated with a data hierarchy in a database, the data hierarchy including a retail channel data set, the availability condition relating to the availability of data in the retail channel data set for an analytic purpose relating to prioritizing the development of sales channels in a retail environment. The availability condition may be stored in a matrix. In addition, the matrix may be used to determine access to the retail channel data set in the data hierarchy.

In embodiments, a retail channel data set may be taken having a plurality of dimensions. A dimension of the retail channel data set may be fixed for purposes of pre-aggregating the data in the retail channel data set for the fixed dimension, the fixed dimension being selected based on suitability of the pre-aggregation to facilitate rapidly serving an analytic purpose relating to prioritizing the development of sales channels in a retail environment. In addition, an analytic query of the retail channel data set may be allowed, where the query may be executed using pre-aggregated data if the query does not seek to vary the fixed dimension and the query may be executed on the un-aggregated retail channel data set if the query seeks to vary the fixed dimension.

In embodiments, a panel data source data set may be received in a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused retail channel data set based at least in part on a key, where the key embodies at least one association between the standard population database and the data sets received in the data fusion facility, where the retail channel data set may be intended to be used for an analytic purpose relating to prioritizing the development of sales channels in a retail environment In embodiments, a classification scheme may be identified associated with a plurality of attributes of a grouping of items in an retail channel data set. A dictionary of attributes associated with the items may be identified. A similarity facility may be used to attribute additional attributes to the items in the retail channel data set based on probabilistic matching of the attributes in the classification scheme and the attributes in the dictionary of attributes. In addition, the modified retail channel data set may be used for an analytic purpose relating to prioritizing the development of sales channels in a retail environment.

In embodiments, certain data in a retail channel data set may be obfuscated to render a post-obfuscation retail channel data set, access to which may be restricted along at least one specified dimension. In addition, the post-obfuscation retail channel data set may be analyzed to produce an analytic result, where the analytic result may be related to prioritizing the development of sales channels in a retail environment and may be based in part on information from the post-obfuscation retail channel data set while keeping the restricted data from release.

In embodiments, an analytic platform may be provided for executing queries relating to an analytic purpose relating to prioritizing the development of sales channels in a retail environment. A retail channel data set may be received in the analytic platform. A new calculated measure may be added that may be associated with the retail channel data set to create a custom data measure, where the custom data measure may be added during a user's analytic session. An analytic query may be submitted requiring the custom data measure during the user's analytic session. In addition, an analytic result may be presented based at least in part on analysis of the custom data measure during the analytic session.

In embodiments, a new data hierarchy associated with a retail channel data set in an analytic platform may be added to create a custom data grouping, where the new data hierarchy may be added during a user's analytic session. In addition, handling of an analytic query relating to prioritizing the development of sales channels in a retail environment that uses the new data hierarchy may be facilitated during the user's analytic session.

In embodiments, a retail channel data set may be taken from which it may be desired to obtain a projection for an analytic purpose relating to prioritizing the development of sales channels in a retail environment. A core information matrix may be developed for the retail channel data set, the core information matrix including regions representing the statistical characteristics of alternative projection techniques that may be applied to the retail channel data set. In addition, a user interface may be provided whereby a user may observe the regions of the core information matrix to facilitate selecting an appropriate projection technique.

In embodiments, a retail channel data set may be taken from which it may be desired to obtain a projection, where a user of an analytic platform may select at least one dimension on which the user wishes to make a projection from the retail channel data set, the projection being for an analytic purpose relating to prioritizing the development of sales channels in a retail environment. A core information matrix may be developed for the retail channel data set, the core information matrix including regions representing the statistical characteristics of alternative projection techniques that may be applied to the retail channel data set, including statistical characteristics relating to projections using any selected dimensions. In addition, a user interface may be provided whereby a user may observe the regions of the core information matrix to facilitate selecting an appropriate projection technique.

Figure 97:
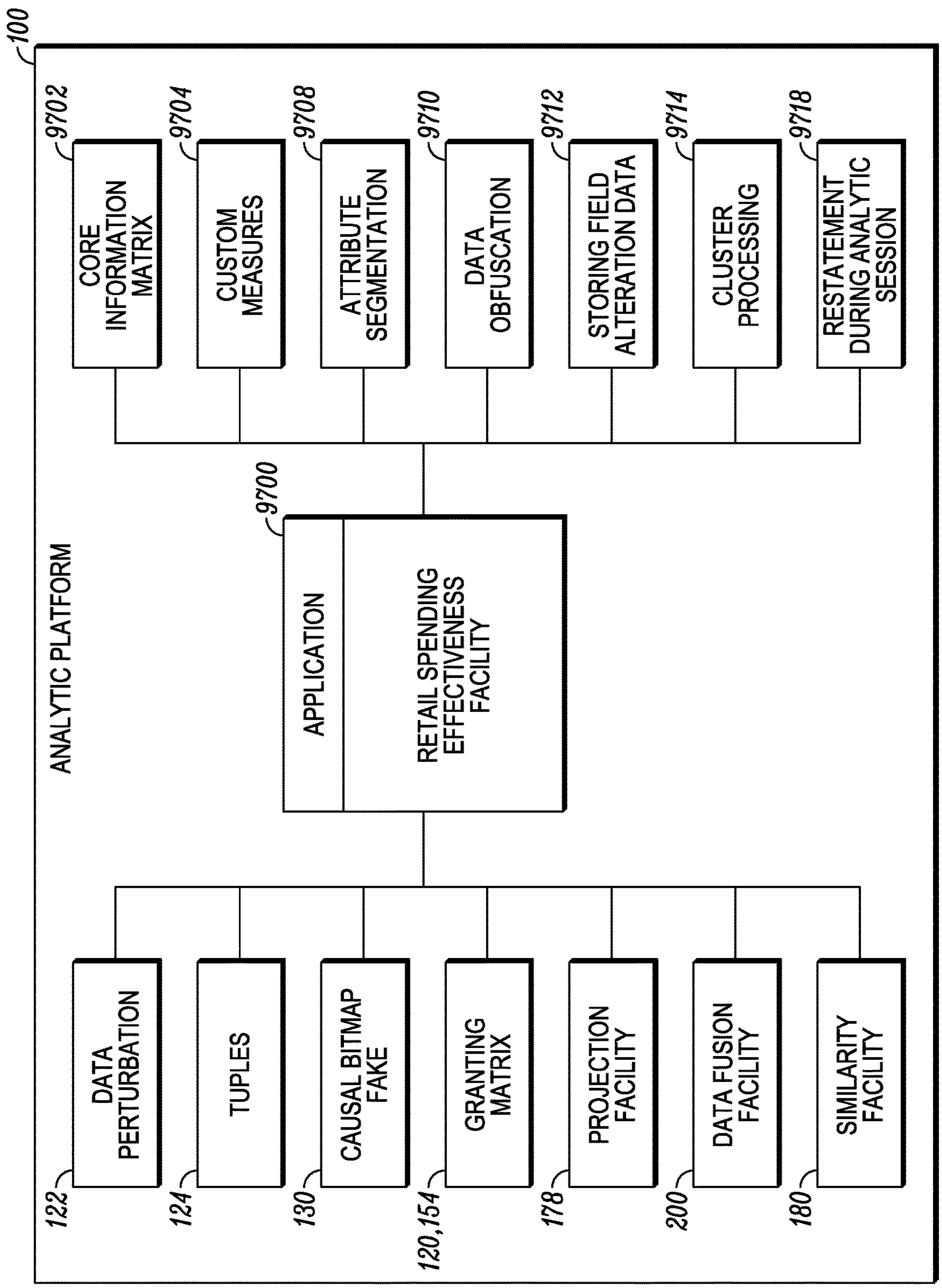
FIG. 97 depicts retail spending effectiveness application.

Referring to FIG. 97, in embodiments, non-unique values may be found in a data table, the data table associated with an analytic data set. The non-unique values may be perturbed to render unique values. In addition, the non-unique value may be used as an identifier for a data item in the analytic data set, where the analytic data set may be used for an analytic purpose relating to determining the effectiveness of spending in an effort to promote a retail product.

In embodiments, a projected facts table in an analytic data set that has one or more associated dimensions may be taken. At least one of the dimensions may be selected to be fixed, where the selection of a dimension may be based on an analytic purpose relating to determining the effectiveness of spending in an effort to promote a retail product. In addition, an aggregation of projected facts may be produced from the projected facts table and associated dimensions, the aggregation fixing the selected dimension for the purpose of allowing queries on the aggregated analytic data set.

In embodiments, a plurality of data sources having data segments of varying accuracy may be identified, the data sources containing data relevant to an analytic purpose relating to determining the effectiveness of spending in an effort to promote a retail product. A plurality of overlapping data segments may be identified among the plurality of data sources to use for comparing the data sources. A factor may be calculated as a function of the comparison of the overlapping data segments. In addition, the factor may be applied to update an analytic data set containing at least one of the data sources.

In embodiments, a data field characteristic of a data field in a data table of an analytic data set may be altered, where the alteration generates a field alteration datum. The field alteration datum may be saved associated with the alteration in a data storage facility. A query requiring the use of the data field in the analytic data set may be submitted, where a component of the query consists of reading the field alteration data and the query relates to an analytic purpose related to determining the effectiveness of spending in an effort to promote a retail product. In addition, the altered data field may be read in accordance with the field alteration data.

In embodiments, an analytic data set may be stored in a partition within a partitioned database, where the partition may be associated with a data characteristic of the analytic data set. A master processing node may be associated with a plurality of slave nodes, where each of the plurality of slave nodes may be associated with a partition of the partitioned database. An analytic query relating to determining the effectiveness of spending in an effort may be submitted to promote a retail product to the master processing node. In addition, the query may be processed by the master node assigning processing steps to an appropriate slave node.

In embodiments, an analytic data set may be received, the analytic data set including facts relating to items perceived to cause actions, where the analytic data set includes data attributes associated with the fact data stored in the analytic data set. A plurality of the combinations of a plurality of fact data and associated data attributes in a causal bitmap may be pre-aggregated. A subset of the pre-aggregated combinations may be selected based on suitability of a combination for an analytic purpose relating to determining the effectiveness of spending in an effort to promote a retail product. In addition, the subset of pre-aggregated combinations may be stored to facilitate querying of the subset.

In embodiments, an availability condition may be specified associated with a data hierarchy in a database, the data hierarchy including an analytic data set, the availability condition relating to the availability of data in the analytic data set for an analytic purpose relating to determining the effectiveness of spending in an effort to promote a retail product. The availability condition in a matrix may be stored. In addition, the matrix may be used to determine access to the analytic data set in the data hierarchy.

In embodiments, an analytic data set having a plurality of dimensions may be taken. A dimension of the analytic data set may be fixed for purposes of pre-aggregating the data in the analytic data set for the fixed dimension, the fixed dimension being selected based on suitability of the pre-aggregation to facilitate rapidly serving an analytic purpose relating to determining the effectiveness of spending in an effort to promote a retail product. In addition, an analytic query of the analytic data set may be allowed, where the query may be executed using pre-aggregated data if the query does not seek to vary the fixed dimension and the query may be executed on the un-aggregated analytic data set if the query seeks to vary the fixed dimension.

In embodiments, a panel data source data set in may be received a data fusion facility. A fact data source data set may be received in a data fusion facility. A dimension data source data set may be received in a data fusion facility. An action may be performed in the data fusion facility, where the action associates the data sets received in the data fusion facility with a standard population database. In addition, data from the data sets received in the data fusion facility may be fused into a new fused analytic data set based at least in part on a key, where the key embodies at least one association between the standard population database and the data sets received in the data fusion facility, where the analytic data set may be intended to be used for an analytic purpose relating to determining the effectiveness of spending in an effort to promote a retail product.

In embodiments, a classification scheme associated with a plurality of attributes of a grouping of items may be identified in an analytic data set. A dictionary of attributes may be identified associated with the items. A similarity facility may be used to attribute additional attributes to the items in the analytic data set based on probabilistic matching of the attributes in the classification scheme and the attributes in the dictionary of attributes. In addition, the modified analytic data set may be used for an analytic purpose relating to determining the effectiveness of spending in an effort to promote a retail product.

In embodiments, certain data may be obfuscated in an analytic data set to render a post-obfuscation analytic data set, access to which may be restricted along at least one specified dimension. In addition, the post-obfuscation analytic data set may be analyzed to produce an analytic result, where the analytic result may be related to determining the effectiveness of spending in an effort to promote a retail product and may be based in part on information from the post-obfuscation analytic data set while keeping the restricted data from release.

In embodiments, an analytic platform may be provided for executing queries relating to an analytic purpose relating to determining the effectiveness of spending in an effort to promote a retail product. An analytic data set may be received in the analytic platform. A new calculated measure may be added that may be associated with the analytic data set to create a custom data measure, where the custom data measure may be added during a user's analytic session. An analytic query requiring the custom data measure may be submitted during the user's analytic session. In addition, an analytic result may be presented based at least in part on analysis of the custom data measure during the analytic session.

In embodiments, a new data hierarchy associated with an analytic data set may be added in an analytic platform to create a custom data grouping, where the new data hierarchy may be added during a user's analytic session. In addition, handling of an analytic query may be facilitated relating to determining the effectiveness of spending in an effort to promote a retail product that uses the new data hierarchy during the user's analytic session.

In embodiments, an analytic data set may be taken from which it may be desired to obtain a projection for an analytic purpose relating to determining the effectiveness of spending in an effort to promote a retail product. A core information matrix may be developed for the analytic data set, the core information matrix including regions representing the statistical characteristics of alternative projection techniques that may be applied to the analytic data set. In addition, a user interface may be provided whereby a user may observe the regions of the core information matrix to facilitate selecting an appropriate projection technique.

In embodiments, an analytic data set may be taken from which it may be desired to obtain a projection, where a user of an analytic platform may select at least one dimension on which the user wishes to make a projection from the analytic data set, the projection being for an analytic purpose relating to determining the effectiveness of spending in an effort to promote a retail product. A core information matrix may be developed for the analytic data set, the core information matrix including regions representing the statistical characteristics of alternative projection techniques that may be applied to the analytic data set, including statistical characteristics relating to projections using any selected dimensions. In addition, a user interface may be provided whereby a user may observe the regions of the core information matrix to facilitate selecting an appropriate projection technique.

Figure 98:
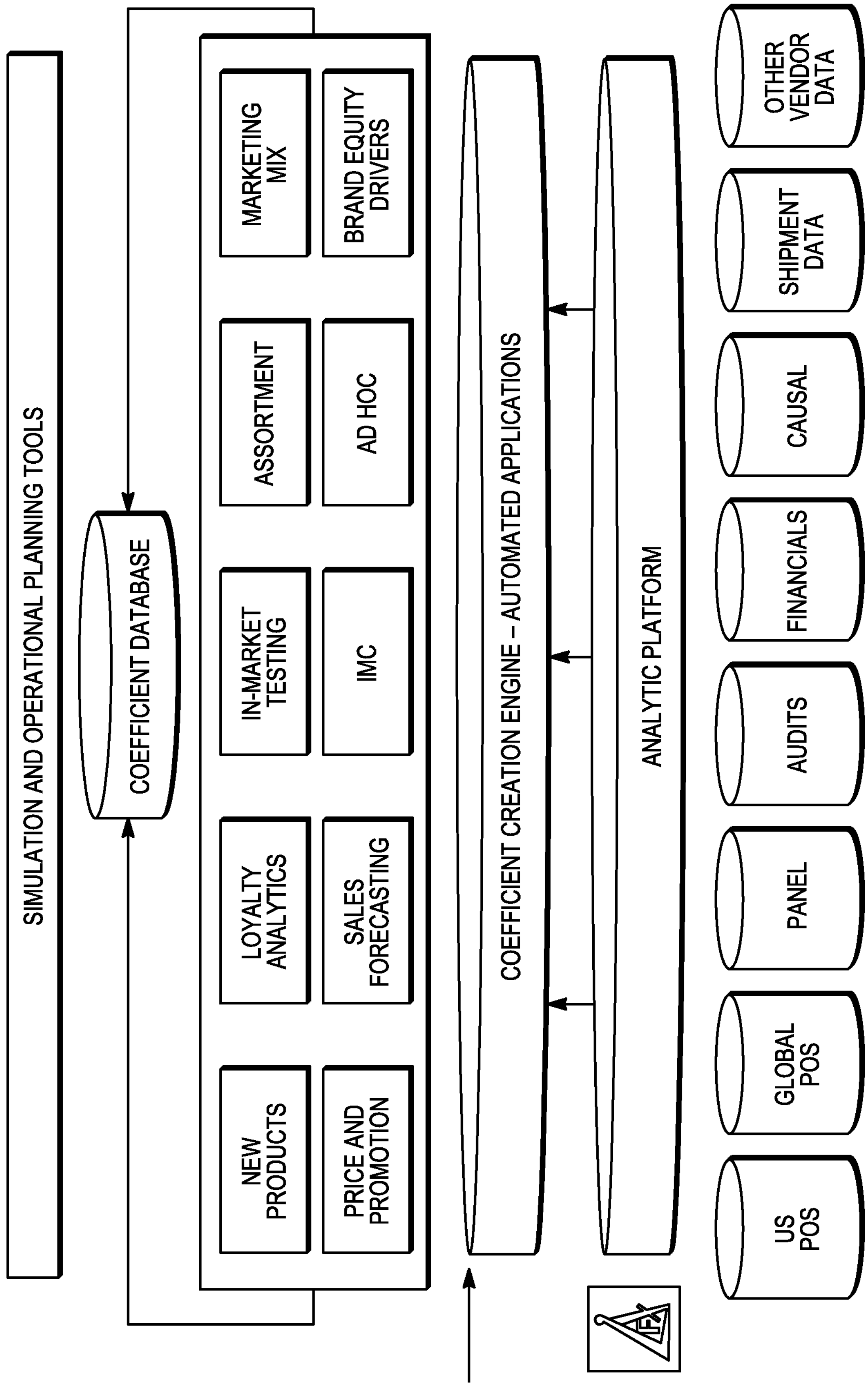
FIG. 98 depicts simulation and operational planning tools.

Referring to FIG. 98, the analytic platform may enable automated analytics. Automated analytics may include on-demand business performance reporting, automated analytics and insight solutions, predictive planning and optimization solutions, or some other type of automated analytics. The automated platform may support a revenue and competitive decision framework relating to brand building, product innovation and product launch, consumer-centric retail execution, consumer and shopper relationship management, or some other type of decision framework. In embodiments, the analytic platform may be associated with a data repository. A data repository may include infoscan, total c-scan, daily data, panel data, retailer direct data, an SAP dataset, consumer segmentation data, consumer demographics, FSP/loyalty data, or some other type of data repository. The analytics platform may be a key component for the decision framework.

In embodiments, the analytic platform may provide simulation and operational planning tools as shown in FIG. 98. The analytic platform may be associated with data related to US POS, Global POS, panel, audits, financials, causal, shipment data, other vendor data, and the like. Further, the coefficient creation engine may create a coefficient database based on the above mentioned data. The coefficient database may include information related to new products, loyalty analytics, in-market testing, assortment, marketing mix, price and promotions, sales forecasting, IMC, ad hoc, brand equity drivers and the like.

In embodiments, the analytic platform may provide on-the-fly continuous analytics and insights. Further, the analytic platform may provide analysis down to the lowest level in the data hierarchy. For example, the analytic platform may provide analysis at the lowest level, i.e. the customer level.

In embodiments, the analytic platform may have the ability to model data across countries for global view that provides centralized global platform. Further, the analytic platform may have the ability to run models on-the-fly, thus, providing flexibility to adapt models to needs of the user.

In embodiments, the analytic platform may provide predictive analytics and automation. This may provide continuous measurement, simulation and forecasting capabilities. The analytic platform may also provide automated measure trees with drill-down capabilities.

In embodiments, the analytic platform may provide capability to migrate applications to the analytic platform to accomplish on-demand analytics. Further, the analytic platform may capabilities to turn static reports into dynamic reports. For example, a user may like to convert a static report to dynamic one for price gap management. The static report may be converted to the dynamic report based on demand of the user.

In embodiments, the analytic platform may provide demand furcating, in-market testing, scenario planning, and 'due-to' reporting capabilities because of the integrated planning and simulation tools.

In embodiments, the analytic platform may feed portal applications and may eliminate need for data restatements. In embodiments, legacy InfoScan system may be processed in background with user involvement. The InfoScan provides a "backup" security system. The InfoScan may also be used to extract reports.

Figure 99:
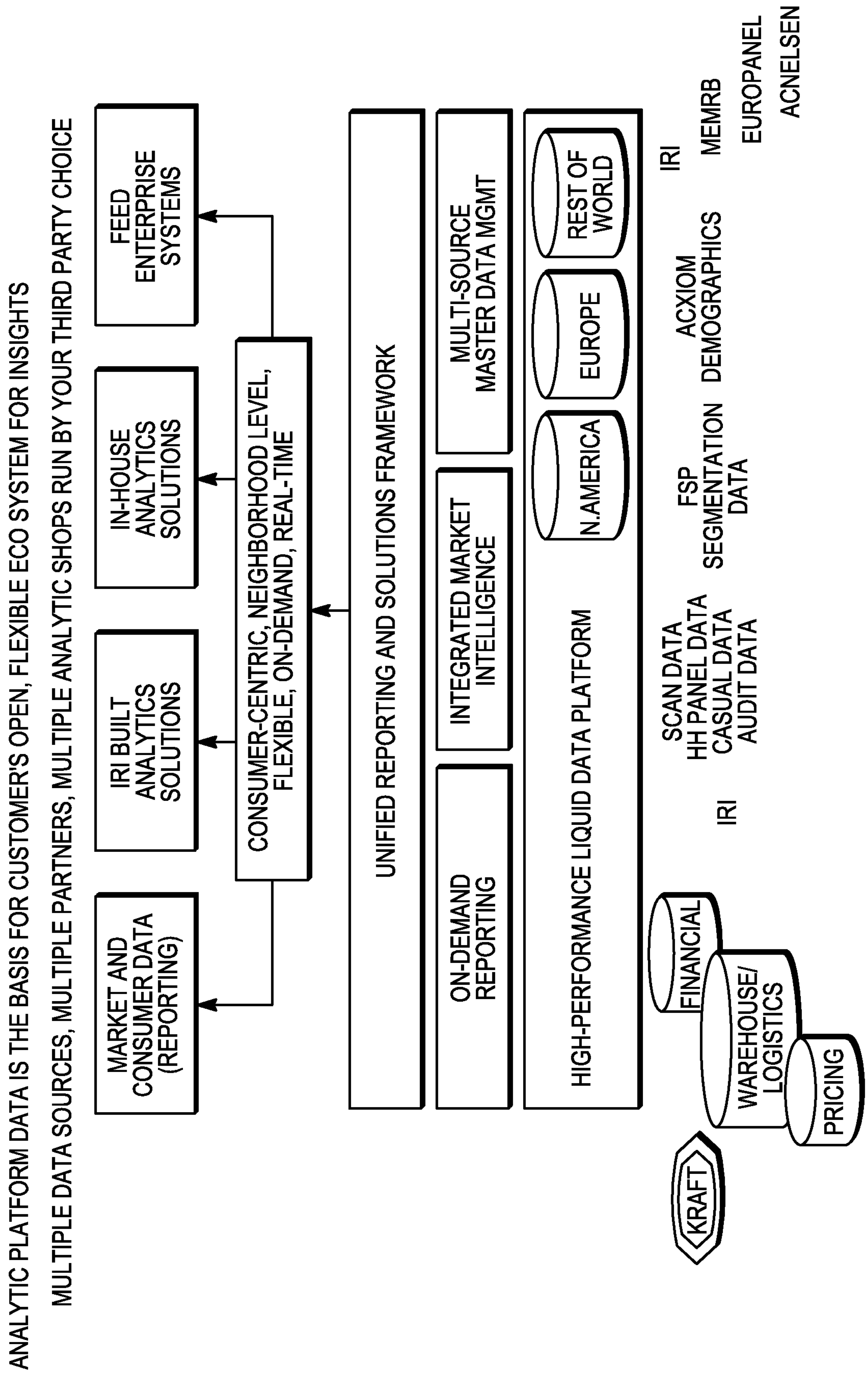
FIG. 99 depicts aspects of the analytic platform.

Referring to FIG. 99, the analytic platform may provide a unified reporting and solution framework. The unified reporting and solution framework may provide on-demand reporting, integrated market intelligence, multi-source master data management. The unified reporting and solution framework may be based on liquid data platform.

FIG. 100 refers to an exemplary snap shot for the assortment analysis. The assortment analysis may provide information for different business issues. The business issue may be related the performance of the items and brands against a particular category of product. In embodiments, the assortment analysis may highlight the particular product performance changes across customer metrics. In embodiments, the assortment analysis may provide quick snapshot of items that drive or decrease brand sales growth. In embodiments, the assortment analysis may determine items which are most important to the particular category and to the particular brand. In embodiments, the assortment analysis may determine items which are least important to the particular category. In embodiments, the assortment analysis may analyze the particular items item performance in store clusters. In embodiments, the assortment analysis may analyze item performance across the customer segments.

The analytical data platform may provide the assortment analysis by using multiple dimensions received from the user. The multiple dimensions for the assortment analysis may include customer, product, geography, time and measures. The customer dimension may include behavioral segment and the spending segment. For example, a user may choose between the consumer segment and the spending segment for the assortment analysis of the particular product. The product dimension may include category and item selection. For example, the user may choose different items for the assortment analysis. The geography dimension may include selection in a particular geography or store cluster hierarchy. For example, the user may choose a particular geography or a particular store hierarchy for the assortment analysis for the particular geography. The time dimension may include a definite period. The definite period may be a week, a quarter or a year. For example, the user may choose a year or a time period for the assortment analysis. The measure dimension may include the net money of sales, advertisement, operation, profit and the like. For example, the user may choose the total amount of money required for the advertisement of the particular product for the assortment analysis of that particular product.

In embodiments, the analytic data platform may provide the new product launch analysis. The new product analysis may provide information for different business issues. The business issue may include the performance of a new product. In embodiments, the new product launch analysis may provide performance metrics for multiple new products. In embodiments, the new product launch analysis may provide a performance analysis of key new products against projections. In embodiments, the new product launch analysis may demonstrate item strength over performance measures. In embodiments, the new product launch analysis may provide the niche product strategic.

The analytical data platform may provide the new product launch analysis by using multiple dimensions received from the user. The multiple dimensions for the new product launch analysis may include customer, product, geography, time and measures. The customer dimension may include behavioral segment and the spending segment. For example, a user may choose between the consumer segment and the spending segment for the new product launch analysis of the particular product. The product dimension may include category and item selection. For example, the user may choose different items for the new product launch analysis. The geography dimension may include selection in a particular geography or store cluster hierarchy. For example, the user may choose a particular geography or a particular store hierarchy for the new product launch analysis for the particular geography. The time dimension may include a definite period. The definite period may be a week, a quarter or a year. For example, the user may choose a year or a time period for the new product launch analysis. The measure dimension may include the net money of sales, advertisement, operation, profit and the like. For example, the user may choose the total amount of money required for the advertisement of the particular product for the new product launch analysis of that particular product. In embodiments, the analytic data platform may provide the promotion analysis for the particular product. The promotion analysis may provide information for different business issues. For example, the analytical data platform may track the performance of a particular product with respect to the amount of money spent on its product. The business issue may include the performance of the particular product. In embodiments, the promotion analysis may show an impact of a recent promotional event on the movement and sales of the particular product. In embodiments, the promotion analysis may analyze pre and post event performance of comparable items. In embodiments, the promotion analysis may identify sales lifts, cannibalization by behavioral Segment and geography. In embodiment, the promotion analysis may compare depth and breadth of discount and profit movement of the particular product.

Figure 101:
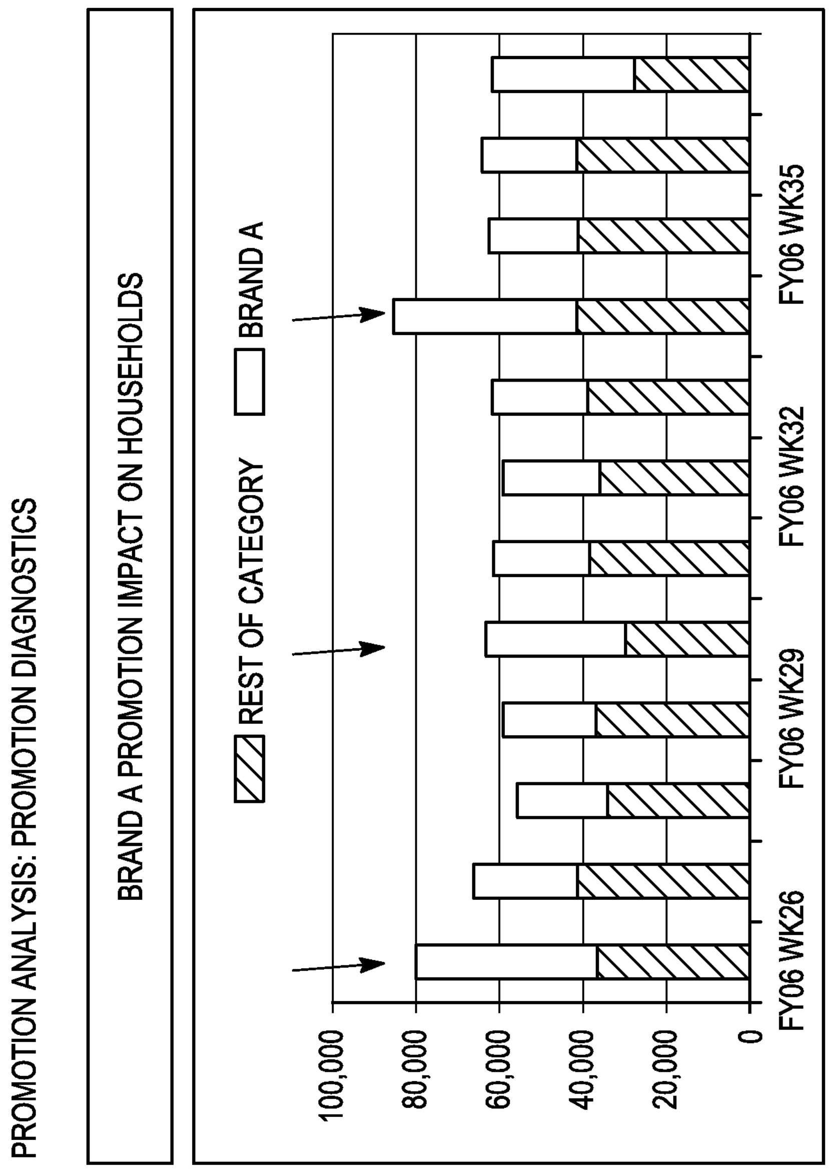
FIG. 101 depicts a sample promotion diagnostic using impact on households.
Figure 102:
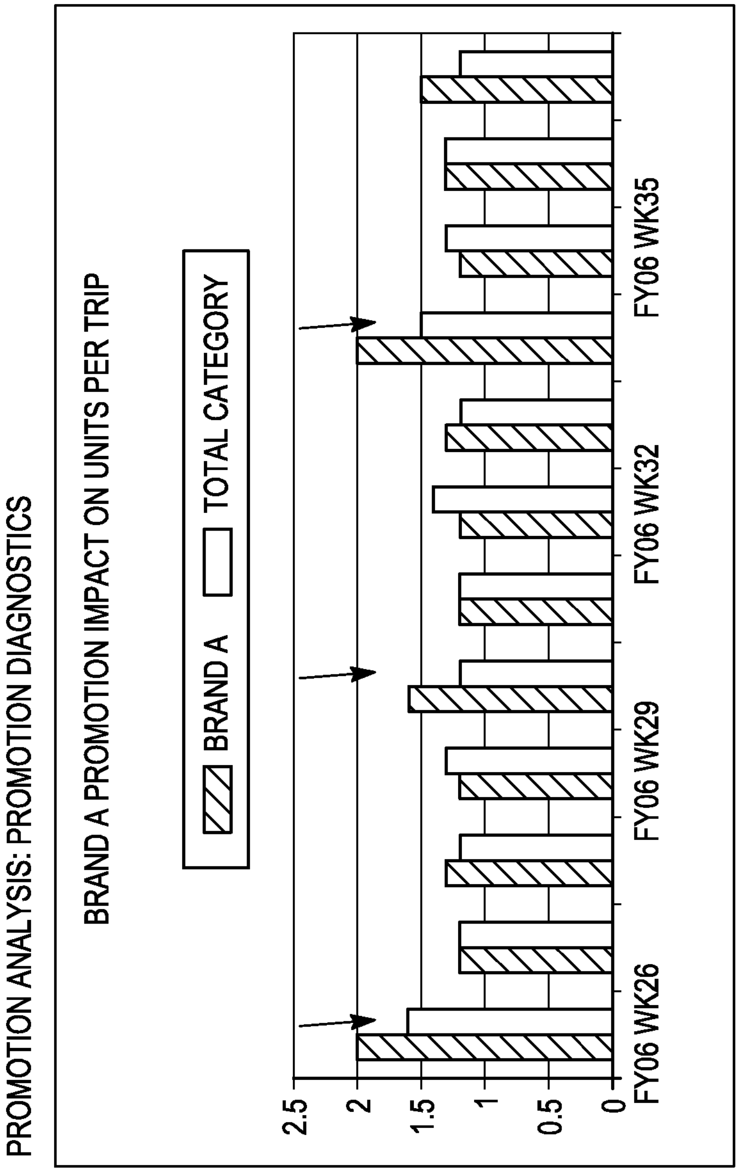
FIG. 102 depicts a sample promotion diagnostic using impact on units per trip.

In embodiments, the analytical data platform may provide the promotion diagnostic for the particular product. The promotion diagnostic may determine impact of the promotion per trip. The promotion diagnostic may determine the impact of promotion on the breadth of purchasing across the brand. For example, a bar graph, as shown in FIG. 101, representing the promotion diagnostic of a particular brand A versus rest of the categories may be provided to the user. Similarly, a bar graph, as shown in FIG. 102, representing the promotion diagnostic of a particular brand A versus all the categories may be provided to the user.

Figure 103:
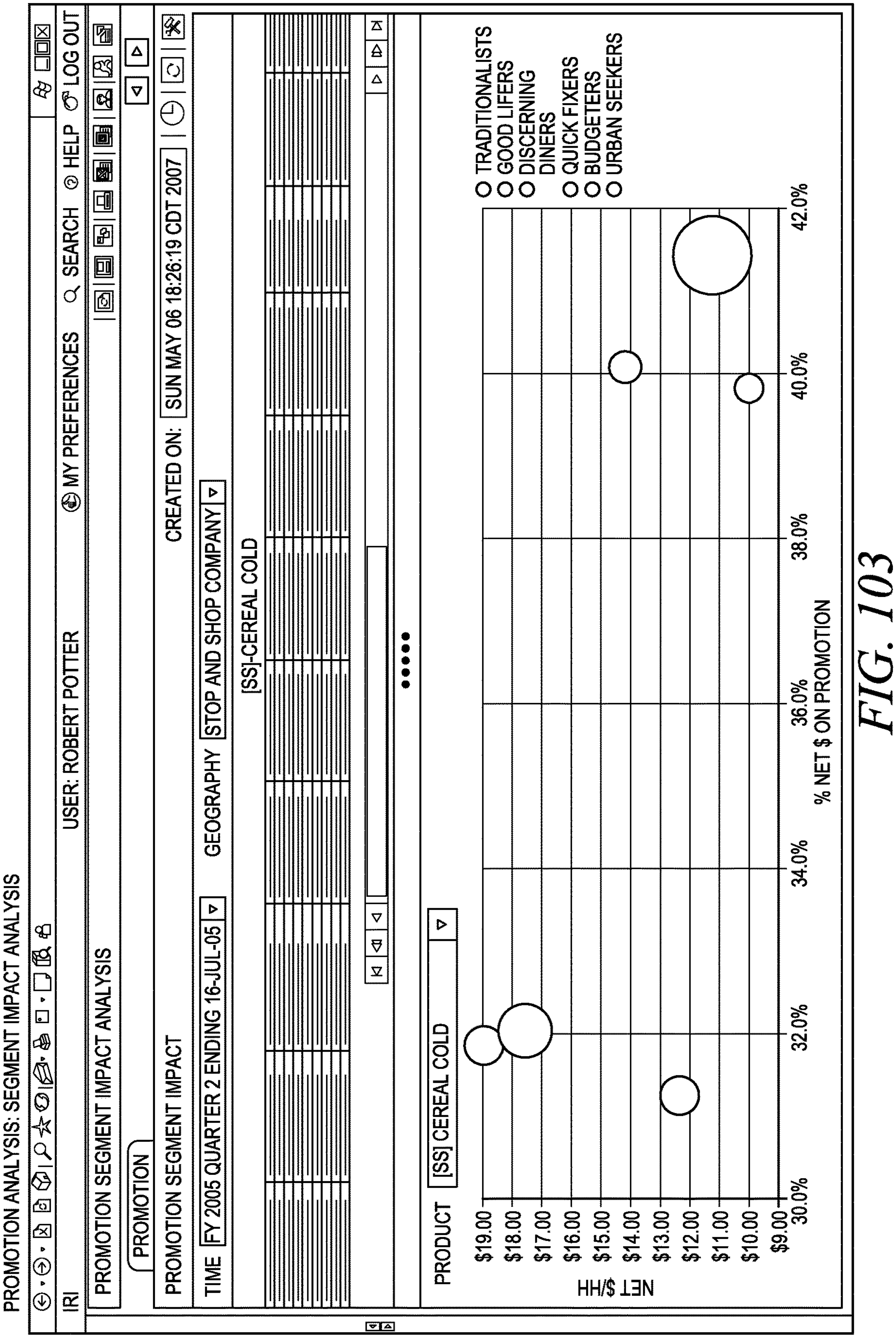
FIG. 103 depicts a segment impact analysis.

In embodiments, the analytical data platform may provide the segment impact analysis for the particular product. The segment impact analysis may provide the information of response of customer segments to the promotion of the particular product. In embodiments, the segment impact analysis may compare the depth and breadth of discount, profit movement, unit movement, and trip effects for the particular product. For example, a balloon chart, as shown in FIG. 103, representing the net investment on the promotion for different products and net sales for the different products may be provided to the user.

The analytical data platform may provide the promotion analysis by using multiple dimensions received from the user. The multiple dimensions for the promotion analysis may include customer, product, geography, time and measures. The customer dimension may include behavioral segment and the spending segment. For example, the user may choose between the consumer segment and the spending segment for the promotion analysis of the particular product. The product dimension may include category and item selection. For example, the user may choose different items for the promotion analysis. The geography dimension may include selection in a particular geography or store cluster hierarchy. For example, the user may choose a particular geography or a particular store hierarchy for the promotion analysis for the particular geography. The time dimension may include a definite period. The definite period may be a week, a quarter or a year. For example, the user may choose a year or a time period for the promotion analysis. The measure dimension may include the net money of sales, advertisement, operation, profit and the like. For example, the user may choose the total amount of money required for the advertisement of the particular product for the promotion analysis of that particular product.

In embodiments, the data analytical platform may provide the pricing analysis. The pricing analysis may provide information for different business issues. The business issue may include the comparison of the price of the particular item with the prices of the competing items. In embodiments, the pricing analysis may provide analysis of multiple products, analysis across price and key metrics. In embodiments, the pricing analysis may highlight key performance measures to identify overall brand impact. In embodiments, the pricing analysis may identify unit movements versus price by product. In embodiments, the pricing analysis may align the promotional discounts in the current period versus promotional discount for previous year. Multiple graphs, bar charts, tables, or some other type of visual representation incorporating multiple dimensions may be provided for the pricing analysis similar to the exemplary FIG. 101, FIG. 102 and FIG. 103.

The analytical data platform may provide the pricing analysis by using multiple dimensions received from the user. The multiple dimensions for the pricing analysis may include customer, product, geography, time and measures. The customer dimension may include behavioral segment and the spending segment. The product dimension may include category and item selection. The geography dimension may include selection in a particular geography or store cluster hierarchy. The time dimension may include a definite period. The definite period may be a week, a quarter or a year. The measure dimension may include the net money of sales, advertisement, operation, profit and the like.

In embodiments, the data analytical platform may provide the basic segmentation analysis. The basic segmentation analysis may provide information for different business issues. The business issue may include the understanding of HHs brand purchasing, the need to target specific brand HHs, the targeting options, developing offer strategy and the need of relevant offers against target HH. In embodiments, the basic segmentation analysis may provide HH targeting, increasing redemption rates and tracking and monitoring of targeted HHs. Multiple graphs, bar charts, tables, or some other type of visual representation incorporating multiple dimensions may be provided for the basic segmentation analysis similar. In embodiments, the data analytical platform may provide the target selection, creation of offer and export of HH list. The HH list may exported by developing offer strategy for target HH groups, identifying campaign offer for target HH groups, selecting control HH groups for campaign, generating targeted HH List and then exporting list to execute campaign.

In embodiments, the data analytical platform may provide the cross purchasing segmentation analysis. The cross purchasing segmentation analysis may provide information for different business issues. The business issue may include identify cross purchasing HH counts. The cross purchasing segmentation analysis may provide efficient cross shopping target HH ID, track campaign performance for Target HHs and measure CRM campaign effectiveness. Multiple graphs, bar charts, tables, or some other type of visual representation incorporating multiple dimensions may be provided for the cross purchasing segmentation analysis.

In embodiments, the data analytical platform may provide the behavioral segmentation analysis. The behavioral segmentation analysis may provide information for different business issues. The business issue may include identify HHs that fit hold of USA Segments. In embodiments, the behavioral segmentation analysis may provide efficient segment product purchasing matching, analyze segment performance and may measure segment purchasing behavior. Multiple graphs, bar charts, tables, or some other type of visual representation incorporating multiple dimensions may be provided for the behavioral segmentation analysis.

In embodiments, the data analytical platform may provide the spending segmentation analysis. The spending segmentation analysis may provide information for different business issues. The business issue may include identify HHs that fit hold of USA Segments. In embodiments, the spending segmentation analysis may provide efficient segment product purchasing matching, analyze segment performance and may measure segment purchasing behavior. Multiple graphs, bar charts, tables, or some other type of visual representation incorporating multiple dimensions may be provided for spending segmentation analysis.

In embodiments, the data analytical platform may provide the migration segmentation analysis. The migration segmentation analysis may provide information for different business issues. The business issue may include understanding the product HH churn. In embodiments, the migration segmentation analysis may provide rapid ID of at risk HHs; rapid ID of at-risk stores and may develops retention campaigns. Multiple graphs, bar charts, tables, or some other type of visual representation incorporating multiple dimensions may be provide for migration segmentation analysis.

In embodiments, the data analytical platform may provide the target segment analysis. In embodiments, the target segment analyses may provide the best and worst stores for HHs, loyalty of customers towards any particular brand, the spending of customers for the particular brand, information about the top 3 categories that the customers shop in, the % of HHs buying a particular brand, the % of HHs buying a brand and the HHs favorite brands in a category. Multiple graphs, bar charts, tables, or some other type of visual representation incorporating multiple dimensions may be provided for the target segment analysis.

In embodiments, the data analytical platform may provide the score carding analysis. In embodiments, the score carding analysis may provide information for different business issues. The business issue may include a variation of product's KPIs over time. The score carding analysis may provide a trending view quarterly, periodically or weekly. The score carding analysis may provide a trending view for a definite period. The definite period may be a week or a year. The score card analysis may provide the comparison of the topline and HHs measure groupings over time. The score card may highlight key measures and may track the effects of seasonality, promotional effects and competitive incursions. The score card analysis may provide the performance of a brand, retailers department, category, sub-category for a definite time.

In embodiments, the data analytical platform may provide the business planning analysis. In embodiments, the business planning analysis may provide information for different business issues. The business issue may be related to overview of customer centric key measure, brand measures topline, customer segment measures topline, behavioral segments mix, new versus baseline customer profile, brand loyalty overview, losses or gains of customer migration or assessment of top brands. In embodiments, the business planning analysis may provide granular insights on vendor, brand performance, category, sub-category performance against geographies or store clusters, customer segments and time. In embodiments, the business planning analysis may provide development of targeted strategies to improve category performance or score carding to measure category movement and performance. Multiple graphs, bar charts, tables, or some other type of visual representation incorporating multiple dimensions may be provided for business planning analysis.

The analytical data platform may provide the business planning analysis by using multiple dimensions received from the user. The multiple dimensions for business planning analysis may include customer, product, geography, time and measures. The customer dimension may include behavioral segment and the spending segment. The product dimension may include category and item selection. For example, the user may choose different items for the business planning analysis. The geography dimension may include selection in a particular geography or store cluster hierarchy. The time dimension may include a definite period. The definite period may be a week, a quarter or a year. For example, the user may choose a year or a time period for business planning analysis. The measure dimension may include the net money of sales, advertisement, operation, profit and the like.

In embodiments, the data analytical platform may provide the profiling according to product trip key metrics. In embodiments, the profiling according to product trip key metrics may provide information for different business issues. The business issue may be related to the impact of the particular brand performance by different trip types or the difference of trip missions between the various customer segments. In embodiments, the profiling according to product trip key metrics may provide in-depth understanding of customer behavior relative to "reason" for the trip or the elevated knowledge to assist in decisions for merchandising, product adjacencies, promotions, and the like. In embodiments, the profiling according to product trip key metrics may provide better understanding of basket dynamics and customer dynamics such as trip frequency, units purchased. Multiple graphs, bar charts, tables, or some other type of visual representation incorporating multiple dimensions may be provided for the profiling according to product trip key metrics.

The analytical data platform may provide the profiling according to product trip key metrics by using multiple dimensions received from the user. The multiple dimensions for profiling according to product trip key metrics may include customer, product, geography, time and measures. The customer dimension may include all HH's, behavioral segment and the spending segment. The product dimension may include any level of product hierarchy. For example, the user may choose any hierarchy for the profiling. The geography dimension may include selection in a particular geography or store cluster hierarchy. For example, the user may choose a particular geography or a particular store hierarchy for profiling for the particular geography. The time dimension may include any current or custom time. For example, the user may choose a year or a time period for profiling according to product trip key metrics. The measure dimension may include the net money of sales, advertisement, operation, profit and the like. For example, the user may choose the total amount of money required for the advertisement of the particular product for the profiling according to product trip key metrics of that particular product.

In embodiments, the data analytical platform may provide the profiling according to geography benchmark. In embodiments, the profiling according to geography benchmark may provide information for different business issues. The business issue may be related to comparison of different divisions, store and store clusters. In embodiments, the profiling according to geography benchmark may provide insights on brand performance issues, opportunities between various geographical dimensions, identify store performance issues resulting from competitive, ethnic or demographic assortments and mixes. In embodiments, the profiling according to geography benchmark may provide identifying variances by behavioral segment density and distribution. Multiple graphs, bar charts, tables, or some other type of visual representation incorporating multiple dimensions may be provided for the profiling according to geography benchmark.

The analytical data platform may provide the profiling according to geography benchmark by using multiple dimensions received from the user. The multiple dimensions for profiling according to geography benchmark may include customer, product, geography, time and measures. The customer dimension may include all HH's, behavioral segment and the spending segment. The product dimension may include any level of product hierarchy. The geography dimension may include selection in a particular geography or store cluster hierarchy. The time dimension may include any current or custom time. The measure dimension may include the net money of sales, advertisement, operation, profit and the like.

In embodiments, the data analytical platform may provide the category portfolio analysis. In embodiments, the category portfolio analysis may provide information for different business issues. The business issue may be related to differentiation of customer segments across brands, the portfolio growth of brands and products drive, and the brand support loyalty among each behavioral segment. In embodiments, the category portfolio analysis may provide category managers with trends, awareness of customer trends, identification of supplier/brand impact to the category and the geographical differences or impacts on the business. Multiple graphs, bar charts, tables, or some other type of visual representation incorporating multiple dimensions may be provided for the category portfolio analysis.

The analytical data platform may provide the category portfolio analysis by using multiple dimensions received from the user. The multiple dimensions for category portfolio analysis may include customer, product, geography, time and measures. The customer dimension may include all HH's, behavioral segment and the spending segment. The product dimension may include any level of product hierarchy. The geography dimension may include selection in a particular geography or store cluster hierarchy. The time dimension may include any current or custom time. The measure dimension may include the net money of sales, advertisement, operation, profit and the like.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method for facilitating high-speed user exploration of a dimension of projected sales information using actual sales data and projection data in a data warehouse, the method comprising:

receiving a data set in an analytic platform, the data set including sales data and projection weights applied to the sales data to calculate projections of future sales data;

creating a flexible dimension for a query of aggregated data by, prior to receiving the query, pre-aggregating the sales data and projection weights along a primary sorting dimension into a projected fact table containing projected sales resulting from aggregating the sales data and the projection weights, the projected sales grouped by one or more of time, item, and venue and stored keyed by one or more corresponding keys of time, item, and venue, where an aggregating query in the flexible dimension is used as a lookup in the projected fact table for any values of the flexible dimension used for the pre-aggregating and represented in an index containing references to corresponding facts in the projected fact table;

sorting projected facts in the projected fact table by the primary sorting dimension; and processing the query against the sales data with respect to the primary sorting dimension using pre-aggregated data in the projected fact table when the query does not seek to vary the primary sorting dimension for the projected fact table and executing a new query against the sales data when the query seeks to vary the primary sorting dimension for the fact table to establish flexibility with respect to at least one dimension for performing computations when the query seeks to vary the primary sorting dimension, wherein when the query does not seek to vary the primary sorting dimension and requires a number of facts in the pre-aggregated data, processing the query includes locating the number of facts and summing a corresponding number of values for the number of facts to provide an analytic result to the query.

2. The method of claim 1, further comprising, prior to receiving the query, sorting the projected facts by a secondary sorting dimension.

3. The method of claim 2, further comprising, prior to receiving the query, sorting the projected facts by a tertiary sorting dimension.

4. The method of claim 3, wherein the primary, secondary, and tertiary sorting dimensions are selected from the group consisting of venue, time, and item.

5. The method of claim 1 wherein the projected sales are aggregated by time and stored keyed by time.

6. The method of claim 1 wherein the projected sales are aggregated by venue and stored keyed by venue.

7. The method of claim 1 wherein the projected sales are aggregated by item and stored keyed by item.

8. The method of claim 1 wherein the projections of future sales data include projections for a plurality of distinct product categories.

9. The method of claim 1 wherein the primary sorting dimension is time.

10. The method of claim 1 wherein processing the query with respect to the primary sorting dimension further comprises interactively serving results of the query back to a user from the projected fact table in response to a user input via an interface that permits the user to interactively select a point along the primary sorting dimension and view projected results of the query corresponding to the selected point, without causing the analytic platform to reprocess the query during the interactive point selection.

11. The method of claim 1 further comprising processing a second query against the sales data with respect to a dimension other than the primary sorting dimension by generating another aggregation from the data set.

12. A computer program product for facilitating high-speed user exploration of a dimension of projected sales information using actual sales data and projection data in a data warehouse, the computer program product comprising computer executable code embodied in a non-transitory computer readable medium that, when executing on one or more computing devices, performs the steps of:

receiving a data set in an analytic platform, the data set including sales data and projection weights applied to the sales data to calculate projections of future sales data;

creating a flexible dimension for a query of aggregated data by, prior to receiving the query, pre-aggregating the sales data and projection weights along a primary sorting dimension into a projected fact table containing projected sales resulting from aggregating the sales data and the projection weights, the projected sales grouped by one or more of time, item, and venue and stored keyed by one or more corresponding keys of time, item, and venue, where an aggregating query in the flexible dimension is used as a lookup in the projected fact table for any values of the flexible dimension used for the pre-aggregating and represented in an index containing references to corresponding facts in the projected fact table;

sorting projected facts in the projected fact table by the primary sorting dimension; and processing the query against the sales data with respect to the primary sorting dimension using pre-aggregated data in the projected fact table when the query does not seek to vary the primary sorting dimension for the projected fact table and executing a new query against the sales data when the query seeks to vary the primary sorting dimension for the fact table to establish flexibility with respect to at least one dimension for performing computations when the query seeks to vary the primary sorting dimension, wherein when the query does not seek to vary the primary sorting dimension and requires a number of facts in the pre-aggregated data, processing the query includes locating the number of facts and summing a corresponding number of values for the number of facts to provide an analytic result to the query.

13. The computer program product of claim 12, further comprising code that performs the step of, prior to receiving the query, sorting the projected facts by a secondary sorting dimension.

14. The computer program product of claim 13, further comprising code that performs the step of, prior to receiving the query, sorting the projected facts by a tertiary sorting dimension.

15. The computer program product of claim 14, wherein the primary, secondary, and tertiary sorting dimensions are selected from the group consisting of venue, time, and item.

16. The computer program product of claim 12 wherein the projected sales are aggregated by time and stored keyed by time.

17. The computer program product of claim 12 wherein the projected sales are aggregated by venue and stored keyed by venue.

18. The computer program product of claim 12 wherein the primary sorting dimension is time.

19. The computer program product of claim 12 wherein processing the query with respect to the primary sorting dimension further comprises interactively serving results of the query back to a user from the projected fact table in response to a user input via an interface that permits the user to interactively select a point along the primary sorting dimension and view projected results of the query corresponding to the selected point, without causing the analytic platform to reprocess the query during the interactive point selection.

20. The computer program product of claim 12 further comprising code that performs the step of processing a second query against the sales data with respect to a dimension other than the primary sorting dimension by generating another aggregation from the data set.

* * * * *